US010616598B2

(12) United States Patent
Takahashi et al.

(10) Patent No.: US 10,616,598 B2
(45) Date of Patent: *Apr. 7, 2020

(54) IMAGE PROCESSING DEVICE AND METHOD

(71) Applicant: SONY CORPORATION, Tokyo (JP)

(72) Inventors: Yoshitomo Takahashi, Kanagawa (JP); Kazushi Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/378,594

(22) Filed: Apr. 9, 2019

(65) Prior Publication Data
US 2019/0238881 A1  Aug. 1, 2019

Related U.S. Application Data

(63) Continuation of application No. 15/477,609, filed on Apr. 3, 2017, now Pat. No. 10,349,076, which is a (Continued)

(30) Foreign Application Priority Data

Sep. 3, 2012 (JP) ................................ 2012-193607
Dec. 28, 2012 (JP) ................................ 2012-286726
Mar. 26, 2013 (JP) ................................ 2013-064131

(51) Int. Cl.
H04N 19/513 (2014.01)
H04N 19/597 (2014.01)
(Continued)

(52) U.S. Cl.
CPC ........... *H04N 19/513* (2014.11); *H04N 19/11* (2014.11); *H04N 19/119* (2014.11);
(Continued)

(58) Field of Classification Search
CPC .... H04N 19/513; H04N 19/31; H04N 19/122; H04N 19/463; H04N 19/51; H04N 19/30;
(Continued)

(56) References Cited

U.S. PATENT DOCUMENTS 8,532,187 B2   9/2013  Jeon et al.
8,553,769 B2  10/2013  He et al.
(Continued)

FOREIGN PATENT DOCUMENTS

JP    2002-199399 A    7/2002
JP    2004-56823 A    2/2004
(Continued)

OTHER PUBLICATIONS

Japanese Office Action dated Aug. 22, 2017 in Patent Application No. 2016-146259 (with English Translation).
(Continued)

Primary Examiner — Yon J Couso
(74) Attorney, Agent, or Firm — Xsensus LLP

(57) ABSTRACT

The present disclosure relates to an image processing device and method which are capable of suppressing an increase in a storage capacity necessary for encoding and decoding.
A motion compensating unit that performs motion compensation in decoding of a current layer and a first compressing unit that compresses a motion vector of the current layer that is reconstructed by the motion compensating unit and used for the motion compensation in decoding of another layer are provided. Alternatively, a motion predicting/compensating unit that performs motion prediction and compensation in encoding of a current layer and a first compressing unit that compresses a motion vector of the current layer that is generated by the motion predicting/compensating unit and used in the motion prediction and compensation in encoding of another layer are provided. For example, the present disclosure can be applied to an image processing device.

14 Claims, 136 Drawing Sheets

Related U.S. Application Data continuation of application No. 14/419,739, filed as application No. PCT/JP2013/072232 on Aug. 21, 2013, now abandoned.

(51) Int. Cl.

| | | |
|---|---|---|
| *H04N 19/52* | (2014.01) | |
| *H04N 19/70* | (2014.01) | |
| *H04N 19/119* | (2014.01) | |
| *H04N 19/11* | (2014.01) | |
| *H04N 19/423* | (2014.01) | |
| *H04N 19/51* | (2014.01) | |
| *H04N 19/463* | (2014.01) | |
| *H04N 19/30* | (2014.01) | |
| *H04N 19/122* | (2014.01) | |
| *H04N 19/31* | (2014.01) | |
| *H04N 19/176* | (2014.01) | |

(52) U.S. Cl.
CPC .......... *H04N 19/122* (2014.11); *H04N 19/30* (2014.11); *H04N 19/31* (2014.11); *H04N 19/423* (2014.11); *H04N 19/463* (2014.11); *H04N 19/51* (2014.11); *H04N 19/52* (2014.11); *H04N 19/597* (2014.11); *H04N 19/70* (2014.11); *H04N 19/176* (2014.11)

(58) Field of Classification Search
CPC .... H04N 19/423; H04N 19/11; H04N 19/119; H04N 19/70; H04N 19/52; H04N 19/597; H04N 19/176
See application file for complete search history.

(56) References Cited

U.S. PATENT DOCUMENTS

| | | | |
|---|---|---|---|
| 9,900,593 B2* | 2/2018 | Xiu | ........................ H04N 19/52 |
| 2006/0133503 A1 | 6/2006 | Park et al. | |
| 2012/0057632 A1 | 3/2012 | Sato | |
| 2013/0128965 A1 | 5/2013 | Zhang et al. | |
| 2013/0188013 A1 | 7/2013 | Chen et al. | |
| 2014/0301446 A1 | 10/2014 | Maeda | |
| 2015/0350676 A1 | 12/2015 | Chen et al. | |

FOREIGN PATENT DOCUMENTS

| | | |
|---|---|---|
| JP | 2006-074651 A | 3/2006 |
| JP | 2009-513074 A | 3/2009 |
| JP | 2010-507286 A | 3/2010 |
| WO | 2012/096164 A1 | 7/2012 |

OTHER PUBLICATIONS

Japanese Office Action dated Aug. 22, 2017 in Patent Application No. 2014-532941 (with English Translation).
Combined Chinese Office Action and Search Report dated Aug. 29, 2017 in Patent Application No. 201510479166.0 (with English Translation).
Combined Chinese Office Action and Search Report dated Aug. 2, 2017 in Patent Application No. 201380045957.1 (with English Translation).
Heiko Schwarz et al., "3D Video Coding Using Advanced Prediction, Depth Modeling, and Encoder Control Methods", 2012 Picture Coding Symposium May 7-9, 2012, 10 pages.
International Search Report dated Nov. 19, 2013 in PCT/JP2013/072232.
Jun Xu et al., "Non-TE5: Memory reduction for MV data of EL in SHVC", Joint Collaborative Team on video Coding (JCT-VC) of ITU-T SG16 WP3 and ISO/IEC JTC1/SC29/WG11, JCTVC-L0221r2,12th Meeting, Sony Electronics Inc., Jan. 14-23, 2013, 6 pages.
Yeping Su et al., "On motion vector competition", Joint Collaborative Team on video Coding (JCT-VC) of ITU-T SG16 WP3 an ISO/IEC JTC1/SC29/WG11, 3rd Meeting, JCTVC-C257, SHARP, Oct. 7-15, 2010, 2 pages.
Benjamin Bross et al., "High efficiency video coding (HEVC) Text specification draft 6", Joint Collaborative Team on video Coding (JCT-VC) of ITU-T SG16 WP3 and ISO/IEC JTC1/SC29/WG11, 8 Meeting, JCTVC-H1003, Feb. 1-10, 2012, 259 pages.
Yoshiya Yamamoto et al., "3D-CE5J related: Simplification of AMVP", Joint Collaborative Team on 3D video Coding Extension Development of ITU-T SG16 WP3 and ISO/IEC JTC 1/SC29/WG11, 1st Meeting, JCT2-A0014, Sharp Corporation, Jul. 16-20, 2012, 17 pages.
Extended European Search Report dated Mar. 30, 2016 in Patent Application No. 13833009.7.
Heiko Schwarz et al., "3D Video Coding Using Advanced Prediction, Depth Modeling, and Encoder Control Methods", 2012 Picture Coding Symposium, IEEE, XP032449814, May 7-9, 2012, 4 pages.
Yeping Su et al., "CE9: Reduced resolution storage of motion vector data", Sharp, Joint Collaborative Team on Video Coding (JCT-VC) of ITU-T SG16 WP3 and ISO/IEC JTC1/SC29/WG11, Document: JCTVC-D072, WG11 No. M18822, XP030008112, Jan. 20-28, 2011, 3 Pages.
Ying Chen et al., "AHG10: Hooks related to motion for the 3DV extensions of HEVC", Qualcomm Incorporated, Joint Collaborative Team on video Coding (JCT-VC) of ITU-T SG16 WP3 and ISO/IEC JTC1/SC29/WG11, Document: JCTVC-J0122, XP030112484, Jul. 11-20, 2012, 20 pages.
Korean Notice of Preliminary Rejection dated Sep. 11, 2019 in Korean Application No. 10-2015-7004523.

* cited by examiner

FIG. 44

```
seq_parameter_set_rbsp() {
    ...
    sps_temporal_mvp_enable_flag
    vui_parameters_present_flag
    if(vui_parameters_present_flag)
        vui_parameters()
    sps_extension_flag
    if(sps_extension_flag) {
        sps_mv_compression_flag
    }
    rbsp_trailing_bits()
}
```

FIG. 98

| slice_segment_header( ) { | Descriptor |
|---|---|
|   first_slice_segment_in_pic_flag | u(1) |
|   if( RapPicFlag ) | |
|     no_output_of_prior_pics_flag | u(1) |
|   slice_pic_parameter_set_id | ue(v) |
|   if( !first_slice_segment_in_pic_flag ) { | |
|     if(dependent_slice_segments_enabled_flag ) | |
|       dependent_slice_segment_flag | u(1) |
|     slice_segment_address | u(v) |
|   } | |
|   if( !dependent_slice_segment_flag ) { | |
|     for ( i = 0; i < num_extra_slice_header_bits; i++ ) | |
|       slice_reserved_undetermined_flag[ i ] | u(1) |
|     slice_type | ue(v) |
|     if( output_flag_present_flag ) | |
|       pic_output_flag | u(1) |
|     if( separate_colour_plane_flag = = 1 ) | |
|       colour_plane_id | u(2) |
|     if( !IdrPicFlag ) { | |
|       pic_order_cnt_lsb | u(v) |
|       short_term_ref_pic_set_sps_flag | u(1) |
|       if( !short_term_ref_pic_set_sps_flag ) | |
|         short_term_ref_pic_set( num_short_term_ref_pic_sets ) | |
|       else if( num_short_term_ref_pic_sets > 1 ) | |
|         short_term_ref_pic_set_idx | u(v) |
|       if( long_term_ref_pics_present_flag ) { | |
|         if( num_long_term_ref_pics_sps > 0 ) | |
|           num_long_term_sps | ue(v) |
|         num_long_term_pics | ue(v) |
|         for( i = 0; i < num_long_term_sps + num_long_term_pics; i++ ) { | |
|           if( i < num_long_term_sps && num_long_term_ref_pics_sps > 1) | |
|             lt_idx_sps[ i ] | u(v) |
|           else { | |
|             poc_lsb_lt[ i ] | u(v) |
|             used_by_curr_pic_lt_flag[ i ] | u(1) |
|           } | |
|           delta_poc_msb_present_flag[ i ] | u(1) |
|           if( delta_poc_msb_present_flag[ i ] ) | |
|             delta_poc_msb_cycle_lt[ i ] | ue(v) |
|         } | |
|       } | |
|       if( sps_temporal_mvp_enable_flag ) | |
|         slice_temporal_mvp_enable_flag | u(1) |

FIG. 99

| | |
|---|---|
| } | |
| if(sample_adaptive_offset_enabled_flag) { | |
|     slice_sao_luma_flag | u(1) |
|     slice_sao_chroma_flag | u(1) |
| } | |
| if( slice_type == P \|\| slice_type == B) { | |
|     num_ref_idx_active_override_flag | u(1) |
|     if(num_ref_idx_active_override_flag) { | |
|         num_ref_idx_l0_active_minus1 | ue(v) |
|         if(slice_type == B) | |
|             num_ref_idx_l1_active_minus1 | ue(v) |
|     } | |
|     if(lists_modification_present_flag && NumPocTotalCurr > 1) | |
|         ref_pic_lists_modification( ) | |
|     if(slice_type == B) | |
|         mvd_l1_zero_flag | u(1) |
|     if(cabac_init_present_flag) | |
|         cabac_init_flag | u(1) |
|     if(slice_temporal_mvp_enable_flag) { | |
|         if(slice_type == B) | |
|             collocated_from_l0_flag | u(1) |
|     if((collocated_from_l0_flag && num_ref_idx_l0_active_minus1 > 0) <br>       \|\| (!collocated_from_l0_flag && <br>           num_ref_idx_l1_active_minus1 > 0)) <br> [Ed. (GJS):Does the logic of this condition check make sense when the slice is not a B slice?(YK):No perfectly, as the value of num_ref_idx_l1_active_minus1 is not inferred for a P slice, though it could also be interpreted that the check of the value of num_ref_idx_l1_active_minus1 is not needed for P slices as the value of collocated_from_l0_flag has to be equal to 1.] | |
|         collocated_ref_idx | ue(v) |
|     } | |
|     if( ( weighted_pred_flag && slice_type == P) \|\| <br>       ( weighted_bipred_flag && slice_type == B)) | |
|         pred_weight_table( ) | |
|     five_minus_max_num_merge_cand | ue(v) |
| } | |
| slice_qp_delta | se(v) |
| if(pps_slice_chroma_qp_offsets_present_flag) { | |
|     slice_cb_qp_offset | se(v) |
|     slice_cr_qp_offset | se(v) |
| } | |
| if(deblocking_filter_control_present_flag) { | |
|     if(deblocking_filter_override_enabled_flag) | |
|         deblocking_filter_override_flag | u(1) |
|     if(deblocking_filter_override_flag) { | |
|         slice_disable_deblocking_filter_flag | u(1) |

FIG. 100

| | |
|---|---|
| if(!slice_disable_deblocking_filter_flag) { | |
|     slice_beta_offset_div2 | se(v) |
|     slice_tc_offset_div2 | se(v) |
|   } | |
|  } | |
| } | |
| if(loop_filter_across_slices_enabled_flag && | |
|   (slice_sao_luma_flag \|\| slice_sao_chroma_flag \|\| | |
|   !slice_disable_deblocking_filter_flag)) | |
|   slice_loop_filter_across_slices_enabled_flag | u(1) |
| } | |
| if( tiles_enabled_flag \|\| entropy_coding_sync_enabled_flag) { | |
|   num_entry_point_offsets | ue(v) |
|   if(num_entry_point_offsets > 0) { | |
|     offset_len_minus1 | ue(v) |
|     for(i = 0; i < num_entry_point_offsets; i++) | |
|       entry_point_offset_minus1[ i ] | u(v) |
|   } | |
| } | |
| if(slice_segment_header_extension_present_flag) { | |
|   slice_segment_header_extension_length | ue(v) |
|   for(i = 0; i < slice_segment_header_extension_length; i++) | |
|     slice_segment_header_extension_data_byte[ i ] | u(8) |
| } | |
| byte_alignment( ) | |
| } | |

FIG. 101

| | Descriptor |
|---|---|
| slice_segment_header( ) { | |
|   first_slice_segment_in_pic_flag | u(1) |
|   if(RapPicFlag) | |
|     no_output_of_prior_pics_flag | u(1) |
|   slice_pic_parameter_set_id | ue(v) |
|   if(!first_slice_segment_in_pic_flag) { | |
|     if(dependent_slice_segments_enabled_flag) | |
|       dependent_slice_segment_flag | u(1) |
|     slice_segment_address | u(v) |
|   } | |
|   if(!dependent_slice_segment_flag) { | |
|     for (i = 0; i < num_extra_slice_header_bits; i++) | |
|       slice_reserved_undetermined_flag[ i ] | u(1) |
|     slice_type | ue(v) |
|     if(output_flag_present_flag) | |
|       pic_output_flag | u(1) |
|     if(separate_colour_plane_flag == 1) | |
|       colour_plane_id | u(2) |
|     if(!IdrPicFlag) { | |
|       pic_order_cnt_lsb | u(v) |
|       short_term_ref_pic_set_sps_flag | u(1) |
|       if(!short_term_ref_pic_set_sps_flag) | |
|         short_term_ref_pic_set(num_short_term_ref_pic_sets) | |
|       else if(num_short_term_ref_pic_sets > 1) | |
|         short_term_ref_pic_set_idx | u(v) |
|       if(long_term_ref_pics_present_flag) { | |
|         if(num_long_term_ref_pics_sps > 0) | |
|           num_long_term_sps | ue(v) |
|         num_long_term_pics | ue(v) |
|         for(i = 0; i < num_long_term_sps + num_long_term_pics; i++) { | |
|           if(i < num_long_term_sps && num_long_term_ref_pics_sps > 1) | |
|             lt_idx_sps[ i ] | u(v) |
|           else{ | |
|             poc_lsb_lt[ i ] | u(v) |
|             used_by_curr_pic_lt_flag[ i ] | u(1) |
|           } | |
|           delta_poc_msb_present_flag[ i ] | u(1) |
|           if(delta_poc_msb_present_flag[ i ]) | |
|             delta_poc_msb_cycle_lt[ i ] | ue(v) |
|         } | |
|       } | |
|     if(sps_temporal_mvp_enable_flag) | |
|       slice_temporal_mvp_enable_flag | u(1) |

FIG. 102

| | |
|---|---|
| } | |
| if(sample_adaptive_offset_enabled_flag) { | |
|     slice_sao_luma_flag | u(1) |
|     slice_sao_chroma_flag | u(1) |
| } | |
| if(slice_type == P || slice_type == B) { | |
|     num_ref_idx_active_override_flag | u(1) |
|     if(num_ref_idx_active_override_flag) { | |
|         num_ref_idx_l0_active_minus1 | ue(v) |
|         if(slice_type == B) | |
|             num_ref_idx_l1_active_minus1 | ue(v) |
|     } | |
|     if(lists_modification_present_flag && NumPocTotalCurr > 1) | |
|         ref_pic_lists_modification( ) | |
|     if(slice_type == B) | |
|         mvd_l1_zero_flag | u(1) |
|     if(cabac_init_present_flag) | |
|         cabac_init_flag | u(1) |
|     if(slice_temporal_mvp_enable_flag) { | |
|         if(slice_type == B) | |
|             collocated_from_l0_flag | u(1) |
|             colbasemv_from_l0_flag | u(1) |
|         if((collocated_from_l0_flag && num_ref_idx_l0_active_minus1>0) <br>         \|\| (!collocated_from_l0_flag && <br>         num_ref_idx_l1_active_minus1 > 0)) <br> [Ed. (GJS):Does the logic of this condition check make sense when the slice is not a B slice?(YK):No perfectly, as the value of num_ref_idx_l1_active_minus1 is not inferred for a P slice, though it could also be intepreted that the check of the value of num_ref_idx_l1_active_minus1 is not needed for P slices as the value of collocated_from_l0_flag has to be equal to 1.] | |
|         collocated_ref_idx | ue(v) |
|     } | |
|     if((weighted_pred_flag && slice_type == P) \|\| <br>         (weighted_bipred_flag && slice_type == B)) | |
|         pred_weight_table( ) | |
|     five_minus_max_num_merge_cand | ue(v) |
| } | |
| slice_qp_delta | se(v) |
| if(pps_slice_chroma_qp_offsets_present_flag) { | |
|     slice_cb_qp_offset | se(v) |
|     slice_cr_qp_offset | se(v) |
| } | |
| if(deblocking_filter_control_present_flag) { | |
|     if(deblocking_filter_override_enabled_flag) | |
|         deblocking_filter_override_flag | u(1) |
|     if(deblocking_filter_override_flag) { | |

FIG. 103

| | |
|---|---|
| slice_disable_deblocking_filter_flag | u(1) |
| if(!slice_disable_deblocking_filter_flag) { | |
| slice_beta_offset_div2 | se(v) |
| slice_tc_offset_div2 | se(v) |
| } | |
| } | |
| } | |
| if(loop_filter_across_slices_enabled_flag && | |
| (slice_sao_luma_flag \|\| slice_sao_chroma_flag \|\| | |
| !slice_disable_deblocking_filter_flag ) ) | |
| slice_loop_filter_across_slices_enabled_flag | u(1) |
| } | |
| if(tiles_enabled_flag \|\| entropy_coding_sync_enabled_flag) { | |
| num_entry_point_offsets | ue(v) |
| if(num_entry_point_offsets > 0) { | |
| offset_len_minus1 | ue(v) |
| for(i = 0; i < num_entry_point_offsets; i++) | |
| entry_point_offset_minus1[ i ] | u(v) |
| } | |
| } | |
| if(slice_segment_header_extension_present_flag) { | |
| slice_segment_header_extension_length | ue(v) |
| for(i = 0; i < slice_segment_header_extension_length; i++) | |
| slice_segment_header_extension_data_byte[ i ] | u(8) |
| } | |
| byte_alignment( ) | |
| } | |

FIG. 132

```xml
<?xml version="1.0"?>
<MPD
xmlns:xsi="http://www.w3.org/2001/XMLSchema-instance"
xmlns="urn:mpeg:DASH:schema:MPD:2011"
xsi:schemaLocation="urn:mpeg:DASH:schema:MPD:2011 DASH-MPD.xsd"
type="static"
mediaPresentationDuration="PT3256S"
minBufferTime="PT1.2S"
profiles="urn:mpeg:dash:profile:isoff-on-demand:2011">

<BaseURL>http://cdn1.example.com/</BaseURL>
<BaseURL>http://cdn2.example.com/</BaseURL>

<Period>
  <!--English Audio-->
  <AdaptationSet mimeType="audio/mp4" codecs="mp4a.0x40" lang="en" subsegmentAlignment="true" subsegmentStartsWithSAP="1">
    <ContentProtection schemeIdUri="urn:uuid:70608953-656C-5244-4D48-65616465722l" />
    <Representation id="1" bandwidth="64000">
      <BaseURL>76574l2346.mp4</BaseURL>
    </Representation>
    <Representation id="2" bandwidth="32000">
      <BaseURL>3460846346.mp4</BaseURL>
    </Representation>
  </AdaptationSet>
  <!--Video-->
  <AdaptationSet mimeType="video/mp4" codecs="avc1.4d0028" subsegmentAlignment="true" subsegmentStartsWithSAP="2">
    <ContentProtection schemeIdUri="urn:uuid:70608953-656C-5244-4D48-65616465722l" />
    <Representation id="6" bandwidth="256000" width="320" height="240">
      <BaseURL>8563456473.mp4</BaseURL>
    </Representation>
    <Representation id="7" bandwidth="512000" width="320" height="240">
      <BaseURL>5636363634.mp4</BaseURL>
    </Representation>
    <Representation id="8" bandwidth="1024000" width="640" height="480">
      <BaseURL>5624657981.mp4</BaseURL>
    </Representation>
    <Representation id="9" bandwidth="1384000" width="640" height="480">
      <BaseURL>4l325645.mp4</BaseURL>
    </Representation>
    <Representation id="A" bandwidth="1528000" width="1280" height="720">
      <BaseURL>8904545625.mp4</BaseURL>
    </Representation>
    <Representation id="B" bandwidth="2048000" width="1280" height="720">
      <BaseURL>2353674573.mp4</BaseURL>
    </Representation>
  </AdaptationSet>
</Period>
</MPD>
```

IMAGE PROCESSING DEVICE AND METHOD

CROSS REFERENCE TO RELATED APPLICATION

The present application is a continuation of U.S. application Ser. No. 15/477,609, filed on Apr. 3, 2017, which is a continuation of U.S. application Ser. No. 14/419,739, filed on Feb. 5, 2015, which was the National State of International Application No. PCT/JP13/72232, filed on Aug. 21, 2013, which claimed priority to Japanese Application No. 2012-193607, filed Sep. 3, 2012, Japanese Application No. 2012-286726, filed Dec. 28, 2012 and Japanese Application No. 2013-064131, filed Mar. 26, 2013, the entire contents of each are hereby incorporated herein by reference.

TECHNICAL FIELD

The present disclosure relates to an image processing device and method, and more particularly, an image processing device and method which are capable of suppressing an increase in a storage capacity necessary for encoding and decoding.

BACKGROUND ART

In recent years, for the purpose of digitalizing image information and transmitting and accumulating information at high efficiency at that time, devices that compress and encode images by using image information-specific redundancy and employing a coding scheme that performs compression through an orthogonal transform such as a discrete cosine transform and motion compensation have been spread. As such a coding scheme, for example, there is Moving Picture Experts Group (MPEG).

Particularly, MPEG 2 (ISO/IEC 13818-2) is a standard that is defined as a general-purpose image coding scheme, and covers interlaced scan images, progressive scan images, standard resolution images, and high definition images. For example, MPEG 2 has been widely used for a wide range of applications such as professional use and consumer use. Using the MPEG 2 compression scheme, for example, in the case of an interlaced scan image of a standard resolution having 720×480 pixels, a coding amount (bit rate) of 4 to 8 Mbps is allocated. Further, using the MPEG 2 compression scheme, for example, in the case of an interlaced scan image of a high resolution having 1920×1088 pixels, a coding amount (bit rate) of 18 to 22 Mbps is allocated. Thus, it is possible to implement a high compression rate and an excellent image quality.

MPEG 2 is mainly intended for high definition coding suitable for broadcasting but does not support a coding scheme having a coding amount (bit rate) lower than that of MPEG 1, that is, a coding scheme of a high compression rate. With the spread of mobile terminals, the need for such a coding scheme is considered to be increased in the future, and thus an MPEG 4 coding scheme has been standardized. In connection with an image coding scheme, an international standard thereof has been approved as ISO/IEC 14496-2 on December, 1998.

Further, in recent years, standardization of a standard such as H.26L (International Telecommunication Union Telecommunication Standardization Sector Q6/16 Video Coding Expert Group (ITU-TQ6/16VCEG)) for the purpose of image coding for video conference has been conducted. H.26L requires a larger computation amount for coding and decoding than in an existing coding scheme such as MPEG 2 or MPEG 4, but is known to implement high coding efficiency. Further, currently, as one of activities of MPEG 4, standardization of incorporating even a function that is not supported in H.26L and implementing high coding efficiency based on H.26L has been performed as a Joint Model of Enhanced-Compression Video Coding.

As a standardization schedule, an international standard called H.264 and MPEG-4 Part 10 (Advanced Video Coding, hereinafter, referred to as "AVC") has been established on March, 2003.

However, a micro block size of 16×16 pixels may not be optimal for a large image frame such as a Ultra High Definition (UHD; 4000×2000 pixels) serving as a target of a next generation coding scheme.

In this regard, currently, for the purpose of further improving coding efficiency as compared to H.264/AVC, standardization of a coding scheme called High Efficiency Video Coding (HEVC) has been conducted by Joint Collaboration Team-Video Coding (JCTVC) which is a joint standardization organization of ITU-T and ISO/IEC. A committee draft of a HEVC standard, that is, a first draft version specification has been issued on February, 2012 (for example, see Non-Patent Document 1).

Meanwhile, in the past, as one of 3D extensions of HEVC, a scheme of changing a CU level and improving encoding performance of a non-base view has been reviewed. As one of tools for this scheme, there is inter-view motion prediction (IVMP) in which an encoded vector of a different view is used as a candidate of a predictive vector of a non-base view (for example, see Non-Patent Document 2).

For example, in the standard of HEVC Ver. 1, there is tool temporal MVP (TMVP) in which a motion vector of a picture of a different timing can be used as a candidate of a predictive vector. When this tool is used, a motion vector (MV) of an encoded picture is held for the TMVP. The motion vector (MV) is encoded in minimum 4×4 units, but information thereof is compressed in 16×16 units until it is referred to in the TMVP. This compression lowers prediction accuracy of a motion vector (MV), but the capacity of a memory holding a motion vector can be reduced to $\frac{1}{16}$.

CITATION LIST

Non-Patent Document

Non-Patent Document 1: Benjamin Bross, Woo-Jin Han, Jens-Rainer Ohm, Gary J. Sullivan, Thomas Wiegand, "High efficiency video coding (HEVC) text specification draft 6," JCTVC-H1003 ver 20, Feb. 17, 2012

Non-Patent Document 2: Yoshiya Yamamoto, Tomohiro Ikai, Tadashi Uchiumi, "3D-CE5.h related: Simplification of AMVP," JCT2-A0014, Joint Collaborative Team on 3D Video Coding Extension Development of ITU-T SG 16 WP 3 and ISO/IEC JTC 1/SC 29/WG 111st Meeting: Stockholm, SE, 16-20 Jul. 2012

SUMMARY OF THE INVENTION

Problems to be Solved by the Invention

However, in the IVMP, such a motion vector compression function is not prepared. In other words, in the case of the IVMP, a motion vector is referred to with the accuracy at the time of encoding in another layer. For example, when a motion vector is encoded in minimum 4×4 units, a temporal buffer holding a motion vector of 4×4 accuracy is necessary for the IVMP.

In other words, in this temporal buffer, a capacity capable of storing at least "a motion vector of 4×4 accuracy by one screen" for one view is necessary. Thus, in the temporal buffer, a capacity that is 16 times as large as when a motion vector for TMVP to be compressed up to 16×16 accuracy is stored (capable of storing 16 pictures) is necessary.

In other words, a storage capacity necessary for encoding and decoding is likely to be increased due to the IVMP.

The present disclosure was made in light of the foregoing, and it is desirable to be able to suppress an increase in a storage capacity necessary for encoding and decoding.

Solutions to Problems

An aspect of the present technology is an image processing device, including: a motion compensating unit that performs motion compensation in decoding of a current layer; and a first compressing unit that compresses a motion vector of the current layer that is reconstructed by the motion compensating unit and used for the motion compensation in decoding of another layer.

The image processing device may further include a second compressing unit that compresses the motion vector of the current layer reconstructed by the motion compensating unit at a compression rate higher than a compression rate of the first compressing unit, and the motion compensating unit may perform the motion compensation in the decoding of the current layer using the motion vector compressed by the second compressing unit.

The second compressing unit may further compress the motion vector compressed by the first compressing unit.

The motion compensating unit may perform the motion compensation in the decoding of the current layer using the motion vector compressed by the first compressing unit.

The image processing device according may further includes: a receiving unit that receives a flag indicating whether or not the motion vector of the current layer used in the motion compensation in the decoding of the other layer; and a selecting unit that selects the motion vector compressed by the first compressing unit as the motion vector of the current layer used in the motion compensation in the decoding of the other layer when the flag received through the receiving unit indicates that the motion vector is compressed, and selects the motion vector that is not compressed by the first compressing unit as the motion vector of the current layer used in the motion compensation in the decoding of the other layer when the flag received through the receiving unit indicates that the motion vector is not compressed.

The motion compensating unit may perform the motion compensation in the decoding of the current layer using the motion vector compressed by the first compressing unit regardless of a value of the flag received through the receiving unit.

The first compressing unit may select a motion vector serving as a representative value from among a plurality of motion vectors reconstructed by the motion compensating unit, and compress the motion vector of the current layer.

The first compressing unit may calculate a motion vector serving as a representative value using a plurality of motion vectors reconstructed by the motion compensating unit, and compress the motion vector of the current layer.

The motion compensating unit may perform the motion compensation using a motion vector reconstructed in the motion compensation in the decoding of the other layer.

Further, an aspect of the present technology is an image processing method of an image processing device, including: performing, by the image processing device, motion compensation in decoding of a current layer; compressing, by the image processing device, a motion vector of the current layer that is reconstructed by the motion compensation and used in the motion compensation in decoding of another layer.

Another aspect of the present technology is an image processing device, including: a motion predicting/compensating unit that performs motion prediction and compensation in encoding of a current layer; and a first compressing unit that compresses a motion vector of the current layer that is generated by the motion predicting/compensating unit and used in the motion prediction and compensation in encoding of another layer.

The image processing device may further include a second compressing unit that compresses the motion vector of the current layer generated by the motion predicting/compensating unit at a compression rate higher than a compression rate of the first compressing unit, and the motion predicting/compensating unit may perform the motion prediction and compensation in the encoding of the current layer using the motion vector compressed by the second compressing unit.

The second compressing unit may further compress the motion vector compressed by the first compressing unit.

The motion predicting/compensating unit may perform the motion prediction and compensation in the encoding of the current layer using the motion vector compressed by the first compressing unit.

The image processing device may further includes: a control unit that controls whether or not the motion vector of the current layer used in the motion prediction and compensation in the encoding of the other layer is compressed; a selecting unit that selects any one of the motion vector that is not compressed by the first compressing unit and the motion vector compressed by the first compressing unit as the motion vector of the current layer used in the motion prediction and compensation in the encoding of the other layer according to control of the control unit; a generating unit that generates a flag indicating whether or not the motion vector of the current layer used in the motion prediction and compensation in the encoding of the other layer is compressed according to control of the control unit; and a transmitting unit that transmits the flag generated by the generating unit.

The motion predicting/compensating unit may perform the motion prediction and compensation in the encoding of the current layer using the motion vector compressed by the first compressing unit regardless of control of the control unit.

The first compressing unit may select a motion vector serving as a representative value from among a plurality of motion vectors generated by the motion predicting/compensating unit, and compress the motion vector of the current layer.

The first compressing unit may calculate a motion vector serving as a representative value using a plurality of motion vectors generated by the motion predicting/compensating unit, and compress the motion vector of the current layer.

The motion predicting/compensating unit may perform the motion prediction and compensation using a motion vector generated in the motion prediction and compensation in the encoding of the other layer.

Further, another aspect of the present technology is an image processing method of an image processing device, including: performing, by the image processing device, motion prediction and compensation in encoding of a current layer; and compressing, by the image processing device, a motion vector of the current layer that is generated by the motion prediction and compensation and used in the motion prediction and compensation in encoding of another layer.

In one aspect of the present technology, motion compensation in decoding of a current layer is performed, and a motion vector of the current layer that is reconstructed by the motion compensation and used for the motion compensation in decoding of another layer is compressed.

In another aspect of the present technology, motion prediction and compensation in encoding of a current layer is performed, and a motion vector of the current layer that is generated by the motion prediction and compensation and used in the motion prediction and compensation in encoding of another layer is compressed.

The image processing device may be an independent device or may be an internal block configuring a single image coding device or a single image decoding device.

Effects of the Invention

According to the present disclosure, it is possible to encode and decode an image. Particularly, it is possible to suppress an increase in a storage capacity necessary for encoding and decoding.

BRIEF DESCRIPTION OF DRAWINGS

FIG. 44 is a diagram for describing an exemplary syntax.

FIG. 98 is a diagram illustrating an exemplary syntax of a slice header.

FIG. 99 is a diagram illustrating an exemplary syntax of a slice header, subsequently to FIG. 98.

FIG. 100 is a diagram illustrating an exemplary syntax of a slice header, subsequently to FIG. 99.

FIG. 101 is a diagram illustrating another exemplary syntax of a slice header.

FIG. 102 is a diagram illustrating another exemplary syntax of a slice header, subsequently to FIG. 101.

FIG. 103 is a diagram illustrating another exemplary syntax of a slice header, subsequently to FIG. 102.

FIG. 132 is an explanatory diagram illustrating a specific example of MPD.

MODE FOR CARRYING OUT THE INVENTION

Hereinafter, modes (hereinafter, referred to as "embodiments") of carrying out the present disclosure will be described. The description will proceed in the following order.

0. Overview
1. First embodiment (image coding device and image decoding device)
2. Second embodiment (image coding device and image decoding device)
3. Third embodiment (image coding device and image decoding device)
4. Fourth embodiment (scalable image coding and decoding)
5. Overview 2 (intra prediction)
6. Fifth embodiment (scalable image coding device)
7. Sixth embodiment (scalable image decoding device)
8. Overview 3 (prediction direction control)
9. Seventh embodiment (image coding device)
10. Eighth embodiment (image decoding device)
11. Ninth embodiment (computer)
12. Application examples
13. Application examples of scalable coding
14. Set unit module processor
15. Application examples of content reproducing system of MPEG-DASH
16. Application examples of wireless communication system of Wi-Fi standard <0. Overview>
<Coding Scheme>

Hereinafter, the present technology will be described in connection with an application to image coding and decoding of a High Efficiency Video Coding (HEVC) scheme. In image coding such as Advanced Video Coding (AVC) or HEVC, motion prediction using a correlation (between frames) in a time direction is performed.

<Coding Unit>

In the AVC scheme, a hierarchical structure based on a macroblock and a sub macroblock is defined. However, a macroblock of 16×16 pixels is not optimal for a large image frame such as a Ultra High Definition (UHD: 4000×2000 pixels) serving as a target of a next generation coding scheme.

Figure 1:
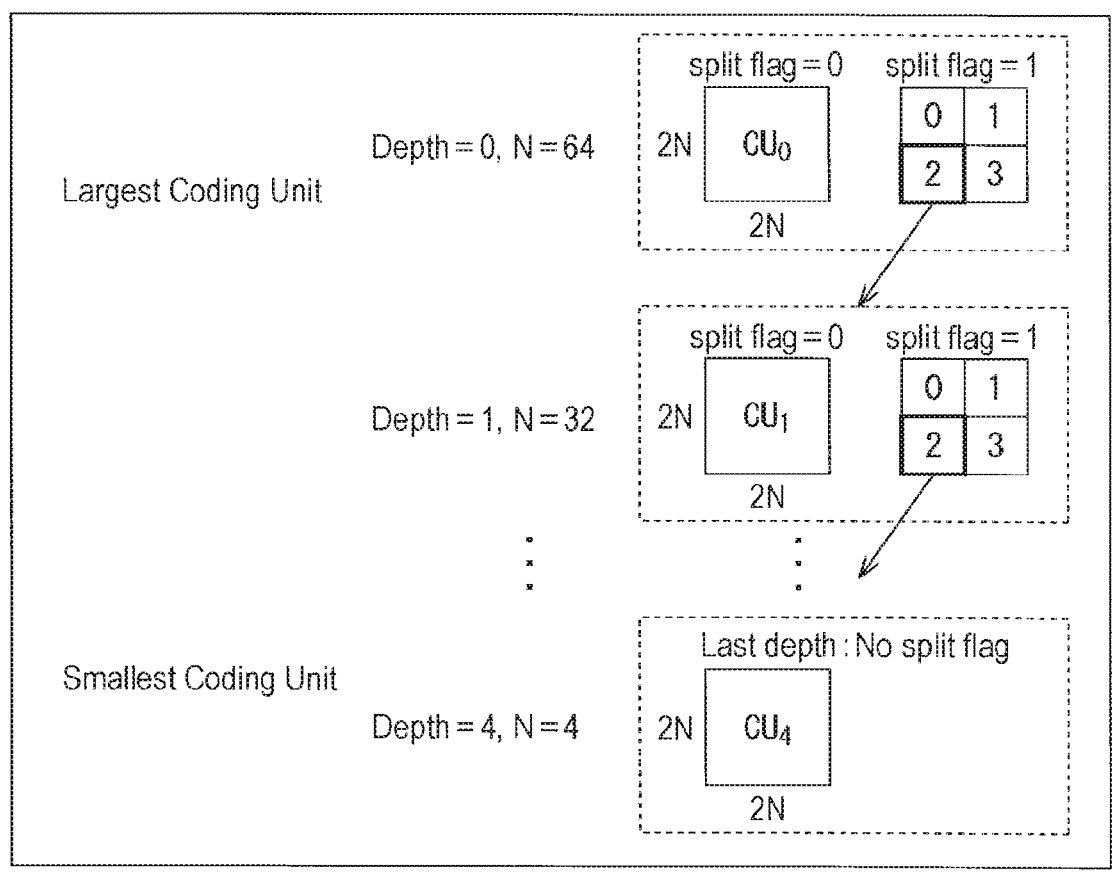
FIG. 1 is a diagram for describing an exemplary configuration of a coding unit.

On the other hand, in the HEVC scheme, a coding unit (CU) is defined as illustrated in FIG. 1.

A CU is also referred to as a coding tree block (CTB), and a partial area of an image of a picture unit undertaking the same role of a macroblock in the AVC scheme. The latter is fixed to a size of 16×16 pixels, but the former is not fixed to a certain size and designated in image compression information in each sequence.

For example, a largest coding unit (LCU) and a smallest coding unit (SCU) of a CU are specified in a sequence parameter set (SPS) included in encoded data to be output.

As split-flag=1 is set in a range in which each LCU is not smaller than a SCU, a coding unit can be divided into CUs having a smaller size. In the example of FIG. 1, a size of an LCU is 128, and a largest scalable depth is 5. A CU of a size of 2N×2N is divided into CUs having a size of N×N serving as the hierarchy that is one-level lower when a value of split_flag is "1."

Further, a CU is divided in prediction units (PUs) that are areas (partial areas of an image of a picture unit) serving as processing units of intra or inter prediction, and divided into transform units (TUs) that are areas (partial areas of an image of a picture unit) serving as processing units of orthogonal transform. Currently, in the HEVC scheme, in addition to 4×4 and 8×8, orthogonal transform of 16×16 and 32×32 can be used.

In the case of the coding scheme in which a CU is defined, and various kinds of processes are performed in units of CUs such as the HEVC scheme, in the AVC scheme, a macroblock can be considered to correspond to an LCU, and a block (sub block) can be considered to correspond to a CU. Further, in the AVC scheme, a motion compensation block can be considered to correspond to a PU. Here, since a CU has a hierarchical structure, a size of an LCU of a topmost layer is commonly set to be larger than a macroblock in the AVC scheme, for example, such as 128×128 pixels.

Thus, hereinafter, an LCU is assumed to include a macroblock in the AVC scheme, and a CU is assumed to include a block (sub block) in the AVC scheme. In other words, a "block" used in the following description indicates an arbitrary partial area in a picture, and, for example, a size, shape, and characteristics of a block are not limited. In other words, a "block" includes an arbitrary area (a processing unit) such as a TU, a PU, an SCU, a CU, an LCU, a sub block, a macroblock, or a slice. Of course, a "block" includes any other partial area (processing unit) as well. When it is necessary to limit a size, a processing unit, or the like, it will be appropriately described.

<Mode Selection>

Meanwhile, in the AVC and HEVC coding schemes, in order to achieve high coding efficiency, it is important to select an appropriate prediction mode.

As an example of such a selection method, there is a method implemented in reference software (opened at http://iphome.hhi.de/suehring/tml/index.htm) of H.264/MPEG-4 AVC called a joint model (JM).

In the JM, it is possible to select two mode determination methods of a high complexity mode and a low complexity mode, which will be described below. In both modes, cost function values related to respective prediction modes are calculated, and a prediction mode having a smaller cost function value is selected as an optimal mode for a corresponding block or macroblock.

A cost function in the high complexity mode is represented as in the following Formula (1):

[Mathematical Formula 1]

$$\text{Cost(Mode} \in \Omega) = D + \lambda^* R \quad (1)$$

Here, $\Omega$ indicates a universal set of a candidate mode for encoding a corresponding block or macroblock, and D indicates differential energy between a decoded image and an input image when encoding is performed in a corresponding prediction mode. $\lambda$ indicates Lagrange's undetermined multiplier given as a function of a quantization parameter. R indicates a total coding amount including an orthogonal transform coefficient when encoding is performed in a corresponding mode.

In other words, in order to perform encoding in the high complexity mode, it is necessary to perform a temporary encoding process once by all candidate modes in order to calculate the parameters D and R, and thus a large computation amount is required.

A cost function in the low complexity mode is represented by the following Formula (2):

[Mathematical Formula 2]

$$\text{Cost(Mode} \in \Omega) = D + QP2\text{Quant}(QP)^* \text{HeaderBit} \quad (2)$$

Here, D indicates differential energy between a prediction image and an input image unlike the high complexity mode. QP2Quant (QP) is given as a function of a quantization parameter QP, and HeaderBit indicates a coding amount related to information belonging to a header such as a motion vector or a mode including no orthogonal transform coefficient.

In other words, in the low complexity mode, it is necessary to perform a prediction process for respective candidate modes, but since up to a decoded image is not necessary, it is unnecessary to perform up to a coding process. Thus, it is possible to implement coding at a computation amount smaller than that in the high complexity mode.

<Multi-view Image>

Figure 2:
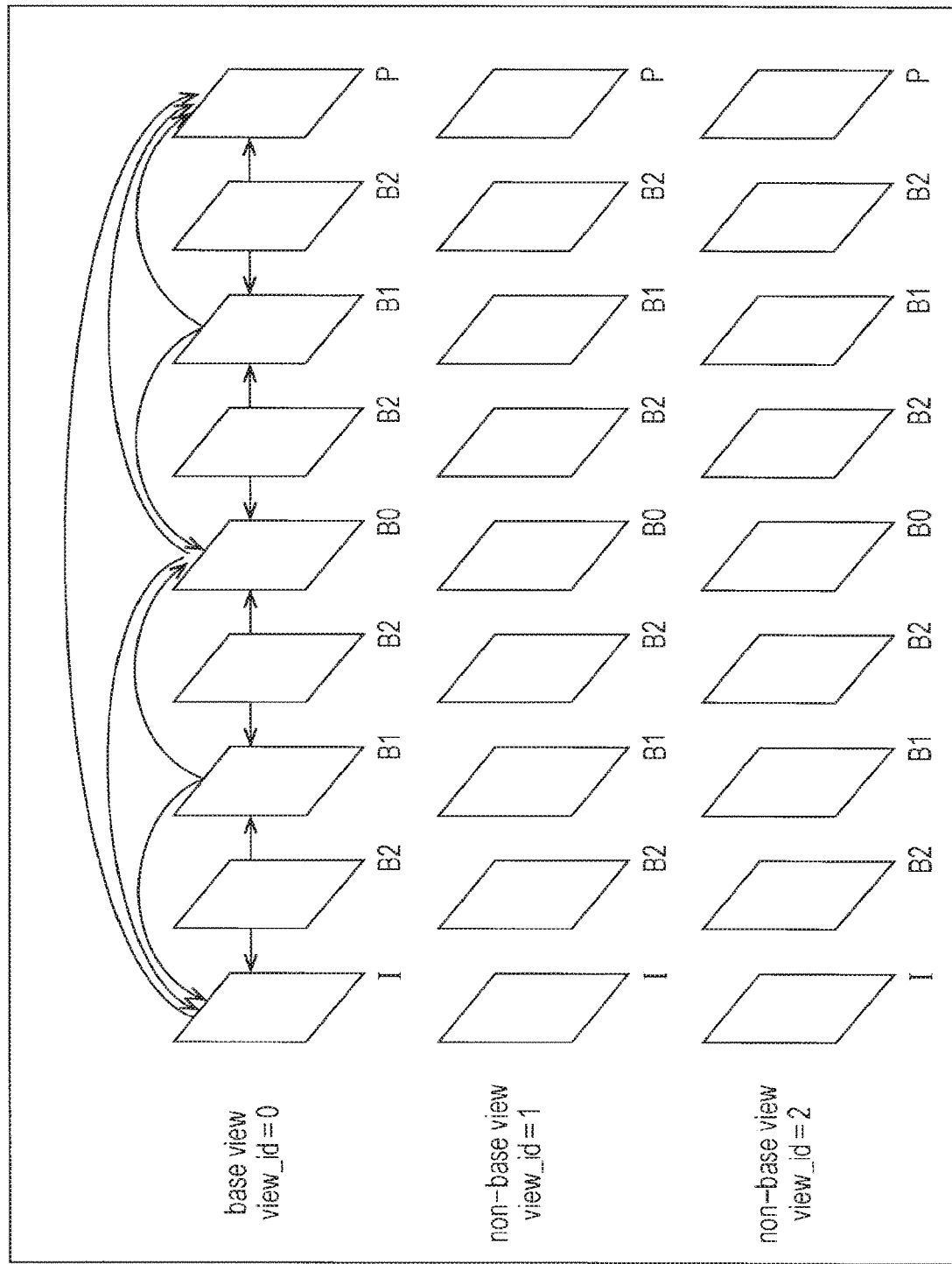
FIG. 2 is a diagram illustrating an exemplary multi-view image coding scheme.

Meanwhile, in the HEVC, it is possible to encode and decode a moving image including a plurality of layers such as a multi-view image illustrated in FIG. 2. In a multi-view moving image, each picture includes a plurality of images having parallax therebetween. An image group (a moving image) of each point of view is referred to as a view (layer). In the case of the example of FIG. 2, a moving image includes 3 views of views 0 to 2. In other words, a picture of a certain POC includes an image of a view 0, an image of a view 1, and an image of a view 2. In FIG. 2, the view 0 (view_id=0) is also referred to as a base view. Further, the view 1 (view_id=1) and the view 2 (view_id=2) are also referred to as non-base views.

<Prediction Motion Vector>

Further, in the HEVC, when an image is encoded or decoded, motion prediction and compensation processes are used to improve the coding efficiency, but in order to further improve the coding efficiency, in the motion prediction and compensation processes, a motion vector of a current block serving as a processing target is predicted using a motion vector of a neighboring block, a differential motion vector between the motion vector of the current block and a prediction motion vector thereof is obtained, and the differential motion vector is transmitted.

A motion vector is predicted such that a plurality of candidates are generated from a motion vector of a neighboring block, and among the plurality of candidates, an optimal candidate is selected.

In the HEVC, it is possible to generate a candidate of a prediction motion vector using a motion vector of a block spatially neighboring a current block. A spatially neighboring block refers to a block in the vicinity of a current block in the same image (an image of the same view of the same POC) as a current block.

Further, in the HEVC, it is possible to generate a candidate of a prediction motion vector using a motion vector of a block temporally neighboring a current block (Temporal Motion Vector Prediction (TMVP)). A temporally neighboring block refers to a block (which is also referred to as a "colocated block") (for example, at the same position as) corresponding to a current block in an image of a different POC of the same view of a current block.

Figure 3:
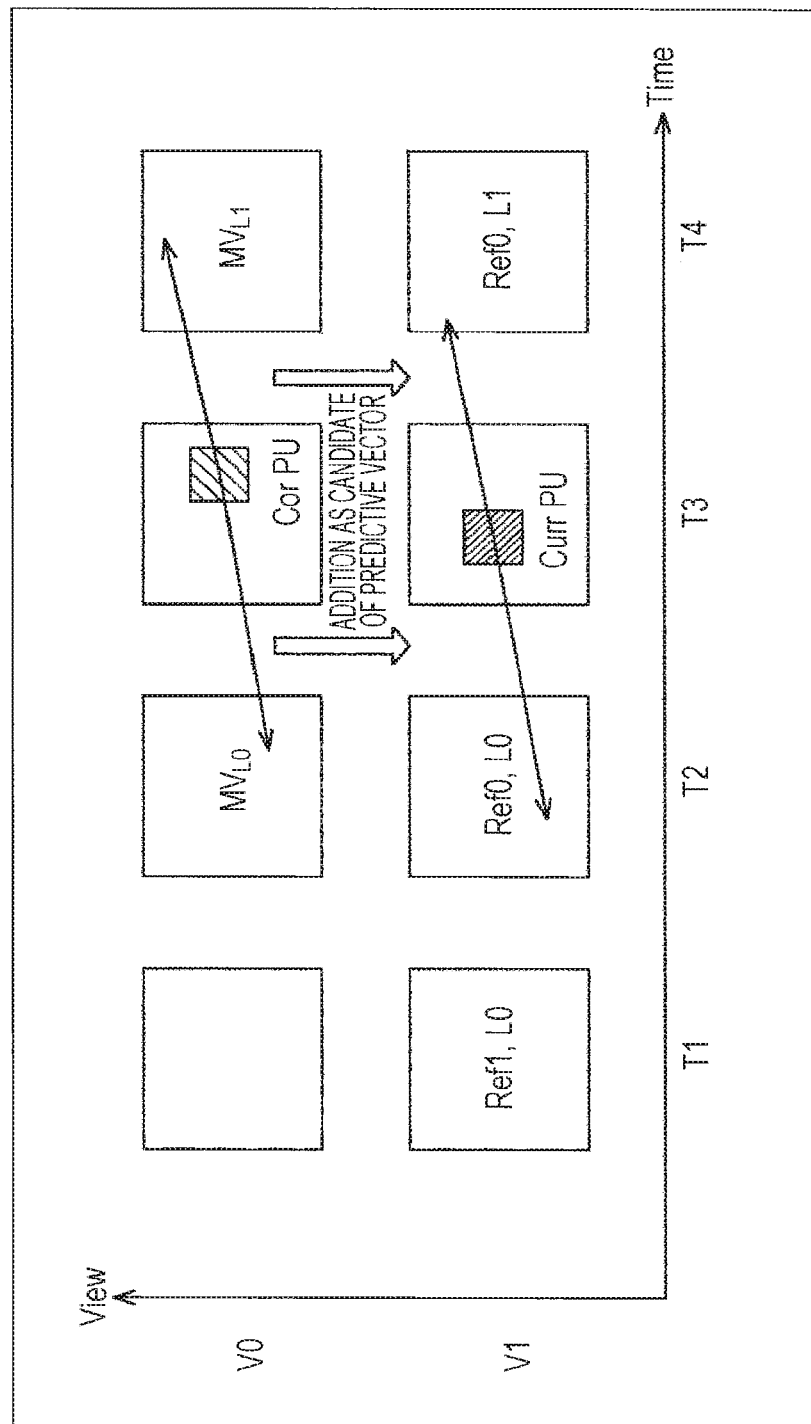
FIG. 3 is a diagram for describing an example of IVMP.

Further, when the multi-view image illustrated in FIG. 2 is encoded, in the HEVC, it is possible to generate a candidate of a prediction motion vector using a motion vector of a block neighboring a current block in terms of a view (a layer) (Inter-view motion prediction (IVMP)). A block neighboring in terms of a view (a layer) refers to a block (which is also referred to as a "colocated block") (for example, at the same position as) corresponding to a current block in an image of a different view of the same POC as a current block. For example, as illustrated in FIG. 3, a motion vector of an immediately previously processed view is referred to using a correlation between views.

Since it is possible to obtain more candidates of higher prediction accuracy as described above, it is possible to obtain a predictive vector of higher prediction accuracy, and it is possible to further improve the coding efficiency.

However, in the TMVP and the IVMP, a motion vector other than an image of a current view of a current picture is referred to. Thus, in the TMVP and the IVMP, it is necessary to hold a motion vector of each block obtained at the time of encoding or decoding until it is not referred to (for example, until motion prediction and compensation processes or a motion compensation process of an image of a next view ends). To this end, it is necessary to prepare the capacity of a memory by an assumed maximum value or more.

In the case of the HEVC, it is possible to compress a motion vector to be held for the TMVP and reduce the accuracy of a motion vector. However, a motion vector to be referred to in the IVMP is used without being compressed. Thus, a motion vector for the IVMP has to be held without being compressed. For this reason, a memory that holds a motion vector for the IVMP is likely to be increased to be larger than a memory that holds a motion vector for the TMVP. In other words, an increase in a storage capacity necessary for encoding and decoding is likely to be suppressed.

Figure 4:
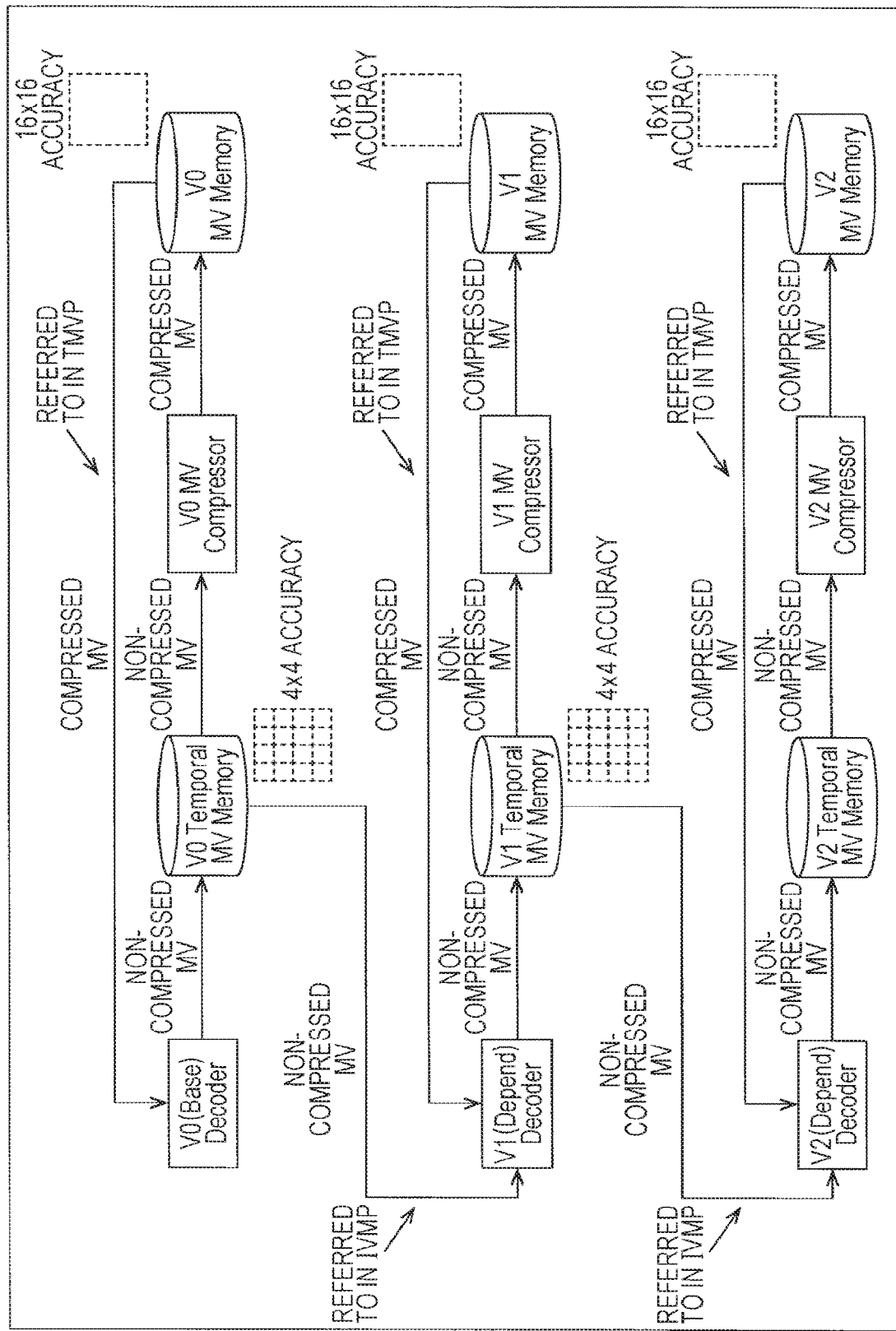
FIG. 4 is a diagram for describing an example of a motion vector reference according to a related art.

FIG. 4 illustrates a specific example. As illustrated in FIG. 4, in the TMVP, a motion vector (a compressed MV) of a current layer (view) is used, and in the IVMP, a motion vector (a non-compressed MV) of an immediately previous layer (another layer) is used.

Thus, in this case, in addition to a memory (a V0 MV memory and a V1 MV memory) storing a motion vector of a 16×16 accuracy for the TMVP, a memory storing a motion vector for the IVMP is necessary. In addition, since the motion vector is not compressed, the capacity larger than that of a memory storing a motion vector to be referred to in the TMVP is necessary.

As the capacity necessary for the memory is increased, a design or manufacturing cost is likely to be increased.

Further, power consumption and a load are likely to be increased.

<Compression of Motion Vector for IVMP>

In this regard, a motion vector for the IVMP is also compressed (for example, thinned out at a certain thinning rate).

For example, in the case of decoding, motion compensation for decoding of a current layer is performed, and a motion vector of a current layer that is reconstructed by the motion compensation and used in motion compensation for decoding of another layer is compressed (for example, thinned out at a certain thinning rate). In other words, motion compensation for decoding of a current layer is performed using a motion vector that is reconstructed and compressed (for example, thinned out at a certain thinning rate) in motion compensation for decoding of another layer.

Further, for example, in the case of encoding, motion prediction and compensation for encoding of a current layer are performed, and a motion vector of a current layer that is generated by the motion prediction and compensation and used in motion prediction and compensation for encoding of another layer is compressed (for example, thinned out at a certain thinning rate). In other words, motion prediction and compensation for encoding of a current layer are performed using a motion vector that is generated and compressed (for example, thinned out at a certain thinning rate) in motion prediction and compensation for encoding of another layer.

As a result, it is possible to suppress an increase in the capacity of a memory necessary for storing the motion vector for the IVMP. In other words, it is possible to suppress an increase in a storage capacity necessary for encoding and decoding.

<1. First Embodiment>
<Compression of Motion Vector for IVMP>

Figure 5:
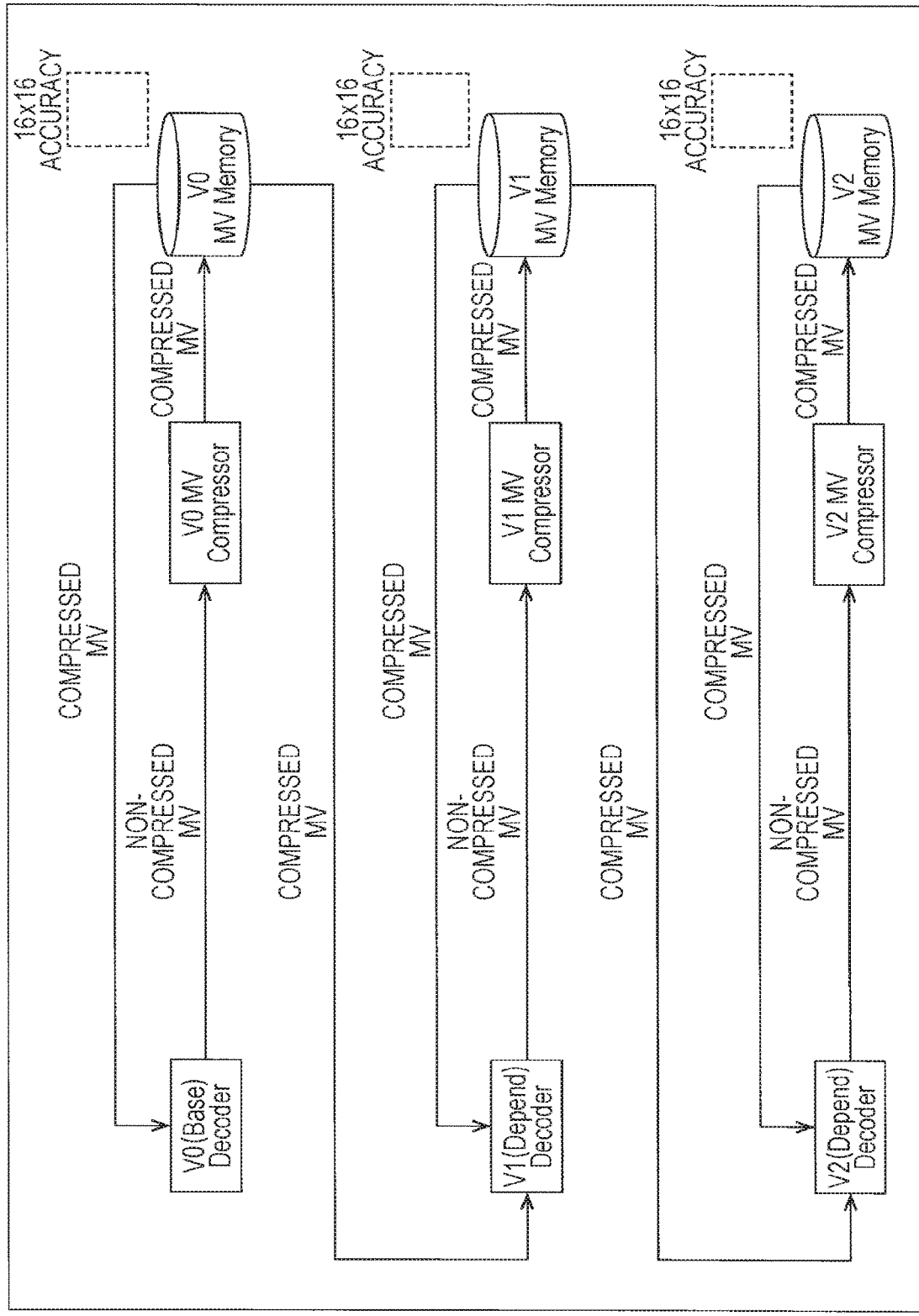
FIG. 5 is a diagram for describing an example of a motion vector reference according to the present technology.

In the motion vector compression, as illustrated in FIG. 5, a motion vector for the IVMP may be compressed (for example, thinned out at the same thinning rate as the motion vector for the TMVP) at the same compression rate as the motion vector for the TMVP. In other words, a motion vector for the IVMP and a motion vector for the TMVP may have the same accuracy through the compression. In this case, it is possible to commonalize the motion vector for the TMVP and the motion vector for the IVMP, and it is possible to suppress an increase in the capacity of a necessary memory.

For example, in the case of the example of FIG. 4, a decoder (a V0 (Base) decoder, a V1 (Depend) decoder, and a V2 (Depend) decoder) reconstructs a motion vector of a maximum of 4×4 accuracy through the decoding, and a motion vector compressing unit ((V0 to V2) MV compressors) performs compression at a 16×16 accuracy. Thus, a memory ((V0 to V2) temporal MV memories) storing the motion vector for the IVMP needs the capacity capable of storing a motion vector of a 4×4 accuracy by one screen.

As in the example illustrated in FIG. 5, as the motion vector for the IVMP is also compressed (for example, thinned out) at a 16×16 accuracy by a motion vector compressing unit ((V0 to V2) MV compressors), it is possible to omit a memory ((V0 to V2) temporal MV memories) capable of storing a motion vector of a 4×4 accuracy by one screen.

It is possible to commonalize the compression process (for example, the thinning process) through the commonalization of the motion vector, and thus it is possible to suppress an increase in a load caused by the compression process for the motion vector.

The compression method will be more specifically described below.

In the following, a moving image of an encoding or decoding target is assumed to be a moving image of 3 views (layers) of views 0 to 2 as illustrated in FIG. 2. Further, pictures of the moving image are processed in a certain order, and in each picture, an image of a view 0, an image of a view 1, and an image of a view 2 are assumed to be sequentially processed.

<Image Coding Device>

Figure 6:
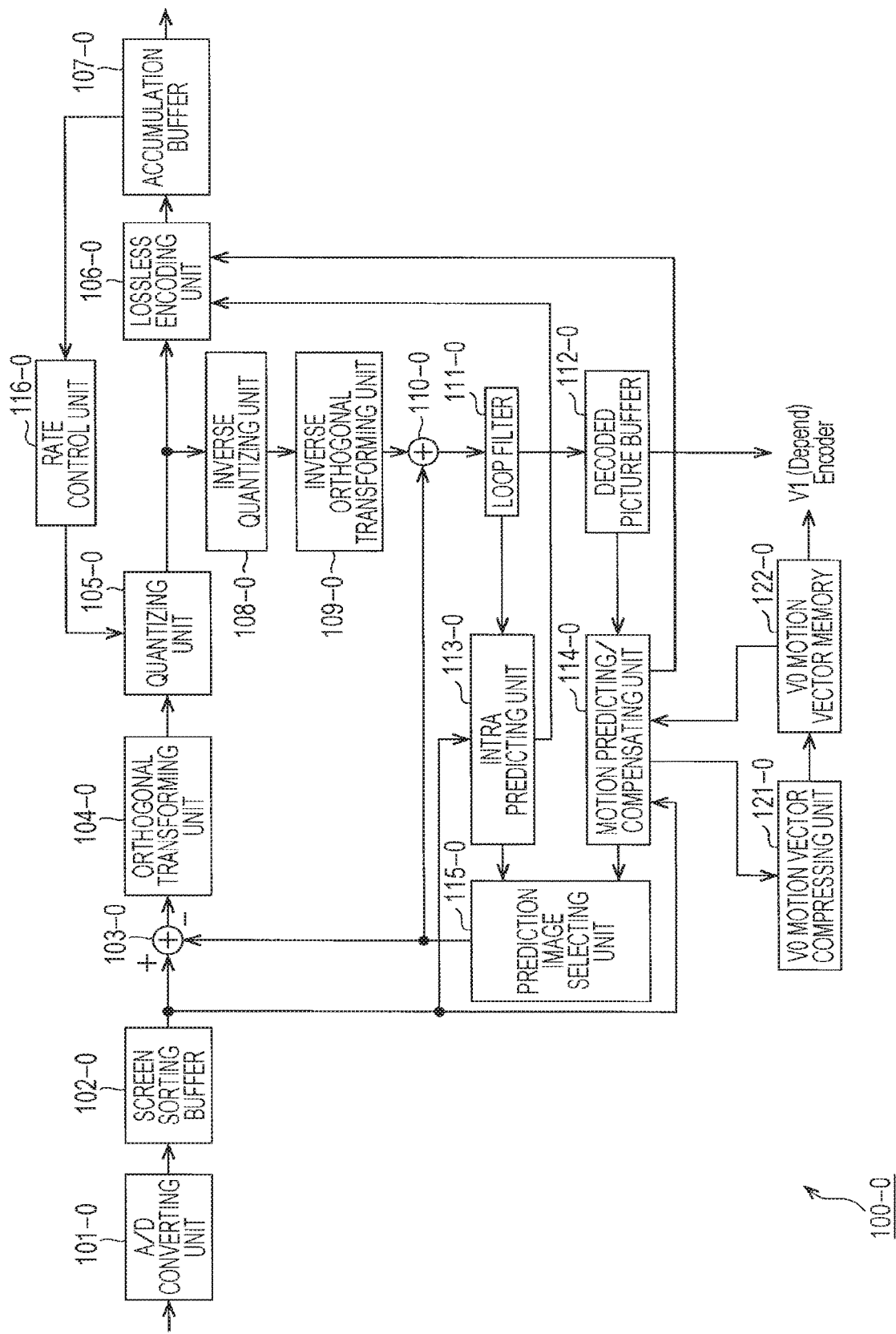
FIG. 6 is a block diagram illustrating an exemplary main configuration of a V0 image coding device.
Figure 7:
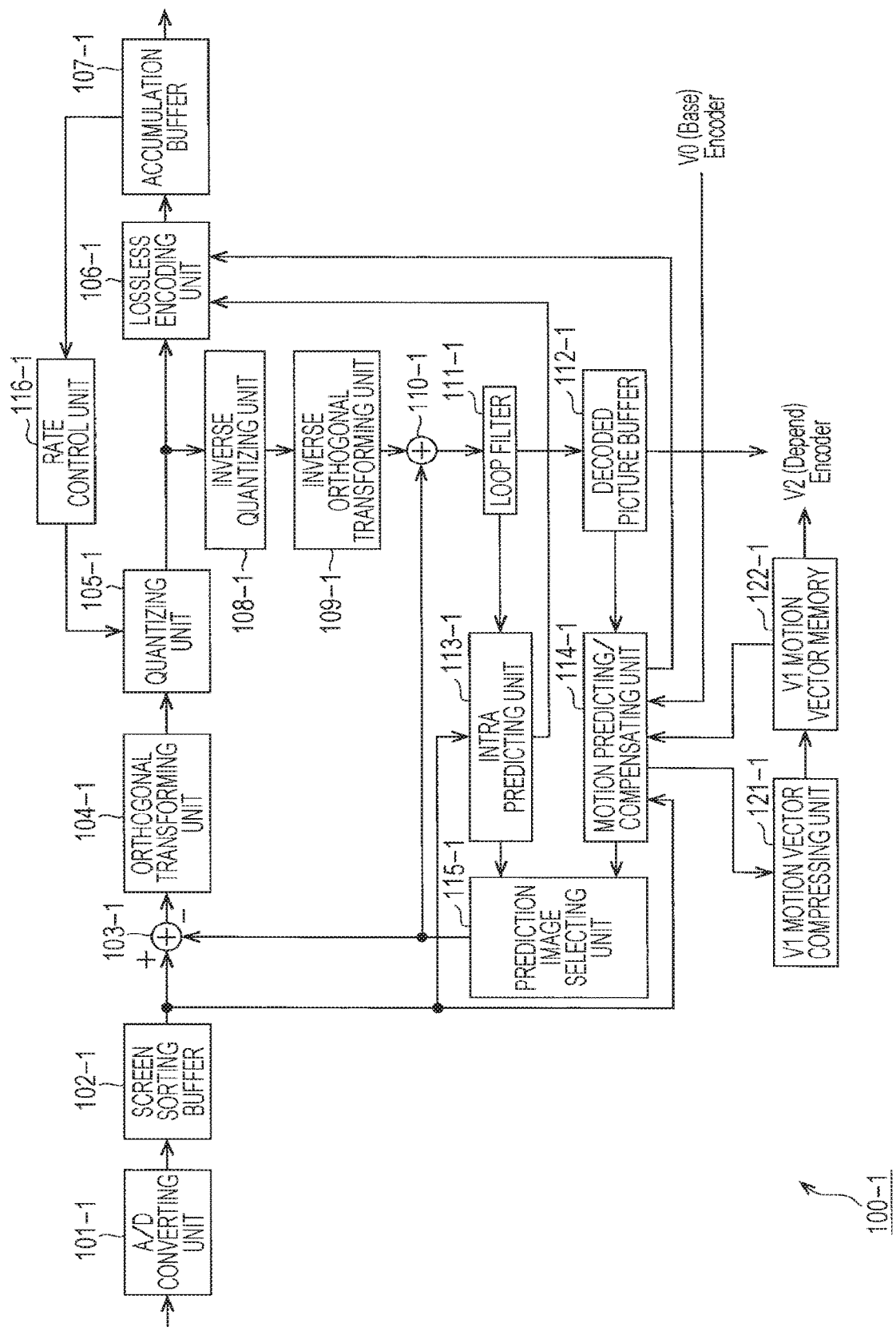
FIG. 7 is a block diagram illustrating an exemplary main configuration of a V1 image coding device.
Figure 8:
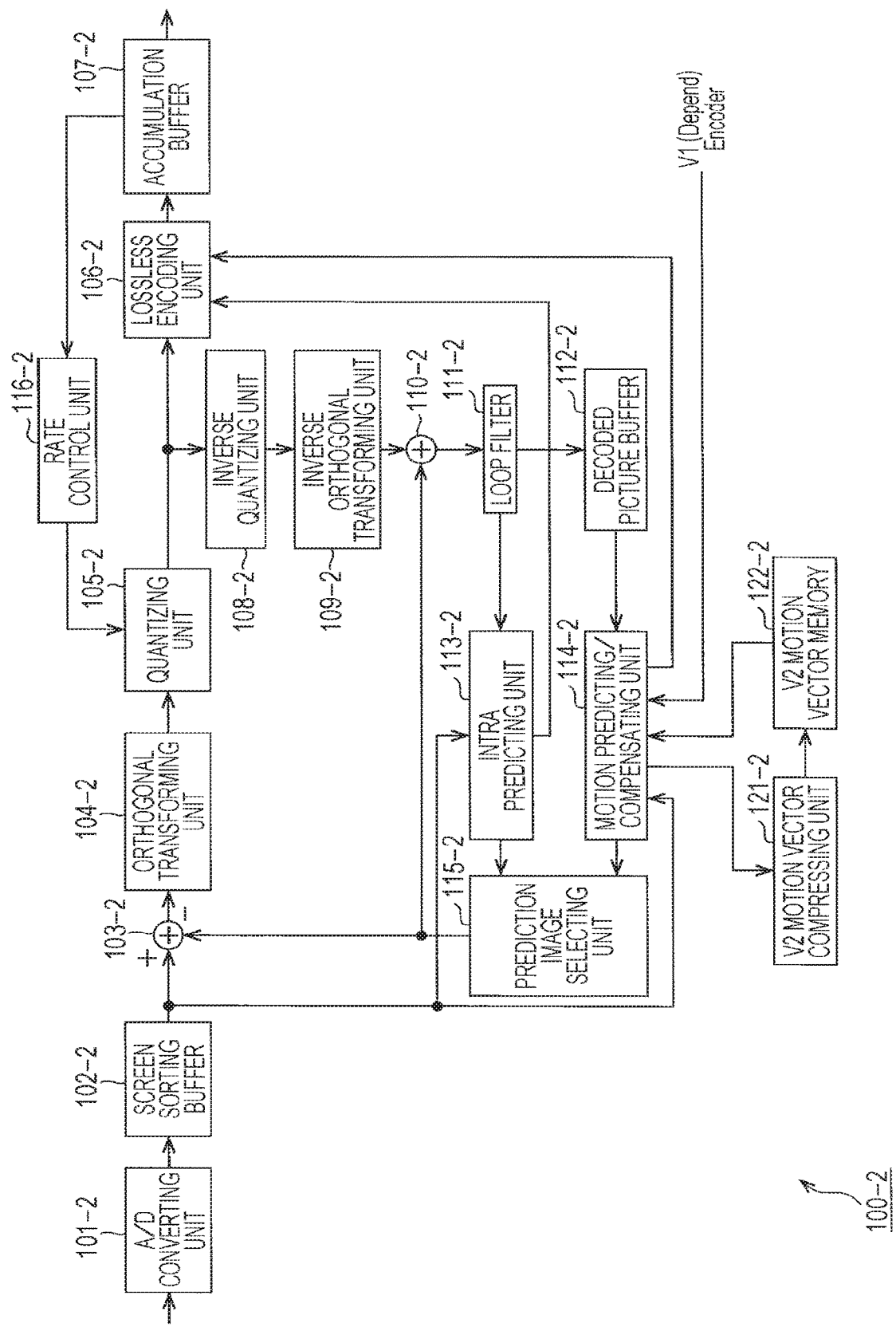
FIG. 8 is a block diagram illustrating an exemplary main configuration of a V2 image coding device.

FIG. 6 is a block diagram illustrating an exemplary main configuration of a V0 image coding device. FIG. 7 is a block diagram illustrating an exemplary main configuration of a V1 image coding device. FIG. 8 is a block diagram illustrating an exemplary main configuration of a V2 image coding device.

An image coding device 100 (not illustrated) encodes a moving image including a plurality of layers such as the multi-view image illustrated in FIG. 2. The image coding device 100 includes a V0 image coding device 100-0 of FIG. 6, a V1 image coding device 100-1 of FIG. 7, and a V2 image coding device 100-3 of FIG. 8 in order to encode views of a multi-view image. The V0 image coding device 100-0 encodes an image of a view 0. The V1 image coding device 100-1 encodes an image of a view 1. The V2 image coding device 100-2 encodes an image of a view 2.

The V0 image coding device 100-0 includes an A/D converting unit 101-0, a screen sorting buffer 102-0, an operation unit 103-0, an orthogonal transforming unit 104-0, a quantizing unit 105-0, a lossless encoding unit 106-0, an accumulation buffer 107-0, an inverse quantizing unit 108-0, and an inverse orthogonal transforming unit 109-0 as illustrated in FIG. 6. The V0 image coding device 100-0 further includes an operation unit 110-0, a loop filter 111-0, a decoded picture buffer 112-0, an intra predicting unit 113-0, a motion predicting/compensating unit 114-0, a prediction image selecting unit 115-0, and a rate control unit 116-0.

The V1 image coding device 100-1 includes an A/D converting unit 101-1, a screen sorting buffer 102-1, an operation unit 103-1, an orthogonal transforming unit 104-1, a quantizing unit 105-1, a lossless encoding unit 106-1, an accumulation buffer 107-1, an inverse quantizing unit 108-1, and an inverse orthogonal transforming unit 109-1 as illustrated in FIG. 7. The V1 image coding device 100-1 further includes an operation unit 110-1, a loop filter 111-1, a decoded picture buffer 112-1, an intra predicting unit 113-1, a motion predicting/compensating unit 114-1, a prediction image selecting unit 115-1, and a rate control unit 116-1.

The V2 image coding device 100-2 includes an A/D converting unit 101-2, a screen sorting buffer 102-2, an operation unit 103-2, an orthogonal transforming unit 104-2, a quantizing unit 105-2, a lossless encoding unit 106-2, an accumulation buffer 107-2, an inverse quantizing unit 108-2, and an inverse orthogonal transforming unit 109-2 as illustrated in FIG. 8. The V2 image coding device 100-2 further includes an operation unit 110-2, a loop filter 111-2, a decoded picture buffer 112-2, an intra predicting unit 113-2, a motion predicting/compensating unit 114-2, a prediction image selecting unit 115-2, and a rate control unit 116-2.

Hereinafter, when the A/D converting units 101-0 to 101-2 need not be distinguished from one another, they are referred to simply as an "A/D converting unit 101." Further, when the screen sorting buffers 102-0 to 102-2 need not be distinguished from one another, they are referred to simply as a "screen sorting buffer 102." Further, when the operation units 103-0 to 103-2 need not be distinguished from one another, they are referred to simply as an "operation unit 103." Further, when the orthogonal transforming units 104-0 to 104-2 need not be distinguished from one another, they are referred to simply as an "orthogonal transforming unit 104." Further, when the quantizing units 105-0 to 105-2 need not be distinguished from one another, they are referred to simply as a "quantizing unit 105." Further, when the lossless encoding units 106-0 to 106-2 need not be distinguished from one another, they are referred to simply as a "lossless encoding unit 106." Further, when the accumulation buffers 107-0 to 107-2 need not be distinguished from one another, they are referred to simply as an "accumulation buffer 107." Further, when the inverse quantizing units 108-0 to 108-2 need not be distinguished from one another, they are referred to simply as an "inverse quantizing unit 108." Further, when the inverse orthogonal transforming units 109-0 to 109-2 need not be distinguished from one another, they are referred to simply as an "inverse orthogonal transforming unit 109."

Further, when the operation units 110-0 to 110-2 need not be distinguished from one another, they are referred to simply as an "operation unit 110." Further, when the loop filters 111-0 to 111-2 need not be distinguished from one another, they are referred to simply as a "loop filter 111." Further, when the decoded picture buffers 112-0 to 112-2 need not be distinguished from one another, they are referred to simply as a "decoded picture buffer 112." Further, when the intra predicting units 113-0 to 113-2 need not be distinguished from one another, they are referred to simply as an "intra predicting unit 113." Further, when the motion predicting/compensating units 114-0 to 114-2 need not be distinguished from one another, they are referred to simply as a "motion predicting/compensating unit 114." Further, when the prediction image selecting units 115-0 to 115-2 need not be distinguished from one another, they are referred to simply as a "prediction image selecting unit 115." Further, when the rate control units 116-0 to 116-2 need not be distinguished from one another, they are referred to simply as a "rate control unit 116."

The V0 image coding device 100-0 further includes a V0 motion vector compressing unit 121-0 and a V0 motion vector memory 122-0. The V1 image coding device 100-1 further includes a V1 motion vector compressing unit 121-1 and a V1 motion vector memory 122-1. The V2 image coding device 100-2 further includes a V2 motion vector compressing unit 121-2 and a V2 motion vector memory 122-2.

The A/D converting unit 101 performs A/D conversion on input image data (image data of the view 0 in the case of the A/D converting unit 101-0, image data of the view 1 in the case of the A/D converting unit 101-1, and the image data of the view 2 in the case of the A/D converting unit 101-2), and supplies converted image data (digital data) to be stored in the screen sorting buffer 102.

The screen sorting buffer 102 performs sorting on a stored image of frames arranged in a display order in a frame order for encoding according to a group of picture (GOP). In other words, the screen sorting buffer 102 sorts pictures arranged in a POC order in a processing order. The screen sorting buffer 102 supplies the image in which a frame order is sorted to the operation unit 103. The screen sorting buffer 102 also supplies the image in which a frame order is sorted to the intra predicting unit 113 and the motion predicting/compensating unit 114.

The operation unit 103 subtracts a prediction image supplied from the intra predicting unit 113 or the motion predicting/compensating unit 114 via the prediction image selecting unit 115 from an image read from the screen sorting buffer 102, and outputs differential information thereof to the orthogonal transforming unit 104. For example, in the case of an image on which intra coding is performed, the operation unit 103 subtracts a prediction image supplied from the intra predicting unit 113 from an image read from the screen sorting buffer 102. Further, for example, in the case of an image on which inter coding is performed, the operation unit 103 subtracts a prediction image supplied from the motion predicting/compensating unit 114 from an image read from the screen sorting buffer 102.

The orthogonal transforming unit 104 performs orthogonal transform such as discrete cosine transform or Karhunen Loeve transform on the differential information supplied from the operation unit 103. The orthogonal transforming unit 104 supplies transform coefficients to the quantizing unit 105.

The quantizing unit 105 quantizes the transform coefficients supplied from the orthogonal transforming unit 104. The quantizing unit 105 sets a quantization parameter based on information related to a target value of a coding amount supplied from the rate control unit 116, and performs the quantization. The quantizing unit 105 supplies the quantized transform coefficients to the lossless encoding unit 106.

The lossless encoding unit 106 encodes the transform coefficients quantized by the quantizing unit 105 according to an arbitrary coding scheme. Since coefficient data is quantized under control of the rate control unit 116, the coding amount becomes the target value set by the rate control unit 116 (or approximates to the target value).

The lossless encoding unit 106 acquires, for example, information indicating an intra (intra-screen) prediction mode from the intra predicting unit 113, and acquires, for example, information indicating an inter (inter-screen) prediction mode and differential motion vector information from the motion predicting/compensating unit 114.

The lossless encoding unit 106 encodes various kinds of information according to an arbitrary coding scheme, and sets (multiplexes) them as part of header information of encoded data (which is also referred to as an "encoded stream"). The lossless encoding unit 106 supplies the encoded data obtained by the encoding to be accumulated in the accumulation buffer 107.

Examples of the coding scheme of the lossless encoding unit 106 include variable length coding or arithmetic coding. As the variable length coding, for example, there is context-adaptive variable length coding (CAVLC) defined in the H.264/AVC scheme. As the arithmetic coding, for example, there is context-adaptive binary arithmetic coding (CABAC).

The accumulation buffer 107 temporarily holds the encoded data supplied from the lossless encoding unit 106. The accumulation buffer 107 outputs the held encoded data to, for example, a recording device (not illustrated) (a recording medium) at a subsequent stage or a transmission path at a certain timing. In other words, the accumulation buffer 107 also serves as a transmitting unit that transmits the encoded data.

The transform coefficients quantized by the quantizing unit 105 are also supplied to the inverse quantizing unit 108. The inverse quantizing unit 108 inversely quantizes the quantized transform coefficients by a method corresponding to the quantization performed by the quantizing unit 105. The inverse quantizing unit 108 supplies the obtained transform coefficients to the inverse orthogonal transforming unit 109.

The inverse orthogonal transforming unit 109 performs inverse orthogonal transform on the transform coefficients supplied from the inverse quantizing unit 108 by a method corresponding to the orthogonal transform process performed by the orthogonal transforming unit 104. An output (restored differential information) that has been subjected to the inverse orthogonal transform is supplied to the operation unit 110.

The operation unit 110 obtains a locally decoded image (decoded image) by adding the prediction image received from the intra predicting unit 113 or the motion predicting/compensating unit 114 via the prediction image selecting unit 115 to the restored differential information that is the inverse orthogonal transform result supplied from the inverse orthogonal transforming unit 109. The decoded image is supplied to the loop filter 111.

The loop filter 111 includes a deblock filter, an adaptive loop filter, or the like, and performs an appropriate filter process on the decoded image supplied from the operation unit 110. For example, the loop filter 111 performs the deblock filter process on the decoded image, and removes block distortion of the decoded image. Further, for example, the loop filter 111 performs the loop filter process on the deblock filter process result (the decoded image from which the block distortion has been removed) using the Wiener Filter, and improves the image quality.

The loop filter 111 may performs an arbitrary filter process on the decoded image. The loop filter 111 may supply information used in the filter process such as a filter coefficient to the lossless encoding unit 106 as necessary so that the information is encoded.

The loop filter 111 supplies the filter process result (hereinafter, referred to as a "decoded image") to the decoded picture buffer 112. The loop filter 111 supplies the reconstructed image supplied from the operation unit 110 to the intra predicting unit 113.

The decoded picture buffer 112 stores the decoded image supplied from the loop filter 111. Further, the decoded picture buffer 112 stores a view ID and a POC of the image.

The decoded picture buffer 112 supplies the stored decoded image (and the view ID and the POC of the image) to the motion predicting/compensating unit 114 for a corresponding view at a certain timing or based on a request given from the outside such as the motion predicting/compensating unit 114.

Further, the decoded picture buffer 112 also supplies the stored decoded image (and the view ID and the POC of the image) to the motion predicting/compensating unit 114 for a next processed view at a certain timing or based on a request given from the outside such as the motion predicting/compensating unit 114. For example, the decoded picture buffer 112-0 supplies the decoded image to the motion predicting/compensating unit 114-0 and the motion predicting/compensating unit 114-1. Further, for example, the decoded picture buffer 112-1 supplies the decoded image to the motion predicting/compensating unit 114-1 and the motion predicting/compensating unit 114-2. Here, since the view 2 is a last processed view, the decoded picture buffer 112-2 supplies the decoded image to the motion predicting/compensating unit 114-2.

Upon acquisition of an image of a neighboring area (a neighboring block) positioned around a processing target area (a current block) from the loop filter 111, the intra predicting unit 113 performs intra prediction of generating a prediction image basically using a prediction unit (PU) as a processing unit using pixel values of the image of the neighboring block. The intra predicting unit 113 performs the intra prediction in a plurality of modes (intra prediction modes) that are prepared in advance.

The intra predicting unit 113 generates prediction images in all intra prediction modes serving as the candidate, evaluates cost function values of the prediction images using the input image supplied from the screen sorting buffer 102, and selects an optimal mode. When the optimal intra prediction mode is selected, the intra predicting unit 113 supplies the prediction image generated in the optimal mode to the prediction image selecting unit 115.

Further, the intra predicting unit 113 appropriately supplies intra prediction information including information related to intra prediction such as an optimal intra prediction mode to the lossless encoding unit 106 so that the intra prediction information is encoded.

The motion predicting/compensating unit 114 performs motion prediction on a current block to generate a motion vector, and performs a compensation process according to the generated motion vector to generate a prediction image (inter prediction image information) of the current block. In the motion prediction and compensation processes, the motion predicting/compensating unit 114 generates a prediction image in all inter prediction modes serving as a candidate, evaluates a cost function value of each prediction image, and selects an optimal mode. When the optimal inter prediction mode is selected, the motion predicting/compensating unit 114 supplies the prediction image generated in the optimal mode to the prediction image selecting unit 115.

The motion predicting/compensating unit 114 performs the above motion prediction and compensation processes using the decoded image acquired from the decoded picture buffer 112.

In the case of an initially processed view, the motion predicting/compensating unit 114 performs the motion prediction and compensation processes using the decoded image acquired from the decoded picture buffer 112 storing an image of a corresponding view. For example, the motion predicting/compensating unit 114-0 performs the motion prediction and compensation processes using the decoded image acquired from the decoded picture buffer 112-0.

In the case of a secondly or subsequently processed view, the motion predicting/compensating unit 114 performs the motion prediction and compensation processes using the decoded images that are acquired from the decoded picture buffer 112 storing an image of a corresponding view and the decoded picture buffer 112 storing an image of an immediately previously processed view. For example, the motion predicting/compensating unit 114-1 performs the motion prediction and compensation processes using the decoded images acquired from the decoded picture buffer 112-0 and the decoded picture buffer 112-1. Further, for example, the motion predicting/compensating unit 114-2 performs the motion prediction and compensation processes using the decoded images acquired from the decoded picture buffer 112-1 and the decoded picture buffer 112-2.

Further, when the inter prediction is employed, the motion predicting/compensating unit 114 supplies inter prediction information including information related to inter prediction such as an optimal inter prediction mode to the lossless encoding unit 106 so that the inter prediction information is transmitted.

The motion predicting/compensating unit 114 transmits a motion vector of an optimal mode as the inter prediction information so that the motion compensation is performed at the decoding side. Practically, the motion predicting/compensating unit 114 transmits a differential motion vector serving as a difference between a motion vector and a prediction motion vector instead of a motion vector in order to further improve the coding efficiency. In other words, the motion predicting/compensating unit 114 predicts a motion vector of a current block, generates a prediction motion vector, and generates a differential motion vector serving as a difference between the motion vector of the current block and the prediction motion vector. The motion predicting/compensating unit 114 transmits the differential motion vector to the decoding side as part of the inter prediction information.

In the prediction of the motion vector, the motion predicting/compensating unit 114 generates a prediction motion vector of a current block using a motion vector of a block neighboring a current block. At this time, in order to further improve the prediction accuracy of the prediction motion vector and to further improve the coding efficiency, the motion predicting/compensating unit 114 can generate a plurality of prediction motion vector candidates, obtain cost function values for the respective candidates, and select an optimal candidate from among the candidates based on the cost function values. In other words, the motion predicting/compensating unit 114 can generate the prediction motion vector candidates by a plurality of methods.

For example, the motion predicting/compensating unit 114 can generate a prediction motion vector of a current block with reference to a motion vector of a block neighboring a current block spatially, temporally, and in terms of a view. Further, the motion predicting/compensating unit 114 transmits information (that is, mode information of a prediction motion vector) indicating a candidate selected as a prediction motion vector to the decoding side as part of the inter prediction information.

The motion predicting/compensating unit 114 acquires a motion vector of a spatially neighboring block from a motion vector memory corresponding to a corresponding view. For example, the motion predicting/compensating unit 114-0 acquires a motion vector from the V0 motion vector memory 122-0. Further, for example, the motion predicting/compensating unit 114-1 acquires a motion vector from the V1 motion vector memory 122-1. Furthermore, for example, the motion predicting/compensating unit 114-2 acquires a motion vector from the V2 motion vector memory 122-2.

In a secondly or subsequently processed view, the motion predicting/compensating unit 114 also acquires a motion vector of a block neighboring in terms of a view from a motion vector memory corresponding to a previously processed view. For example, the motion predicting/compensating unit 114-1 acquires a motion vector from the V0 motion vector memory 122-0. Further, for example, the motion predicting/compensating unit 114-2 acquires a motion vector from the V1 motion vector memory 122-1.

The motion vector is compressed. In other words, motion prediction and compensation for encoding of a current layer is performed using a motion vector that is generated and compressed in motion prediction and compensation for encoding of another layer. In other words, it is possible to suppress an increase in the storage capacity necessary for encoding.

The motion predicting/compensating unit 114-0 supplies a motion vector of a current block (a motion vector of an optimal mode) generated in the motion prediction and compensation processes to the V0 motion vector compressing unit 121-0. Further, the motion predicting/compensating unit 114-1 supplies the generated motion vector of the current block to the V1 motion vector compressing unit 121-1. Furthermore, the motion predicting/compensating unit 114-2 supplies the generated motion vector of the current block to the V2 motion vector compressing unit 121-2.

The prediction image selecting unit 115 selects a supply source of a prediction image to be supplied to the operation unit 103 and the operation unit 110. For example, in the case of the intra coding, the prediction image selecting unit 115 selects the intra predicting unit 113 as the supply source of the prediction image, and supplies the prediction image supplied from the intra predicting unit 113 to the operation unit 103 and the operation unit 110. Further, for example, in the case of the inter coding, the prediction image selecting unit 115 selects the motion predicting/compensating unit 114 as the supply source of the prediction image, and supplies the prediction image supplied from the motion predicting/compensating unit 114 to the operation unit 103 and the operation unit 110.

The rate control unit 116 controls a rate of a quantization operation of the quantizing unit 105 based on the coding amount of the encoded data accumulated in the accumulation buffer 107 such that neither an overflow nor an underflow occurs.

The V0 motion vector compressing unit 121-0 performs compression (which is also referred as "1/16 compressed") on a motion vector of a maximum of 4×4 accuracy (which is also referred to as a "non-compressed V0 motion vector") acquired from the motion predicting/compensating unit 114-0 with the 16×16 accuracy, and supplies the compressed motion vector (which is also referred to as a "1/16-compressed V0 motion vector") to the V0 motion vector memory 122-0.

A method of compressing a motion vector is arbitrary. For example, the V0 motion vector compressing unit 121-0 may select a motion vector serving as a representative value from among a plurality of motion vectors acquired from the motion predicting/compensating unit 114-0. For example, one motion vector serving as a representative value may be selected from among 16 motion vectors (motion vectors of 4×4 blocks) of the 4×4 accuracy. Through this compression, the accuracy of the motion vector becomes the 16×16 accuracy.

Further, a method of selecting the motion vector is arbitrary. A motion vector of a block at a position determined by a certain method may be selected, and for example, a motion vector of a block at a certain position such as a block at an upper left end may be selected, and a block corresponding to a position in an image may be selected.

The number of selected motion vectors is arbitrary and may be 2 or more.

Further, for example, the V0 motion vector compressing unit 121-0 calculates a representative value through a certain operation using each motion vector. A method of calculating a representative value is arbitrary. For example, an average value or a median value of motion vectors of respective blocks may be used as a representative value. Further, the number of calculated representative values is arbitrary and may be 2 or more.

The $1/16$-compressed V0 motion vector (the representative value of the motion vector) obtained as described above is supplied to and stored in the V0 motion vector memory 122-0. The V0 motion vector memory 122-0 appropriately supplies the stored $1/16$-compressed V0 motion vector to the motion predicting/compensating unit 114-0 as a motion vector of a temporally neighboring block. Further, the V0 motion vector memory 122-0 appropriately supplies the stored $1/16$-compressed V0 motion vector to the motion predicting/compensating unit 114-1 as a motion vector of a block neighboring in terms of a view.

The V1 motion vector compressing unit 121-1 performs $1/16$ compressed on a motion vector of a maximum of 4×4 accuracy (which is also referred to as a "non-compressed V1 motion vector") acquired from the motion predicting/compensating unit 114-1, and supplies the compressed motion vector (which is also referred to as a "$1/16$-compressed V1 motion vector") to be stored in the V1 motion vector memory 122-1. The V1 motion vector memory 122-1 appropriately supplies the stored $1/16$-compressed V1 motion vector to the motion predicting/compensating unit 114-1 as a motion vector of a temporally neighboring block. Further, the V1 motion vector memory 122-1 appropriately supplies the stored $1/16$-compressed V1 motion vector to the motion predicting/compensating unit 114-2 as a motion vector of a block neighboring in terms of a view.

The V2 motion vector compressing unit 121-2 performs $1/16$ compressed on a motion vector of a maximum of 4×4 accuracy (which is also referred to as a "non-compressed V2 motion vector") acquired from the motion predicting/compensating unit 114-2, and supplies the compressed motion vector (which is also referred to as a "$1/16$-compressed V2 motion vector") to be stored in the V2 motion vector memory 122-2. The V2 motion vector memory 122-2 appropriately supplies the stored $1/16$-compressed V2 motion vector to the motion predicting/compensating unit 114-2 as a motion vector of a temporally neighboring block.

Further, a method of compressing a motion vector through the V1 motion vector compressing unit 121-1 and the V2 motion vector compressing unit 121-2 is the same as in the V0 motion vector compressing unit 121-0, and thus a description thereof is omitted.

The V0 motion vector compressing unit 121-0, the V1 motion vector compressing unit 121-1, and the V2 motion vector compressing unit 121-2 perform the above motion vector compression in certain units. For example, the V0 motion vector compressing unit 121-0, the V1 motion vector compressing unit 121-1, and the V2 motion vector compressing unit 121-2 may perform the above motion vector compression in units of LCUs. The V0 motion vector compressing unit 121-0, the V1 motion vector compressing unit 121-1, and the V2 motion vector compressing unit 121-2 may be the same or differ in the processing unit. The processing unit may be changed during a sequence.

Further, the motion vector compression methods performed by the V0 motion vector compressing unit 121-0, the V1 motion vector compressing unit 121-1, and the V2 motion vector compressing unit 121-2 may be the same as or different from one another.

As described above, the V0 motion vector compressing unit 121-0, the V1 motion vector compressing unit 121-1, and the V2 motion vector compressing unit 121-2 can reduce (that is, compress) an information amount of motion vectors by reducing the number of motion vectors. Thus, it is possible to reduce the capacities of the V0 motion vector memory 122-0, the V1 motion vector memory 122-1, and the V2 motion vector memory 122-2.

Further, as described above, the motion predicting/compensating unit 114 may refer to the motion vectors stored in the V0 motion vector memory 122-0, the V1 motion vector memory 122-1, and the V2 motion vector memory 122-2 as the motion vector for the IVMP as well as the motion vector for the TMVP. As the motion vector for the TMVP and the motion vector for the IVMP are commonalized as described above, it is possible to reduce the storage capacity necessary for encoding. Further, it is possible to suppress an increase in a load caused by compression of a motion vector. Accordingly, it is possible to implement a reduction in a manufacturing or developing cost, device downsizing, a reduction in power consumption, and the like for the image coding device 100.

<Coding Process Flow>

Next, a flow of processing performed by the image coding device 100 will be described. An exemplary flow of a coding process performed by the image coding device 100 will be described with reference to a flowchart of FIG. 9.

When the coding process starts, in step S1001, the V0 image coding device 100-0 performs a V0 coding process on a current picture. In step S1002, the V1 image coding device 100-1 performs a V1 coding process on the current picture. In step S1003, the V2 image coding device 100-2 performs a V2 coding process on the current picture.

In step S1004, the image coding device 100 determines whether or not all pictures have been processed, and when it is determined that there is a non-processed picture, the process returns to step S1001, and the subsequent process is repeated.

The process of steps S1001 to S1004 is repeatedly performed for each picture, and when it is determined in step S1004 that all pictures have been processed, the image coding device 100 ends the coding process.

<V0 Coding Process Flow>

Next, an exemplary flow of the V0 coding process of encoding the view 0 which is performed in step S1001 of FIG. 9 will be described with reference to a flowchart of FIG. 10.

In step S1101, the A/D converting unit 101-0 performs A/D conversion on an input image. In step S1102, the screen sorting buffer 102-0 stores the A/D converted image, and sorts respective pictures arranged in a display order in an encoding order. In step S1103, the intrapredicting unit 113-0 performs the intra prediction process of the intra prediction mode.

In step S1104, the motion predicting/compensating unit 114-0 performs a V0 inter motion prediction process in which the motion prediction and the motion compensation of the inter prediction mode are performed.

In step S1105, the prediction image selecting unit 115-0 selects either of the prediction image generated by the intra predicting unit 113-0 and the prediction image generated by the motion predicting/compensating unit 114-0.

In step S1106, the V0 motion vector compressing unit 121-0 performs compression (1/16 compressed) on a non-compressed V0 motion vector of a maximum of 4×4 accuracy that is a motion vector of a current picture of the view 0 generated by the process of step S1104 with the 16×16 accuracy. For example, the 1/16 compressed is performed in units of LCUs (for example, 16×16 pixels). For example, the V0 motion vector compressing unit 121-0 selects a V0 motion vector of a block of 16×16 pixels at an upper left end as a representative value (that is, a V0 motion vector of the 16×16 accuracy) of the 16×16 pixels.

In step S1107, the V0 motion vector memory 122-0 stores the 1/16-compressed V0 motion vector generated by the process of step S1106.

In step S1108, the operation unit 103-0 subtracts the prediction image selected by the process of step S1105 from the image sorted by the process of step S1102. Differential data (data of a differential image between the image sorted by the process of step S1102 and the prediction image selected in step S1105) obtained by this operation is reduced to be smaller in a data amount than original image data. Thus, it is possible to reduce a data amount compared to when an image is encoded without change.

In step S1109, the orthogonal transforming unit 104-0 performs the orthogonal transform process on the differential data generated by the process of step S1108.

In step S1110, the quantizing unit 105-0 quantizes the orthogonal transform coefficients obtained by the process of step S1109 using the quantization parameter calculated by the rate control unit 116-0.

In step S1111, the lossless encoding unit 106-0 encodes the coefficients quantized by the process of step S1110. In other words, lossless coding such as variable length coding or arithmetic coding is performed on data corresponding to a differential image.

At this time, the lossless encoding unit 106-0 encodes information related to the prediction mode of the prediction image selected by the process of step S1105, and adds the encoded information to the encoded data obtained by encoding the differential image. In other words, the lossless encoding unit 106-0 also encodes the optimal intra prediction mode information supplied from the intra predicting unit 113-0, information according to the optimal inter prediction mode supplied from the motion predicting/compensating unit 114-0, or the like, and adds the encoded information to the encoded data.

In step S1112, the accumulation buffer 107-0 accumulates the encoded data obtained by the process of step S1111. The encoded data accumulated in the accumulation buffer 107-0 is appropriately read, and transmitted to the decoding side via a transmission path or a recording medium.

The differential information quantized by the process of step S1110 is locally decoded as follows. In other words, in step S1113, the inverse quantizing unit 108-0 inversely quantizes the orthogonal transform coefficients (which are also referred to as "quantization coefficients") generated and quantized by the process of step S1110 according to characteristics corresponding to characteristics of the quantizing unit 105-0. In step S1114, the inverse orthogonal transforming unit 109-0 performs inverse orthogonal transform on the orthogonal transform coefficients obtained by the process of step S1113 according to characteristics corresponding to characteristics of the orthogonal transforming unit 104-0. As a result, a differential image is restored.

In step S1115, the operation unit 110-0 adds the prediction image selected in step S1105 to the differential image restored in step S1114, and generates a locally decoded image (reconstructed image).

The V0 image coding device 100-0 performs the process of steps S1103 to S1115 on blocks in a current LCU serving as a processing target. In step S1116, the V0 image coding device 100-0 determines whether or not all LCUs have been processed. When it is determined that there is anon-processed LCU, the process returns to step S1103, and the subsequent process is repeated. The process of steps S1103 to S1115 is performed on each LCU of an image of a view 0 of a current picture, and when it is determined in step S1116 that all LCUs have been processed, the process proceeds to step S1117.

In step S1117, the loop filter 111-0 appropriately performs the loop filter process such as the deblock filter process or the adaptive loop filter process on the reconstructed image obtained by the process of step S1115, and generates the decoded image.

In step S1118, the decoded picture buffer 112-0 stores the decoded image generated by the process of step S1117.

In step S1119, the rate control unit 116-0 control the rate of the quantization operation of the quantizing unit 105-0 based on the coding amount (the generated coding amount) of the encoded data accumulated in the accumulation buffer 107-0 by the process of step S1118 such that neither an overflow nor an underflow occurs. Further, the rate control unit 116-0 supplies information related to the quantization parameter to the quantizing unit 105-0.

Figure 9:
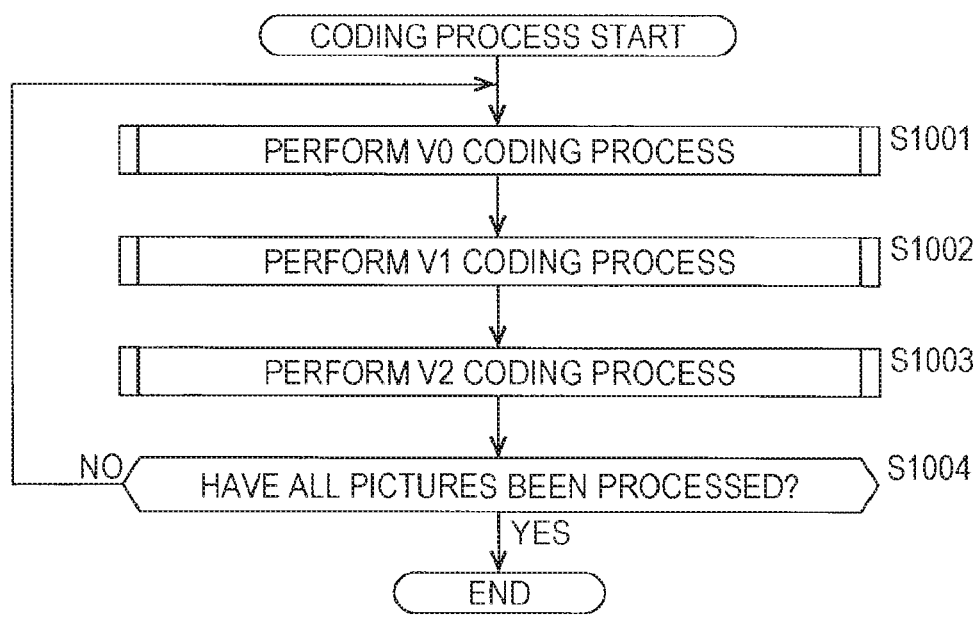
FIG. 9 is a flowchart for describing an exemplary flow of a coding process.

When the process of step S1119 ends, the V0 coding process ends, and the process returns to FIG. 9.

<V0 Inter Motion Prediction Process Flow>

Next, an exemplary flow of the V0 inter motion prediction process performed in step S1104 of FIG. 10 will be described with reference to a flowchart of FIG. 11.

When the V0 inter motion prediction process starts, in step S1131, the motion predicting/compensating unit 114-0 performs the motion search process, and generates a motion vector of a current block.

In step S1132, the motion predicting/compensating unit 114-0 decides a spatial prediction motion vector candidate using a non-compressed V0 motion vector in a picture. The spatial prediction motion vector candidate refers to a prediction motion vector candidate generated from a motion vector of a block spatially neighboring a current block. In other words, the motion predicting/compensating unit 114-0 decides the spatial prediction motion vector candidate using a V0 motion vector of a block spatially neighboring a current block. The V0 motion vector is a motion vector in a current picture and thus held in a non-compressed (a maximum of 4×4 accuracy) state by the motion predicting/compensating unit 114-0. Thus, the motion predicting/compensating unit 114-0 decides the spatial prediction motion vector candidate using the non-compressed V0 motion vector.

In step S1133, the motion predicting/compensating unit 114-0 decides the temporal prediction motion vector candidate using a 1/16-compressed V0 motion vector of another picture. The temporal prediction motion vector candidate refers to a prediction motion vector candidate generated from a motion vector of a block temporally neighboring a current block. In other words, the motion predicting/compensating unit 114-0 decides the spatial prediction motion vector candidate using a V0 motion vector of a colocated block of a picture temporally neighboring a current block.

The V0 motion vector is a motion vector of a different picture of the same view as a current picture and thus held in the V0 motion vector memory 122-0 in a compressed (the 16×16 accuracy) state. Thus, the motion predicting/compensating unit 114-0 reads the 1/16-compressed V0 motion vector from the V0 motion vector memory 122-0, and decides the temporal prediction motion vector candidate using the 1/16-compressed V0 motion vector.

Since the view 0 is an initially processed view, generation of a prediction motion vector candidate using a correlation between views is not performed.

In step S1134, the motion predicting/compensating unit 114-0 calculates cost function values for the candidates generated in steps S1132 and S1133.

In step S1135, the motion predicting/compensating unit 114-0 determines an optimal prediction mode based on the cost function values calculated in step S1134. At this time, the motion predicting/compensating unit 114-0 also decides (a mode of) a prediction motion vector.

In step S1136, the motion predicting/compensating unit 114-0 performs motion compensation in the optimal mode determined in step S1135, and generates a prediction image. Further, the motion predicting/compensating unit 114-0 generates the inter prediction information including the optimal inter prediction mode, the differential motion vector, and the mode of the prediction motion vector.

In step S1137, the motion predicting/compensating unit 114-0 stores the motion vector of the optimal mode in a buffer as the non-compressed V0 motion vector. When the process of step S1137 ends, the V0 inter motion prediction process ends, and the process returns to FIG. 10.

<V1 Coding Process Flow>

Figure 12:
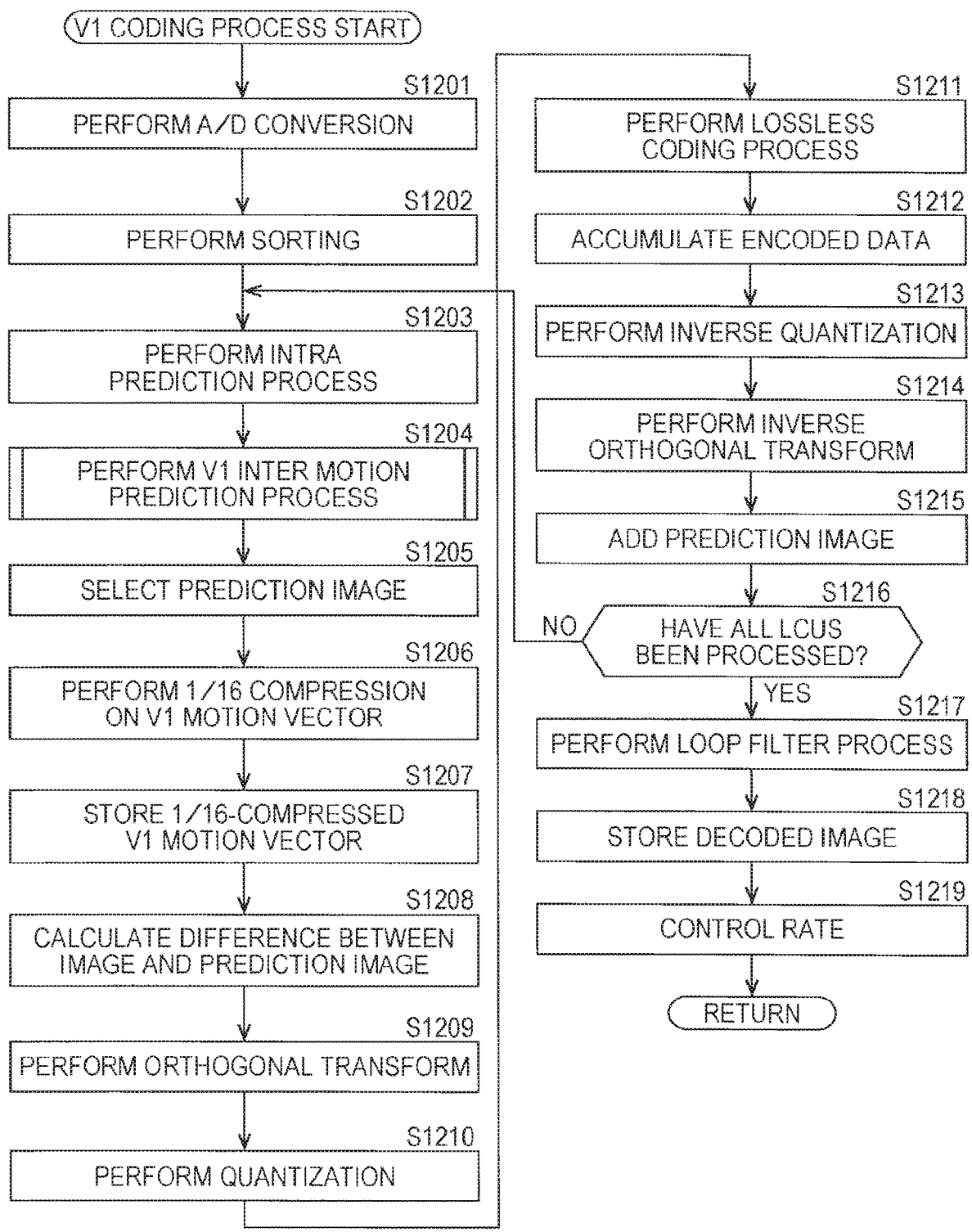
FIG. 12 is a flowchart for describing an exemplary flow of a V1 coding process.

Next, an exemplary flow of the V1 coding process of encoding the view 1 which is performed in step S1002 of FIG. 9 will be described with reference to a flowchart of FIG. 12.

A difference between the process for the view 0 and the process for the view 1 mainly lies in the inter motion prediction process. Thus, as illustrated in FIG. 12, the V1 image coding device 100-1 performs the V1 coding process basically in the same manner as the coding process (the V0 coding process of FIG. 10) for the view 0. In other words, the process of steps S1201 to S1219 of FIG. 12 is performed basically in the same manner as the process of steps S1101 to S1119 of FIG. 10. Thus, the description of FIG. 12 may proceed such that the respective components of the V0 image coding device 100-0 described with reference to FIG. 10 are replaced with the respective components of the V1 image coding device 100-1, and the process for the view 0 illustrated in FIG. 10 is replaced with the process for the view 1, and thus a description thereof is omitted.

<V1 Inter Motion Prediction Process Flow>

Next, an exemplary flow of the V1 inter motion prediction process performed in step S1204 of FIG. 12 will be described with reference to a flowchart of FIG. 13.

Figure 11:
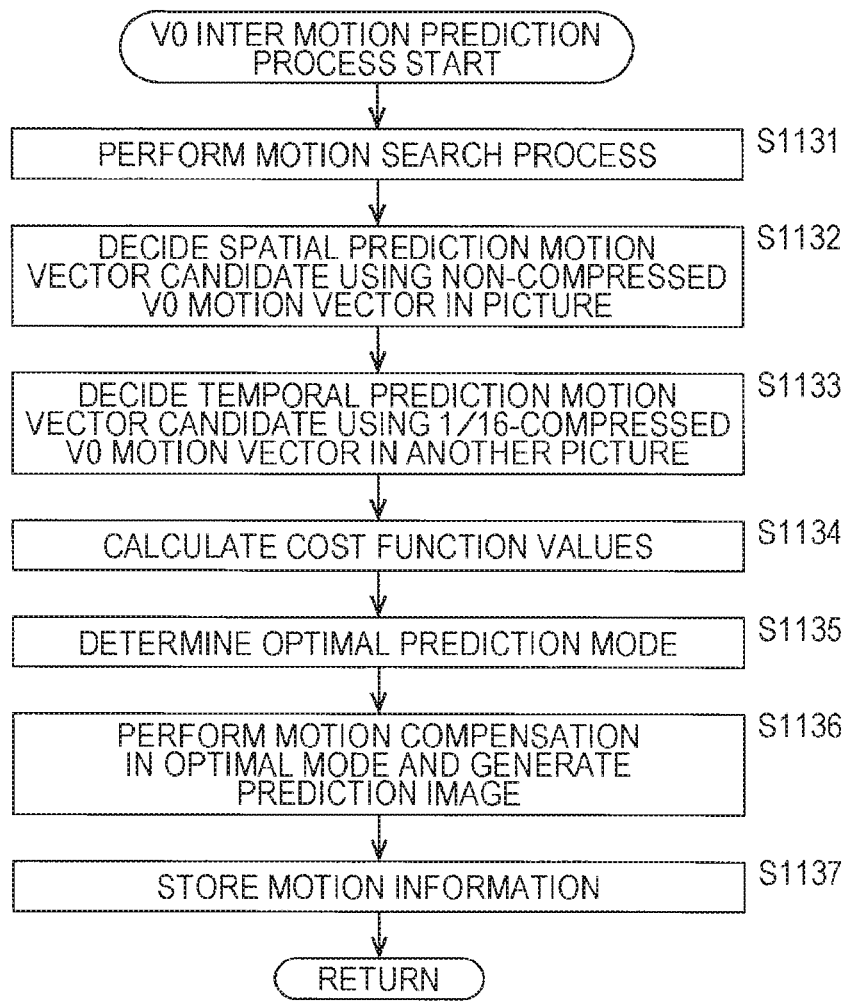
FIG. 11 is a flowchart for describing an exemplary flow of a V0 inter motion prediction process.

When the V1 inter motion prediction process starts, the process of steps S1231 to S1233 is performed basically in the same manner as the process of steps S1131 to S1133 of FIG. 11. Here, the V1 inter motion prediction process is performed by the motion predicting/compensating unit 114-1. The process of FIG. 13 is performed on the view 1, and thus in step S1232, a non-compressed V1 motion vector serving as a non-compressed motion vector of the view 1 is used. Further, in step S1233, a 1/16-compressed V1 motion vector that has been subjected to 1/16 compressed is used.

In the inter motion prediction process for the view 1, in addition to generation of a candidate by spatial prediction and a candidate by temporal prediction, generation of a prediction motion vector candidate (a candidate by the IVMP) using a correlation between views is also performed.

In other words, in step S1234, the motion predicting/compensating unit 114-1 decides an IVMP prediction motion vector candidate using a 1/16-compressed V0 motion vector. The IVMP prediction motion vector candidate refers to a prediction motion vector candidate generated from a motion vector of a block neighboring a current block in terms of a view. In other words, the motion predicting/compensating unit 114-1 decides the IVMP prediction motion vector candidate using a V0 motion vector of a colocated block of an image of a different view of the same picture as a current block. The V0 motion vector is a motion vector of a different view of the same picture as a current picture and thus held in the V0 motion vector memory 122-0 in a compressed (the 16×16 accuracy) state. Thus, the motion predicting/compensating unit 114-1 reads the 1/16-compressed V0 motion vector from the V0 motion vector memory 122-0, and decides an inter-view prediction motion vector candidate using the 1/16-compressed V0 motion vector.

The process of steps S1235 to step S1238 is performed, similarly to the process of step S1134 to step S1137 of FIG. 11. When the process of step S1238 ends, the V1 inter motion prediction process ends, and the process returns to FIG. 12.

<V2 Coding Process Flow>

Next, an exemplary flow of the V2 coding process of encoding the view 2 which is performed in step S1003 of FIG. 9 will be described with reference to a flowchart of FIG. 14.

The process for the view 2 is performed, similarly to the process for the view 1. Thus, as illustrated in FIG. 14, the V2 image coding device 100-2 performs the V2 coding process basically in the same manner as the coding process (the V1 coding process of FIG. 12) for the view 1. In other words, the process of step S1301 to step S1319 of FIG. 14 is performed basically in the same manner as the process of step S1201 to step S1219 of FIG. 12. Thus, the description of FIG. 14 may proceed such that the respective components of the V1 image coding device 100-1 described with reference to FIG. 12 are replaced with the respective components of the V2 image coding device 100-2, and the process for the view 1 illustrated in FIG. 12 is replaced with the process for the view 2, and thus a description thereof is omitted.

<V2 Inter Motion Prediction Process Flow>

Next, an exemplary flow of the V2 inter motion prediction process performed in step S1304 of FIG. 14 will be described with reference to a flowchart of FIG. 15.

Figure 15:
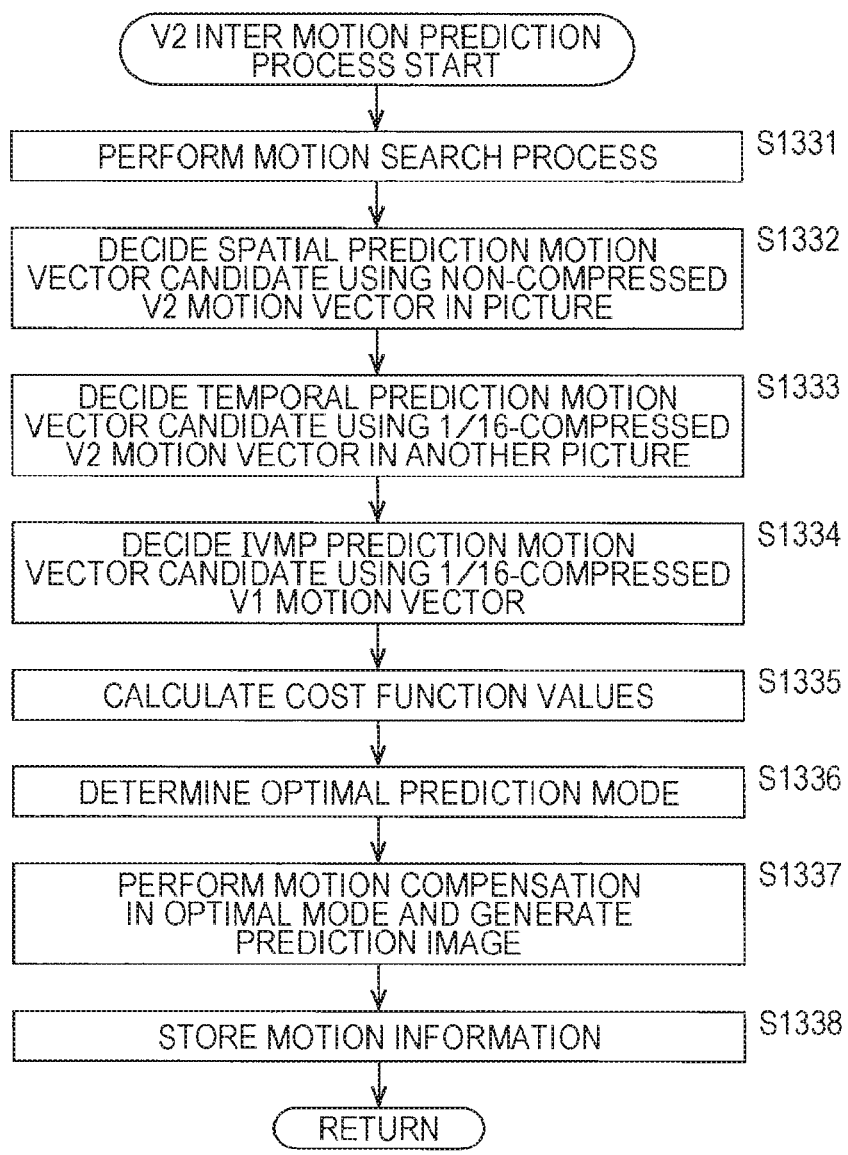
FIG. 15 is a flowchart for describing an exemplary flow of a V2 inter motion prediction process.

The motion predicting/compensating unit 114-2 performs the V2 inter motion prediction process basically in the same manner as the inter motion prediction process (the V1 inter motion prediction process of FIG. 13) for the view 1 as illustrated in FIG. 15. In other words, the process of step S1331 to step S1338 of FIG. 15 is performed basically in the same manner as step S1231 to step S1238 of FIG. 13.

Here, in step S1332, a non-compressed V2 motion vector serving as a non-compressed motion vector of the view 2 is used. Further, in step S1333, a 1/16-compressed V2 motion vector that has been subjected to 1/16 compressed is used. Further, in step S1334, a 1/16-compressed V1 motion vector that has been subjected to 1/16 compressed is used.

Figure 14:
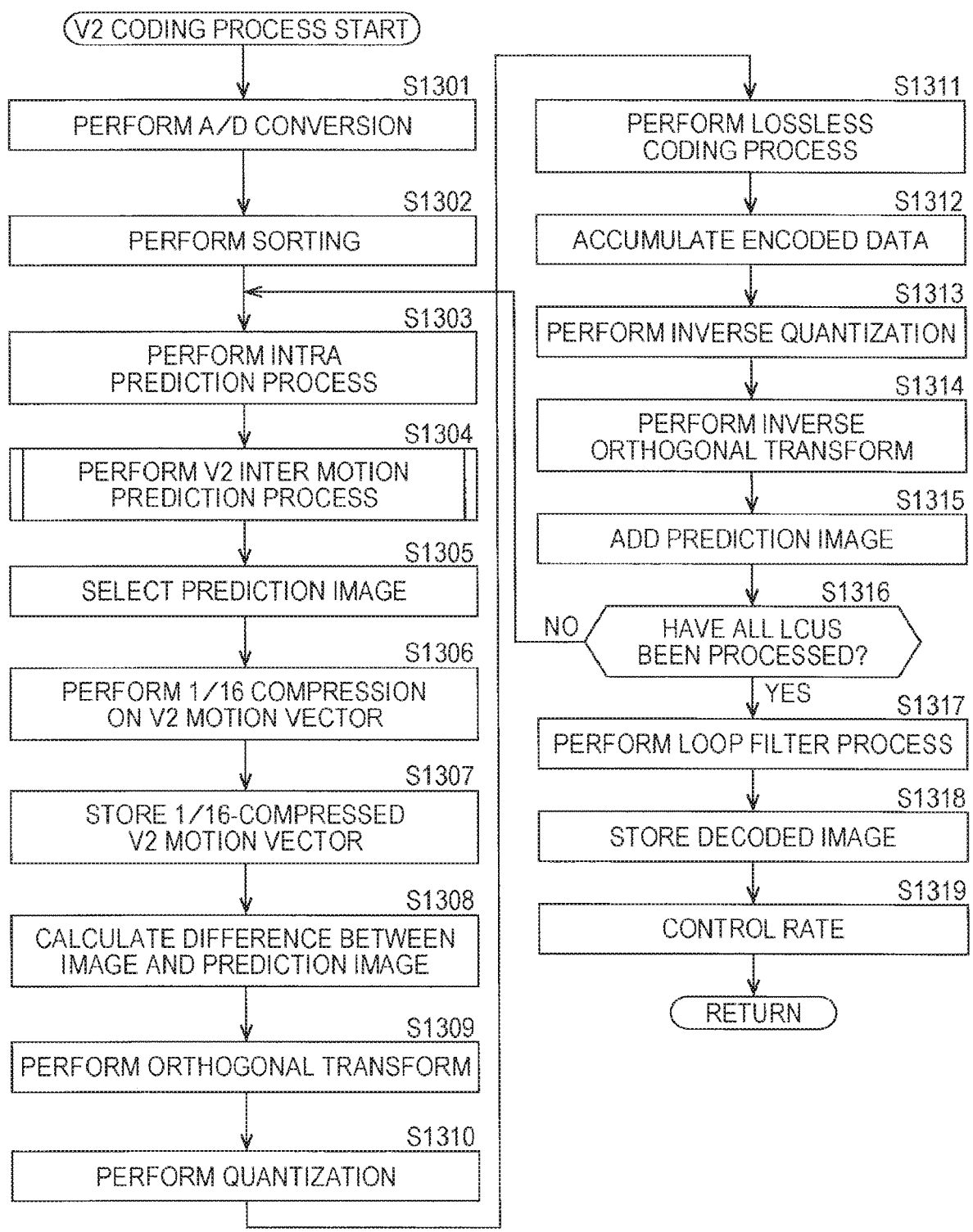
FIG. 14 is a flowchart for describing an exemplary flow of a V2 coding process.

When the process of step S1338 ends, the V2 inter motion prediction process ends, and the process returns to FIG. 14.

As the respective processes are performed as described above, the image coding device 100 can reduce the memory capacity necessary for the motion vector for the IVMP, and suppress an increase in the storage capacity necessary for encoding and decoding.

<Image Decoding Device>

Figure 16:
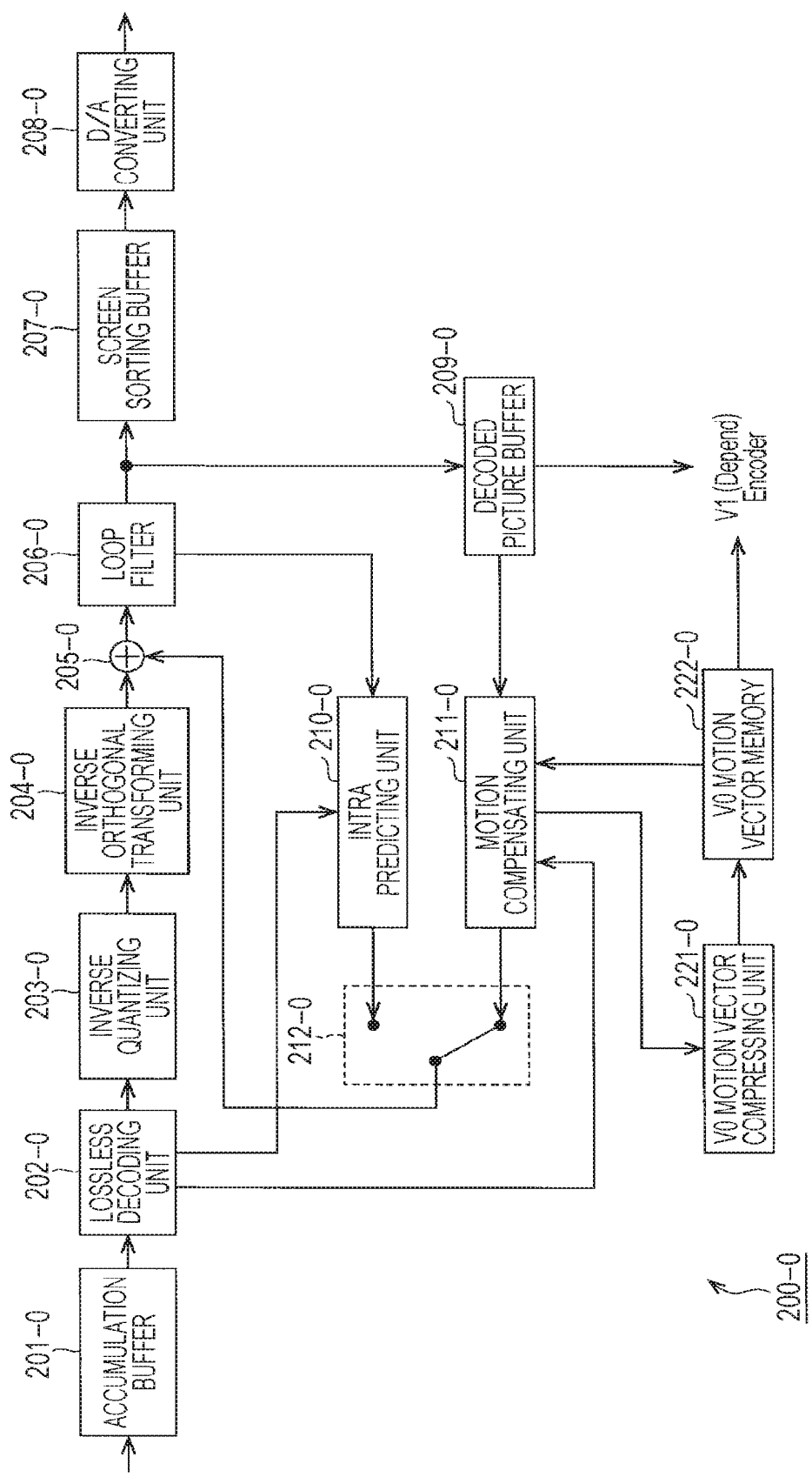
FIG. 16 is a block diagram illustrating an exemplary main configuration of a V0 image decoding device.
Figure 17:
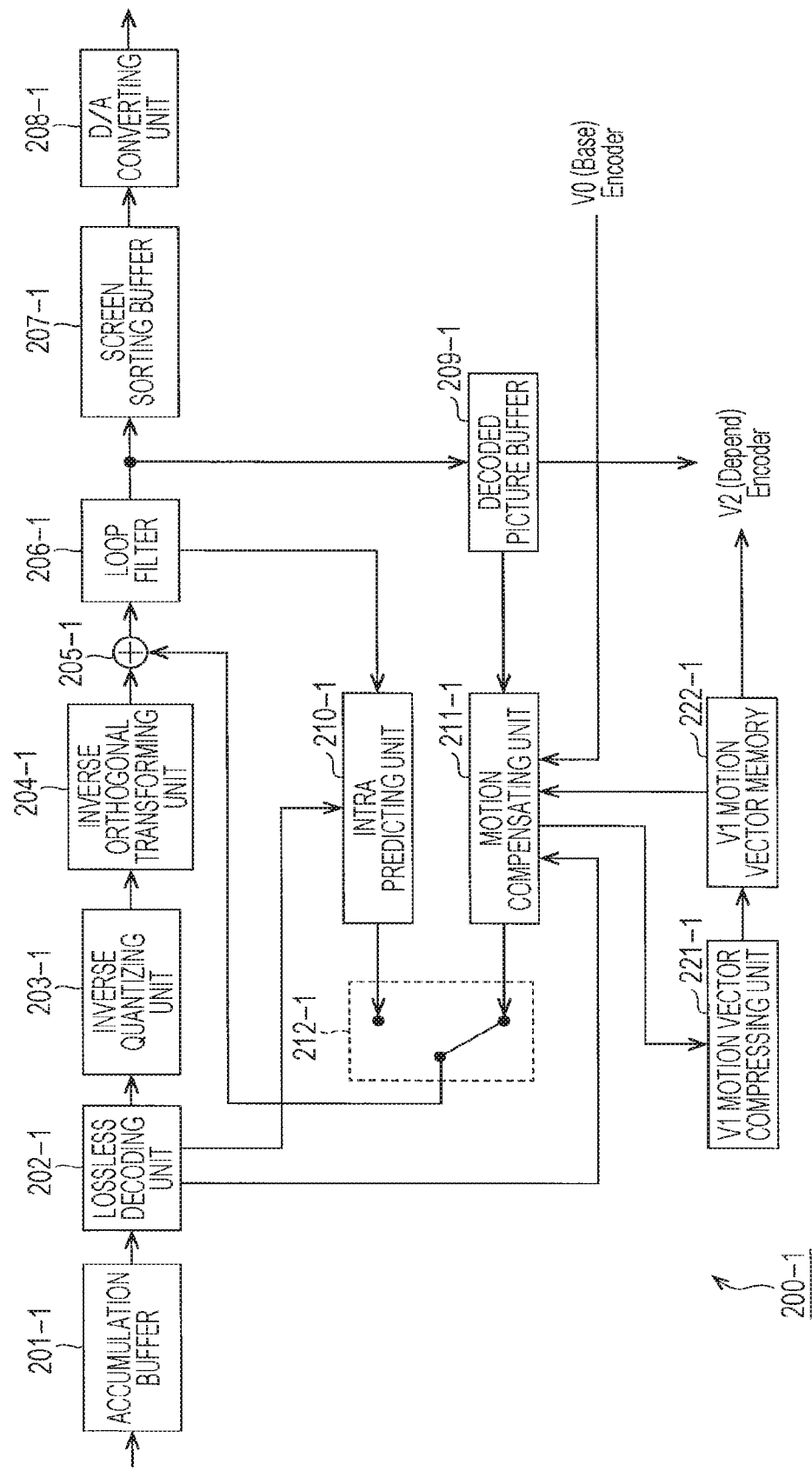
FIG. 17 is a block diagram illustrating an exemplary main configuration of a V1 image decoding device.
Figure 18:
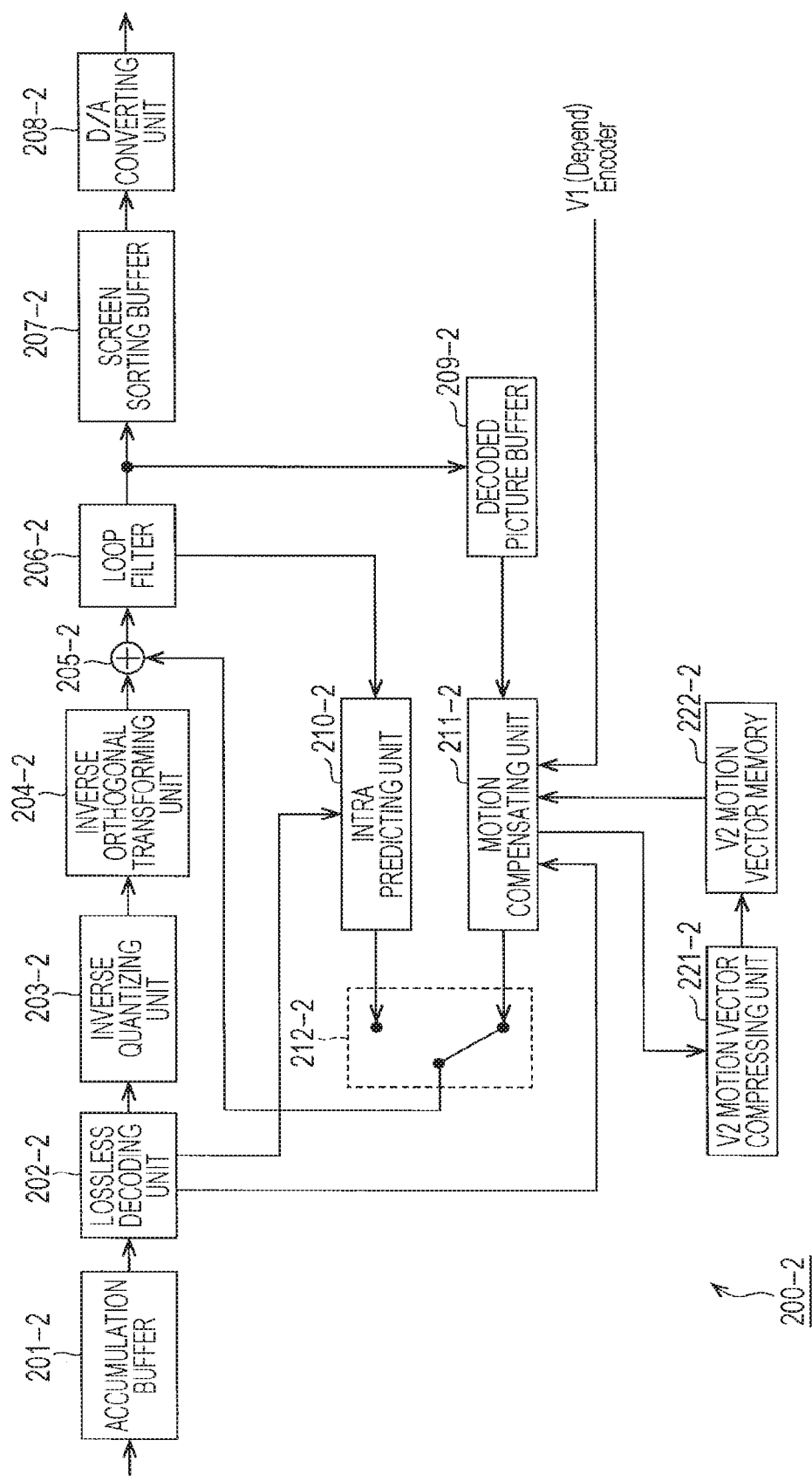
FIG. 18 is a block diagram illustrating an exemplary main configuration of a V2 image decoding device.

Next, decoding of encoded data (encoded stream) encoded as described above will be described. FIG. 16 is a block diagram illustrating an exemplary main configuration of the V0 image decoding device. FIG. 17 is a block diagram illustrating an exemplary main configuration the V1 image decoding device. FIG. 18 is a block diagram illustrating an exemplary main configuration the V2 image decoding device.

An image decoding device 200 (not illustrated) decodes encoded data of a moving image including a plurality of layers such as the multi-view image illustrated in FIG. 2 which is encoded by the image coding device 100 by a decoding method corresponding to the encoding method. The image decoding device 200 includes a V0 image decoding device 200-0 of FIG. 16, a V1 image decoding device 200-1 of FIG. 17, and a V2 image decoding device 200-2 of FIG. 18 in order to decode encoded data of respective views of a multi-view image. The V0 image decoding device 200-0 decodes encoded data of an image of a view 0 encoded by the V0 image coding device 100-0. The V1 image decoding device 200-1 decodes encoded data of an image of a view 1 encoded by the V1 image coding device 100-1. The V2 image decoding device 200-2 decodes encoded data of an image of a view 2 encoded by the V2 image coding device 100-2.

The V0 image decoding device 200-0 includes an accumulation buffer 201-0, a lossless decoding unit 202-0, an inverse quantizing unit 203-0, an inverse orthogonal transforming unit 204-0, an operation unit 205-0, a loop filter 206-0, a screen sorting buffer 207-0, and a D/A converting unit 208-0 as illustrated in FIG. 16. The V0 image decoding device 200-0 further includes a decoded picture buffer 209-0, an intra predicting unit 210-0, a motion compensating unit 211-0, and a selecting unit 212-0.

The V1 image decoding device 200-1 includes an accumulation buffer 201-1, a lossless decoding unit 202-1, an inverse quantizing unit 203-1, an inverse orthogonal transforming unit 204-1, an operation unit 205-1, a loop filter 206-1, a screen sorting buffer 207-1, and a D/A converting unit 208-1 as illustrated in FIG. 17. The V1 image decoding device 200-1 further includes a decoded picture buffer 209-1, an intra predicting unit 210-1, a motion compensating unit 211-1, and a selecting unit 212-1.

The V2 image decoding device 200-2 includes an accumulation buffer 201-2, a lossless decoding unit 202-2, an inverse quantizing unit 203-2, an inverse orthogonal transforming unit 204-2, an operation unit 205-2, a loop filter 206-2, a screen sorting buffer 207-2, and a D/A converting unit 208-2 as illustrated in FIG. 18. The V2 image decoding device 200-2 further includes a decoded picture buffer 209-2, an intra predicting unit 210-2, a motion compensating unit 211-2, and a selecting unit 212-2.

Hereinafter, when the accumulation buffers 201-0 to 201-2 need not be distinguished from one another, they are referred to simply as an "accumulation buffer 201." Further, when the lossless decoding units 202-0 to 202-2 need not be distinguished from one another, they are referred to simply as a "lossless decoding unit 202." Further, when the inverse quantizing units 203-0 to 203-2 need not be distinguished from one another, they are referred to simply as an "inverse quantizing unit 203." Further, when the inverse orthogonal transforming units 204-0 to 204-2 need not be distinguished from one another, they are referred to simply as an "inverse orthogonal transforming unit 204." Further, when the operation units 205-0 to 205-2 need not be distinguished from one another, they are referred to simply as an "operation unit 205."

Further, when the loop filters 206-0 to 206-2 need not be distinguished from one another, they are referred to simply as a "loop filter 206." Further, when the screen sorting buffers 207-0 to 207-2 need not be distinguished from one another, they are referred to simply as a "screen sorting buffer 207." Further, when the D/A converting units 208-0 to 208-2 need not be distinguished from one another, they are referred to simply as a "D/A converting unit 208." Further, when the decoded picture buffers 209-0 to 209-2 need not be distinguished from one another, they are referred to simply as a "decoded picture buffer 209."

Further, when the intra predicting units 210-0 to 210-2 need not be distinguished from one another, they are referred to simply as an "intra predicting unit 210." Further, when the motion compensating units 211-0 to 211-2 need not be distinguished from one another, they are referred to simply as a "motion compensating unit 211." Further, when the selecting units 212-0 to 212-2 need not be distinguished from one another, they are referred to simply as a "selecting unit 212."

The V0 image decoding device 200-0 further includes a V0 motion vector compressing unit 221-0 and a V0 motion vector memory 222-0. The V1 image decoding device 200-1 further includes a V1 motion vector compressing unit 221-1 and a V1 motion vector memory 222-1. The V2 image decoding device 200-2 further includes a V2 motion vector compressing unit 221-2 and a V2 motion vector memory 222-2.

The accumulation buffer 201 also functions as a receiving unit that receives transmitted encoded data. The accumulation buffer 201 receives and accumulates transmitted encoded data, and supplies the encoded data to the lossless decoding unit 202 at a certain timing. The encoded data includes information necessary for decoding such as prediction mode information. The lossless decoding unit 202 decodes information encoded by the lossless encoding unit 106 (FIGS. 6 to 8) which is supplied from the accumulation buffer 201 according to a scheme corresponding to the coding scheme of the lossless encoding unit 106. The lossless decoding unit 202 supplies quantized coefficient data of a differential image obtained by the decoding to the inverse quantizing unit 203.

Further, the lossless decoding unit 202 determines which of the intra prediction mode and the inter prediction mode has been selected as the optimal prediction mode, and supplies information related to the optimal prediction mode to a mode determined to be selected, that is, the intra predicting unit 210 or the motion compensating unit 211. In other words, for example, when the intra prediction mode is selected as the optimal prediction mode at the encoding side, the information related to the optimal prediction mode is supplied to the intra predicting unit 210. Further, for example, when the inter prediction mode is selected as the optimal prediction mode at the encoding side, the information related to the optimal prediction mode is supplied to the motion compensating unit 211.

Further, for example, the lossless decoding unit 202 supplies information necessary for inverse quantization such as a quantization matrix and a quantization parameter to the inverse quantizing unit 203.

The inverse quantizing unit 203 inversely quantizes the quantized coefficient data that is obtained by the decoding performed by the lossless decoding unit 202 according to a scheme corresponding to the quantization scheme of the quantizing unit 105. The inverse quantizing unit 203 is a processing unit similar to the inverse quantizing unit 108. In other words, the description of the inverse quantizing unit 203 can also apply to the inverse quantizing unit 108. Here, it is necessary to change and read, for example, input and output destinations of data according to a device.

The inverse quantizing unit 203 supplies the obtained coefficient data to the inverse orthogonal transforming unit 204.

The inverse orthogonal transforming unit 204 performs inverse orthogonal transform on the orthogonal transform coefficients supplied from the inverse quantizing unit 203 according to a scheme corresponding to the orthogonal transform scheme of the orthogonal transforming unit 104. The inverse orthogonal transforming unit 204 is a processing unit similar to the inverse orthogonal transforming unit 109. In other words, the description of the inverse orthogonal transforming unit 204 can also apply to the inverse orthogonal transforming unit 109. Here, it is necessary to change and read, for example, input and output destinations of data according to a device.

The inverse orthogonal transforming unit 204 obtains decoding residual data (differential image) corresponding to residual data (differential image) that is not subjected to orthogonal transform in the image coding device 100 through the inverse orthogonal transform process. The differential image obtained by the inverse orthogonal transform is supplied to the operation unit 205. Further, the operation unit 205 is supplied with a prediction image from the intra predicting unit 210 or the motion compensating unit 211 via the selecting unit 212.

The operation unit 205 adds the differential image to the prediction image, and obtains a reconstructed image corresponding to image data from which a prediction image is not subtracted by the operation unit 103. The operation unit 205 supplies the reconstructed image to the loop filter 206.

The loop filter 206 appropriately performs the loop filter process such as the deblock filter process or the adaptive loop filter process on the supplied reconstructed image, and generates the decoded image. For example, the loop filter 206 performs the deblock filter process on the reconstructed image, and removes block distortion. Further, for example, the loop filter 206 improves the image quality by performing the loop filter process on the deblock filter process result (the reconstructed image from which the block distortion has been removed) using the Wiener Filter.

A type of the filter process performed by the loop filter 206 is arbitrary, and any other filter process may be performed. Further, the loop filter 206 may perform the filter process using a filter coefficient supplied from the image coding device 100.

The loop filter 206 supplies the decoded image serving as the filter process result to the screen sorting buffer 207 and the decoded picture buffer 209. Further, the loop filter 206 supplies the output (reconstructed image) of the operation unit 205 to the intra predicting unit 210 without performing the filter process. For example, the intra predicting unit 210 uses pixel values of pixels included in this image as pixel values of neighboring pixels.

The screen sorting buffer 207 performs sorting on the supplied decoded image. In other words, the frames sorted in an order for encoding by the screen sorting buffer 102 are sorted in an original display order. The D/A converting unit 208 performs D/A conversion on the decoded image supplied from the screen sorting buffer 207, outputs the converted image to be displayed on a display (not illustrated).

The decoded picture buffer 209 stores the supplied decoded image (and the view ID and the POC of the image). Further, the decoded picture buffer 209 supplies the stored decoded image (and the view ID and the POC of the image) to the motion compensating unit 211 at a certain timing or based on a request given from the outside such as the motion compensating unit 211.

The intra predicting unit 210 performs basically the same process as the intra predicting unit 113. Here, the intra predicting unit 210 performs intra prediction only on an area in which a prediction image is generated by intra prediction at the time of encoding. The intra predicting unit 210 supplies a generated prediction image to the operation unit 205 via the selecting unit 212 for each area of a prediction processing unit.

The motion compensating unit 211 generates a prediction image by performing motion compensation on the area in which inter prediction has been performed at the time of encoding in the inter prediction mode employed at the time of encoding based on the inter prediction information supplied from the lossless decoding unit 202. The motion compensating unit 211 supplies the generated prediction image to the operation unit 205 via the selecting unit 212 for each area of a prediction processing unit.

The motion compensating unit 211 performs the motion compensation process using the decoded image acquired from the decoded picture buffer 209.

In the case of an initially processed view, the motion compensating unit 211 performs the motion compensation process using the decoded image acquired from the decoded picture buffer 209 storing an image of a corresponding view. For example, the motion compensating unit 211-0 performs the motion compensation process using the decoded image acquired from the decoded picture buffer 209-0.

In the case of a secondly or subsequently processed view, the motion compensating unit 211 performs the motion compensation process using the decoded images acquired from the decoded picture buffer 209 storing an image of a corresponding view and the decoded picture buffer 209 storing an image of an immediately previously processed view. For example, the motion compensating unit 211-1 performs the motion compensation process using the decoded images acquired from the decoded picture buffer 209-0 and the decoded picture buffer 209-1. Further, for example, the motion compensating unit 211-2 performs the motion compensation process using the decoded images acquired from the decoded picture buffer 209-1 and the decoded picture buffer 209-2.

The motion compensating unit 211 reconstructs a motion vector of a current block from a differential motion vector transmitted from the encoding side as the inter prediction information. At this time, the motion compensating unit 211 predicts the motion vector of the current block by the same method (mode) as in the motion predicting/compensating unit 114 based on the inter prediction information supplied from the lossless decoding unit 202, and generates a prediction motion vector. The motion compensating unit 211 adds the prediction motion vector to the differential motion vector, and reconstructs the motion vector of the current block.

In other words, the motion compensating unit 211 generates the prediction motion vector of the current block with reference to a motion vector of a block neighboring the current block spatially, temporally, or in terms of a view.

The motion vector of the spatially neighboring block is held by the motion compensating unit 211. Further, when a motion vector of a temporally neighboring block is referred to, the motion compensating unit 211 acquires a motion vector from a motion vector memory corresponding to a corresponding view. For example, the motion compensating unit 211-0 acquires a motion vector of a temporally neighboring block from the V0 motion vector memory 222-0. Further, for example, the motion compensating unit 211-1 acquires a motion vector of a temporally neighboring block from the V1 motion vector memory 222-1. Furthermore, for example, the motion compensating unit 211-2 acquires a motion vector of a temporally neighboring block from the V2 motion vector memory 222-2.

Further, when a motion vector of a block neighboring in terms of a view is referred to, the motion compensating unit 211 acquires a motion vector from a motion vector memory corresponding to a previously processed view. For example, the motion compensating unit 211-1 acquires a motion vector of a block neighboring in terms of a view from the V0 motion vector memory 222-0. Further, for example, the motion compensating unit 211-2 acquires a motion vector of a block neighboring in terms of a view from the V1 motion vector memory 222-1.

The motion vectors acquired from the motion vector memories are subjected to $1/16$ compressed. In other words, motion compensation for decoding of a current layer is performed using a motion vector that is reconstructed and compressed in motion compensation for decoding of another layer. In other words, it is possible to suppress an increase in the storage capacity necessary for decoding.

The motion compensating unit 211 supplies the motion vector of the current block (a motion vector of an optimal mode) generated through the motion prediction and compensation processes to the V0 motion vector compressing unit 221-0. Further, the motion compensating unit 211-1 supplies the generated motion vector of the current block to the V1 motion vector compressing unit 221-1. Furthermore, the motion compensating unit 211-2 supplies the generated motion vector of the current block to the V2 motion vector compressing unit 221-2.

The selecting unit 212 supplies the prediction image supplied from the intra predicting unit 210 or the prediction image supplied from the motion compensating unit 211 to the operation unit 205.

The V0 motion vector compressing unit 221-0 performs $1/16$ compressed on the non-compressed V0 motion vector of a maximum of 4×4 accuracy acquired from the motion compensating unit 211-0 with the 16×16 accuracy, and supplies the obtained $1/16$-compressed V0 motion vector to the V0 motion vector memory 222-0.

A method of compressing a motion vector is arbitrary as long as the same method as in the V0 motion vector compressing unit 121-0 is used. For example, when a motion vector serving as a representative value is selected from among motion vectors of a plurality of blocks and compressed, a method of selecting a motion vector is arbitrary as long as the same method as in the V0 motion vector compressing unit 121-0 is used. Further, the number of selected motion vectors is arbitrary as long as the same method as in the V0 motion vector compressing unit 121-0 is used, and may be 2 or more.

Further, for example, when a representative value is calculated by performing a certain operation using motion vectors of a plurality of blocks, and a motion vector is compressed, a method of calculating a representative value is arbitrary as long as the same method as in the V0 motion vector compressing unit 121-0 is used.

The $1/16$-compressed V0 motion vector (the representative value of the motion vector) obtained as described above is supplied to and stored in the V0 motion vector memory 222-0. The V0 motion vector memory 222-0 appropriately supplies the stored $1/16$-compressed V0 motion vector to the motion compensating unit 211-0 as a motion vector of a temporally neighboring block. Further, the V0 motion vector memory 222-0 appropriately supplies the stored $1/16$-compressed V0 motion vector to the motion compensating unit 211-1 as a motion vector of a block neighboring in terms of a view.

The V1 motion vector compressing unit 221-1 performs $1/16$ compressed on the non-compressed V1 motion vector acquired from the motion compensating unit 211-1, and supplies the obtained $1/16$-compressed V1 motion vector to be stored in the V1 motion vector memory 222-1. The V1 motion vector memory 222-1 appropriately supplies the stored $1/16$-compressed V1 motion vector to the motion compensating unit 211-1 as a motion vector of a temporally neighboring block. Further, the V1 motion vector memory 222-1 appropriately supplies the stored $1/16$-compressed V1 motion vector to the motion compensating unit 211-2 as a motion vector of a block neighboring in terms of a view.

The V2 motion vector compressing unit 221-2 performs $1/16$ compressed on the non-compressed V2 motion vector acquired from the motion compensating unit 211-2, and supplies the obtained $1/16$-compressed V2 motion vector to be stored in the V2 motion vector memory 222-2. The V2 motion vector memory 222-2 appropriately supplies the stored $1/16$-compressed V2 motion vector to the motion compensating unit 211-2 as a motion vector of a temporally neighboring block.

Further, a method of compressing a motion vector through the V1 motion vector compressing unit 221-1 and the V2 motion vector compressing unit 221-2 is the same as in the V0 motion vector compressing unit 221-0, and thus a description thereof is omitted.

The V0 motion vector compressing unit 221-0, the V1 motion vector compressing unit 221-1, and the V2 motion vector compressing unit 221-2 performs the above motion vector compression in certain units. For example, the V0 motion vector compressing unit 221-0, the V1 motion vector compressing unit 221-1, and the V2 motion vector compressing unit 221-2 may perform the above motion vector compression in units of LCUs. Further, the V0 motion vector compressing unit 221-0, the V1 motion vector compressing unit 221-1, and the V2 motion vector compressing unit 221-2 may be the same or different in the processing unit. The processing unit may be changed during a sequence.

Further, the motion vector compression methods performed by the V0 motion vector compressing unit 221-0, the V1 motion vector compressing unit 221-1, and the V2 motion vector compressing unit 221-2 may be the same as or different from one another.

As described above, the V0 motion vector compressing unit 221-0, the V1 motion vector compressing unit 221-1, and the V2 motion vector compressing unit 221-2 can reduce (that is, compress) an information amount of motion vectors by reducing the number of motion vectors. Thus, it is possible to reduce the capacities of the V0 motion vector memory 222-0, the V1 motion vector memory 222-1, and the V2 motion vector memory 222-2.

Further, as described above, the motion compensating unit 211 may refer to the motion vectors stored in the V0 motion vector memory 222-0, the V1 motion vector memory 222-1, and the V2 motion vector memory 222-2 as the motion vector for the IVMP as well as the motion vector for the TMVP. As the motion vector for the TMVP and the motion vector for the IVMP are commonalized as described above, it is possible to reduce the storage capacity necessary for encoding. Further, it is possible to suppress an increase in a load caused by compression of a motion vector. Accordingly, it is possible to implement a reduction in a manufacturing or developing cost, device downsizing, a reduction in power consumption, and the like for the image decoding device 200.

<Decoding Process Flow>

Next, a flow of processing performed by the image decoding device 200 will be described. An exemplary flow of the decoding process performed by the image decoding device 200 will be described with reference to a flowchart of FIG. 19.

When the decoding process starts, for a current picture, the V0 image decoding device 200-0 performs a V0 decoding process in step S1401, the V1 image decoding device 200-1 performs a V1 decoding process in step S1402, and the V2 image decoding device 200-2 performs a V2 decoding process in step S1403.

In step S1404, the image decoding device 200 determines whether or not all pictures have been processed, and when it is determined that there is a non-processed picture, the process returns to step S1401, and the subsequent process is repeated.

The process of step S1401 to step S1404 is repeatedly performed for each picture, and when it is determined, in step S1404, that all pictures have been processed, the image decoding device 200 ends the decoding process.

<V0 Decoding Process Flow>

Next, an exemplary flow of the V0 decoding process of decoding encoded data of the view 0 which is performed in step S1401 of FIG. 19 will be described with reference to a flowchart of FIG. 20.

When the V0 decoding process starts, in step S1501, the accumulation buffer 201-0 accumulates transmitted bit streams of the view 0. In step S1502, the lossless decoding unit 202-0 decodes the bit streams (encoded differential image information) of the view 0 supplied from the accumulation buffer 201-0. In other words, the respective pictures (an I picture, a P picture, and a B picture) of the view 0 encoded by the lossless encoding unit 106-0 are decoded. At this time, various kinds of pieces of information excluding the differential image information included in the bit streams such as header information are also decoded.

In step S1503, the inverse quantizing unit 203-0 inversely quantizes the quantized coefficients obtained by the process of step S1503.

In step S1504, the inverse orthogonal transforming unit 204-0 performs inverse orthogonal transform as necessary on the coefficients inversely quantized by the process of step S1503.

In step S1505, the lossless decoding unit 202-0 determines whether or not the prediction mode applied at the time of encoding is the inter prediction. When the prediction mode applied at the time of encoding is determined to be the inter prediction, the process proceeds to step S1506.

In step S1506, the motion compensating unit 211-0 performs the V0 motion compensation process, and generates a prediction image. When the process of step S1506 ends, the process proceeds to step S1508. Further, when the prediction mode applied at the time of encoding is determined to be the intra prediction in step S1505, the process proceeds to step S1507. In step S1507, the intra predicting unit 210-0 performs the intra prediction process, and generates a prediction image. When the process of step S1507 ends, the process proceeds to step S1508.

In step S1508, the operation unit 205-0 adds the prediction image generated by the process of step S1506 or the process of step S1507 to the differential image information obtained through the inverse orthogonal transform performed by the process of step S1504. Thus, the reconstructed image is generated.

In step S1509, the V0 motion vector compressing unit 221-0 performs $1/16$ compressed on the non-compressed V0 motion vector generated by the process of step S1506, similarly to the V0 motion vector compressing unit 121-0. In step S1510, the V0 motion vector memory 222-0 stores the $1/16$-compressed V0 motion vector generated by the process of step S1509, similarly to the V0 motion vector memory 122-0.

The V0 image decoding device 200-0 performs the process of step S1501 to step S1510 on each block in a current LCU serving as a processing target. In step S1511, the V0 image decoding device 200-0 determines whether or not all LCUs have been processed. When it is determined that there is a non-processed LCU, the process returns to step S1501, and the subsequent process is repeated. The process of step S1501 to step S1510 is performed on each LCU of an image of a view 0 of a current picture, and when all LCUs are determined to have been processed in step S1511, the process proceeds to step S1512.

In step S1512, the loop filter 206-0 appropriately performs the loop filter process such as the deblock filter process or the adaptive loop filter process on the reconstructed image obtained in step S1508.

In step S1513, the screen sorting buffer 207-0 performs sorting on the decoded image generated by the filter process performed in step S1512. In other words, the frames sorted in an order for encoding by the screen sorting buffer 102-0 are sorted in an original display order.

In step S1514, the D/A converting unit 208-0 performs D/A conversion on the decoded image of the view 0 in which the order of frames is sorted. The decoded image is output to and displayed on a display (not illustrated).

In step S1515, the decoded picture buffer 209-0 stores the decoded image obtained by the filter process in step S1512. The decoded image is used as a reference image in the inter prediction process.

Figure 19:
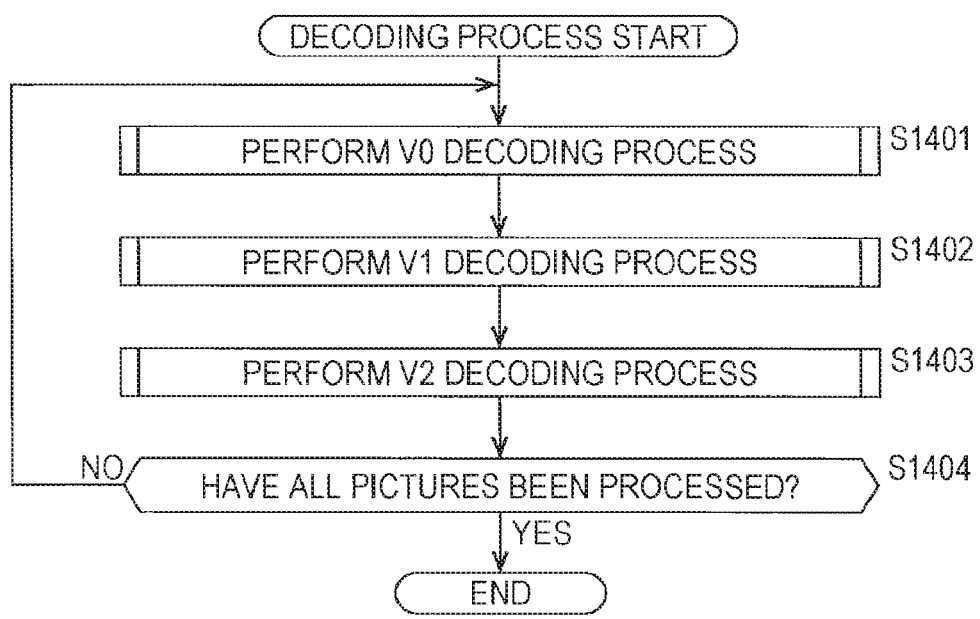
FIG. 19 is a flowchart for describing an exemplary flow of a decoding process.

When the process of step S1515 ends, the decoding process ends, and the process returns to FIG. 19.

<V0 Motion Compensation Process Flow>

Next, an exemplary flow of the V0 motion compensation process performed in step S1506 of FIG. 20 will be described with reference to a flowchart of FIG. 21.

When the V0 motion compensation process starts, in step S1531, the motion compensating unit 211-0 acquires differential motion information (a differential motion vector). In step S1532, the motion compensating unit 211-0 determines whether or not a mode of a prediction motion vector is spatial prediction based on the inter prediction information. When a mode of a prediction motion vector is determined to be spatial prediction, the process proceeds to step S1533.

In step S1533, the motion compensating unit 211-0 generates a prediction motion vector using a non-compressed V0 motion vector (a motion vector of a block spatially neighboring a current block) in a picture. When the prediction motion vector is generated, the process proceeds to step S1535.

However, when a mode of a prediction motion vector is determined to be not spatial prediction in step S1532, the process proceeds to step S1534.

In step S1534, the motion compensating unit 211-0 generates a prediction motion vector using a $1/16$-compressed V0 motion vector (a motion vector of a block spatially neighboring a current block) in another picture. When the prediction motion vector is generated, the process proceeds to step S1535.

In step S1535, the motion compensating unit 211-0 reconstructs a motion vector using the prediction motion vector generated by the process of step S1533 or the process of step S1534.

In step S1536, the motion compensating unit 211-0 performs motion compensation, and generates a prediction image. The motion compensating unit 211-0 stores the reconstructed motion vector. When the process of step S1536 ends, the V0 motion compensation process ends, and the process returns to FIG. 20.

<V1 Decoding Process Flow>

Figure 22:
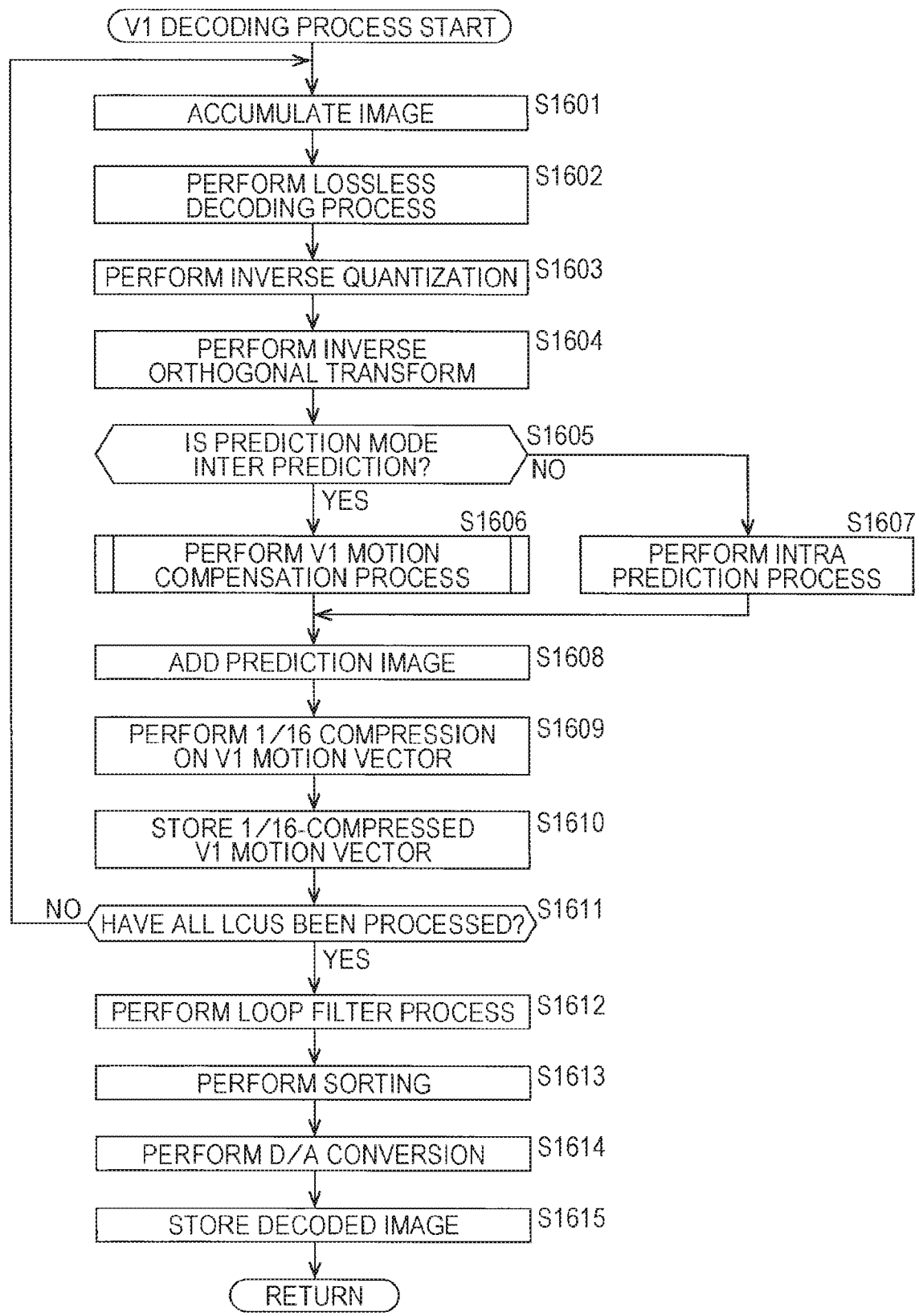
FIG. 22 is a flowchart for describing an exemplary flow of a V1 decoding process.

Next, an exemplary flow of the V1 decoding process of decoding encoded data of the view 1 which is performed in step S1402 of FIG. 19 will be described with reference to a flowchart of FIG. 22.

A difference between the process for the view 0 and the process for the view 1 mainly lies in the motion compensation process. Thus, as illustrated in FIG. 22, the V1 image decoding device 200-1 performs the V1 decoding process basically in the same manner as the decoding process (the V0 decoding process of FIG. 20) for the view 0. In other words, the process of step S1601 to step S1615 of FIG. 22 is performed basically in the same manner as the process of step S1501 to step S1515 of FIG. 20. Thus, the description of FIG. 22 may proceed such that the respective components of the V0 image decoding device 200-0 described with reference to FIG. 20 are replaced with the respective components of the V1 image decoding device 200-1, and the process for the view 0 illustrated in FIG. 20 is replaced with the process for the view 1, and thus a description thereof is omitted.

<V1 Motion Compensation Process Flow>

Next, an exemplary flow of the V1 motion compensation process performed in step S1606 of FIG. 22 will be described with reference to a flowchart of FIG. 23.

When the V1 motion compensation process starts, in step S1631, the motion compensating unit 211-1 acquires the differential motion information (the differential motion vector). In step S1632, the motion compensating unit 211-1 determines whether or not a mode of a prediction motion vector is spatial prediction based on the inter prediction information. When a mode of a prediction motion vector is determined to be spatial prediction, the process proceeds to step S1633.

In step S1633, the motion compensating unit 211-1 generates a prediction motion vector using a non-compressed V1 motion vector (a motion vector of a block spatially neighboring a current block) in a picture. When the prediction motion vector is generated, the process proceeds to step S1635.

However, when a mode of a prediction motion vector is determined to be not spatial prediction in step S1632, the process proceeds to step S1634.

Since the view 1 is not an initially processed view, a mode of a prediction motion vector may be an inter-view prediction (IVMP).

In step S1634, the motion compensating unit 211-1 determines whether or not a mode of a prediction motion vector is temporal prediction based on the inter prediction information. When a mode of a prediction motion vector is determined to be temporal prediction, the process proceeds to step S1635.

In step S1635, the motion compensating unit 211-1 generates a prediction motion vector using a 1/16-compressed V1 motion vector (a motion vector of a block spatially neighboring a current block) in another picture. When the prediction motion vector is generated, the process proceeds to step S1637.

However, when a mode of a prediction motion vector is determined to be not temporal prediction in step S1634, the process proceeds to step S1636.

In step S1636, the motion compensating unit 211-1 generates a prediction motion vector using the 1/16-compressed V0 motion vector (a motion vector of a colocated block of an image of a view 0). When the prediction motion vector is generated, the process proceeds to step S1637.

In step S1637, the motion compensating unit 211-1 reconstructs a motion vector using the prediction motion vector generated in step S1633, step S1635, or step S1636.

In step S1638, the motion compensating unit 211-1 performs motion compensation, and generates a prediction image. Further, the motion compensating unit 211-1 stores the motion vector reconstructed in step S1637. When the process of step S1638 ends, the V1 motion compensation process ends, and the process returns to FIG. 22.

<V2 Decoding Process Flow>

Next, an exemplary flow of the V2 decoding process of decoding encoded data of the view 2 which is performed in step S1403 of FIG. 19 will be described with reference to a flowchart of FIG. 24.

A difference between the process for the view 1 and the process for the view 2 mainly lies in the motion compensation process. Thus, as illustrated in FIG. 24, the V2 image decoding device 200-2 performs the V2 decoding process basically in the same manner as the decoding process (the V1 decoding process of FIG. 22) for the view 1. In other words, the process of step S1701 to step S1715 of FIG. 24 is performed basically in the same manner as the process of step S1601 to step S1615 of FIG. 22. Thus, the description of FIG. 24 may proceed such that the respective components of the V1 image decoding device 200-1 described with reference to FIG. 22 are replaced with the respective components of the V2 image decoding device 200-2, and the process for the view 1 illustrated in FIG. 22 is replaced with the process for the view 2, and thus a description thereof is omitted.

<V2 Motion Compensation Process Flow>

Next, an exemplary flow of the V2 motion compensation process performed in step S1706 of FIG. 24 will be described with reference to a flowchart of FIG. 25.

Figure 23:
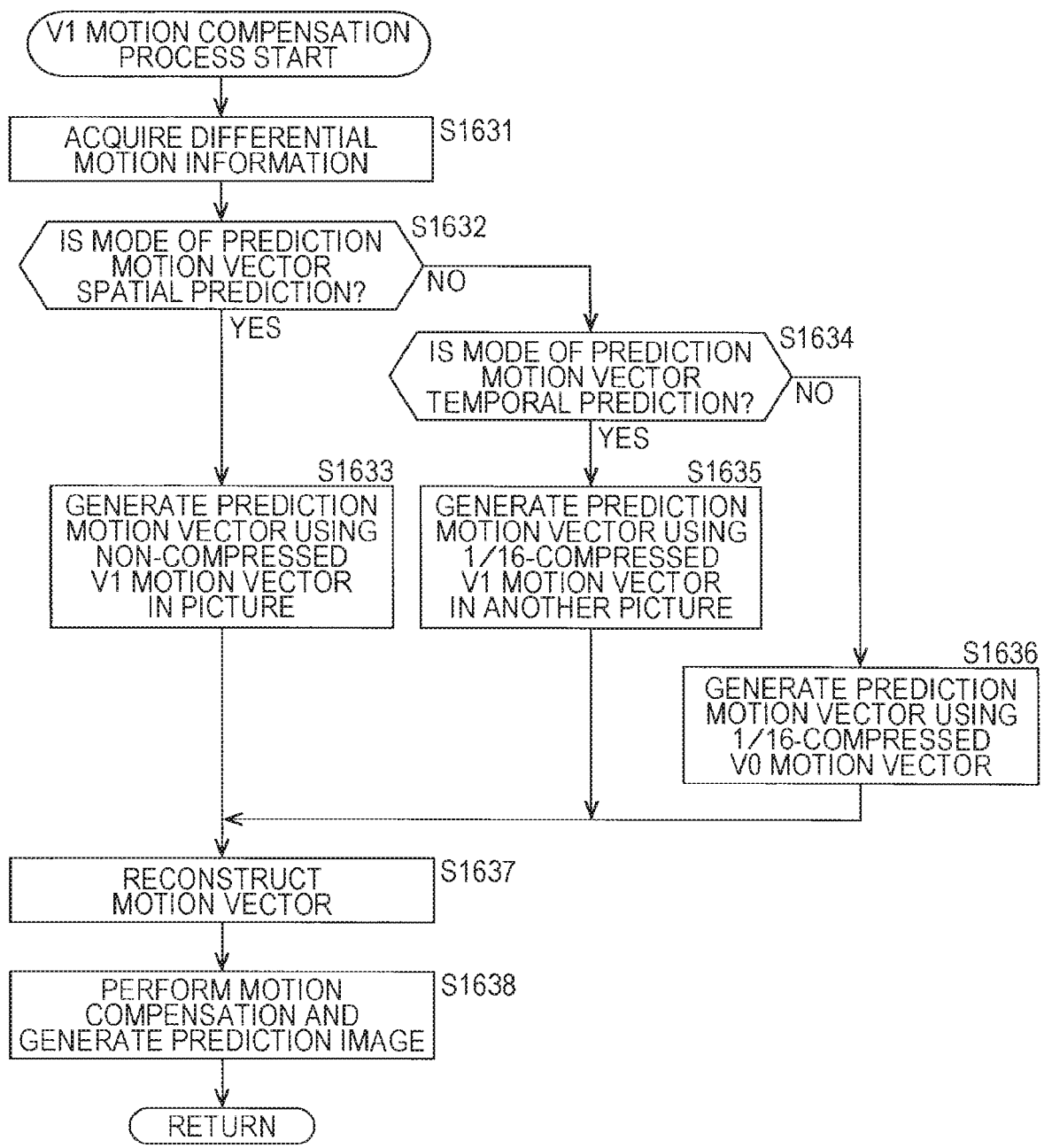
FIG. 23 is a flowchart for describing an exemplary flow of a V1 motion compensation process.
Figure 25:
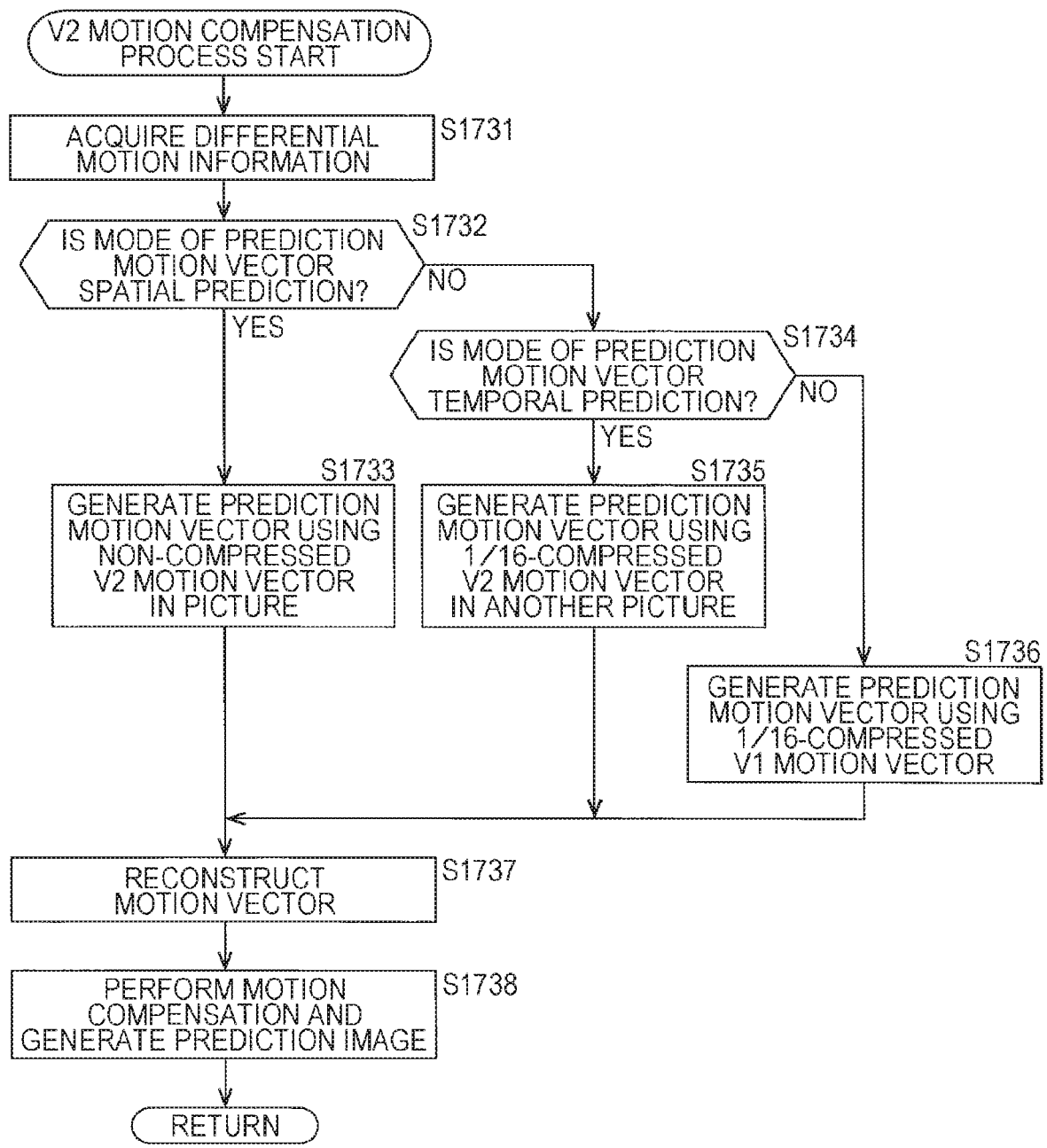
FIG. 25 is a flowchart for describing an exemplary flow of a V2 motion compensation process.

As illustrated in FIG. 25, the V2 motion compensation process is performed basically in the same manner as the V1 motion compensation process (FIG. 23). In other words, the process of step S1731 to step S1738 of FIG. 25 is performed basically in the same manner as the process of step S1631 to step S1638 of FIG. 23. Here, the V1 motion compensation process is performed by the motion compensating unit 211-1, whereas the V2 motion compensation process is performed by the motion compensating unit 211-2.

Further, the processing target of the V2 motion compensation process is an image of the view 2 other than an image of the view 1. Thus, in step S1733, the motion compensating unit 211-2 generates a prediction motion vector using a non-compressed V2 motion vector (a motion vector of a block spatially neighboring a current block) in a picture.

Further, in step S1735, the motion compensating unit 211-2 generates a prediction motion vector using a 1/16-compressed V2 motion vector (a motion vector of a block temporally neighboring a current block) in another picture.

Further, in step S1736, the motion compensating unit 211-2 generates a prediction motion vector using a 1/16-compressed V1 motion vector (a motion vector of a block neighboring a current block in terms of a view).

The processes of step S1731, step S1732, step S1734, step S1737, and step S1738 are performed in the same manner as in the processes of step S1631, step S1632, step S1634, step S1637, and step S1638 of FIG. 23.

Figure 24:
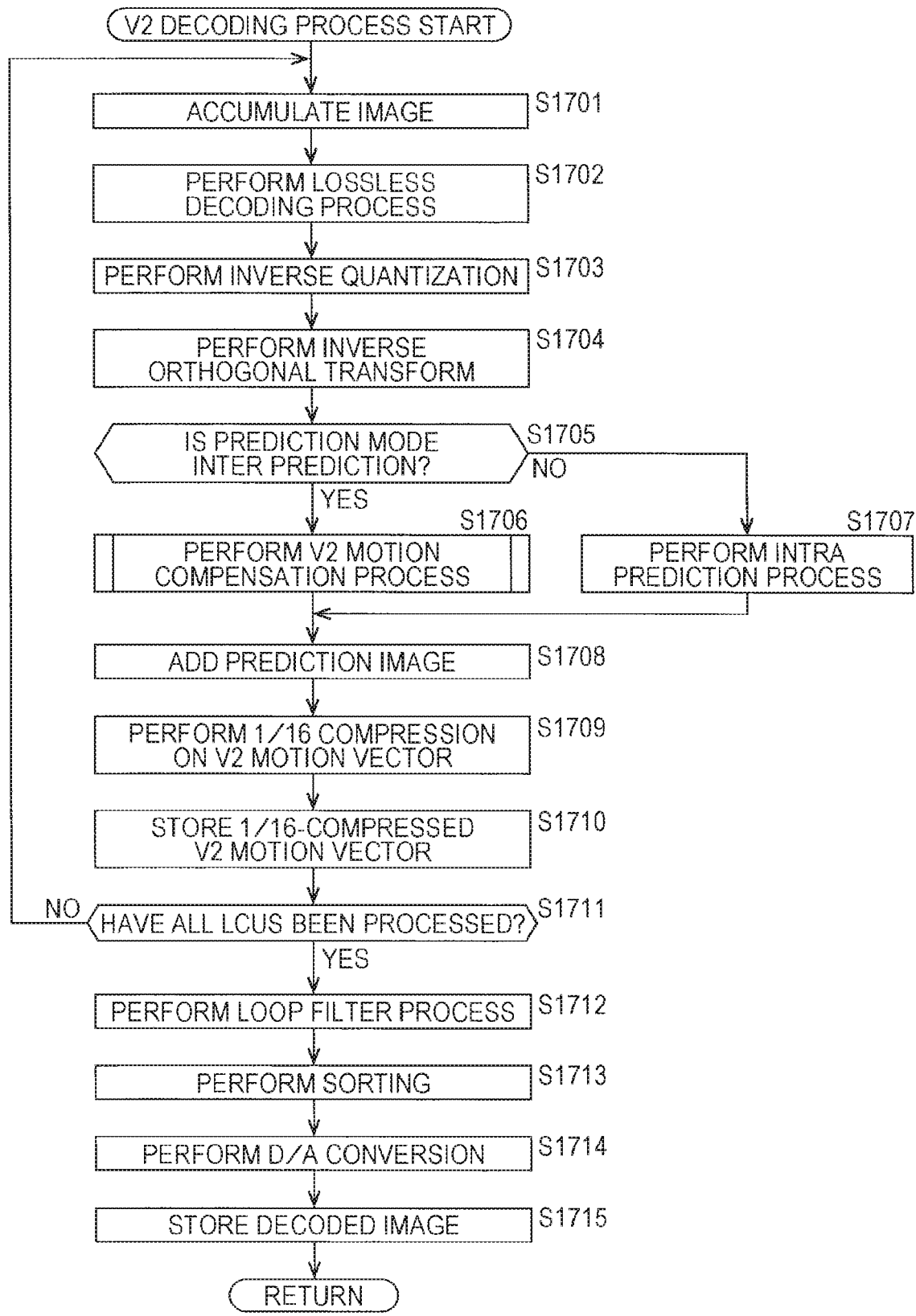
FIG. 24 is a flowchart for describing an exemplary flow of a V2 decoding process.

When the process of step S1738 ends, the V2 motion compensation process ends, and the process returns to FIG. 24.

As the process is performed as described above, the image decoding device 200 can reduce the memory capacity necessary for the motion vectors for the IVMP and suppress an increase in a storage capacity necessary for encoding and decoding.

The above description has been made in connection with the example in which the accuracy of a motion vector is a maximum of 4×4 accuracy in the non-compressed state and the 16×16 accuracy after compressed, but this is an example, and the accuracy of a motion vector is arbitrary. A compression rate of a motion vector is arbitrary as well. In other words, the accuracy of a spatial prediction motion vector candidate, a temporal prediction motion vector candidate, an IVMP prediction motion vector candidate, and a prediction motion vector of each view is arbitrary as well. All views may be the same as or different from one another in the accuracy or the compression rate.

<2. Second Embodiment>
<Compression of Motion Vector for IVMP>

Figure 26:
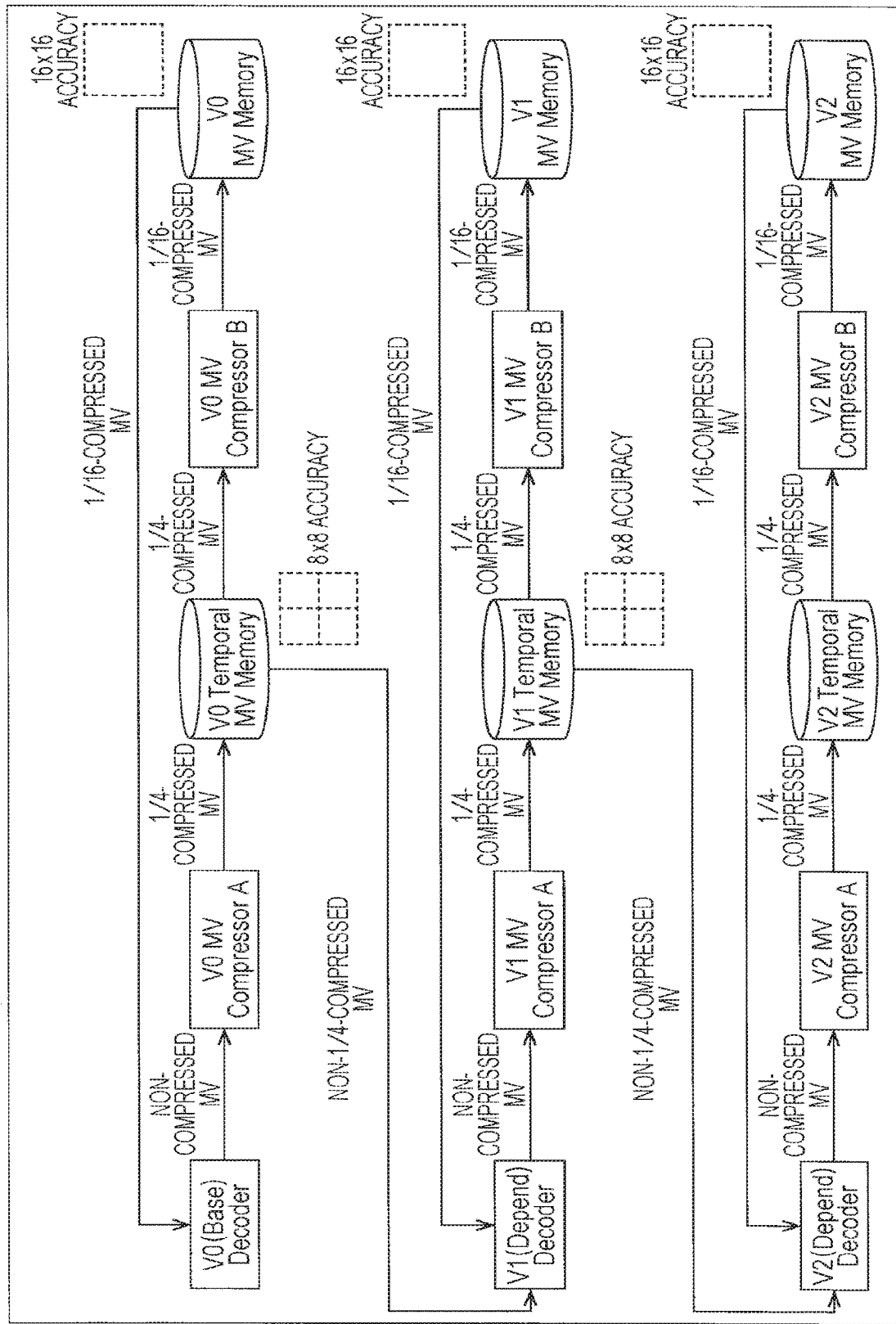
FIG. 26 is a diagram for describing an example of a motion vector reference according to the present technology.

In the motion vector compression, a motion vector for the IVMP and a motion vector for the TMVP may be compressed (for example, thinned out) as illustrated in FIG. 26. In other words, the accuracy of a motion vector for the IVMP may be different from the accuracy of a motion vector for the TMVP.

More specifically, for example, a motion vector of a 4×4 accuracy is compressed (for example, thinned out) with an 8×8 accuracy for the IVMP until a next view process (encoding and decoding) starts, and is compressed (for example, thinned out) with a 16×16 accuracy for the TMVP until a next picture process (encoding and decoding) starts. In other words, a motion vector of an 8×8 accuracy is referred to for the IVMP, and a motion vector of a 16×16 accuracy is referred to for the TMVP. Thus, it is possible to suppress an increase in the capacity of a necessary memory compared to the method of the related art. Further, it is possible to increase the accuracy of the motion vector for the IVMP to be larger than in the method described in the first embodiment.

For example, as illustrated in FIG. 26, a motion vector for the IVMP is compressed (for example, thinned out) with the 8×8 accuracy through a motion vector compressing unit ((V0 to V2) MV compressors A) and stored in a temporal motion vector memory ((V0 to V2) temporal MV memories). In the IVMP, the motion vector of the temporal motion vector memory is referred to. Through this compression (for example, thinning out), it is possible to suppress an increase in the capacity of the temporal motion vector memory.

Further, as a motion vector for the TMVP, the motion vector of the temporal motion vector memory is further compressed (for example, thinned out) with a 16×16 accuracy through a motion vector compressing unit ((V0 to V2) MV compressors B) and stored in a motion vector memory ((V0 to V2) MV memories). In the TMVP, the motion vector of the motion vector memory is referred to. Thus, it is possible to reduce the compression rate (for example, the thinning rate of the thinning process) of the compresses process to ¼ in both cases. In other words, the same compression process (for example, the thinning process) may be performed only twice, and it is easy to implement.

The compression method will be more specifically described below. In the following, the accuracy of a motion vector is assumed to be a maximum of 4×4 accuracy in the non-compressed state. Further, a non-compressed motion vector is assumed to be compressed (¼ compressed) with an 8×8 accuracy for the IVMP. Furthermore, a ¼-compressed motion vector (a motion vector of an 8×8 accuracy) is assumed to be compressed (¼ compressed) with a 16×16 accuracy for the TMVP.

<Image Coding Device>

Figure 27:
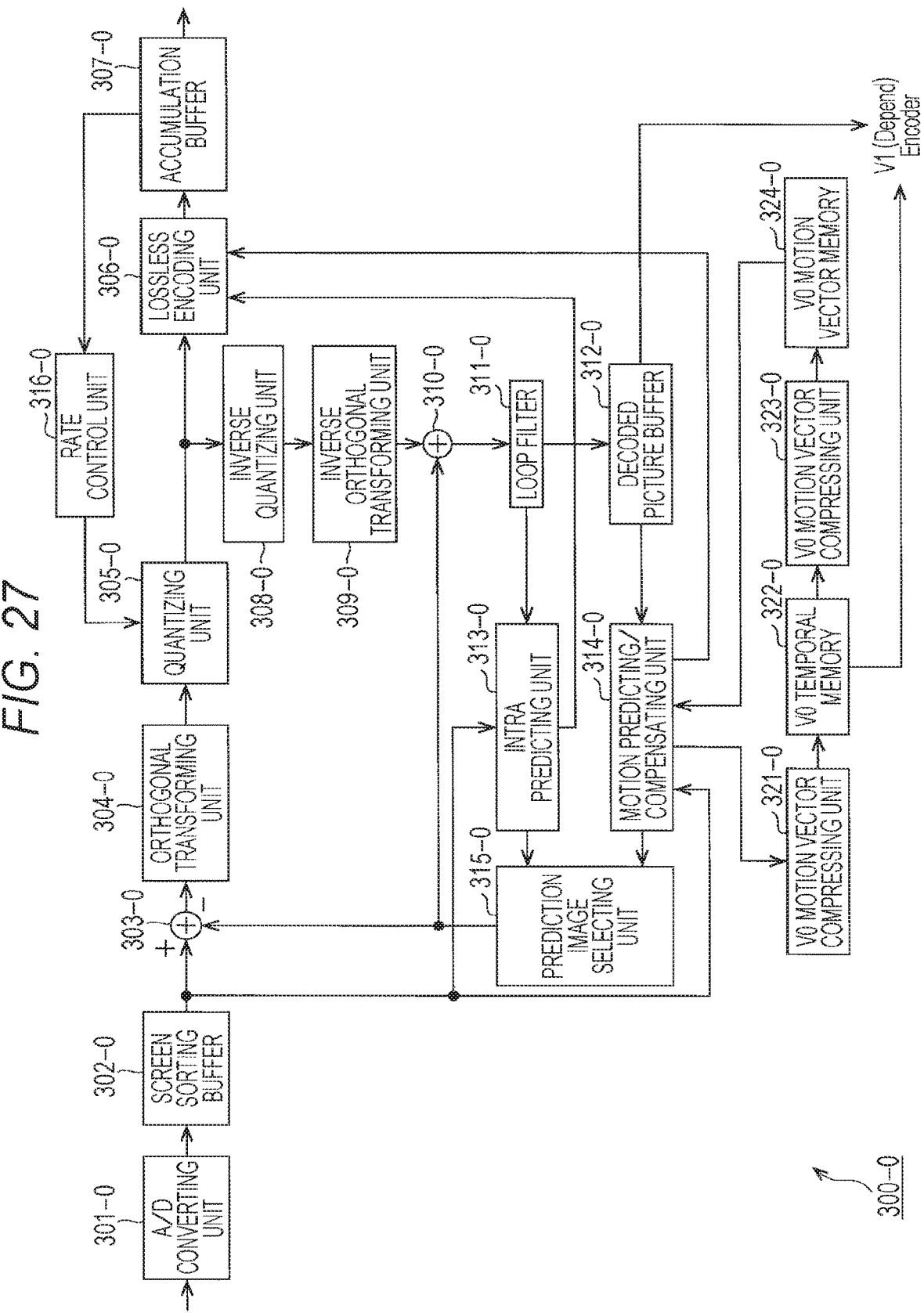
FIG. 27 is a block diagram illustrating an exemplary main configuration of a V0 image coding device.
Figure 28:
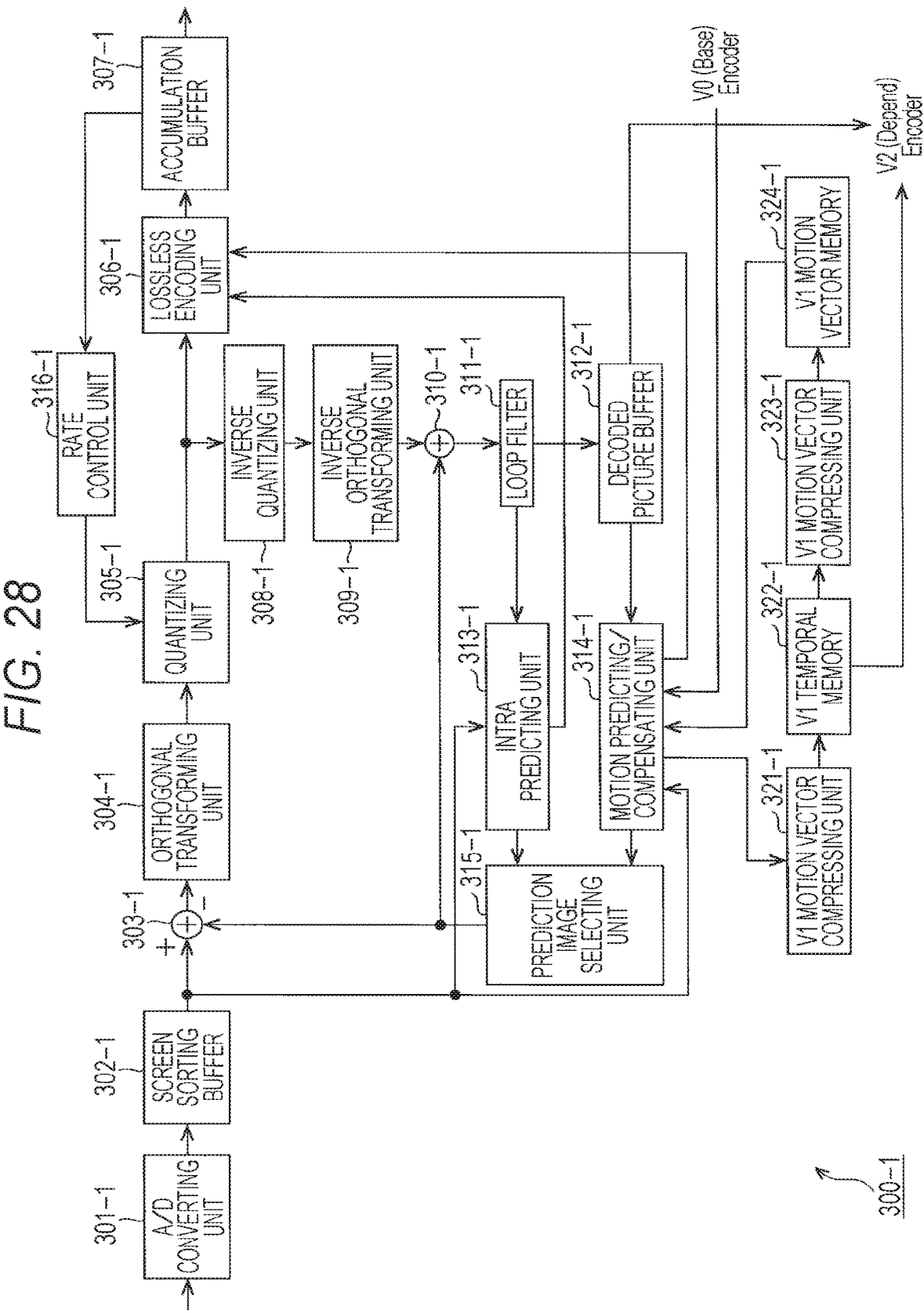
FIG. 28 is a block diagram illustrating an exemplary main configuration of a V1 image coding device.
Figure 29:
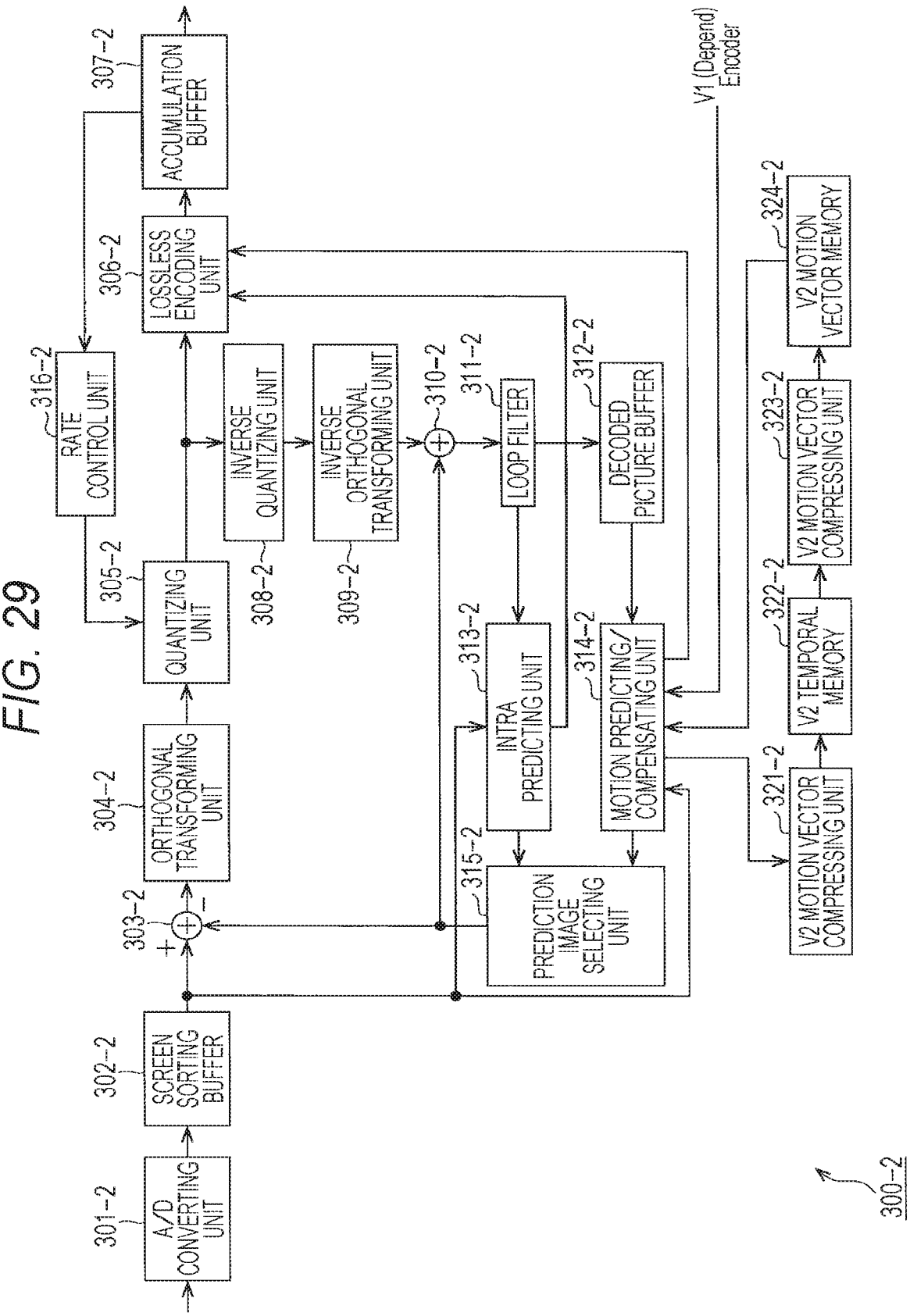
FIG. 29 is a block diagram illustrating an exemplary main configuration of a V2 image coding device.

FIG. 27 is a block diagram illustrating an exemplary main configuration of the V0 image coding device. FIG. 28 is a block diagram illustrating an exemplary main configuration of the V1 image coding device. FIG. 29 is a block diagram illustrating an exemplary main configuration of the V2 image coding device.

An image coding device 300 (not illustrated) encodes a moving image including a plurality of layers such as the multi-view image illustrated in FIG. 2. The image coding device 300 includes a V0 image coding device 300-0 of FIG. 27, a V1 image coding device 300-1 of FIG. 28, and a V2 image coding device 300-3 of FIG. 29 in order to encode views of a multi-view image. The V0 image coding device 300-0 encodes an image of a view 0. The V1 image coding device 300-1 encodes an image of a view 1. The V2 image coding device 300-2 encodes t an image of a view 2.

The V0 image coding device 300-0 includes an A/D converting unit 301-0, a screen sorting buffer 302-0, an operation unit 303-0, an orthogonal transforming unit 304-0, a quantizing unit 305-0, a lossless encoding unit 306-0, an accumulation buffer 307-0, an inverse quantizing unit 308-0, and an inverse orthogonal transforming unit 309-0 as illustrated in FIG. 27. The V0 image coding device 300-0 further includes an operation unit 310-0, a loop filter 311-0, a decoded picture buffer 312-0, an intrapredicting unit 313-0, a motion predicting/compensating unit 314-0, a prediction image selecting unit 315-0, and a rate control unit 316-0.

The V1 image coding device 300-1 includes an A/D converting unit 301-1, a screen sorting buffer 302-1, an operation unit 303-1, an orthogonal transforming unit 304-1, a quantizing unit 305-1, a lossless encoding unit 306-1, an accumulation buffer 307-1, an inverse quantizing unit 308-1, and an inverse orthogonal transforming unit 309-1 as illustrated in FIG. 28. The V1 image coding device 300-1 further includes an operation unit 310-1, a loop filter 311-1, a decoded picture buffer 312-1, an intra predicting unit 313-1, a motion predicting/compensating unit 314-1, a prediction image selecting unit 315-1, and a rate control unit 316-1.

The V2 image coding device 300-2 includes an A/D converting unit 301-2, a screen sorting buffer 302-2, an operation unit 303-2, an orthogonal transforming unit 304-2, a quantizing unit 305-2, a lossless encoding unit 306-2, an accumulation buffer 307-2, an inverse quantizing unit 308-2, and an inverse orthogonal transforming unit 309-2 as illustrated in FIG. 29. The V2 image coding device 300-2 further includes an operation unit 310-2, a loop filter 311-2, a decoded picture buffer 312-2, an intra predicting unit 313-2, a motion predicting/compensating unit 314-2, a prediction image selecting unit 315-2, and a rate control unit 316-2.

Hereinafter, the A/D converting units 301-0 to 301-2 need not be distinguished from one another, they are referred to simply as an "A/D converting unit 301." Further, when the screen sorting buffers 302-0 to 302-2 need not be distinguished from one another, they are referred to simply as a "screen sorting buffer 302." Further, when the operation units 303-0 to 303-2 need not be distinguished from one another, they are referred to simply as an "operation unit 303." Further, when the orthogonal transforming units 304-0 to 304-2 need not be distinguished from one another, they are referred to simply as an "orthogonal transforming unit 304." Further, when the quantizing units 305-0 to 305-2 need not be distinguished from one another, they are referred to simply as a "quantizing unit 305." Further, when the lossless encoding units 306-0 to 306-2 need not be distinguished from one another, they are referred to simply as a "lossless encoding unit 306." Further, when the accumulation buffers 307-0 to 307-2 need not be distinguished from one another, they are referred to simply as an "accumulation buffer 307." Further, when the inverse quantizing units 308-0 to 308-2 need not be distinguished from one another, they are referred to simply as an "inverse quantizing unit 308." Further, when the inverse orthogonal transforming units 309-0 to 309-2 need not be distinguished from one another, they are referred to simply as an "inverse orthogonal transforming unit 309."

Further, when the operation units 310-0 to 310-2 need not be distinguished from one another, they are referred to simply as an "operation unit 310." Further, when the loop filters 311-0 to 311-2 need not be distinguished from one another, they are referred to simply as a "loop filter 311." Further, when the decoded picture buffers 312-0 to 312-2 need not be distinguished from one another, they are referred to simply as a "decoded picture buffer 312." Further, when the intra predicting units 313-0 to 313-2 need not be distinguished from one another, they are referred to simply as an "intra predicting unit 313." Further, when the motion predicting/compensating units 314-0 to 314-2 need not be distinguished from one another, they are referred to simply as a "motion predicting/compensating unit 314." Further, when the prediction image selecting units 315-0 to 315-2 need not be distinguished from one another, they are referred to simply as a "prediction image selecting unit 315." Further, when the rate control units 316-0 to 316-2 need not be distinguished from one another, they are referred to simply as a "rate control unit 316."

The A/D converting unit 301 corresponds to the A/D converting unit 101, and performs basically the same process as the A/D converting unit 101. The screen sorting buffer 302 corresponds to the screen sorting buffer 102, and performs basically the same process as the screen sorting buffer 102. The operation unit 303 corresponds to the operation unit 103, and performs basically the same process as the operation unit 103. The orthogonal transforming unit 304 corresponds to the orthogonal transforming unit 104, and performs basically the same process as the orthogonal transforming unit 104. The quantizing unit 305 corresponds to the quantizing unit 105, and performs basically the same process as the quantizing unit 105. The lossless encoding unit 306 corresponds to the lossless encoding unit 106, and performs basically the same process as the lossless encoding unit 106. The accumulation buffer 307 corresponds to the accumulation buffer 107, and performs basically the same process as the accumulation buffer 107.

The inverse quantizing unit 308 corresponds to the inverse quantizing unit 108, and performs basically the same process as the inverse quantizing unit 108. The inverse orthogonal transforming unit 309 corresponds to the inverse orthogonal transforming unit 109, and performs basically the same process as the inverse orthogonal transforming unit 109. The operation unit 310 corresponds to the operation unit 110, and performs basically the same process as the operation unit 110. The loop filter 311 corresponds to the loop filter 111, and performs basically the same process as the loop filter 111. The decoded picture buffer 312 corresponds to the decoded picture buffer 112, and performs basically the same process as the decoded picture buffer 112.

The intra predicting unit 313 corresponds to the intra predicting unit 113, and performs basically the same process as the intra predicting unit 113. The motion predicting/compensating unit 314 corresponds to the motion predicting/compensating unit 114, and performs basically the same process as the motion predicting/compensating unit 114. The prediction image selecting unit 315 corresponds to the prediction image selecting unit 115, and performs basically the same process as the prediction image selecting unit 115.

The V0 image coding device 300-0 further includes a V0 motion vector compressing unit 321-0, a V0 temporal memory 322-0, a V0 motion vector compressing unit 323-0, a V0 motion vector compressing unit 323-0, and a V0 motion vector memory 324-0.

The V1 image coding device 300-1 further includes a V1 motion vector compressing unit 321-1, a V1 temporal memory 322-1, a V1 motion vector compressing unit 323-1, a V1 motion vector compressing unit 323-1, and a V1 motion vector memory 324-1.

The V2 image coding device 300-2 further includes a V2 motion vector compressing unit 321-2, a V2 temporal memory 322-2, a V2 motion vector compressing unit 323-2, a V2 motion vector compressing unit 323-2, and a V2 motion vector memory 324-2.

The motion predicting/compensating unit 314-0 supplies a non-compressed V0 motion vector (a maximum of 4×4 accuracy) of a current block generated by motion prediction to the V0 motion vector compressing unit 321-0. Further, the motion predicting/compensating unit 314-0 acquires a ¹⁄₁₆-compressed V0 motion vector stored in the V0 motion vector memory 324-0 as a motion vector of a block temporally neighboring a current block.

The motion predicting/compensating unit 314-1 supplies a non-compressed V1 motion vector (a maximum of 4×4 accuracy) of a current block generated by motion prediction to the V1 motion vector compressing unit 321-1. Further, the motion predicting/compensating unit 314-1 acquires a ¹⁄₁₆-compressed V1 motion vector stored in the V1 motion vector memory 324-1 as a motion vector of a block temporally neighboring a current block. Furthermore, the motion predicting/compensating unit 314-1 acquires the ¹⁄₁₆-compressed V0 motion vector stored in the V0 motion vector memory 324-0 as a motion vector of a block neighboring a current block in terms of a view.

The motion predicting/compensating unit 314-2 supplies a non-compressed V2 motion vector (a maximum of 4×4 accuracy) of a current block generated by motion prediction to the V2 motion vector compressing unit 321-2. Further, the motion predicting/compensating unit 314-2 acquires a ¹⁄₁₆-compressed V2 motion vector stored in the V2 motion vector memory 324-2 as a motion vector of a block temporally neighboring a current block. Furthermore, the motion predicting/compensating unit 314-2 acquires the ¹⁄₁₆-compressed V1 motion vector stored in the V1 motion vector memory 324-1 as a motion vector of a block neighboring a current block in terms of a view.

The V0 motion vector compressing unit 321-0 performs compression (which is also referred to as "¼ compressed") on the non-compressed V0 motion vector supplied from the motion predicting/compensating unit 314-0 with the 8×8 accuracy, and supplies a compressed motion vector (which is also referred to as a "¼-compressed V0 motion vector") to the V0 temporal memory 322-0. In other words, the V0 motion vector compressing unit 321-0 is different in the compression rate but performs the same compression as the V0 motion vector compressing unit 121-0. Thus, a method of compressing a motion vector is arbitrary, similarly to the V0 motion vector compressing unit 121-0.

The V0 temporal memory 322-0 stores the supplied ¼-compressed V0 motion vector. The V0 temporal memory 322-0 appropriately supplies the stored ¼-compressed V0 motion vector to the motion predicting/compensating unit 314-1 as a motion vector of a block neighboring in terms of a view. Further, the V0 temporal memory 322-0 appropriately supplies the stored ¼-compressed V0 motion vector to the V0 motion vector compressing unit 323-0.

The V0 motion vector compressing unit 323-0 reads the ¼-compressed V0 motion vector from the V0 temporal memory 322-0, performs compression (which is also referred to as "¼ compression") with a 16×16 accuracy, and supplies a compressed motion vector (that is, a $1/16$-compressed V0 motion vector) to the V0 motion vector memory 324-0. The V0 motion vector compressing unit 323-0 performs the same process as in the V0 motion vector compressing unit 321-0. In other words, the same ¼ compressed is performed twice. Thus, the same $1/16$-compressed V0 motion vector as one generated by the V0 motion vector compressing unit 121-0 is generated.

The V0 motion vector compressing unit 321-0 and the V0 motion vector compressing unit 323-0 may differ in the compression method from each other. Further, the V0 motion vector compressing unit 323-0 may perform $1/16$ compressed on the non-compressed V0 motion vector generated by the motion predicting/compensating unit 314-0, similarly to the V0 motion vector compressing unit 121-0.

The V0 motion vector memory 324-0 stores the supplied $1/16$-compressed V0 motion vector. The V0 motion vector memory 324-0 appropriately supplies the stored $1/16$-compressed V0 motion vector to the motion predicting/compensating unit 314-0 as a motion vector of a temporally neighboring block.

The V1 motion vector compressing unit 321-1 is a processing unit similar to the V0 motion vector compressing unit 321-0. The V1 motion vector compressing unit 321-1 performs ¼ compressed on the non-compressed V1 motion vector supplied from the motion predicting/compensating unit 314-1, and supplies a compressed motion vector (which is also referred to as a "¼-compressed V1 motion vector") to the V1 temporal memory 322-1.

The V1 temporal memory 322-1 is a processing unit similar to the V0 temporal memory 322-0. The V1 temporal memory 322-1 stores the supplied ¼-compressed V1 motion vector. The V1 temporal memory 322-1 appropriately supplies the stored ¼-compressed V1 motion vector to the motion predicting/compensating unit 314-2 as a motion vector of a block neighboring in terms of a view. Further, the V1 temporal memory 322-1 appropriately supplies the stored ¼-compressed V1 motion vector to the V1 motion vector compressing unit 323-1.

The V1 motion vector compressing unit 323-1 is a processing unit similar to the V0 motion vector compressing unit 323-0. The V1 motion vector compressing unit 323-1 reads the ¼-compressed V1 motion vector from the V1 temporal memory 322-1, performs ¼ compressed, and supplies a compressed motion vector (that is, a $1/16$-compressed V1 motion vector) to the V1 motion vector memory 324-1.

The V1 motion vector memory 324-1 stores the supplied $1/16$-compressed V1 motion vector. The V1 motion vector memory 324-1 appropriately supplies the stored $1/16$-compressed V1 motion vector to the motion predicting/compensating unit 314-1 as a motion vector of a temporally neighboring block.

The V2 motion vector compressing unit 321-2 is a processing unit similar to the V0 motion vector compressing unit 321-0. The V2 motion vector compressing unit 321-2 performs ¼ compressed the non-compressed V2 motion vector supplied from the motion predicting/compensating unit 314-2, and supplies a compressed motion vector (which is also referred to as a "¼-compressed V2 motion vector") to the V2 temporal memory 322-2.

The V2 temporal memory 322-2 is a processing unit similar to the V0 temporal memory 322-0. The V2 temporal memory 322-2 stores the supplied ¼-compressed V2 motion vector. The V2 temporal memory 322-2 appropriately supplies the stored ¼-compressed V2 motion vector to the V2 motion vector compressing unit 323-2.

The V2 motion vector compressing unit 323-2 is a processing unit similar to the V0 motion vector compressing unit 323-0. The V2 motion vector compressing unit 323-2 reads the ¼-compressed V2 motion vector from the V2 temporal memory 322-2, performs ¼ compressed, and supplies a compressed motion vector (that is, the $1/16$-compressed V2 motion vector) to the V2 motion vector memory 324-2.

The V2 motion vector memory 324-2 stores the supplied $1/16$-compressed V2 motion vector. The V2 motion vector memory 324-2 appropriately supplies the stored $1/16$-compressed V2 motion vector to the motion predicting/compensating unit 314-2 as a motion vector of a temporally neighboring block.

Since the V2 image coding device 300-2 encodes an image of the view 2 that is finally processed, a motion vector obtained in the motion predicting/compensating unit 314-2 is not used for any other view. Thus, instead of the V2 motion vector compressing unit 321-2 to the V2 motion vector memory 324-2, the V2 motion vector compressing unit 121-2 and the V2 motion vector memory 122-2 may be applied as in the V2 image coding device 100-2.

As described above, the V0 motion vector compressing unit 321-0, the V1 motion vector compressing unit 321-1, and the V2 motion vector compressing unit 321-2 can reduce (that is, compress) an information amount of motion vectors by reducing the number of motion vectors. Thus, it is possible to reduce the capacities of the V0 temporal memory 322-0, the V1 temporal memory 322-1, and the V2 temporal memory 322-2.

Further, at this time, by suppressing the compression rate so that the accuracy of the motion vector for the IVMP is higher than the accuracy of the motion vector for the TMVP, it is possible to improve the prediction accuracy of the IVMP to be higher than when the accuracy of the motion vector for the IVMP is equal to the accuracy of the motion vector for the TMVP.

Accordingly, it is possible to implement a reduction in a manufacturing or developing cost, device downsizing, a reduction in power consumption, and the like for the image coding device 300.

<V0 Coding Process Flow>

Next, a flow of processing performed by the image coding device 100 will be described. The flow of the coding process performed by the image coding device 300 is the same as in the first embodiment (FIG. 9), and thus a description thereof is omitted.

Figure 30:
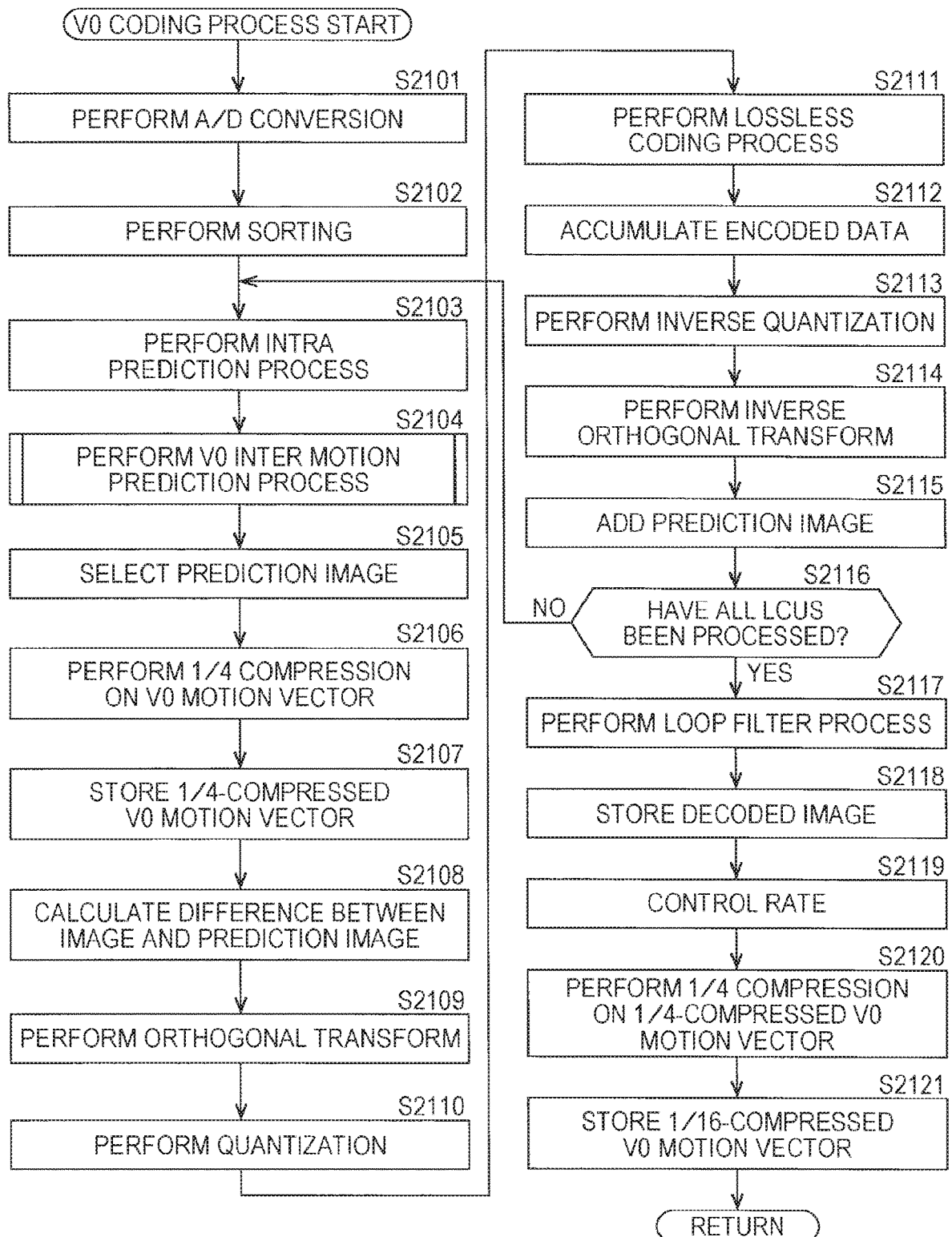
FIG. 30 is a flowchart for describing an exemplary flow of a V0 coding process.

Next, an exemplary flow of the V0 coding process of encoding the view 0 which is performed in step S1001 of FIG. 9 will be described with reference to a flowchart of FIG. 30.

Figure 10:
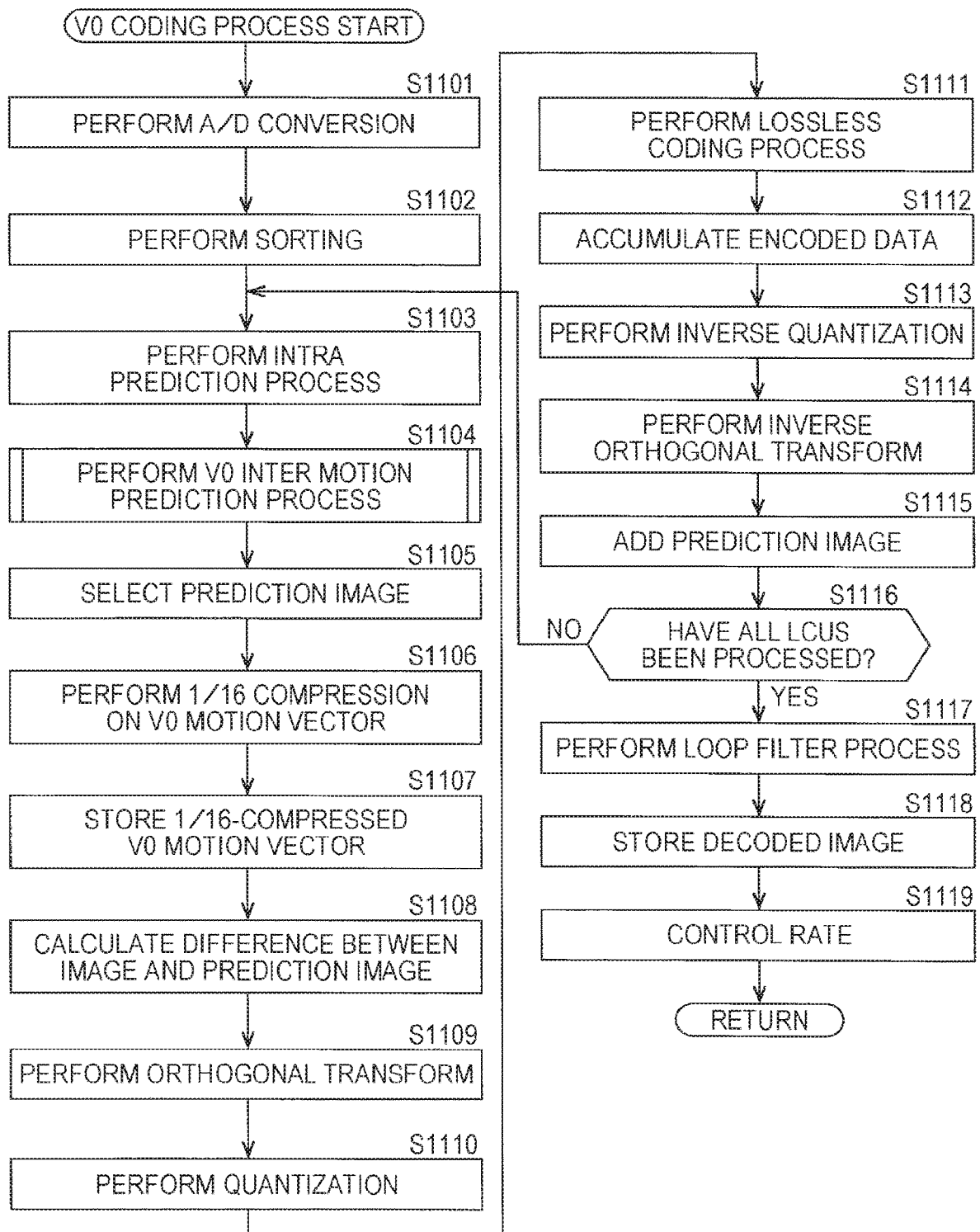
FIG. 10 is a flowchart for describing an exemplary flow of a V0 coding process.

The process of step S2101 to step S2105 is performed in the same manner as the process of step S1101 to step S1105 of FIG. 10 through the respective processing units of the V0 image coding device 300-0.

In step S2106, the V0 motion vector compressing unit 321-0 performs compression (¼ compressed) on the non-compressed V0 motion vector of the maximum of 4×4 accuracy serving as the motion vector of the current picture of the view 0 generated by the process of step S2104 with the 8×8 accuracy. For example, the ¼ compressed is performed in units of LCUs (for example, 16×16 pixels).

In step S2107, the V0 temporal memory 322-0 stores the ¼-compressed V0 motion vector generated by the process of step S2106.

The process of step S2108 to step S2119 is performed in the same manner as the process of step S1108 to step S1119 of FIG. 10 through the respective processing units of the V0 image coding device 300-0.

In step S2120, the V0 motion vector compressing unit 323-0 reads the ¼-compressed V0 motion vector stored by the process of step S2107 from the V0 temporal memory 322-0, and further performs ¼ compressed.

In step S2121, the V0 motion vector memory 324-0 stores the ¹⁄₁₆-compressed V0 motion vector generated by the process of step S2106.

When the process of step S2121 ends, the V0 coding process ends, and the process returns to FIG. 9. The V0 inter motion prediction process performed in step S2104 of FIG. 30 is performed in the same manner as in the first embodiment (FIG. 11) through the motion predicting/compensating unit 314-0, and thus a description thereof is omitted.

<V1 Coding Process Flow>

Figure 31:
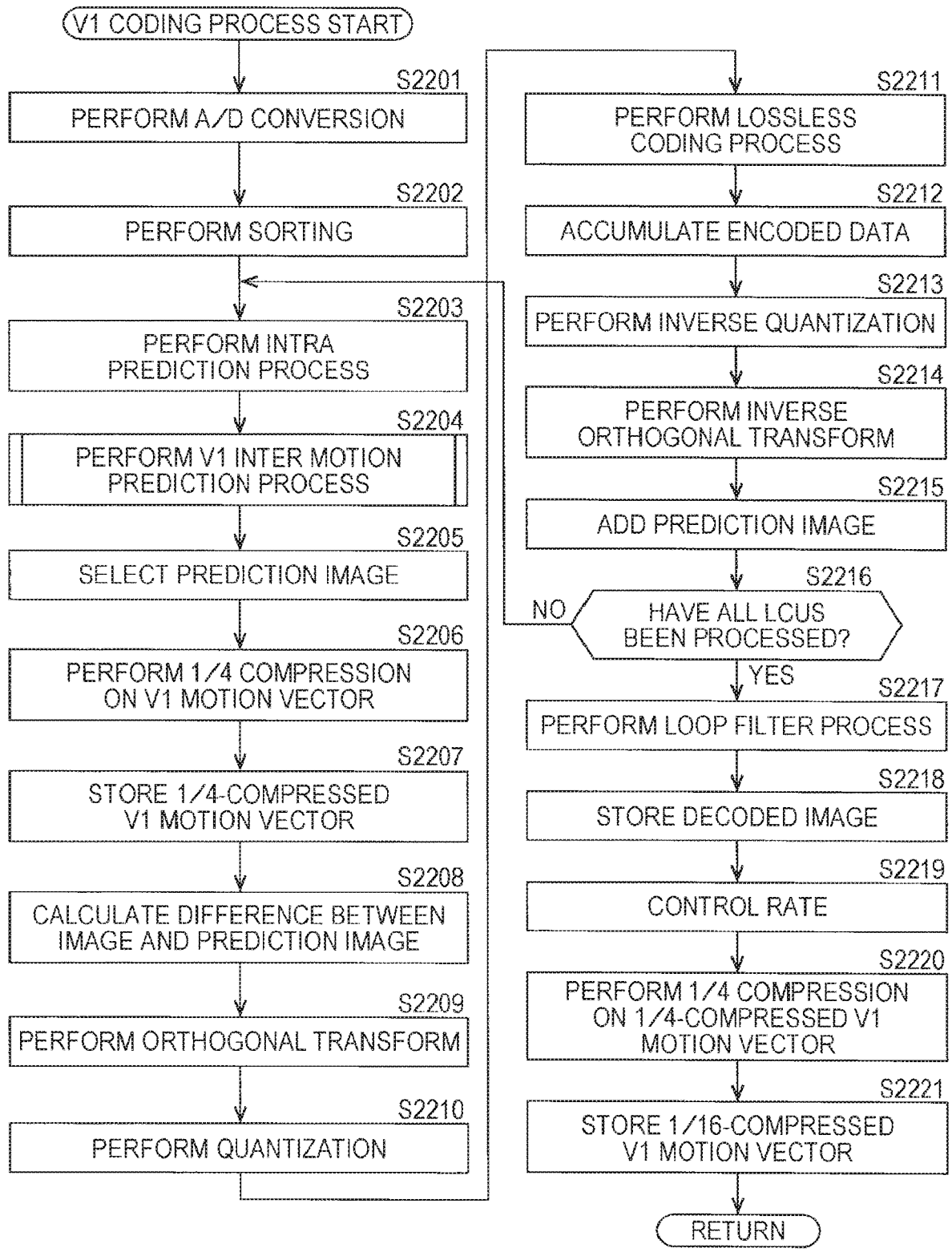
FIG. 31 is a flowchart for describing an exemplary flow of a V1 coding process.

Next, an exemplary flow of the V1 coding process of encoding the view 1 which is performed in step S1002 of FIG. 9 will be described with reference to a flowchart of FIG. 31.

A difference between the process for the view 0 and the process for the view 1 mainly lies in the inter motion prediction process. Thus, as illustrated in FIG. 31, the V1 image coding device 300-1 performs the V1 coding process for the view 1 basically in the same manner as the V0 coding process for the view 0 (FIG. 30). In other words, the process of step S2201 to step S2221 of FIG. 31 is performed basically in the same manner as the process of step S2101 to step S2121 of FIG. 30. Thus, the description of FIG. 31 may proceed such that the respective components of the V0 image coding device 300-0 described with reference to FIG. 30 are replaced with the respective components of the V1 image coding device 300-1, and the process for the view 0 illustrated in FIG. 30 is replaced with the process for the view 1, and thus a description thereof is omitted.

<V1 Inter Motion Prediction Process Flow>

Next, an exemplary flow of the V1 inter motion prediction process performed in step S2204 of FIG. 31 will be described with reference to a flowchart of FIG. 32.

Figure 13:
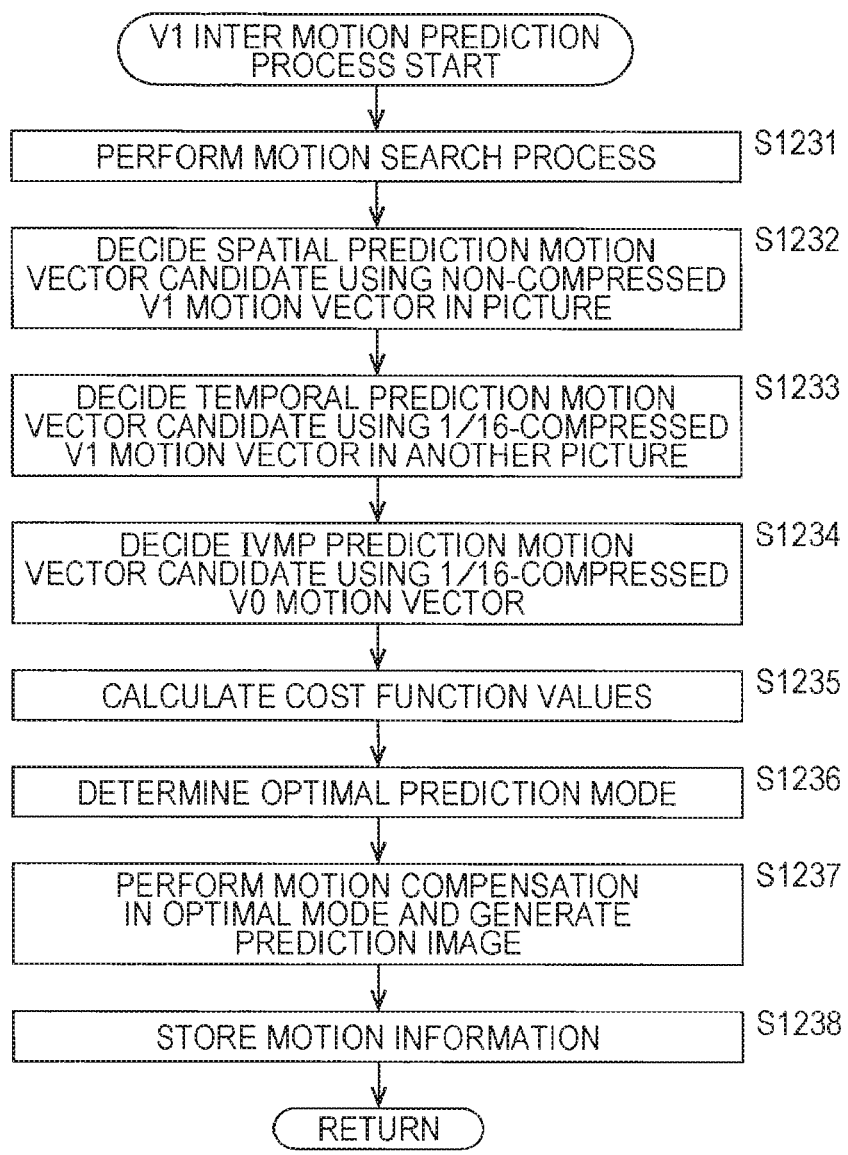
FIG. 13 is a flowchart for describing an exemplary flow of a V1 inter motion prediction process.

The motion predicting/compensating unit 314-1 performs the process of step S2241 to step S2243 in the same manner as the process of step S1231 to step S1233 of FIG. 13.

In step S2244, the motion predicting/compensating unit 114-1 acquires the ¼-compressed V0 motion vector from the V0 temporal memory 322-0, and decides the IVMP prediction motion vector candidate using the ¼-compressed V0 motion vector.

The motion predicting/compensating unit 314-1 performs the process of step S2245 to step S2248 in the same manner of step S1235 to step S1238 of FIG. 13. When the process of step S2248 ends, the V1 inter motion prediction process ends, and the process returns to FIG. 31.

<V2 Coding Process Flow>

Next, an exemplary flow of the V2 coding process of encoding the view 2 which is performed in step S1003 of FIG. 9 will be described with reference to a flowchart of FIG. 33.

The process for the view 2 is performed, similarly to the process for the view 1. Thus, as illustrated in FIG. 33, the V2 image coding device 300-2 performs the V2 coding process basically in the same manner as the V1 coding process for the view 1 (FIG. 31). In other words, the process of step S2301 to step S2321 of FIG. 33 is performed basically in the same manner as the process of step S2201 to step S2221 of FIG. 31. Thus, the description of FIG. 33 may proceed such that the respective components of the V1 image coding device 300-1 described with reference to FIG. 31 are replaced with the respective components of the V2 image coding device 300-2, and the process for the view 1 illustrated in FIG. 31 is replaced with the process for the view 2, and thus a description thereof is omitted.

In step S2306, ¹⁄₁₆ compression may be performed on the non-compressed V2 motion vector, the obtained ¹⁄₁₆-compressed V2 motion vector may be stored in step S2307, and the process of step S2320 and step S2321 may not be performed. In this case, since the number of compression processes is reduced, it is possible to suppress an increase in a load caused by the compression. Here, as illustrated in FIG. 33, as ¼ compression is performed twice, it is possible to perform the compression similarly to another view, and it is easy to control.

<V2 Inter Motion Prediction Process Flow>

Next, an exemplary flow of the V2 inter motion prediction process performed in step S2304 of FIG. 33 will be described with reference to a flowchart of FIG. 34.

Figure 32:
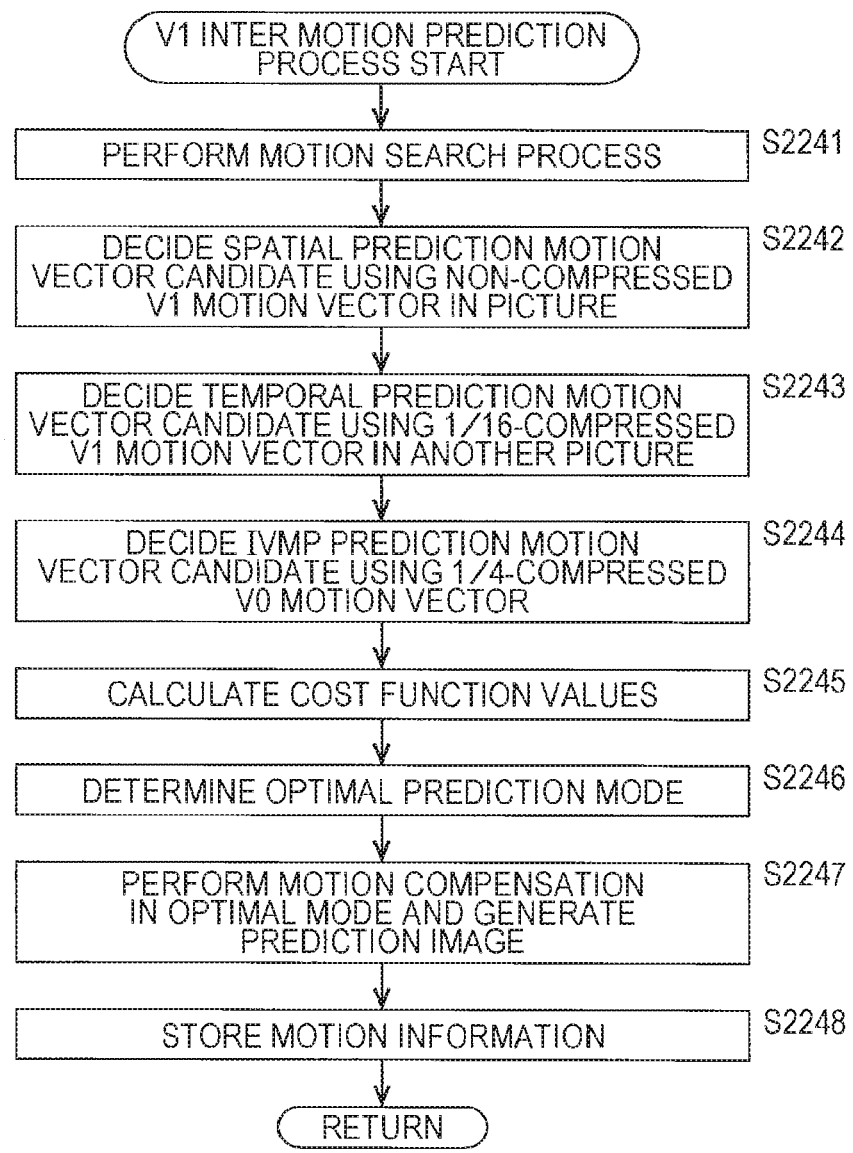
FIG. 32 is a flowchart for describing an exemplary flow of a V1 inter motion prediction process.
Figure 34:
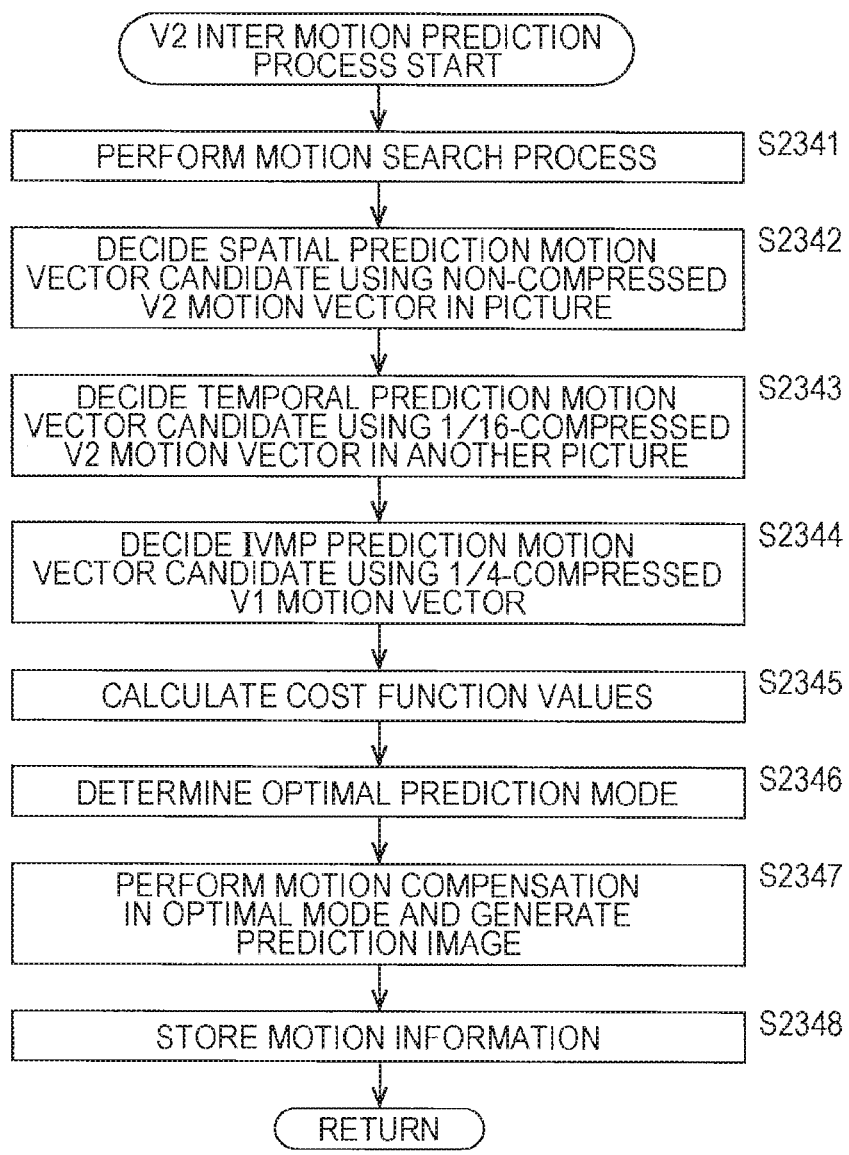
FIG. 34 is a flowchart for describing an exemplary flow of a V2 inter motion prediction process.

As illustrated in FIG. 34, the motion predicting/compensating unit 314-2 performs the V2 inter motion prediction process basically in the same manner as the V1 inter motion prediction process for the view 1 (FIG. 32). In other words, the process of step S2341 to step S2348 of FIG. 34 is performed basically in the same manner as the process of step S3241 to step S2248 of FIG. 32.

Here, in step S2342, the non-compressed V2 motion vector serving as a non-compressed motion vector of the view 2 is used. In step S2343, the ¹⁄₁₆-compressed V2 motion vector that has been subjected to ¹⁄₁₆ compressed is used. In step S2344, the ¼-compressed V1 motion vector that has been subjected to ¼ compressed is used.

Figure 33:
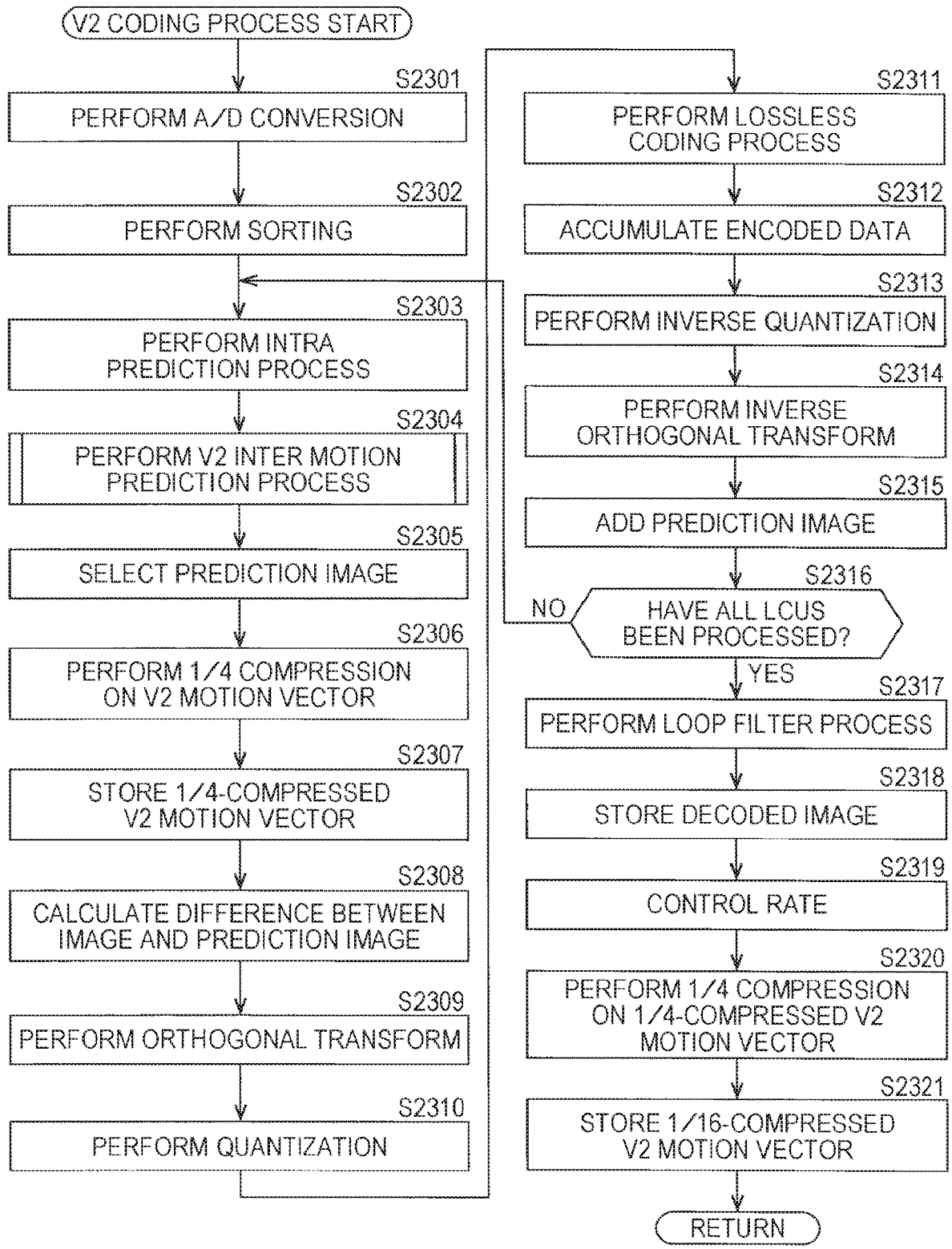
FIG. 33 is a flowchart for describing an exemplary flow of a V2 coding process.

When the process of step S2348 ends, the V2 inter motion prediction process ends, and the process returns to FIG. 33.

As the process is performed as described above, the image coding device 300 can reduce the memory capacity necessary for the motion vectors for the IVMP and suppress an increase in a storage capacity necessary for encoding and decoding.

<Image Decoding Device>

Figure 35:
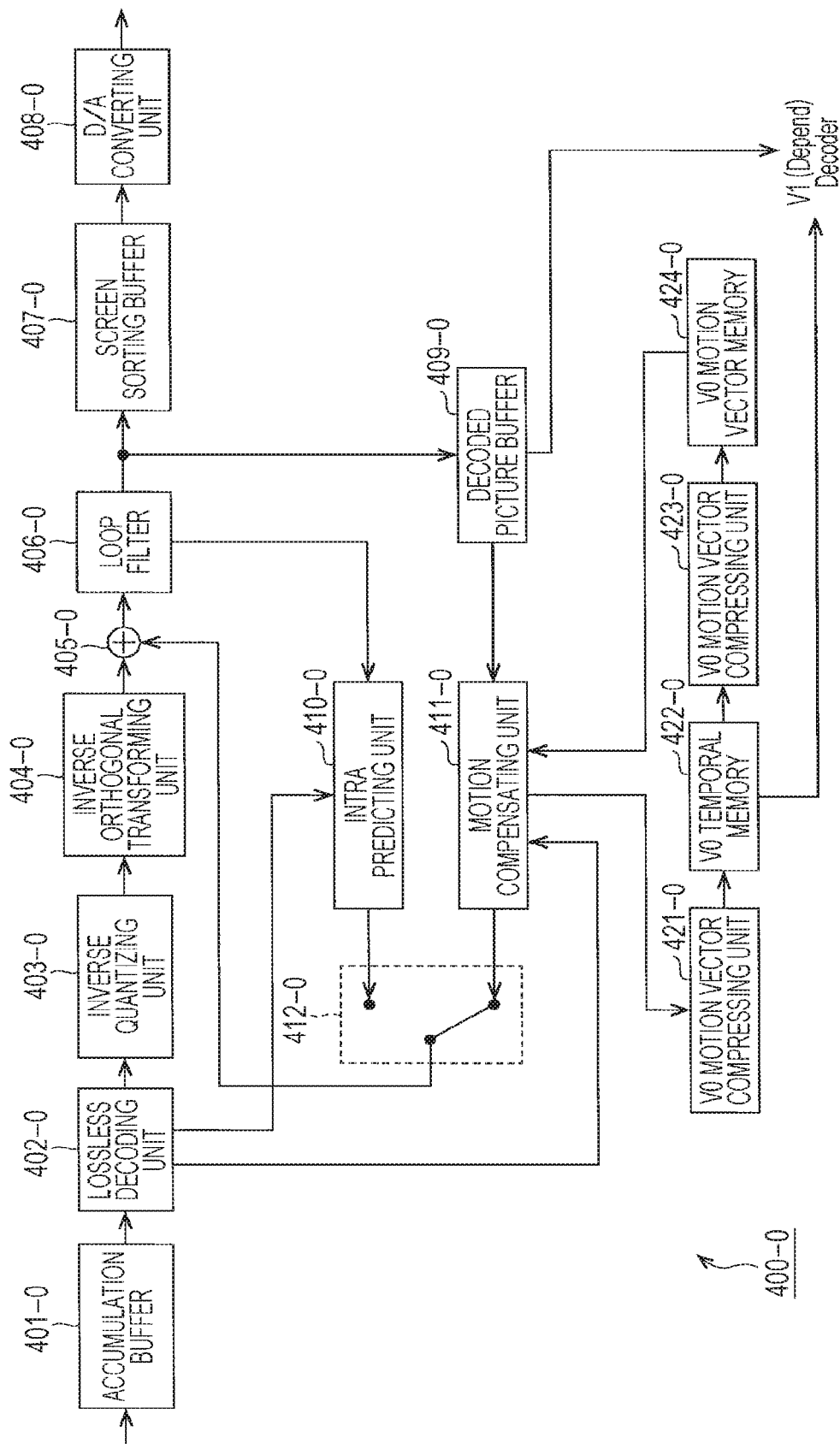
FIG. 35 is a block diagram illustrating an exemplary main configuration of a V0 image decoding device.
Figure 36:
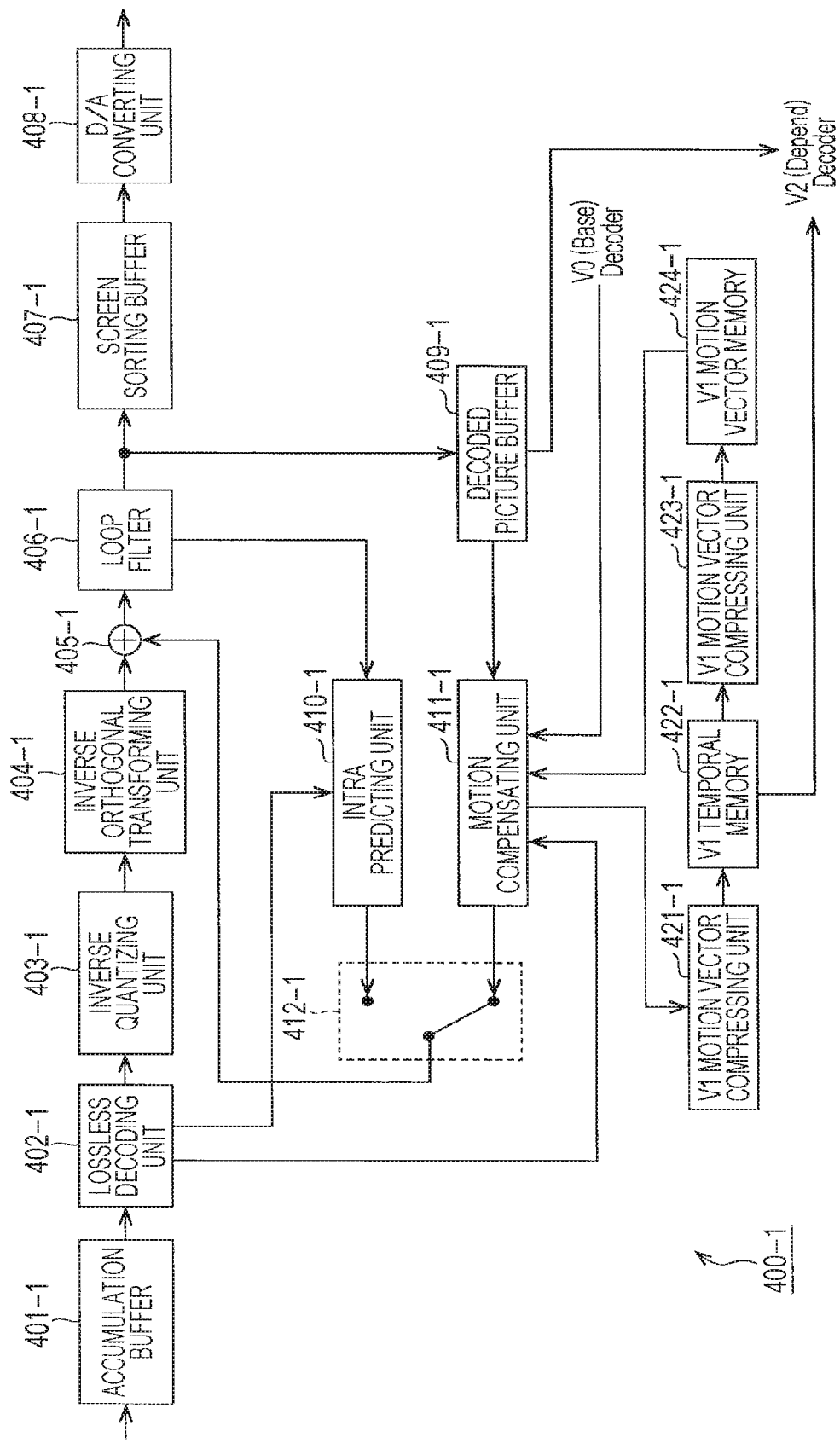
FIG. 36 is a block diagram illustrating an exemplary main configuration of a V1 image decoding device.
Figure 37:
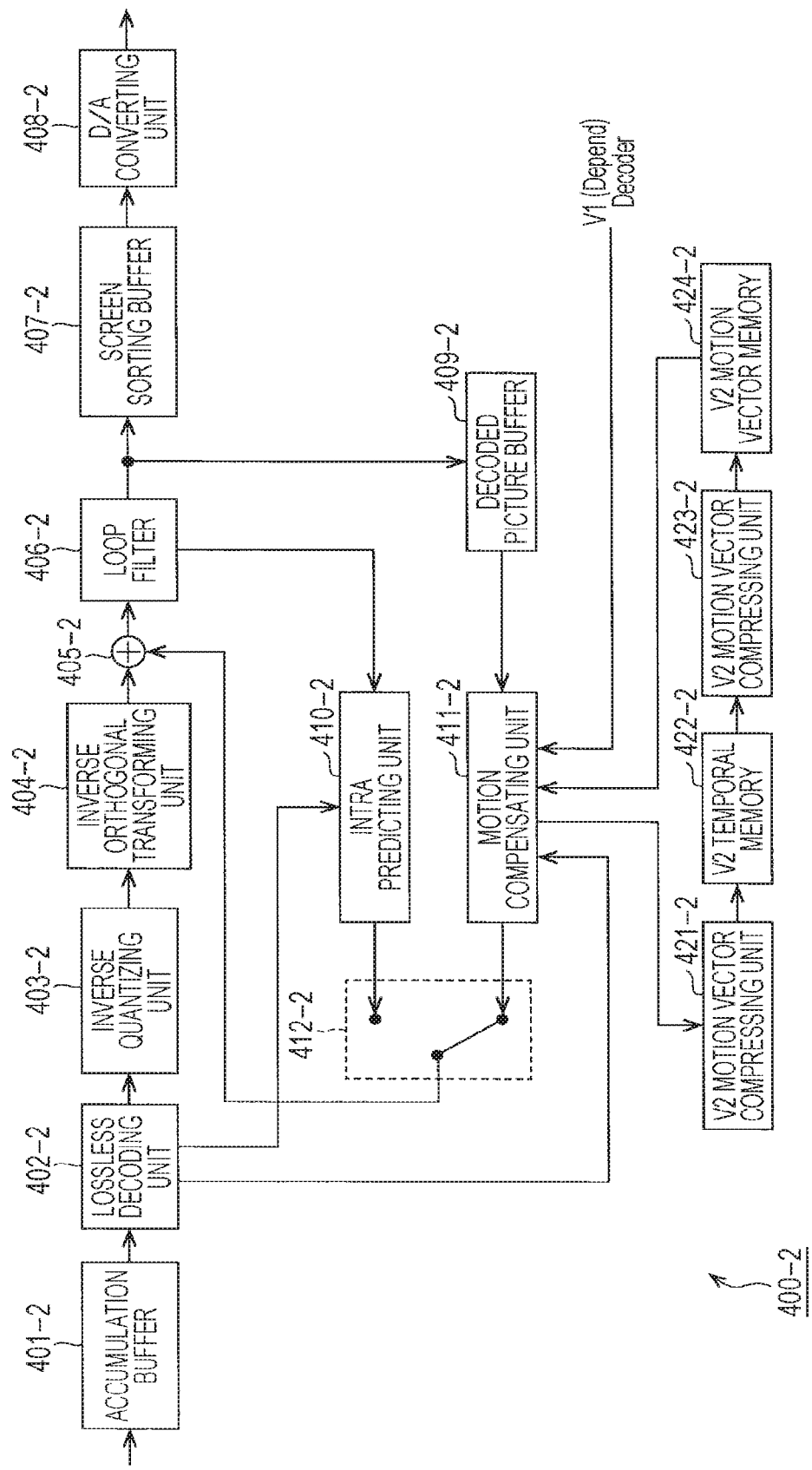
FIG. 37 is a block diagram illustrating an exemplary main configuration of a V2 image decoding device.

Next, decoding of encoded data (encoded streams) encoded as described above will be described. FIG. 35 is a block diagram illustrating an exemplary main configuration of the V0 image decoding device. FIG. 36 is a block diagram illustrating an exemplary main configuration of the V1 image decoding device. FIG. 37 is a block diagram illustrating an exemplary main configuration of the V2 image decoding device.

An image decoding device 400 (not illustrated) decodes encoded data of a moving image including a plurality of layers such as the multi-view image illustrated in FIG. 2 which is encoded by the image coding device 300 by a decoding method corresponding to the encoding method. The image decoding device 400 includes a V0 image decoding device 400-0 of FIG. 35, a V1 image decoding device 400-1 of FIG. 36, and the V2 image decoding device 400-2 of FIG. 37 in order to decode encoded data of respective views of a multi-view image. The V0 image decoding device 400-0 decodes the encoded data of the image of the view 0 encoded through the V0 image coding device 300-0. The V1 image decoding device 400-1 decodes the encoded data of the image of the view 1 encoded through the V1 image coding device 300-1. The V2 image decoding device 400-2 decodes the encoded data of the image of the view 2 encoded through the V2 image coding device 300-2.

The V0 image decoding device 400-0 includes an accumulation buffer 401-0, a lossless decoding unit 402-0, an inverse quantizing unit 403-0, an inverse orthogonal transforming unit 404-0, an operation unit 405-0, a loop filter 406-0, a screen sorting buffer 407-0, and a D/A converting unit 408-0 as illustrated in FIG. 35. The V0 image decoding device 400-0 further includes a decoded picture buffer 409-0, an intra predicting unit 410-0, a motion compensating unit 411-0, and a selecting unit 412-0.

The V1 image decoding device 400-1 includes an accumulation buffer 401-1, a lossless decoding unit 402-1, an inverse quantizing unit 403-1, an inverse orthogonal transforming unit 404-1, an operation unit 405-1, a loop filter 406-1, a screen sorting buffer 407-1, and a D/A converting unit 408-1 as illustrated in FIG. 36. The V1 image decoding device 400-1 further includes a decoded picture buffer 409-1, an intra predicting unit 410-1, a motion compensating unit 411-1, and a selecting unit 412-1.

The V2 image decoding device 400-2 includes an accumulation buffer 401-2, a lossless decoding unit 402-2, an inverse quantizing unit 403-2, an inverse orthogonal transforming unit 404-2, an operation unit 405-2, a loop filter 406-2, a screen sorting buffer 407-2, and a D/A converting unit 408-2 as illustrated in FIG. 37. The V2 image decoding device 400-2 further includes a decoded picture buffer 409-2, an intra predicting unit 410-2, a motion compensating unit 411-2, and a selecting unit 412-2.

Hereinafter, when the accumulation buffers 401-0 to 401-2 need not be distinguished from one another, they are referred to simply as an "accumulation buffer 401." Further, when the lossless decoding units 402-0 to 402-2 need not be distinguished from one another, they are referred to simply as a "lossless decoding unit 402." Further, when the inverse quantizing units 403-0 to 403-2 need not be distinguished from one another, they are referred to simply as an "inverse quantizing unit 403." Further, when the inverse orthogonal transforming units 404-0 to 404-2 need not be distinguished from one another, they are referred to simply as an "inverse orthogonal transforming unit 404." Further, when the operation units 405-0 to 405-2 need not be distinguished from one another, they are referred to simply as an "operation unit 405."

Further, when the loop filters 406-0 to 406-2 need not be distinguished from one another, they are referred to simply as a "loop filter 406." Further, when the screen sorting buffers 407-0 to 407-2 need not be distinguished from one another, they are referred to simply as a "screen sorting buffer 407." Further, when the D/A converting units 408-0 to 408-2 need not be distinguished from one another, they are referred to simply as a "D/A converting unit 408." Further, when the decoded picture buffers 409-0 to 409-2 need not be distinguished from one another, they are referred to simply as a "decoded picture buffer 409."

Further, when the intra predicting units 410-0 to 410-2 need not be distinguished from one another, they are referred to simply as an "intra predicting unit 410." Further, when the motion compensating units 411-0 to 411-2 need not be distinguished from one another, they are referred to simply as a "motion compensating unit 411." Further, when the selecting units 412-0 to 412-2 need not be distinguished from one another, they are referred to simply as a "selecting unit 412."

The accumulation buffer 401 corresponds to the accumulation buffer 201, and performs basically the same process as the accumulation buffer 201. The lossless decoding unit 402 corresponds to the lossless decoding unit 202, and performs basically the same process as the lossless decoding unit 202. The inverse quantizing unit 403 corresponds to the inverse quantizing unit 203, and performs basically the same process as the inverse quantizing unit 203. The inverse orthogonal transforming unit 404 corresponds to the inverse orthogonal transforming unit 204, and performs basically the same process as the inverse orthogonal transforming unit 204. The operation unit 405 corresponds to the operation unit 205, and performs basically the same process as the operation unit 205.

The loop filter 406 corresponds to the loop filter 206, and performs basically the same process as the loop filter 206. The screen sorting buffer 407 corresponds to the screen sorting buffer 207, and performs basically the same process as the screen sorting buffer 207. The D/A converting unit 408 corresponds to the D/A converting unit 208, and performs basically the same process as the D/A converting unit 208.

The decoded picture buffer 409 corresponds to the decoded picture buffer 209, and performs basically the same process as the decoded picture buffer 209.

The intra predicting unit 410 corresponds to the intra predicting unit 210, and performs basically the same process as the intra predicting unit 210. The motion compensating unit 411 corresponds to the motion compensating unit 211, and performs basically the same process as the motion compensating unit 211. The selecting unit 412 corresponds to the selecting unit 212, and performs basically the same process as the selecting unit 212.

The V0 image decoding device 400-0 further includes a V0 motion vector compressing unit 421-0, a V0 temporal memory 422-0, a V0 motion vector compressing unit 423-0, a V0 motion vector compressing unit 423-0, and a V0 motion vector memory 424-0.

The V1 image decoding device 400-1 further includes a V1 motion vector compressing unit 421-1, a V1 temporal memory 422-1, a V1 motion vector compressing unit 423-1, a V1 motion vector compressing unit 423-1, and a V1 motion vector memory 424-1.

The V2 image decoding device 400-2 further includes a V2 motion vector compressing unit 421-2, a V2 temporal memory 422-2, a V2 motion vector compressing unit 423-2, a V2 motion vector compressing unit 423-2, and a V2 motion vector memory 424-2.

The motion compensating unit 411-0 supplies a non-compressed V0 motion vector (a maximum of 4×4 accuracy) of a current block generated by motion prediction to the V0 motion vector compressing unit 421-0. Further, the motion compensating unit 411-0 acquires the $\frac{1}{16}$-compressed V0 motion vector stored in the V0 motion vector memory 424-0 as a motion vector of a block temporally neighboring a current block.

The motion compensating unit 411-1 supplies a non-compressed V1 motion vector (a 4×4 accuracy) of a current block generated by motion prediction to the V1 motion vector compressing unit 421-1. Further, the motion compensating unit 411-1 acquires the 1/16-compressed V1 motion vector stored in the V1 motion vector memory 424-1 as a motion vector of a block temporally neighboring a current block. Furthermore, the motion compensating unit 411-1 acquires the 1/4-compressed V0 motion vector stored in the V0 temporal memory 422-0 as a motion vector of a block neighboring a current block in terms of a view.

The motion compensating unit 411-2 supplies a non-compressed V2 motion vector (a 4×4 accuracy) of a current block generated by motion prediction to the V2 motion vector compressing unit 421-2. Further, the motion compensating unit 411-2 acquires the 1/16-compressed V2 motion vector stored in the V2 motion vector memory 424-2 as a motion vector of a block temporally neighboring a current block. Furthermore, the motion compensating unit 411-2 acquires the 1/4-compressed V1 motion vector stored in the V1 temporal memory 422-1 as a motion vector of a block neighboring a current block in terms of a view.

The V0 motion vector compressing unit 421-0 performs 1/4 compressed on the non-compressed V0 motion vector supplied from the motion compensating unit 411-0, and supplies an obtained 1/4-compressed V0 motion vector to the V0 temporal memory 422-0. A method of compressing a motion vector is arbitrary as long as the same method as in the V0 motion vector compressing unit 321-0 is used.

The V0 temporal memory 422-0 stores the supplied 1/4-compressed V0 motion vector. The V0 temporal memory 422-0 appropriately supplies, the stored 1/4-compressed V0 motion vector to the motion compensating unit 411-1 as a motion vector of a block neighboring in terms of a view. Further, the V0 temporal memory 422-0 appropriately supplies the stored 1/4-compressed V0 motion vector to the V0 motion vector compressing unit 423-0.

The V0 motion vector compressing unit 423-0 reads the 1/4-compressed V0 motion vector from the V0 temporal memory 422-0, performs 1/4 compressed, and supplies the obtained 1/16-compressed V0 motion vector to the V0 motion vector memory 424-0. A method of compressing a motion vector is arbitrary as long as the same method as in the V0 motion vector compressing unit 323-0 is used.

For example, the V0 motion vector compressing unit 421-0 and the V0 motion vector compressing unit 423-0 may differ in the compression method from each other. Further, the V0 motion vector compressing unit 423-0 may perform 1/16 compression on the non-compressed V0 motion vector generated by the motion compensating unit 411-0, similarly to the V0 motion vector compressing unit 221-0.

The V0 motion vector memory 424-0 stores the supplied 1/16-compressed V0 motion vector. The V0 motion vector memory 424-0 appropriately supplies the stored 1/16-compressed V0 motion vector to the motion compensating unit 411-0 as a motion vector of a temporally neighboring block.

The V1 motion vector compressing unit 421-1 is a processing unit similar to the V0 motion vector compressing unit 421-0. The V1 motion vector compressing unit 421-1 performs 1/4 compressed on the non-compressed V1 motion vector supplied from the motion compensating unit 411-1, and supplies the obtained 1/4-compressed V1 motion vector to the V1 temporal memory 422-1.

The V1 temporal memory 422-1 is a processing unit similar to the V0 temporal memory 422-0. The V1 temporal memory 422-1 stores the supplied 1/4-compressed V1 motion vector. The V1 temporal memory 422-1 appropriately supplies the stored 1/4-compressed V1 motion vector to the motion compensating unit 411-2 as a motion vector of a block neighboring in terms of a view. Further, the V1 temporal memory 422-1 appropriately supplies the stored 1/4-compressed V1 motion vector to the V1 motion vector compressing unit 423-1.

The V1 motion vector compressing unit 423-1 is a processing unit similar to the V0 motion vector compressing unit 423-0. The V1 motion vector compressing unit 423-1 reads the 1/4-compressed V1 motion vector from the V1 temporal memory 422-1, performs 1/4 compressed, and supplies the obtained 1/16-compressed V1 motion vector to the V1 motion vector memory 424-1.

The V1 motion vector memory 424-1 stores the supplied 1/16-compressed V1 motion vector. The V1 motion vector memory 424-1 appropriately supplies the stored 1/16-compressed V1 motion vector to the motion compensating unit 411-1 as a motion vector of a temporally neighboring block.

The V2 motion vector compressing unit 421-2 is a processing unit similar to the V0 motion vector compressing unit 421-0. The V2 motion vector compressing unit 421-2 performs 1/4 compressed on the non-compressed V2 motion vector supplied from the motion compensating unit 411-2, and supplies the obtained 1/4-compressed V2 motion vector to the V2 temporal memory 422-2.

The V2 temporal memory 422-2 is a processing unit similar to the V0 temporal memory 422-0. The V2 temporal memory 422-2 stores the supplied 1/4-compressed V2 motion vector. The V2 temporal memory 422-2 appropriately supplies the stored 1/4-compressed V2 motion vector to the V2 motion vector compressing unit 423-2.

The V2 motion vector compressing unit 423-2 is a processing unit similar to the V0 motion vector compressing unit 423-0. The V2 motion vector compressing unit 423-2 reads the 1/4-compressed V2 motion vector from the V2 temporal memory 422-2, performs 1/4 compressed, and supplies the obtained 1/16-compressed V2 motion vector to the V2 motion vector memory 424-2.

The V2 motion vector memory 424-2 stores the supplied 1/16-compressed V2 motion vector. The V2 motion vector memory 424-2 appropriately supplies the stored 1/16-compressed V2 motion vector to the motion compensating unit 411-2 as a motion vector of a temporally neighboring block.

Since the V2 image decoding device 400-2 decodes encoded data of an image of the view 2 that is finally processed, a motion vector obtained in the motion compensating unit 411-2 is not used in any other view. Thus, instead of the V2 motion vector compressing unit 421-2 to the V2 motion vector memory 424-2, the V2 motion vector compressing unit 221-2 and the V2 motion vector memory 222-2 may be applied as in the V2 image decoding device 200-2.

As described above, the V0 motion vector compressing unit 421-0, the V1 motion vector compressing unit 421-1, and the V2 motion vector compressing unit 421-2 can reduce (that is, compress) an information amount of motion vectors by reducing the number of motion vectors. Thus, it is possible to reduce the capacities of the V0 temporal memory 422-0, the V1 temporal memory 422-1, and the V2 temporal memory 422-2.

Further, at this time, by suppressing the compression rate so that the accuracy of the motion vector for the IVMP is higher than the accuracy of the motion vector for the TMVP, it is possible to improve the prediction accuracy of the IVMP to be higher than when the accuracy of the motion vector for the IVMP is equal to the accuracy of the motion vector for the TMVP.

Accordingly, it is possible to implement a reduction in a manufacturing or developing cost, device downsizing, a reduction in power consumption, and the like for the image decoding device 400.

<V0 Decoding Process Flow>

Next, a flow of processing performed by the image decoding device 400 will be described. The flow of the decoding process performed by the image decoding device 400 is the same as in the first embodiment (FIG. 19), and thus a description thereof is omitted.

Figure 38:
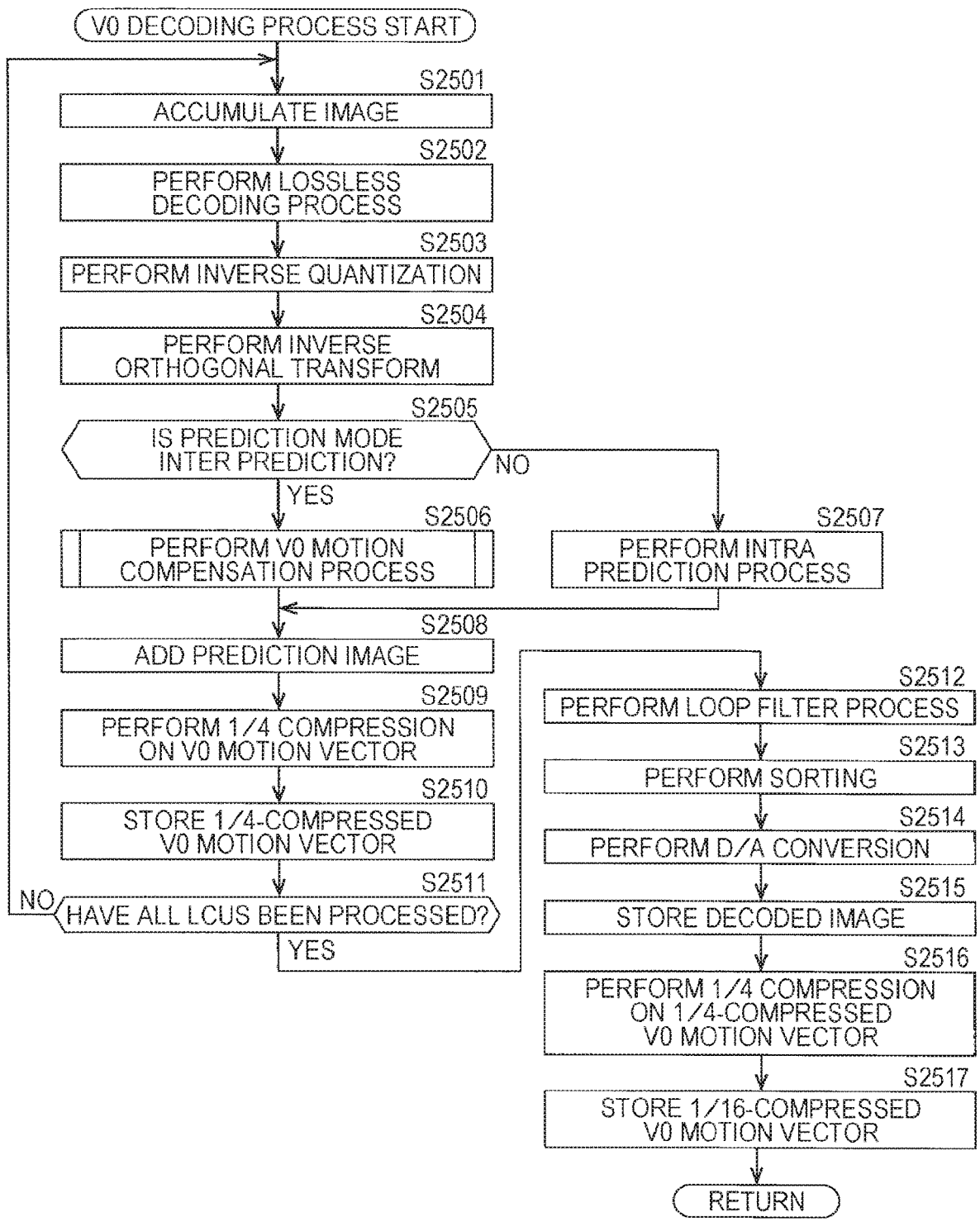
FIG. 38 is a flowchart for describing an exemplary flow of a V0 decoding process.

Next, an exemplary flow of the V0 decoding process of decoding the view 0 which is performed in step S1401 of FIG. 19 will be described with reference to a flowchart of FIG. 38.

Figure 20:
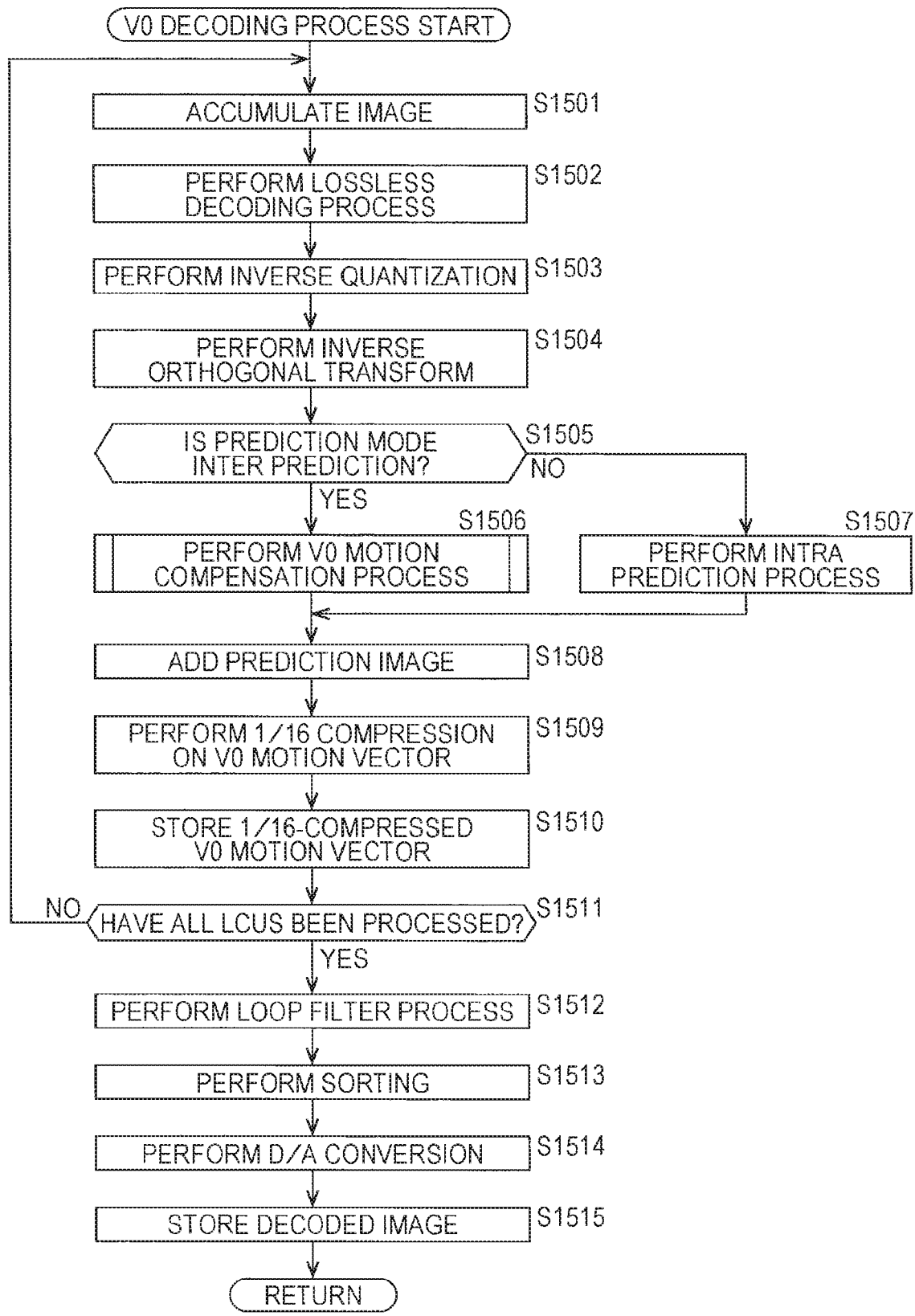
FIG. 20 is a flowchart for describing an exemplary flow of a V0 decoding process.
Figure 21:
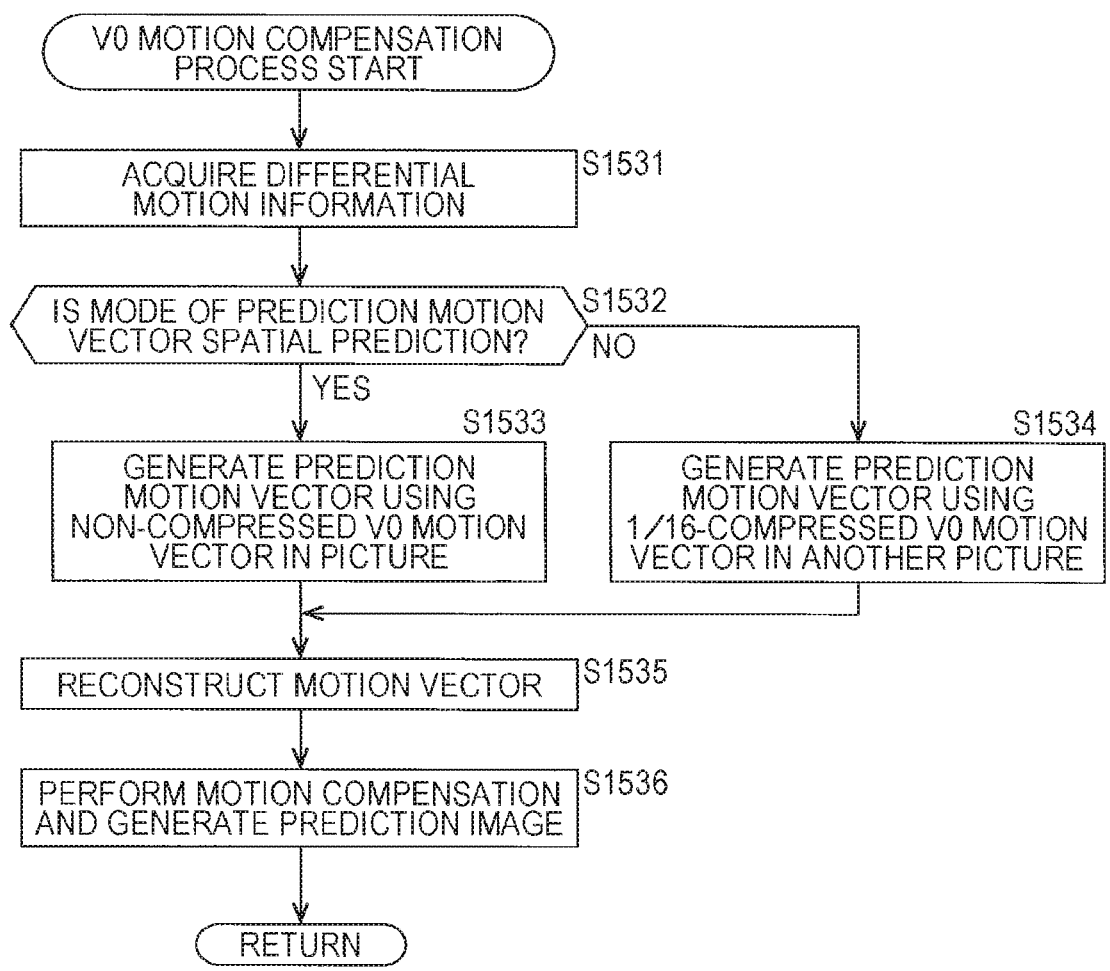
FIG. 21 is a flowchart for describing an exemplary flow of a V0 motion compensation process.

The process of step S2501 to step S2508 is performed in the same manner as the process of step S1501 to step S1508 of FIG. 20 through the respective processing units of the V0 image decoding device 400-0.

In step S2509, the V0 motion vector compressing unit 421-0 performs compression (¼ compressed) on the non-compressed V0 motion vector of the maximum of 4×4 accuracy serving as the motion vector of the current picture of the view 0 generated by the process of step S2506 with the 8×8 accuracy. For example, the ¼ compressed is performed in units of LCUs (for example, 16×16 pixels).

In step S2510, the V0 temporal memory 422-0 stores the ¼-compressed V0 motion vector generated by the process of step S2509.

The process of step S2511 to step S2515 is performed in the same manner as the process of step S1511 to step S1515 of FIG. 20 through the respective processing units of the V0 image decoding device 400-0.

In step S2516, the V0 motion vector compressing unit 423-0 reads the ¼-compressed V0 motion vector stored by the process of step S2510 from the V0 temporal memory 422-0, and further performs ¼ compressed.

In step S2517, the V0 motion vector memory 424-0 stores the 1/16-compressed V0 motion vector generated by the process of step S2516.

When the process of step S2517 ends, the V0 coding process ends, and the process returns to FIG. 19. Further, the V0 motion compensation process performed in step S2506 of FIG. 38 is performed in the same manner as in the first embodiment (FIG. 21) through the motion compensating unit 411-0, thus a description thereof is omitted.

<V1 Decoding Process Flow>

Figure 39:
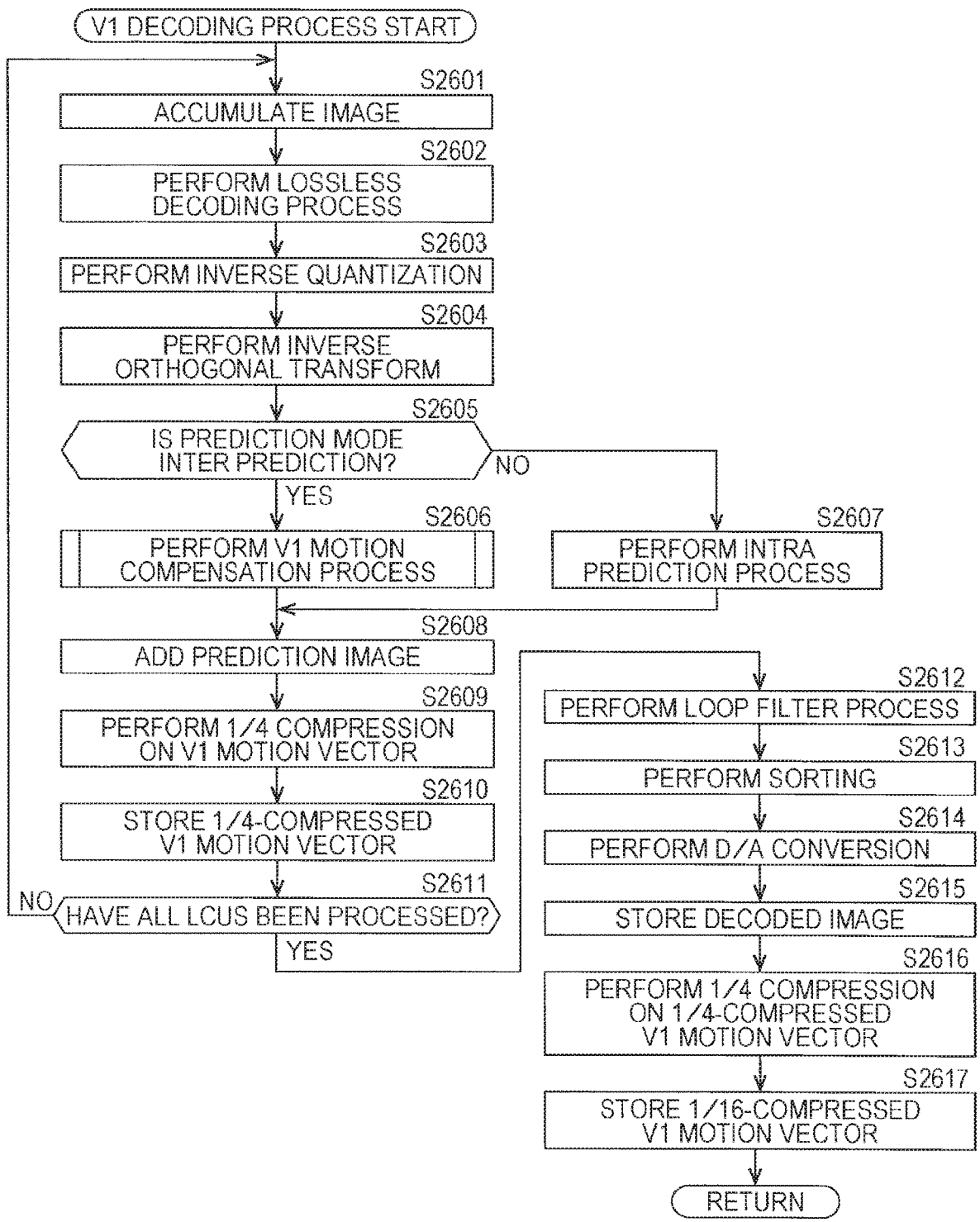
FIG. 39 is a flowchart for describing an exemplary flow of a V1 decoding process.

Next, an exemplary flow of the V1 decoding process of decoding encoded data of the view 1 which is performed in step S1402 of FIG. 19 will be described with reference to a flowchart of FIG. 39.

A difference between the process for the view 0 and the process for the view 1 mainly lies in the motion compensation process. Thus, as illustrated in FIG. 39, the V1 image decoding device 400-1 performs the V1 decoding process for the view 1 basically in the same manner as the V0 decoding process for the view 0 (FIG. 38). In other words, the process of step S2601 to step S2617 of FIG. 39 is performed basically in the same manner as the process of step S2501 to step S2517 of FIG. 38. Thus, the description of FIG. 39 may proceed such that the respective components of the V0 image decoding device 400-0 described with reference to FIG. 38 are replaced with the respective components of the V1 image decoding device 400-1, and the process for the view 0 illustrated in FIG. 38 is replaced with the process for the view 1, and thus a description thereof is omitted.

<V1 Motion Compensation Process Flow>

Figure 40:
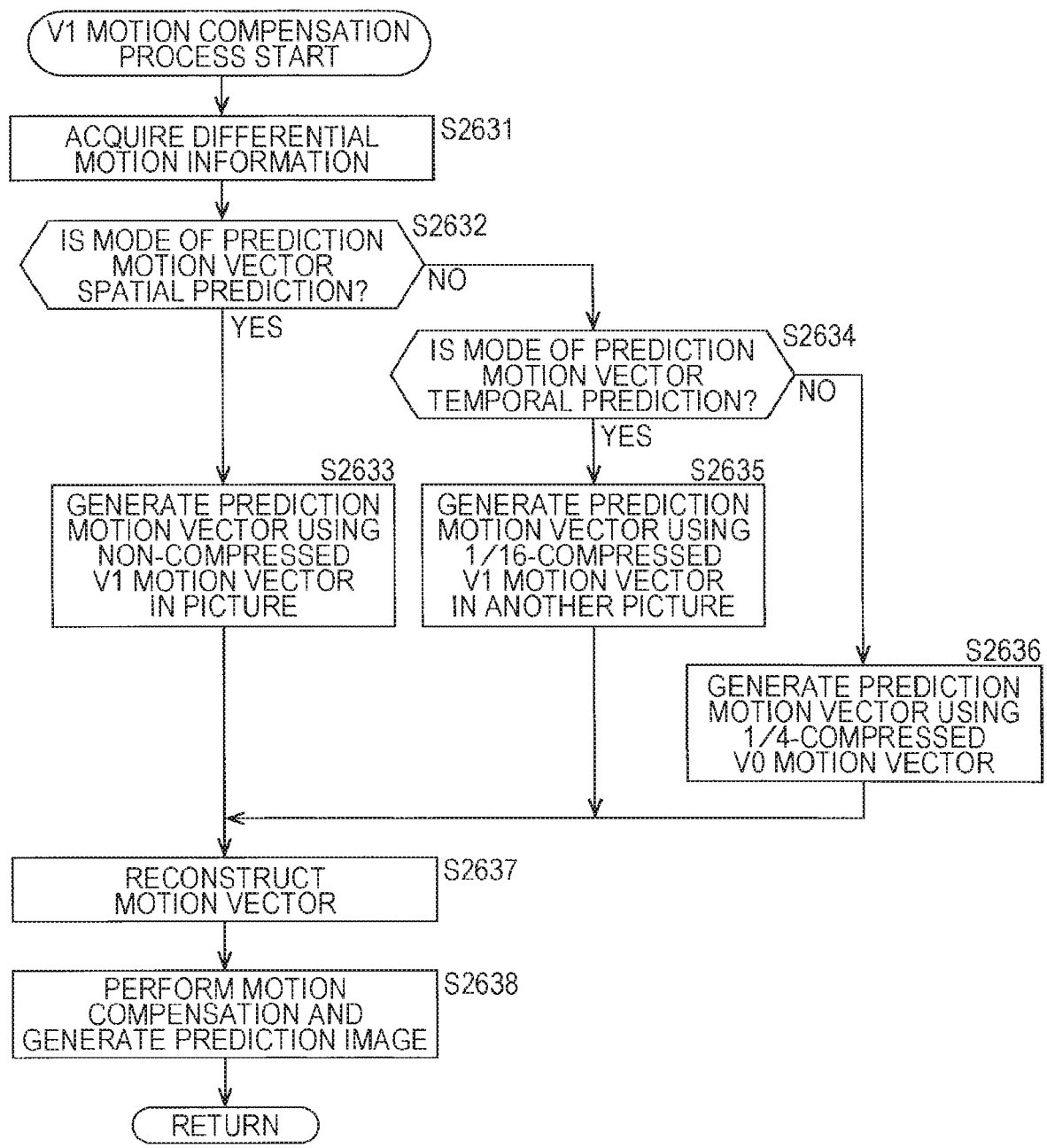
FIG. 40 is a flowchart for describing an exemplary flow of a V1 motion compensation process.

Next, an exemplary flow of the V1 motion compensation process performed in step S2606 of FIG. 39 will be described with reference to a flowchart of FIG. 40.

The process of step S2631 to step S2635 is performed in the same manner as the process of step S1631 to step S1635 of FIG. 23 through the motion compensating unit 411-1.

In step S2636, the motion compensating unit 411-1 generates a prediction motion vector using a ¼-compressed V0 motion vector (a motion vector of a colocated block of an image of the view 0). When the prediction motion vector is generated, the process proceeds to step S2637.

The process of step S2637 and step S2638 is performed in the same manner as the process of step S1637 and step S1638 of FIG. 23 through the motion compensating unit 411-1. When the process of step S2638 ends, the V1 motion compensation process ends, and the process returns to FIG. 22.

<V2 Decoding Process Flow>

Figure 41:
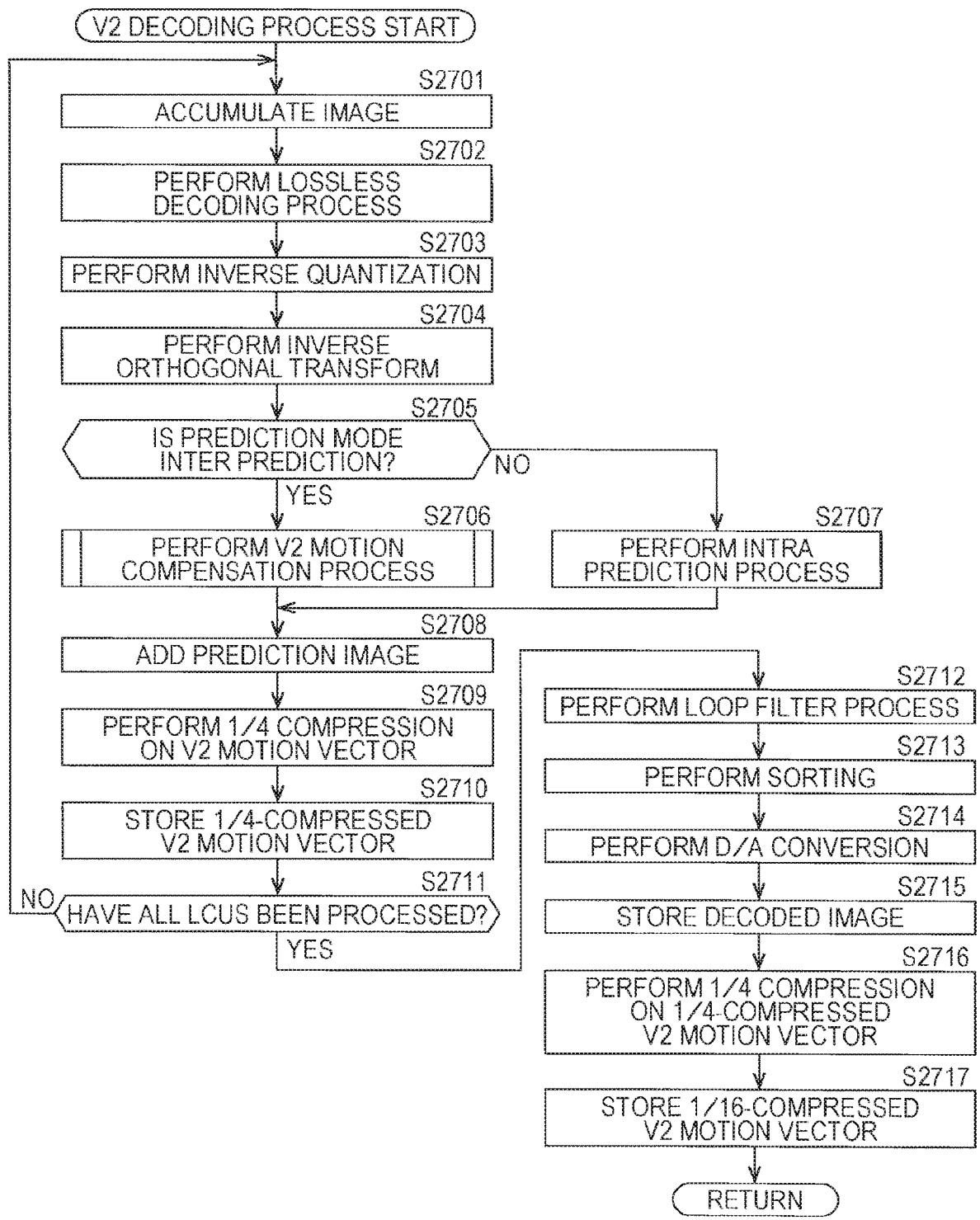
FIG. 41 is a flowchart for describing an exemplary flow of a V2 decoding process.

Next, an exemplary flow of the V2 decoding process of decoding encoded data of the view 2 which is performed in step S1403 of FIG. 19 will be described with reference to a flowchart of FIG. 41.

A difference between the process for the view 1 and the process for the view 2 mainly lies in the motion compensation process. Thus, as illustrated in FIG. 41, the V2 decoding process is performed basically in the same manner as the V1 decoding process for the view 1 (FIG. 39) through the V2 image decoding device 400-2. In other words, the process of step S2701 to step S2717 of FIG. 41 is performed basically in the same manner as the process of step S2601 to step S2617 of FIG. 39. Thus, the description of FIG. 41 may proceed such that the respective components of the V1 image decoding device 400-1 described with reference to FIG. 39 are replaced with the respective components of the V2 image decoding device 400-2, and the process for the view 1 illustrated in FIG. 39 is replaced with the process for the view 2, and thus a description thereof is omitted.

<V2 Motion Compensation Process Flow>

Figure 42:
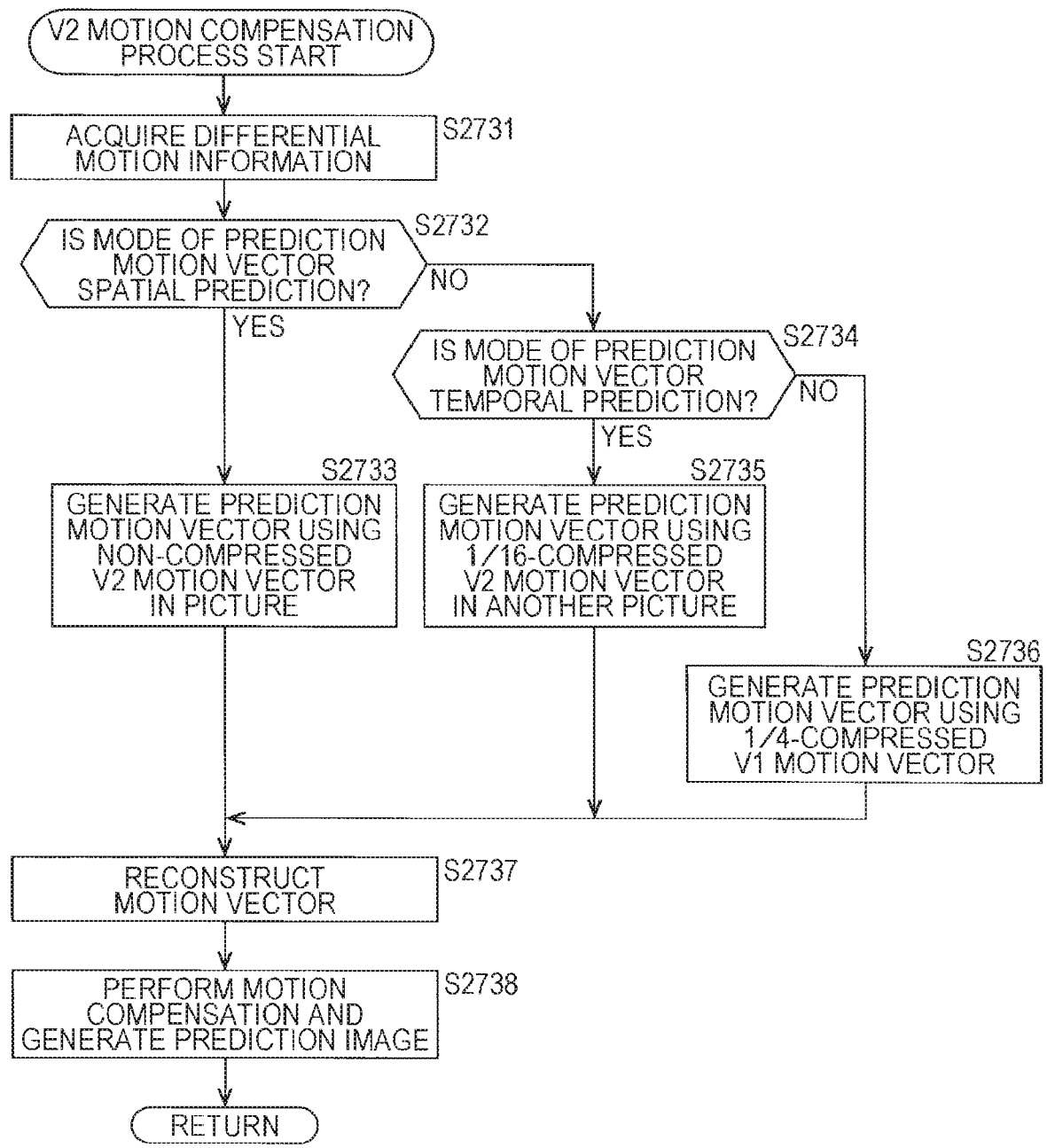
FIG. 42 is a flowchart for describing an exemplary flow of a V2 motion compensation process.

Next, an exemplary flow of the V2 motion compensation process performed in step S2706 of FIG. 41 will be described with reference to a flowchart of FIG. 42.

The process of step S2731 to step S2735 is performed in the same manner as the process of step S1731 to step S1735 of FIG. 25 through the motion compensating unit 411-2.

In step S2736, the motion compensating unit 411-2 generates a prediction motion vector using a ¼-compressed V1 motion vector (a motion vector of a colocated block of an image of the view 1). When the prediction motion vector is generated, the process proceeds to step S2737.

The process of step S2737 and step S2738 is performed in the same manner as the process of step S1737 and step S1738 of FIG. 25 through the motion compensating unit 411-2. When the process of step S2738 ends, the V1 motion compensation process ends, and the process returns to FIG. 41.

As the process is performed as described above, the image decoding device 400 can reduce the memory capacity necessary for the motion vectors for the IVMP and suppress an increase in a storage capacity necessary for encoding and decoding.

The above description has been made in connection with the example in which the accuracy of a motion vector is a maximum of 4×4 accuracy in the non-compressed state, compression is performed with the 8×8 accuracy for the IVMP, and compression is performed with 16×16 accuracy for the TMVP, but this is an example, and the accuracy of a motion vector is arbitrary. A compression rate of each compression is arbitrary as well. In other words, the accuracy of a spatial prediction motion vector candidate, a temporal prediction motion vector candidate, an IVMP prediction motion vector candidate, and a prediction motion vector of each view is arbitrary as well. All views may be the same as or different from one another in the accuracy or the compression rate.

<3. Third Embodiment>

<Compression of Motion Vector for IVMP>

Figure 43:
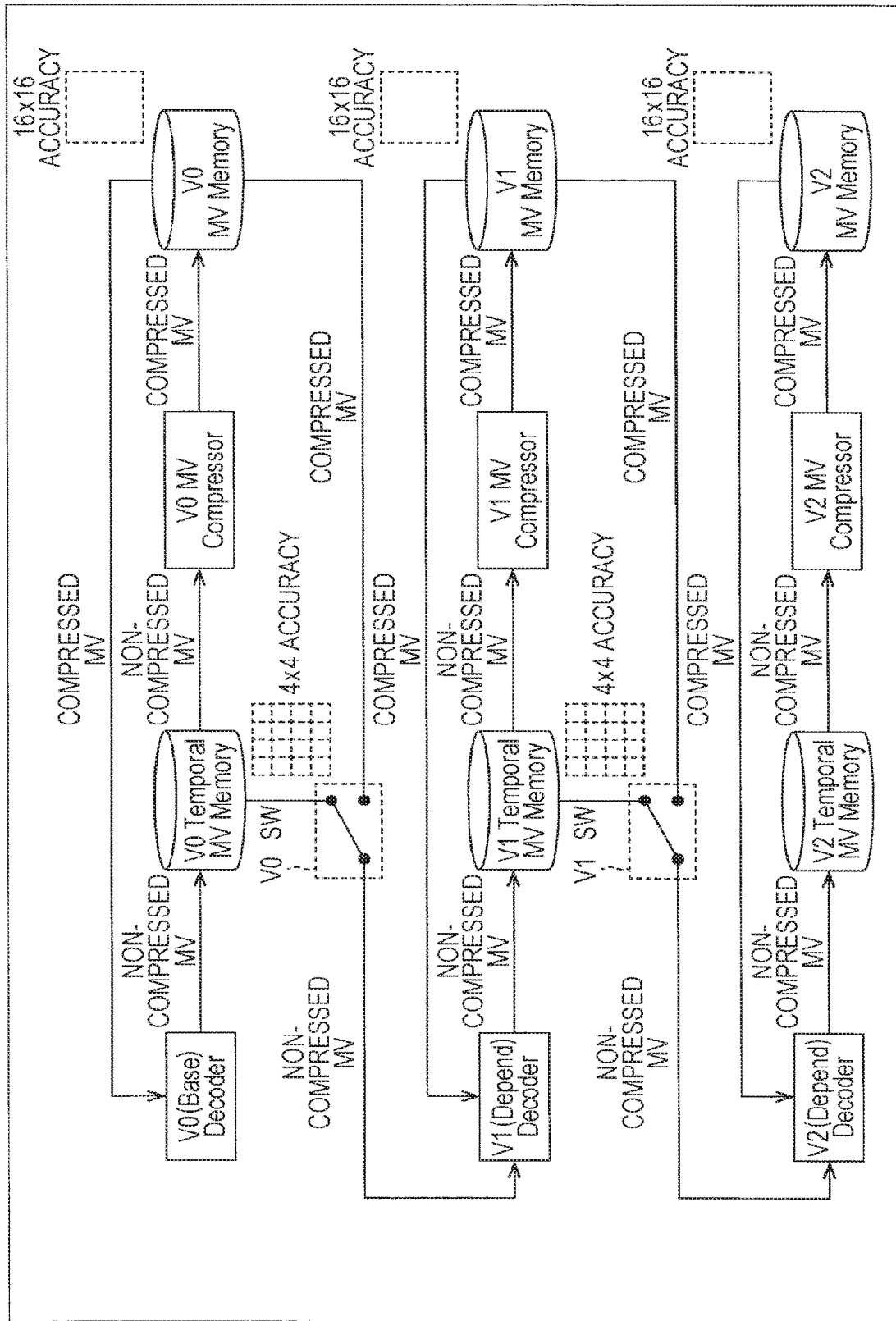
FIG. 43 is a diagram for describing an example of a motion vector reference according to the present technology.

In the motion vector compression (for example, thinning out), it may be possible to control whether or not the motion vector for the IVMP is compressed (for example, thinned out) as illustrated in FIG. 43. In other words, it may be possible to select one of the methods of the related art described with reference to FIG. 4 and the methods (described in the first embodiment) described with reference to FIG. 5.

More specifically, for example, a decoder (a V1 (Depend) decoder and a V2 (Depend) decoder) to select whether or not to acquire a non-compressed motion vector (a non-compressed MV) from a temporal motion vector memory (a V0 temporal MV memory and a V1 temporal MV memory) and then perform the IVMP using the acquired non-compressed motion vector or whether or not to acquire a 1/16-compressed (for example, thinned-out) motion vector (a compressed MV) from a motion vector memory (a V0 MV memory and a V1 MV memory) and then perform the IVMP using the acquired 1/16-compressed motion vector through a switch (V0 SW and V1SW).

Thus, it is possible to perform encoding or decoding while more adaptively controlling a processing amount, a used memory amount, or the like according to an arbitrary condition such as the capacity of a memory, a processing capability of a CPU, a current load situation, or the like.

The compression method will be more specifically described below. In the following, the accuracy of a motion vector is assumed to be a maximum of 4×4 accuracy in the non-compressed state. Further, a non-compressed motion vector is assumed to be compressed (1/4 compressed) with a 16×16 accuracy for the TMVP (or for the TMVP and the IVMP).

<Syntax>

When any one of a plurality of methods is selected as described above, the encoding side and the decoding side have to select the same method. In this regard, in order to cause the encoding side and the decoding side to share a selected method, information (for example, a flag) indicating a selected method may be transmitted from the encoding side to the decoding side. For example, a 1-bit flag indicating which of the method of FIG. 4 and the method of FIG. 5 is selected may be generated at the encoding side and then transmitted to the decoding side. The decoding side can perform decoding based on the value of the flag, select the same method as the method employed at the encoding side, and then appropriately perform decoding.

In this case, the flag can be transmitted by an arbitrary method. For example, the flag may be transmitted through a sequence parameter set (Sep_parameter_set) as in a syntax illustrated in FIG. 44.

In the case of the example of FIG. 44, the image coding device generates the flag, stores "sps_my_compression_flag" in the sequence parameter set as the flag, and transmits the flag. The image decoding device extracts "sps_my_compression_flag" from bit streams, and selects the same method as the method employed by the image coding device with reference to the value.

<Image Coding Device>

Figure 45:
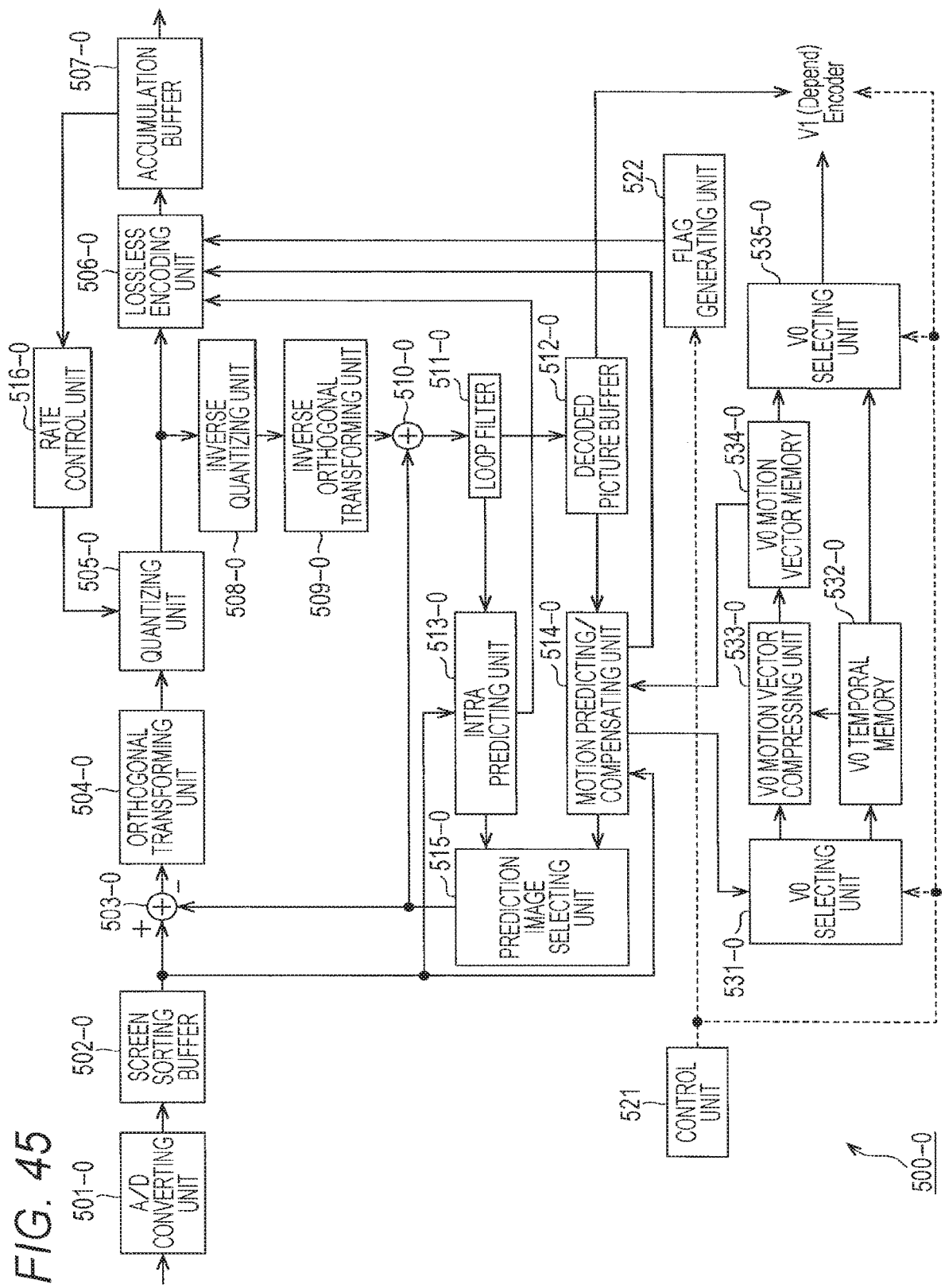
FIG. 45 is a block diagram illustrating an exemplary main configuration of a V0 image coding device.
Figure 46:
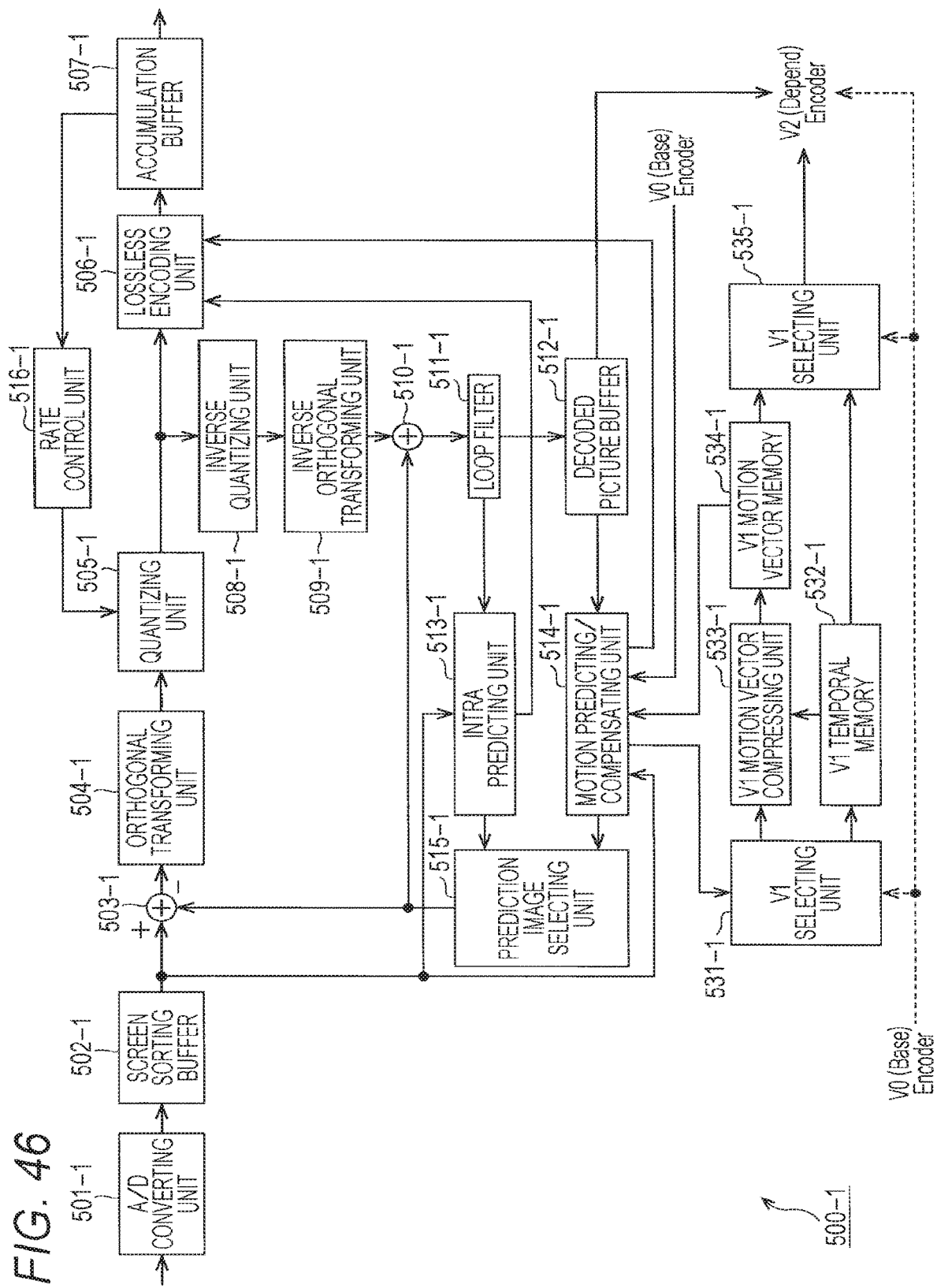
FIG. 46 is a block diagram illustrating an exemplary main configuration of a V1 image coding device.
Figure 47:
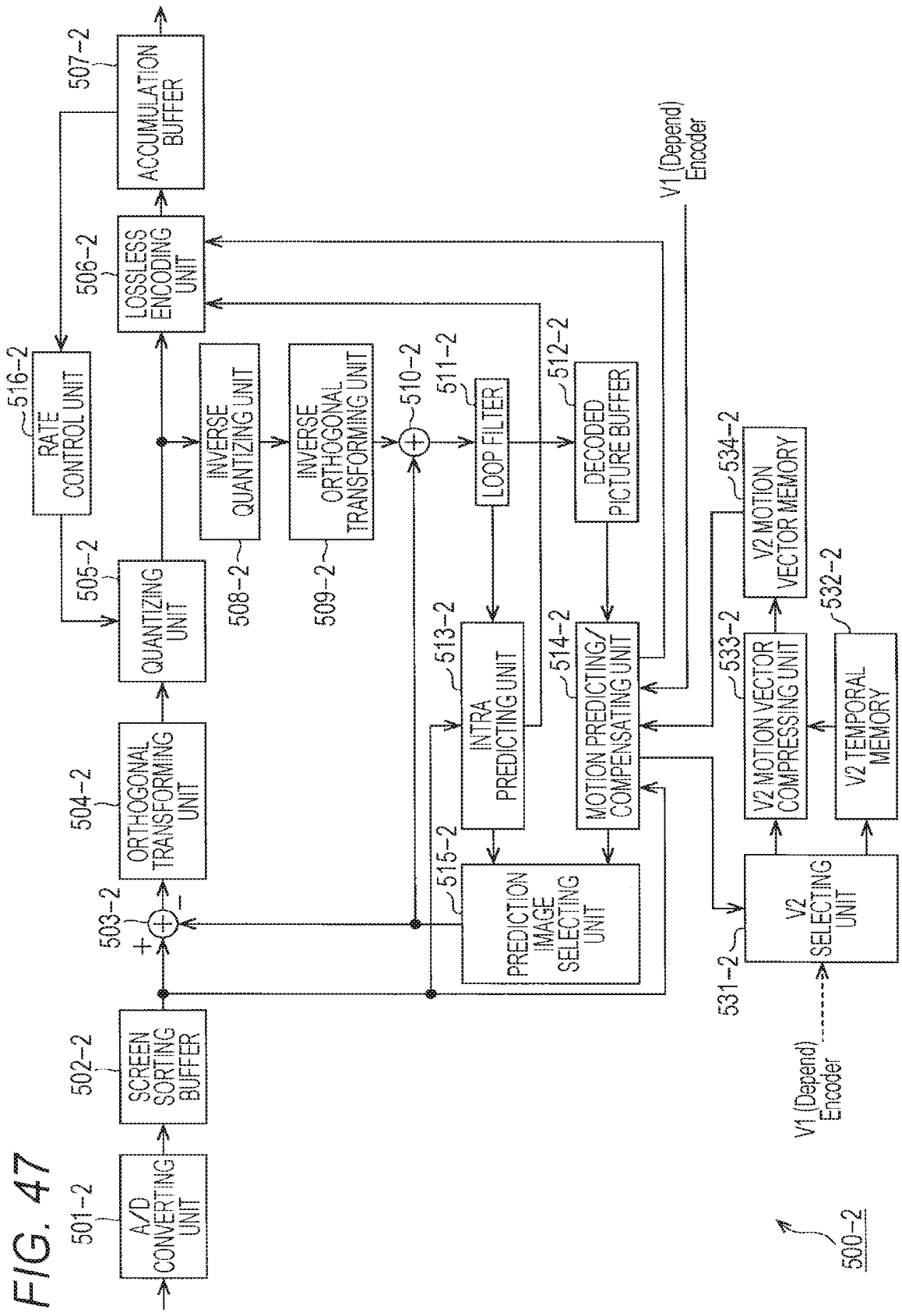
FIG. 47 is a block diagram illustrating an exemplary main configuration of a V2 image coding device.

FIG. 45 is a block diagram illustrating an exemplary main configuration of the V0 image coding device. FIG. 46 is a block diagram illustrating an exemplary main configuration of the V1 image coding device. FIG. 47 is a block diagram illustrating an exemplary main configuration of the V2 image coding device.

An image coding device 500 (not illustrated) encodes a moving image including a plurality of layers such as the multi-view image illustrated in FIG. 2. The image coding device 500 includes a V0 image coding device 500-0 of FIG. 45, a V1 image coding device 500-1 of FIG. 46, and a V2 image coding device 500-3 of FIG. 47 in order to encode views of a multi-view image. The V0 image coding device 500-0 encodes an image of a view 0. The V1 image coding device 500-1 encodes an image of a view 1. The V2 image coding device 500-2 encodes t an image of a view 2.

The V0 image coding device 500-0 includes an A/D converting unit 501-0, a screen sorting buffer 502-0, an operation unit 503-0, an orthogonal transforming unit 504-0, a quantizing unit 505-0, a lossless encoding unit 506-0, an accumulation buffer 507-0, an inverse quantizing unit 508-0, and an inverse orthogonal transforming unit 509-0 as illustrated in FIG. 45. The V0 image coding device 500-0 further includes an operation unit 510-0, a loop filter 511-0, a decoded picture buffer 512-0, an intrapredicting unit 513-0, a motion predicting/compensating unit 514-0, a prediction image selecting unit 515-0, and a rate control unit 516-0.

The V1 image coding device 500-1 includes an A/D converting unit 501-1, a screen sorting buffer 502-1, an operation unit 503-1, an orthogonal transforming unit 504-1, a quantizing unit 505-1, a lossless encoding unit 506-1, an accumulation buffer 507-1, an inverse quantizing unit 508-1, and an inverse orthogonal transforming unit 509-1 as illustrated in FIG. 46. The V1 image coding device 500-1 further includes an operation unit 510-1, a loop filter 511-1, a decoded picture buffer 512-1, an intra predicting unit 513-1, a motion predicting/compensating unit 514-1, a prediction image selecting unit 515-1, and a rate control unit 516-1.

The V2 image coding device 500-2 includes an A/D converting unit 501-2, a screen sorting buffer 502-2, an operation unit 503-2, an orthogonal transforming unit 504-2, a quantizing unit 505-2, a lossless encoding unit 506-2, an accumulation buffer 507-2, an inverse quantizing unit 508-2, and an inverse orthogonal transforming unit 509-2 as illustrated in FIG. 47. The V2 image coding device 500-2 further includes an operation unit 510-2, a loop filter 511-2, a decoded picture buffer 512-2, an intra predicting unit 513-2, a motion predicting/compensating unit 514-2, a prediction image selecting unit 515-2, and a rate control unit 516-2.

Hereinafter, when the A/D converting units 501-0 to 501-2 need not be distinguished from one another, they are referred to simply as an "A/D converting unit 501." Further, when the screen sorting buffers 502-0 to 02-2 need not be distinguished from one another, they are referred to simply as a "screen sorting buffer 502." Further, when the operation units 503-0 to 503-2 need not be distinguished from one another, they are referred to simply as an "operation unit 503." Further, when the orthogonal transforming units 504-0 to 504-2 need not be distinguished from one another, they are referred to simply as an "orthogonal transforming unit 504." Further, when the quantizing units 505-0 to 505-2 need not be distinguished from one another, they are referred to simply as a "quantizing unit 505." Further, when the lossless encoding units 506-0 to 506-2 need not be distinguished from one another, they are referred to simply as a "lossless encoding unit 506." Further, when the accumulation buffers 507-0 to 507-2 need not be distinguished from one another, they are referred to simply as an "accumulation buffer 507." Further, when the inverse quantizing units 508-0 to 508-2 need not be distinguished from one another, they are referred to simply as an "inverse quantizing unit 508." Further, when the inverse orthogonal transforming units 509-0 to 509-2 need not be distinguished from one another, they are referred to simply as an "inverse orthogonal transforming unit 509."

Further, when the operation units 510-0 to 510-2 need not be distinguished from one another, they are referred to simply as an "operation unit 510." Further, when the loop filters 511-0 to 511-2 need not be distinguished from one another, they are referred to simply as a "loop filter 511." Further, when the decoded picture buffers 512-0 to 512-2 need not be distinguished from one another, they are referred to simply as a "decoded picture buffer 512." Further, when the intra predicting units 513-0 to 513-2 need not be distinguished from one another, they are referred to simply as an "intra predicting unit 513." Further, when the motion predicting/compensating units 514-0 to 514-2 need not be distinguished from one another, they are referred to simply as a "motion predicting/compensating unit 514." Further, when the prediction image selecting units 515-0 to 515-2 need not be distinguished from one another, they are referred to simply as a "prediction image selecting unit 515." Further, when the rate control units 516-0 to 516-2 need not be distinguished from one another, they are referred to simply as a "rate control unit 516."

The A/D converting unit 501 corresponds to the A/D converting unit 101, and performs basically the same process as the A/D converting unit 101. The screen sorting buffer 502 corresponds to the screen sorting buffer 102, and performs basically the same process as the screen sorting buffer 102. The operation unit 503 corresponds to the operation unit 103, and performs basically the same process as the operation unit 103. The orthogonal transforming unit 504 corresponds to the orthogonal transforming unit 104, and performs basically the same process as the orthogonal transforming unit 104. The quantizing unit 505 corresponds to the quantizing unit 105, and performs basically the same process as the quantizing unit 105. The lossless encoding unit 506 corresponds to the lossless encoding unit 106, and performs basically the same process as the lossless encoding unit 106. The accumulation buffer 507 corresponds to the accumulation buffer 107, and performs basically the same process as the accumulation buffer 107.

The inverse quantizing unit 508 corresponds to the inverse quantizing unit 108, and performs basically the same process as the inverse quantizing unit 108. The inverse orthogonal transforming unit 509 corresponds to the inverse orthogonal transforming unit 109, and performs basically the same process as the inverse orthogonal transforming unit 109. The operation unit 510 corresponds to the operation unit 110, and performs basically the same process as the operation unit 110. The loop filter 511 corresponds to the loop filter 111, and performs basically the same process as the loop filter 111. The decoded picture buffer 512 corresponds to the decoded picture buffer 112, and performs basically the same process as the decoded picture buffer 112.

The intra predicting unit 513 corresponds to the intra predicting unit 113, and performs basically the same process as the intra predicting unit 113. The motion predicting/compensating unit 514 corresponds to the motion predicting/compensating unit 114, and performs basically the same process as the motion predicting/compensating unit 114. The prediction image selecting unit 515 corresponds to the prediction image selecting unit 115, and performs basically the same process as the prediction image selecting unit 115.

The V0 image coding device 500-0 further includes a control unit 521, a flag generating unit 522, a V0 selecting unit 531-0, a V0 temporal memory 532-0, a V0 motion vector compressing unit 533-0, a V0 motion vector memory 534-0, and a V0 selecting unit 535-0.

The V1 image coding device 500-1 further includes a V1 selecting unit 531-1, a V1 temporal memory 532-1, a V1 motion vector compressing unit 533-1, a V1 motion vector memory 534-1, and a V1 selecting unit 535-1.

The V2 image coding device 500-2 further includes a V2 selecting unit 531-2, a V2 temporal memory 532-2, a V2 motion vector compressing unit 533-2, and a V2 motion vector memory 534-2.

The control unit 521 decides whether or not the motion vector for the IVMP is compressed based on an instruction given from the outside such as the user or another device, a certain condition determination result, or the like. In other words, the control unit 521 decides which of the method illustrated in FIG. 4 and the method illustrated in FIG. 5 is selected. When it is decided whether or not the motion vector is compressed, the control unit 521 supplies information indicating whether or not the motion vector is compressed to the flag generating unit 522.

The flag generating unit 522 generates a flag indicating a method notified from the control unit 521. The flag generating unit 522 supplies the generated flag to the lossless encoding unit 506-0. The lossless encoding unit 506-0 includes the supplied flag in the sequence parameter set, and transmits the resultant sequence parameter set to the decoding side.

The control unit 521 controls selection (switching) of the V0 selecting unit 531-0, the V0 selecting unit 535-0, the V1 selecting unit 531-1, the V1 selecting unit 535-1, and the V2 selecting unit 531-2 according to the decided method.

When the control unit 521 selects a method in which the motion vector for the IVMP is compressed, the V0 selecting unit 531-0 selects the V0 motion vector compressing unit 533-0 according to control of the control unit 521, and the V0 selecting unit 535-0 selects the V0 motion vector memory 534-0 according to control of the control unit 521. The V1 selecting unit 531-1 selects the V1 motion vector compressing unit 533-1 according to control of the control unit 521, and the V1 selecting unit 535-1 selects the V1 motion vector memory 534-1 according to control of the control unit 521. The V2 selecting unit 531-2 selects the V2 motion vector compressing unit 533-2 according to control of the control unit 521.

In this case, the motion predicting/compensating unit 514-0 supplies a non-compressed V0 motion vector (a maximum of 4×4 accuracy) of a current block generated by motion prediction to the V0 motion vector compressing unit 533-0 via the V0 selecting unit 531-0. The V0 motion vector compressing unit 533-0 performs $\frac{1}{16}$ compressed on the non-compressed V0 motion vector supplied from the motion predicting/compensating unit 514-0, and supplies an obtained $\frac{1}{16}$-compressed V0 motion vector to the V0 motion vector memory 534-0. The V0 motion vector memory 534-0 stores the supplied $\frac{1}{16}$-compressed V0 motion vector. The V0 motion vector memory 534-0 appropriately supplies the stored $\frac{1}{16}$-compressed V0 motion vector to the motion predicting/compensating unit 514-0 as a motion vector of a temporally neighboring block. Further, the V0 motion vector memory 534-0 appropriately supplies the stored ¹⁄₁₆-compressed V0 motion vector to the motion predicting/compensating unit 514-1 as a motion vector of a block neighboring in terms of a view via the V0 selecting unit 535-0.

The motion predicting/compensating unit 514-1 supplies a non-compressed V1 motion vector (a maximum of 4×4 accuracy) of a current block generated by motion prediction to the V1 motion vector compressing unit 533-1 via the V1 selecting unit 531-1. The V1 motion vector compressing unit 533-1 performs ¹⁄₁₆ compressed on the non-compressed V1 motion vector supplied from the motion predicting/compensating unit 514-1, and supplies an obtained ¹⁄₁₆-compressed V1 motion vector to the V1 motion vector memory 534-1. The V1 motion vector memory 534-1 stores the supplied ¹⁄₁₆-compressed V1 motion vector. The V1 motion vector memory 534-1 appropriately supplies the stored ¹⁄₁₆-compressed V1 motion vector to the motion predicting/compensating unit 514-1 as a motion vector of a temporally neighboring block. Further, the V1 motion vector memory 534-1 appropriately supplies the stored ¹⁄₁₆-compressed V1 motion vector to the motion predicting/compensating unit 514-2 as a motion vector of a block neighboring in terms of a view via the V1 selecting unit 535-1.

The motion predicting/compensating unit 514-2 supplies a non-compressed V2 motion vector (a maximum of 4×4 accuracy) of a current block generated by motion prediction to the V2 motion vector compressing unit 533-2 via the V2 selecting unit 531-2. The V2 motion vector compressing unit 533-2 performs ¹⁄₁₆ compressed on the non-compressed V2 motion vector supplied from the motion predicting/compensating unit 514-2, and supplies the obtained ¹⁄₁₆-compressed V2 motion vector to the V2 motion vector memory 534-2. The V2 motion vector memory 534-2 stores the supplied ¹⁄₁₆-compressed V2 motion vector. The V2 motion vector memory 534-2 appropriately supplies the stored ¹⁄₁₆-compressed V2 motion vector to the motion predicting/compensating unit 514-2 as a motion vector of a temporally neighboring block.

In other words, in this case, the image coding device 500 is configured to perform the same method as the method (for example, FIG. 5) described in the first embodiment.

When the control unit 521 selects a method in which the motion vector for the IVMP is not compressed, the V0 selecting unit 531-0 and the V0 selecting unit 535-0 select the V0 temporal memory 532-0 according to control of the control unit 521. The V1 selecting unit 531-1 and the V1 selecting unit 535-1 select the V1 temporal memory 532-0 according to control of the control unit 521. The V2 selecting unit 531-2 selects the V2 temporal memory 532-2 according to control of the control unit 521.

In this case, the motion predicting/compensating unit 514-0 supplies a non-compressed V0 motion vector (a maximum of 4×4 accuracy) of a current block generated by motion prediction to the V0 temporal memory 532-0 via the V0 selecting unit 531-0. The V0 temporal memory 532-0 appropriately supplies the stored non-compressed V0 motion vector to the motion predicting/compensating unit 514-1 as a motion vector of a block neighboring in terms of a view via the V0 selecting unit 535-0. Further, the V0 temporal memory 532-0 appropriately supplies the stored non-compressed V0 motion vector to the V0 motion vector compressing unit 533-0. The V0 motion vector compressing unit 533-0 reads the non-compressed V0 motion vector from the V0 temporal memory 532-0, performs ¹⁄₁₆ compressed, and supplies an obtained ¹⁄₁₆-compressed V0 motion vector to the V0 motion vector memory 534-0. The V0 motion vector memory 534-0 stores the supplied ¹⁄₁₆-compressed V0 motion vector. The V0 motion vector memory 534-0 appropriately supplies the stored ¹⁄₁₆-compressed V0 motion vector to the motion predicting/compensating unit 514-0 as a motion vector of a temporally neighboring block.

The motion predicting/compensating unit 514-1 supplies a non-compressed V1 motion vector (a maximum of 4×4 accuracy) of a current block generated by motion prediction to the V1 temporal memory 532-1 via the V1 selecting unit 531-1. The V1 temporal memory 532-1 appropriately supplies the stored non-compressed V1 motion vector to the motion predicting/compensating unit 514-2 as a motion vector of a block neighboring in terms of a view via the V1 selecting unit 535-1. Further, the V1 temporal memory 532-1 appropriately supplies the stored non-compressed V1 motion vector to the V1 motion vector compressing unit 533-1. The V1 motion vector compressing unit 533-1 performs ¹⁄₁₆ compressed on the non-compressed V1 motion vector supplied from the V1 temporal memory 532-1, and supplies the obtained ¹⁄₁₆-compressed V1 motion vector to the V1 motion vector memory 534-1. The V1 motion vector memory 534-1 stores the supplied ¹⁄₁₆-compressed V1 motion vector. The V1 motion vector memory 534-1 appropriately supplies the stored ¹⁄₁₆-compressed V1 motion vector to the motion predicting/compensating unit 514-1 as a motion vector of a temporally neighboring block.

The motion predicting/compensating unit 514-2 supplies a non-compressed V2 motion vector (a maximum of 4×4 accuracy) of a current block generated by motion prediction to the V2 temporal memory 532-2 via the V2 selecting unit 531-2. The V2 temporal memory 532-2 appropriately supplies the stored non-compressed V2 motion vector to the V2 motion vector compressing unit 533-2. The V2 motion vector compressing unit 533-2 performs ¹⁄₁₆ compressed on the non-compressed V2 motion vector supplied from the V2 temporal memory 532-2, and supplies the obtained ¹⁄₁₆-compressed V2 motion vector to the V2 motion vector memory 534-2. The V2 motion vector memory 534-2 stores the supplied ¹⁄₁₆-compressed V2 motion vector. The V2 motion vector memory 534-2 appropriately supplies the stored ¹⁄₁₆-compressed V2 motion vector to the motion predicting/compensating unit 514-2 as a motion vector of a temporally neighboring block.

In other words, in this case, the image coding device 500 is configured to perform the same method as the method (for example, FIG. 4) of the related art.

As described above, as it is possible to control a method of compressing a motion vector, it is possible to adaptively suppress an increase in a storage capacity necessary for encoding and decoding.

<Coding Process Flow>

Next, a flow of processing performed by the image coding device 500 will be described. An exemplary flow of the coding process performed by the image coding device 500 will be described with reference to a flowchart of FIG. 48.

When the coding process starts, in step S3001, the control unit 521 of the V0 image coding device 500-0 performs a setting (a setting as to whether or not a motion vector for the IVMP is compressed) for compression of a motion vector for the IVMP. In step S3002, the flag generating unit 522 generates a motion vector compression flag indicating whether or not the motion vector for the IVMP is compressed according to the setting of step S3001. The motion vector compression flag is encoded by the lossless encoding unit 506-0. In step S3003, the encoded data of the motion vector compression flag is supplied to and held in the accumulation buffer 507-0 and transmitted to the decoding side at a certain timing.

For a current picture, the V0 image coding device 500-0 performs the V0 coding process in step S3004, the V1 image coding device 500-1 performs the V1 coding process in step S3005, and the V2 image coding device 500-2 performs the V2 coding process in step S3006.

In step S3007, the image coding device 500 determines whether or not all pictures have been processed. When it is determined that there is a non-processed picture, the process returns to step S3004, and the subsequent process is repeated.

The process of step S3004 to step S3007 is repeatedly performed on each picture, and when it is determined in step S3007 that all pictures have been processed, the coding process ends.

<V0 Coding Process Flow>

Next, an exemplary flow of the V0 coding process of encoding the view 0 which is performed in step S3004 of FIG. 48 will be described with reference to flowcharts of FIGS. 49 and 50.

Figure 49:
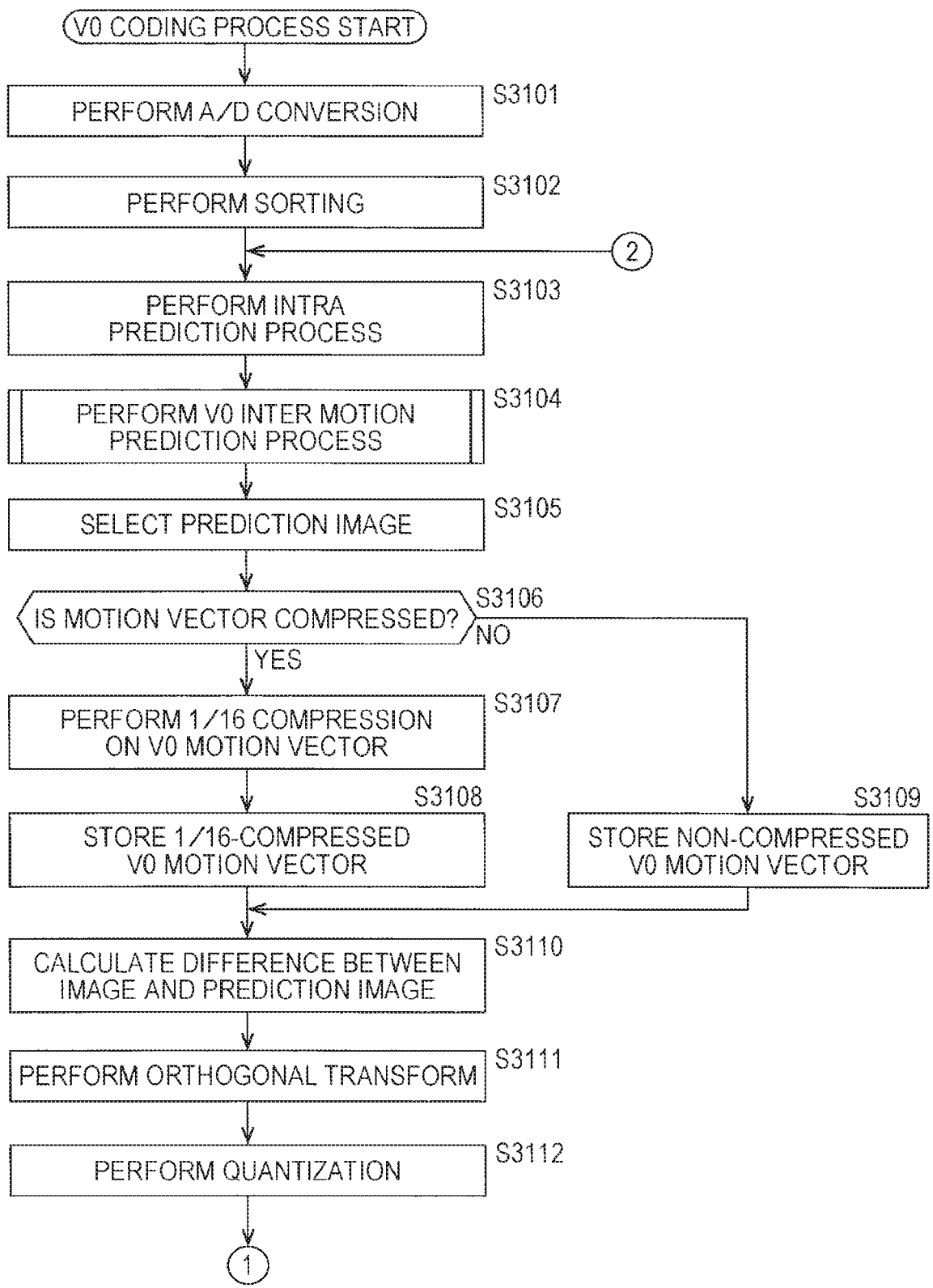
FIG. 49 is a flowchart for describing an exemplary flow of a V0 coding process.

The process of step S3101 to step S3105 of FIG. 49 is performed in the same manner as the process of step S1101 to step S1105 of FIG. 10 through the respective processing units of the V0 image coding device 500-0.

In step S3106, the V0 selecting unit 531-0 determines whether or not a non-compressed V0 motion vector is compressed according to control of the control unit 521. When a non-compressed V0 motion vector is determined to be compressed, the process proceeds to step S3107.

In step S3107, the V0 motion vector compressing unit 533-0 performs ¹/₁₆ compressed on the non-compressed V0 motion vector. In step S3108, the V0 motion vector memory 534-0 stores a ¹/₁₆-compressed V0 motion vector generated by the process of step S3107. When the process of step S3108 ends, the process proceeds to step S3110.

However, when the non-compressed V0 motion vector is determined not to be compressed in step S3106, the process proceeds to step S3109. In step S3109, the V0 temporal memory 532-0 stores the non-compressed V0 motion vector. When the process of step S3109 ends, the process proceeds to step S3110.

Figure 50:
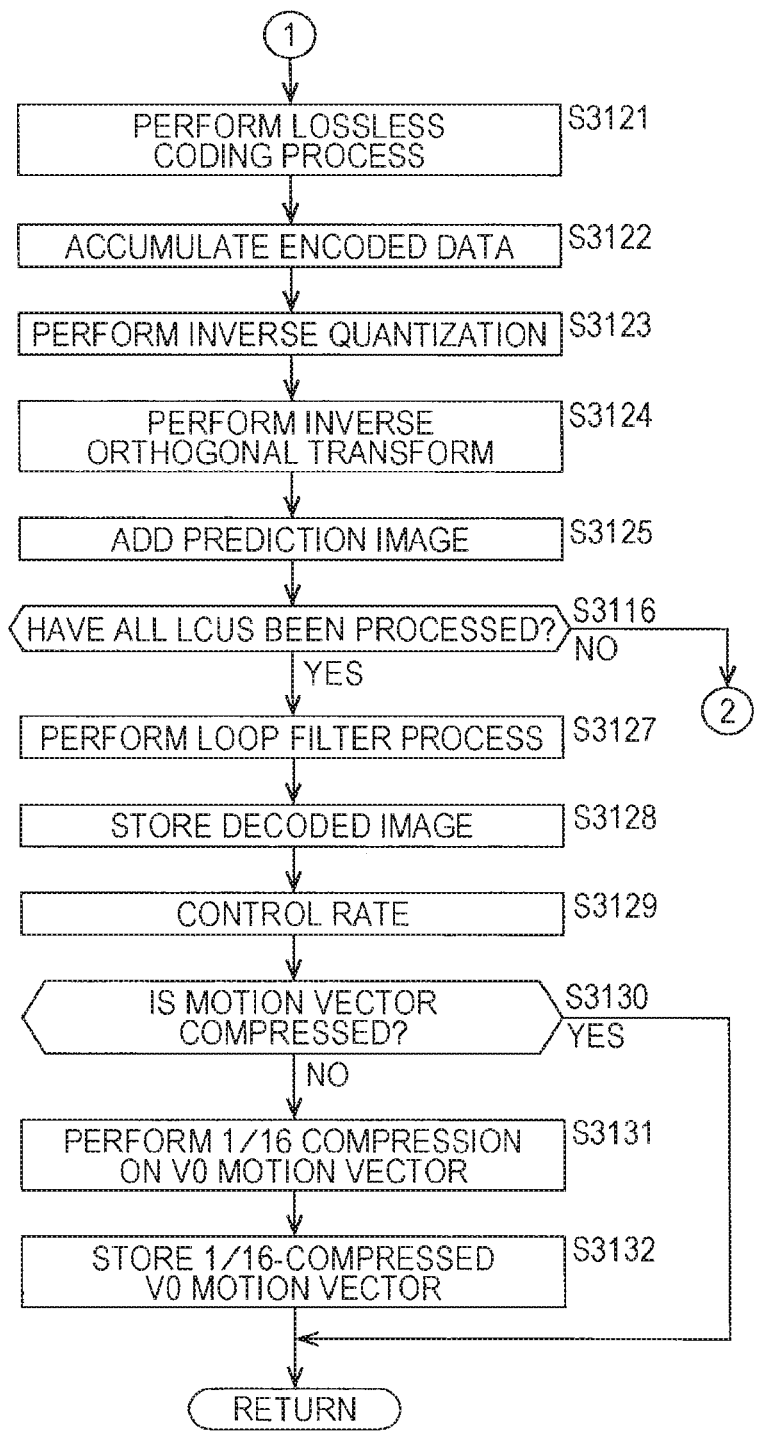
FIG. 50 is a flowchart for describing an exemplary flow of a V0 coding process, subsequently to FIG. 49.

The process of step S3110 to step S3112 of FIG. 49 and the process of step S3121 to step S3129 of FIG. 50 are performed in the same manner as the process of step S1108 to step S1119 of FIG. 10 through the respective processing units of the image coding device 500-0.

Next, in step S3130 of FIG. 50, the V0 selecting unit 535-0 determines whether or not a motion vector for the IVMP is compressed according to control of the control unit 521. This determination is performed in the same manner as in step S3106 of FIG. 49. When a motion vector for the IVMP is determined to be not compressed, that is, when a motion vector is determined to be not compressed even in step S3106 of FIG. 49, the process proceeds to step S3131.

In this case, the non-compressed V0 motion vector is stored in the V0 temporal memory 532-0 by the process of step S3109 of FIG. 49. In this regard, in step S3131, the V0 motion vector compressing unit 533-0 reads the non-compressed V0 motion vector from the V0 temporal memory 532-0, and performs ¹/₁₆ compressed. In step S3132, the V0 motion vector memory 534-0 stores the ¹/₁₆-compressed V0 motion vector calculated in step S3131.

In this case, the non-compressed V0 motion vector stored in the V0 temporal memory 532-0 is used for the IVMP by the motion predicting/compensating unit 514-1. Further, the ¹/₁₆-compressed V0 motion vector stored in the V0 motion vector memory 534-0 is used for the TMVP by the motion predicting/compensating unit 514-0.

Figure 48:
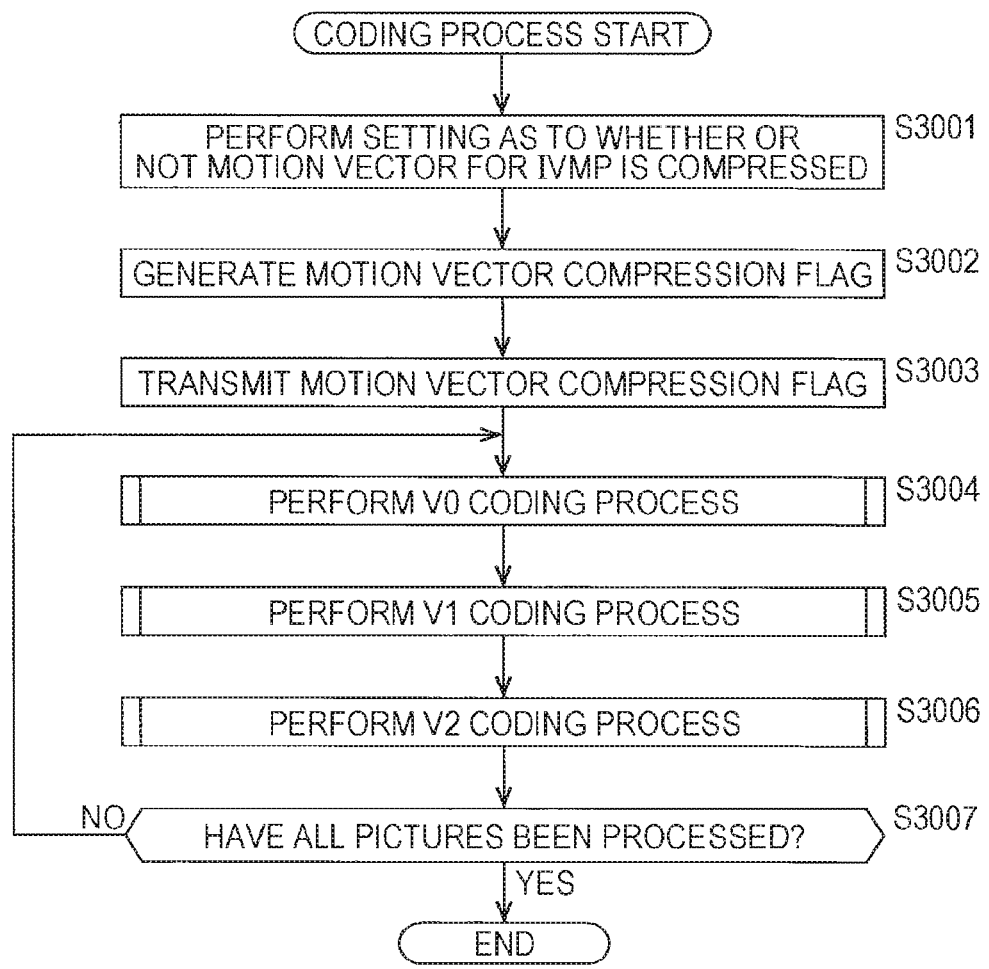
FIG. 48 is a flowchart for describing an exemplary flow of the coding process.

When the process of step S3132 ends, the V0 coding process ends, and the process returns to FIG. 48.

However, when a motion vector is determined to be compresses in step S3130 of FIG. 50, that is, when a motion vector is determined to be compressed even in step S3106 of FIG. 49, the V0 coding process ends, and the process returns to FIG. 48.

In this case, the ¹/₁₆-compressed V0 motion vector stored in the V0 motion vector memory 534-0 is used for the TMVP by the motion predicting/compensating unit 514-0 and also used for the IVMP by the motion predicting/compensating unit 514-1.

The V0 inter motion prediction process performed in step S3104 of FIG. 49 is performed by the motion predicting/compensating unit 514-0 in the same manner as in the first embodiment (FIG. 11), and thus a description thereof is omitted.

<V1 Coding Process Flow>

Figure 51:
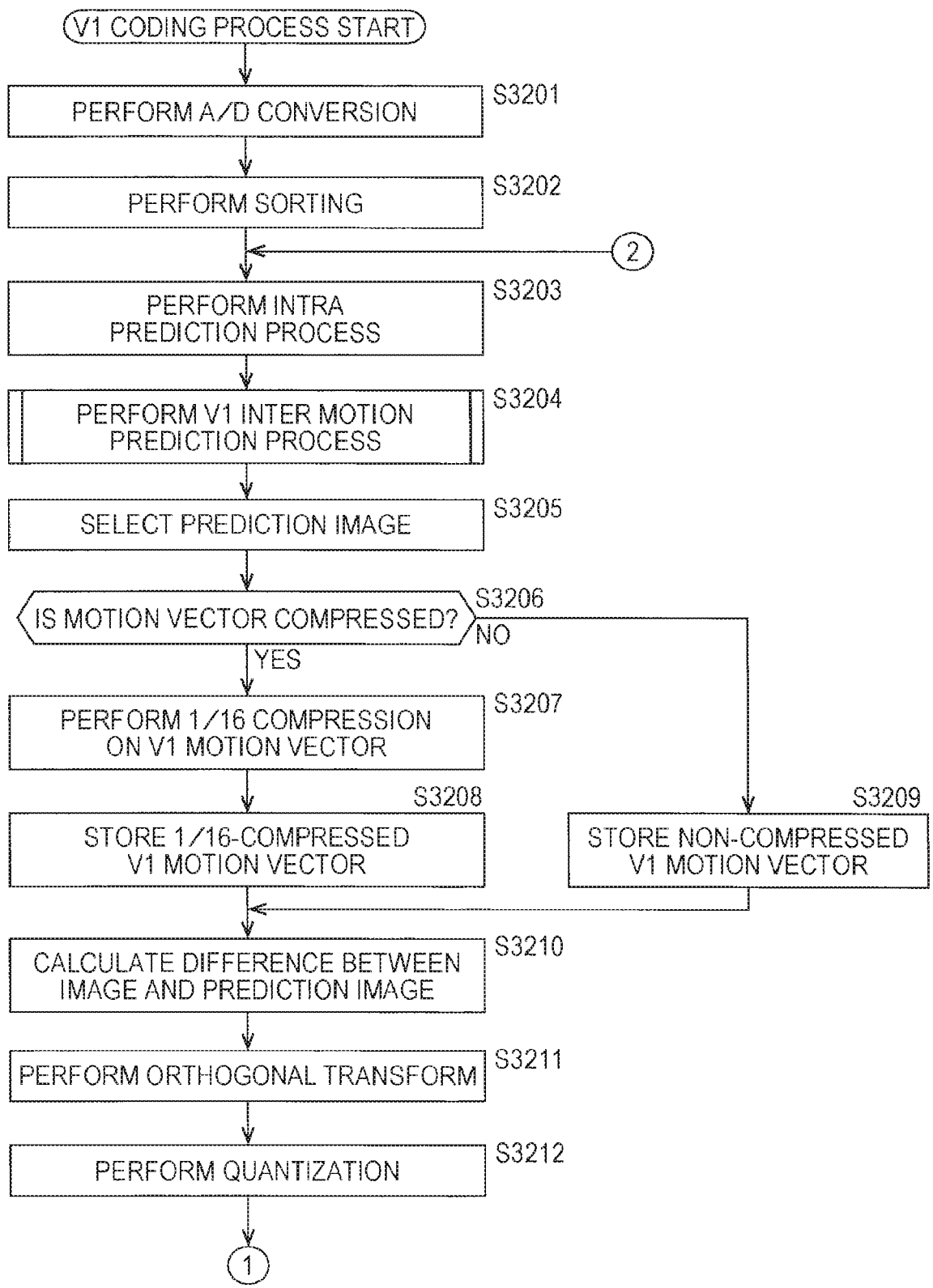
FIG. 51 is a flowchart for describing an exemplary flow of a V1 coding process.
Figure 52:
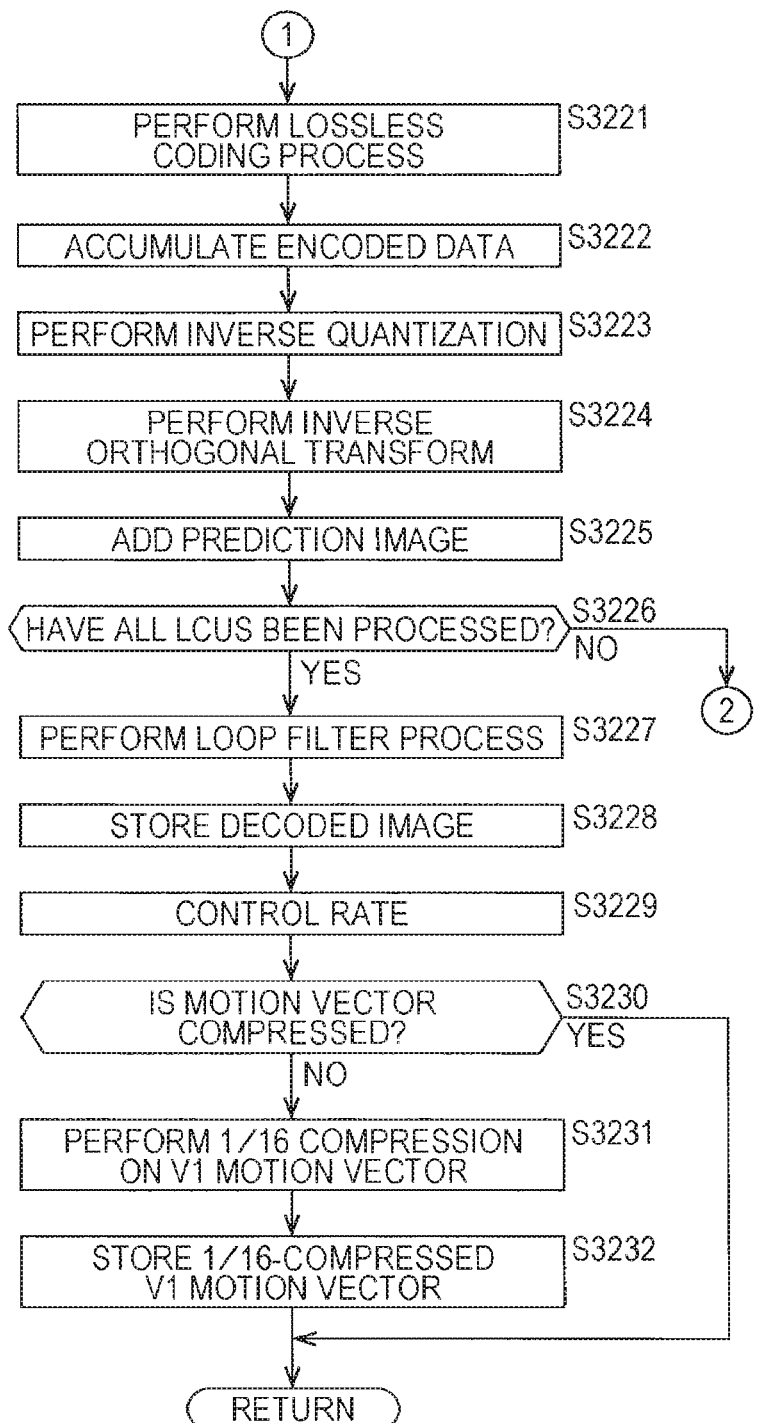
FIG. 52 is a flowchart for describing an exemplary flow of a V1 coding process, subsequently to FIG. 51.

Next, an exemplary flow of the V1 coding process of encoding the view 1 which is performed in step S3005 of FIG. 48 will be described with reference to flowcharts of FIGS. 51 and 52.

A difference between the process for the view 0 and the process for the view 1 mainly lies in the inter motion prediction process. Thus, as illustrated in FIG. 51, the V1 image coding device 500-1 performs the V1 coding process for the view 1 basically in the same manner as the V0 coding process for the view 0 (FIGS. 49 and 50). In other words, the process of step S3201 to step S3212 of FIG. 51 and the process of step S3221 to step S3232 of FIG. 52 are performed basically in the same manner as the process of step S3101 to step S3112 of FIG. 49 and the process of step S3121 to step S3132 of FIG. 50. Thus, the description of FIGS. 51 and 52 may proceed such that the respective components of the V0 image coding device 500-0 described with reference to FIGS. 49 and 50 are replaced with the respective components of the V1 image coding device 500-1, and the process for the view 0 illustrated in FIGS. 49 and 50 is replaced with the process for the view 1, and thus a description thereof is omitted.

<V1 Inter Motion Prediction Process Flow>

Next, an exemplary flow of the V1 inter motion prediction process performed in step S3204 of FIG. 51 will be described with reference to a flowchart of FIG. 53.

When the V1 inter motion prediction process starts, the process of step S3251 to step S3253 is performed basically in the same manner as the process of step S1231 to step S1233 of FIG. 13. Here, in this case, the V1 inter motion prediction process is performed by the motion predicting/compensating unit 514-1.

Further, in this case, it is selected whether a motion vector for the IVMP is compressed. In other words, in step S3254 of FIG. 53, the motion predicting/compensating unit 514-1 determines whether or not a motion vector is compressed according to control of the control unit 521 (that is, selection of the V0 selecting unit 535-0 controlled by the control unit 521). When a motion vector is determined to be compressed, the process proceeds to step S3255.

In step S3255, the motion predicting/compensating unit 514-1 decides an IVMP prediction motion vector candidate using the ¹/₁₆-compressed V0 motion vector acquired from the V0 motion vector memory 534-0. When the candidate is decided, the process proceeds to step S3257.

However, when a motion vector is determined to be not compressed in step S3254, the process proceeds to step S3256.

In step S3256, the motion predicting/compensating unit 514-1 decides an IVMP prediction motion vector candidate using the non-compressed V0 motion vector acquired from the V0 temporal memory 532-0. When the candidate is decided, the process proceeds to step S3257.

Figure 53:
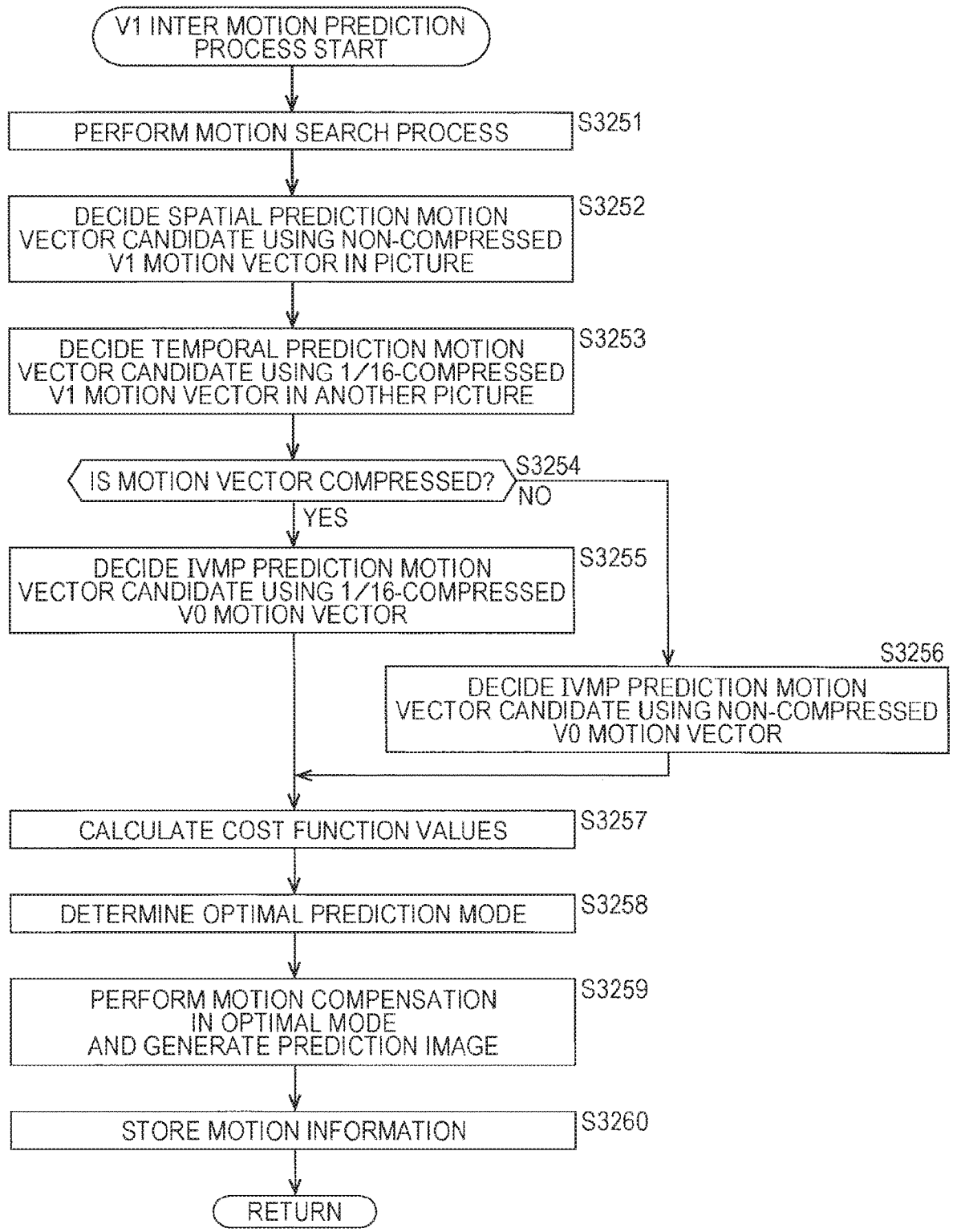
FIG. 53 is a flowchart for describing an exemplary flow of a V1 inter motion prediction process.

The process of step S3257 to step S3260 of FIG. 53 is performed in the same manner as the process of step S1235 to step S1238 of FIG. 13. When the process of step S3260 ends, the V1 inter motion prediction process ends, and the process returns to FIG. 51.

<V2 Coding Process Flow>

Figure 54:
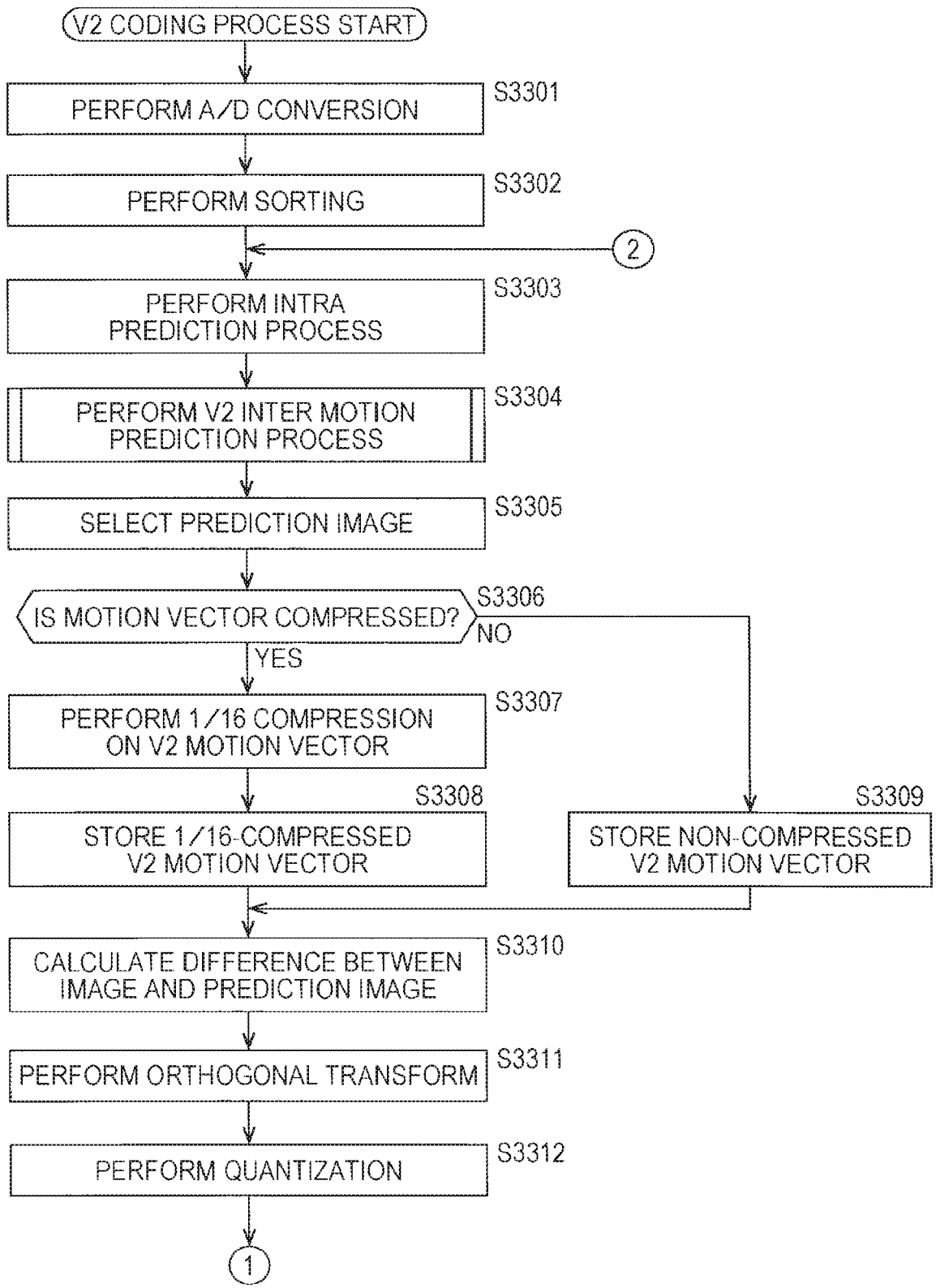
FIG. 54 is a flowchart for describing an exemplary flow of a V2 coding process.
Figure 55:
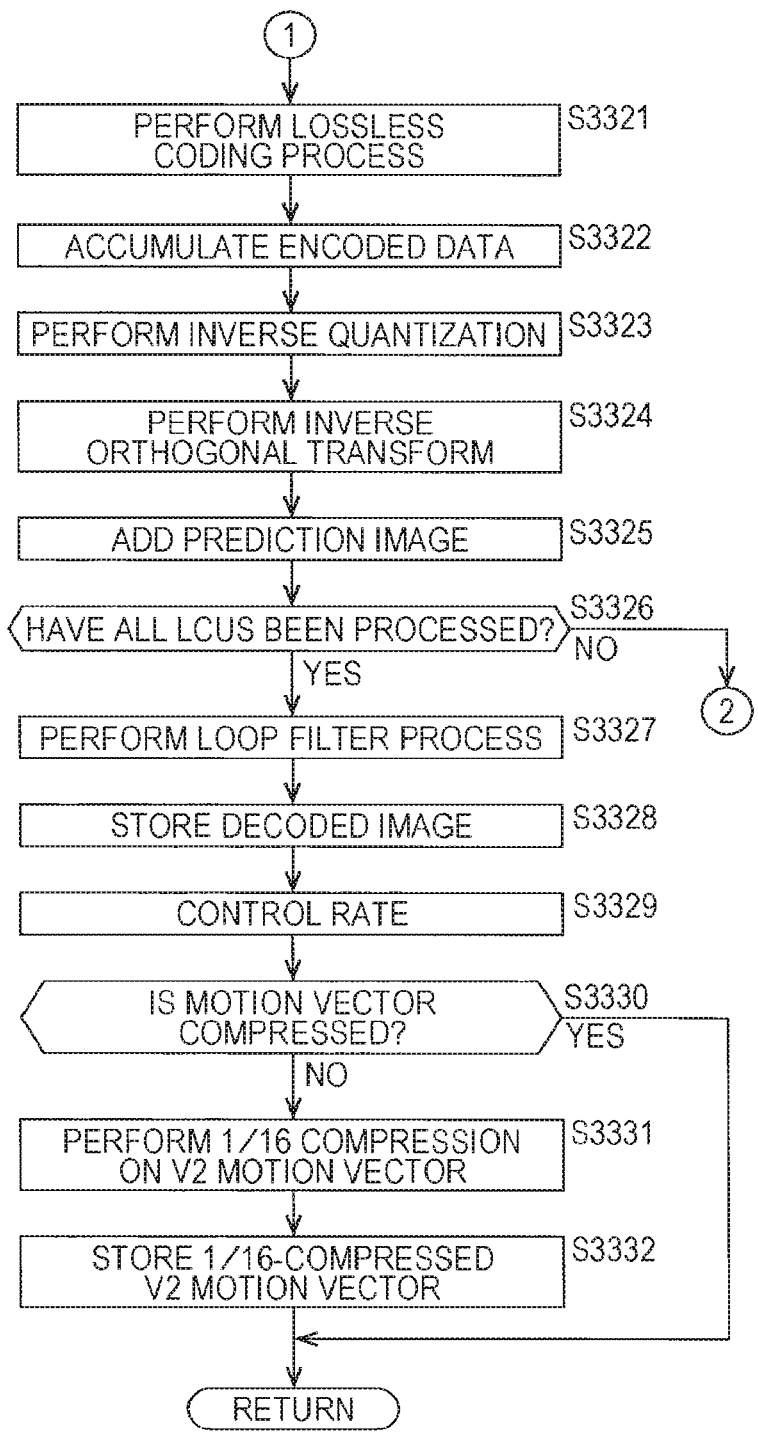
FIG. 55 is a flowchart for describing an exemplary flow of a V2 coding process, subsequently to FIG. 54.

Next, an exemplary flow of the V2 coding process of encoding the view 2 which is performed in step S3006 of FIG. 48 will be described with reference to flowcharts of FIGS. 54 and 55.

The process for the view 2 is performed in the same manner as the process for the view 1. Thus, as illustrated in FIGS. 54 and 55, the V2 image coding device 500-2 performs the V2 coding process basically in the same manner as the V1 coding process for the view 1 (FIGS. 51 and 52). In other words, the process of step S3301 to step S3312 of FIG. 54 and the process of step S3321 to step S3332 of FIG. 55 are performed basically in the same manner as the process of step S3201 to step S3212 of FIG. 51 and the process of step S3221 to step S3232 of FIG. 52. Thus, the description of FIGS. 54 and 55 may proceed such that the respective components of the V1 image coding device 500-1 described with reference to FIGS. 51 and 52 are replaced with the respective components of the V2 image coding device 500-2, and the process for the view 1 illustrated in FIGS. 51 and 52 is replaced with the process for the view 2, and thus a description thereof is omitted.

Since the view 2 is a view that is finally processed among the views 0 to 2, a generated V2 motion vector is not used for the IVMP. Thus, one of the process of step S3307 and step S3308 of FIG. 54 and the process of step S3331 and step S3338 of FIG. 55 is preferably performed. Thus, the other and the determination processes of step S3306 and step S3330 of FIG. 54 may not be performed.

<V2 Inter Motion Prediction Process Flow>

Next, an exemplary flow of the V2 inter motion prediction process performed in step S3304 of FIG. 54 will be described with reference to a flowchart of FIG. 56.

When the V2 inter motion prediction process starts, the process of step S3351 to step S3353 is performed basically in the same manner as the process of step S1331 to step S1333 of FIG. 15. Here, in this case, the V2 inter motion prediction process is performed by the motion predicting/compensating unit 514-2.

Further, in this case, it is selected whether or not a motion vector for the IVMP is compressed. In other words, in step S3354 of FIG. 56, the motion predicting/compensating unit 514-2 determines whether or not a motion vector is compressed according to control of the control unit 521 (that is, selection of the V1 selecting unit 535-1 controlled by the control unit 521). When a motion vector is determined to be compressed, the process proceeds to step S3355.

In step S3355, the motion predicting/compensating unit 514-2 decides an IVMP prediction motion vector candidate using the ⅟₁₆-compressed V1 motion vector acquired from the V1 motion vector memory 534-1. When the candidate is decided, the process proceeds to step S3357.

However, when a motion vector is determined to be not compressed in step S3354, the process proceeds to step S3356.

In step S3356, the motion predicting/compensating unit 514-2 decides an IVMP prediction motion vector candidate using the non-compressed V1 motion vector acquired from the V1 temporal memory 532-1. When the candidate is decided, the process proceeds to step S3357.

Figure 56:
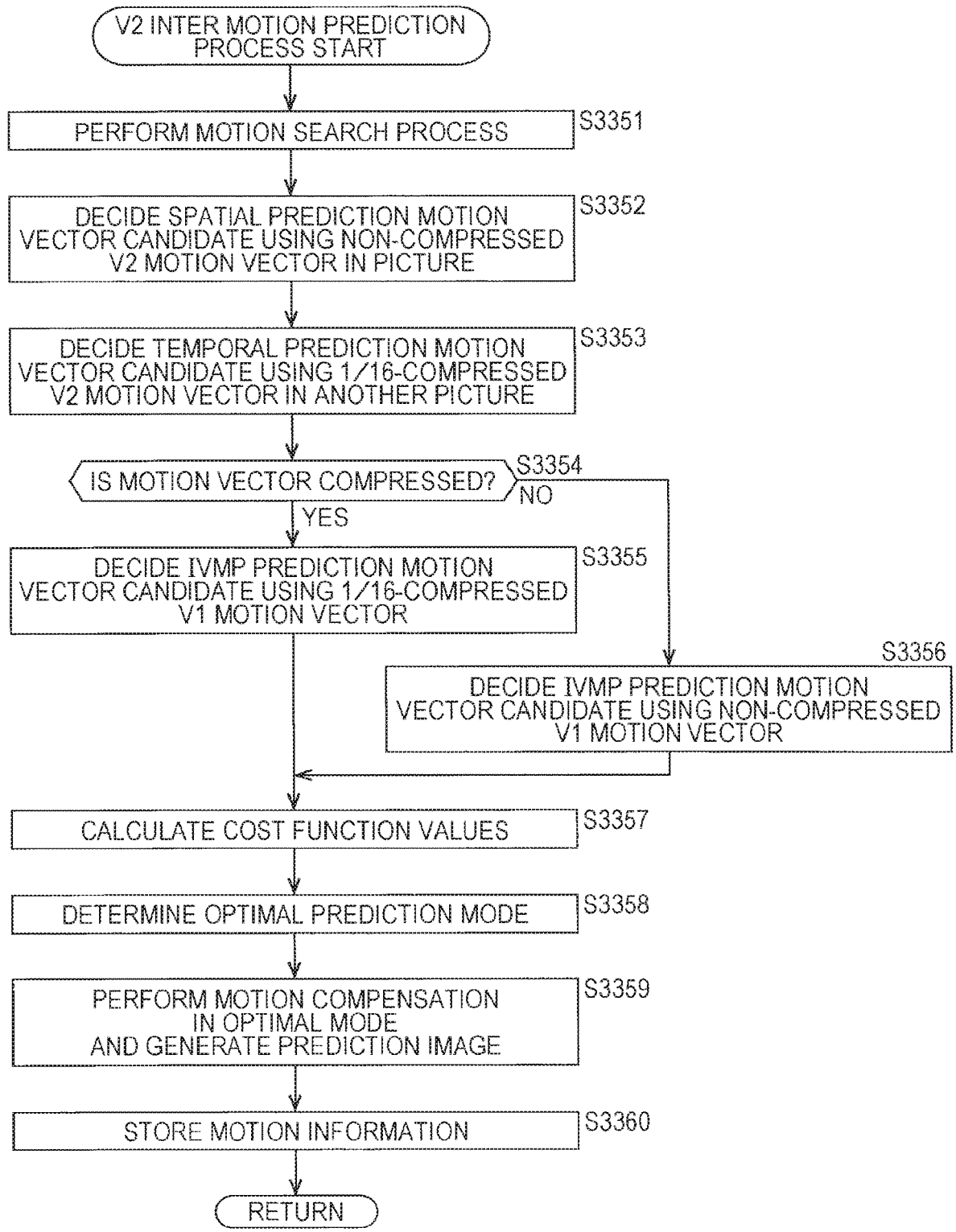
FIG. 56 is a flowchart for describing an exemplary flow of a V2 inter motion prediction process.

The process of step S3357 to step S3360 of FIG. 56 is performed in the same manner as the process of step S1335 to step S1338 of FIG. 15. When the process of step S3360 ends, the V2 inter motion prediction process ends, and the process returns to FIG. 54.

As the process is performed as described above, the image coding device 500 can more adaptively reduce the memory capacity necessary for the motion vectors for the IVMP and more adaptively suppress an increase in a storage capacity necessary for encoding and decoding.

<Image Decoding Device>

Figure 57:
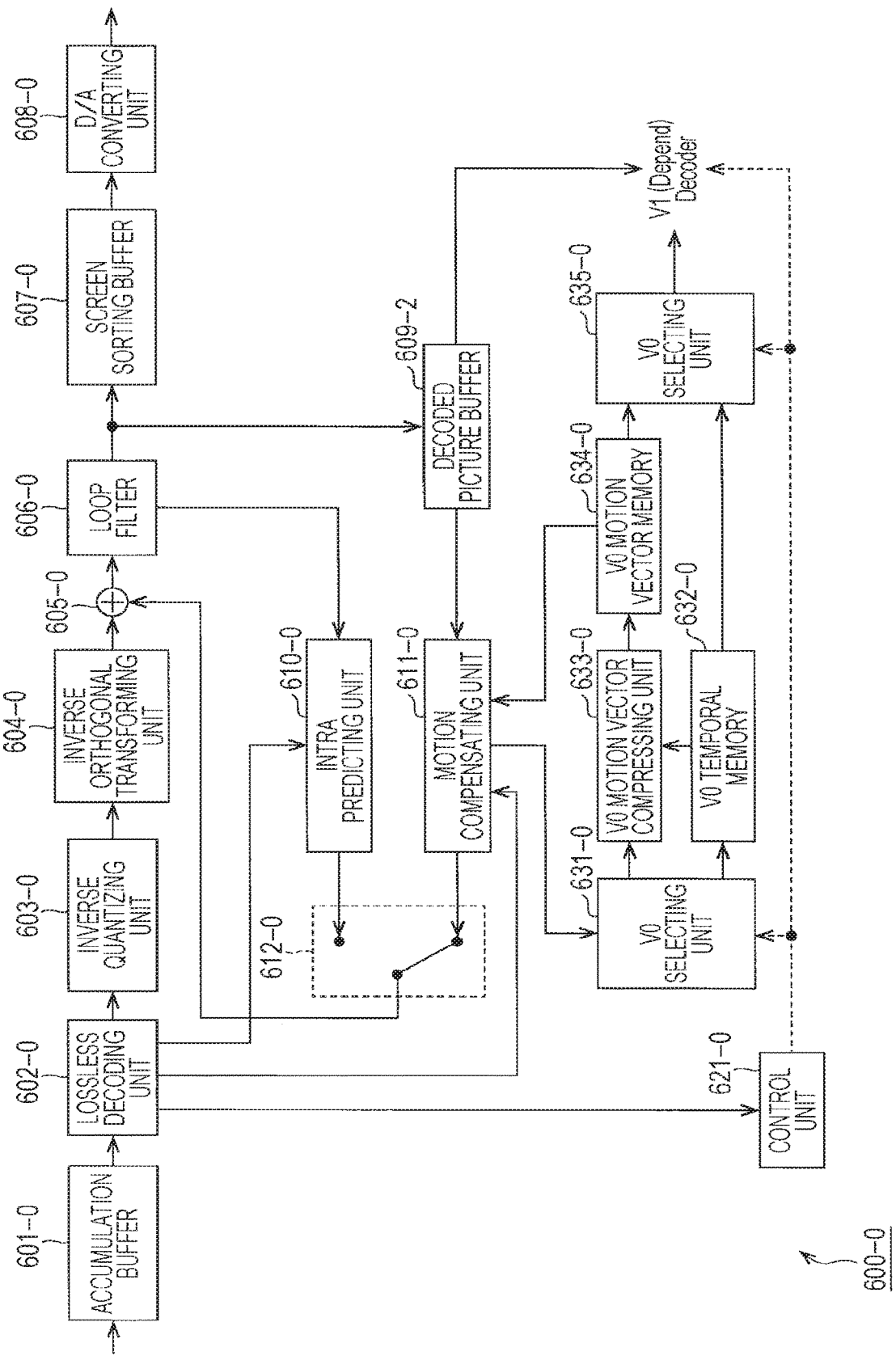
FIG. 57 is a block diagram illustrating an exemplary main configuration of a V0 image decoding device.
Figure 58:
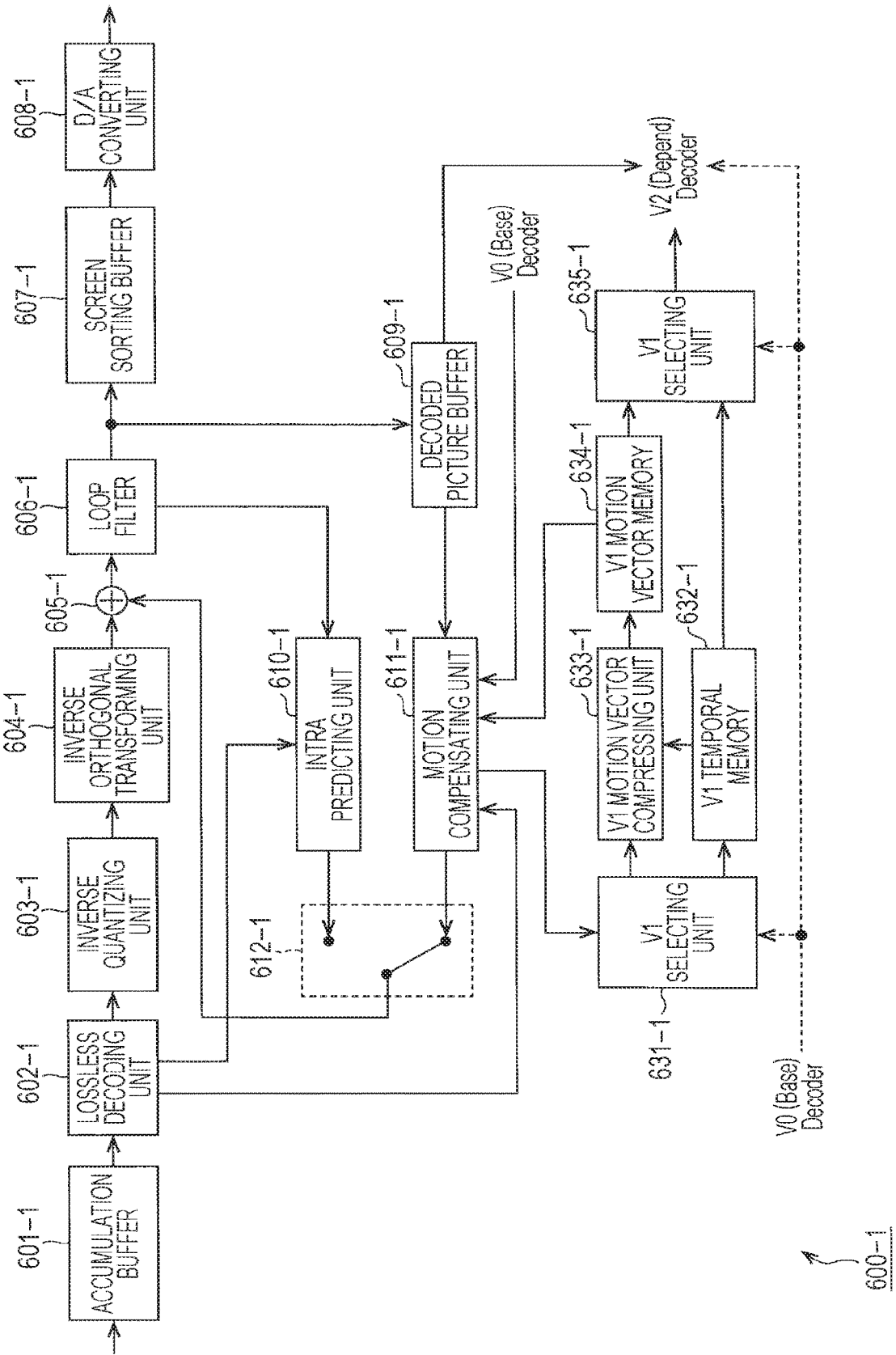
FIG. 58 is a block diagram illustrating an exemplary main configuration of a V1 image decoding device.
Figure 59:
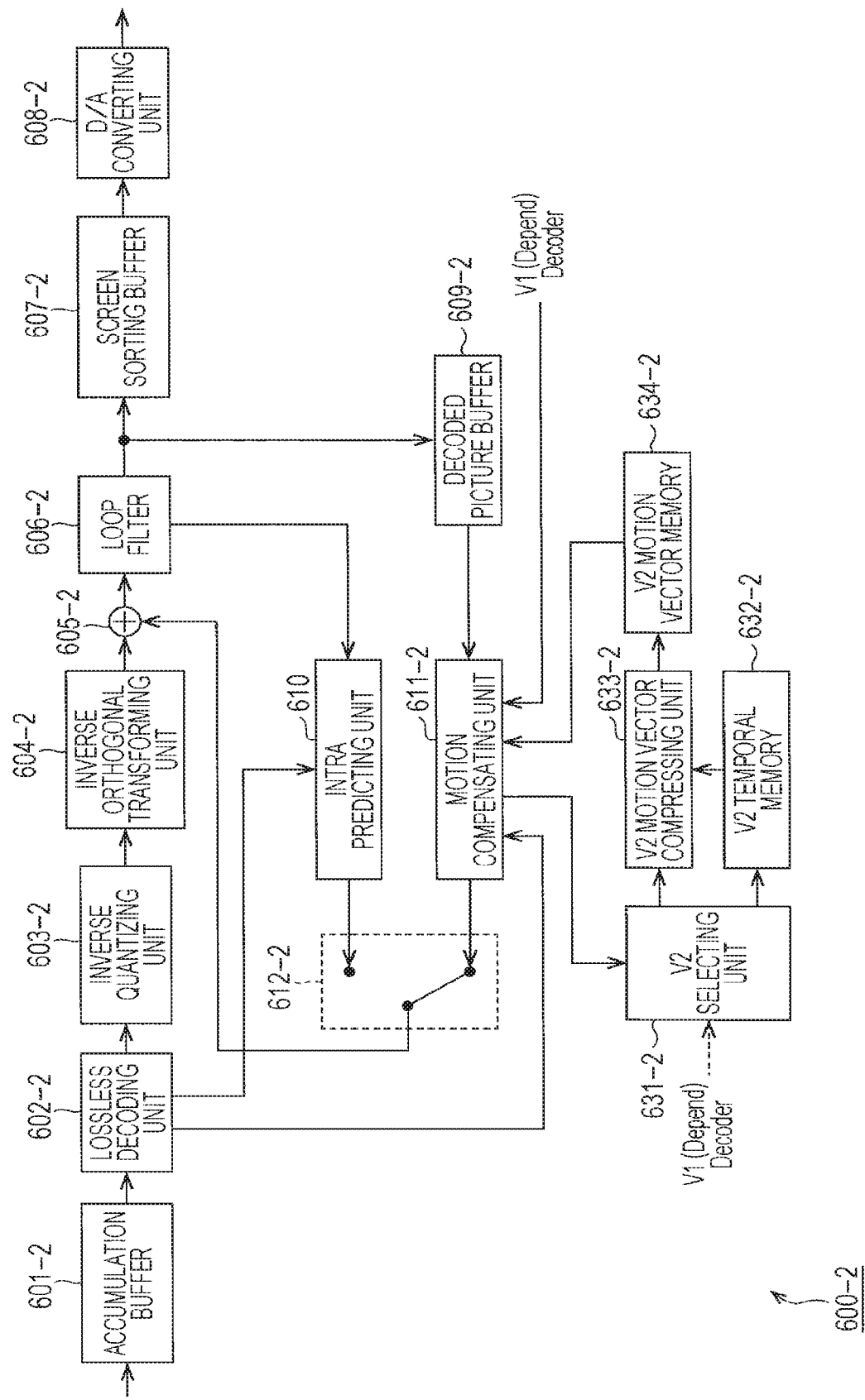
FIG. 59 is a block diagram illustrating an exemplary main configuration of a V2 image decoding device.

Next, decoding of encoded data (encoded stream) encoded as described above will be described. FIG. 57 is a block diagram illustrating an exemplary main configuration of the V0 image decoding device. FIG. 58 is a block diagram illustrating an exemplary main configuration of the V1 image decoding device. FIG. 59 is a block diagram illustrating an exemplary main configuration of the V2 image decoding device.

An image decoding device 600 (not illustrated) decodes encoded data of a moving image including a plurality of layers such as the multi-view image illustrated in FIG. 2 encoded by the image coding device 500 by a decoding method corresponding to the encoding method. The image decoding device 600 includes a V0 image decoding device 600-0 of FIG. 57, a V1 image decoding device 600-1 of FIG. 58, and a V2 image decoding device 600-2 of FIG. 59 in order to decode encoded data of respective views of a multi-view image. The V0 image decoding device 600-0 decodes the encoded data of the image of the view 0 encoded by the V0 image coding device 500-0. The V1 image decoding device 600-1 decodes the encoded data of the image of the view 1 encoded by the V1 image coding device 500-1. The V2 image decoding device 600-2 decodes the encoded data of the image of the view 2 encoded by the V2 image coding device 500-2.

The V0 image decoding device 600-0 includes an accumulation buffer 601-0, a lossless decoding unit 602-0, an inverse quantizing unit 603-0, an inverse orthogonal transforming unit 604-0, an operation unit 605-0, a loop filter 606-0, a screen sorting buffer 607-0, and a D/A converting unit 608-0 as illustrated in FIG. 57. The V0 image decoding device 600-0 further includes a decoded picture buffer 609-0, an intra predicting unit 610-0, a motion compensating unit 611-0, and a selecting unit 612-0.

The V1 image decoding device 600-1 includes an accumulation buffer 601-1, a lossless decoding unit 602-1, an inverse quantizing unit 603-1, an inverse orthogonal transforming unit 604-1, an operation unit 605-1, a loop filter 606-1, a screen sorting buffer 607-1, and a D/A converting unit 608-1 as illustrated in FIG. 58. The V1 image decoding device 600-1 further includes a decoded picture buffer 609-1, an intra predicting unit 610-1, a motion compensating unit 611-1, and a selecting unit 612-1.

The V2 image decoding device 600-2 includes an accumulation buffer 601-2, a lossless decoding unit 602-2, an inverse quantizing unit 603-2, an inverse orthogonal transforming unit 604-2, an operation unit 605-2, a loop filter 606-2, a screen sorting buffer 607-2, and a D/A converting unit 608-2 as illustrated in FIG. 59. The V2 image decoding device 600-2 further includes a decoded picture buffer 609-2, an intra predicting unit 610-2, a motion compensating unit 611-2, and a selecting unit 612-2.

Hereinafter, when the accumulation buffers 601-0 to 601-2 need not be distinguished from one another, they are referred to simply as an "accumulation buffer 601." Further, when the lossless decoding units 602-0 to 602-2 need not be distinguished from one another, they are referred to simply as a "lossless decoding unit 602." Further, when the inverse quantizing units 603-0 to 603-2 need not be distinguished from one another, they are referred to simply as an "inverse quantizing unit 603." Further, when the inverse orthogonal transforming units 604-0 to 604-2 need not be distinguished from one another, they are referred to simply as an "inverse orthogonal transforming unit 604." Further, when the operation units 605-0 to 605-2 need not be distinguished from one another, they are referred to simply as an "operation unit 605."

Further, when the loop filters 606-0 to 606-2 need not be distinguished from one another, they are referred to simply as a "loop filter 606." Further, when the screen sorting buffers 607-0 to 607-2 need not be distinguished from one another, they are referred to simply as a "screen sorting buffer 607." Further, when the D/A converting units 608-0 to 608-2 need not be distinguished from one another, they are referred to simply as a "D/A converting unit 608." Further, when the decoded picture buffers 609-0 to 609-2 need not be distinguished from one another, they are referred to simply as a "decoded picture buffer 609."

Further, when the intra predicting units 610-0 to 610-2 need not be distinguished from one another, they are referred to simply as an "intra predicting unit 610." Further, when the motion compensating units 611-0 to 611-2 need not be distinguished from one another, they are referred to simply as a "motion compensating unit 611." Further, when the selecting units 612-0 to 612-2 need not be distinguished from one another, they are referred to simply as a "selecting unit 612."

The accumulation buffer 601 corresponds to the accumulation buffer 201, and performs basically the same process as the accumulation buffer 201. The lossless decoding unit 602 corresponds to the lossless decoding unit 202, and performs basically the same process as the lossless decoding unit 202. The inverse quantizing unit 603 corresponds to the inverse quantizing unit 203, and performs basically the same process as the inverse quantizing unit 203. The inverse orthogonal transforming unit 604 corresponds to the inverse orthogonal transforming unit 204, and performs basically the same process as the inverse orthogonal transforming unit 204. The operation unit 605 corresponds to the operation unit 205, and performs basically the same process as the operation unit 205.

The loop filter 606 corresponds to the loop filter 206, and performs basically the same process as the loop filter 206. The screen sorting buffer 607 corresponds to the screen sorting buffer 207, and performs basically the same process as the screen sorting buffer 207. The D/A converting unit 608 corresponds to the D/A converting unit 208, and performs basically the same process as the D/A converting unit 208. The decoded picture buffer 609 corresponds to the decoded picture buffer 209, and performs basically the same process as the decoded picture buffer 209.

The intra predicting unit 610 corresponds to the intra predicting unit 210, and performs basically the same process as the intra predicting unit 210. The motion compensating unit 611 corresponds to the motion compensating unit 211, and performs basically the same process as the motion compensating unit 211. The selecting unit 612 corresponds to the selecting unit 212, and performs basically the same process as the selecting unit 212.

The V0 image decoding device 600-0 further includes a control unit 621, a V0 selecting unit 631-0, a V0 temporal memory 632-0, a V0 motion vector compressing unit 633-0, a V0 motion vector memory 634-0, and a V0 selecting unit 635-0.

The V1 image decoding device 600-1 further includes a V1 selecting unit 631-1, a V1 temporal memory 632-1, a V1 motion vector compressing unit 633-1, a V1 motion vector memory 634-1, and a V1 selecting unit 635-1.

The V2 image decoding device 600-2 further includes a V2 selecting unit 631-2, a V2 temporal memory 632-2, a V2 motion vector compressing unit 633-2, and a V2 motion vector memory 634-2.

The lossless decoding unit 602-0 extracts a flag that indicates whether or not the motion vector for the IVMP is compressed and is supplied from the encoding side, for example, from the sequence parameter set, and supplies the flag to the control unit 621.

The control unit 621 controls selection (switching) of the V0 selecting unit 631-0, the V0 selecting unit 635-0, the V1 selecting unit 631-1, the V1 selecting unit 635-1, and the V2 selecting unit 631-2 based on the value of the flag acquired from the lossless decoding unit 602, that is, according to the method (the method decided by the control unit 521) employed at the encoding side.

When the motion vector for the IVMP is compressed, the V0 selecting unit 631-0 selects the V0 motion vector compressing unit 633-0 according to control of the control unit 621, and the V0 selecting unit 635-0 selects the V0 motion vector memory 634-0 according to control of the control unit 621. Further, the V1 selecting unit 631-1 selects the V1 motion vector compressing unit 633-1 according to control of the control unit 621, and the V1 selecting unit 635-1 selects the V1 motion vector memory 634-1 according to control of the control unit 621. Further, the V2 selecting unit 631-2 selects the V2 motion vector compressing unit 633-2 according to control of the control unit 621.

In this case, the motion compensating unit 611-0 supplies the non-compressed V0 motion vector (a maximum of 4×4 accuracy) of the reconstructed current block to the V0 motion vector compressing unit 633-0 via the V0 selecting unit 631-0. The V0 motion vector compressing unit 633-0 performs 1/16 compression on the non-compressed V0 motion vector supplied from the motion compensating unit 611-0, and supplies the obtained 1/16-compressed V0 motion vector to the V0 motion vector memory 634-0. The V0 motion vector memory 634-0 stores the supplied 1/16-compressed V0 motion vector. The V0 motion vector memory 634-0 appropriately supplies the stored 1/16-compressed V0 motion vector to the motion compensating unit 611-0 as a motion vector of a temporally neighboring block. Further, the V0 motion vector memory 634-0 appropriately supplies the stored 1/16-compressed V0 motion vector to the motion compensating unit 611-1 as a motion vector of a block neighboring in terms of a view via the V0 selecting unit 635-0.

The motion compensating unit 611-1 supplies the non-compressed V1 motion vector (a maximum of 4×4 accuracy) of the reconstructed current block to the V1 motion vector compressing unit 633-1 via the V1 selecting unit 631-1. The V1 motion vector compressing unit 633-1 performs 1/16 compression on the non-compressed V1 motion vector supplied from the motion compensating unit 611-1, and supplies the obtained 1/16-compressed V1 motion vector to the V1 motion vector memory 634-1. The V1 motion vector memory 634-1 stores the supplied 1/16-compressed V1 motion vector. The V1 motion vector memory 634-1 appropriately supplies the stored 1/16-compressed V1 motion vector to the motion compensating unit 611-1 as a motion vector of a temporally neighboring block. Further, the V1 motion vector memory 634-1 appropriately supplies the stored 1/16-compressed V1 motion vector to the motion compensating unit 611-2 as a motion vector of a block neighboring in terms of a view via the V1 selecting unit 635-1.

Further, the motion compensating unit 611-2 supplies a non-compressed V2 motion vector (a maximum of 4×4 accuracy) of a current block generated by motion prediction to the V2 motion vector compressing unit 633-2 via the V2 selecting unit 631-2. The V2 motion vector compressing unit 633-2 performs 1/16 compressed on the non-compressed V2 motion vector supplied from the motion compensating unit 611-2, and supplies the obtained 1/16-compressed V2 motion vector to the V2 motion vector memory 634-2. The V2 motion vector memory 634-2 stores the supplied 1/16-compressed V2 motion vector. The V2 motion vector memory 634-2 appropriately supplies the stored 1/16-compressed V2 motion vector to the motion compensating unit 611-2 as a motion vector of a temporally neighboring block.

In other words, in this case, the image decoding device 600 is configured to perform the same method as the method (for example, FIG. 5) described in the first embodiment.

When the motion vector for the IVMP is not compressed, the V0 selecting unit 631-0 and the V0 selecting unit 635-0 select the V0 temporal memory 632-0 according to control of the control unit 621. Further, the V1 selecting unit 631-1 and the V1 selecting unit 635-1 select the V1 temporal memory 632-0 according to control of the control unit 621. Furthermore, the V2 selecting unit 631-2 selects the V2 temporal memory 632-2 according to control of the control unit 621.

In this case, the motion compensating unit 611-0 supplies a non-compressed V0 motion vector (a maximum of 4×4 accuracy) of a current block generated by motion prediction to the V0 temporal memory 632-0 via the V0 selecting unit 631-0. The V0 temporal memory 632-0 appropriately supplies the stored non-compressed V0 motion vector to the motion compensating unit 611-1 as a motion vector of a block neighboring in terms of a view via the V0 selecting unit 635-0. Further, the V0 temporal memory 632-0 appropriately supplies the stored non-compressed V0 motion vector to the V0 motion vector compressing unit 633-0. The V0 motion vector compressing unit 633-0 reads the non-compressed V0 motion vector from the V0 temporal memory 632-0, performs 1/16 compressed, and supplies the obtained 1/16-compressed V0 motion vector to the V0 motion vector memory 634-0. The V0 motion vector memory 634-0 stores the supplied 1/16-compressed V0 motion vector. The V0 motion vector memory 634-0 appropriately supplies the stored 1/16-compressed V0 motion vector to the motion compensating unit 611-0 as a motion vector of a temporally neighboring block.

Further, the motion compensating unit 611-1 supplies a non-compressed V1 motion vector (a maximum of 4×4 accuracy) of a current block generated by motion prediction to the V1 temporal memory 632-1 via the V1 selecting unit 631-1. The V1 temporal memory 632-1 appropriately supplies the stored non-compressed V1 motion vector to the motion compensating unit 611-2 as a motion vector of a block neighboring in terms of a view via the V1 selecting unit 635-1. Further, the V1 temporal memory 632-1 appropriately supplies the stored non-compressed V1 motion vector to the V1 motion vector compressing unit 633-1. The V1 motion vector compressing unit 633-1 performs 1/16 compressed on the non-compressed V1 motion vector supplied from the V1 temporal memory 632-1, and supplies the obtained 1/16-compressed V1 motion vector to the V1 motion vector memory 634-1. The V1 motion vector memory 634-1 stores the supplied 1/16-compressed V1 motion vector. The V1 motion vector memory 634-1 appropriately supplies the stored 1/16-compressed V1 motion vector to the motion compensating unit 611-1 as a motion vector of a temporally neighboring block.

Further, the motion compensating unit 611-2 supplies a non-compressed V2 motion vector (a maximum of 4×4 accuracy) of a current block generated by motion prediction to the V2 temporal memory 632-2 via the V2 selecting unit 631-2. The V2 temporal memory 632-2 appropriately supplies the stored non-compressed V2 motion vector to the V2 motion vector compressing unit 633-2. The V2 motion vector compressing unit 633-2 performs 1/16 compressed on the non-compressed V2 motion vector supplied from the V2 temporal memory 632-2, and supplies the obtained 1/16-compressed V2 motion vector to the V2 motion vector memory 634-2. The V2 motion vector memory 634-2 stores the supplied 1/16-compressed V2 motion vector. The V2 motion vector memory 634-2 appropriately supplies the stored 1/16-compressed V2 motion vector to the motion compensating unit 611-2 as a motion vector of a temporally neighboring block.

In other words, in this case, the image decoding device 600 is configured to perform the same method as the method (for example, FIG. 4) of the related art.

As described above, as it is possible to control a method of compressing a motion vector, it is possible to adaptively suppress an increase in a storage capacity necessary for encoding and decoding.

<Decoding Process Flow>

Next, a flow of processing performed by the image decoding device 600 will be described. An exemplary flow of the decoding process performed by the image decoding device 600 will be described with reference to a flowchart of FIG. 60.

When the decoding process starts, in step S3401, the control unit 621 receives the motion vector compression flag that indicates whether or not the motion vector for the IVMP is compressed and is transmitted from the encoding side.

For the current picture, the V0 image decoding device 600-0 performs the V0 decoding process in step S3402, the V1 image decoding device 600-1 performs the V1 decoding process in step S3403, and the V2 image decoding device 600-2 performs the V2 decoding process in step S3404.

In step S3405, the image decoding device 600 determines whether or not all pictures have been processed, and when it is determined that there is a non-processed picture, the process returns to step S3402, and the subsequent process is repeated.

The process of step S3402 to step S3405 is repeatedly performed on each picture, and when it is determined that all pictures have been processed in step S3405, the image decoding device 600 ends the decoding process.

<V0 Decoding Process Flow>

Next, an exemplary flow of the V0 decoding process of decoding the view 0 which is performed in step S3402 of FIG. 60 will be described with reference to flowcharts of FIGS. 61 and 62.

The process of step S3501 to step S3508 is performed in the same manner as the process of step S1501 to step S1508 of FIG. 20 through the respective processing units of the V0 image decoding device 600-0.

In step S3509, the V0 selecting unit 631-0 determines whether or not the non-compressed V0 motion vector is compressed according to control of the control unit 621. When the non-compressed V0 motion vector is determined to be compressed, the process proceeds to step S3510.

In step S3510, the V0 motion vector compressing unit 633-0 performs 1/16 compressed on the non-compressed V0 motion vector. In step S3511, the V0 motion vector memory 634-0 stores the 1/16-compressed V0 motion vector generated by the process of step S3510. When the process of step S3511 ends, the process proceeds to step S3521 of FIG. 62.

Figure 61:
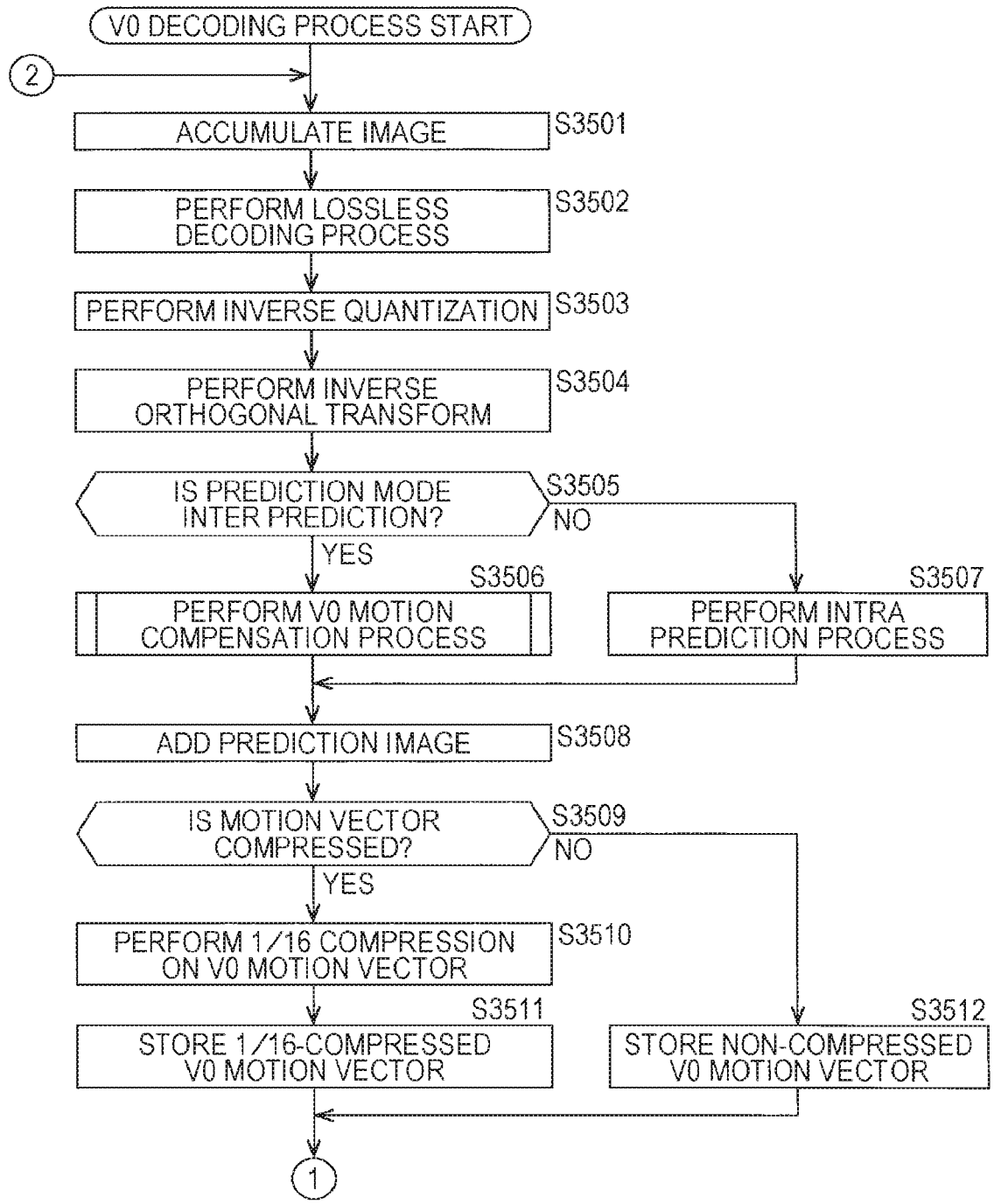
FIG. 61 is a flowchart for describing an exemplary flow of a V0 decoding process.

Further, when the non-compressed V0 motion vector is determined to be not compressed in step S3509 of FIG. 61, the process proceeds to step S3512. In step S3512, the V0 temporal memory 632-0 stores the non-compressed V0 motion vector. When the process of step S3512 ends, the process proceeds to step S3521 of FIG. 62.

Figure 62:
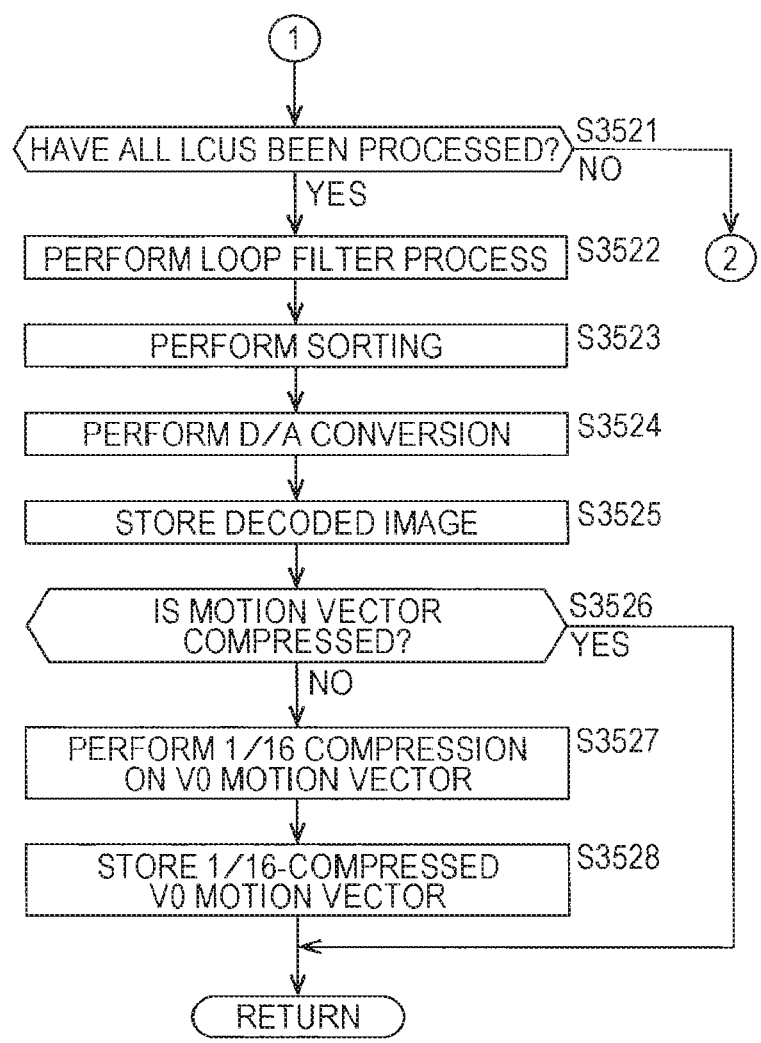
FIG. 62 is a flowchart for describing an exemplary flow of a V0 decoding process, subsequently to FIG. 61.

The process of step S3521 to step S3525 of FIG. 62 is performed in the same manner as the process of step S1511 to step S1515 of FIG. 20 through the respective processing units of the image decoding device 600-0.

In step S3509 of FIG. 62, the V0 selecting unit 635-0 determines whether or not a motion vector for the IVMP is compressed according to control of the control unit 621. This determination is performed in the same manner as step S3509 of FIG. 61. When a motion vector for the IVMP is determined to be not compressed, that is, when a motion vector is determined to be not compressed even in step S3509 of FIG. 61, the process proceeds to step S3527 of FIG. 62.

In this case, the non-compressed V0 motion vector is stored in the V0 temporal memory 632-0 by the process of step S3512 of FIG. 61. In this regard, in step S3527, the V0 motion vector compressing unit 633-0 reads the non-compressed V0 motion vector from the V0 temporal memory 632-0, and performs 1/16 compressed. In step S3528, the V0 motion vector memory 634-0 stores the 1/16-compressed V0 motion vector calculated in step S3527.

In this case, the non-compressed V0 motion vector stored in the V0 temporal memory 632-0 is used for the IVMP by the motion compensating unit 611-1. Further, the 1/16-compressed V0 motion vector stored in the V0 motion vector memory 634-0 is used for the TMVP by the motion compensating unit 611-0.

Figure 60:
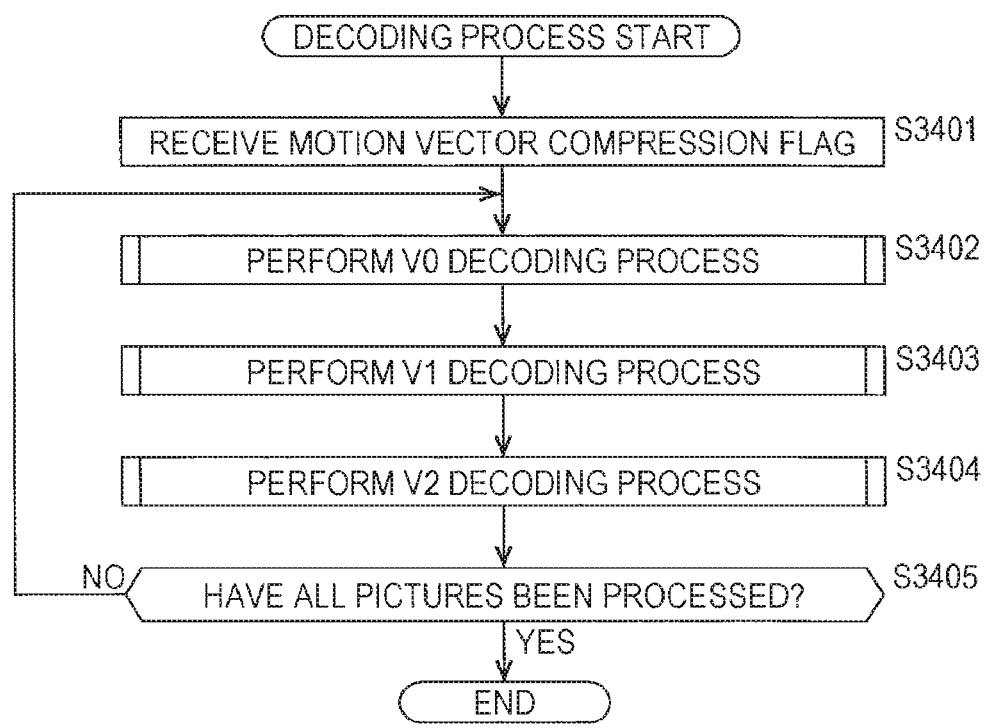
FIG. 60 is a flowchart for describing an exemplary flow of a decoding process.

When the process of step S3528 ends, the V0 decoding process ends, and the process returns to FIG. 60.

Further, when a motion vector is determined to be compressed in step S3526 of FIG. 62, that is, when a motion vector is determined to be compressed even in step S3509 of FIG. 61, the V0 coding process ends, and the process returns to FIG. 60.

In this case, the 1/16-compressed V0 motion vector stored in the V0 motion vector memory 634-0 is used for the TMVP by the motion compensating unit 611-0 and used for the IVMP by the motion compensating unit 611-1.

The V0 motion compensation process performed in step S3506 of FIG. 61 is performed by the motion compensating unit 611-0 in the same manner as in the first embodiment (FIG. 21), and thus a description thereof is omitted.

<V1 Decoding Process Flow>

Figure 63:
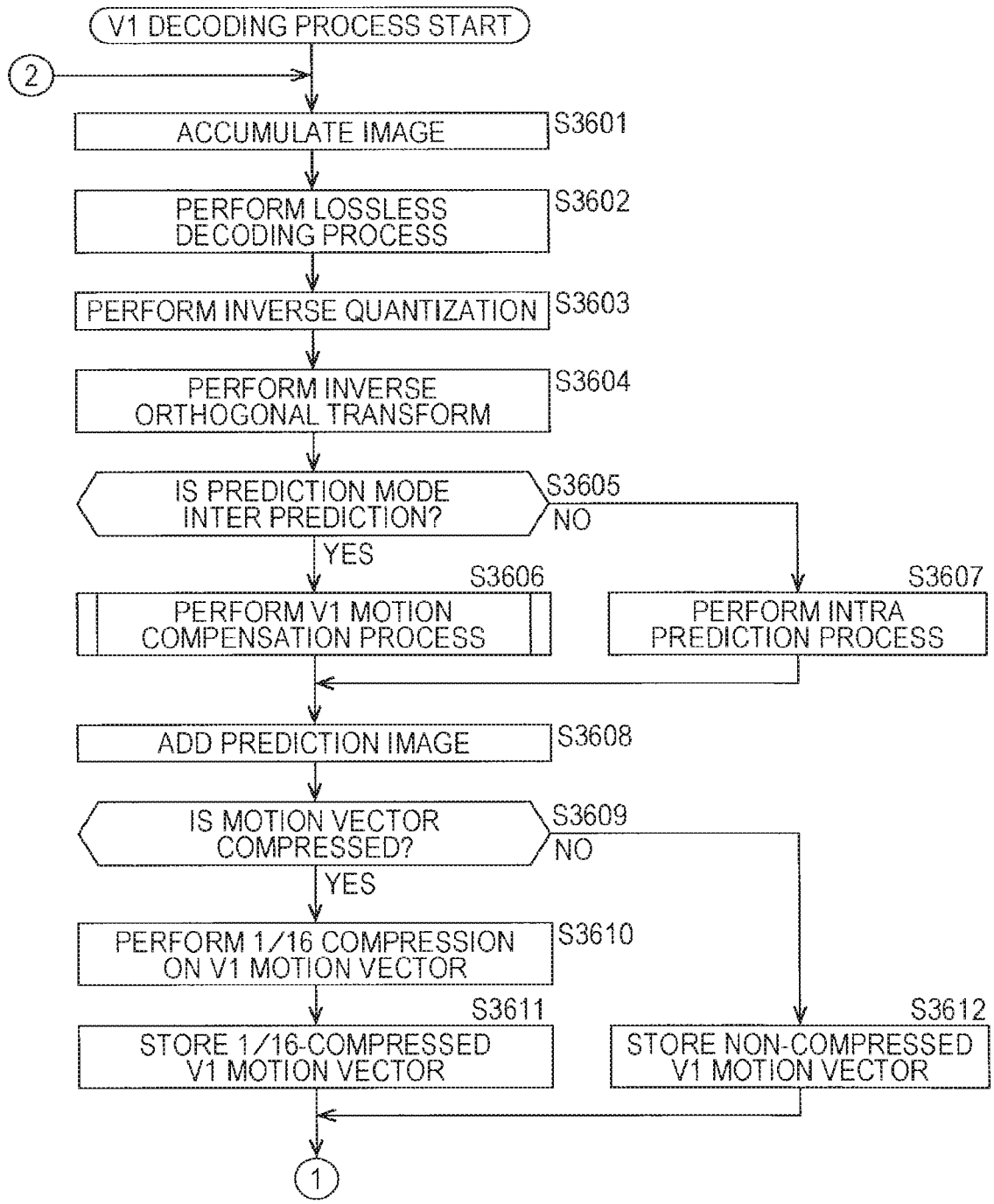
FIG. 63 is a flowchart for describing an exemplary flow of a V1 decoding process.
Figure 64:
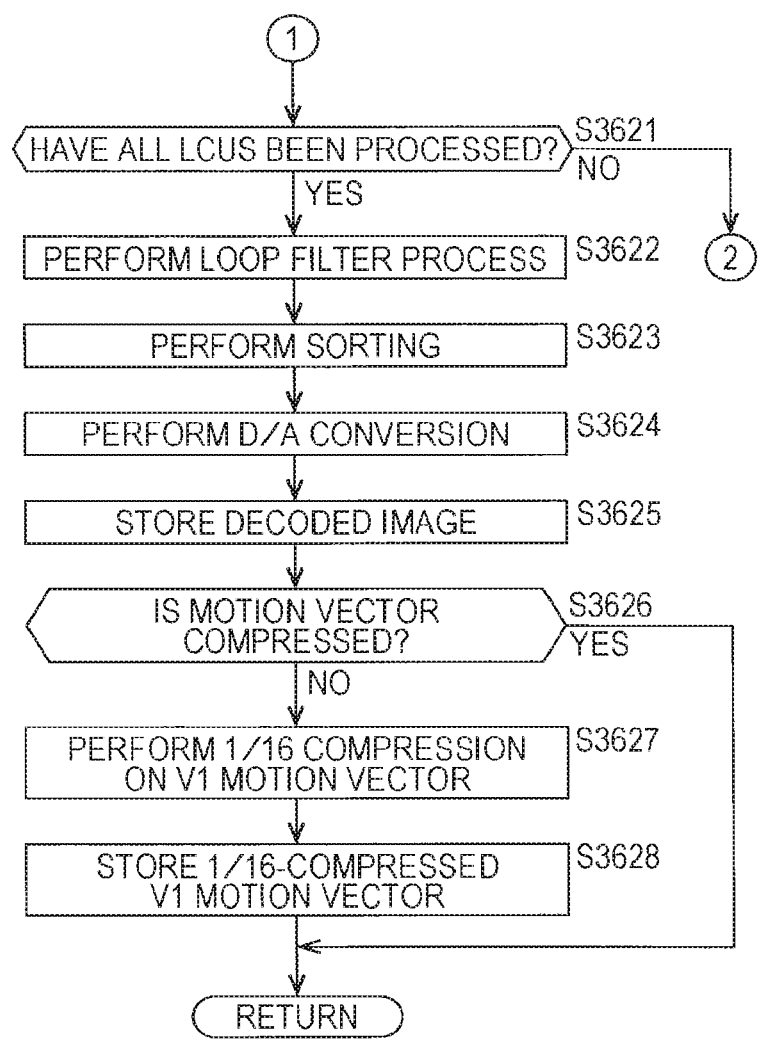
FIG. 64 is a flowchart for describing an exemplary flow of a V1 decoding process, subsequently to FIG. 64.

Next, an exemplary flow of the V1 decoding process of decoding encoded data of the view 1 which is performed in step S3403 of FIG. 60 will be described with reference to flowcharts of FIGS. 63 and 64.

A difference between the process for the view 0 and the process for the view 1 mainly lies in the motion compensation process. Thus, as illustrated in FIGS. 63 and 64, the V1 image decoding device 600-1 performs the V1 decoding process for the view 1 basically in the same manner as the V0 decoding process for the view 0 (FIGS. 61 and 62). In other words, the process of step S3601 to step S3612 of FIG. 63 and the process of step S3621 to step S3628 of FIG. 64 are performed basically in the same manner as the process of step S3501 to step S3512 of FIG. 61 and the process of step S3521 to step S3528 of FIG. 62. Thus, the description of FIGS. 63 and 64 may proceed such that the respective components of the V0 image decoding device 600-0 described with reference to FIGS. 61 and 62 are replaced with the respective components of the V1 image decoding device 600-1, and the process for the view 0 illustrated in FIGS. 61 and 62 is replaced with the process for the view 1, and thus a description thereof is omitted.

<V1 Motion Compensation Process Flow>

Next, an exemplary flow of the V1 motion compensation process performed in step S3606 of FIG. 63 will be described with reference to a flowchart of FIG. 65.

When the V1 motion compensation process starts, in step S3641, the motion compensating unit 611-1 acquires the differential motion information (the differential motion vector). In step S3642, the motion compensating unit 611-1 determines whether or not a mode of a prediction motion vector is spatial prediction based on the inter prediction information. When a mode of a prediction motion vector is determined to be spatial prediction, the process proceeds to step S3643.

In step S3643, the motion compensating unit 611-1 generates a prediction motion vector using a non-compressed V1 motion vector (a motion vector of a block spatially neighboring a current block) in a picture. When the prediction motion vector is generated, the process proceeds to step S3649.

However, when a mode of a prediction motion vector is determined to be not spatial prediction in step S3642, the process proceeds to step S3644.

Since the view 1 is not an initially processed view, a mode of a prediction motion vector may be an inter-view prediction (IVMP).

In step S3644, the motion compensating unit 611-1 determines whether or not a mode of a prediction motion vector is temporal prediction based on the inter prediction information. When a mode of a prediction motion vector is determined to be temporal prediction, the process proceeds to step S3645.

In step S3645, the motion compensating unit 611-1 generates a prediction motion vector using the 1/16-compressed V1 motion vector (a motion vector of a block spatially neighboring a current block) in another picture. When the prediction motion vector is generated, the process proceeds to step S3649.

However, when a mode of a prediction motion vector is determined to be not temporal prediction in step S3644, the process proceeds to step S3646.

In the case of the present embodiment, there are cases in which the encoding side compresses and does not compress the motion vector for the IVMP.

In step S3646, the motion compensating unit 611-1 determines whether or not a motion vector is compressed based on control of the control unit 621. When a motion vector is determined to be not compressed, the process proceeds to step S3647.

In step S3647, the motion compensating unit 611-1 generates a prediction motion vector using the non-compressed V0 motion vector. When the prediction motion vector is generated, the process proceeds to step S3649.

However, when a motion vector is determined to be compressed in step S3646, the process proceeds to step S3648.

In step S3648, the motion compensating unit 611-1 generates a prediction motion vector using the 1/16-compressed V0 motion vector. When the prediction motion vector is generated, the process proceeds to step S3649.

In step S3649, the motion compensating unit 611-1 reconstructs a motion vector using the prediction motion vector generated in step S3643, step S3645, step S3647, or step S3648.

In step S3650, the motion compensating unit 611-1 performs motion compensation, and generates a prediction image. Further, the motion compensating unit 611-1 stores the motion vector reconstructed in step S3649. When the process of step S3650 ends, the V1 motion compensation process ends, and the process returns to FIG. 63.

<V2 Decoding Process Flow>

Next, an exemplary flow of the V2 decoding process of decoding encoded data of the view 2 which is performed in step S3404 of FIG. 60 will be described with reference to flowcharts of FIGS. 66 and 67.

A difference between the process for the view 0 and the process for the view 2 mainly lies in the motion compensation process. Thus, as illustrated in FIGS. 66 and 67, the V2 image decoding device 600-2 performs the V2 decoding process for the view 2 basically in the same manner as the V0 decoding process for the view 0 (FIGS. 61 and 62). In other words, the process of step S3701 to step S3712 of FIG. 66 and the process of step S3721 to step S3728 of FIG. 67 are performed basically in the same manner as the process of step S3501 to step S3512 of FIG. 61 and the process of step S3521 to step S3528 of FIG. 62. Thus, the description of FIGS. 66 and 67 may proceed such that the respective components of the V0 image decoding device 600-0 described with reference to FIGS. 61 and 62 are replaced with the respective components of the V2 image decoding device 600-2, and the process for the view 0 illustrated in FIGS. 61 and 62 is replaced with the process for the view 2, and thus a description thereof is omitted.

<V2 Motion Compensation Process Flow>

Next, an exemplary flow of the V2 motion compensation process performed in step S3706 of FIG. 66 will be described with reference to a flowchart of FIG. 68.

Figure 65:
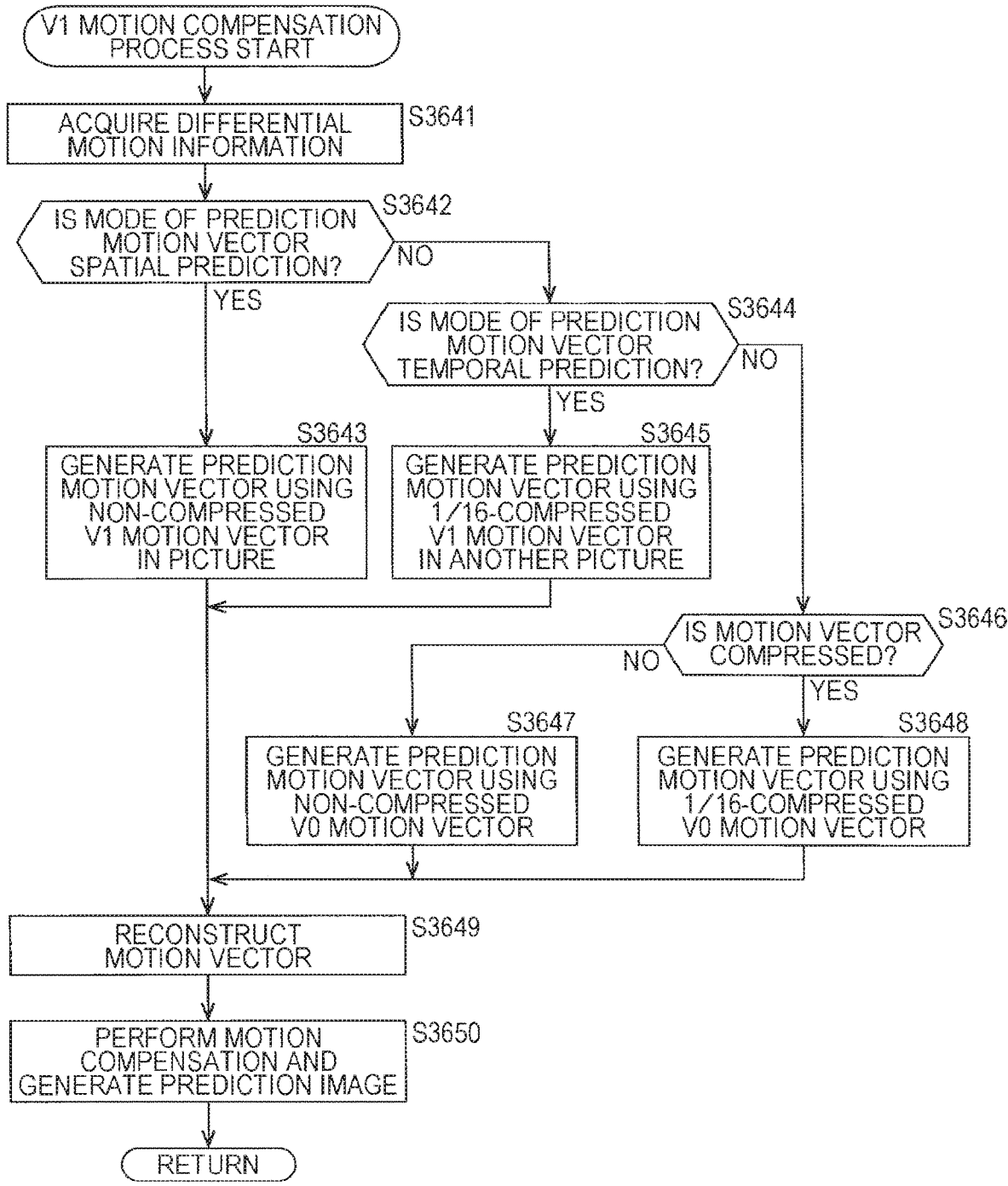
FIG. 65 is a flowchart for describing an exemplary flow of a V1 motion compensation process.
Figure 68:
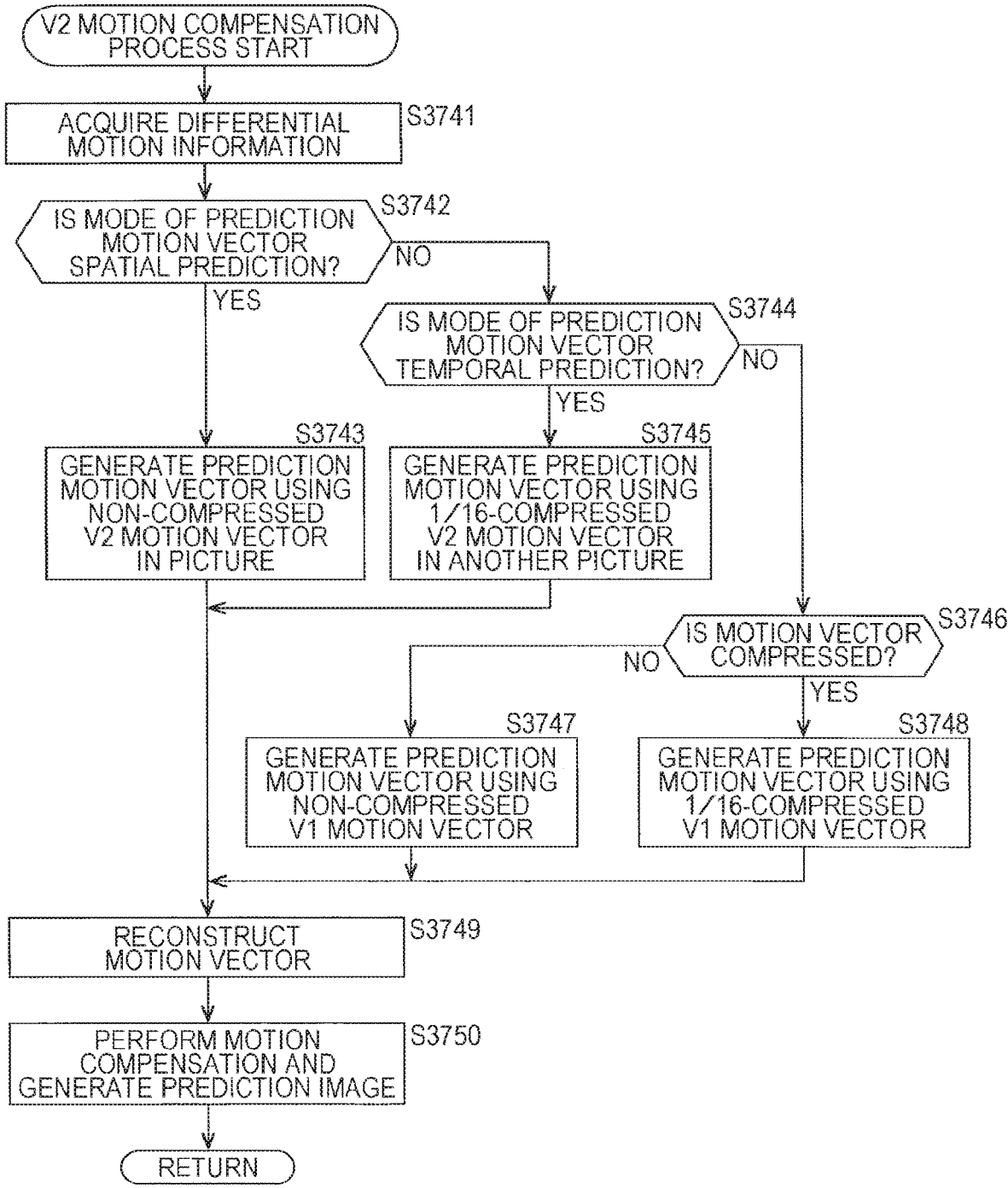
FIG. 68 is a flowchart for describing an exemplary flow of a V2 motion compensation process.

As illustrated in FIG. 68, the V2 motion compensation process is performed basically in the same manner as the V1 motion compensation process (FIG. 65). In other words, the process of step S3741 to step S3750 of FIG. 68 is performed basically in the same manner as the process of step S3631 to step S3650 of FIG. 65. Here, the V1 motion compensation process is performed by the motion compensating unit 611-1, whereas the V2 motion compensation process is performed by the motion compensating unit 611-2.

Further, the processing target of the V2 motion compensation process is an image of the view 2 other than an image of the view 1. Thus, in step S3743, the motion compensating unit 611-2 generates a prediction motion vector using a non-compressed V2 motion vector (a motion vector of a block spatially neighboring a current block) in a picture.

In step S3745, the motion compensating unit 611-2 generates a prediction motion vector using a 1/16-compressed V2 motion vector (a motion vector of a block temporally neighboring a current block) in another picture.

In step S3747, the motion compensating unit 611-2 generates a prediction motion vector using a non-compressed V1 motion vector (a motion vector of a block neighboring a current block in terms of a view).

In step S3748, the motion compensating unit 611-2 generates a prediction motion vector using a 1/16-compressed V1 motion vector (a motion vector of a block neighboring a current block in terms of a view).

Figure 66:
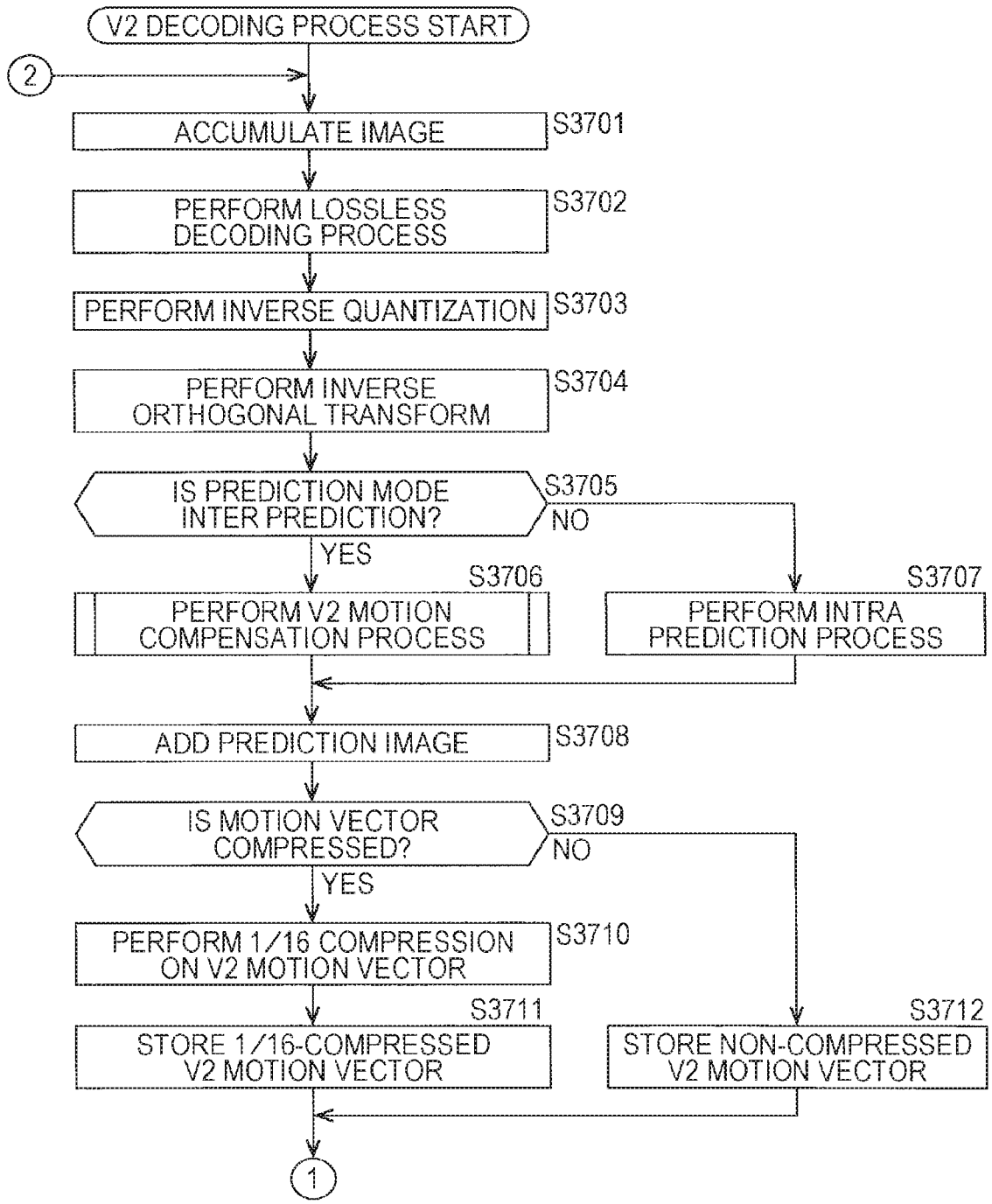
FIG. 66 is a flowchart for describing an exemplary flow of a V2 decoding process.
Figure 67:
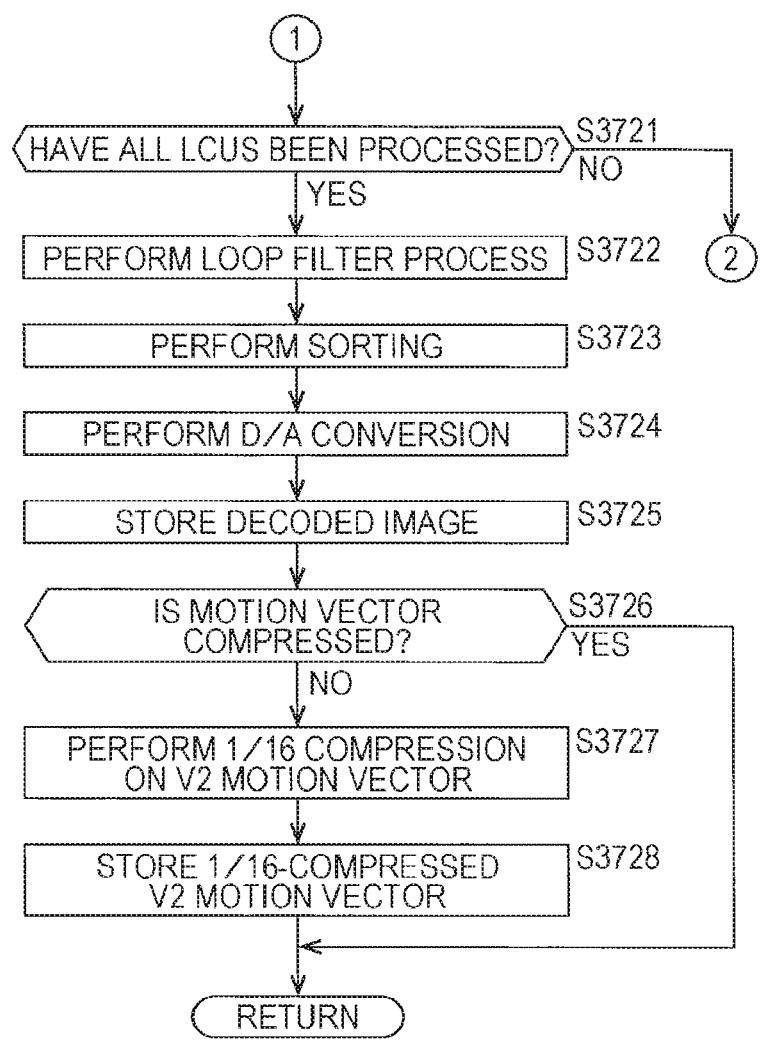
FIG. 67 is a flowchart for describing an exemplary flow of a V2 decoding process, subsequently to FIG. 66.

When the process of step S3750 ends, the V2 motion compensation process ends, and the process returns to FIG. 66.

As the process is performed as described above, the image decoding device 600 can adaptively reduce the memory capacity necessary for the motion vectors for the IVMP and adaptively suppress an increase in a storage capacity necessary for encoding and decoding.

<4. Fourth Embodiment>

<Applications to Scalable Image Coding and Scalable Image Decoding>

Figure 69:
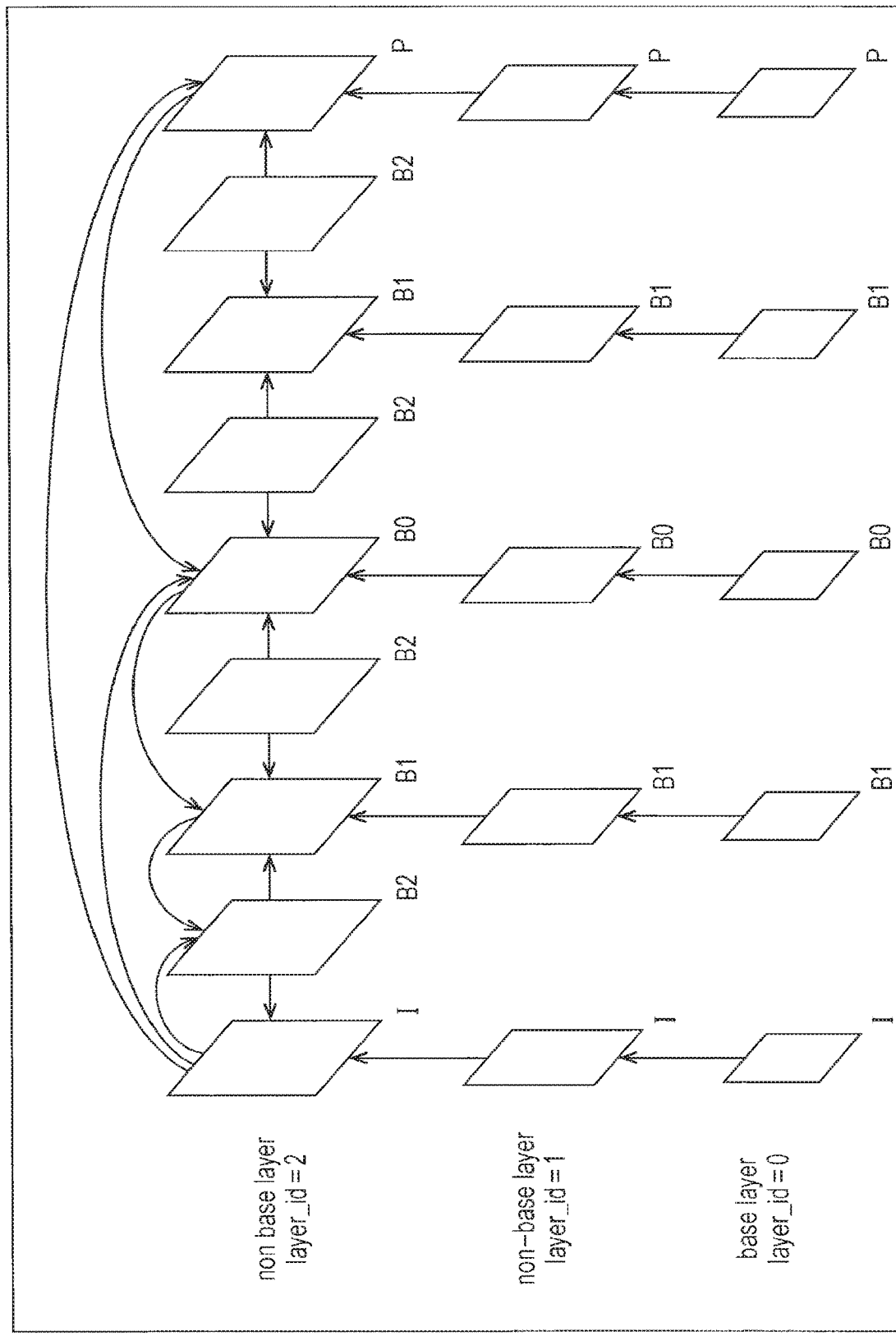
FIG. 69 is a diagram illustrating an exemplary scalable image coding scheme.

The above description has proceeded with multi-view image coding and decoding, but, a layer is not limited to a view. For example, a hierarchy in scalable coding and decoding such as a resolution, a component, and a bit depth is also included in a layer. The present technology can be applied to any coding and decoding of a plurality of layers. For example, the above-described series of processes can be applied to scalable image coding and scalable image decoding. FIG. 69 illustrates an exemplary scalable image coding scheme.

In scalable image coding (scalable coding), image data is divided (hierarchized) into a plurality of layers so that a certain parameter has a scalability function, and encoding is performed for each layer. Scalable image decoding (scalable decoding) is decoding corresponding to the scalable image coding.

As illustrated in FIG. 69, for hierarchization of image, one image is divided into a plurality of images (layers) based on a certain parameter having a scalability function. In other words, a hierarchized image (scalable image) includes an image of a plurality of layers that differ in a value of the certain parameter from one another. The plurality of layers of the scalable image include a base layer in which encoding and decoding are performed using only an image of its own layer without using images of other layers and non-base layers (which are also referred to as "enhancement layers") in which encoding and decoding are performed using images of other layers. As the non-base layer, an image of the base layer may be used, and an image of any other non-base layer may be used.

Generally, the non-base layer is configured with data (differential data) of a differential image between its own image and an image of another layer so that the redundancy is reduced. For example, when one image is hierarchized into two layers, that is, a base layer and a non-base layer (which is also referred to as an enhancement layer), an image of a quality lower than an original image is obtained when only data of the base layer is used, and an original image (that is, a high quality image) is obtained when both data of the base layer and data of the non-base layer are combined.

As an image is hierarchized as described above, images of various qualities can be easily obtained depending on the situation. For example, for a terminal having a low processing capability such as a mobile telephone, image compression information of only the base layer is transmitted, and a moving image of low spatial and temporal resolutions or a low quality is reproduced, and for a terminal having a high processing capability such as a television or a personal computer, image compression information of the enhancement layer as well as the base layer is transmitted, and a moving image of high spatial and temporal resolutions or a high quality is reproduced. In other words, without performing the transcoding process, image compression information according to a capability of a terminal or a network can be transmitted from a server.

Figure 70:
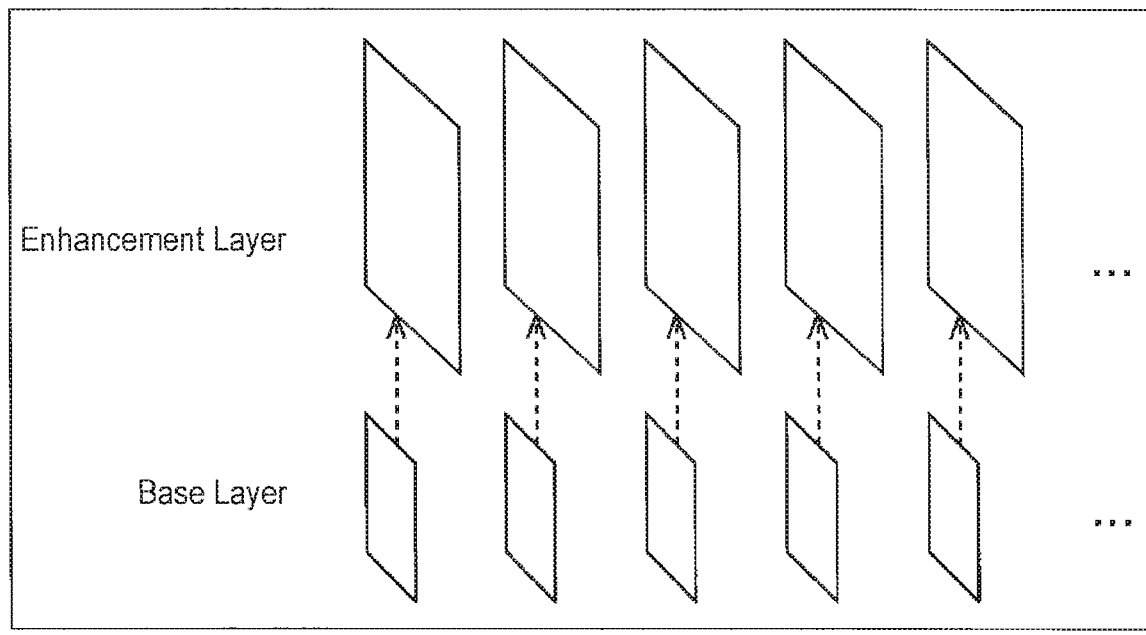
FIG. 70 is a diagram for describing an exemplary spatial scalable coding.

As a parameter having scalability, for example, there is a spatial resolution (spatial scalability) as illustrated in FIG. 70. In the case of the spatial scalability, respective layers have different resolutions. In other words, each picture is hierarchized into two layers, that is, a base layer of a resolution spatially lower than that of an original image and an enhancement layer that is combined with an image of the base layer to obtain an original image (an original spatial resolution) as illustrated in FIG. 70. Of course, the number of layers is an example, and each picture can be hierarchized into an arbitrary number of layers.

Figure 71:
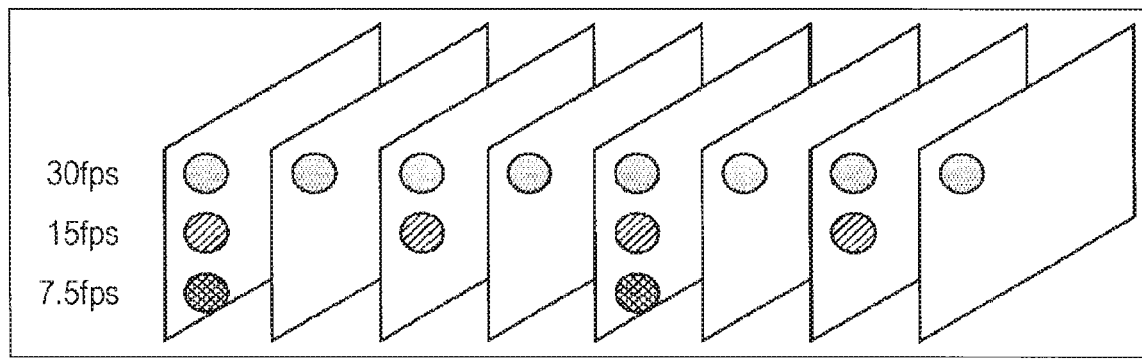
FIG. 71 is a diagram for describing an exemplary temporal scalable coding.

As another parameter having such scalability, for example, there is a temporal resolution (temporal scalability) as illustrated in FIG. 71. In the case of the temporal scalability, respective layers have different frame rates. In other words, in this case, each picture is hierarchized into layers having different frame rates, a moving image of a high frame rate can be obtained by combining a layer of a high frame rate with a layer of a low frame rate, and an original moving image (an original frame rate) can be obtained by combining all the layers as illustrated in FIG. 3. The number of layers is an example, and each picture can be hierarchized into an arbitrary number of layers.

Figure 72:
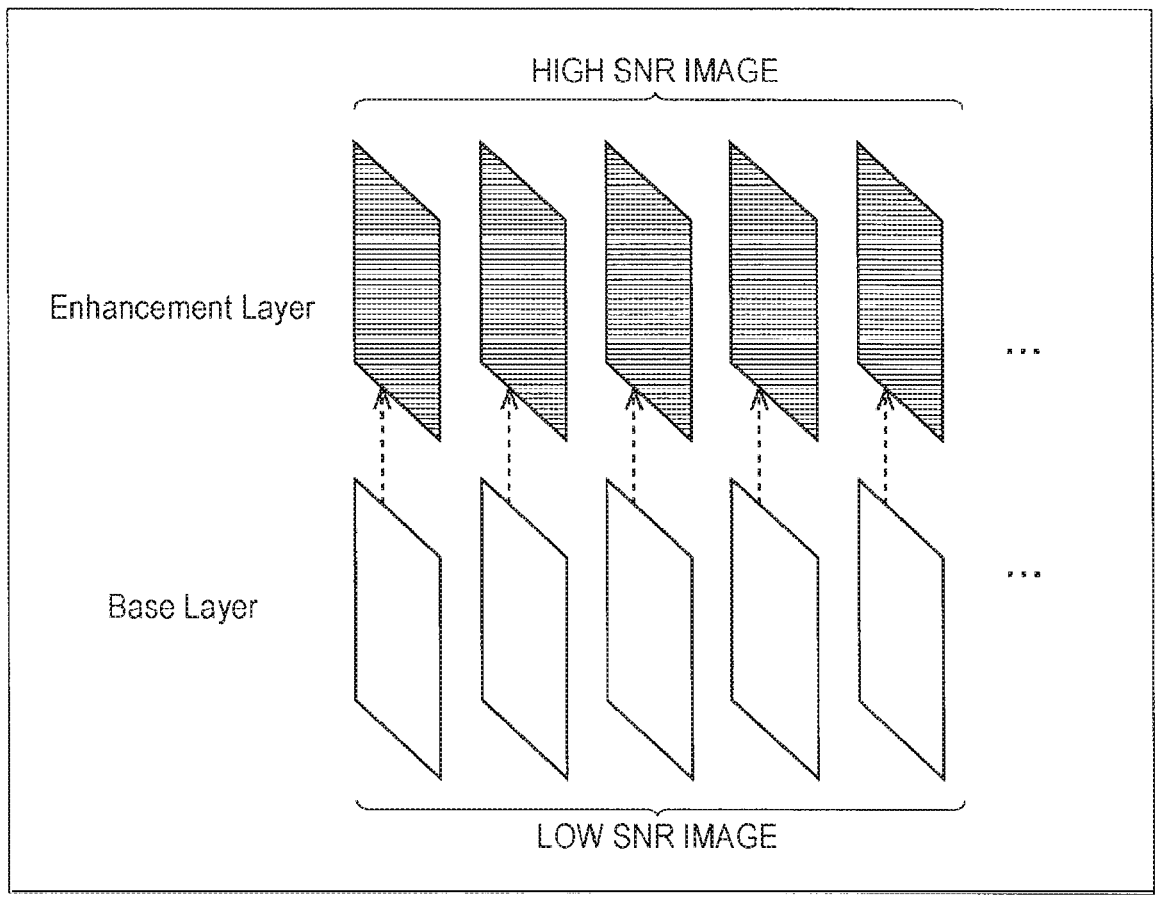
FIG. 72 is a diagram for describing an exemplary scalable coding of a signal to noise ratio.

Further, as another parameter having such scalability, for example, there is a signal-to-noise ratio (SNR) (SNR scalability). In the case of the SNR scalability, respective layers having different SN ratios. In other words, in this case, each picture is hierarchized into two layers, that is, a base layer of a SNR lower than that of an original image and an enhancement layer that is combined with an image of the base layer to obtain an original image (original SNR) as illustrated in FIG. 72. In other words, for base layer image compression information, information related to an image of a low PSNR is transmitted, and a high PSNR image can be reconstructed by combining the information with the enhancement layer image compression information. Of course, the number of layers is an example, and each picture can be hierarchized into an arbitrary number of layers.

A parameter other than the above-described examples may be applied as a parameter having scalability. For example, there is bit-depth scalability in which the base layer includes an 8-bit image, and a 10-bit image can be obtained by adding the enhancement layer to the base layer.

Further, there is chroma scalability in which the base layer includes a component image of a 4:2:0 format, and a component image of a 4:2:2 format can be obtained by adding the enhancement layer to the base layer.

In such scalable image coding and decoding, when an image of each layer is encoded or decoded, a height of a correlation between layers can be used for prediction of a motion vector, similarly to the case of the above-described multi-view encoding and decoding. In other words, a prediction motion vector can be generated or reconstructed using a processed (encoded or decoded) motion vector of another layer.

In this case, it is necessary to hold a motion vector obtained in encoding or decoding of a certain layer so that it can be used in encoding or decoding of a subsequently processed layer.

In this regard, in order to suppress an increase in the memory capacity, a motion vector of a current layer used in encoding or decoding of another layer may be compressed.

A specific compression method is the same as the method described above in description of multi-view encoding and decoding.

For example, in order to compress (thin out) and refer to a motion vector as illustrated in FIG. 5, preferably, an image coding device has a configuration of FIGS. 6 to 8 and executes the processes of the flowcharts of FIGS. 9 to 15. Further, preferably, an image decoding device has a configuration of FIGS. 16 to 18 and executes the processes of the flowcharts of FIGS. 19 to 25.

Further, for example, in order to compress (thin out) and refer to a motion vector as illustrated in FIG. 26, preferably, an image coding device has a configuration of FIGS. 27 to 29 and executes the processes of the flowcharts of FIGS. 30 to 34. Further, preferably, an image decoding device has a configuration of FIGS. 35 to 37 and executes the processes of the flowcharts of FIGS. 38 to 42.

Further, for example, in order to compress (thin out) and refer to a motion vector as illustrated in FIG. 43, preferably, an image coding device has a configuration of FIGS. 45 to 47 and executes the processes of the flowcharts of FIGS. 48 to 56. Further, preferably, an image decoding device has a configuration of FIGS. 57 to 59 and executes the processes of the flowcharts of FIGS. 60 to 68.

Further, in such scalable image coding and decoding, for example, in coding and decoding of a layer 1 (layer_id=1), a motion vector of a layer 0 (layer_id=0) is used. At this time, the accuracy of the motion vector of the layer 0 is lower than the accuracy of the motion vector of the layer 1 even without compression. However, as the motion vector of the layer 0 is further compressed, the storage capacity necessary for holding the motion vector can be further reduced.

Further, a compression rate may be decided in view of an accuracy ratio of the motion vector between layers. For example, a certain compression rate may be decided as a reference compression rate, and an actual compression rate may be decided according to an accuracy ratio of a motion vector between layers (a resolution ratio between layers). For example, a reference compression rate of a motion vector of the layer 0 used for the IVMP of the layer 1 is assumed to be 1/16. At this time, when the resolution of the layer 0 is 1/4 of the layer 1, an actual compression rate may be set to 1/4, and when the resolution of the layer 0 is 1/8 of the layer 1, an actual compression rate may be set to 1/2. As a result, it is possible to implement a desired compression rate (the reference compression rate), and it is possible to sufficiently suppress an increase in a storage capacity necessary for encoding and decoding.

Figure 73:
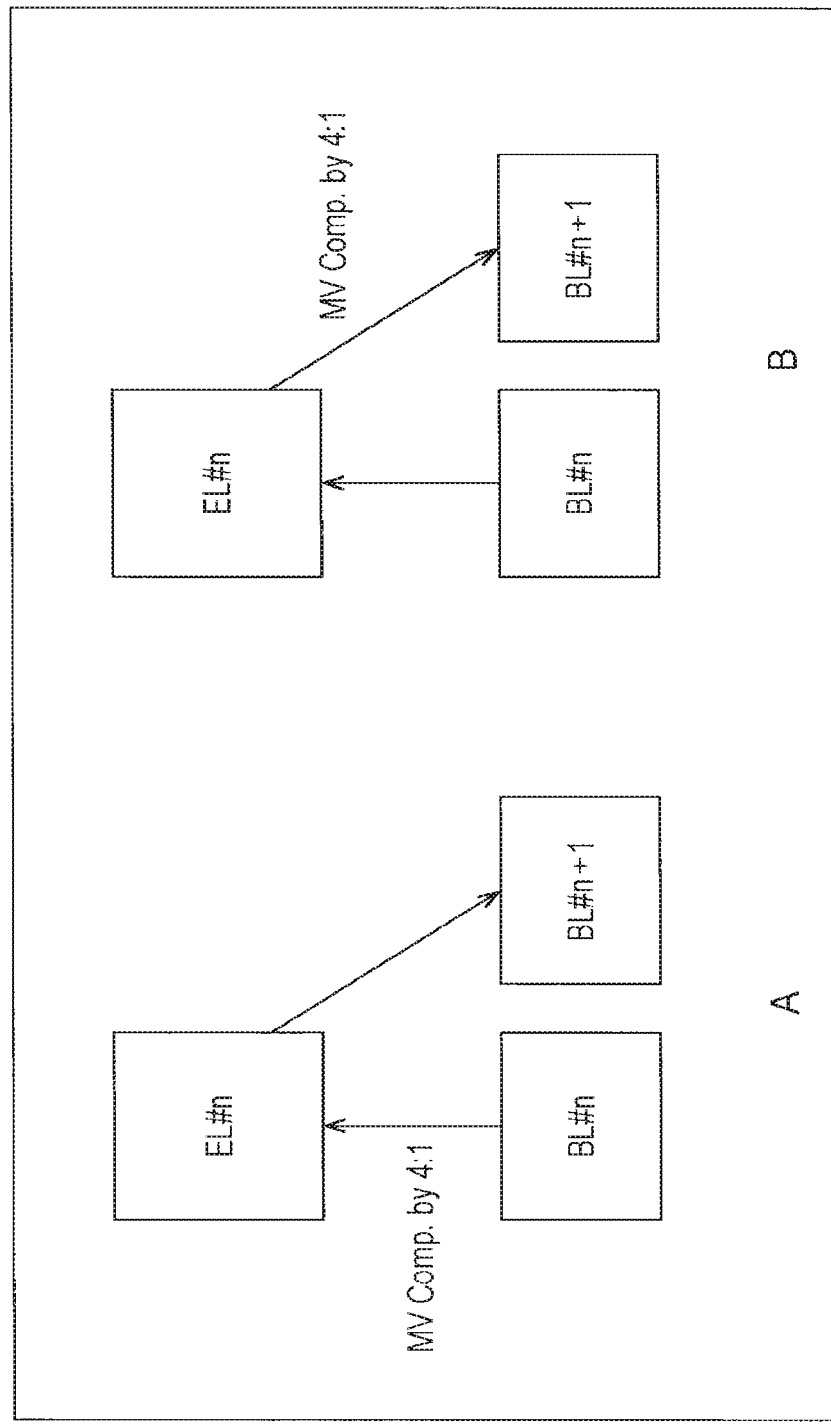
FIG. 73 is a diagram for describing an example of thinning out a motion vector.

Further, for example, if a motion vector of a base layer (BL) is thinned out to 1/4 as illustrated in A of FIG. 73, the reduction in prediction accuracy of the motion vector is very large, and thus the coding efficiency is likely to be lowered in the enhancement layer (EL). However, if a motion vector of a base layer (BL) is provided to an enhancement layer without being thinned out as illustrated in B of FIG. 73, the storage capacity necessary for encoding and decoding is likely to increase.

Figure 74:
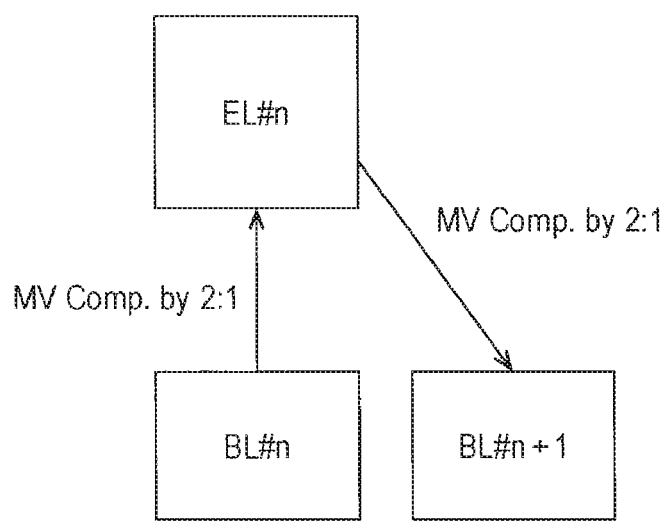
FIG. 74 is a diagram for describing another example of thinning out a motion vector.

In this regard, for example, as illustrated in FIG. 74, 1/2 thinning out (compression) may be performed when a motion vector is provided from the base layer to the enhancement layer, and 1/2 thinning out (compression) may be further performed when it is returned from the enhancement layer to the base layer. In other words, even in the case of scalable image coding and decoding, a motion vector can be thinned out (compressed) by the same method as the method for multi-view image coding and decoding described above with reference to FIG. 26 and the like.

As described above, division of an image into a plurality of layers can be performed based on an arbitrary parameter, and the present technology can be applied to coding and decoding of an image of a plurality of layers without depending on the parameter. In other words, even when the present technology is applied to scalable image coding and scalable image decoding, it is possible to suppress an increase in the necessary storage capacity.

<Others>

The above description has proceeded with the example in which the number of layers is 3 (0 to 2), but the number of layers is arbitrary, and may be 2 or 4 or more.

Further, the above description has proceeded with the example in which in motion prediction and motion compensation for encoding or motion compensation for decoding, a motion vector of an immediately previously processed layer is used, but the present technology is not limited to this example, and a motion vector of any other arbitrary layer may be used.

For example, for encoding and decoding of all non-base layers, a motion vector of a base layer may be used. Further, a motion vector of one non-base layer may be used for a plurality of non-base layers.

<5. Overview 2>
<Intra Prediction>

Meanwhile, in the HEVC, similarly to the AVC and the like, intra prediction of generating a prediction image using a pixel neighboring a current block is specified.

Figure 75:
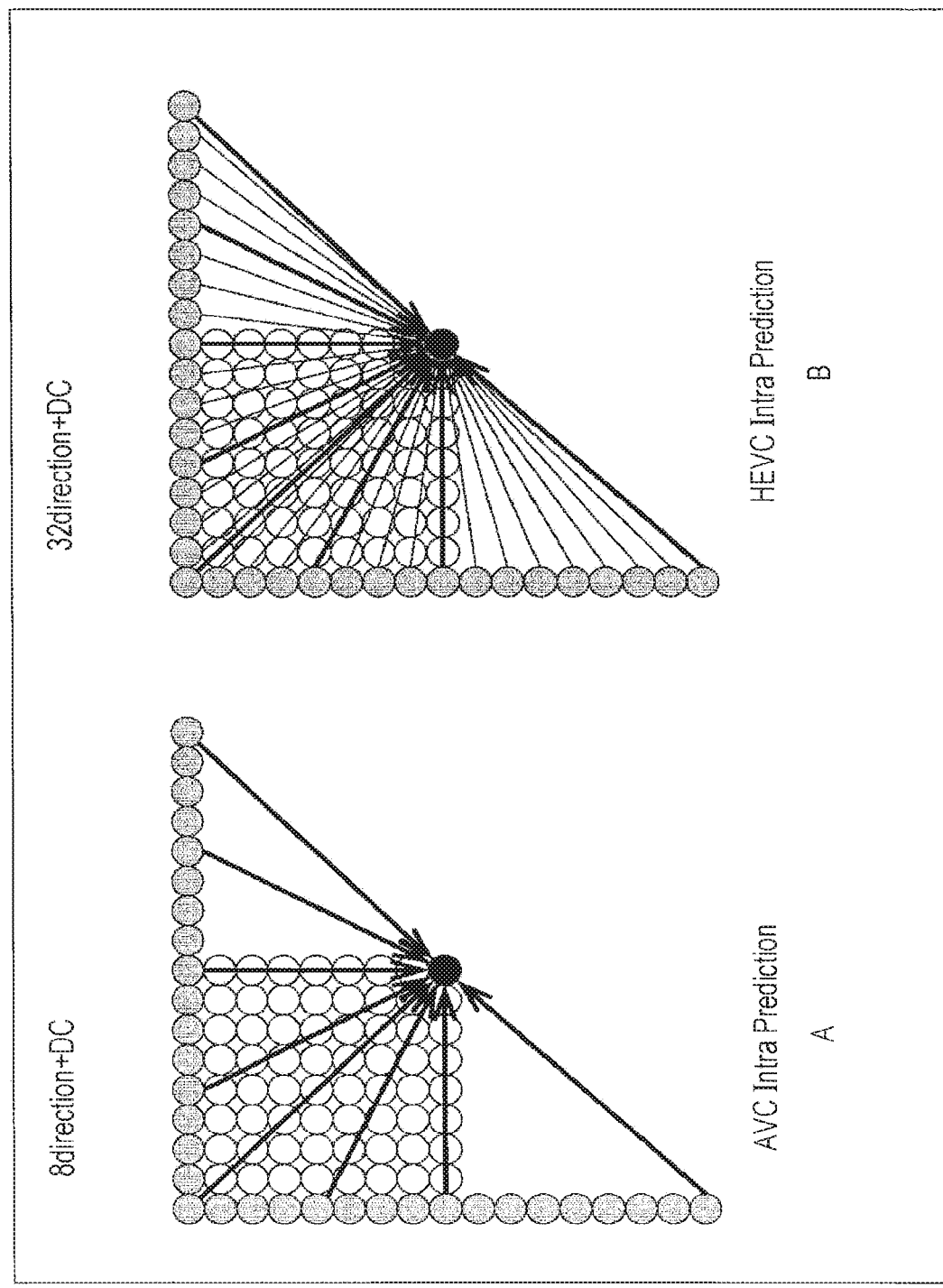
FIG. 75 is a diagram for describing exemplary angular prediction.

In the AVC, there are intra 4×4 prediction, intra 8×8 prediction, and intra 16×16 prediction, whereas in the HEVC, angular prediction illustrated in FIG. 75 is applied to 4×4 to 64×64 pixel blocks.

In other words, in the AVC, intra prediction process is performed by 8-direction+DC prediction as illustrated in A of FIG. 75, whereas in the HEVC, intra prediction is performed by 32-direction+DC prediction as illustrated in B of FIG. 75. As a result, the prediction accuracy is improved.

Figure 76:
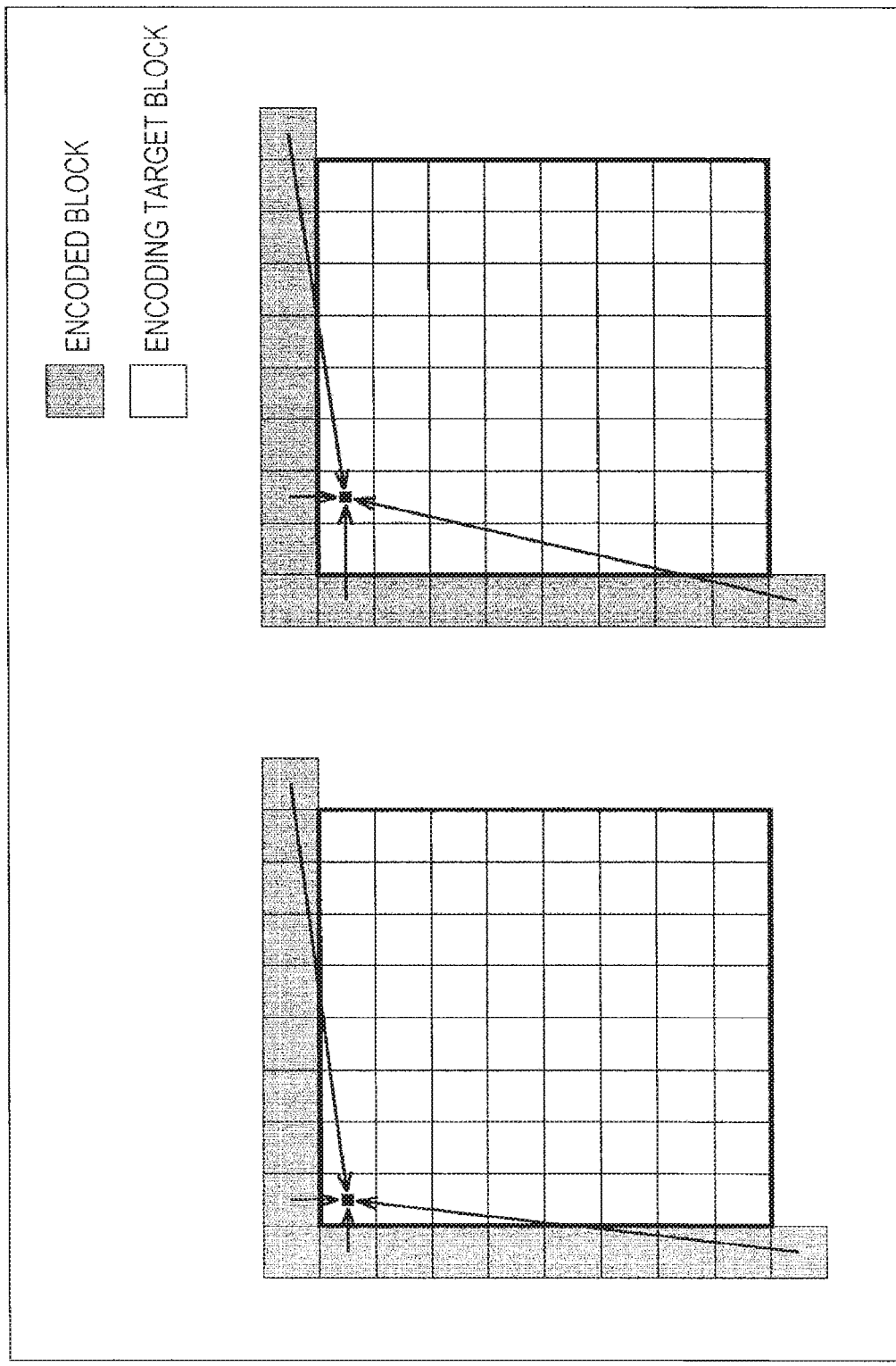
FIG. 76 is a diagram for describing exemplary planar prediction.

Further, in the HEVC, planar prediction illustrated in FIG. 76 is specified.

In the planar prediction process, a prediction pixel included in a current block is generated by bi-linear interpolation based on a pixel (an already encoded pixel) neighboring the current block serving as a processing target. The planar prediction process can improve the coding efficiency of an area having a gradation.

Figure 77:
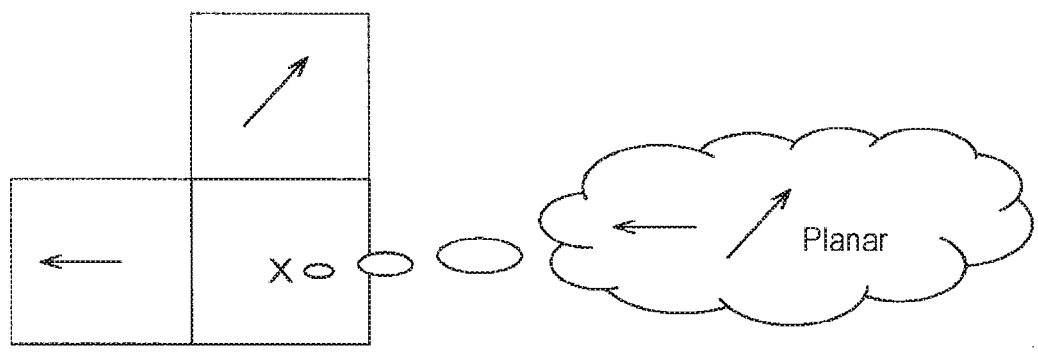
FIG. 77 is a diagram for describing an exemplary most probable mode.

In the HEVC, a coding process of an intra prediction mode using 3 most probable modes is performed as illustrated in FIG. 77. In other words, an intra prediction mode (Above) of a neighboring block above a current block, an intra prediction mode (Left) of a neighboring block on the left of the current block, and a mode decided by combination of the intra prediction modes in neighboring blocks (Above and Left) are set as intra prediction mode candidates (which are also referred to as "candidate modes"), and among the 3 candidate modes, an optimal mode is employed as an intra prediction mode of the current block.

When the prediction mode of the current block is identical to one of the most probable modes, an index number thereof is transmitted. Otherwise, mode information of a prediction block is transmitted with a 5-bit fixed length.

<Filter Process in Intra Prediction>

Figure 78:
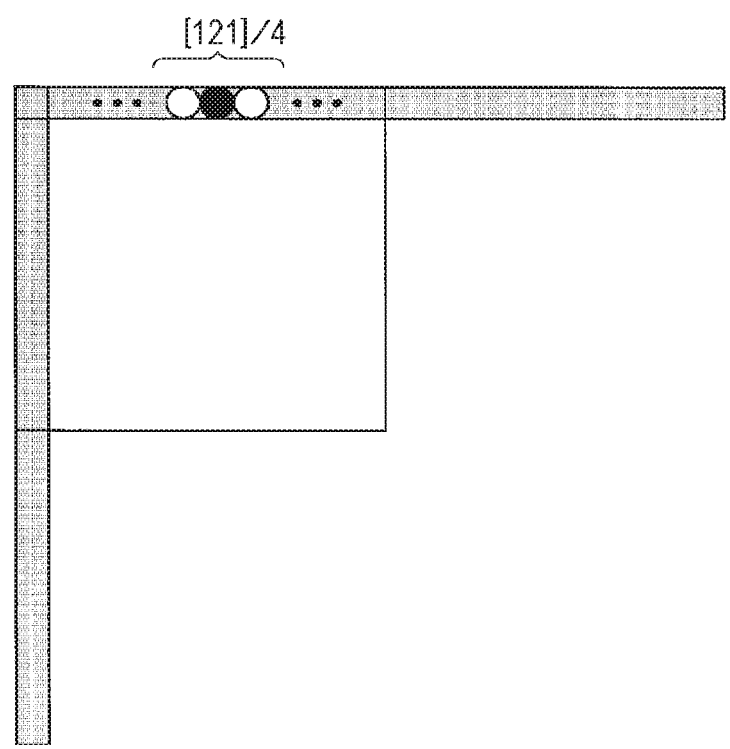
FIG. 78 is a diagram for describing exemplary mode dependent intra smoothing (MDIS).

FIG. 78 is a diagram for describing mode dependent intra smoothing (MDIS) specified in the HEVC.

In the case of the AVC, in the intra 8×8 prediction mode, [1 2 1]/4 filter process is performed on a pixel neighboring a current block as illustrated in FIG. 78. On the other hand, in the HEVC, it is decided whether the filter process or turned on or off (that is, whether or not the filter process is applied) according to a block size and a prediction mode.

More specifically, when the block size of the current block is 4×4, the filter process is not applied. When the block size of the current block is 8×8, the filter process is applied to a prediction mode in a 45° direction. When the block size of the current block is 16×16, the filter process is applied to prediction modes in directions other than 3 directions which are close to a horizontal direction and 3 directions which are close to a vertical direction. When the block size of the current block is 32×32, the filter process is applied to prediction modes in directions other than horizontal and vertical directions.

Figure 79:
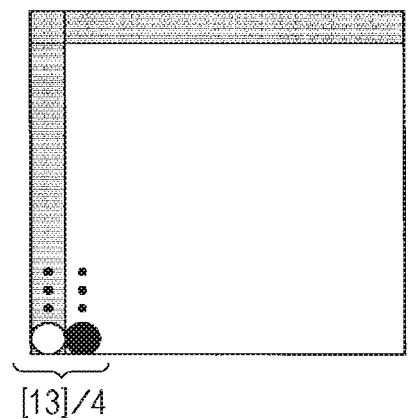
FIG. 79 is a diagram for describing an exemplary boundary value smoothing process.

Further, in the HEVC, for the purpose of reducing block distortion when a prediction mode is a DC mode, a horizontal mode, or a vertical mode, a boundary value smoothing process illustrated in FIG. 79 is specified.

For example, in the case of the prediction (DC prediction) in which the prediction mode is the DC mode, the filter process (smoothing process) illustrated in FIG. 79 is performed on both a neighboring pixel adjacent to an upper side (Top) of a current block serving as a processing target and a neighboring pixel adjacent to a left side (Left) of the current block. Further, in the case of the prediction (horizontal prediction) in which the prediction mode is the horizontal mode, the filter process (smoothing process) illustrated in FIG. 79 is performed on a neighboring pixel adjacent to an upper side (Top) of a current block. In the case of the prediction (vertical prediction) in which the prediction mode is the vertical mode, the filter process (smoothing process) illustrated in FIG. 79 is performed on a neighboring pixel adjacent to a left side (Left) of a current block.

Meanwhile, Vadim Seregin, Patrice Onno, Shan Liu, Tammy Lee, Chulkeun Kim, Haitao Yang, Haricharan Laksman, "Description of Tool Experiment C5: Inter-layer syntax prediction using the HEVC base layer," JCTVC-K1105, Joint Collaborative Team on Video Coding (JCT-VC) of ITU-T SG 16 WP 3 and ISO/IEC JTC 1/SC 29/WG 1111th Meeting: Shanghai, CN, 1019 October 2012 proposes a method of encoding intra prediction mode information in an enhancement layer using information related to an intra prediction mode of a base layer. However, in the HEVC, since it is necessary to hold on intra prediction mode information for 4×4 blocks in a worst case, the storage capacity necessary for encoding and decoding is likely to increase.

Further, Jill Boyce, Kawamura Kei, Haricharan Lakshman, "TE6: Inter-layer syntax prediction from AVC base layer", JCTVC-K1106v2, Joint Collaborative Team on Video Coding (JCT-VC) of ITU-T SG 16 WP 3 and ISO/IEC JTC 1/SC 29/WG 1111th Meeting: Shanghai, CN, 1019 October 2012 proposes a technique of encoding motion information of an enhancement layer using motion information of a base layer when scalable coding is performed in which AVC coding of a base layer (base layer AVC) is performed, and HEVC coding (enhancement layer HEVC) of an enhancement layer is performed. In this case, intra prediction mode information of an enhancement layer is considered to be encoded using intra prediction mode information of a base layer, similarly to the above-described case. In this case, the storage capacity necessary for encoding and decoding is likely to increase, similarly to the above-described case.

In this regard, in the present technology, when (information indicating) an intra prediction mode in a base layer is stored in a memory, a thinning process of (the information indicating) the intra prediction mode is performed. As a result, it is possible to suppress the storage capacity necessary for storing (the information indicating) the intra prediction mode. In other words, it is possible to suppress an increase in a storage capacity necessary for encoding and decoding. In the following description, for convenience of description, the information indicating the intra prediction mode is also referred to as an "intra prediction mode."

Figure 80:
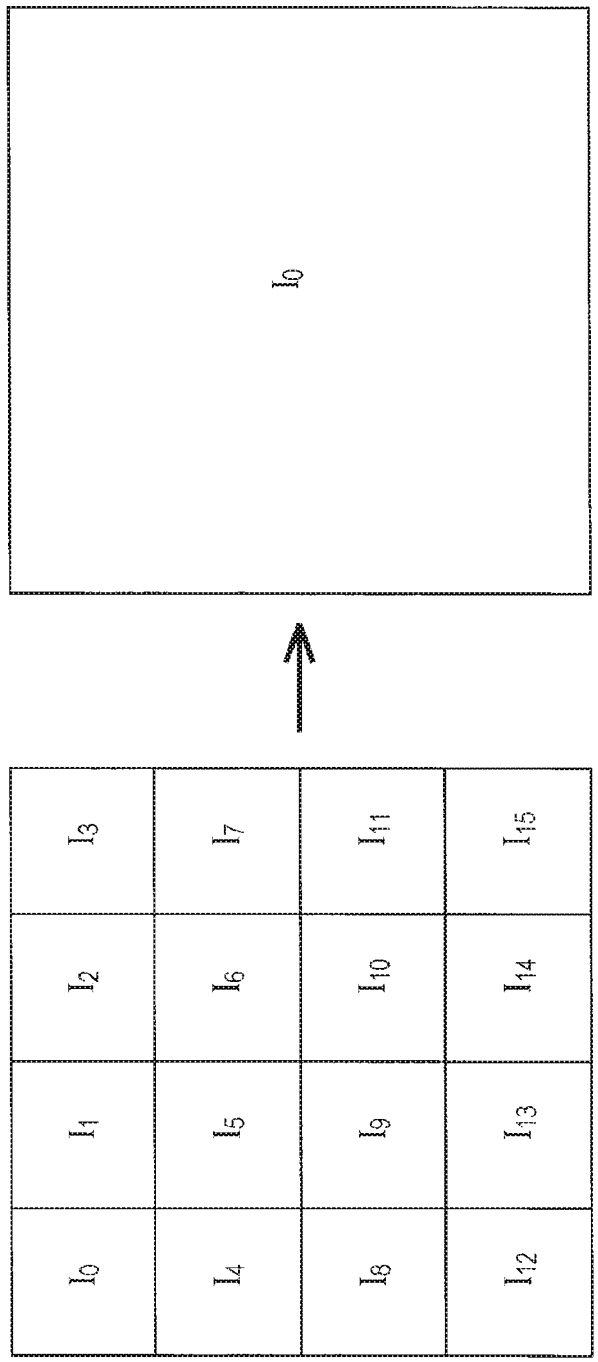
FIG. 80 is a diagram illustrating a thinning-out example of an intra prediction mode.

FIG. 80 is a diagram for describing the present technology.

For example, the thinning process of the intra prediction mode may be performed for each certain area. The thinning process is a process of leaving some intra prediction modes among a plurality of intra prediction modes and discarding the other intra prediction modes. In other words, in this case, an area serving as a processing unit of the thinning process has a range corresponding to a plurality of blocks serving as a processing unit of intra prediction. For example, as illustrated in the left of FIG. 80, 16 blocks of blocks 0 to 15 serving as a processing unit of intra prediction are set as a processing unit (area) of the thinning process. In this case, the intra prediction mode is set to each of the blocks 0 to 15. In other words, there are 16 intra prediction modes I0 to I15 in a current area serving as the processing target of the thinning process.

In the thinning process, among intra prediction modes of blocks of a current area, some intra prediction modes are left (selected) as representatives of the area and stored in a buffer memory, and the other intra prediction modes are discarded. For example, when a thinning rate is 4:1, among the 16 intra prediction modes, any one intra prediction mode is selected and stored in a buffer (the other 15 intra prediction modes are discarded).

An intra prediction mode can be selected as a representative of an area. For example, an intra prediction mode (for example, I0) of a block (for example, a block 0) in which intra prediction is initially performed among blocks of a current area may be selected as a representative of the current area. Further, for example, an intra prediction mode (for example, any one of I5, I6, I9, and I10) of a block (for example, any one of blocks 5, 6, 9, and 10) positioned near the center of the current area may be selected as a representative of the current area.

In an enhancement layer, an intra prediction mode (representative value) of a base layer stored in the buffer is used for a coding process of blocks (PUs) in which the blocks 0 to 15 are set as colocated blocks. In other words, an intra prediction mode (representative value) of an area of a base layer corresponding to a current block is used for intra prediction of an enhancement layer.

As a result, it is possible to suppress an increase in the capacity of the buffer storing the intra prediction mode.

A value of a thinning rate is arbitrary and not limited to the above example (4:1). For example, a value of a thinning rate may be any other value such as 2:1, 8:1, or 16:1. A size of the area serving as a processing unit of the thinning process may be decided according to a thinning rate. Further, intra prediction modes that correspond in number to a thinning rate may be selected from one area as representatives of the area (that is, a plurality of intra prediction modes may be selected from one area as representatives). A method of setting a thinning rate is arbitrary. For example, a predetermined value may be set as a thinning rate, or a thinning rate may be set according to an instruction given from the outside such as the user, may be set based on, for example, a hardware condition such as a storage capacity usable as a buffer memory storing intra prediction modes or a bus bandwidth, or may be set based on, for example, a software condition such as a resolution ratio of a base layer and an enhancement layer of image data. Further, a thinning rate may be set by considering a plurality of types of conditions comprehensively. A thinning rate may be included at an arbitrary position of image compression information (bit stream) to be output and transmitted. For example, a thinning rate may be included in a video parameter set (VPS) and transmitted. Further, for example, a thinning rate may be included in a sequence parameter set (SPS), a picture parameter set (PPS), or a slice header of an enhancement layer and transmitted.

Further, in the case of spatial scalability, since respective layers have different resolutions, it is desirable to decide a layer designating a thinning rate in advance. For example, a thinning rate may be set to a ratio in a base layer.

For example, when the spatial scalability ratio is 1:2, 4×4 blocks of a base layer correspond to 8×8 blocks of an enhancement layer. Here, when a thinning rate is 2:1, an intra prediction mode of a base layer is stored in units of 8×8 blocks at a base layer resolution and in units of 16×16 blocks at an enhancement layer resolution.

As the above process is performed, it is possible to suppress an increase in the storage capacity necessary of storing the intra prediction mode information of the base layer to encode the intra prediction mode in the enhancement layer.

Further, in the present technology, the image compression information of the base layer may be based on the AVC.

Next, application examples of the present technology to specific devices will be described.

<6. Fifth Embodiment>
<Scalable Coding Device>

Figure 81:
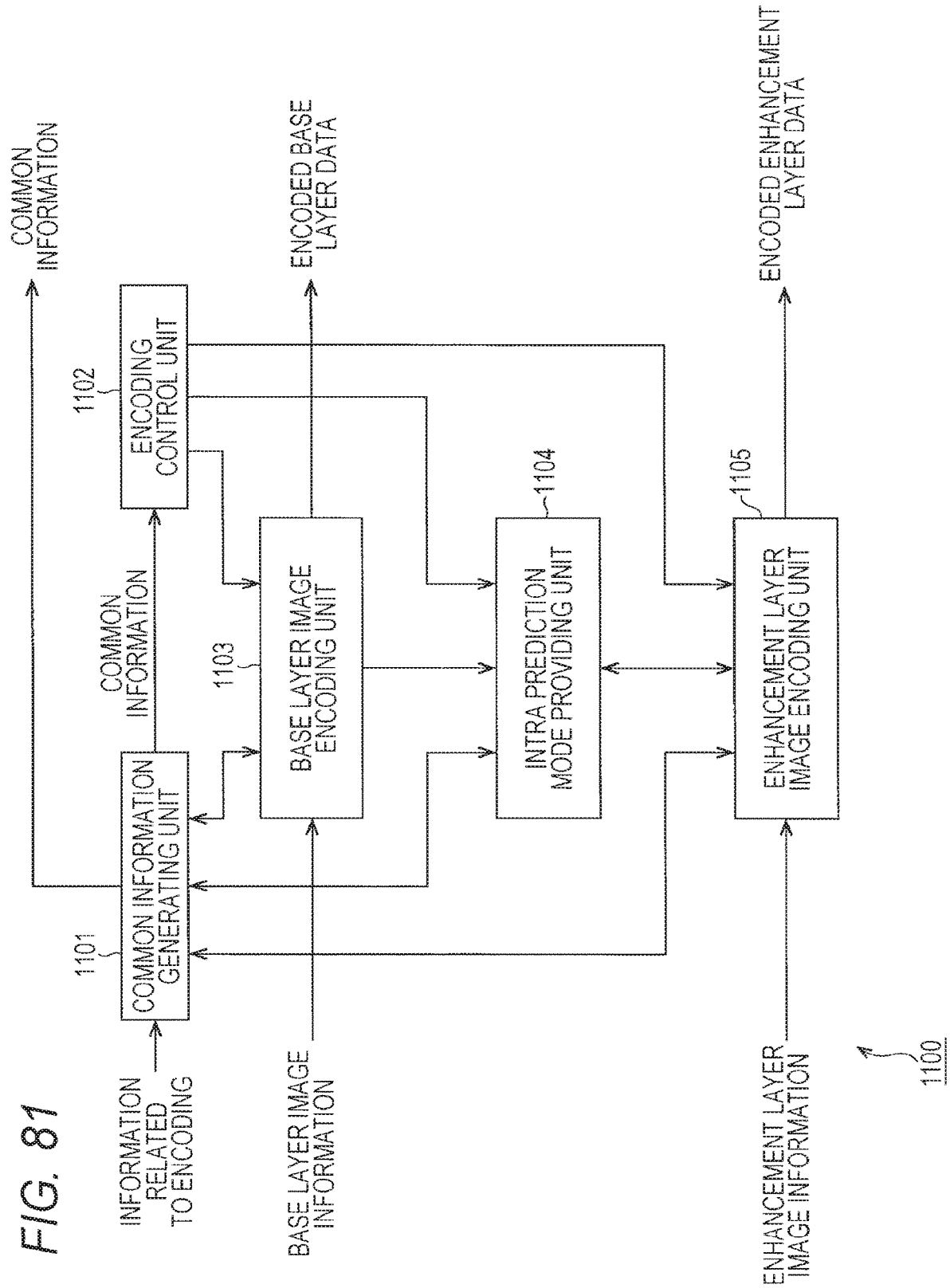
FIG. 81 is a block diagram illustrating an exemplary main configuration of a scalable coding device.

FIG. 81 is a block diagram illustrating an exemplary main configuration of a scalable coding device.

A scalable coding device 1100 illustrated in FIG. 81 is an image information processing device that performs scalable coding on image data, and encodes each layer of image data hierarchized into a base layer and an enhancement layer. A parameter (a parameter having scalability) used as a hierarchization reference is arbitrary. The scalable coding device 1100 includes a common information generating unit 1101, an encoding control unit 1102, a base layer image encoding unit 1103, an intra prediction mode providing unit 1104, and an enhancement layer image encoding unit 1105.

For example, the common information generating unit 1101 acquires information related to encoding of image data stored in a NAL unit. Further, the common information generating unit 1101 acquires necessary information from the base layer image encoding unit 1103, the intra prediction mode providing unit 1104, the enhancement layer image encoding unit 1105, and the like as necessary. The common information generating unit 1101 generates common information serving as information related to all layers based on the information. For example, the common information includes a video parameter set and the like. The common information generating unit 1101 outputs the generated common information to the outside of the scalable coding device 1100, for example, as a NAL unit. Further, the common information generating unit 1101 supplies the generated common information to the encoding control unit 1102.

Furthermore, the common information generating unit 1101 supplies some or all of the generated common information to the base layer image encoding unit 1103, the intra prediction mode providing unit 1104, and the enhancement layer image encoding unit 1105 as necessary.

The encoding control unit 1102 controls the base layer image encoding unit 1103, the intra prediction mode providing unit 1104, and the enhancement layer image encoding unit 1105 based on the common information supplied from the common information generating unit 1101, and controls encoding of each layer.

The base layer image encoding unit 1103 acquires image information (base layer image information) of a base layer. The base layer image encoding unit 1103 encodes the base layer image information without using information of another layer, and generates and outputs encoded data (encoded base layer data) of the base layer. Further, the base layer image encoding unit 1103 supplies an intra prediction mode of intra prediction performed at the time of encoding to the intra prediction mode providing unit 1104 as the intra prediction mode of the base layer.

The intra prediction mode providing unit 1104 performs a process of supplying an intra prediction mode obtained in intra prediction in the base layer image encoding unit 1103 to intra prediction in the enhancement layer image encoding unit 1105. At this time, the intra prediction mode providing unit 1104 thins out the intra prediction mode of the base layer acquired from the base layer image encoding unit 1103 at a certain thinning rate, and stores the resultant intra prediction mode. Further, when encoding of the enhancement layer is performed, the intra prediction mode providing unit 1104 supplies the stored intra prediction mode of the base layer to the enhancement layer image encoding unit 1105. Furthermore, the intra prediction mode providing unit 1104 may be able to set the thinning rate of the intra prediction mode.

The enhancement layer image encoding unit 1105 acquires image information (enhancement layer image information) of an enhancement layer. The enhancement layer image encoding unit 1105 encodes the enhancement layer image information. Further, the enhancement layer image encoding unit 1105 acquires the intra prediction mode of the base layer from the intra prediction mode providing unit 1104, performs intra prediction of the enhancement layer using the intra prediction mode of the base layer, and encodes an image of the enhancement layer. Then, the enhancement layer image encoding unit 1105 outputs the obtained encoded data (encoded enhancement layer data). As the intra prediction of the enhancement layer is performed using the intra prediction mode of the base layer as described above, the decoding side can similarly perform intra prediction using the intra prediction mode of the base layer. In other words, as information related to the intra prediction mode, information of the base layer is preferably transmitted, and it is unnecessary to transmit information of the enhancement layer. Accordingly, it is possible to suppress an increase in the coding efficiency. Then, when the intra prediction mode of the base layer is stored to be used for the intra prediction of the enhancement layer, the thinning process is performed as described above, and thus it is possible to reduce the necessary storage capacity, and it is possible to reduce the coding and decoding load.

<Base Layer Image Encoding Unit>

Figure 82:
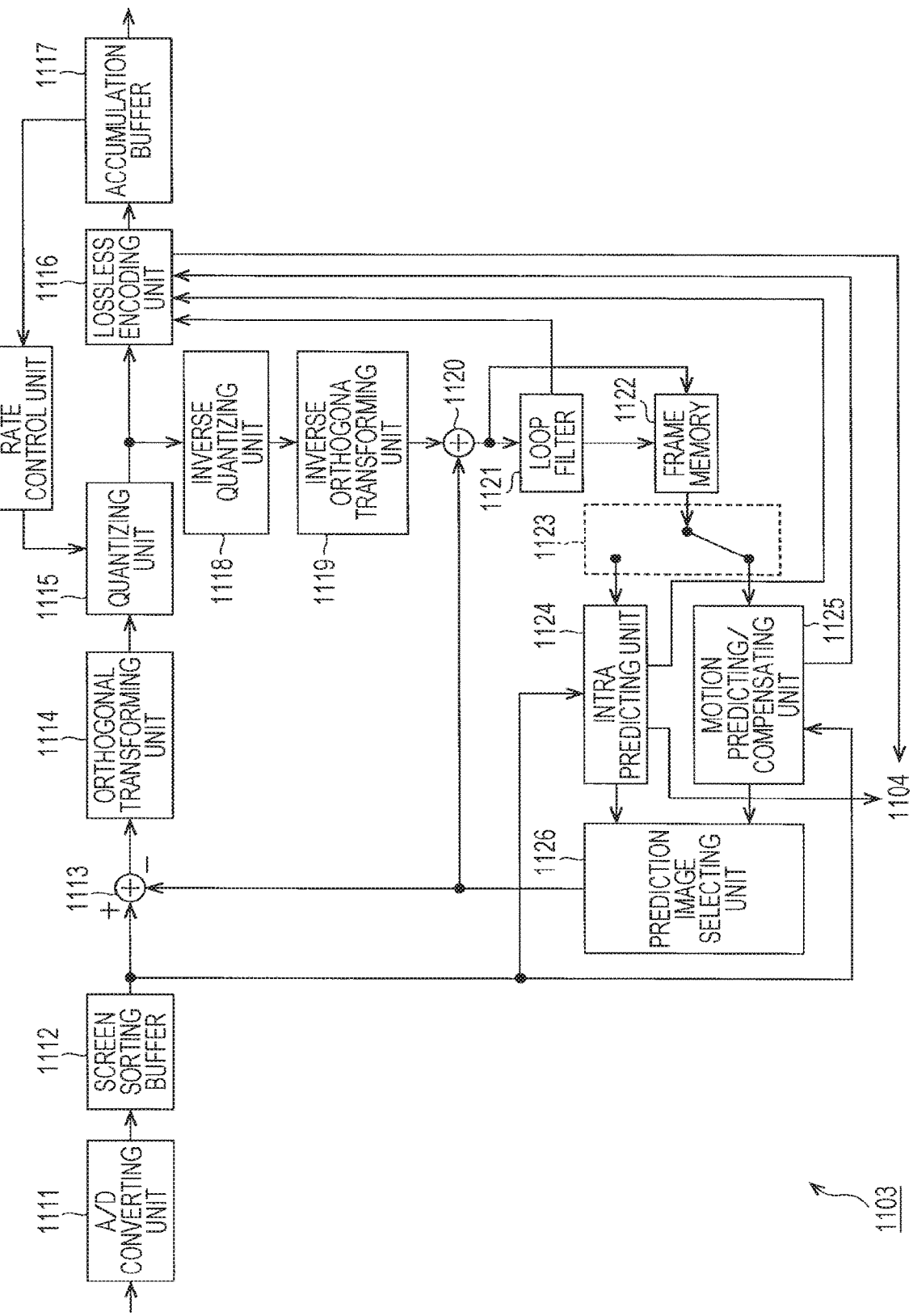
FIG. 82 is a block diagram illustrating an exemplary main configuration of a base layer image encoding unit.

FIG. 82 is a block diagram illustrating an exemplary main configuration of the base layer image encoding unit 1103 of FIG. 81. The base layer image encoding unit 1103 includes an A/D converting unit 1111, a screen sorting buffer 1112, an operation unit 1113, an orthogonal transforming unit 1114, a quantizing unit 1115, a lossless encoding unit 1116, an accumulation buffer 1117, an inverse quantizing unit 1118, and an inverse orthogonal transforming unit 1119 as illustrated in FIG. 82. The base layer image encoding unit 1103 further includes an operation unit 1120, a loop filter 1121, a frame memory 1122, a selecting unit 1123, an intra predicting unit 1124, a motion predicting/compensating unit 1125, a prediction image selecting unit 1126, and a rate control unit 1127.

The A/D converting unit 1111 performs A/D conversion on input image data (base layer image information), and supplies the converted image data (digital data) to be stored in the screen sorting buffer 1112. The screen sorting buffer 1112 performs sorting on an image of frames stored in a display order in a frame order for encoding according to a Group of Picture (GOP), and supplies the image sorted in the frame order to the operation unit 1113. Further, the screen sorting buffer 1112 supplies the image sorted in the frame order to the intra predicting unit 1124 and the motion predicting/compensating unit 1125.

The operation unit 1113 subtracts a prediction image supplied from the intra predicting unit 1124 or the motion predicting/compensating unit 1125 via the prediction image selecting unit 1126 from an image read from the screen sorting buffer 1112, and outputs differential information thereof to the orthogonal transforming unit 1114. For example, in the case of an image on which intra coding is performed, the operation unit 1113 subtracts a prediction image supplied from the intra predicting unit 1124 from the image read from the screen sorting buffer 1112. Further, for example, in the case of an image on which inter coding is performed, the operation unit 1113 subtracts a prediction image supplied from the motion predicting/compensating unit 1125 from the image read from the screen sorting buffer 1112.

The orthogonal transforming unit 1114 performs orthogonal transform such as discrete cosine transform or Karhunen Loéve transform on the differential information supplied from the operation unit 1113. The orthogonal transforming unit 1114 supplies transform coefficients to the quantizing unit 1115.

The quantizing unit 1115 quantizes the transform coefficients supplied from the orthogonal transforming unit 1114. The quantizing unit 1115 sets a quantization parameter based on information related to a target value of a coding amount supplied from the rate control unit 1127, and performs quantization. The quantizing unit 1115 supplies the quantized transform coefficients to the lossless encoding unit 1116.

The lossless encoding unit 1116 encodes the transform coefficients quantized in the quantizing unit 1115 according to an arbitrary coding scheme. Since coefficient data is quantized under control of the rate control unit 1127, the coding amount becomes a target value (or approximates a target value) set by the rate control unit 1127.

The lossless encoding unit 1116 acquires, for example, information indicating an intra prediction mode from the intra predicting unit 1124, and acquires, for example, information indicating an inter prediction mode or differential motion vector information from the motion predicting/compensating unit 1125. Further, the lossless encoding unit 1116 appropriately generates a NAL unit of the base layer including a sequence parameter set (SPS), a picture parameter set (PPS), and the like.

The lossless encoding unit 1116 encodes various kinds of information according to an arbitrary coding scheme, and sets (multiplexes) them as part of encoded data (which is also referred to as an "encoded stream"). The lossless encoding unit 1116 supplies the encoded data obtained by the encoding to be accumulated in the accumulation buffer 1117.

Examples of the coding scheme of the lossless encoding unit 1116 include variable length coding and arithmetic coding. As the variable length coding, for example, there is Context-Adaptive Variable Length Coding (CAVLC) defined in the H.264/AVC scheme. As the arithmetic coding, for example, there is Context-Adaptive Binary Arithmetic Coding (CABAC).

The accumulation buffer 1117 temporarily holds the encoded data (encoded base layer data) supplied from the lossless encoding unit 1116. The accumulation buffer 1117 outputs the held encoded base layer data to, for example, a recording device (not illustrated) (a recording medium) at a subsequent stage or a transmission path at a certain timing. In other words, the accumulation buffer 1117 also serves as a transmitting unit that transmits the encoded data.

The transform coefficients quantized by the quantizing unit 1115 are also supplied to the inverse quantizing unit 1118. The inverse quantizing unit 1118 inversely quantizes the quantized transform coefficients by a method corresponding to the quantization performed by the quantizing unit 1115. The inverse quantizing unit 1118 supplies the obtained transform coefficients to the inverse orthogonal transforming unit 1119.

The inverse orthogonal transforming unit 1119 performs inverse orthogonal transform on the transform coefficients supplied from the inverse quantizing unit 1118 by a method corresponding to the orthogonal transform process performed by the orthogonal transforming unit 1114. An output (restored differential information) that has been subjected to the inverse orthogonal transform is supplied to the operation unit 1120.

The operation unit 1120 obtains a locally decoded image (a decoded image) by adding the prediction image received from the intra predicting unit 1124 or the motion predicting/compensating unit 1125 via the prediction image selecting unit 1126 to the restored differential information that is the inverse orthogonal transform result supplied from the inverse orthogonal transforming unit 1119. The decoded image is supplied to the loop filter 1121 or the frame memory 1122.

The loop filter 1121 includes a deblock filter, an adaptive loop filter, or the like, and performs an appropriate filter process on the reconstructed image supplied from the operation unit 1120. For example, the loop filter 1121 performs the deblock filter process on the reconstructed image, and removes block distortion of the reconstructed image. Further, for example, the loop filter 1121 improves the image quality by performing the loop filter process on the deblock the filter process result (the reconstructed image from which the block distortion has been removed) using the Wiener Filter. The loop filter 1121 supplies a filter process result (which is also referred to as a "decoded image") to the frame memory 1122.

The loop filter 1121 may further perform any other arbitrary filter process on the reconstructed image. The loop filter 1121 may supply information used in the filter process such as a filter coefficient to the lossless encoding unit 1116 as necessary so that the information is encoded.

The frame memory 1122 stores the reconstructed image supplied from the operation unit 1120 and the decoded image supplied from the loop filter 1121. The frame memory 1122 supplies the stored reconstructed image to the intra predicting unit 1124 via the selecting unit 1123 at a certain timing or based on a request given from the outside such as the intra predicting unit 1124. Further, the frame memory 1122 supplies the stored decoded image to the motion predicting/compensating unit 1125 via the selecting unit 1123 at a certain timing or based on a request given from the outside such as the motion predicting/compensating unit 1125.

The frame memory 1122 stores the supplied decoded image, and supplies the stored decoded image to the selecting unit 1123 as the reference image at a certain timing.

The selecting unit 1123 selects a supply destination of the reference image supplied from the frame memory 1122. For example, in the case of the intra prediction, the selecting unit 1123 supplies the reference image (the pixel value in the current picture) supplied from the frame memory 1122 to the motion predicting/compensating unit 1125. Further, for example, in the case of the inter prediction, the selecting unit 1123 supplies the reference image supplied from the frame memory 1122 to the motion predicting/compensating unit 1125.

The intra predicting unit 1124 performs the intra prediction (intra prediction) of generating a prediction image using the pixel value in the current picture serving as the reference image supplied from the frame memory 1122 via the selecting unit 1123. The intra predicting unit 1124 performs the intra prediction in a plurality of intra prediction modes which are prepared in advance.

The intra predicting unit 1124 generates prediction images in all the intra prediction modes serving as a candidate, evaluates cost function values of the prediction images using an input image supplied from the screen sorting buffer 1112, and selects an optimal mode. When the optimal intra prediction mode is selected, the intra predicting unit 1124 supplies the prediction image generated in the optimal mode to the prediction image selecting unit 1126.

Further, the intra predicting unit 1124 appropriately supplies, for example, the intra prediction mode information indicating the employed intra prediction mode to the lossless encoding unit 1116 so that the intra prediction mode information is encoded as described above.

The motion predicting/compensating unit 1125 performs motion prediction (inter prediction) using the input image supplied from the screen sorting buffer 1112 and the reference image supplied from the frame memory 1122 via the selecting unit 1123. The motion predicting/compensating unit 1125 performs the motion compensation process according to the detected motion vector, and generates a prediction image (inter prediction image information). The motion predicting/compensating unit 1125 performs the inter prediction in a plurality of inter prediction modes which are prepared in advance.

The motion predicting/compensating unit 1125 generates prediction images in all the inter prediction modes serving as a candidate. The motion predicting/compensating unit 1125 evaluates cost function values of the prediction images using the input image supplied from the screen sorting buffer 1112, information of the generated differential motion vector, and the like, and selects an optimal mode. When the optimal inter prediction mode is selected, the motion predicting/compensating unit 1125 supplies the prediction image generated in the optimal mode to the prediction image selecting unit 1126.

The motion predicting/compensating unit 1125 supplies information indicating the employed inter prediction mode, information necessary to perform processing in the inter prediction mode when the encoded data is decoded, and the like to the lossless encoding unit 1116 so that the information is encoded. As the necessary information, there is information of a generated differential motion vector, and as prediction motion vector information, there is a flag indicating an index of a prediction motion vector.

The prediction image selecting unit 1126 selects the supply source of the prediction image that is supplied to the operation unit 1113 and the operation unit 1120. For example, in the case of the intra coding, the prediction image selecting unit 1126 selects the intra predicting unit 1124 as the supply source of the prediction image, and supplies the prediction image supplied from the intra predicting unit 1124 to the operation unit 1113 and the operation unit 1120. Further, for example, in the case of the inter coding, the prediction image selecting unit 1126 selects the motion predicting/compensating unit 1125 as the supply source of the prediction image, and supplies the prediction image supplied from the motion predicting/compensating unit 1125 to the operation unit 1113 and the operation unit 1120.

The rate control unit 1127 controls the rate of the quantization operation of the quantizing unit 1115 based on the coding amount of the encoded data accumulated in the accumulation buffer 1117 such that neither an overflow nor an underflow occurs.

The intra predicting unit 1124 supplies the employed intra prediction mode to the intra prediction mode providing unit 1104 as the intra prediction mode of the base layer. The lossless encoding unit 1116 supplies information indicating the resolution of the base layer to the intra prediction mode providing unit 1104.

<Enhancement Layer Image Encoding Unit>

Figure 83:
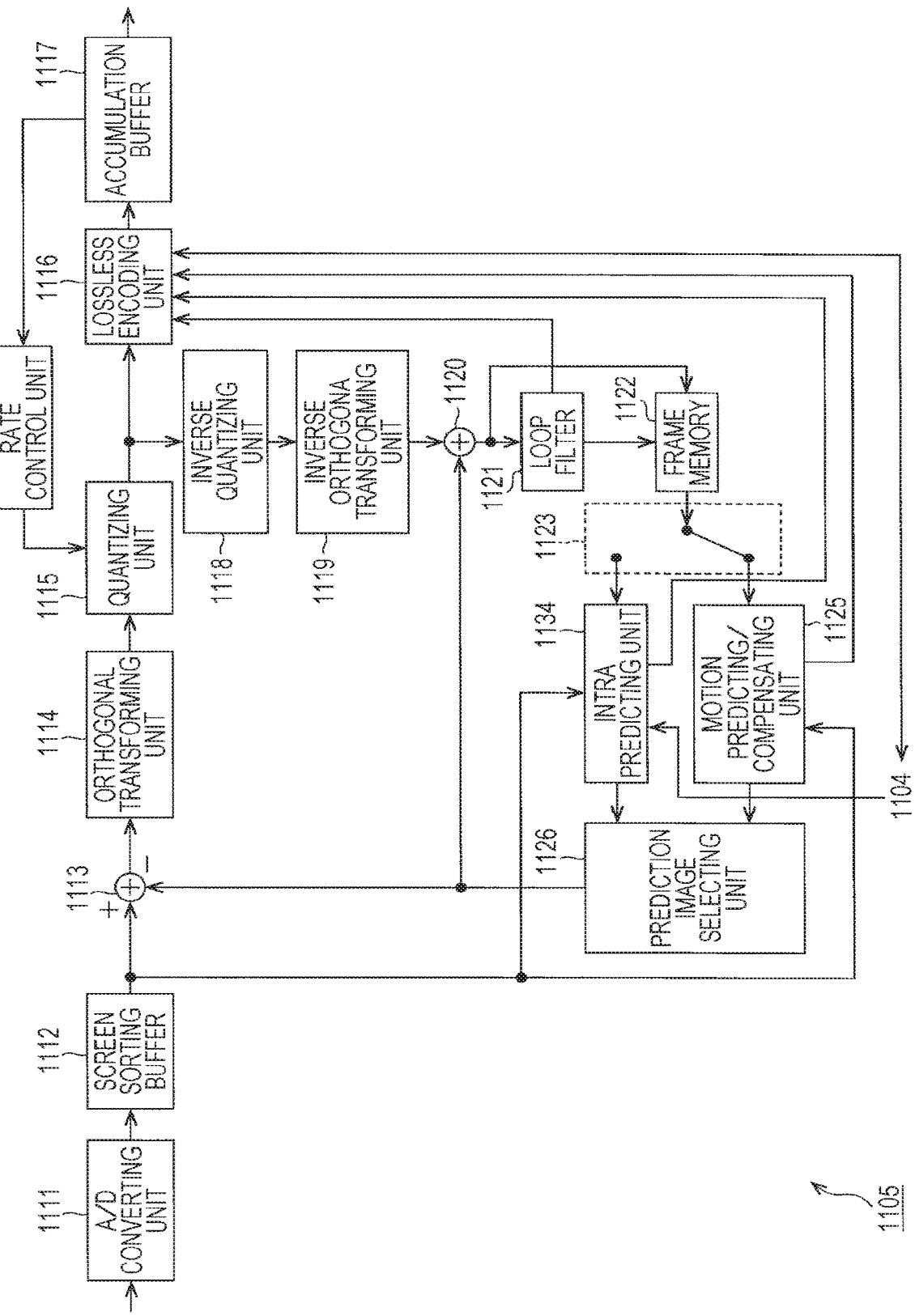
FIG. 83 is a block diagram illustrating an exemplary main configuration of an enhancement layer image encoding unit.

FIG. 83 is a block diagram illustrating an exemplary main configuration of the enhancement layer image encoding unit 1105 of FIG. 81. The enhancement layer image encoding unit 1105 has basically the same configuration as the base layer image encoding unit 1103 of FIG. 82 as illustrated in FIG. 83.

Here, the respective components of the enhancement layer image encoding unit 1105 perform a process of encoding enhancement layer image information other than the base layer. In other words, the A/D converting unit 1111 of the enhancement layer image encoding unit 1105 performs A/D conversion on the enhancement layer image information, and the accumulation buffer 1117 of the enhancement layer image encoding unit 1105 outputs the encoded enhancement layer data to, for example, a recording device (not illustrated) (a recording medium) at a subsequent stage or a transmission path.

The enhancement layer image encoding unit 1105 includes an intra predicting unit 1134 instead of the intra predicting unit 1124.

The intra predicting unit 1134 acquires (reads) an intra prediction mode corresponding to a current block among (the representative values of) the intra prediction modes of the base layer stored in the intra prediction mode providing unit 1104, performs the intra prediction of the enhancement layer using the intra prediction mode, and generates a prediction image. The intra prediction is performed in the same manner as in the intra predicting unit 1124.

Further, similarly to the intra predicting unit 1124, the intra predicting unit 1134 appropriately supplies, for example, intra prediction mode information of the enhancement layer indicating an employed intra prediction mode to the lossless encoding unit 1116 so that the information is encoded.

The lossless encoding unit 1116 of the enhancement layer image encoding unit 1105 supplies information indicating the resolution of the enhancement layer to the intra prediction mode providing unit 1104. Further, the lossless encoding unit 1116 acquires information that indicates a thinning rate of the intra prediction mode of the base layer and is supplied from the intra prediction mode providing unit 1104, encodes the acquired information, and causes the encoded result to be transmitted to the decoding side, for example, through the sequence parameter set (SPS), the picture parameter set (PPS), or the slice header of the enhancement layer.

For example, the information indicating the thinning rate may be transmitted through the video parameter set (VPS). In this case, the information indicating the thinning rate is supplied to the common information generating unit 1101.

<Intra Prediction Mode Providing Unit>

Figure 84:
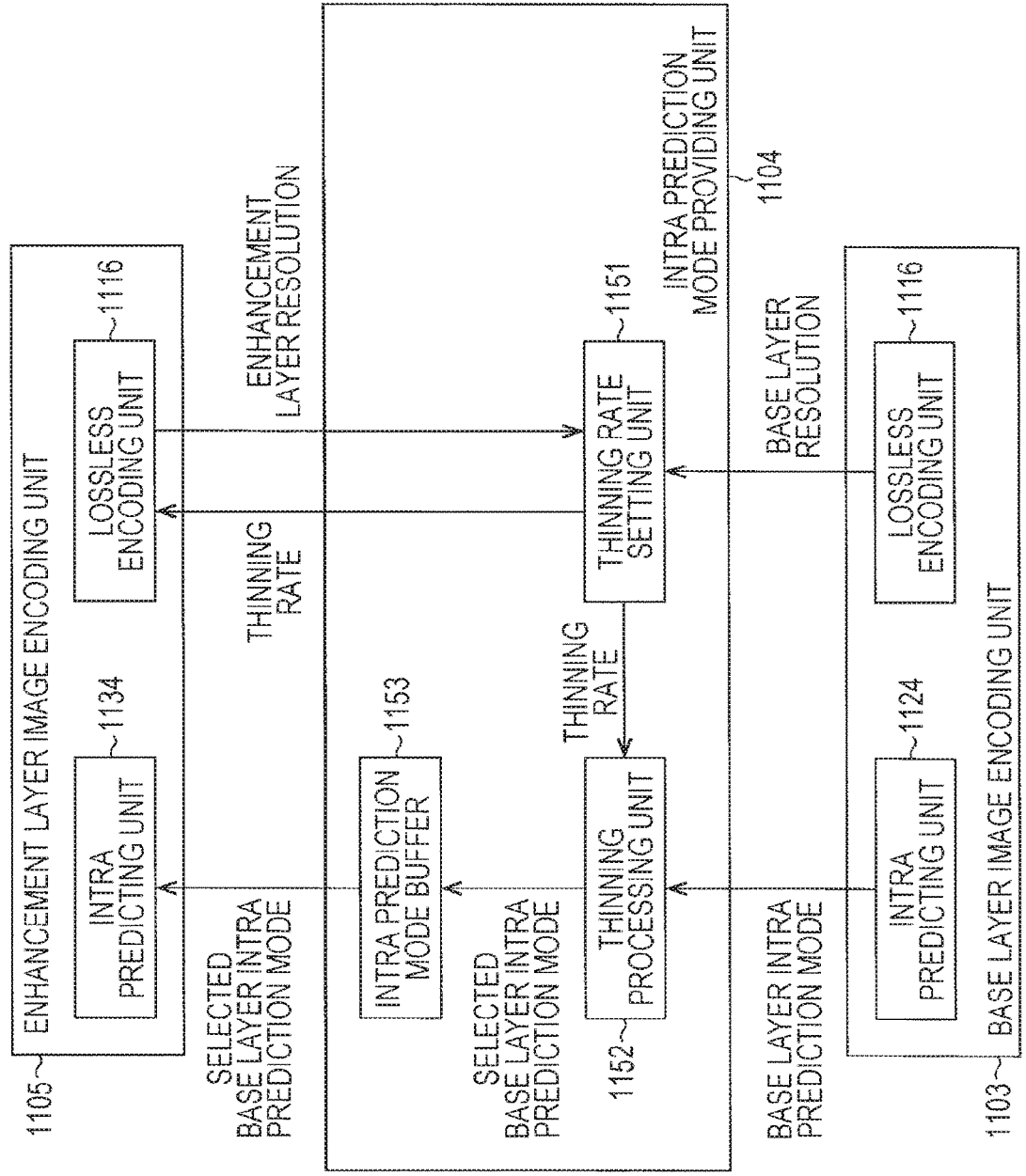
FIG. 84 is a block diagram illustrating an exemplary main configuration of an intra prediction mode providing unit.

FIG. 84 is a block diagram illustrating an exemplary main configuration of the intra prediction mode providing unit 1104 of FIG. 81.

The intra prediction mode providing unit 1104 includes a thinning rate setting unit 1151, a thinning processing unit 1152, and an intra prediction mode buffer 1153 as illustrated in FIG. 84.

The thinning rate setting unit 1151 sets the thinning rate of the intra prediction mode of the base layer. A setting method is arbitrary. For example, the thinning rate setting unit 1151 may set the thinning rate based on an instruction given from the outside such as the user. At this time, a thinning rate may be set based on a ratio in the base layer.

Further, for example, the thinning rate setting unit 1151 may acquire the base layer resolution from the lossless encoding unit 1116 of the base layer image encoding unit 1103 and acquire the enhancement layer resolution from the lossless encoding unit 1116 of the enhancement layer image encoding unit 1105. For example, the thinning rate setting unit 1151 may present the information indicating the resolution to the user by displaying the information indicating the resolution on a monitor or the like or outputting a sound representing the information indicating the resolution through a speaker or the like. In this case, the user can set a thinning rate in view of the resolution of each layer.

Further, for example, the user may designate a block size of an intra prediction mode in the enhancement layer, and the thinning rate setting unit 1151 may convert the designated information into a thinning rate based on the acquired resolution of each layer. As a result, it is possible to set a thinning rate based on information easily understood by the user, and it is possible to more easily set a thinning rate.

The thinning rate setting unit 1151 supplies information indicating the set thinning rate to the thinning processing unit 1152. Further, the thinning rate setting unit 1151 supplies the information indicating the set thinning rate to the lossless encoding unit 1116 of the enhancement layer image encoding unit 1105 (or the common information generating unit 1101) so that the information is transmitted to the decoding side.

The thinning processing unit 1152 acquires the intra prediction mode of the base layer supplied from the intra predicting unit 1124 of the base layer image encoding unit 1103, and thins out the intra prediction mode at the thinning rate set by the thinning rate setting unit 1151. For example, as described above, the thinning process of the intra prediction mode is performed for each certain area, and a representative (the intra prediction mode) of each area is selected. The intra prediction mode of the base layer left (selected) after the thinning is supplied to the intra prediction mode buffer 1153.

The intra prediction mode buffer 1153 stores the selected base layer intra prediction mode supplied from the thinning processing unit 1152. The intra prediction mode buffer 1153 supplies an intra prediction mode of an area corresponding to a current block of intra prediction of an enhancement layer performed in the intra predicting unit 1134 of the enhancement layer image encoding unit 1105 among the selected base layer intra prediction modes being stored to the intra predicting unit 1134.

As described above, the intra predicting unit 1134 performs intra prediction of a current block of an enhancement layer using the intra prediction mode of the base layer (the selected base layer intra prediction mode) read from the intra prediction mode buffer 1153, and generates a prediction image.

As described above, the scalable coding device 1100 can use the intra prediction mode of the base layer for the intra prediction of encoding the enhancement layer, and thus it is possible to suppress a reduction in the coding efficiency. As a result, the scalable coding device 1100 can suppress a reduction in an image quality caused by encoding and decoding. Further, when the intra prediction mode of the base layer is supplied to the enhancement layer, the intra prediction mode is thinned out at a certain thinning rate, and thus the scalable coding device 1100 can suppress an increase in a storage capacity necessary for encoding and decoding.

<Common Information Generation Process Flow>

Next, the flows of the processes performed by the scalable coding device 1100 will be described. First, an exemplary flow of the common information generation process will be described with reference to a flowchart of FIG. 85.

When the common information generation process starts, in step S4101, the thinning rate setting unit 1151 of the intra prediction mode providing unit 1104 sets the thinning rate of the base layer intra prediction mode.

In step S4102, the common information generating unit 1101 generates a video parameter set including the information indicating the thinning rate set in step S4101.

In step S4103, the common information generating unit 1101 transmits (supplies) the video parameter set generated in step S4102 to the decoding side as the common information. When the process of step S4103 ends, the common information generation process ends.

<Coding Process Flow>

Next, an exemplary flow of the coding process will be described with reference to a flowchart of FIG. 86. The scalable coding device 1100 performs the coding process in units of pictures.

When the coding process starts, in step S4121, the encoding control unit 1102 of the scalable coding device 1100 sets a first layer as a processing target.

In step S4122, the encoding control unit 1102 determines whether or not a current layer serving as a processing target is a base layer. When the current layer is determined to be the base layer, the process proceeds to step S4123.

In step S4123, the base layer image encoding unit 1103 and the intra prediction mode providing unit 1104 perform the base layer coding process. When the process of step S4123 ends, the process proceeds to step S4126.

However, when the current layer is determined to be an enhancement layer in step S4122, the process proceeds to step S4124. In step S4124, the encoding control unit 1102 decides a base layer corresponding to (that is, serving as a reference destination) a current layer.

In step S4125, the enhancement layer image encoding unit 1105 performs the enhancement layer coding process. When the process of step S4125 ends, the process proceeds to step S4126.

In step S4126, the encoding control unit 1102 determines whether or not all layers have been processed. When it is determined that there is a non-processed layer, the process proceeds to step S4127.

In step S4127, the encoding control unit 1102 sets a next non-processed layer as a processing target (a current layer). When the process of step S4127 ends, the process returns to step S4122. The process of step S4122 to step S4127 is repeatedly performed, and thus each layer is encoded.

Then, when all layers are determined to have been processed in step S4126, the coding process ends.

<Base Layer Coding Process Flow>

Next, an exemplary flow of the base layer coding process performed in step S4123 of FIG. 86 will be described with reference to a flowchart of FIG. 87.

In step S4141, the A/D converting unit 1111 of the base layer image encoding unit 1103 performs A/D conversion on input image information (image data) of a base layer. In step S4142, the screen sorting buffer 1112 stores the image information (digital data) of the base layer that has been subjected to the A/D conversion, and sorts the pictures arranged in the display order in the encoding order.

In step S4143, the intra predicting unit 1124 performs the intra prediction process of the intra prediction mode. In step S4144, the motion predicting/compensating unit 1125 performs the motion prediction and compensation processes in which the motion prediction and the motion compensation of the inter prediction mode are performed. In step S4145, the prediction image selecting unit 1126 decides an optimal mode based on the cost function values output from the intra predicting unit 1124 and the motion predicting/compensating unit 1125. In other words, the prediction image selecting unit 1126 selects either of the prediction image generated by the intra predicting unit 1124 and the prediction image generated by the motion predicting/compensating unit 1125. In step S4146, the operation unit 1113 calculates a difference between the image sorted by the process of step S4142 and the prediction image selected by the process of step S4145. The differential data is smaller in a data amount than original image data. Thus, it is possible to compress a data mount to be smaller than when an image is encoded without change.

In step S4147, the orthogonal transforming unit 1114 performs the orthogonal transform process on the differential information generated by the process of step S4146. In step S4148, the quantizing unit 1115 quantizes the orthogonal transform coefficients obtained by the process of step S4147 using the quantization parameter calculated by the rate control unit 1127.

The differential information quantized by the process of step S4148 is locally decoded as follows. In other words, in step S4149, the inverse quantizing unit 1118 inversely quantizes the quantized coefficients (which are also referred to as "quantization coefficients") generated by the process of step S4148 according to characteristics corresponding to characteristics of the quantizing unit 1115. In step S4150, the inverse orthogonal transforming unit 1119 performs inverse orthogonal transform on the orthogonal transform coefficients obtained by the process of step S4147. In step S4151, the operation unit 1120 adds the prediction image to the locally decoded differential information, and generates a locally decoded image (an image corresponding to an input to the operation unit 1113).

In step S4152, the loop filter 1121 performs filtering on the image generated by the process of step S4151. As a result, block distortion and the like are removed. In step S4153, the frame memory 1122 stores the image from which the block distortion and the like have been removed by the process of step S4152. Further, an image that has not been subjected to the filter process performed by the loop filter 1121 is also supplied to the frame memory 1122 from the operation unit 1120 and stored in the frame memory 1122. The image stored in the frame memory 1122 is used for the process of step S4143 or the process of step S4144.

Figure 85:
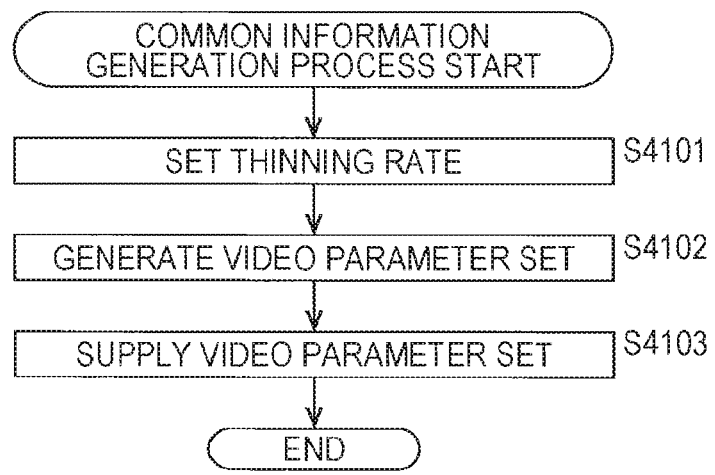
FIG. 85 is a flowchart for describing an exemplary flow of a common information generation process.

In step S4154, the thinning processing unit 1152 of the intra prediction mode providing unit 1104 thins out the intra prediction mode of the base layer at the thinning rate set in step S4101 of FIG. 85.

In step S4155, the intra prediction mode buffer 1153 of the intra prediction mode providing unit 1104 stores the selected intra prediction mode of the base layer that is thinned out by the process of step S4154.

In step S4156, the lossless encoding unit 1116 of the base layer image encoding unit 1103 encodes the coefficients quantized by the process of step S4148. In other words, lossless coding such as variable length coding or arithmetic coding is performed on data corresponding to the differential image.

At this time, the lossless encoding unit 1116 encodes information related to the prediction mode of the prediction image selected by the process of step S4145, and adds the differential image to encoded data obtained by the encoding. In other words, the lossless encoding unit 1116 also encodes the optimal intra prediction mode information supplied from the intra predicting unit 1124, information according to the optimal inter prediction mode supplied from the motion predicting/compensating unit 1125, or the like, and adds the encoded information to the encoded data.

In step S4157, the accumulation buffer 1117 accumulates the encoded base layer data obtained by the process of step S4156. The encoded base layer data accumulated in the accumulation buffer 1117 is appropriately read and transmitted to the decoding side via a transmission path or a recording medium.

In step S4158, the rate control unit 1127 controls the rate of the quantization operation of the quantizing unit 1115 based on the coding amount (the generated coding amount) of the encoded data accumulated in the accumulation buffer 1117 in step S4157 such that neither an overflow nor an underflow occurs.

Figure 86:
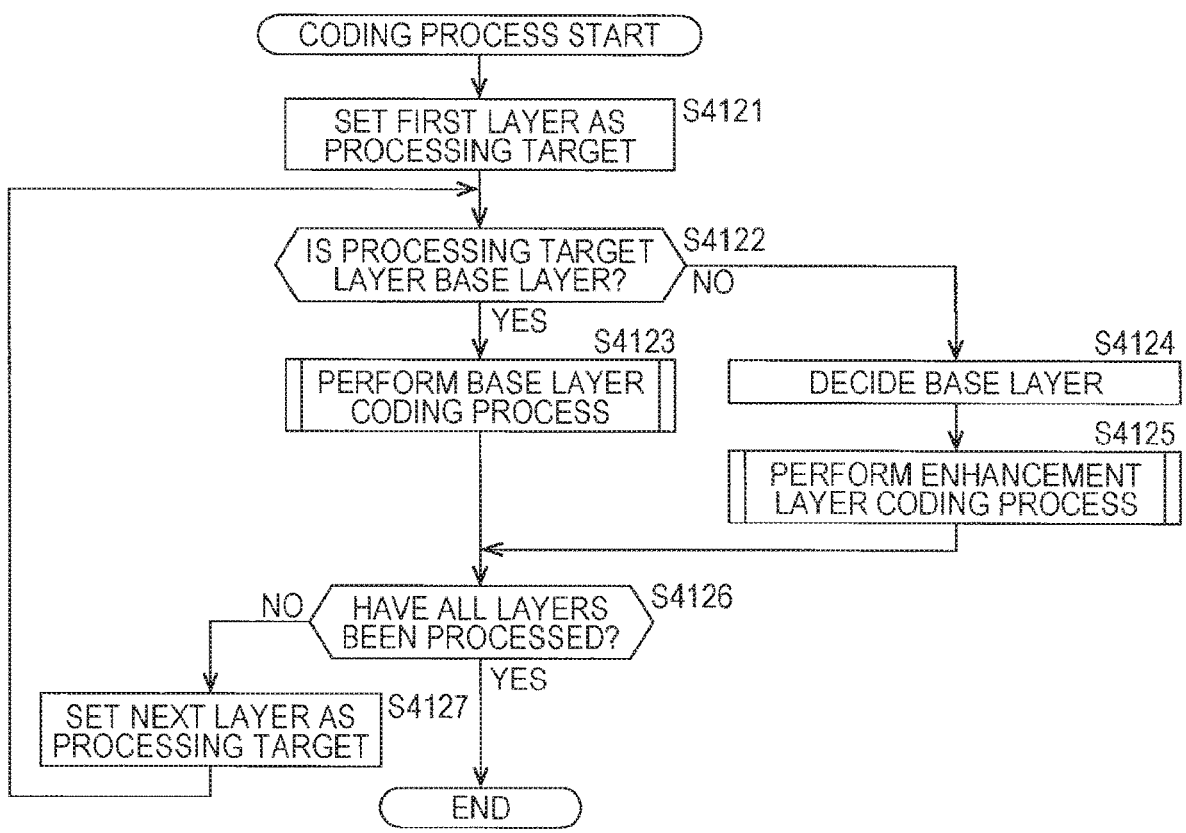
FIG. 86 is a flowchart for describing an exemplary flow of a coding process.

When the process of step S4158 ends, the base layer coding process ends, and the process returns to FIG. 86. For example, the base layer coding process is performed in units of pictures. In other words, the base layer coding process is performed on each picture of a current layer. Here, each process of the base layer coding process is performed for each processing unit.

<Enhancement Layer Coding Process Flow>

Figure 88:
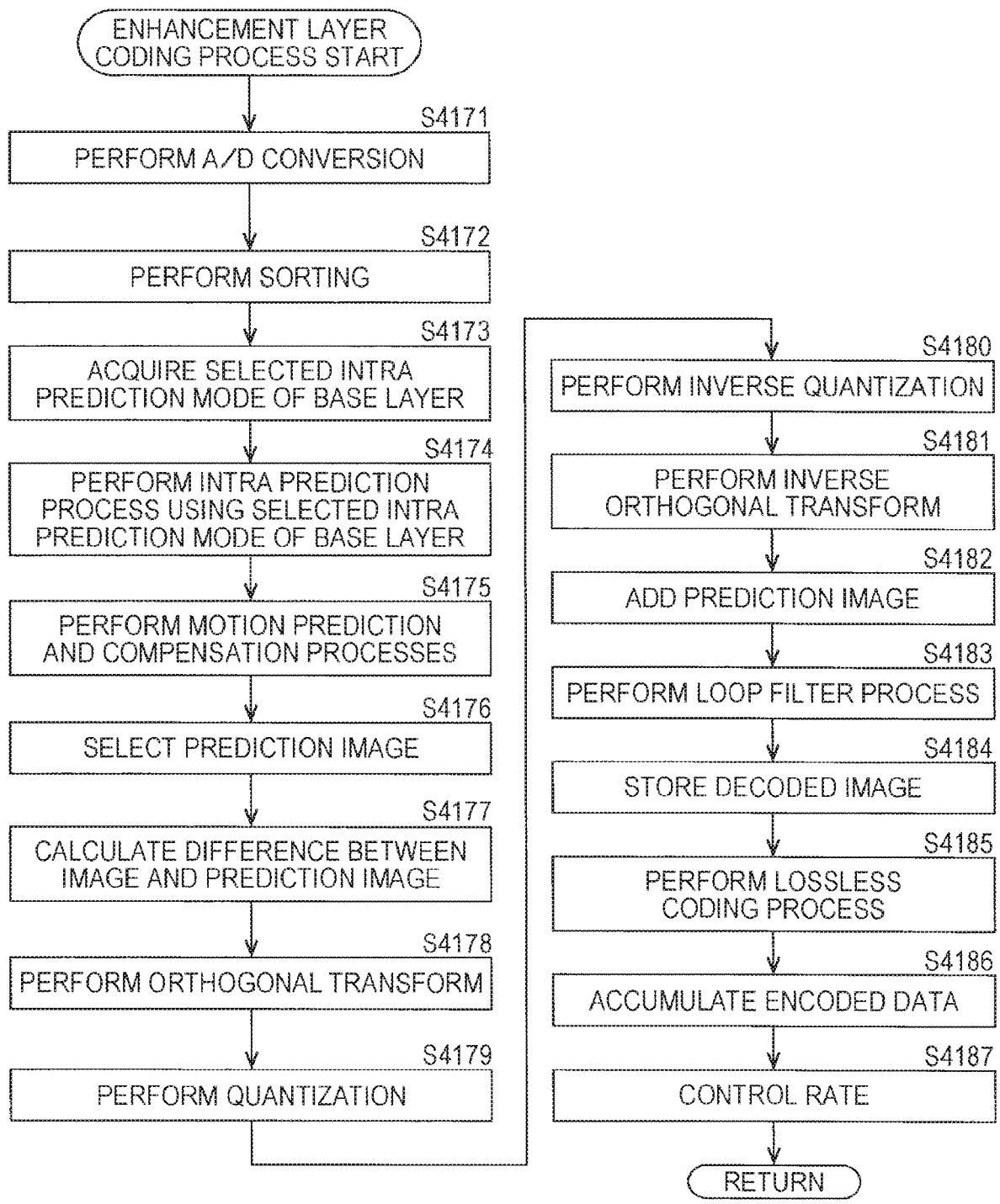
FIG. 88 is a flowchart for describing an exemplary flow of an enhancement layer coding process.

Next, an exemplary flow of the enhancement layer coding process performed in step S4125 of FIG. 86 will be described with reference to a flowchart of FIG. 88.

Figure 87:
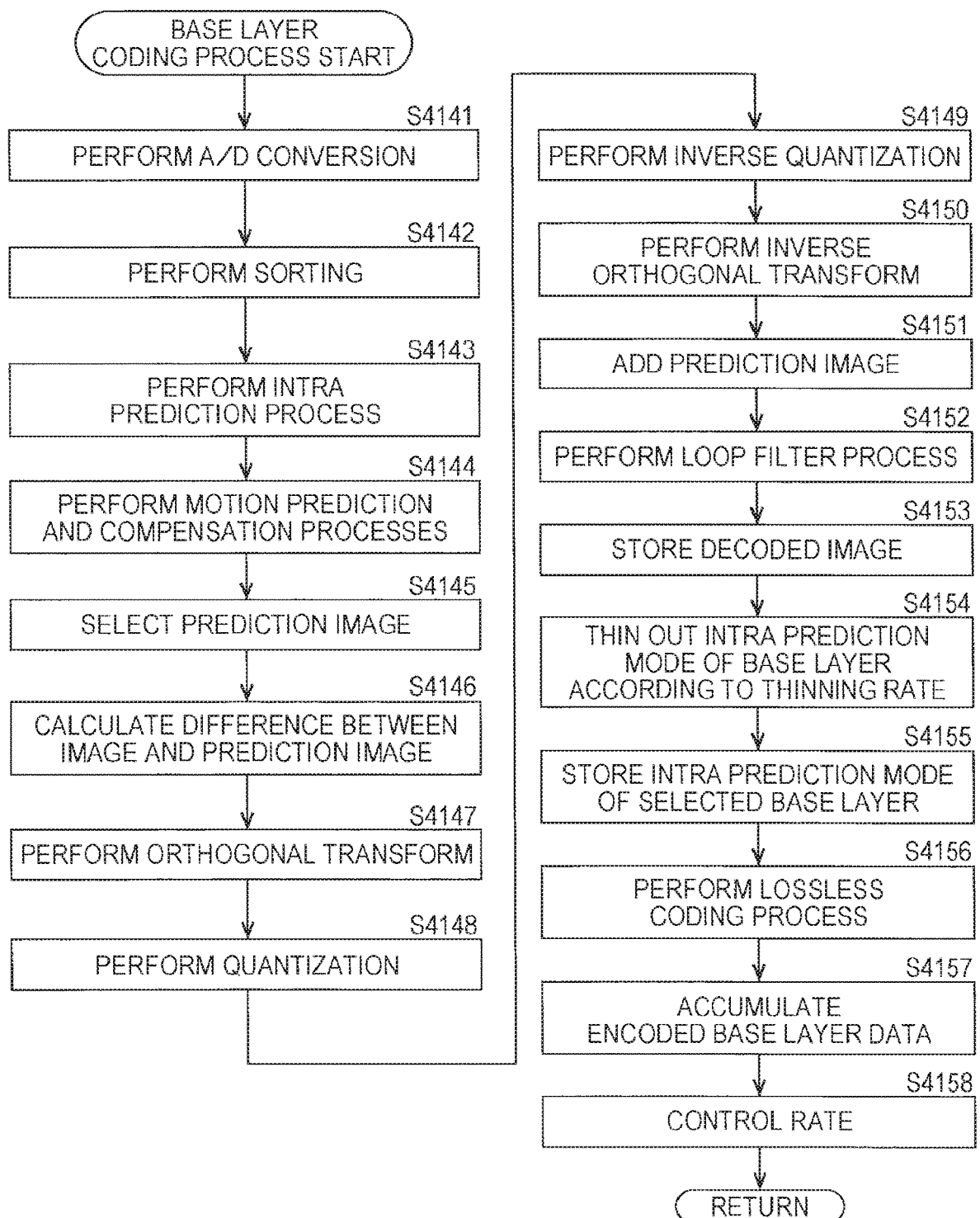
FIG. 87 is a flowchart for describing an exemplary flow of a base layer coding process.

The processes of step S4171, step S4172, and step S4175 to step S4187 of the enhancement layer coding process are performed in the same manner as the processes of step S4141, step S4142, step S4144 to step S4153, and step S4156 to step S4158 of the base layer coding process of FIG. 87. Here, the respective processes of the enhancement layer coding process are performed on the enhancement layer image information through the respective processing units of the enhancement layer image encoding unit 1105.

In step S4173, the intra predicting unit 1134 of the enhancement layer image encoding unit 1105 acquires an intra prediction mode of the base layer (a selected intra prediction mode of the base layer) corresponding to a current block from the intra prediction mode buffer 1153 of the intra prediction mode providing unit 1104.

In step S4174, the intra predicting unit 1134 performs the intra prediction process of the enhancement layer using the selected intra prediction mode of the base layer acquired in step S4173.

When the process of step S4187 ends, the enhancement layer coding process ends, and the process returns to FIG. 86. For example, the enhancement layer coding process is performed in units of pictures. In other words, the enhancement layer coding process is performed on each picture of the current layer. Here, each process of the enhancement layer coding process is performed for each processing unit.

As the process is performed as described above, the scalable coding device 1100 can use the intra prediction mode of the base layer for the intra prediction of encoding the enhancement layer, and thus it is possible to suppress a reduction in the coding efficiency. Thus, the scalable coding device 1100 can suppress a reduction in the image quality caused by encoding and decoding. Further, when the intra prediction mode of the base layer is provided to the enhancement layer, the intra prediction mode is thinned out at a certain thinning rate, and thus the scalable coding device 1100 can suppress an increase in a storage capacity necessary for encoding and decoding.

<7. Sixth Embodiment>

<Scalable Decoding Device>

Figure 89:
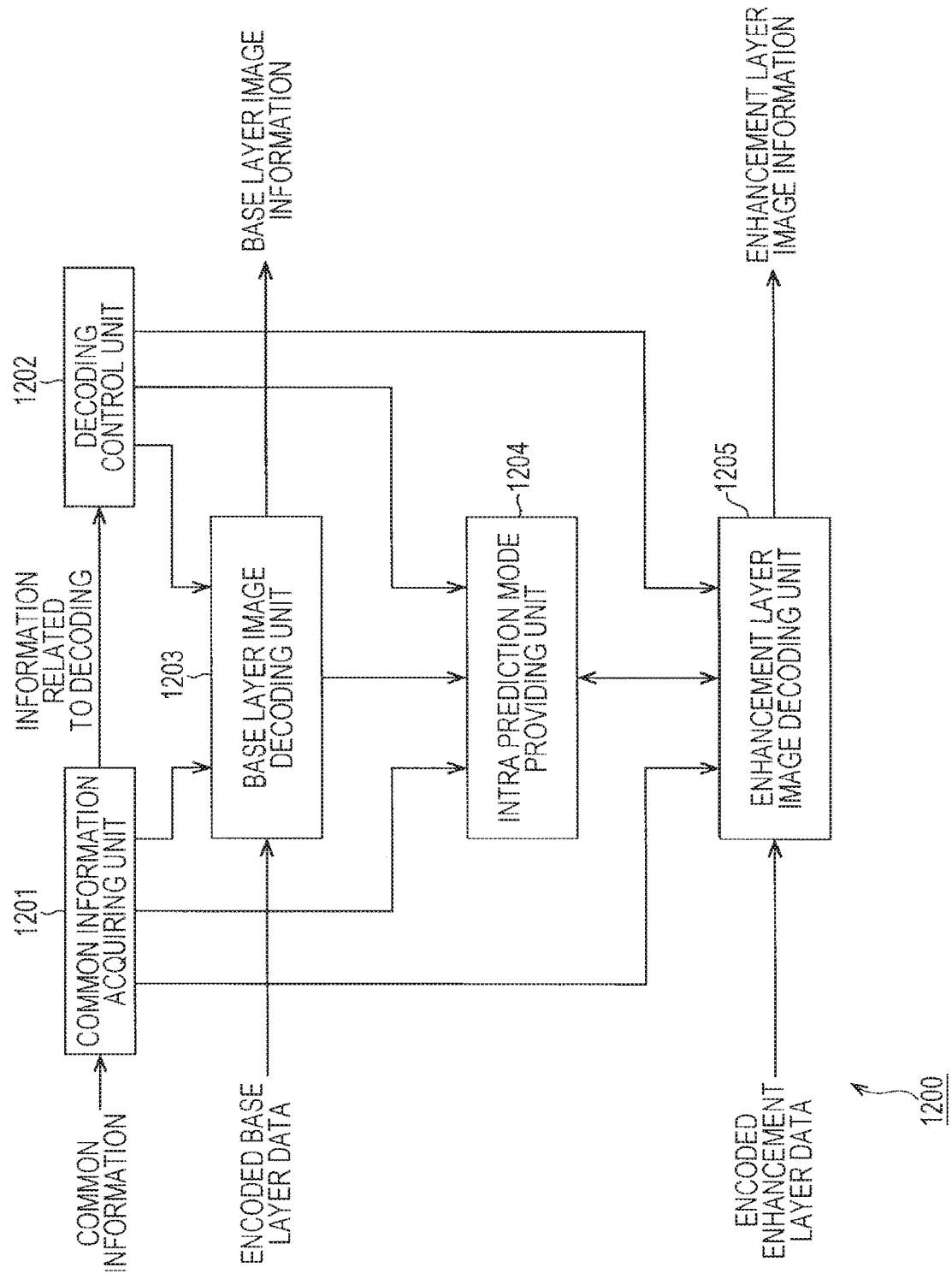
FIG. 89 is a block diagram illustrating an exemplary main configuration of a scalable decoding device.

Next, decoding of encoded data (bit stream) obtained by scalable coding as described above will be described. FIG. 89 is a block diagram illustrating an exemplary main configuration of a scalable decoding device corresponding to the scalable coding device 1100 of FIG. 81. For example, the scalable decoding device 1200 illustrated in FIG. 89 performs scalable decoding on encoded data obtained by scalable coding image data through the scalable coding device 1100 according to a method corresponding to the encoding method.

The scalable decoding device 1200 includes a common information acquiring unit 1201, a decoding control unit 1202, a base layer image decoding unit 1203, an intra prediction mode providing unit 1204, and an enhancement layer image decoding unit 1205 as illustrated in FIG. 89.

The common information acquiring unit 1201 acquires the common information (for example, the video parameter set (VPS)) transmitted from the encoding side. The common information acquiring unit 1201 extracts information related to decoding from the acquired common information, and supplies the acquired information to the decoding control unit 1202. Further, the common information acquiring unit 1201 appropriately supplies part or all of the common information to the base layer image decoding unit 1203, the intra prediction mode providing unit 1204, and the enhancement layer image decoding unit 1205.

For example, when information indicating a thinning rate is transmitted from the encoding side through the video parameter set (VPS), the common information acquiring unit 1201 acquires the information indicating the thinning rate from the video parameter set transmitted from the encoding side, and supplies the information indicating the thinning rate to the intra prediction mode providing unit 1204.

The decoding control unit 1202 acquires information related to decoding supplied from the common information acquiring unit 1201, and controls decoding of each layer by controlling the base layer image decoding unit 1203, the intra prediction mode providing unit 1204, and the enhancement layer image decoding unit 1205 based on the acquired information.

The base layer image decoding unit 1203 acquires the encoded base layer data obtained by encoding the base layer image information through the image decoding unit corresponding to the base layer image encoding unit 1103, for example, the base layer image encoding unit 1103. The base layer image decoding unit 1203 decodes the encoded base layer data without using information of another layer, and reconstructs and outputs the base layer image information. For decoding of the base layer, the base layer image decoding unit 1203 performs intra prediction on a block on which intra prediction is performed at the time of encoding in an intra prediction mode (that is, the same mode as at the time of encoding) designated by the intra prediction mode information transmitted from the encoding side, generates a prediction image, and generates a decoded image using the prediction image. Further, the base layer image decoding unit 1203 supplies the intra prediction mode of the intra prediction of the base layer to the intra prediction mode providing unit 1204. For example, the base layer image decoding unit 1203 may supply the intra prediction mode information transmitted from the encoding side to the intra prediction mode providing unit 1204.

The intra prediction mode providing unit 1204 performs a process of providing the intra prediction mode supplied from the base layer image decoding unit 1203 to the intra prediction in the enhancement layer image decoding unit 1205. At this time, the intra prediction mode providing unit 1204 thins out the intra prediction mode of the base layer acquired from the base layer image decoding unit 1203 at a certain thinning rate, and stores the resultant mode. Then, when encoding of the enhancement layer is performed, the intra prediction mode providing unit 1204 supplies the stored intra prediction mode of the base layer to the enhancement layer image decoding unit 1205. In other words, the intra prediction mode selected by the intra prediction mode providing unit 1204 is supplied to the enhancement layer image decoding unit 1205.

The enhancement layer image decoding unit 1205 acquires the encoded enhancement layer data obtained by encoding the enhancement layer image information through the image decoding unit corresponding to the enhancement layer image encoding unit 1105, for example, the enhancement layer image encoding unit 1105. The enhancement layer image decoding unit 1205 performs intra prediction using the intra prediction mode of the base layer acquired from the intra prediction mode providing unit 1204, generates a prediction image, reconstructs enhancement layer image information using the prediction image, and outputs the enhancement layer image information.

<Base Layer Image Decoding Unit>

Figure 90:
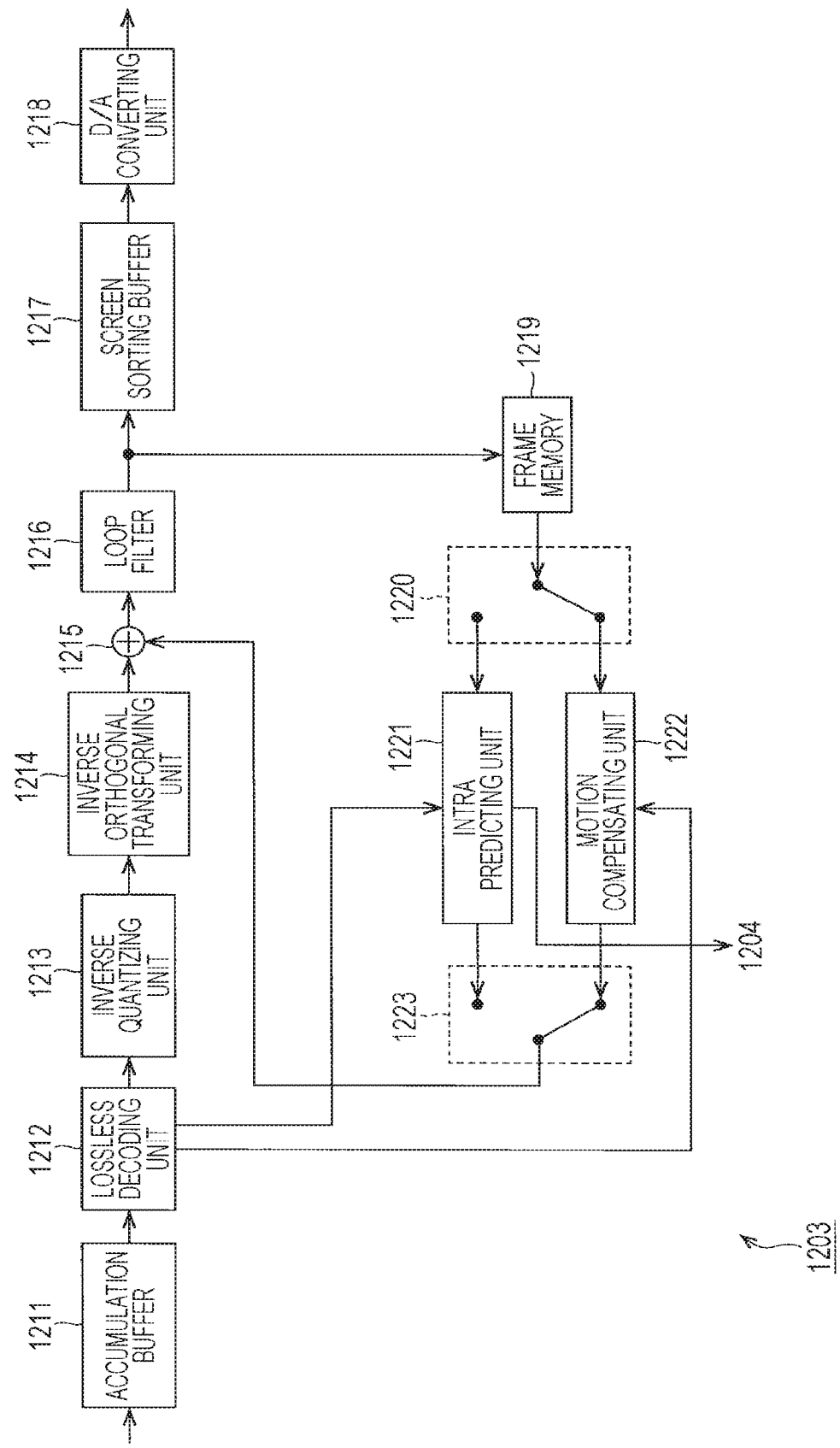
FIG. 90 is a block diagram illustrating an exemplary main configuration of a base layer image decoding unit.

FIG. 90 is a block diagram illustrating an exemplary main configuration of the base layer image decoding unit 1203 of FIG. 89. The base layer image decoding unit 1203 includes an accumulation buffer 1211, a lossless decoding unit 1212, an inverse quantizing unit 1213, an inverse orthogonal transforming unit 1214, an operation unit 1215, a loop filter 1216, a screen sorting buffer 1217, and a D/A converting unit 1218 as illustrated in FIG. 90. The base layer image decoding unit 1203 further includes a frame memory 1219, a selecting unit 1220, an intra predicting unit 1221, a motion compensating unit 1222, and a selecting unit 1223.

The accumulation buffer 1211 also functions as a receiving unit that receives transmitted encoded base layer data. The accumulation buffer 1211 receives and accumulates the transmitted encoded base layer data, and supplies the encoded data to the lossless decoding unit 1212 at a certain timing. Information necessary for decoding of prediction mode information and the like is added to the encoded base layer data.

The lossless decoding unit 1212 decodes the information encoded by the lossless encoding unit 1116 which is supplied from the accumulation buffer 1211 according to a scheme corresponding to the coding scheme of the lossless encoding unit 1116. The lossless decoding unit 1212 supplies quantized coefficient data of a differential image obtained by the decoding to the inverse quantizing unit 1213.

Further, the lossless decoding unit 1212 appropriately extracts and acquires the NAL unit including the video parameter set (VPS), the sequence parameter set (SPS), the picture parameter set (PPS), and the like which is included in the encoded base layer data. The lossless decoding unit 1212 extracts information related to an optimal prediction mode from the information, determines which of the intra prediction mode and the inter prediction mode is selected as the optimal prediction mode based on the information, and supplies the information related to the optimal prediction mode to a mode determined to be selected, that is, the intra predicting unit 1221 or the motion compensating unit 1222. In other words, for example, when the intra prediction mode is selected as the optimal prediction mode in the base layer image encoding unit 1103, the information related to the optimal prediction mode is supplied to the intra predicting unit 1221. Further, for example, when the inter prediction mode is selected as the optimal prediction mode in the base layer image encoding unit 1103, the information related to the optimal prediction mode is supplied to the motion compensating unit 1222.

Further, for example, the lossless decoding unit 1212 extracts information necessary for inverse quantization such as a quantization matrix and a quantization parameter from the NAL unit, and supplies the extracted information to the inverse quantizing unit 1213.

The inverse quantizing unit 1213 inversely quantizes the quantized coefficient data obtained by decoding performed by the lossless decoding unit 1212 according to a scheme corresponding to the quantization scheme of the quantizing unit 1115. The inverse quantizing unit 1213 is a processing unit similar to the inverse quantizing unit 1118. In other words, the description of the inverse quantizing unit 1213 can also apply to the inverse quantizing unit 1118. Here, it is necessary to change and read, for example, input and output destinations of data according to a device. The inverse quantizing unit 1213 supplies the obtained coefficient data to the inverse orthogonal transforming unit 1214.

The inverse orthogonal transforming unit 1214 performs inverse orthogonal transform on the coefficient data supplied from the inverse quantizing unit 1213 according to a scheme corresponding to the orthogonal transform scheme of the orthogonal transforming unit 1114. The inverse orthogonal transforming unit 1214 is a processing unit similar to the inverse orthogonal transforming unit 1119. In other words, the description of the inverse orthogonal transforming unit 1214 can also apply to the inverse orthogonal transforming unit 1119. Here, it is necessary to change and read, for example, input and output destinations of data according to a device.

The inverse orthogonal transforming unit 1214 obtains decoding residual data corresponding to residual data that is not subjected to orthogonal transform in the orthogonal transforming unit 1114 through the inverse orthogonal transform process. The obtained decoding residual data that has been subjected to the inverse orthogonal transform is supplied to the operation unit 1215. Further, the prediction image is supplied to the operation unit 1215 from the intra predicting unit 1221 or the motion compensating unit 1222 via the selecting unit 1223.

The operation unit 1215 adds the decoding residual data to the prediction image, and obtains decoded image data corresponding to image data from which the prediction image is not subtracted by the operation unit 1113. The operation unit 1215 supplies the decoded image data to the loop filter 1216.

The loop filter 1216 appropriately performs the filter process such as the deblock filter or the adaptive loop filter on the supplied decoded image, and supplies the resultant decoded image to the screen sorting buffer 1217 and the frame memory 1219. For example, the loop filter 1216 performs the deblock filter process on the decoded image to remove the block distortion of the decoded image. Further, for example, the loop filter 1216 improves the image quality by performing the loop filter process on the deblock filter process result (the decoded image from which the block distortion has been removed) using the Wiener Filter. The loop filter 1216 is a processing unit similar to the loop filter 1121.

The decoded image output from the operation unit 1215 may be supplied to the screen sorting buffer 1217 and the frame memory 1219 without intervention of the loop filter 1216. In other words, a part or all of the filter process performed by the loop filter 1216 may be omitted.

The screen sorting buffer 1217 performs sorting on the decoded image. In other words, frames sorted in the encoding order by the screen sorting buffer 1112 are sorted in the original display order. The D/A converting unit 1218 performs D/A conversion on the image supplied from the screen sorting buffer 1217, and outputs the resultant image to be displayed on a display (not illustrated).

The frame memory 1219 stores the supplied decoded image, and supplies the stored decoded image to the selecting unit 1220 as a reference image at a certain timing or based on a request given from the outside such as the intra predicting unit 1221 or the motion compensating unit 1222.

The selecting unit 1220 selects a supply destination of the reference image supplied from the frame memory 1219. When an image that has been subjected to the intra coding is decoded, the selecting unit 1220 supplies the reference image supplied from the frame memory 1219 to the intra predicting unit 1221. Further, when an image that has been subjected to the inter coding is decoded, the selecting unit 1220 supplies the reference image supplied from the frame memory 1219 to the motion compensating unit 1222.

For example, information indicating an intra prediction mode obtained by decoding the header information is appropriately supplied from the lossless decoding unit 1212 to the intra predicting unit 1221. The intra predicting unit 1221 performs intra prediction using the reference image acquired from the frame memory 1219 in the intra prediction mode used in the intra predicting unit 1124, and generates a prediction image. The intra predicting unit 1221 supplies the generated prediction image to the selecting unit 1223.

The motion compensating unit 1222 acquires information (the optimal prediction mode information, the reference image information, and the like) obtained by decoding the header information from the lossless decoding unit 1212.

The motion compensating unit 1222 performs motion compensation using the reference image acquired from the frame memory 1219 in the inter prediction mode indicated by the optimal prediction mode information acquired from the lossless decoding unit 1212, and generates a prediction image. The motion compensating unit 1222 supplies the generated prediction image to the selecting unit 1223.

The selecting unit 1223 supplies the prediction image supplied from the intra predicting unit 1221 or the prediction image supplied from the motion compensating unit 1222 to the operation unit 1215. Then, the operation unit 1215 adds the prediction image generated using the motion vector to the decoding residual data (the differential image information) supplied from the inverse orthogonal transforming unit 1214 to decode an original image.

Further, the intra predicting unit 1221 supplies the employed intra prediction mode (that is, the intra prediction mode designated by the encoding side) to the intra prediction mode providing unit 1204 as the intra prediction mode of the base layer.

<Enhancement Layer Image Encoding Unit>

Figure 91:
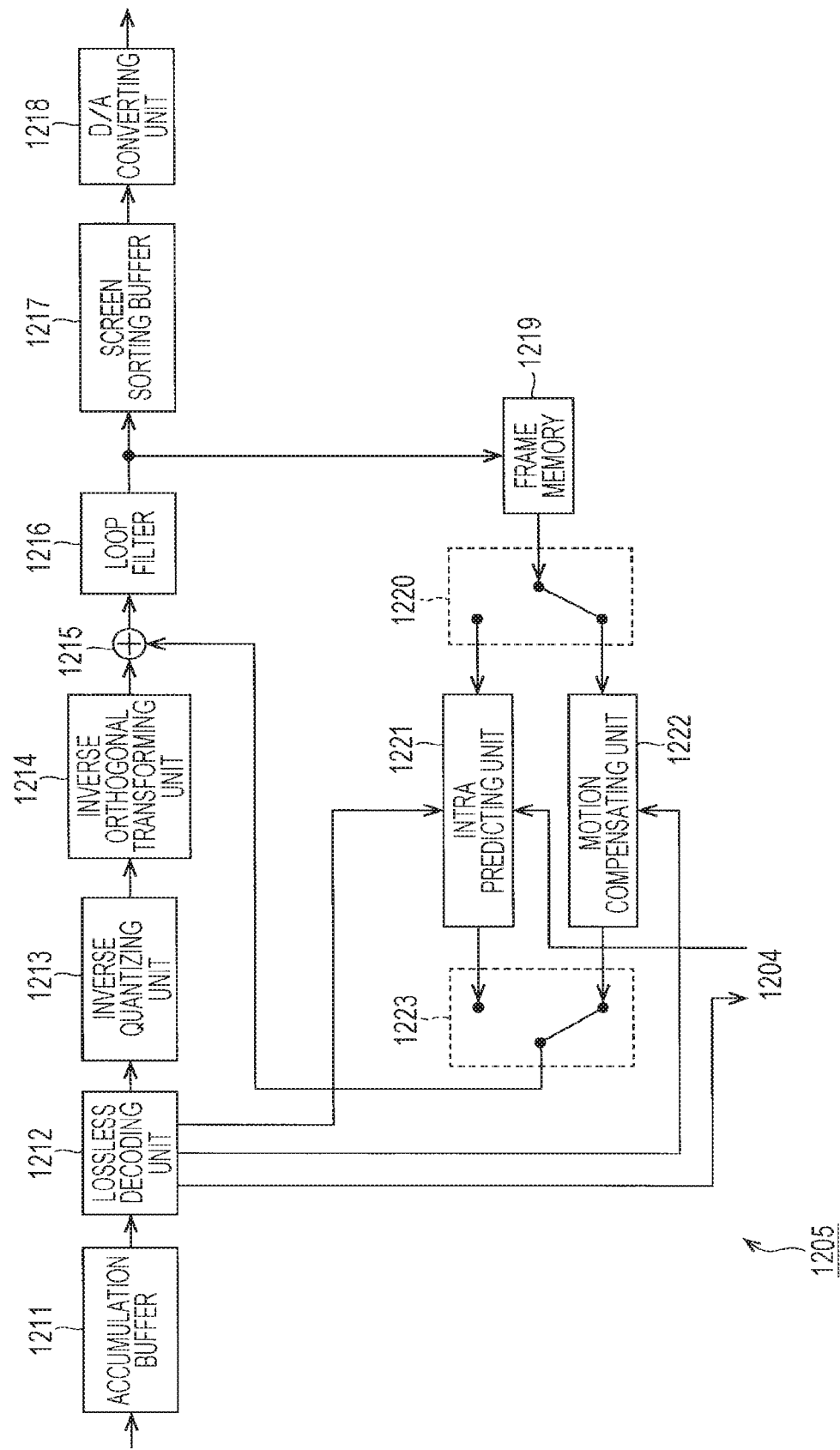
FIG. 91 is a block diagram illustrating an exemplary main configuration of an enhancement layer image decoding unit.

FIG. 91 is a block diagram illustrating an exemplary main configuration of the enhancement layer image decoding unit 1205 of FIG. 89. The enhancement layer image decoding unit 1205 has basically the same configuration as the base layer image decoding unit 1203 of FIG. 90 as illustrated in FIG. 91.

Here, the respective components of the enhancement layer image decoding unit 1205 perform a process of decoding the encoded enhancement layer data other than the base layer. In other words, the accumulation buffer 1211 of the enhancement layer image decoding unit 1205 stores the encoded enhancement layer data, and the D/A converting unit 1218 of the enhancement layer image decoding unit 1205 outputs the enhancement layer image information, for example, to a recording device (not illustrated) (a recording medium) at a subsequent stage or a transmission path.

Further, the enhancement layer image decoding unit 1205 includes an intra predicting unit 1231 instead of the intra predicting unit 1221.

The intra predicting unit 1231 acquires (reads) an intra prediction mode corresponding to a current block among (the representative values of) the intra prediction modes of the base layer stored in the intra prediction mode providing unit 1204, performs the intra prediction of the enhancement layer using the intra prediction mode, and generates a prediction image. The intra prediction is performed in the same manner as in the intra predicting unit 1221.

Further, for example, when information indicating a thinning rate in a sequence parameter set (SPS), a picture parameter set (PPS), or a slice header of the enhancement layer is transmitted from the encoding side, the lossless decoding unit 1212 of the enhancement layer image decoding unit 1205 supplies the information indicating the thinning rate transmitted from the encoding side to the intra prediction mode providing unit 1204.

For example, the information indicating the thinning rate may be transmitted through a video parameter set (VPS). In this case, the information indicating the thinning rate is supplied from the common information acquiring unit 1201 to the intra prediction mode providing unit 1204.

<Intra Prediction Mode Providing Unit>

Figure 92:
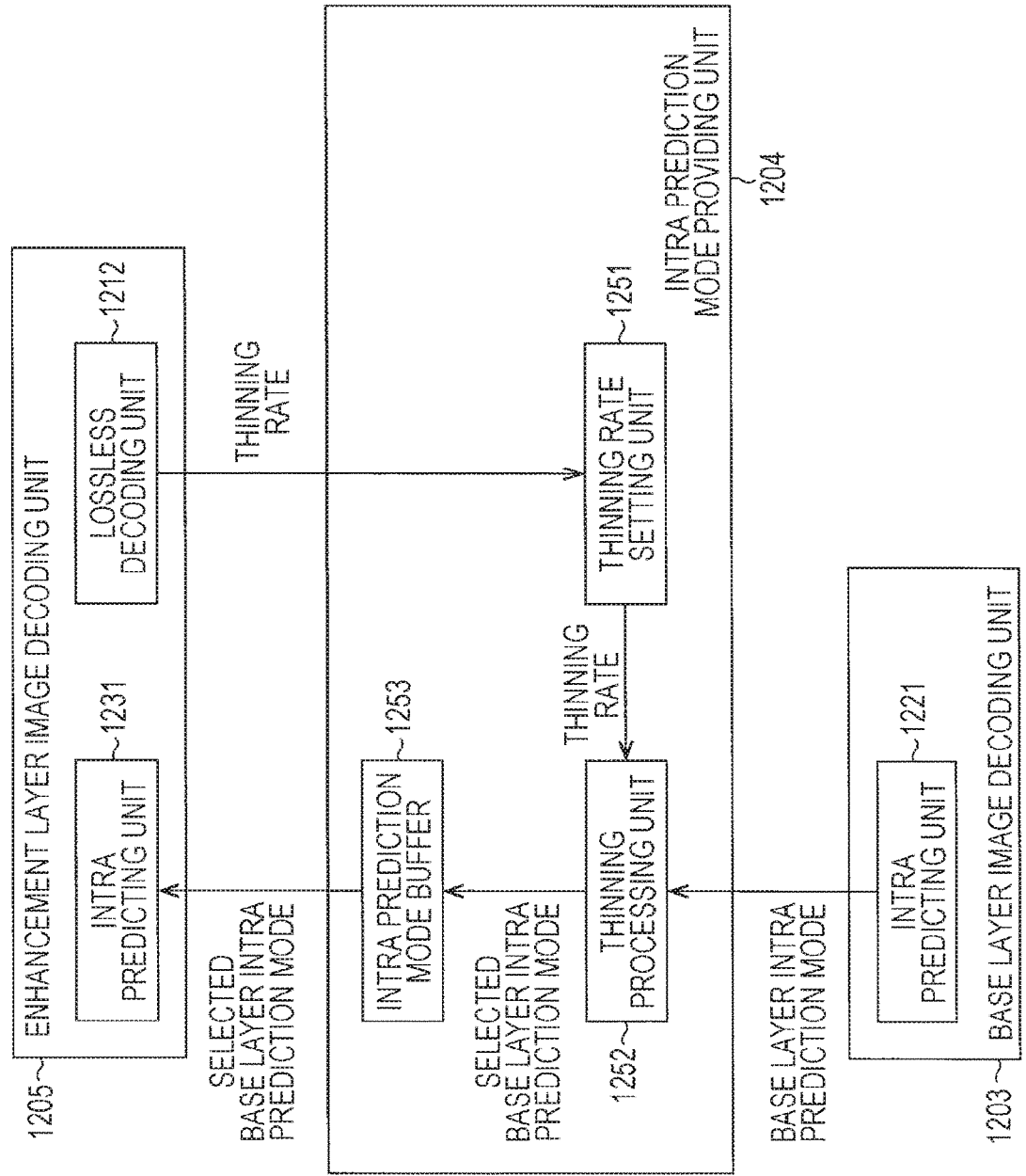
FIG. 92 is a block diagram illustrating an exemplary main configuration of an intra prediction mode providing unit.

FIG. 92 is a block diagram illustrating an exemplary main configuration of the intra prediction mode providing unit 1204 of FIG. 89.

The intra prediction mode providing unit 1204 includes a thinning rate acquiring unit 1251, a thinning processing unit 1252, and an intra prediction mode buffer 1253 as illustrated in FIG. 92.

The thinning rate acquiring unit 1251 acquires the thinning rate of the intra prediction mode of the base layer transmitted from the encoding side from the lossless decoding unit 1212 of the enhancement layer image decoding unit 1205 (or the common information acquiring unit 1201). The thinning rate setting unit 1251 supplies the acquired information indicating the thinning rate to the thinning processing unit 1252.

The thinning processing unit 1252 acquires the intra prediction mode of each block of the base layer supplied from the intra predicting unit 1221 of the base layer image decoding unit 1203, and thins out the intra prediction mode at the thinning rate supplied from the thinning rate acquiring unit 1251. For example, as described above, the thinning process of the intra prediction mode is performed for each certain area, and a representative (intra prediction mode) of each area is selected. The intra prediction mode of the base layer selected by the thinning is supplied to the intra prediction mode buffer 1253.

The intra prediction mode buffer 1253 stores the selected base layer intra prediction mode supplied from the thinning processing unit 1252. The intra prediction mode buffer 1253 supplies an intra prediction mode of a block corresponding to a current block of intra prediction performed in the intra predicting unit 1231 of the enhancement layer image decoding unit 1205 among the selected base layer intra prediction mode being stored to the intra predicting unit 1231.

As described above, the intra predicting unit 1231 performs intra prediction of a current block of the enhancement layer using the intra prediction mode of the base layer (the selected base layer intra prediction mode) read from the intra prediction mode buffer 1253, and generates a prediction image.

As described above, the scalable decoding device 1200 can use the intra prediction mode of the base layer for the intra prediction of encoding the enhancement layer, and thus it is possible to suppress a reduction in the coding efficiency. As a result, the scalable decoding device 1200 can suppress a reduction in the image quality caused by encoding and decoding. Further, when the intra prediction mode of the base layer is provided to the enhancement layer, the intra prediction mode is thinned out at a certain thinning rate, and thus the scalable decoding device 1200 can suppress an increase in a storage capacity necessary for encoding and decoding.

<Common Information Acquisition Process Flow>

Next, the flows of the processes performed by the scalable decoding device 1200 will be described. First, an exemplary flow of the common information acquisition process will be described with reference to a flowchart of FIG. 93.

When the common information acquisition process starts, in step S4201, the common information acquiring unit 1201 acquires the video parameter set transmitted from the encoding side.

In step S4202, the thinning rate acquiring unit 1251 of the intra prediction mode providing unit 1204 acquires the thinning rate of the base layer intra prediction mode from the video parameter set acquired in step S4201.

When the process of step S4202 ends, the common information acquisition process ends.

<Decoding Process Flow>

Next, an exemplary flow of the decoding process will be described with reference to a flowchart of FIG. 94. The scalable decoding device 1200 performs the decoding process in units of pictures.

When the decoding process starts, in step S4221, the decoding control unit 1202 of the scalable decoding device 1200 sets a first layer as a processing target.

In step S4222, the decoding control unit 1202 determines whether or not a current layer serving as a processing target is a base layer. When the current layer is determined to be the base layer, the process proceeds to step S4223.

In step S4223, the base layer image decoding unit 1203 and the intra prediction mode providing unit 1204 perform the base layer decoding process. When the process of step S4223 ends, the process proceeds to step S4226.

Further, when the current layer is determined to be an enhancement layer in step S4222, the process proceeds to step S4224. In step S4224, the decoding control unit 1202 decides a base layer (that is, serving as a reference destination) corresponding to the current layer.

In step S4225, the enhancement layer image decoding unit 1205 performs the enhancement layer decoding process. When the process of step S4225 ends, the process proceeds to step S4226.

In step S4226, the decoding control unit 1202 determines whether or not all layers have been processed. When it is determined that there is a non-processed layer, the process proceeds to step S4227.

In step S4227, the decoding control unit 1202 sets a next non-processed layer as a processing target (current layer). When the process of step S4227 ends, the process returns to step S4222. The process of step S4222 to step S4227 is repeatedly performed, and thus each layer is decoded.

Then, when all layers are determined to have been processed in step S4226, the decoding process ends.

<Base Layer Decoding Process Flow>

Next, an exemplary flow of the base layer decoding process performed in step S4223 of FIG. 94 will be described with reference to a flowchart of FIG. 95.

When the base layer decoding process starts, in step S4241, the accumulation buffer 1211 of the base layer image decoding unit 1203 accumulates bit streams of the base layer transmitted from the encoding side. In step S4242, the lossless decoding unit 1212 decodes the bit streams (the encoded differential image information) of the base layer supplied from the accumulation buffer 1211. In other words, an I picture, a P picture, and a B picture encoded by the lossless encoding unit 1116 are decoded. At this time, various kinds of information such as the header information as well as the differential image included in the bit stream is also decoded.

In step S4243, the inverse quantizing unit 1213 inversely quantizes quantized coefficients obtained by the process of step S4242.

In step S4244, the inverse orthogonal transforming unit 1214 performs inverse orthogonal transform on a current block (a current TU).

In step S4245, the intra predicting unit 1221 or the motion compensating unit 1222 performs the prediction process, and generates a prediction image. In other words, the prediction process is performed in the prediction mode that is applied at the time of encoding and determined in the lossless decoding unit 1212. More specifically, for example, when intra prediction is applied at the time of encoding, the intra predicting unit 1221 generates a prediction image in an intra prediction mode determined to be optimal at the time of encoding. Further, for example, when inter prediction is applied at the time of encoding, the motion compensating unit 1222 generates a prediction image in an inter prediction mode determined to be optimal at the time of encoding.

In step S4246, the operation unit 1215 adds the prediction image generated in step S4245 to the differential image information generated by the inverse orthogonal transform process of step S4244. As a result, an original image is decoded.

In step S4247, the loop filter 1216 appropriately performs the loop filter process on the decoded image obtained in step S4246.

In step S4248, the screen sorting buffer 1217 performs the image that has been subjected to the filter process in step S4247. In other words, frames sorted for encoding by the screen sorting buffer 1112 are sorted in an original display order.

In step S4249, the D/A converting unit 1218 performs D/A conversion on the image in which an order of the frames is sorted in step S4248. The image is output to and displayed on a display (not illustrated).

In step S4250, the frame memory 1219 stores the decoded image that has been subjected to the loop filter process in step S4247.

Figure 93:
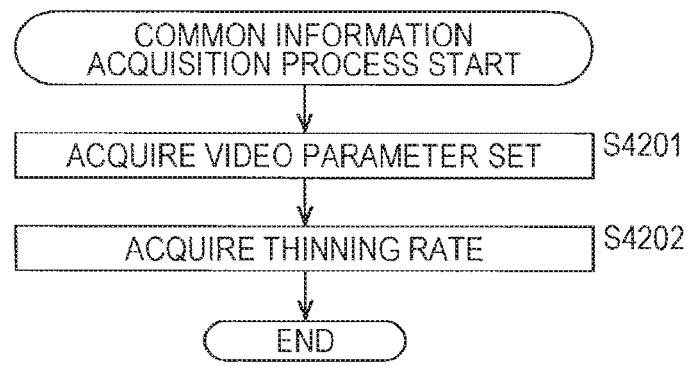
FIG. 93 is a flowchart for describing an exemplary flow of a common information acquisition process.

In step S4251, the thinning processing unit 1252 of the intra prediction mode providing unit 1204 thins out the intra prediction mode of the base layer obtained by the intra prediction process of the intra predicting unit 1221 in step S4245 at the thinning rate acquired in step S4202 of FIG. 93.

In step S4252, the intra prediction mode buffer 1253 of the intra prediction mode providing unit 1204 stores the intra prediction mode of the base layer selected by the thinning in step S4251.

Figure 94:
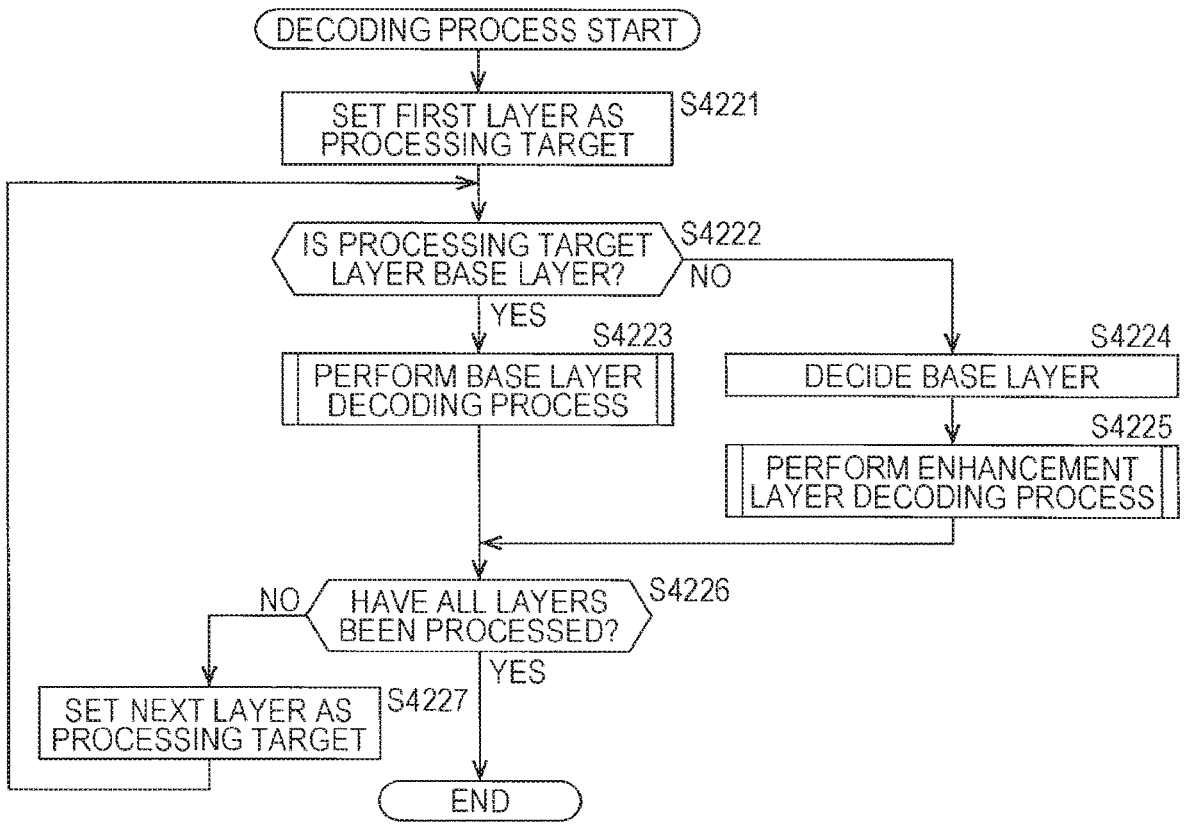
FIG. 94 is a flowchart for describing an exemplary flow of a decoding process.
Figure 95:
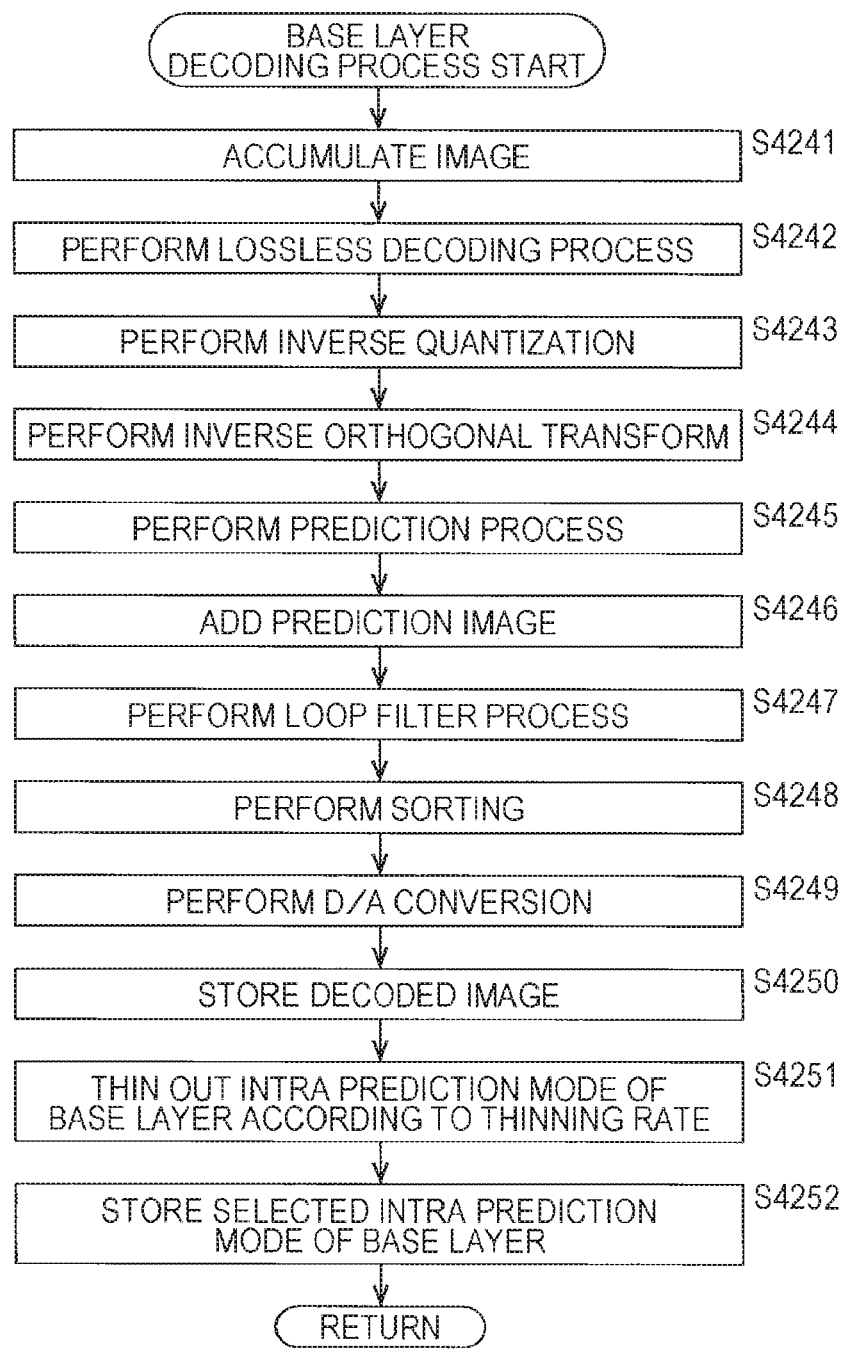
FIG. 95 is a flowchart for describing an exemplary flow of a base layer decoding process.

When the process of step S4252 ends, the base layer decoding process ends, and the process returns to FIG. 94. For example, the base layer decoding process is performed in units of pictures. In other words, the base layer decoding process is performed on each picture of the current layer. Here, each process of the base layer decoding process is performed for each processing unit.

<Enhancement Layer Decoding Process Flow>

Figure 96:
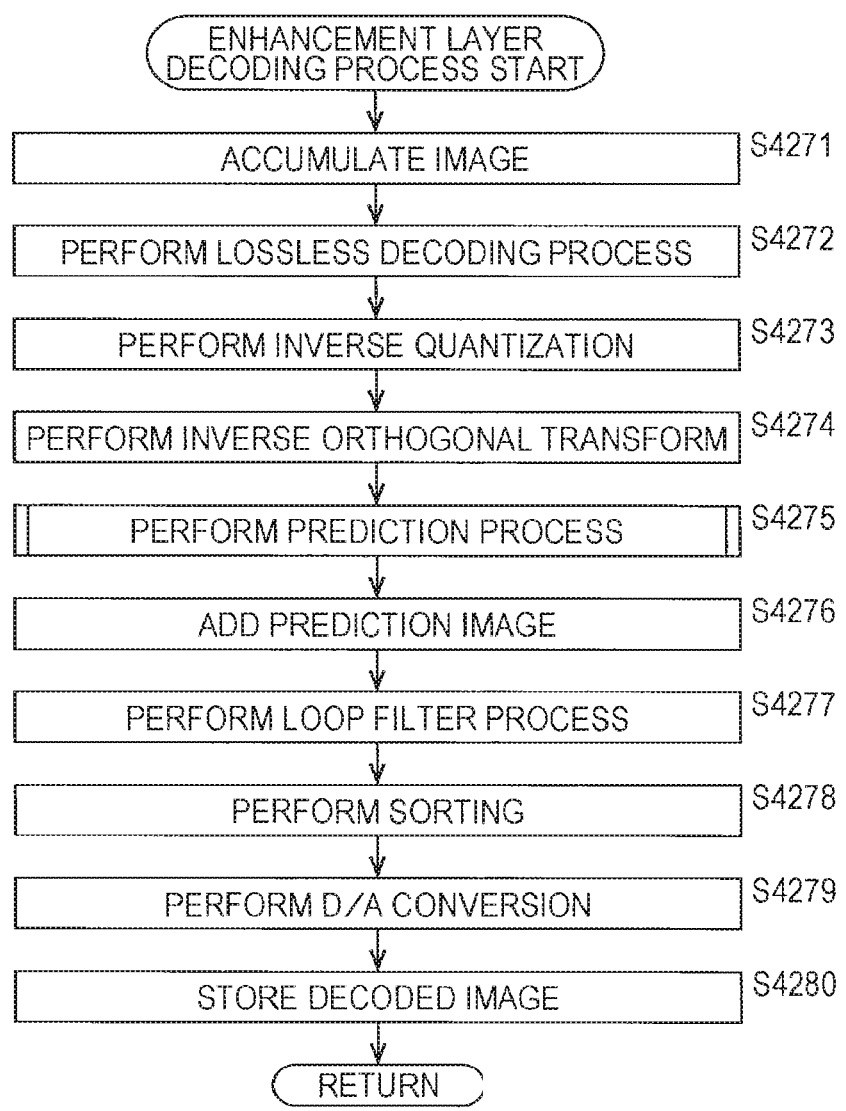
FIG. 96 is a flowchart for describing an exemplary flow of an enhancement layer decoding process.

Next, an exemplary flow of the enhancement layer decoding process performed in step S4225 of FIG. 94 will be described with reference to a flowchart of FIG. 96.

The process of step S4271 to step S4274 and the process of step S4276 to step S4280 in the enhancement layer decoding process are performed in the same manner as the process of step S4241 to step S4244 and the process of step S4246 to step S4250 in the base layer decoding process. Here, the respective processes of the enhancement layer decoding process are performed on the encoded enhancement layer data through the respective processing units of the enhancement layer image decoding unit 1205.

In step S4275, the intra predicting unit 1231 of the enhancement layer image decoding unit 1205 and the motion compensating unit 1222 perform the prediction process on the encoded enhancement layer data.

When the step S4280 ends, the enhancement layer decoding process ends, and the process returns to FIG. 94. For example, the enhancement layer decoding process is performed in units of pictures. In other words, the enhancement layer decoding process is performed on each picture of the current layer. Here, each process of the enhancement layer decoding process is performed for each processing unit.

<Prediction Process Flow>

Figure 97:
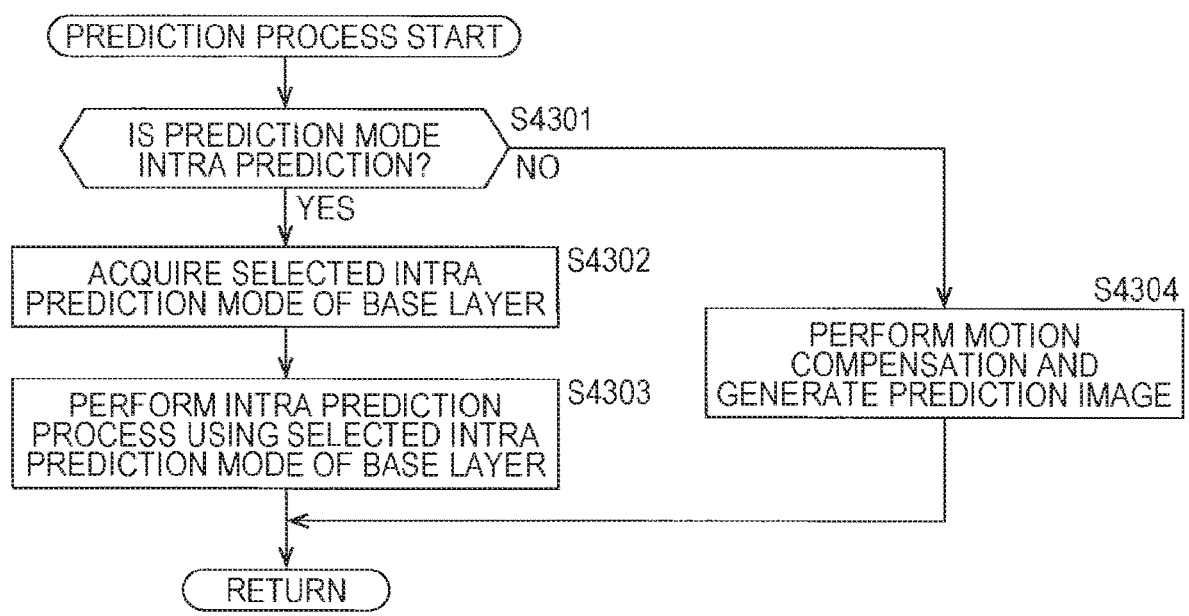
FIG. 97 is a flowchart for describing an exemplary flow of a prediction process.

Next, an exemplary flow of the prediction process performed in step S4275 of FIG. 96 will be described with reference to a flowchart of FIG. 97.

When the prediction process starts, in step S4301, the intra predicting unit 1231 of the enhancement layer image decoding unit 1205 determines whether or not a prediction mode is intra prediction. When the prediction mode is determined to be intra prediction, the process proceeds to step S4302.

In step S4302, the intra predicting unit 1231 acquires an intra prediction mode of a block corresponding to a current block among the selected intra prediction modes of the base layer stored in the intra prediction mode buffer 1253 of the intra prediction mode providing unit 1204.

In step S4303, the intra predicting unit 1231 performs the intra prediction process using the intra prediction mode (the selected intra prediction mode of the base layer) acquired in step S4302, and generates a prediction image. When the process of step S4303 ends, the prediction process ends, and the process returns to FIG. 96.

Further, when the prediction mode is determined to be inter prediction in step S4301, the process proceeds to step S4304. In step S4304, the motion compensating unit 1222 performs motion compensation in an optimal inter prediction mode serving as the inter prediction mode employed at the time of encoding, and generates a prediction image. When the process of step S4304 ends, the prediction process ends, and the process returns to FIG. 96.

As the process is performed as described above, the scalable decoding device 1200 can use the intra prediction mode of the base layer for the intra prediction of decoding the enhancement layer, and thus it is possible to suppress a reduction in the coding efficiency. As a result, the scalable decoding device 1200 can suppress a reduction in the image quality caused by encoding and decoding. Further, when the intra prediction mode of the base layer is supplied to the enhancement layer, the intra prediction mode is thinned out at a certain thinning rate supplied from the encoding side, and thus the scalable decoding device 1200 can suppress an increase in a storage capacity necessary for encoding and decoding, similarly to the scalable coding device 1100.

The present technology related to scalable coding and decoding described above in the fifth and sixth embodiments can be similarly applied to the multi-view image coding and decoding described above in the first to third embodiments.

In other words, even when the present technology is applied to the multi-view image coding, preferably, the image coding device has the configuration of FIGS. 81 to 84, and performs the respective processes described above with reference to the flowcharts of FIGS. 85 to 88.

Further, even when the present technology is applied to the multi-view image decoding, preferably, the image coding device has the configuration of FIGS. 89 to 92, and performs the respective processes described above with reference to the flowcharts of FIGS. 93 to 97.

<8. Overview 3>

<Prediction Direction Control>

Meanwhile, in the HEVC of the related art, a temporal motion vector (temporal_motion_vector) can be used for motion vector encoding (mv_coding), and any one of an L0 direction and an L1 direction can be used. In other words, for the temporal motion vector (temporal_motion_vector), it is desirable to store information in anyone of the L0 direction and the L1 direction.

FIGS. 98 to 100 are diagrams illustrating an exemplary syntax of a slice segment header according to a related art. Flag information (collocated_from_10_flag) illustrated in FIG. 99 is flag information indicating whether or not the temporal motion vector (temporal_motion_vector) in the L0 direction is stored. When the value of the flag information is "1 (true)," the temporal motion vector (temporal_motion_vector) in the L0 direction is stored, and when the value of the flag information is "0 (false)," the temporal motion vector (temporal_motion_vector) in the L1 direction is stored.

Meanwhile, Vadim Seregin, Patrice Onno, Shan Liu, Elena Alshina, Chulkeun Kim, Haitao Yang, "Description of Core Experiment SCE5: Inter-layer syntax prediction using the HEVC base layer," JCTVC-L1105, Joint Collaborative Team on Video Coding (JCT-VC) of ITU-T SG 16 WP 3 and ISO/IEC JTC 1/SC 29/WG 1112th Meeting: Geneva, CH, 14-23 Jan. 2013 proposes inter-layer syntax prediction using motion information in a base layer as a motion vector coding scheme for scalable coding.

In the inter-layer syntax prediction, L0 motion information of a base layer is used for an L0 motion vector coding process of an enhancement layer, and L1 motion information of a base layer is used for L1 motion vector encoding of an enhancement layer. Thus, it is necessary to store motion information in both the L0 direction and the L1 direction in a buffer, and the storage capacity necessary for encoding and decoding is likely to be increased.

In this regard, a prediction direction of motion information of another layer used for encoding of a current layer serving as processing target in image data including a plurality of layers is set, and only motion information in the set prediction direction is acquired from another layer. For example, when scalable coding is performed on image data, in the inter-layer syntax prediction using motion information of the base layer for encoding of the enhancement layer, a prediction direction of the motion information of the base layer used in the inter-layer syntax prediction is set, and only motion information in the prediction direction is acquired and stored in a buffer. For example, only motion information of the base layer in either the L0 direction or the L1 direction is acquired and stored in a buffer. Then, in the inter-layer syntax prediction for encoding of the enhancement layer, the motion information of the base layer stored in the buffer is read and used.

Thus, it is possible to reduce the capacity of the buffer necessary for holding the motion information of the base layer compared to when the motion information of the base layer in all prediction directions (for example, the L0 direction and the L1 direction) is acquired. In other words, it is possible to suppress an increase in the storage capacity necessary for encoding.

Further, control information indicating a setting of the prediction direction of the motion information of the base layer is transmitted to the decoding side. Then, the decoding side acquires only the motion information of the base layer in the prediction direction (for example, the L0 direction or the L1 direction) designated by the control information according to the setting of the control information transmitted from the encoding side and stores the acquired motion information in a buffer. Then, in the inter-layer syntax prediction for decoding of the enhancement layer, the motion information of the base layer stored in the buffer is read and used.

Thus, it is possible to reduce the capacity of the buffer necessary for holding the motion information of the base layer compared to when motion information of the base layer in all prediction directions (for example, the L0 direction and the L1 direction) is acquired. In other words, it is possible to suppress an increase in the storage capacity necessary for decoding.

<Exemplary Syntax>

FIGS. 101 to 103 are diagrams illustrating an exemplary syntax of a slice segment header in this case. As the control information, flag information (colbasemv_from_l0_flag) is transmitted as illustrated in FIG. 102. The flag information is flag information indicating whether or not the motion information of the base layer in the L0 direction is stored. When the value of the flag information is "1 (true)," the motion information in the L0 direction is acquired from the base layer and stored in a buffer. Further, when the value of the flag information is "0 (false)," motion information in the L1 direction is acquired from the base layer and stored in a buffer. The motion information of the base layer stored in the buffer as described above is used for the inter-layer prediction of the enhancement layer.

As the control information is transmitted, in the decoding side, the same inter-layer syntax prediction as the encoding side can be performed. Thus, it is possible to suppress an increase in the storage capacity necessary for decoding.

As described above, information indicating whether or not the prediction direction is a certain direction (for example, the L0 direction) may be used as the control information indicating the prediction direction of the motion information of the base layer used for the inter-layer prediction. As the flag information is used as the control information, an information amount of the control information can be reduced (for example, reduced to 1 bit). Thus, it is possible to suppress a reduction in the coding efficiency.

Of course, the direction is not limited to the L0 direction. For example, information indicating whether or not the prediction direction of the motion information of the base layer used for the inter-layer prediction is the L1 direction may be used as the control information. Further, the direction may be selected. For example, the direction may be selected in arbitrary units such as slices, pictures, or sequences.

Further, the control information is not limited to the flag information. For example, information indicating whether the prediction direction of the motion information of the base layer used for the inter-layer prediction is the L0 direction or the L1 direction may be used as the control information.

The example of FIGS. 101 to 103 has been described in connection with the example in which the control information is transmitted through the slice header, but the present technology is not limited to this example. In other words, for example, the control information may be transmitted in arbitrary units such as sequences, pictures, or LCUs. In other words, a control unit of the control information is not limited to a slice. For example, the control information may be controlled in arbitrary units such as sequences, pictures, or LCUs.

Further, in the inter-layer prediction, motion information of a certain area of the base layer corresponding to a current area of a processing target of the enhancement layer is used.

Further, when the prediction direction of the motion information acquired from the base layer is different from a used prediction direction, conversion may be performed. For example, when the motion information of the base layer in the L0 direction stored in the buffer is sued for prediction of the enhancement layer in the L1 direction, the motion information of the base layer is converted into the L1 direction. This conversion may be similarly performed at the encoding side or at the decoding side.

Further, the motion information acquired from the base layer may be converted such that a scalable parameter is used as an enhancement layer reference as necessary. For example, when a resolution is scalable, the scale of the acquired motion information of the base layer may be converted (upsampled) according to the resolution ratio of the base layer and the enhancement layer. Further, this conversion may be performed before the information is stored in the buffer or after the information is read from the buffer. This conversion may be similarly performed at the encoding side or at the decoding side.

Next, examples in which the present technology is applied to a specific device will be described.

<9. Seventh Embodimen>
<Image Coding Device>

Figure 104:
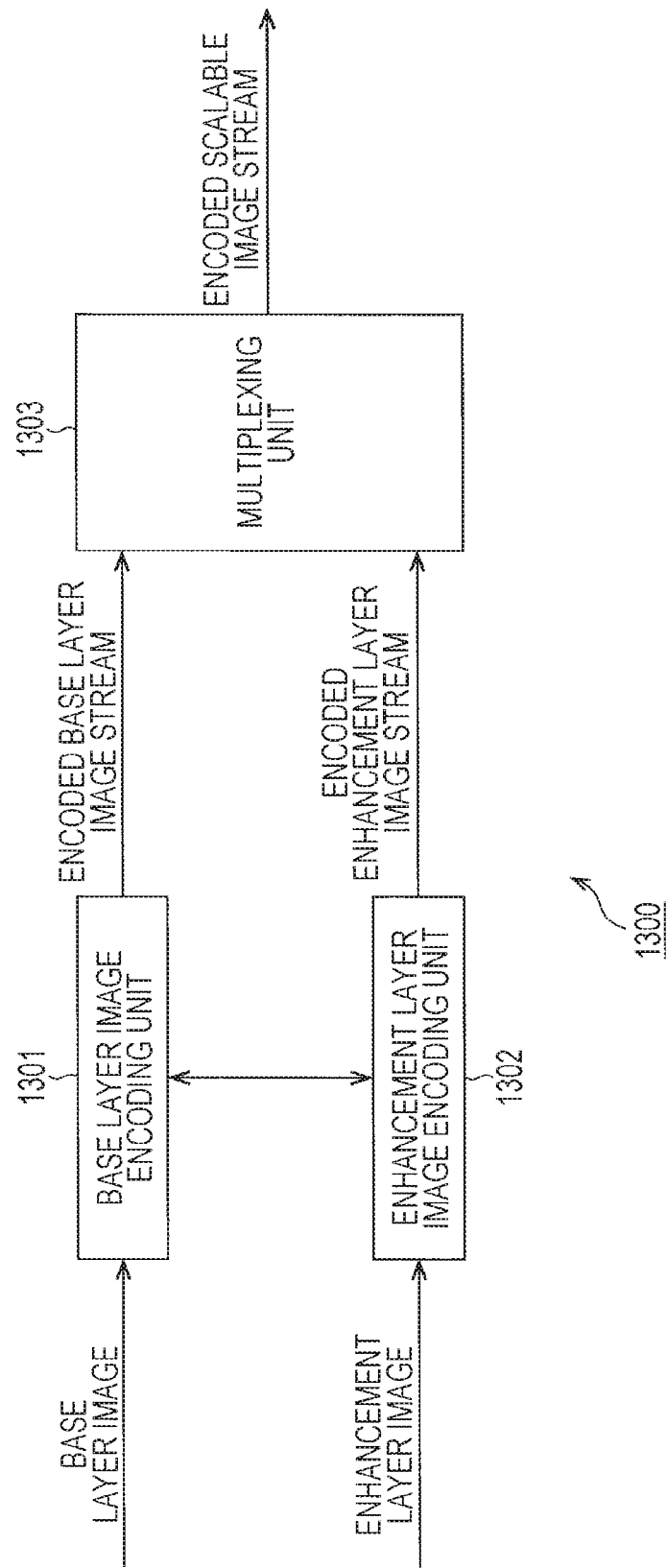
FIG. 104 is a block diagram illustrating an exemplary main configuration of an image coding device.

FIG. 104 is a diagram illustrating an image coding device as an example of an image processing device to which the present technology is applied. An image coding device 1300 illustrated in FIG. 104 is a device that performs scalable image coding. The image coding device 1300 includes a base layer image encoding unit 1301, an enhancement layer image encoding unit 1302, and a multiplexing unit 1303 as illustrated in FIG. 104.

The base layer image encoding unit 1301 encodes a base layer image, and generates an encoded base layer image stream. The enhancement layer image encoding unit 1302 encodes an enhancement layer image, and generates an encoded enhancement layer image stream. The multiplexing unit 1303 performs multiplexing on the encoded base layer image stream generated in the base layer image encoding unit 1301 and the encoded enhancement layer image stream generated in the enhancement layer image encoding unit 1302, and generates an encoded scalable image stream. The multiplexing unit 1303 transmits the generated encoded scalable image stream to the decoding side.

The base layer image encoding unit 1301 encodes a base layer image without referring to another layer. On the other hand, the enhancement layer image encoding unit 1302 performs the inter-layer prediction with reference to the base layer in encoding of the enhancement layer image. For example, the enhancement layer image encoding unit 1302 acquires the motion information of the base layer generated when the base layer image encoding unit 1301 encodes the base layer image, and performs the inter-layer syntax prediction using the motion information of the base layer.

At this time, the enhancement layer image encoding unit 1302 sets a prediction direction of the motion information acquired from the base layer image encoding unit 1301, acquires only motion information in the set prediction direction, and stores the motion information in the buffer. Further, the enhancement layer image encoding unit 1302 performs the inter-layer prediction using the motion information of the base layer (that is, the motion information in the set prediction direction) stored in the buffer.

Further, the enhancement layer image encoding unit 1302 transmits the control information indicating the setting content of the prediction direction to the decoding side via the multiplexing unit 1303 (as the encoded scalable image stream).

<Base Layer Image Encoding Unit>

Figure 105:
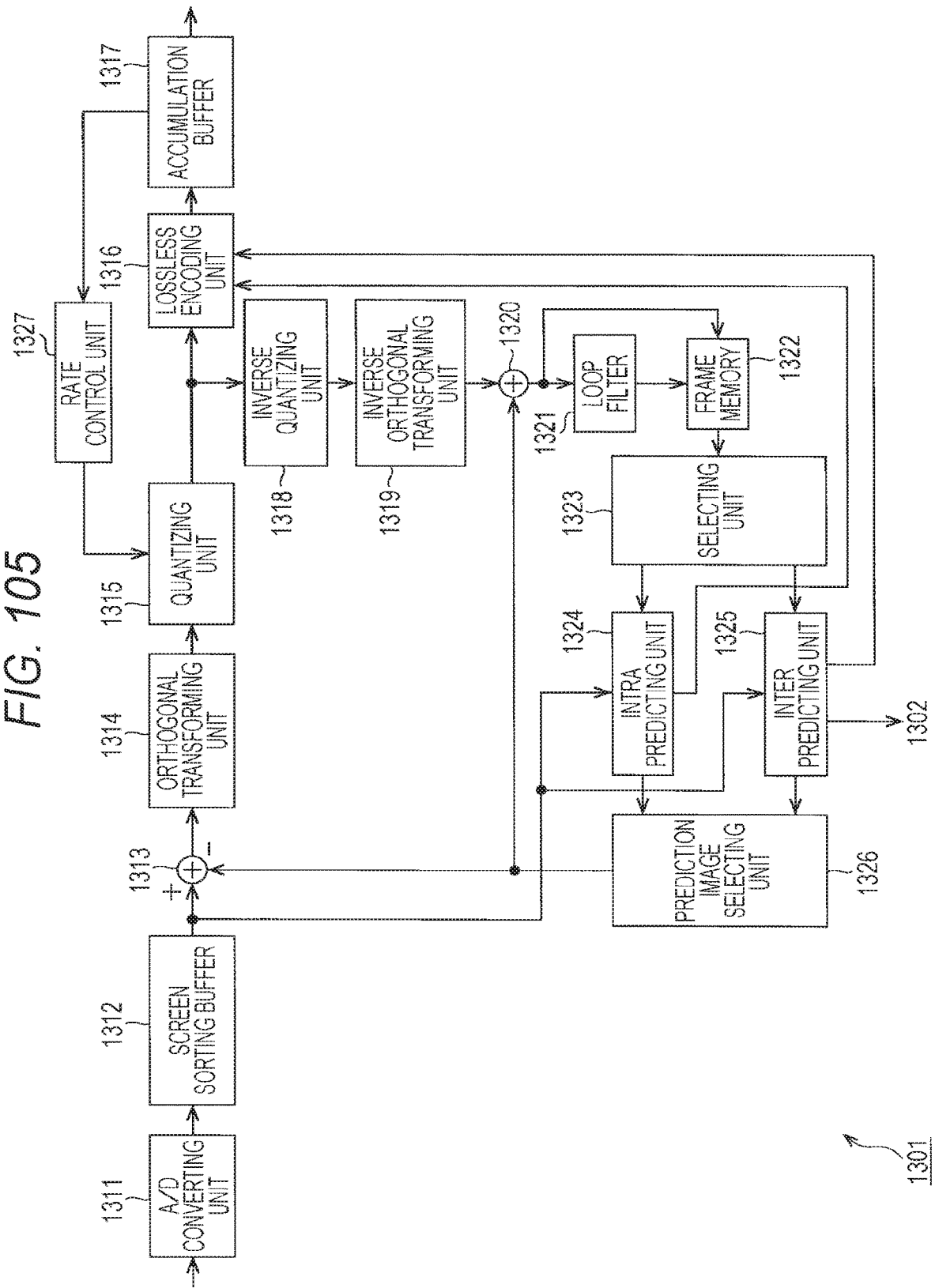
FIG. 105 is a block diagram illustrating an exemplary main configuration of a base layer image encoding unit.

FIG. 105 is a block diagram illustrating an exemplary main configuration of the base layer image encoding unit 1301 of FIG. 104. The base layer image encoding unit 1301 includes an A/D converting unit 1311, a screen sorting buffer 1312, an operation unit 1313, an orthogonal transforming unit 1314, a quantizing unit 1315, a lossless encoding unit 1316, an accumulation buffer 1317, an inverse quantizing unit 1318, and an inverse orthogonal transforming unit 1319 as illustrated in FIG. 105. The base layer image encoding unit 1301 further includes an operation unit 1320, a loop filter 1321, a frame memory 1322, a selecting unit 1323, an intra predicting unit 1324, an inter predicting unit 1325, a prediction image selecting unit 1326, and a rate control unit 1327.

The A/D converting unit 1311 performs A/D conversion on input image data (base layer image information), and supplies the converted image data (digital data) to be stored in the screen sorting buffer 1312. The screen sorting buffer 1312 performs sorting the stored image of frames arranged in the display order in the frame order for encoding according to a Group of Picture (GOP), and supplies the image sorted in the frame order to the operation unit 1313. Further, the screen sorting buffer 1312 also supplies the image sorted in the frame order to the intra predicting unit 1324 and the inter predicting unit 1325.

The operation unit 1313 subtracts a prediction image supplied from the intra predicting unit 1324 or the inter predicting unit 1325 via the prediction image selecting unit 1326 from an image read from the screen sorting buffer 1312, and outputs the differential information to the orthogonal transforming unit 1314. For example, in the case of the image on which intra coding is performed, the operation unit 1313 subtracts the prediction image supplied from the intra predicting unit 1324 from the image read from the screen sorting buffer 1312. Further, for example, in the case of the image on which inter coding is performed, the operation unit 1313 subtracts the prediction image supplied from the inter predicting unit 1325 from the image read from the screen sorting buffer 1312.

The orthogonal transforming unit 1314 performs orthogonal transform such as discrete cosine transform or Karhunen Loéve transform on the differential information supplied from the operation unit 1313. The orthogonal transforming unit 1314 supplies the transform coefficients to the quantizing unit 1315.

The quantizing unit 1315 quantizes the transform coefficients supplied from the orthogonal transforming unit 1314. The quantizing unit 1315 sets a quantization parameter based on information related to a target value of a coding amount supplied from the rate control unit 1327, and performs quantization. The quantizing unit 1315 supplies the quantized transform coefficients to the lossless encoding unit 1316.

The lossless encoding unit 1316 encodes the transform coefficients quantized in the quantizing unit 1315 according to an arbitrary coding scheme. Since coefficient data is quantized under control of the rate control unit 1327, the coding amount becomes the target value (or approximates the target value) set by the rate control unit 1327.

The lossless encoding unit 1316 acquires, for example, information indicating a intra prediction mode from the intra predicting unit 1324, and acquires, for example, information indicating an inter prediction mode and differential motion vector information from the inter predicting unit 1325. Further, the lossless encoding unit 1316 appropriately generates a NAL unit of a base layer including a sequence parameter set (SPS), a picture parameter set (PPS), and the like.

Further, the lossless encoding unit 1316 encodes information (which is also referred to as "base layer area division information") related to area (for example, a tile or a slice) division of the base layer set by a base layer area division setting unit.

The lossless encoding unit 1316 encodes various kinds of information according to an arbitrary coding scheme, and sets (multiplexes) the encoded information as part of encoded data (which is also referred to as an "encoded stream"). The lossless encoding unit 1316 supplies the encoded data obtained by the encoding to be accumulated in the accumulation buffer 1317.

Examples of the coding scheme of the lossless encoding unit 1316 include variable length coding and arithmetic coding. As the variable length coding, for example, there is Context-Adaptive Variable Length Coding (CAVLC) defined in the H.264/AVC scheme. As the arithmetic coding, for example, there is Context-Adaptive Binary Arithmetic Coding (CABAC).

The accumulation buffer 1317 temporarily holds the encoded data (the encoded base layer data) supplied from the lossless encoding unit 1316. The accumulation buffer 1317 outputs the held encoded base layer data to, for example, a recording device (not illustrated) (a recording medium) at a subsequent stage or a transmission path at a certain timing. In other words, the accumulation buffer 1317 also serves as a transmitting unit that transmits encoded data.

The transform coefficients quantized in the quantizing unit 1315 are also supplied to the inverse quantizing unit 1318. The inverse quantizing unit 1318 inversely quantizes the quantized transform coefficients by a method corresponding to the quantization performed by the quantizing unit 1315. The inverse quantizing unit 1318 supplies the obtained transform coefficients to the inverse orthogonal transforming unit 1319.

The inverse orthogonal transforming unit 1319 performs inverse orthogonal transform on the transform coefficients supplied from the inverse quantizing unit 1318 by a method corresponding to the orthogonal transform process performed by the orthogonal transforming unit 1314. An output (restored differential information) that has been subjected to the inverse orthogonal transform is supplied to the operation unit 1320.

The operation unit 1320 obtains a locally decoded image (a decoded image) by adding the prediction image received from the intra predicting unit 1324 or the inter predicting unit 1325 via the prediction image selecting unit 1326 to the restored differential information that is the inverse orthogonal transform result supplied from the inverse orthogonal transforming unit 1319. The decoded image is supplied to the loop filter 1321 or the frame memory 1322.

The loop filter 1321 includes a deblock filter, an adaptive loop filter, or the like, and performs an appropriate filter process on the reconstructed image supplied from the operation unit 1320. For example, the loop filter 1321 performs the deblock filter process on the reconstructed image, and removes block distortion of the reconstructed image. Further, for example, the loop filter 1321 improves the image quality by performing the loop filter process on the deblock filter process result (the reconstructed image from which the block distortion has been removed) using the Wiener Filter. The loop filter 1321 supplies the filter process result (which is also referred to as a "decoded image") to the frame memory 1322.

The loop filter 1321 may further perform any other arbitrary filter process on the reconstructed image. The loop filter 1321 may supply information used in the filter process such as a filter coefficient to the lossless encoding unit 1316 as necessary so that the information is encoded.

The frame memory 1322 stores the supplied decoded image, and supplies the stored decoded image to the selecting unit 1323 as the reference image at a certain timing.

More specifically, the frame memory 1322 stores the reconstructed image supplied from the operation unit 1320 and the decoded image supplied from the loop filter 1321. The frame memory 1322 supplies the stored reconstructed image to the intra predicting unit 1324 via the selecting unit 1323 at a certain timing or based on a request given from the outside such as the intra predicting unit 1324. Further, the frame memory 1322 supplies the stored decoded image to the inter predicting unit 1325 via the selecting unit 1323 at a certain timing or based on a request given from the outside such as the inter predicting unit 1325.

The selecting unit 1323 selects a supply destination of the reference image supplied from the frame memory 1322. For example, in the case of the intra prediction, the selecting unit 1323 supplies the reference image (the pixel value in the current picture) supplied from the frame memory 1322 to the intra predicting unit 1324. Further, for example, in the case of the inter prediction, the selecting unit 1323 supplies the reference image supplied from the frame memory 1322 to the inter predicting unit 1325.

The intra predicting unit 1324 performs the prediction process on the current picture that is the image of the frame of the processing target, and generates a prediction image. The intra predicting unit 1324 performs the prediction process in units of certain blocks (using a block as a processing unit). In other words, the intra predicting unit 1324 generates a prediction image of a current block serving as a processing target in a current picture. At this time, the intra predicting unit 1324 performs the prediction process (intra prediction) using the reconstructed image supplied from the frame memory 1322 as the reference image via the selecting unit 1323. In other words, the intra predicting unit 1324 generates a prediction image using a pixel value of a pixel neighboring a current block which is included in a reconstructed image. The pixel value of the neighboring pixel used for the intra prediction is a pixel value of a previously processed pixel of the current picture. In intra prediction (that is, in the scheme of generating a prediction image), a plurality of methods (which are also referred to as "intra prediction modes") are prepared as candidates in advance. The intra predicting unit 1324 performs the intra prediction in a plurality of intra prediction modes which are prepared in advance.

The intra predicting unit 1324 generates prediction images in all the intra prediction modes serving as the candidates, evaluates cost function values of the prediction images using the input image supplied from the screen sorting buffer 1312, and selects an optimal mode. When the optimal intra prediction mode is selected, the intra predicting unit 1324 supplies the prediction image generated in the optimal mode to the prediction image selecting unit 1326.

Further, as described above, the intra predicting unit 1324 appropriately supplies, for example, the intra prediction mode information indicating the employed intra prediction mode to the lossless encoding unit 1316 so that the information is encoded.

The inter predicting unit 1325 performs the prediction process on the current picture, and generates a prediction image. The inter predicting unit 1325 performs the prediction process in units of certain blocks (using a block as a processing unit). In other words, the inter predicting unit 1325 generates a prediction image of a current block serving as a processing target in a current picture. At this time, the inter predicting unit 1325 performs the prediction process using image data of the input image supplied from the screen sorting buffer 1312 and image data of the decoded image supplied as the reference image from the frame memory 1322. The decoded image is an image (another picture other than a current picture) of a frame processed before the current picture. In other words, the inter predicting unit 1325 performs the prediction process (inter prediction) of generating a prediction image using an image of another picture.

The inter prediction includes motion prediction and motion compensation. More specifically, the inter predicting unit 1325 performs motion prediction on a current block using the input image and the reference image, and detects a motion vector. Then, the inter predicting unit 1325 performs the motion compensation process according to the detected motion vector using the reference image, and generates a prediction image (inter prediction image information) of a current block. In the inter prediction (that is, a scheme of generating a prediction image), a plurality of methods (which are also referred to as "inter prediction modes") are prepared as candidates in advance. The inter predicting unit 1325 performs the inter prediction in a plurality of inter prediction modes which are prepared in advance.

The inter predicting unit 1325 generates prediction images in all the inter prediction modes serving as the candidate. The inter predicting unit 1325 evaluates cost function values of the prediction images using the input image supplied from the screen sorting buffer 1312, information of the generated differential motion vector, and the like, and selects an optimal mode. When the optimal inter prediction mode is selected, the inter predicting unit 1325 supplies the prediction image generated in the optimal mode to the prediction image selecting unit 1326.

The inter predicting unit 1325 supplies the information indicating the employed inter prediction mode, information necessary for performing processing in the inter prediction mode when the encoded data is decoded, and the like to the lossless encoding unit 1316 so that the information is encoded. As the necessary information, there is information of a generated differential motion vector, and as prediction motion vector information, there is a flag indicating an index of a prediction motion vector.

The prediction image selecting unit 1326 selects the supply source of the prediction image that is supplied to the operation unit 1313 and the operation unit 1320. For example, in the case of the intra coding, the prediction image selecting unit 1326 selects the intra predicting unit 1324 as the supply source of the prediction image, and supplies the prediction image supplied from the intra predicting unit 1324 to the operation unit 1313 and the operation unit 1320. Further, for example, in the case of the inter coding, the prediction image selecting unit 1326 selects the inter predicting unit 1325 as the supply source of the prediction image, and supplies the prediction image supplied from the inter predicting unit 1325 to the operation unit 1313 and the operation unit 1320.

The rate control unit 1327 controls the rate of the quantization operation of the quantizing unit 1315 based on the coding amount of the encoded data accumulated in the accumulation buffer 1317 such that neither an overflow nor an underflow occurs.

The base layer image encoding unit 1301 performs encoding without referring to another layer. In other words, the intra predicting unit 1324 and the inter predicting unit 1325 do not refer to information (for example, a decoded image, intra prediction mode information, inter prediction mode information, and motion information) related to encoding of another layer.

Further, the inter predicting unit 1325 supplies motion information in a prediction direction (for example, the L0 direction or the L1 direction) requested by the enhancement layer image encoding unit 1302 to the enhancement layer image encoding unit 1302.

<Enhancement Layer Image Encoding Unit>

Figure 106:
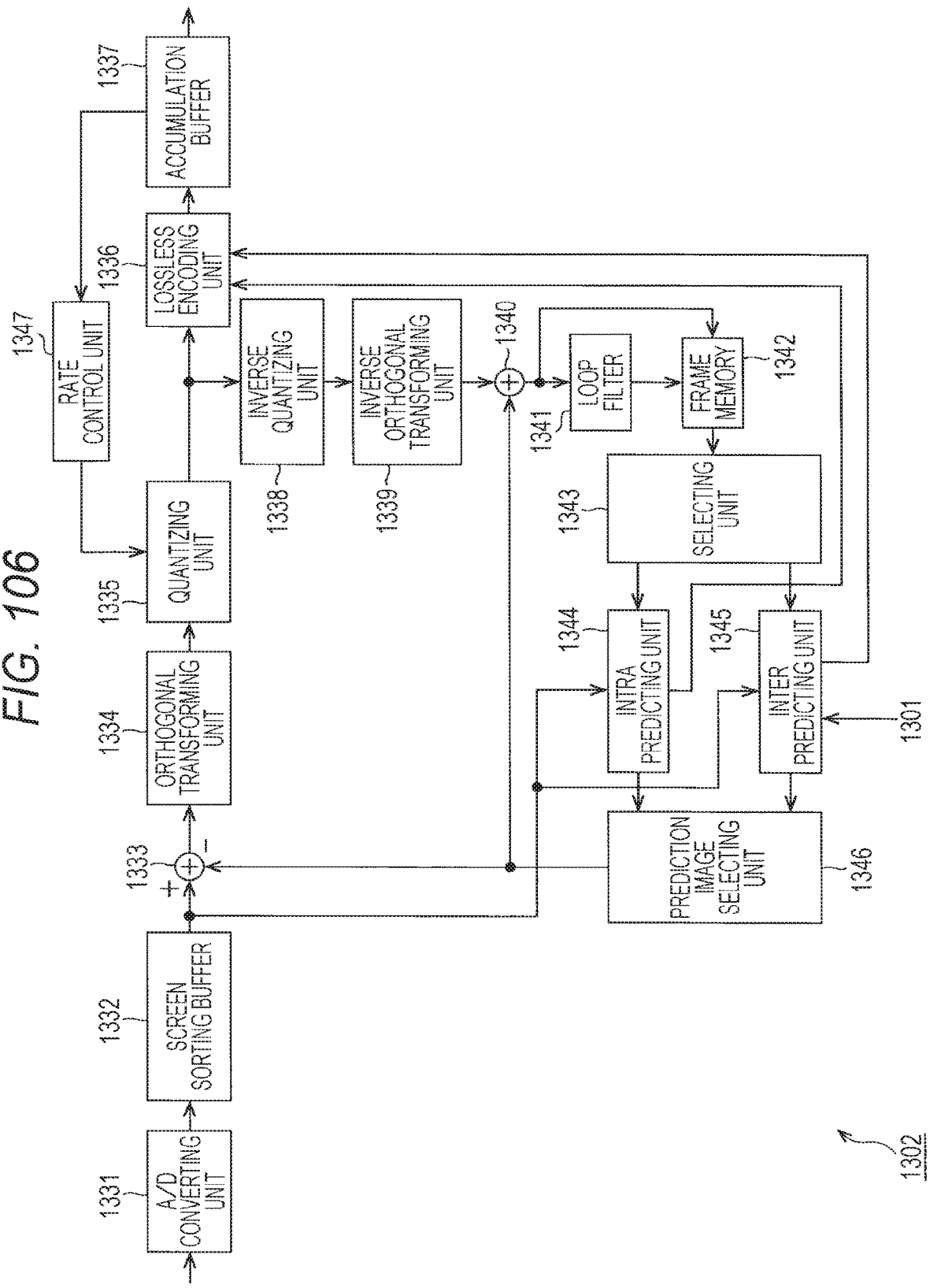
FIG. 106 is a block diagram illustrating an exemplary main configuration of an enhancement layer image encoding unit.

FIG. 106 is a block diagram illustrating an exemplary main configuration of the enhancement layer image encoding unit 1302 of FIG. 104. The enhancement layer image encoding unit 1302 has basically the same configuration as the base layer image encoding unit 1301 of FIG. 105 as illustrated in FIG. 106.

In other words, the enhancement layer image encoding unit 1302 includes an A/D converting unit 1331, a screen sorting buffer 1332, an operation unit 1333, an orthogonal transforming unit 1334, a quantizing unit 1335, a lossless encoding unit 1336, an accumulation buffer 1337, an inverse quantizing unit 1338, and an inverse orthogonal transforming unit 1339 as illustrated in FIG. 106. The enhancement layer image encoding unit 1302 further includes an operation unit 1340, a loop filter 1341, a frame memory 1342, a selecting unit 1343, an intra predicting unit 1344, an inter predicting unit 1345, a prediction image selecting unit 1346, and a rate control unit 1347.

The A/D converting unit 1331 to the rate control unit 1347 correspond to the A/D converting unit 1311 to the rate control unit 1327 of FIG. 105, and perform the same process as the corresponding processing units. Here, the respective components of the enhancement layer image encoding unit 1302 perform a process of encoding the enhancement layer image information other than the base layer. Thus, the description of the A/D converting unit 1311 to the rate control unit 1327 of FIG. 105 can apply as the description of the processes of the A/D converting unit 1331 to the rate control unit 1347, but, in this case, it is necessary to use data of the enhancement layer other than data of the base layer as data to be processed. Further, it is necessary to appropriately replace a processing unit of an input source or an output destination of data with a corresponding processing unit among the A/D converting unit 1331 to the rate control unit 1347 and read it.

Here, the inter predicting unit 1345 sets a prediction direction (for example, the L0 direction or the L1 direction) of the motion information acquired from the base layer image encoding unit 1301, acquires the motion information of the base layer in the set prediction direction from the base layer image encoding unit 1301, and stores the acquired motion information in a built-in buffer. The inter predicting unit 1345 performs the inter-layer syntax prediction using the motion information of the base layer stored in the buffer.

<Inter Predicting Unit>

Figure 107:
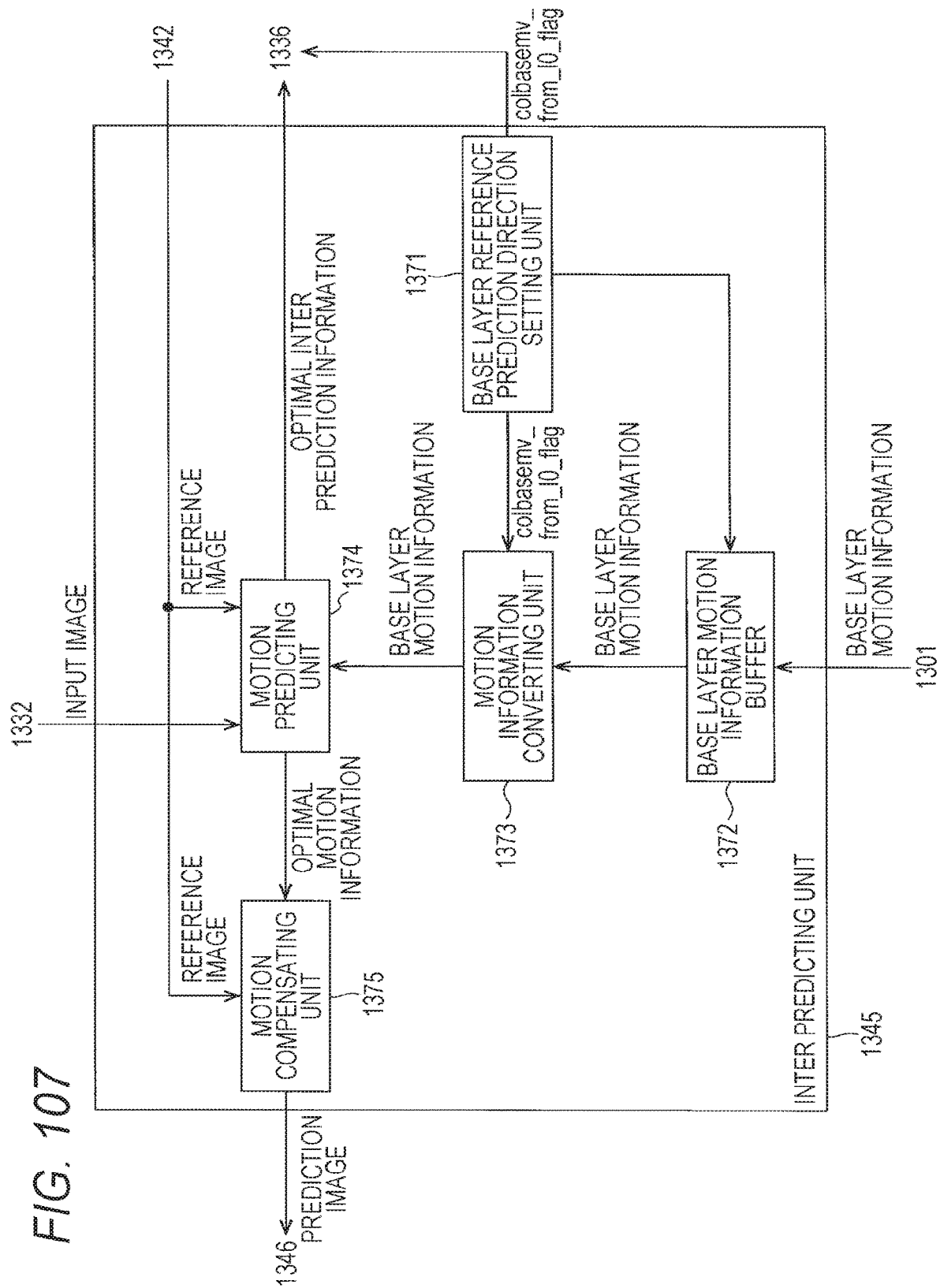
FIG. 107 is a block diagram illustrating an exemplary main configuration of an inter predicting unit.

FIG. 107 is a block diagram illustrating an exemplary main configuration of the inter predicting unit 1345 of FIG. 106. The inter predicting unit 1345 includes a base layer reference prediction direction setting unit 1371, a base layer motion information buffer 1372, a motion information converting unit 1373, a motion predicting unit 1374, and a motion compensating unit 1375 as illustrated in FIG. 107.

The base layer reference prediction direction setting unit 1371 sets a prediction direction of motion information of the base layer to be referred to (used in the inter-layer syntax prediction). For example, the base layer reference prediction direction setting unit 1371 selects the motion information of the base layer in the L0 direction or the motion information of the base layer in the L1 direction as the motion information to be referred to.

The base layer reference prediction direction setting unit 1371 generates control information indicating setting content of the prediction direction, supplies the control information to the base layer motion information buffer 1372 and the motion information converting unit 1373, and causes the setting to be reflected in the base layer motion information buffer 1372 and the motion information converting unit 1373.

For example, the information described above in <8. Overview 3> may be used as the control information. In the example of FIG. 107, the base layer reference prediction direction setting unit 1371 generates flag information (colbasemv_from_l0_flag) indicating whether or not the motion information of the base layer in the L0 direction is referred to as the control information, and supplies the generated the flag information (colbasemv_from_l0_flag) to the base layer motion information buffer 1372 and the motion information converting unit 1373. Further, the base layer reference prediction direction setting unit 1371 supplies the flag information (colbasemv_from_l0_flag) to the lossless encoding unit 1336 so that the flag information (colbasemv_from_l0_flag) is encoded and transmitted to the decoding side.

The base layer motion information buffer 1372 acquires the motion information of the base layer (which is also referred to as "base layer motion information") from the base layer image encoding unit 1301, and stores (holds) the acquired motion information. At this time, the base layer motion information buffer 1372 acquires base layer motion information in a prediction direction according to the setting of the base layer reference prediction direction setting unit 1371, that is, base layer motion information in a prediction direction indicated by the control information (the flag information (colbasemv_from_l0_flag)) supplied from the base layer reference prediction direction setting unit 1371. By limiting the prediction direction of the base layer motion information to be acquired as described above, it is possible to reduce the storage capacity of the base layer motion information buffer 1372 storing the base layer motion information.

When the motion predicting unit 1374 performs the inter-layer prediction, the motion information converting unit 1373 reads the base layer motion information stored in the base layer motion information buffer 1372, and supplies the base layer motion information to the motion predicting unit 1374. At this time, the motion information converting unit 1373 appropriately performs a conversion process on the read base layer motion information, and supplies the converted base layer motion information to the motion predicting unit 1374.

For example, when the prediction direction according to the setting of the base layer reference prediction direction setting unit 1371, that is, the prediction direction indicated by the control information (the flag information (colbasemv_from_l0_flag)) supplied from the base layer reference prediction direction setting unit 1371 is not identical to the prediction direction of the inter-layer prediction of the motion predicting unit 1374, the motion information converting unit 1373 converts the prediction direction of the base layer motion information (for example, converts the motion information in the L0 direction into that in the L1 direction or converts the motion information in the L1 direction into that in the L0 direction).

Further, for example, the motion information converting unit 1373 may convert an inter-layer scalable parameter of the base layer motion information based on the base layer into that based on the enhancement layer.

The motion predicting unit 1374 performs motion prediction in all the inter prediction modes serving as the candidate. For example, the motion predicting unit 1374 performs the motion prediction using the input image supplied from the screen sorting buffer 1332 and the reference image supplied from the frame memory 1342. Further, for example, the motion predicting unit 1374 performs the inter-layer syntax prediction using the base layer motion information supplied from the motion information converting unit 1373.

When the prediction is performed in all the candidate modes as described above, the motion predicting unit 1374 evaluates a cost function value for each prediction result, and selects an optimal mode based on the evaluation result. The motion predicting unit 1374 supplies motion information of the mode selected as the optimal mode to the motion compensating unit 1375 as optimal motion information. Further, the motion predicting unit 1374 supplies optimal inter prediction information serving as information related to motion prediction of the mode selected as the optimal mode to the lossless encoding unit 1336 so that the optimal inter prediction information is encoded and transmitted to the decoding side. For example, the optimal inter prediction information includes information indicating the optimal mode, the optimal motion information, information (for example, the differential motion information) obtained by encoding the optimal motion information.

The motion compensating unit 1375, the motion compensating unit 1375 performs motion compensation using the optimal motion information supplied from the motion predicting unit 1374 and the reference image supplied from the frame memory 1342, and generates a prediction image. The motion compensating unit 1375 supplies the generated prediction image to the prediction image selecting unit 1346.

<Image Coding Process Flow>

Next, flows of the respective processes performed by the image coding device 1300 will be described. First, an exemplary flow of the image coding process will be described with reference to a flowchart of FIG. 108.

When the image coding process starts, in step S5101, the base layer image encoding unit 1301 of the image coding device 1300 encodes image data of the base layer.

In step S5102, the enhancement layer image encoding unit 1302 encodes image data of the enhancement layer.

In step S5103, the multiplexing unit 1303 performs multiplexing on the encoded base layer image stream generated by the process of step S5101 and the encoded enhancement layer image stream generated by the process of step S5102 (that is, bit streams of the respective layers), and generates a line of encoded scalable image streams.

When the process of step S5103 ends, the image coding device 1300 ends the image coding process. One picture (or 1 slice) is processed by the image coding process. Thus, the image coding device 1300 repeatedly performs the image coding process on each picture (or slice) of hierarchized moving image data.

<Base Layer Coding Process Flow>

Next, an exemplary flow of the base layer coding process performed in step S5101 of FIG. 108 by the base layer image encoding unit 1301 will be described with reference to a flowchart of FIG. 109.

When the base layer coding process starts, in step S5121, the A/D converting unit 1311 of the base layer image encoding unit 1301 performs A/D conversion on an image of each frame (picture) of an input moving image.

In step S5122, the screen sorting buffer 1312 stores the image that has been subjected to the A/D conversion in step S5121, and sorts pictures arranged in the display order in an encoding order.

In step S5123, the intra predicting unit 1324 performs the intra prediction process of the intra prediction mode.

In step S5124, the inter predicting unit 1325 performs the inter prediction process in which the motion prediction and the motion compensation of the inter prediction mode and the like are performed. In other words, the inter predicting unit 1325 performs motion prediction in all candidate modes, calculates and evaluates cost function values for prediction results, and selects an optimal inter prediction mode based on an evaluation result. Then, the inter predicting unit 1325 performs motion compensation in the optimal inter prediction mode, and generates a prediction image. Since the base layer image encoding unit 1301 does not refer to information of another layer, the inter predicting unit 1325 does not perform the inter-layer prediction.

In step S5125, the prediction image selecting unit 1326 selects a prediction image based on the cost function value or the like. In other words, the prediction image selecting unit 1326 selects either of the prediction image generated by the intra prediction of step S5123 and a prediction image generated by the inter prediction of step S5124.

In step S5126, the operation unit 1313 calculates a difference between the input image sorted in the frame order by the process of step S5122 and the prediction image selected by the process of step S5125. In other words, the operation unit 1313 generates image data of a differential image between the input image and the prediction image. The image data of the differential image obtained as described above is reduced in a data mount to be smaller than original image data. Thus, it is possible to reduce a data amount to be smaller than when an image is encoded without change.

In step S5127, the orthogonal transforming unit 1314 performs orthogonal transform on the image data of the differential image generated by the process of step S5128.

In step S5128, the quantizing unit 1315 quantizes the orthogonal transform coefficients obtained by the process of step S5127 using the quantization parameter calculated by the rate control unit 1327.

In step S5129, the inverse quantizing unit 1318 inversely quantizes the quantized coefficients (which are also referred to as "quantization coefficients") generated by the process of step S5128 according to characteristics corresponding to characteristics of the quantizing unit 1315.

In step S5130, the inverse orthogonal transforming unit 1319 performs inverse orthogonal transform on the orthogonal transform coefficients obtained by the process of step S5129.

In step S5131, the operation unit 1320 adds the prediction image selected by the process of step S5125 to the differential image restored by the process of step S5130, and generates image data of a reconstructed image.

In step S5132, the loop filter 1321 performs the loop filter process on the image data of the reconstructed image generated by the process of step S5131. As a result, for example, block distortion of the reconstructed image is removed.

In step S5133, the frame memory 1322 stores, for example, data of the decoded image obtained by the process of step S5132 and the reconstructed image obtained by the process of step S5131.

In step S5134, the lossless encoding unit 1316 encodes the quantized coefficients obtained by the process of step S5128. In other words, lossless coding such as variable length coding or arithmetic coding is performed on data corresponding to the differential image.

Further, at this time, the lossless encoding unit 1316 encodes information related to the prediction mode of the prediction image selected by the process of step S5125, and adds the differential image to the encoded data obtained by the encoding. In other words, the lossless encoding unit 1316 also encodes the optimal intra prediction mode information supplied from the intra predicting unit 1324, the optimal inter prediction information supplied from the inter predicting unit 1325, or the like, and adds the encoded information to the encoded data.

Further, the lossless encoding unit 1316 also sets and encodes, for example, syntax elements of various NAL units, and adds the set syntax elements to the encoded data.

In step S5135, the accumulation buffer 1317 accumulates the encoded data obtained by the process of step S5134. The encoded data accumulated in the accumulation buffer 1317 is appropriately read, and transmitted to the decoding side via a transmission path or a recording medium.

In step S5136, the rate control unit 1327 controls the rate of the quantization operation of the quantizing unit 1315 based on the coding amount (the generated coding amount) of the encoded data accumulated in the accumulation buffer 1317 by the process of step S5135 such that neither an overflow nor a underflow occurs. Further, the rate control unit 1327 supplies information related to the quantization parameter to the quantizing unit 1315.

Figure 108:
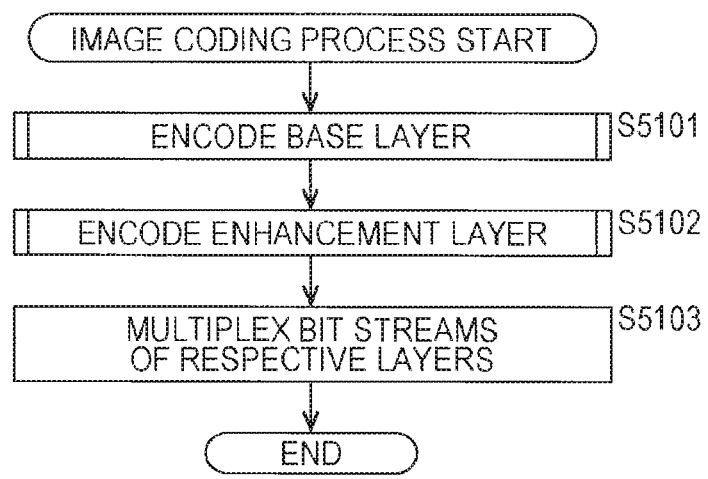
FIG. 108 is a flowchart for describing an exemplary flow of an image coding process.

When the process of step S5136 ends, the base layer coding process ends, and the process returns to FIG. 108.

<Enhancement Layer Coding Process Flow>

Next, in step S5102 of FIG. 108, an exemplary flow of the enhancement layer coding process performed by the enhancement layer image encoding unit 1302 will be described with reference to a flowchart of FIG. 110.

When the enhancement layer coding process starts, in step S5151, the base layer reference prediction direction setting unit 1371 of the enhancement layer image encoding unit 1302 sets the prediction direction of the base layer motion information.

In step S5152, the base layer reference prediction direction setting unit 1371 supplies the control information indicating the content of the setting performed in step S5151 to the lossless encoding unit 1336 so that the control information is encoded and transmitted to the decoding side.

In step S5153, the base layer motion information buffer 1372 acquires the base layer motion information in the prediction direction set in step S5151 from the base layer image encoding unit 1301, and holds the acquired base layer motion information.

Figure 109:
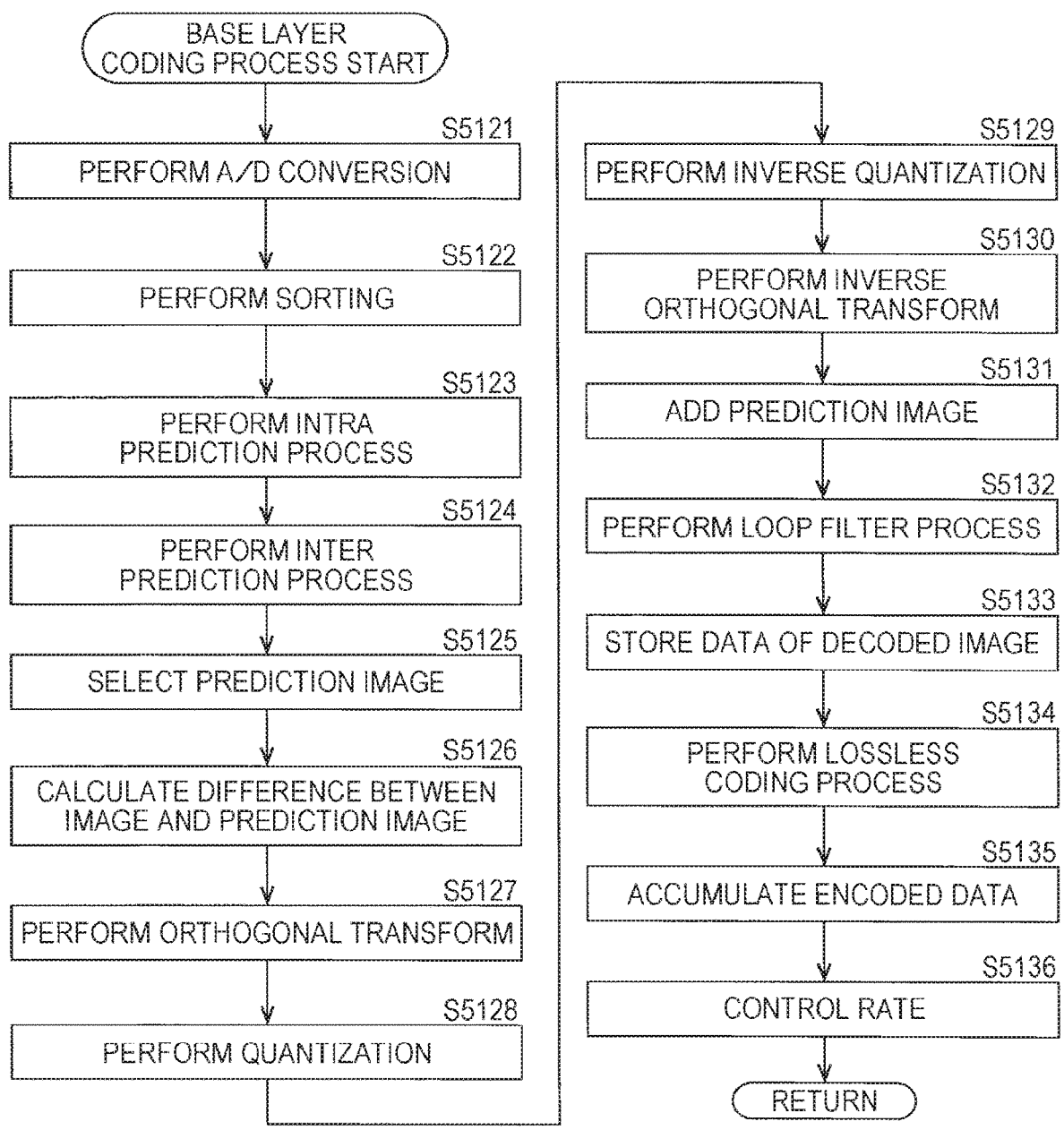
FIG. 109 is a flowchart for describing an exemplary flow of a base layer coding process.

The process of step S5154 to step S5169 corresponds to the process of step S5121 to step S5136 of FIG. 109, and is performed basically in the same manner as the process of step S5121 to step S5136 of FIG. 109.

Here, in the inter prediction process of step S5157, the inter-layer prediction is included as the candidate mode as well. In other words, in step S5157, the motion predicting unit 1374 performs the inter-layer syntax prediction using the base layer motion information read from the base layer motion information buffer 1372 via the motion information converting unit 1373 as one of the candidate modes. The motion predicting unit 1374 selects the optimal inter prediction mode from among all the candidate modes including the inter-layer syntax prediction, and generates a prediction image.

When the process of step S5169 ends, the enhancement layer coding process ends, and the process returns to FIG. 108.

As the process is performed as described above, the enhancement layer image encoding unit 1302 can reduce the capacity of the buffer necessary for holding the motion information of the base layer compared to when the motion information of the base layer in all prediction directions (for example, the L0 direction and the L1 direction) is acquired. In other words, the image coding device 1300 can suppress an increase in the storage capacity necessary for encoding.

Further, the image coding device 1300 transmits the control information indicating the setting of the prediction direction of the base layer motion information to the decoding side, and thus the decoding side can reduce the capacity of the buffer necessary for holding the base layer motion information, similarly to the encoding side. In other words, it is possible to suppress an increase in the storage capacity necessary for decoding.

<Base Layer Motion Information Reference Process Flow>

Figure 110:
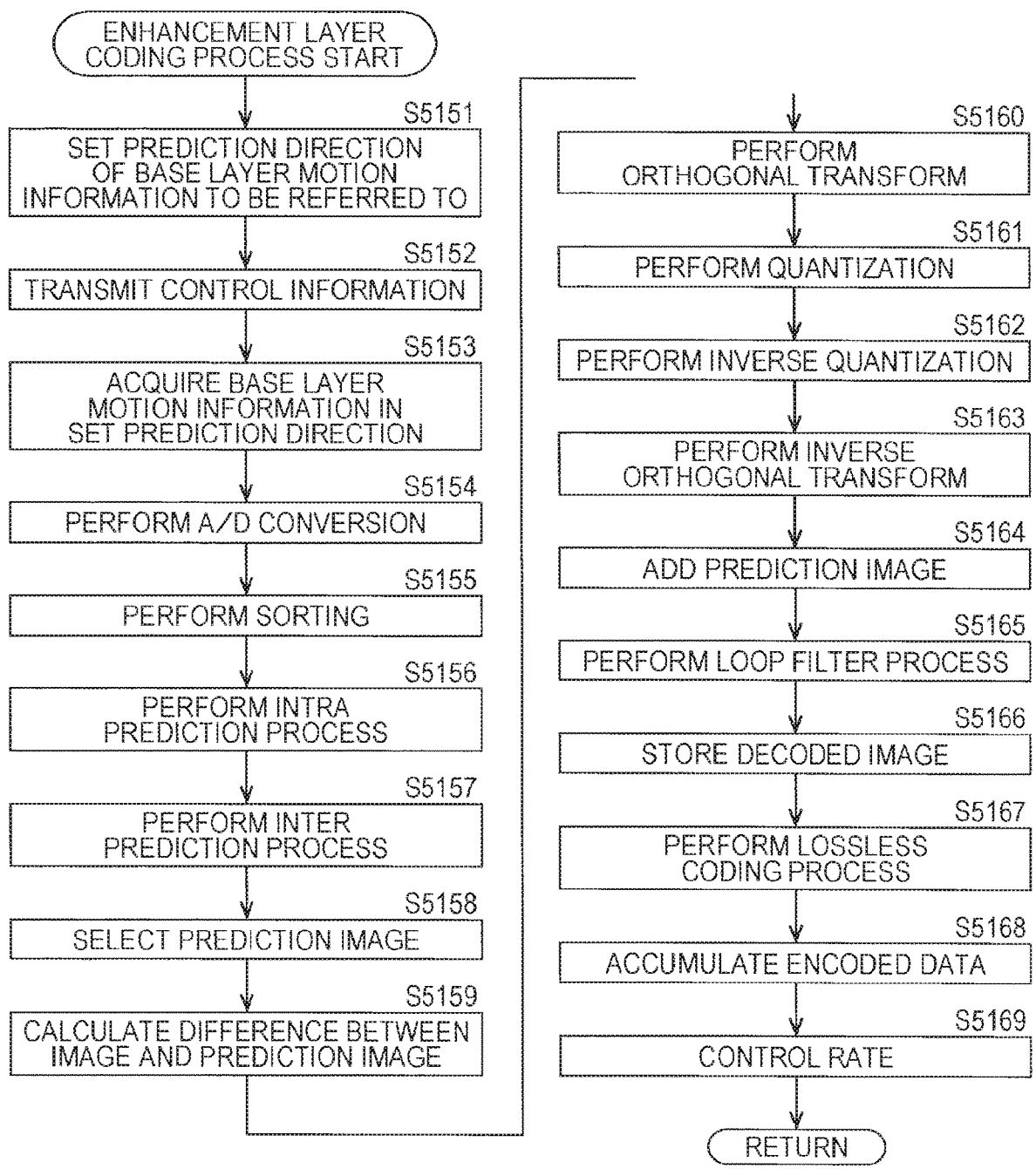
FIG. 110 is a flowchart for describing an exemplary flow of an enhancement layer coding process.
Figure 111:
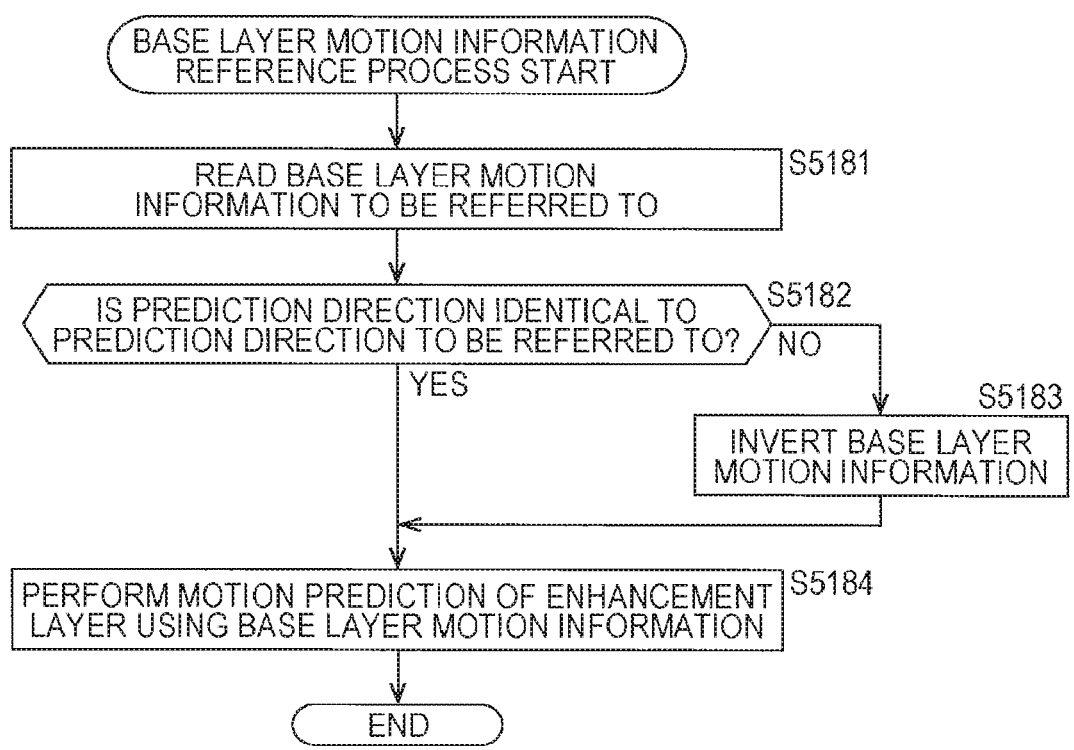
FIG. 111 is a flowchart for describing an exemplary flow of a base layer motion information reference process.

As described above, in the inter prediction process of step S5157 of FIG. 110, the base layer motion information held in the base layer motion information buffer 1372 is read for the inter-layer prediction. An exemplary flow of the base layer motion information reference process of reading the base layer motion information will be described with reference to a flowchart of FIG. 111.

When the base layer motion information reference process starts, in step S5181, the motion information converting unit 1373 of the inter predicting unit 1345 reads the base layer motion information to be referred to from the base layer motion information buffer 1372.

In step S5182, the motion information converting unit 1373 determines whether or not the prediction direction of the inter-layer prediction is identical to the prediction direction (that is, the prediction direction of the motion information read in step S5181) set by the base layer reference prediction direction setting unit 1371. When the prediction direction of the inter-layer prediction is determined to be not identical to the prediction direction set by the base layer reference prediction direction setting unit 1371, the process proceeds to step S5183.

In step S5183, the motion information converting unit 1373 inverts the base layer motion information read in step S5181. For example, when the prediction direction of the inter-layer prediction is the L0 direction, and the prediction direction of the base layer motion information read in step S5181 is the L1 direction, the motion information converting unit 1373 converts the prediction direction of the base layer motion information into the L0 direction. Further, for example, when the prediction direction of the inter-layer prediction is the L1 direction, and the prediction direction of the base layer motion information read in step S5181 is the L0 direction, the motion information converting unit 1373 converts the prediction direction of the base layer motion information into the L1 direction.

When the process of step S5183 ends, the process proceeds to step S5184.

Further, when the prediction direction of the inter-layer prediction is determined to be identical to the prediction direction set by the base layer reference prediction direction setting unit 1371 in step S5182, the process proceeds to step S5184. In other words, the process of converting the prediction direction is not performed.

In step S5184, the motion predicting unit 1374 performs the motion prediction of the enhancement layer using the base layer motion information that has been read and appropriately converted as described above.

When the process of step S5184 ends, the base layer motion information reference process ends.

As described above, the inter predicting unit 1345 can cause the prediction direction of the base layer motion information read from the base layer motion information buffer 1372 to match the prediction direction of the inter-layer prediction. Thus, the base layer motion information buffer 1372 may store the base layer motion information of one prediction direction. Thus, it is possible to reduce the capacity of the buffer necessary for holding the base layer motion information. In other words, it is possible to suppress an increase in the storage capacity necessary for encoding.

Further, in the base layer motion information reference process, the motion information converting unit 1373 may perform a process of converting a scalable parameter based on the base layer into that based on the enhancement layer on the base layer motion information read from the base layer motion information buffer 1372. The conversion process may be performed before step S5182 or may be performed before step S5184.

<10. Eighth Embodiment>
<Image Decoding Device>

Figure 112:
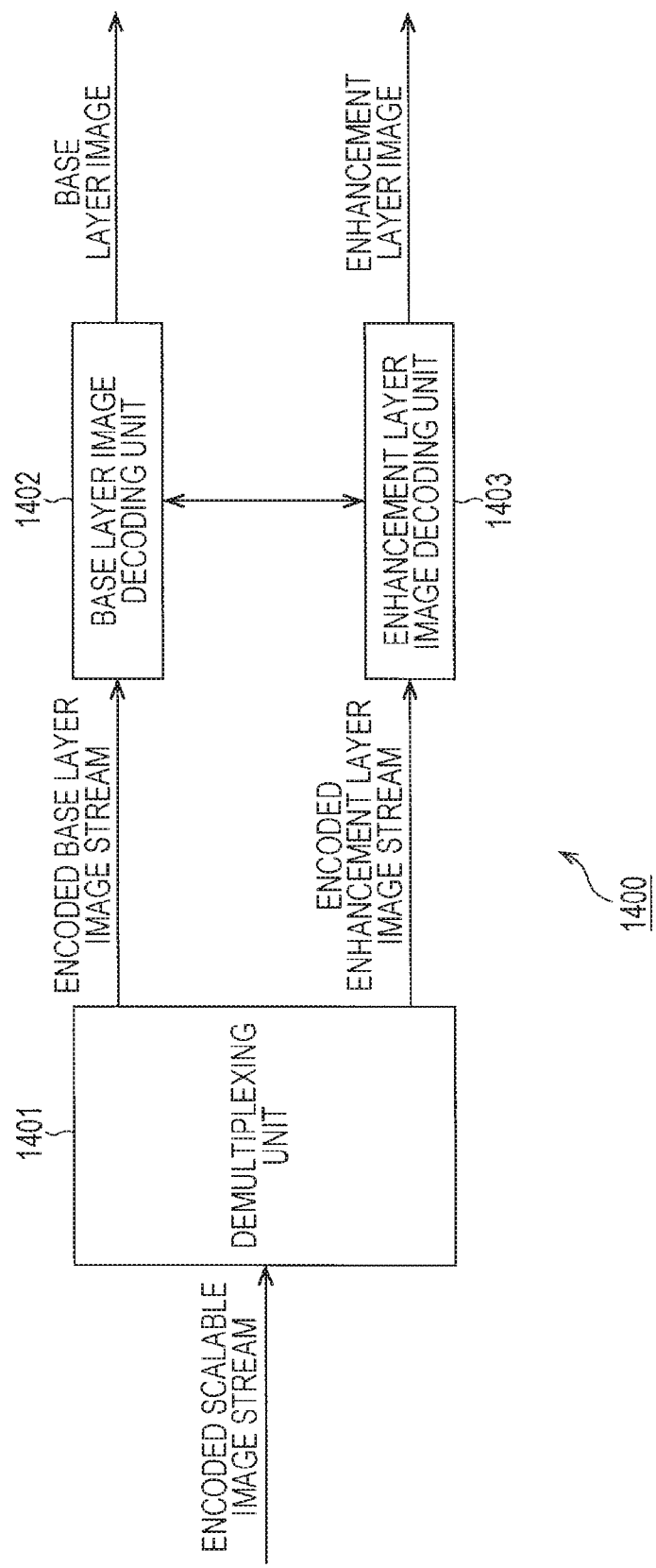
FIG. 112 is a block diagram illustrating an exemplary main configuration of an image decoding device.

Next, decoding of encoded data encoded as described above will be described. FIG. 112 is a block diagram illustrating an exemplary main configuration of an image decoding device corresponding to the image coding device 1300 of FIG. 104 as an example of an image processing device to which the present technology is applied.

An image decoding device 1400 illustrated in FIG. 112 decodes the encoded data generated by the image coding device 1300 according to a decoding method corresponding to the encoding method (that is, performs scalable decoding on the encoded data obtained by scalable coding).

The image decoding device 1400 includes a demultiplexing unit 1401, a base layer image decoding unit 1402, and an enhancement layer image decoding unit 1403 as illustrated in FIG. 112.

The demultiplexing unit 1401 receives an encoded scalable image stream in which an encoded base layer image stream and an encoded enhancement layer image stream transmitted from the encoding side are multiplexed, performs demultiplexing on the encoded scalable image stream, and extracts the encoded base layer image stream and the encoded enhancement layer image stream. The base layer image decoding unit 1402 decodes the encoded base layer image stream extracted by the demultiplexing unit 1401, and obtains a base layer image. The enhancement layer image decoding unit 1403 decodes the encoded enhancement layer image stream extracted by the demultiplexing unit 1401, and obtains an enhancement layer image.

The base layer image decoding unit 1402 decodes the encoded base layer image stream without referring to another layer. On the other hand, the enhancement layer image decoding unit 1403 performs the inter-layer prediction with reference to the base layer in decoding of the encoded enhancement layer image stream. For example, the enhancement image decoding unit 1403 acquires the motion information of the base layer restored when the base layer image decoding unit 1402 decodes the encoded base layer image stream, and performs the inter-layer syntax prediction using the motion information of the base layer.

At this time, the enhancement layer image decoding unit 1403 acquires only the base layer motion information in the prediction direction designated by (that is, the setting performed at the encoding side (at the time of encoding)) the control information transmitted from the encoding side, and stores the acquired base layer motion information in the buffer. Then, the enhancement layer image decoding unit 1403 performs the inter-layer prediction using the base layer motion information (that is, the motion information in the same prediction direction as one used at the time of encoding) stored in the buffer.

<Base Layer Image Decoding Unit>

Figure 113:
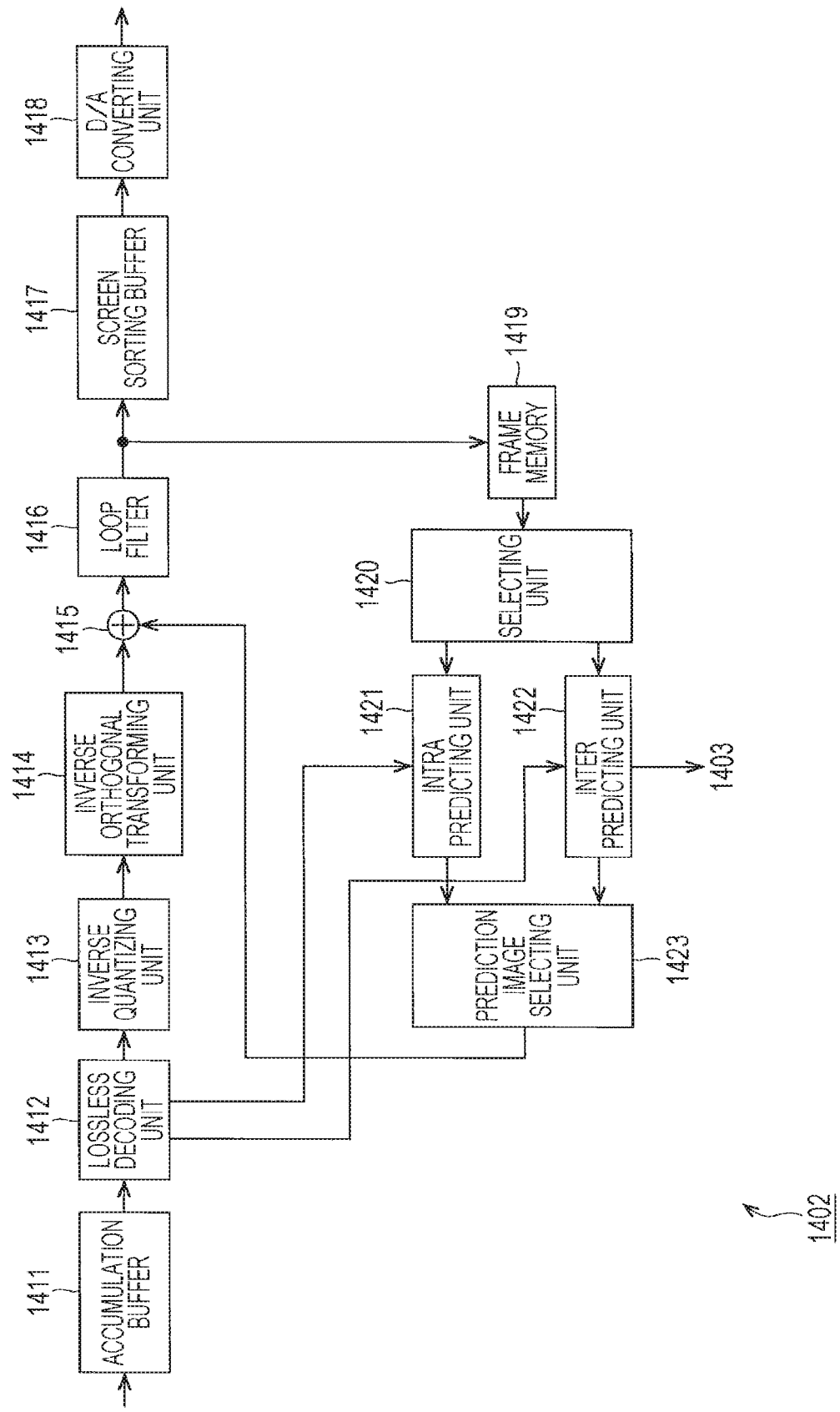
FIG. 113 is a block diagram illustrating an exemplary main configuration of a base layer image decoding unit.

FIG. 113 is a block diagram illustrating an exemplary main configuration of the base layer image decoding unit 1402 of FIG. 112. The base layer image decoding unit 1402 includes an accumulation buffer 1411, a lossless decoding unit 1412, an inverse quantizing unit 1413, an inverse orthogonal transforming unit 1414, an operation unit 1415, a loop filter 1416, a screen sorting buffer 1417, and a D/A converting unit 1418 as illustrated in FIG. 113. The base layer image decoding unit 1402 further includes a frame memory 1419, a selecting unit 1420, an intra predicting unit 1421, an inter predicting unit 1422, and a prediction image selecting unit 1423.

The accumulation buffer 1411 also serves as a receiving unit that receives transmitted encoded data. The accumulation buffer 1411 receives and accumulates the transmitted encoded data, and supplies the encoded data to the lossless decoding unit 1412 at a certain timing.

Information necessary for decoding such as prediction mode information is added to the encoded data. The lossless decoding unit 1412 decodes the information encoded by the lossless encoding unit 1316 which is supplied from the accumulation buffer 1411 according to a decoding scheme corresponding to the coding scheme. The lossless decoding unit 1412 supplies quantized coefficients data of a differential image obtained by the decoding to the inverse quantizing unit 1413.

Further, the lossless decoding unit 1412 determines which of the intra prediction mode and the inter prediction mode is selected as the optimal prediction mode, and supplies the information related to the optimal prediction mode to a mode determined to be selected, that is, the intra predicting unit 1421 or the inter predicting unit 1422. In other words, for example, when the encoding side selects the intra prediction mode as the optimal prediction mode, the information related to the optimal prediction mode is supplied to the intra predicting unit 1421. Further, for example, when the encoding side selects the inter prediction mode as the optimal prediction mode, the information related to the optimal prediction mode is supplied to the inter predicting unit 1422.

Further, the lossless decoding unit 1412 supplies, for example, information necessary for inverse quantization such as a quantization matrix and a quantization parameter to the inverse quantizing unit 1413.

The inverse quantizing unit 1413 inversely quantizes the quantized coefficient data obtained by the decoding performed by the lossless decoding unit 1412 according to a scheme corresponding to the quantization scheme of the quantizing unit 1315. The inverse quantizing unit 1413 is a processing unit similar to the inverse quantizing unit 1318. The inverse quantizing unit 1413 supplies the obtained coefficient data to the inverse orthogonal transforming unit 1414.

The inverse orthogonal transforming unit 1414 performs inverse orthogonal transform on the orthogonal transform coefficients supplied from the inverse quantizing unit 1413 according to a scheme corresponding to the orthogonal transform scheme of the orthogonal transforming unit 1314 as necessary. The inverse orthogonal transforming unit 1414 is a processing unit similar to the inverse orthogonal transforming unit 1319.

Through the inverse orthogonal transform process, image data of the differential image is restored. The image data of the restored differential image corresponds to the image data of the differential image that is not subjected to orthogonal transform in the image coding device. Hereinafter, the image data of the restored differential image obtained by the inverse orthogonal transform process of the inverse orthogonal transforming unit 1414 is also referred to as decoding residual data. The inverse orthogonal transforming unit 1414 supplies the decoding residual data to the operation unit 1415. Further, image data of the prediction image is supplied to the operation unit 1415 from the intra predicting unit 1421 or the inter predicting unit 1422 via the prediction image selecting unit 1423.

The operation unit 1415 obtains image data of a reconstructed image in which the differential image is added to the prediction image using the decoding residual data and the image data of the prediction image. The reconstructed image corresponds to the input image from which the prediction image is not subtracted by the operation unit 1313. The operation unit 1415 supplies the reconstructed image to the loop filter 1416.

The loop filter 1416 appropriately performs the loop filter process such as the deblock filter process or the adaptive loop filter process on the supplied reconstructed image, and generates a decoded image. For example, the loop filter 1416 performs the deblock filter process on the reconstructed image, and removes the block distortion. Further, for example, the loop filter 1416 improves the image quality by performing the loop filter process on the deblock filter process result (the reconstructed image from which the block distortion has been removed) using the Wiener Filter.

A type of the filter process performed by the loop filter 1416 is arbitrary, and any other filter process may be performed. Further, the loop filter 1416 may perform the filter process using a filter coefficient supplied from the encoding side. Furthermore, the loop filter 1416 may output input data without performing the filter process.

The loop filter 1416 supplies the decoded image (or the reconstructed image) serving as the filter process result to the screen sorting buffer 1417 and the frame memory 1419.

The screen sorting buffer 1417 performs sorting on the decoded image in the frame order. In other words, the screen sorting buffer 1417 sorts the image of frames sorted in the encoding order by the screen sorting buffer 1312 in the original display order. In other words, the screen sorting buffer 1417 stores the image data of the decoded image of the frames supplied in the encoding order in that order, reads the image data of the decoded image of the frames stored in the encoding order in the display order, and supplies the read image data to the D/A converting unit 1418. The D/A converting unit 1418 performs D/A conversion on the decoded image (digital data) of the frames supplied from the screen sorting buffer 1417, and outputs analog data to be displayed on a display (not illustrated).

The frame memory 1419 stores the supplied decoded image, and supplies the stored decoded image to the intra predicting unit 1421 or the inter predicting unit 1422 as the reference image via the selecting unit 1420 at a certain timing or based on a request given from the outside such as the intra predicting unit 1421 or the inter predicting unit 1422.

For example, the intra prediction mode information is appropriately supplied to the intra predicting unit 1421 from the lossless decoding unit 1412. The intra predicting unit 1421 performs intra prediction in the intra prediction mode (the optimal intra prediction mode) used in the intra predicting unit 1324, and generates a prediction image. At this time, the intra predicting unit 1421 performs intra prediction using the image data of the reconstructed image supplied from the frame memory 1419 via the selecting unit 1420. In other words, the intra predicting unit 1421 uses the reconstructed image as the reference image (neighboring pixel). The intra predicting unit 1421 supplies the generated prediction image to the prediction image selecting unit 1423.

For example, the optimal prediction mode information and the motion information are appropriately supplied from the lossless decoding unit 1412 to the inter predicting unit

1422. The inter predicting unit 1422 performs inter prediction using the decoded image (the reference image) acquired from the frame memory 1419 in the inter prediction mode (the optimal inter prediction mode) indicated by the optimal prediction mode information acquired from the lossless decoding unit 1412, and generates a prediction image.

The prediction image selecting unit 1423 supplies the prediction image supplied from the intra predicting unit 1421 or the prediction image supplied from the inter predicting unit 1422 to the operation unit 1415. Then, the operation unit 1415 adds the prediction image to the decoding residual data (the differential image information) supplied from the inverse orthogonal transforming unit 1414, and so the reconstructed image is obtained.

The base layer image decoding unit 1402 performs decoding without referring to another layer. In other words, the intra predicting unit 1421 and the inter predicting unit 1422 do not refer to information (for example, the decoded image, the intra prediction mode information, the inter prediction mode information, and the motion information) related to encoding of another layer.

Further, the inter predicting unit 1422 supplies the motion information of the prediction direction (for example, the L0 direction or the L1 direction) requested by the enhancement layer image decoding unit 1403 to the enhancement layer image decoding unit 1403.

<Enhancement Layer Image Decoding Unit>

Figure 114:
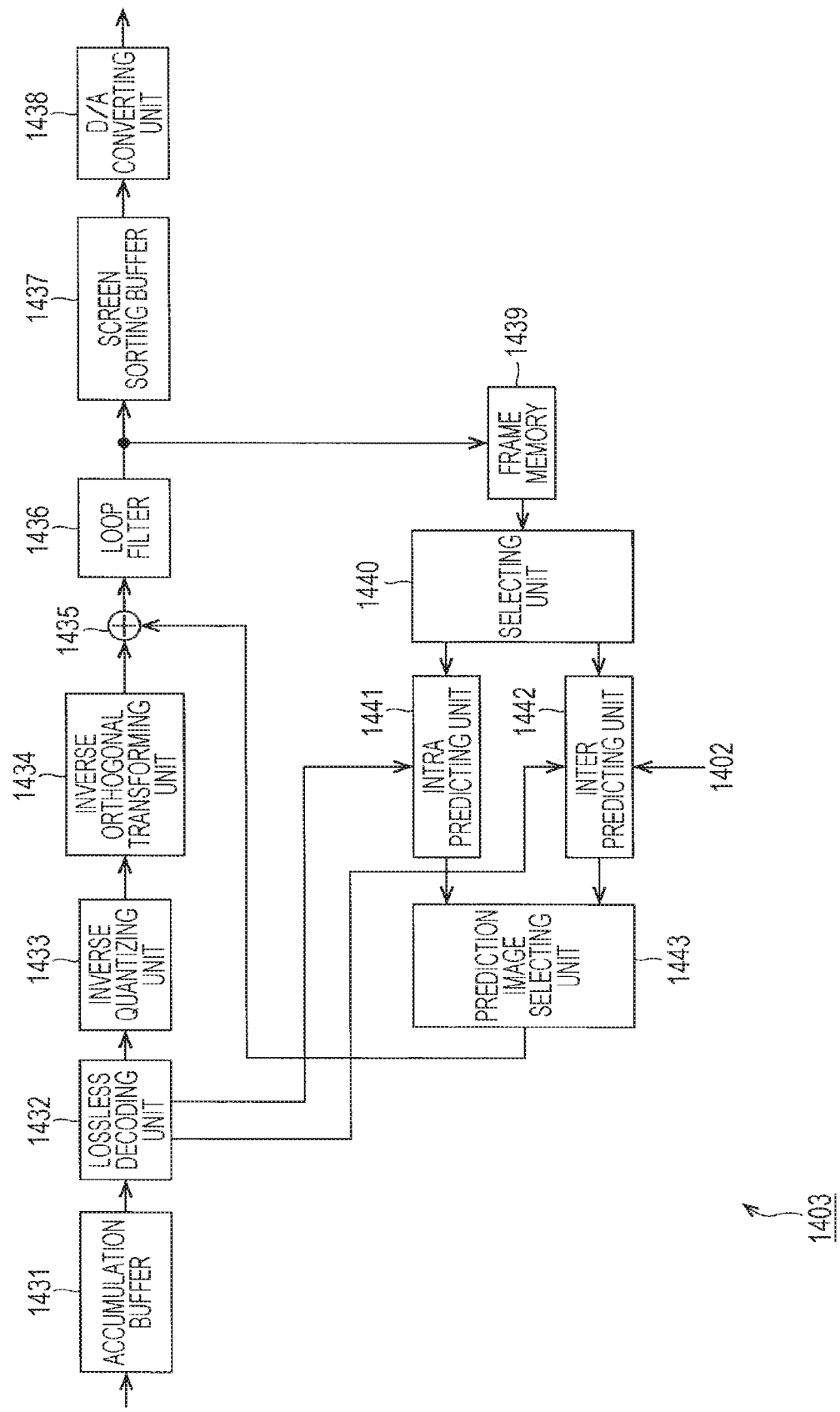
FIG. 114 is a block diagram illustrating an exemplary main configuration of an enhancement layer image decoding unit.

FIG. 114 is a block diagram illustrating an exemplary main configuration of the enhancement layer image decoding unit 1403 of FIG. 112. The enhancement layer image decoding unit 1403 has basically the same configuration as the base layer image decoding unit 1402 of FIG. 113 as illustrated in FIG. 114.

In other words, the enhancement layer image decoding unit 1403 includes an accumulation buffer 1431, a lossless decoding unit 1432, an inverse quantizing unit 1433, an inverse orthogonal transforming unit 1434, an operation unit 1435, a loop filter 1436, a screen sorting buffer 1437, and a D/A converting unit 1438 as illustrated in FIG. 114. The enhancement layer image decoding unit 1403 further includes a frame memory 1439, a selecting unit 1440, an intra predicting unit 1441, an inter predicting unit 1442, and a prediction image selecting unit 1443.

The accumulation buffer 1431 to the prediction image selecting unit 1443 correspond to the accumulation buffer 1411 to the prediction image selecting unit 1423 of FIG. 113, and perform the same processes as the corresponding processing units. Here, the respective components of the enhancement layer image decoding unit 1403 perform a process of encoding the enhancement layer image information other than the base layer. Thus, the description of the accumulation buffer 1411 to the prediction image selecting unit 1423 of FIG. 113 can apply to the description of the processes of the accumulation buffer 1431 to the prediction image selecting unit 1443, but in this case, it is necessary to use data of the enhancement layer other than data of the base layer as data to be processed. Further, it is necessary to appropriately replace a processing unit of an input source or an output destination of data with a corresponding processing unit of the enhancement layer image decoding unit 1403 and read it.

Here, the lossless decoding unit 1432 supplies, for example, the control information (for example, the flag information (colbasemv_from_10_flag) indicating whether or not the motion information of the base layer in the L0 direction is stored) of the prediction direction of the base layer motion information acquired from the base layer image decoding unit 1402 supplied from the encoding side which is included in the slice header to the inter predicting unit 1442.

The inter predicting unit 1442 acquires the base layer motion information in the prediction direction designated by the control information from the base layer image decoding unit 1402, and stores the acquired base layer motion information in a built-in buffer. When the inter-layer syntax prediction is performed, the inter predicting unit 1442 uses the motion information of the base layer stored in the buffer.

<Inter Predicting Unit>

Figure 115:
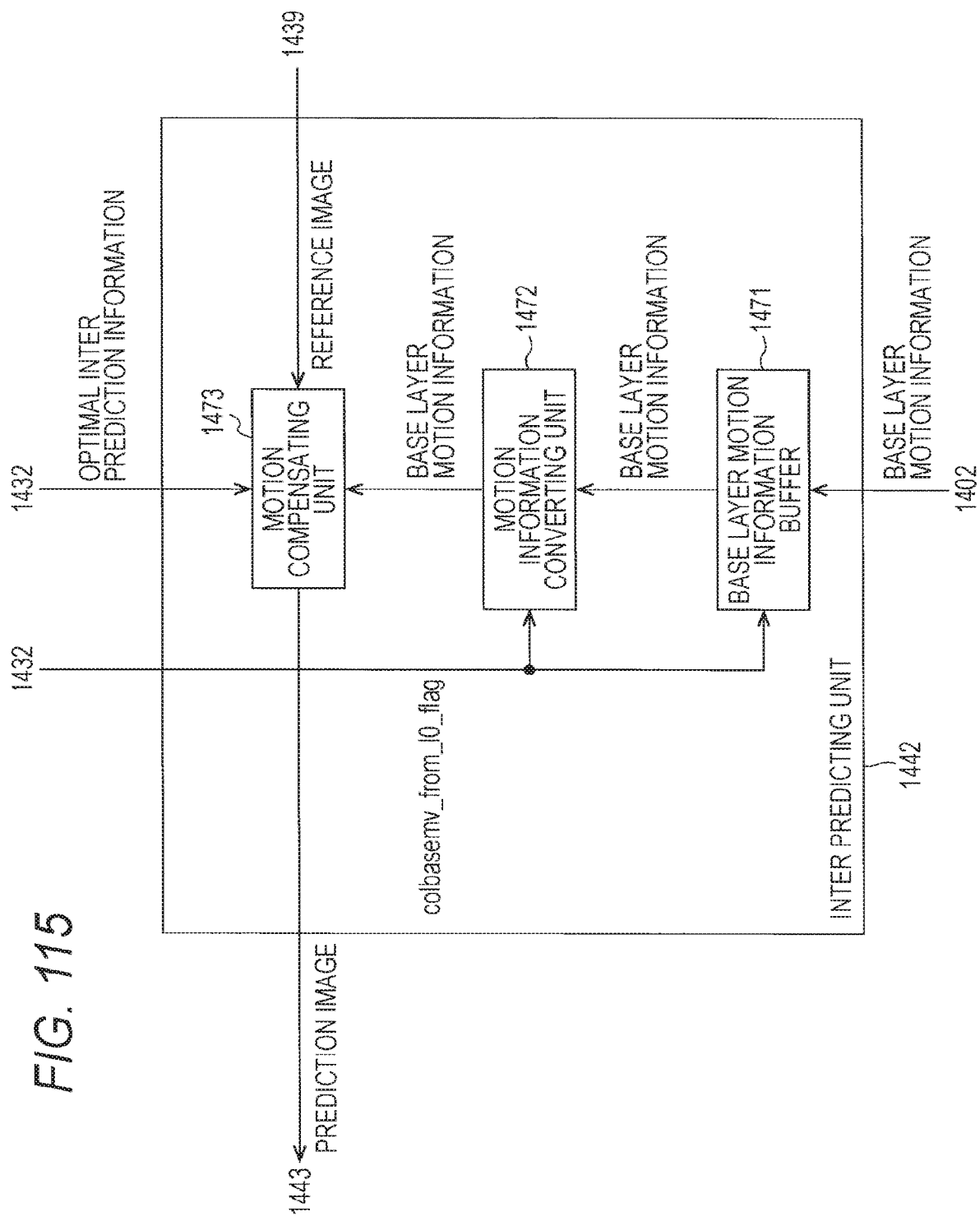
FIG. 115 is a block diagram illustrating an exemplary main configuration of an inter predicting unit.

FIG. 115 is a block diagram illustrating an exemplary main configuration of the inter predicting unit 1442 of FIG. 114. The inter predicting unit 1442 includes a base layer motion information buffer 1471, a motion information converting unit 1472, and a motion compensating unit 1473 as illustrated in FIG. 115.

The base layer motion information buffer 1471 acquires the control information (the flag information (colbasemv_from_10_flag)) supplied from the lossless decoding unit 1432. The base layer motion information buffer 1471 acquires the base layer motion information in the prediction direction indicated by the control information, and stores the acquired base layer motion information. In other words, the base layer motion information buffer 1471 acquires the base layer motion information in the same prediction direction as at the time of encoding. By limiting the prediction direction of the base layer motion information to be acquired as described above, it is possible to reduce the storage capacity of the base layer motion information buffer 1471 storing the base layer motion information.

The motion information converting unit 1472 acquires the control information (the flag information (colbasemv_from_10_flag)) supplied from the lossless decoding unit 1432. Further, when the motion compensating unit 1473 reconstructs the motion information through the inter-layer prediction, the motion information converting unit 1472 reads the base layer motion information stored in the base layer motion information buffer 1471, and supplies the base layer motion information to the motion compensating unit 1473. At this time, the motion information converting unit 1472 appropriately performs the conversion process on the read base layer motion information, and supplies the converted base layer motion information to the motion compensating unit 1473.

For example, when the prediction direction indicated by the control information (the flag information (colbasemv_from_10_flag)) supplied from the lossless decoding unit 1432 is not identical to the prediction direction of the inter-layer prediction of the motion compensating unit 1473, the motion information converting unit 1472 converts the prediction direction of the base layer motion information (for example, converts the motion information in the L0 direction into that in the L1 direction or coverts the motion information in the L1 direction into that in the L0 direction).

Further, for example, the motion information converting unit 1472 may convert an inter-layer scalable parameter of the base layer motion information based on the base layer into that based on the enhancement layer.

The motion compensating unit 1473 performs motion compensation in the optimal inter prediction mode (the inter prediction mode employed at the time of encoding) indicated by the optimal inter prediction information supplied from the lossless decoding unit 1432, and generates a prediction image. For example, the motion compensating unit 1473 decodes the encoded motion information (for example, the differential motion information) included in the optimal inter prediction information supplied from the lossless decoding unit 1432, and reconstructs the motion information of the current block. Then, the motion compensating unit 1473 acquires the reference image from the frame memory 1439 corresponding to the reconstructed motion information, and generates a prediction image. The motion compensating unit 1473 supplies the generated prediction image to the prediction image selecting unit 1443.

Further, for example, when the optimal inter prediction mode is the inter-layer syntax prediction, the motion compensating unit 1473 reconstructs the motion information of the current block using the base layer motion information supplied from the motion information converting unit 1472, and generates a prediction image.

<Image Decoding Process Flow>

Next, flows of the respective processes performed by the image decoding device 1400 will be described. First, an exemplary flow of the image decoding process will be described with reference to a flowchart of FIG. 116.

When the image decoding process starts, in step S5201, the demultiplexing unit 1401 of the image decoding device 1400 performs demultiplexing on the encoded scalable image stream transmitted from the encoding side for each layer.

In step S5202, the base layer image decoding unit 1402 decodes the encoded base layer image stream extracted by the process of step S5201. The base layer image decoding unit 1402 outputs data of the base layer image generated by the decoding.

In step S5203, the enhancement layer image decoding unit 1403 decodes the encoded enhancement layer image stream extracted by the process of step S5201. The enhancement layer image decoding unit 1403 outputs data of the enhancement layer image generated by the decoding.

When the process of step S5203 ends, the image decoding device 1400 ends the image decoding process. Through the image decoding process, one picture (or one slice) is processed. Thus, the image decoding device 1400 repeatedly performs the image decoding process for each picture (or slice) of hierarchized moving image data.

<Base Layer Decoding Process Flow>

Next, an exemplary flow of the base layer decoding process performed by the base layer image decoding unit 1402 in step S5202 of FIG. 116 will be described with reference to a flowchart of FIG. 117.

When the base layer decoding process starts, in step S5221, the accumulation buffer 1411 of the base layer image decoding unit 1402 accumulates a transmitted bit stream (encoded data). In step S5222, the lossless decoding unit 1412 decodes the bit stream (encoded data) supplied from the accumulation buffer 1411. In other words, image data such as an I picture, a P picture, and a B picture encoded by the lossless encoding unit 1316 is decoded. At this time, various kinds of information such as the header information as well as image data included in the bit stream is also decoded.

In step S5223, the inverse quantizing unit 1413 inversely quantizes the quantized coefficients obtained by the process of step S5222.

In step S5224, the inverse orthogonal transforming unit 1414 performs inverse orthogonal transform on the coefficients that have been inversely quantized in step S5223.

In step S5225, the intra predicting unit 1421 or the inter predicting unit 1422 generates a prediction image. In other words, motion compensation is performed in the prediction mode applied at the time of encoding which is determined by the lossless decoding unit 1412 is performed. More specifically, for example, when intra prediction is applied at the time of encoding, the intra predicting unit 1421 generates a prediction image in the intra prediction mode regarded to be optimal at the time of encoding. Further, for example, when inter prediction is applied at the time of encoding, the inter predicting unit 1422 generates a prediction image in the inter prediction mode regarded to be optimal at the time of encoding.

In step S5226, the operation unit 1415 adds the prediction image generated in step S5225 to the differential image obtained by the inverse orthogonal transform in step S5224. As a result, the image data of the reconstructed image is obtained.

In step S5227, the loop filter 1416 appropriately performs the loop filter process such as the deblock filter process or the adaptive loop filter process on the image data of the reconstructed image obtained by the process of step S5226.

In step S5228, the screen sorting buffer 1417 performs sorting on frames of the reconstructed image that has been subjected to the filter process in step S5227. In other words, the frames sorted at the time of encoding are sorted in the original display order.

In step S5229, the D/A converting unit 1418 performs D/A conversion on the image in which the order of the frames is sorted in step S5228. The image is output to a display (not illustrated), and the image is displayed.

In step S5230, the frame memory 1419 stores, for example, data of the decoded image obtained by the process of step S5227 or the reconstructed image obtained by the process of step S5226.

Figure 116:
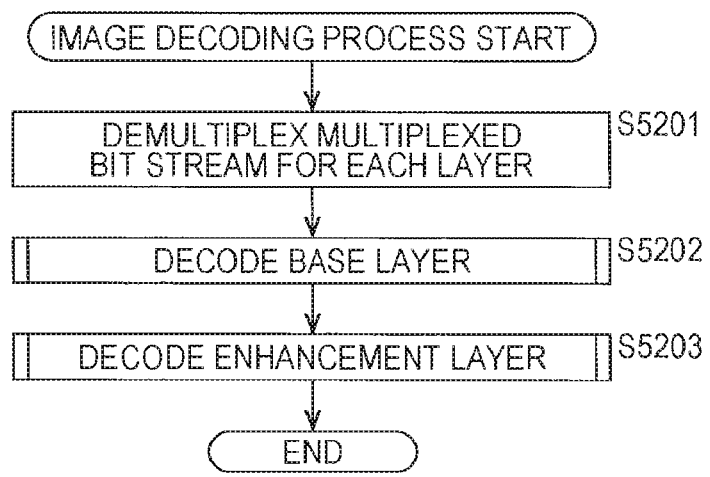
FIG. 116 is a flowchart for describing an exemplary flow of an image decoding process.

When the process of step S5230 ends, the base layer decoding process ends, and the process returns to FIG. 116.

<Enhancement Layer Decoding Process Flow>

Next, an exemplary flow of the enhancement layer decoding process performed by the enhancement layer image decoding unit 1403 in step S5203 of FIG. 116 will be described with reference to a flowchart of FIG. 118.

When the enhancement layer decoding process starts, in step S5251, the inter predicting unit 1422 of the enhancement layer image decoding unit 1403 acquires the control information (the flag information (colbasemv_from_10_flag)) transmitted from the encoding side via the lossless decoding unit 1412.

In step S5252, the inter predicting unit 1422 acquires the base layer motion information in prediction direction designated by the control information acquired in step S5251 from the base layer image decoding unit 1402, and stores the acquired base layer motion information in the buffer.

Figure 117:
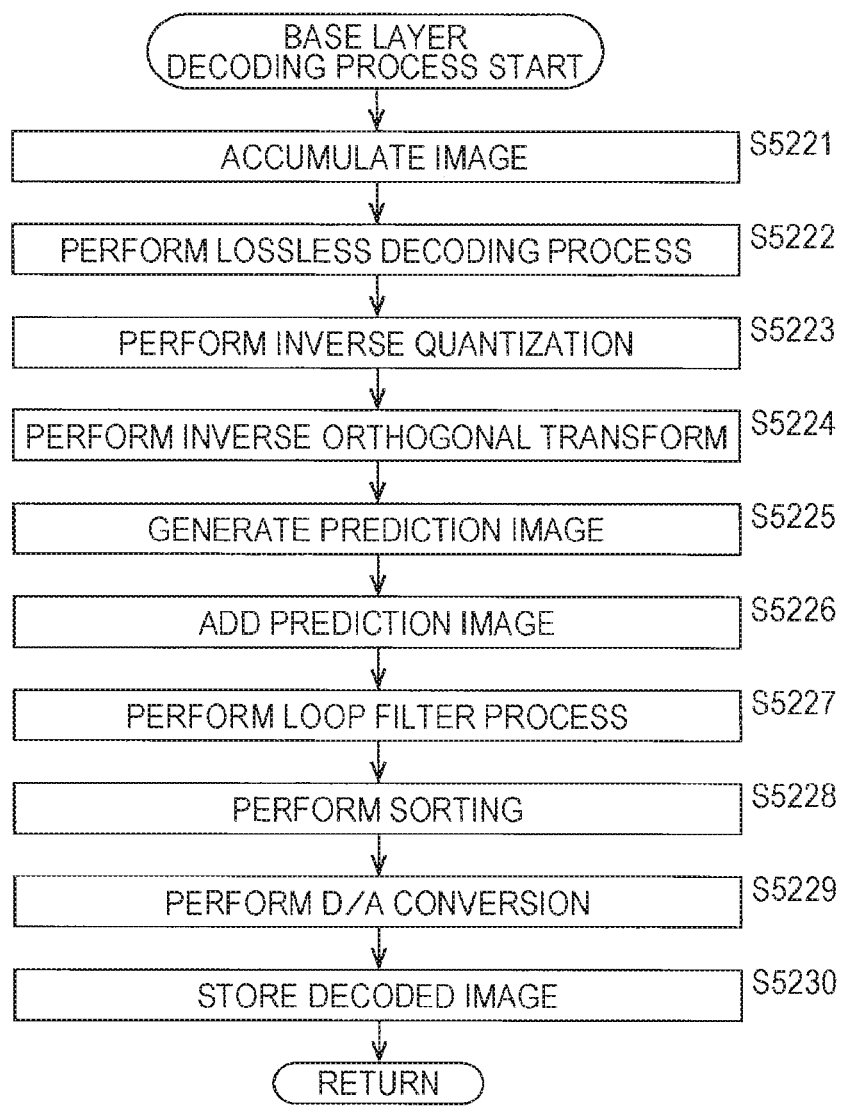
FIG. 117 is a flowchart for describing an exemplary flow of a base layer decoding process.

The process of step S5253 to step S5262 corresponds to the process of step S5221 to step S5230 of FIG. 117, and is performed basically in the same manner as the process of step S5221 to step S5230 of FIG. 117.

Here, when the optimal prediction mode when the prediction image is generated in step S5257 is the inter-layer syntax prediction of the interprediction, the interpredicting unit 1442 generates a prediction image using the base layer motion information acquired from the base layer image decoding unit 1402.

When the process of step S5262 ends, the enhancement layer decoding process ends, and the process returns to FIG. 116.

As the process is performed as described above, the enhancement layer image decoding unit 1403 can reduce the capacity of the buffer necessary for holding the motion information of the base layer compared to when the motion information of the base layer in all the prediction directions (for example, the L0 direction and the L1 direction) is acquired. In other words, the image decoding device 1400 can suppress an increase in the storage capacity necessary for decoding.

<Base Layer Motion Information Reference Process Flow>

Figure 118:
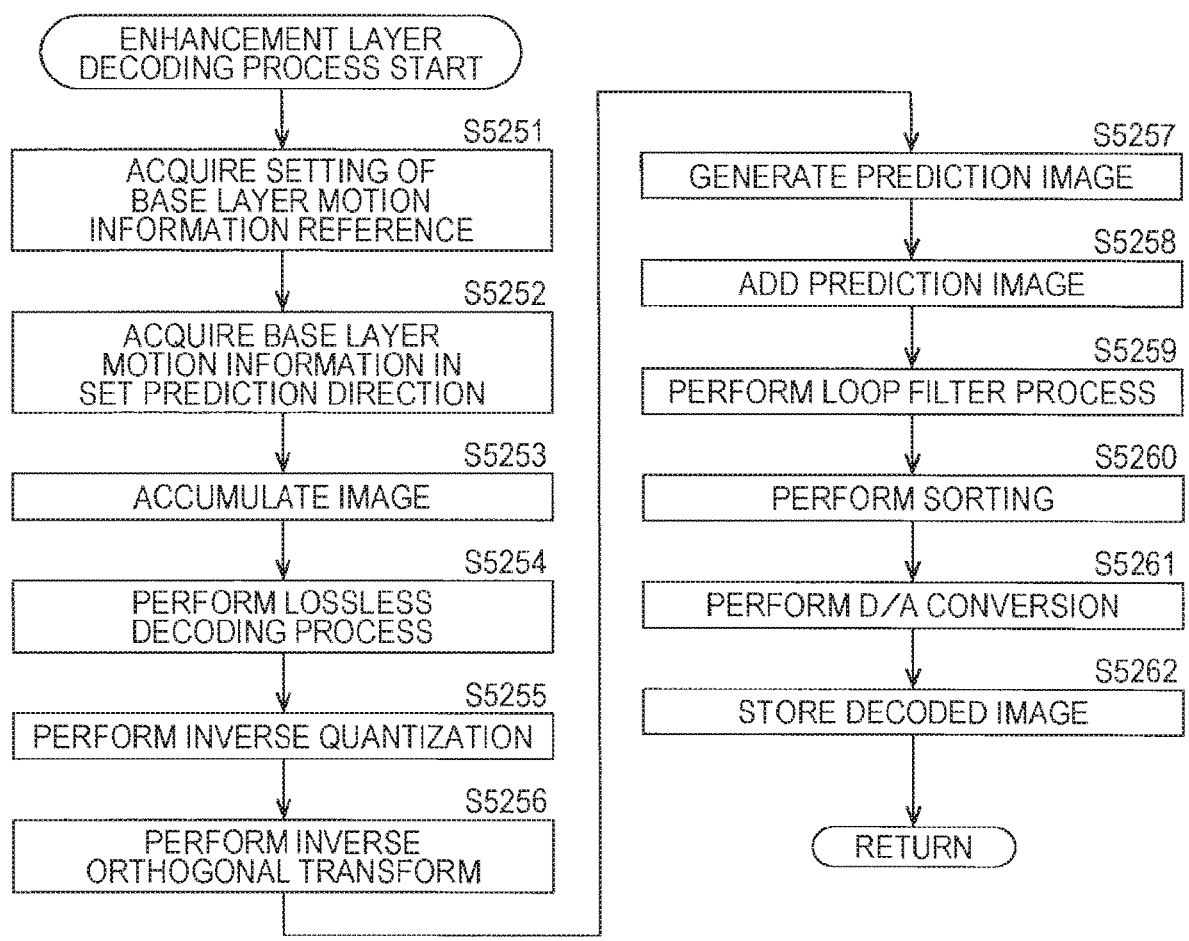
FIG. 118 is a flowchart for describing an exemplary flow of an enhancement layer decoding process.

Further, when the optimal prediction mode is the inter-layer prediction of the inter prediction as described above, the base layer motion information held in the base layer motion information buffer 1471 is read when the prediction image is generated in step S5257 of FIG. 118. The base layer motion information reference process of reading the base layer motion information is performed in the same manner as in the case of encoding. In other words, the description of the flowchart of FIG. 111 can apply to the process of the decoding side. Thus, a description of this process is omitted.

The present technology can be applied to all image coding devices and image decoding devices based on scalable coding and decoding schemes.

For example, the present technology can be applied to an image coding device and an image decoding device used when image information (bit stream) compressed by orthogonal transform such as discrete cosine transform and motion compensation as in MPEG and H.26x is received via a network medium such as satellite broadcasting, a cable television, the Internet, or a mobile telephone. Further, the present technology can be applied to an image coding device and an image decoding device used when processing is performed on a storage medium such as an optical disk, a magnetic disk, or a flash memory.

<11. Ninth Embodiment>
<Computer>

The above-described series of processes may be executed by hardware or software. When the series of processes are executed by software, a program configuring the software is installed in a computer. Here, examples of the computer includes a computer incorporated into dedicated hardware and a general purpose personal computer that includes various programs installed therein and is capable of executing various kinds of functions.

Figure 119:
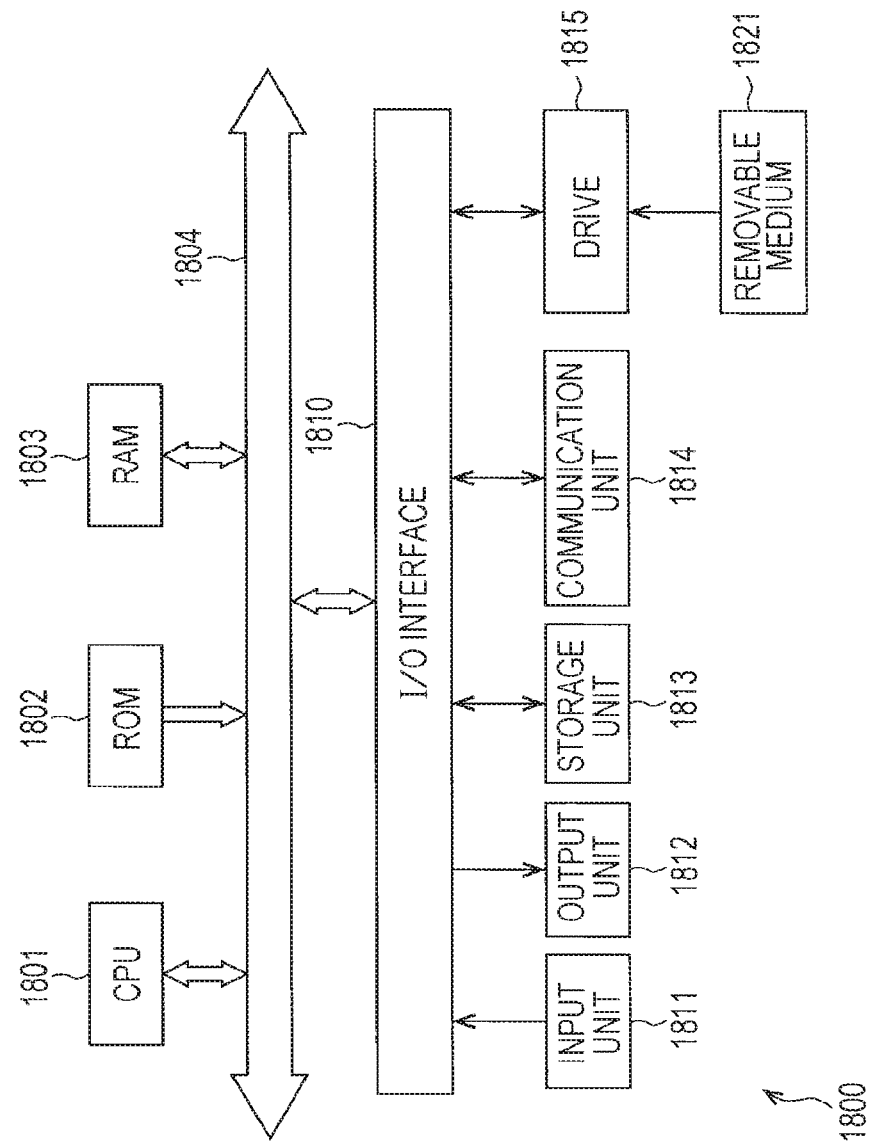
FIG. 119 is a block diagram illustrating an exemplary main configuration of a computer.

FIG. 119 is a block diagram illustrating an exemplary hardware configuration of a computer that executes the above-described series of processes by a program.

In a computer 1800 illustrated in FIG. 119, a central processing unit (CPU) 1801, a read only memory (ROM) 1802, and a random access memory (RAM) 1803 are connected with one another via a bus 1804.

An input/output (I/O) interface 1810 is also connected to the bus 1804. An input unit 1811, an output unit 1812, a storage unit 1813, a communication unit 1814, and a drive 1815 are connected to the I/O interface 1810.

For example, the input unit 1811 includes a keyboard, a mouse, a microphone, a touch panel, an input terminal, and the like. For example, the output unit 1812 includes a display, a speaker, an output terminal, and the like. For example, the storage unit 1813 includes a hard disk, a RAM disk, a non-volatile memory, and the like. For example, the communication unit 1814 includes a network interface. The drive 1815 drives a removable medium 1821 such as a magnetic disk, an optical disk, a magneto optical disk, or a semiconductor memory.

In the computer having the above configuration, the CPU 1801 executes the above-described series of processes, for example, by loading the program stored in the storage unit 1813 onto the RAM 1803 through the I/O interface 1810 and the bus 1804 and executing the program. The RAM 1803 also appropriately stores, for example, data necessary when the CPU 1801 executes various kinds of processes.

For example, the program executed by the computer (the CPU 1801) may be recorded in the removable medium 1821 as a package medium or the like and applied. Further, the program may be provided through a wired or wireless transmission medium such as a local area network (LAN), the Internet, or digital satellite broadcasting.

In the computer, the removable medium 1821 is mounted to the drive 1815, and then the program may be installed in the storage unit 1813 through the I/O interface 1810. Further, the program may be received by the communication unit 1814 via a wired or wireless transmission medium and then installed in the storage unit 1813. In addition, the program may be installed in the ROM 1802 or the storage unit 1813 in advance.

Further, the program may be a program in which the processes are chronologically performed in the order described in this disclosure or may be a program in which the processes are performed in parallel or at necessary timings such as called timings.

Further, in the present specification, steps describing a program recorded in a recording medium include not only processes chronologically performed according to a described order but also processes that are not necessarily chronologically processed but performed in parallel or individually.

In addition, in this disclosure, a system means a set of two or more configuration elements (devices, modulates (parts), or the like) regardless of whether or not all configuration elements are arranged in a single housing. Thus, both a plurality of devices that are accommodated in separate housings and connected via a network and a single device in which a plurality of modules are accommodated in a single housing are systems.

Further, a configuration described as one device (or processing unit) may be divided into a plurality of devices (or processing units). Conversely, a configuration described as a plurality of devices (or processing units) may be integrated into one device (or processing unit). Further, a configuration other than the above-described configuration may be added to a configuration of each device (or each processing unit). In addition, when a configuration or an operation in an entire system is substantially the same, a part of a configuration of a certain device (or processing unit) may be included in a configuration of another device (or another processing unit).

The preferred embodiments of the present disclosure have been described above with reference to the accompanying drawings, whilst the technical scope of the present disclosure is not limited to the above examples. A person skilled in the art of the present disclosure may find various alterations and modifications within the scope of the appended claims, and it should be understood that they will naturally come under the technical scope of the present disclosure.

For example, the present technology may have a configuration of cloud computing in which a plurality of devices share and process a one function together via a network.

Further, the steps described in the above flowcharts may be executed by a single device or may be shared and executed by a plurality of devices.

Furthermore, when a plurality of processes are included in a single step, the plurality of processes included in the single step may be executed by a single device or may be shared and executed by a plurality of devices.

The image coding devices and the image decoding devices according to the above embodiments can be applied to satellite broadcasting, cable broadcasting such as cable televisions, transmitters or receivers in delivery on the Internet or delivery to terminals by cellular communications, recording devices that record images in a medium such as an optical disk, a magnetic disk, or a flash memory, or various electronic devices such as reproducing devices that reproduce images from a storage medium. 4 application examples will be described below.

<12. Application Examples>
<First Application Example: Television Receiver>

Figure 120:
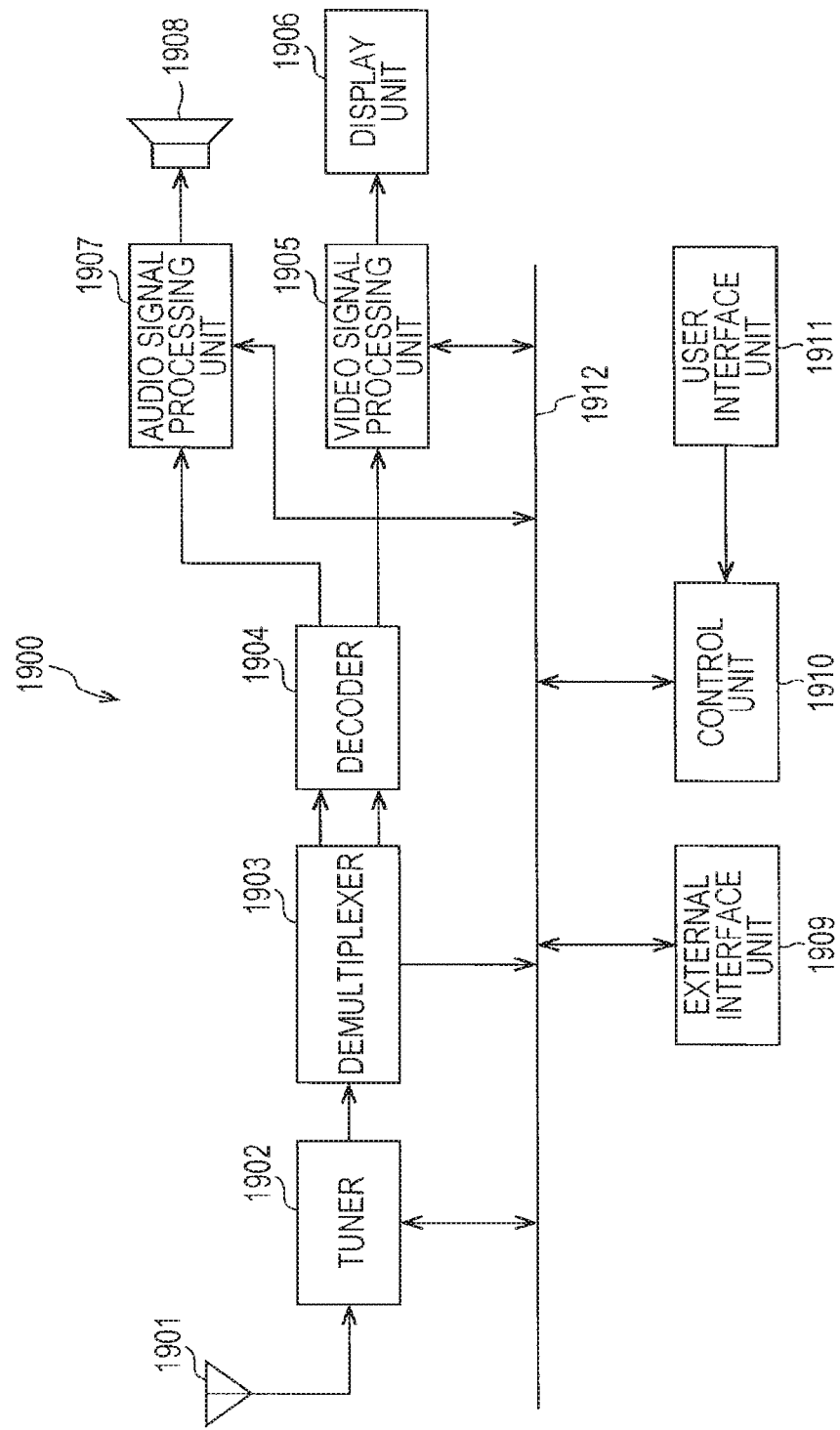
FIG. 120 is a block diagram illustrating an exemplary schematic configuration of a television device.

FIG. 120 illustrates an exemplary schematic configuration of a television device to which the above embodiment is applied. A television device 1900 includes an antenna 1901, a tuner 1902, a demultiplexer 1903, a decoder 1904, a video signal processing unit 1905, a display unit 1906, an audio signal processing unit 1907, a speaker 1908, an external interface 1909, a control unit 1910, a user interface 1911, and a bus 1912.

The tuner 1902 extracts a signal of a desired channel from a broadcast signal received through the antenna 1901, and demodulates an extracted signal. Further, the tuner 1902 outputs an encoded bit stream obtained by the demodulation to the demultiplexer 1903. In other words, the tuner 1902 receives an encoded stream including an encoded image, and serves as a transmitting unit in the television device 1900.

The demultiplexer 1903 demultiplexes a video stream and an audio stream of a program of a viewing target from an encoded bit stream, and outputs each demultiplexed stream to the decoder 1904. Further, the demultiplexer 1903 extracts auxiliary data such as an electronic program guide (EPG) from the encoded bit stream, and supplies the extracted data to the control unit 1910. Further, when the encoded bit stream has been scrambled, the demultiplexer 1903 may perform descrambling.

The decoder 1904 decodes the video stream and the audio stream input from the demultiplexer 1903. The decoder 1904 outputs video data generated by the decoding process to the video signal processing unit 1905. Further, the decoder 1904 outputs audio data generated by the decoding process to the audio signal processing unit 1907.

The video signal processing unit 1905 reproduces the video data input from the decoder 1904, and causes a video to be displayed on the display unit 1906. Further, the video signal processing unit 1905 may causes an application screen supplied via a network to be displayed on the display unit 1906. The video signal processing unit 1905 may perform an additional process such as a noise reduction process on the video data according to a setting. The video signal processing unit 1905 may generate an image of a graphical user interface (GUI) such as a menu, a button, or a cursor and cause the generated image to be superimposed on an output image.

The display unit 1906 is driven by a drive signal supplied from the video signal processing unit 1905, and displays a video or an image on a video plane of a display device (for example, a liquid crystal display, a plasma display, or an organic electroluminescence display (GELD) (an organic EL display)).

The audio signal processing unit 1907 performs a reproduction process such as D/A conversion and amplification on the audio data input from the decoder 1904, and outputs a sound through the speaker 1908. The audio signal processing unit 1907 may perform an additional process such as a noise reduction process on the audio data.

The external interface 1909 is an interface for connecting the television device 1900 with an external device or a network. For example, the video stream or the audio stream received through the external interface 1909 may be decoded by the decoder 1904. In other words, the external interface 1909 also undertakes a transmitting unit of the television device 1900 that receives an encoded stream including an encoded image.

The control unit 1910 includes a processor such as a CPU and a memory such as a RAM or a ROM. For example, the memory stores a program performed by the CPU, program data, EPG data, and data acquired via a network. For example, the program stored in the memory is read and executed by the CPU when the television device 1900 is activated. The CPU executes the program, and controls an operation of the television device 1900, for example, according to an operation signal input from the user interface 1911.

The user interface 1911 is connected with the control unit 1910. For example, the user interface 1911 includes a button and a switch used when the user operates the television device 1900 and a receiving unit receiving a remote control signal. The user interface 1911 detects the user's operation through the components, generates an operation signal, and outputs the generated operation signal to the control unit 1910.

The bus 1912 connects the tuner 1902, the demultiplexer 1903, the decoder 1904, the video signal processing unit 1905, the audio signal processing unit 1907, the external interface 1909, and the control unit 1910 with one another.

In the television device 1900 having the above configuration, the decoder 1904 has the function of the image decoding device according to the above embodiment. Thus, when an image is decoded in the television device 1900, it is possible to suppress an increase in the storage capacity necessary for decoding.

<Second Application Example: Mobile Telephone>

Figure 121:
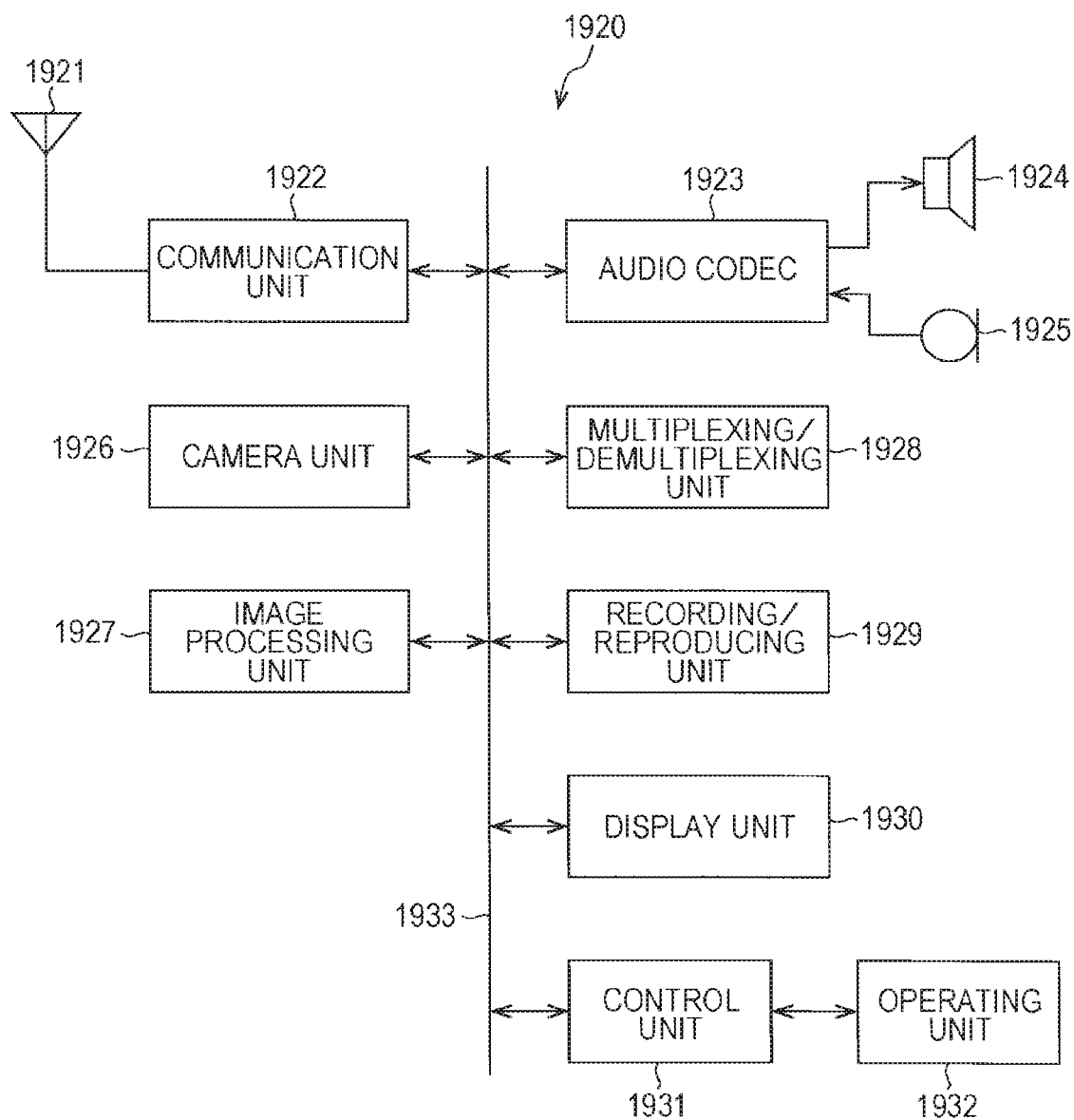
FIG. 121 is a block diagram illustrating an exemplary schematic configuration of a mobile telephone.

FIG. 121 illustrates an exemplary schematic configuration of a mobile telephone to which the above embodiment is applied. A mobile telephone 1920 includes an antenna 1921, a communication unit 1922, an audio codec 1923, a speaker 1924, a microphone 1925, a camera unit 1926, an image processing unit 1927, a multiplexing/demultiplexing 1928, a recording/reproducing unit 1929, a display unit 1930, a control unit 1931, an operating unit 1932, and a bus 1933.

The antenna 1921 is connected to the communication unit 1922. The speaker 1924 and the microphone 1925 are connected to the audio codec 1923. The operating unit 1932 is connected to the control unit 1931. The bus 1933 connects the communication unit 1922, the audio codec 1923, the camera unit 1926, the image processing unit 1927, the multiplexing/demultiplexing 1928, the recording/reproducing unit 1929, the display unit 1930, and the control unit 1931 with one another.

The mobile telephone 1920 performs operations such as transmission and reception of an audio signal, transmission and reception of an electronic mail or image data, image imaging, and data recording in various operation modes such as a voice call mode, a data communication mode, a shooting mode, and a video phone mode.

In the voice call mode, an analog audio signal generated by the microphone 1925 is supplied to the audio codec 1923. The audio codec 1923 converts the analog audio signal into audio data, and performs A/D conversion and compression on the converted audio data. Then, the audio codec 1923 outputs the compressed audio data to the communication unit 1922. The communication unit 1922 encodes and modulates the audio data, and generates a transmission signal. Then, the communication unit 1922 transmits the generated transmission signal to a base station (not illustrated) through the antenna 1921. Further, the communication unit 1922 amplifies a wireless signal received through the antenna 1921, performs frequency transform, and acquires a reception signal. Then, the communication unit 1922 demodulates and decodes the reception signal, generates audio data, and outputs the generated audio data to the audio codec 1923. The audio codec 1923 decompresses the audio data, performs D/A conversion, and generates an analog audio signal. Then, the audio codec 1923 supplies the generated audio signal to the speaker 1924 so that a sound is output.

Further, in the data communication mode, for example, the control unit 1931 generates text data configuring an electronic mail according to the user's operation performed through the operating unit 1932. The control unit 1931 causes a text to be displayed on the display unit 1930. The control unit 1931 generates electronic mail data according to a transmission instruction given from the user through the operating unit 1932, and outputs the generated electronic mail data to the communication unit 1922. The communication unit 1922 encodes and modulates the electronic mail data, and generates a transmission signal. Then, the communication unit 1922 transmits the generated transmission signal to base station (not illustrated) through the antenna 1921. Further, the communication unit 1922 amplifies a wireless signal received through the antenna 1921, performs frequency transform, and acquires a reception signal. Then, the communication unit 1922 demodulates and decodes the reception signal, restores electronic mail data, and outputs the restored electronic mail data to the control unit 1931. The control unit 1931 causes content of the electronic mail to be displayed on the display unit 1930, and stores the electronic mail data in a storage medium of the recording/reproducing unit 1929.

The recording/reproducing unit 1929 includes an arbitrary readable/writable storage medium. For example, the storage medium may be a built-in storage medium such as a RAM or a flash memory or a removable storage medium such as a hard disk, a magnetic disk, a magneto optical disk, an optical disk, an unallocated space bitmap (USB) memory, or a memory card.

In the shooting mode, for example, the camera unit 1926 images a subject, generates image data, and outputs the generated image data to the image processing unit 1927. The image processing unit 1927 encodes the image data input from the camera unit 1926, and stores the encoded stream in a storage medium of the storing/reproducing unit 1929.

In the video phone mode, for example, the multiplexing/demultiplexing 1928 multiplexes the video stream encoded by the image processing unit 1927 and the audio stream input from the audio codec 1923, and outputs the multiplexed stream to the communication unit 1922. The communication unit 1922 encodes and modulates the stream, and generates a transmission signal. Then, the communication unit 1922 transmits the generated transmission signal to a base station (not illustrated) through the antenna 1921. Further, the communication unit 1922 amplifies a wireless signal received through the antenna 1921, performs frequency transform, and acquires a reception signal. The transmission signal and the reception signal may include an encoded bit stream. Then, the communication unit 1922 demodulates and decodes the reception signal, and restores a stream, and outputs the restored stream to the multiplexing/demultiplexing 1928. The multiplexing/demultiplexing 1928 demultiplexes a video stream and an audio stream from the input stream, and outputs the video stream and the audio stream to the image processing unit 1927 and the audio codec 1923, respectively. The image processing unit 1927 decodes the video stream, and generates video data. The video data is supplied to the display unit 1930, and a series of images are displayed by the display unit 1930. The audio codec 1923 decompresses the audio stream, performs D/A conversion, and generates an analog audio signal. Then, the audio codec 1923 supplies the generated audio signal to the speaker 1924 so that a sound is output.

In the mobile telephone 1920 having the above configuration, the image processing unit 1927 has the functions of the image coding device and the image decoding device according to the above embodiment. Thus, when the mobile telephone 1920 encodes and decodes an image, it is possible to suppress an increase in a storage capacity necessary for encoding and decoding.

<Third Application Example: Recording/Reproducing Device>

Figure 122:
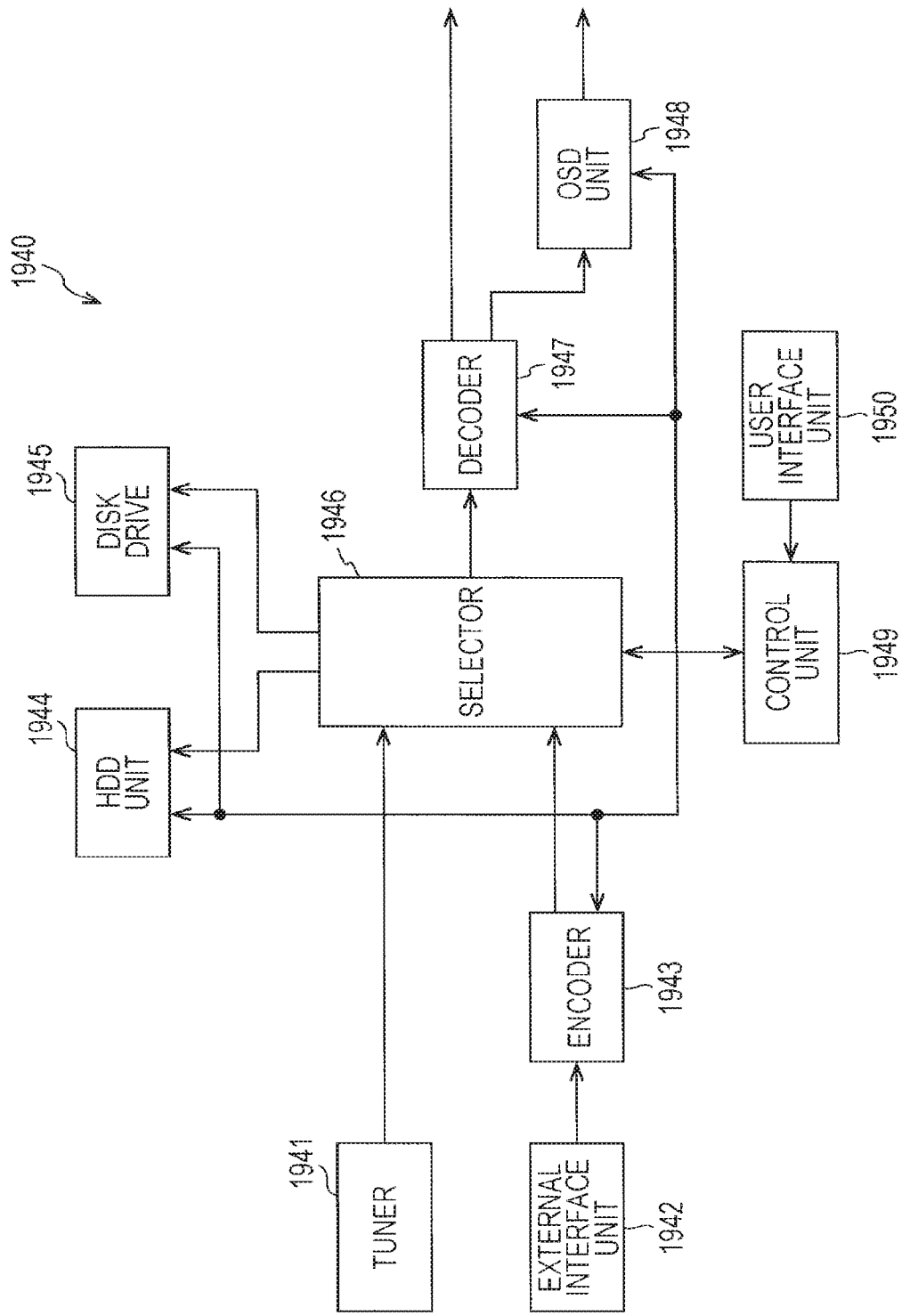
FIG. 122 is a block diagram illustrating an exemplary schematic configuration of a recording/reproducing device.

FIG. 122 illustrates an exemplary schematic configuration of a recording/reproducing device to which the above embodiment is applied. For example, a recording/reproducing device 1940 encodes audio data and video data of a received broadcast program, and stores the encoded data in a recording medium. For example, the recording/reproducing device 1940 may encode audio data and video data acquired from another device and record the encoded data in a recording medium. For example, the recording/reproducing device 1940 reproduces data recorded in a recording medium through a monitor and a speaker according to the user's instruction. At this time, the recording/reproducing device 1940 decodes the audio data and the video data.

The recording/reproducing device 1940 includes a tuner 1941, an external interface 1942, an encoder 1943, a hard disk drive (HDD) 1944, a disk drive 1945, a selector 1946, a decoder 1947, an on-screen display (OSD) 1948, a control unit 1949, and a user interface 1950.

The tuner 1941 extracts of a signal of a desired channel from a broadcast signal received through an antenna (not illustrated), and demodulates the extracted signal. Then, the tuner 1941 outputs an encoded bit stream obtained by the demodulation to the selector 1946. In other words, the tuner 1941 undertakes a transmitting unit in the recording/reproducing device 1940.

The external interface 1942 is an interface for connecting the recording/reproducing device 1940 with an external device or a network. For example, the external interface 1942 may be an IEEE1394 interface, a network interface, a USB interface, or a flash memory interface. For example, video data and audio data received via the external interface 1942 are input to the encoder 1943. In other words, the external interface 1942 undertakes a transmitting unit in the recording/reproducing device 1940.

When video data and audio data input from the external interface 1942 are not encoded, the encoder 1943 encodes the video data and the audio data. Then, the encoder 1943 outputs an encoded bit stream to the selector 1946.

The HDD 1944 records an encoded bit stream in which content data such as a video or a sound is compressed, various kinds of programs, and other data in an internal hard disk. The HDD 1944 reads the data from the hard disk when a video or a sound is reproduced.

The disk drive 1945 records or reads data in or from amounted recording medium. For example, the recording medium mounted in the disk drive 1945 may be a DVD disk (DVD-Video, DVD-RAM, DVD-R, DVD-RW, DVD+R, DVD+RW, or the like), a Blu-ray (a registered trademark) disk, or the like.

When a video or a sound is recorded, the selector 1946 selects an encoded bit stream input from the tuner 1941 or the encoder 1943, and outputs the selected encoded bit stream to the HDD 1944 or the disk drive 1945. Further, when a video or a sound is reproduced, the selector 1946 outputs an encoded bit stream input from the HDD 1944 or the disk drive 1945 to the decoder 1947.

The decoder 1947 decodes the encoded bit stream, and generates video data and audio data. Then, the decoder 1947 outputs the generated video data to the OSD 1948. The decoder 1904 outputs the generated audio data to an external speaker.

The OSD 1948 reproduces the video data input from the decoder 1947, and displays a video. For example, the OSD 1948 may cause an image of a GUI such as a menu, a button, or a cursor to be superimposed on a displayed video.

The control unit 1949 includes a processor such as a CPU and a memory such as a RAM or a ROM. The memory stores a program executed by the CPU, program data, and the like. For example, the program stored in the memory is read and executed by the CPU when the recording/reproducing device 1940 is activated. The CPU executes the program, and controls an operation of the recording/reproducing device 1940, for example, according to an operation signal input from the user interface 1950.

The user interface 1950 is connected with the control unit 1949. For example, the user interface 1950 includes a button and a switch used when the user operates the recording/reproducing device 1940 and a receiving unit receiving a remote control signal. The user interface 1950 detects the user's operation through the components, generates an operation signal, and outputs the generated operation signal to the control unit 1949.

In the recording/reproducing device 1940 having the above configuration, the encoder 1943 has the function of the image coding device according to the above embodiment. The decoder 1947 has the function of the image decoding device according to the above embodiment. Thus, when the recording/reproducing device 1940 encodes and decodes an image, it is possible to suppress an increase in a storage capacity necessary for encoding and decoding.

<Fourth Application Example: Imaging Device>

Figure 123:
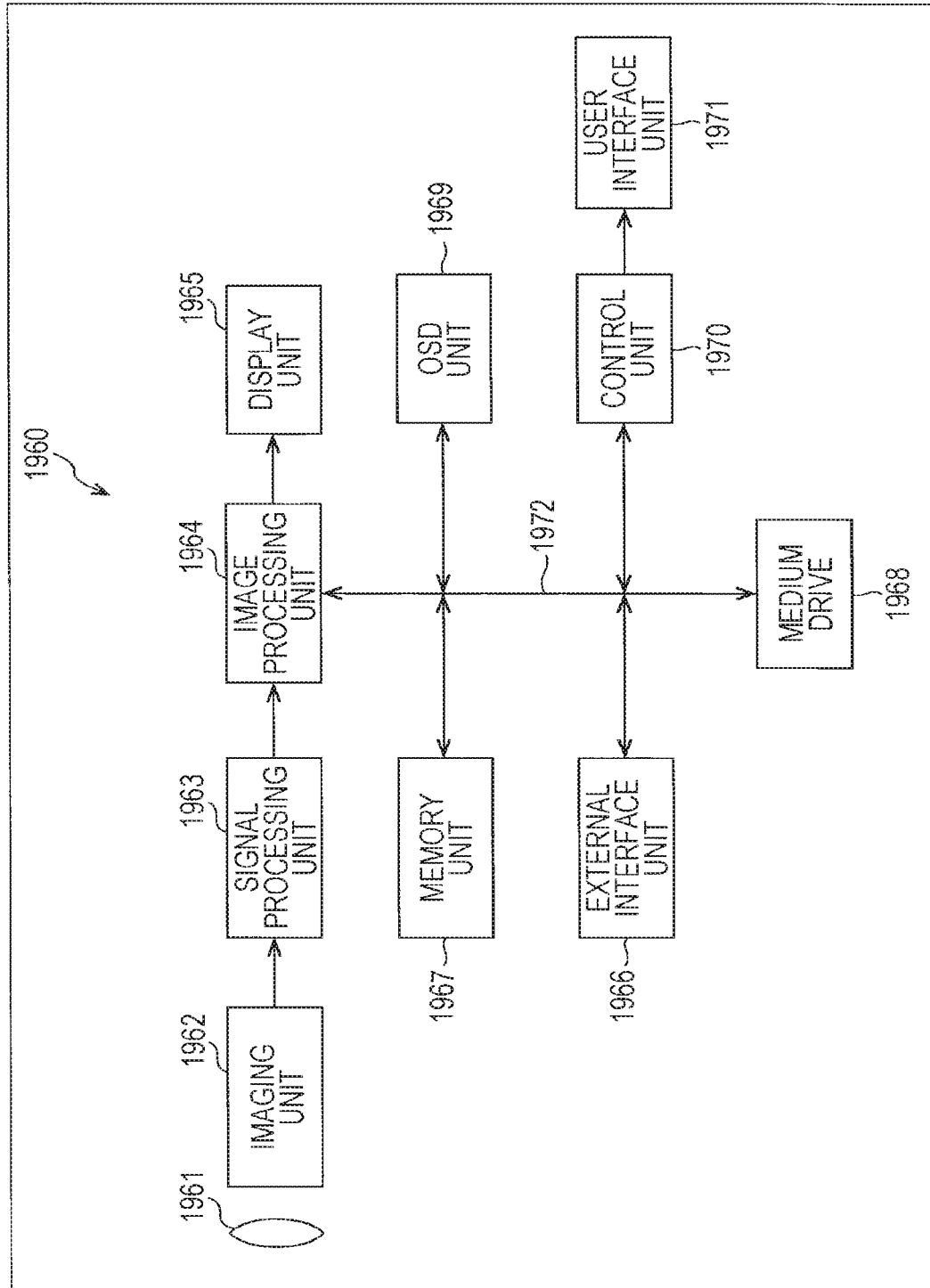
FIG. 123 is a block diagram illustrating an exemplary schematic configuration of an imaging device.

FIG. 123 illustrates an exemplary schematic configuration of an imaging device to which the above embodiment is applied. An imaging device 1960 images a subject, generates an image, encodes image data, and records the image data in a recording medium.

The imaging device 1960 includes an optical block 1961, an imaging unit 1962, a signal processing unit 1963, an image processing unit 1964, a display unit 1965, an external interface 1966, a memory 1967, a medium drive 1968, an OSD 1969, a control unit 1970, a user interface 1971, and a bus 1972.

The optical block 1961 is connected to the imaging unit 1962. The imaging unit 1962 is connected to the signal processing unit 1963. The display unit 1965 is connected to the image processing unit 1964. The user interface 1971 is connected to the control unit 1970. The bus 1972 connects the image processing unit 1964, the external interface 1966, the memory 1967, the medium drive 1968, the OSD 1969, and the control unit 1970 with one another.

The optical block 1961 includes a focus lens, a diaphragm mechanism, and the like. The optical block 1961 forms an optical image of a subject on an imaging plane of the imaging unit 1962. The imaging unit 1962 includes a CCD (charge coupled device) image sensor or a CMOS (complementary metal oxide semiconductor) image sensor, or the like, and converts the optical image formed on the imaging plane into an image signal serving as an electric signal by photoelectric conversion. Then, the imaging unit 1962 outputs the image signal to the signal processing unit 1963.

The signal processing unit 1963 performs various kinds of camera signal processes such as knee correction, gamma correction, and color correction on the image signal input from the imaging unit 1962. The signal processing unit 1963 outputs the image data that has been subjected to the camera signal processes to the image processing unit 1964.

The image processing unit 1964 encodes the image data input from the signal processing unit 1963, and generates encoded data. Then, the image processing unit 1964 outputs the generated encoded data to the external interface 1966 or the medium drive 1968. Further, the image processing unit 1964 decodes encoded data input from the external interface 1966 or the medium drive 1968, and generates image data. Then, the image processing unit 1964 outputs the generated image data to the display unit 1965. The image processing unit 1964 may output the image data input from the signal processing unit 1963 to the display unit 1965 so that an image is displayed. The image processing unit 1964 may cause display data acquired from the OSD 1969 to be superimposed on an image output to the display unit 1965.

The OSD 1969 generates an image of a GUI such as a menu, a button, or a cursor, and outputs the generated image to the image processing unit 1964.

For example, the external interface 1966 is configured as an USB I/O terminal. For example, the external interface 1966 connects the imaging device 1960 with a printer when an image is printed. Further, a drive is connected to the external interface 1966 as necessary. For example, a removable medium such as a magnetic disk or an optical disk may be mounted as the drive, and a program read from the removable medium may be installed in the imaging device 1960. Further, the external interface 1966 may be configured as a network interface connected to a network such as an LAN or the Internet. In other words, the external interface 1966 undertakes a transmitting unit in the imaging device 1960.

The recording medium mounted in the medium drive 1968 may be an arbitrary readable/writable removable medium such as a magnetic disk, a magneto optical disk, an optical disk, or a semiconductor memory. Further, a recording medium may be fixedly mounted in the medium drive 1968, and for example, a non-transitory storage unit such as a built-in hard disk drive or a solid state drive (SSD) may be configured.

The control unit 1970 includes a processor such as a CPU and a memory such as a RAM or a ROM. For example, the memory stores a program performed by the CPU, program data, and the like. For example, the program stored in the memory is read and executed by the CPU when the imaging device 1960 is activated. The CPU executes the program, and controls an operation of the imaging device 1960, for example, according to an operation signal input from the user interface 1971.

The user interface 1971 is connected with the control unit 1970. For example, the user interface 1971 includes a button, a switch, or the like which is used when the user operates the imaging device 1960. The user interface 1971 detects the user's operation through the components, generates an operation signal, and outputs the generated operation signal to the control unit 1970.

In the imaging device 1960 having the above configuration, the image processing unit 1964 has the functions of the image coding device and the image decoding device according to the above embodiment. Thus, when the imaging device 1960 encodes and decodes an image, it is possible to suppress an increase in a storage capacity necessary for encoding and decoding.

<13. Application Examples of Scalable Coding>
<First System>

Next, concrete application examples of scalable encoded data generated by scalable coding will be described. The scalable coding is used for selection of data to be transmitted, for example, as illustrated in FIG. 124.

Figure 124:
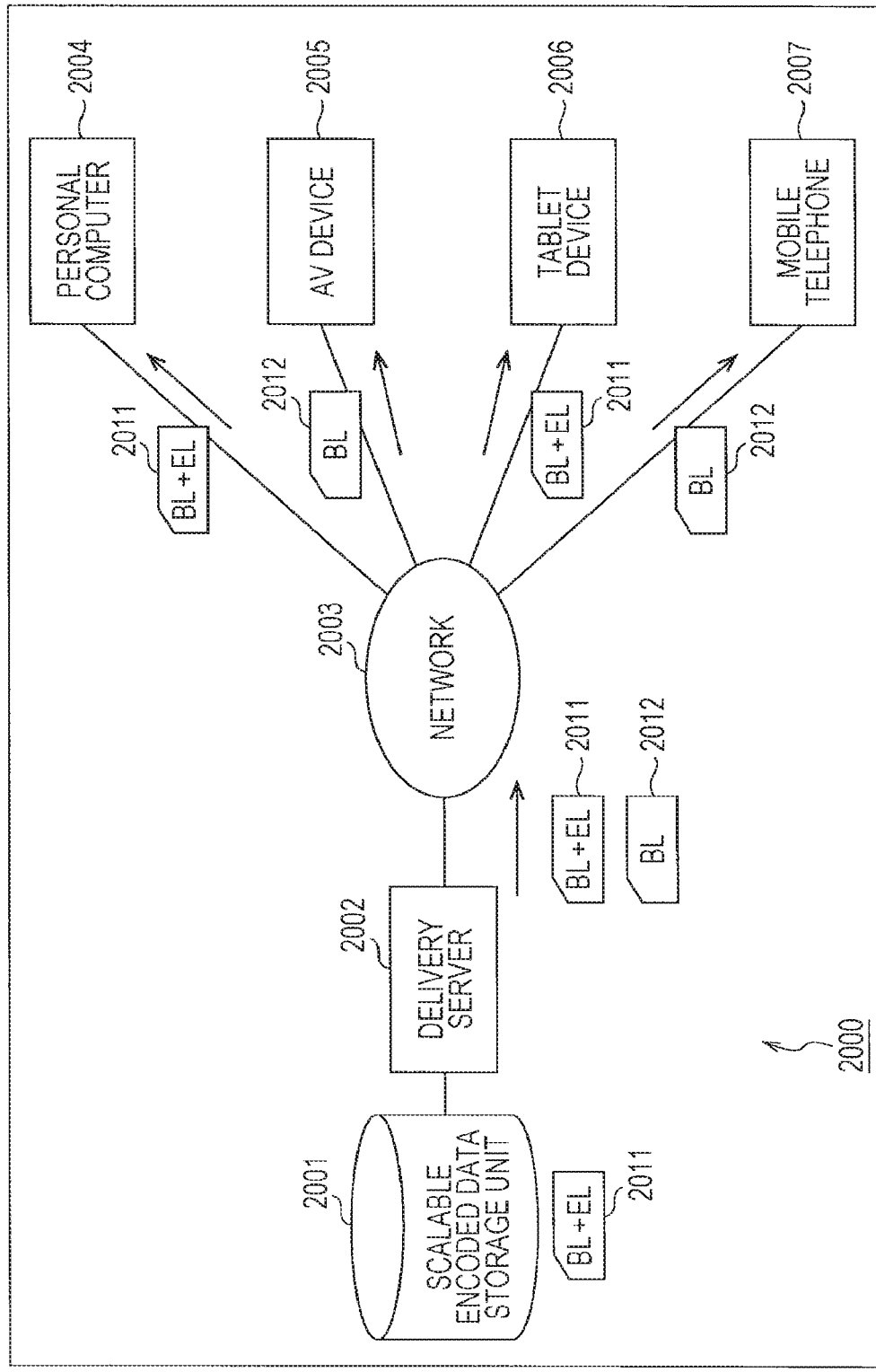
FIG. 124 is a block diagram illustrating a utilization example of scalable coding.

In a data transmission system 2000 illustrated in FIG. 124, a delivery server 2002 reads scalable encoded data stored in a scalable encoded data storage unit 2001, and delivers the scalable encoded data to terminal devices such as a personal computer 2004, an AV device 2005, a tablet device 2006, and a mobile telephone 2007 via a network 2003.

At this time, the delivery server 2002 selects an appropriate high-quality encoded data according to the capabilities of the terminal devices, a communication environment, or the like, and transmits the selected high-quality encoded data. Although the delivery server 2002 transmits unnecessarily high-quality data, the terminal devices do not necessarily obtain a high-quality image, and a delay or an overflow may occur. Further, a communication band may be unnecessarily occupied, and a load of a terminal device may be unnecessarily increased. On the other hand, although the delivery server 2002 transmits unnecessarily low-quality data, the terminal devices are unlikely to obtain an image of a sufficient quality. Thus, the delivery server 2002 reads scalable encoded data stored in the scalable encoded data storage unit 2001 as encoded data of a quality appropriate for the capability of the terminal device or a communication environment, and then transmits the read data.

For example, the scalable encoded data storage unit 2001 is assumed to store scalable encoded data (BL+EL) 2011 that is encoded by the scalable coding. The scalable encoded data (BL+EL) 2011 is encoded data including both of a base layer and an enhancement layer, and both an image of the base layer and an image of the enhancement layer can be obtained by decoding the scalable encoded data (BL+EL) 2011.

The delivery server 2002 selects an appropriate layer according to the capability of a terminal device to which data is transmitted, a communication environment, or the like, and reads data of the selected layer. For example, for the personal computer 2004 or the tablet device 2006 having a high processing capability, the delivery server 2002 reads the high-quality scalable encoded data (BL+EL) 2011 from the scalable encoded data storage unit 2001, and transmits the scalable encoded data (BL+EL) 2011 without change. On the other hand, for example, for the AV device 2005 or the mobile telephone 2007 having a low processing capability, the delivery server 2002 extracts data of the base layer from the scalable encoded data (BL+EL) 2011, and transmits a scalable encoded data (BL) 2012 that is data of the same content as the scalable encoded data (BL+EL) 2011 but lower in quality than the scalable encoded data (BL+EL) 2011.

As described above, an amount of data can be easily adjusted using scalable encoded data, and thus it is possible to prevent the occurrence of a delay or an overflow and prevent a load of a terminal device or a communication medium from being unnecessarily increased. Further, the scalable encoded data (BL+EL) 2011 is reduced in redundancy between layers, and thus it is possible to reduce an amount of data to be smaller than when individual data is used as encoded data of each layer. Thus, it is possible to more efficiently use a memory area of the scalable encoded data storage unit 2001.

Further, various devices such as the personal computer 2004 to the mobile telephone 2007 can be applied as the terminal device, and thus the hardware performance of the terminal devices differ according to each device. Further, since various applications can be executed by the terminal devices, software has various capabilities. Furthermore, all communication line networks including either or both of a wired network and a wireless network such as the Internet or an Local Area Network (LAN), can be applied as the network 2003 serving as a communication medium, and thus various data transmission capabilities are provided. In addition, a change may be made by another communication or the like.

In this regard, the delivery server 2002 may be configured to perform communication with a terminal device serving as a transmission destination of data before starting data transmission and obtain information related to a capability of a terminal device such as hardware performance of a terminal device or a performance of an application (software) executed by a terminal device and information related to a communication environment such as an available bandwidth of the network 2003. Then, the delivery server 2002 may select an appropriate layer based on the obtained information.

Further, the extraction of the layer may be performed in a terminal device. For example, the personal computer 2004 may decode the transmitted scalable encoded data (BL+EL) 2011 and display the image of the base layer or the image of the enhancement layer. Further, for example, the personal computer 2004 may extract the scalable encoded data (BL) 2012 of the base layer from the transmitted scalable encoded data (BL+EL) 2011, store the scalable encoded data (BL) 2012 of the base layer, transfer the scalable encoded data (BL) 2012 of the base layer to another device, decode the scalable encoded data (BL) 2012 of the base layer, and display the image of the base layer.

Of course, the number of the scalable encoded data storage units 2001, the number of the delivery servers 2002, the number of the networks 2003, and the number of terminal devices are arbitrary. The above description has been made in connection with the example in which the delivery server 2002 transmits data to the terminal devices, but the application example is not limited to this example. The data transmission system 2000 can be applied to any system in which when encoded data generated by the scalable coding is transmitted to a terminal device, an appropriate layer is selected according to a capability of a terminal devices or a communication environment, and the encoded data is transmitted.

In the data transmission system 2000, the present technology is applied, similarly to the application to the scalable coding and the scalable decoding described in the fourth to eighth embodiments, and thus the same effects as the effects described in the fourth to eighth embodiments can be obtained.

<Second System>

Figure 125:
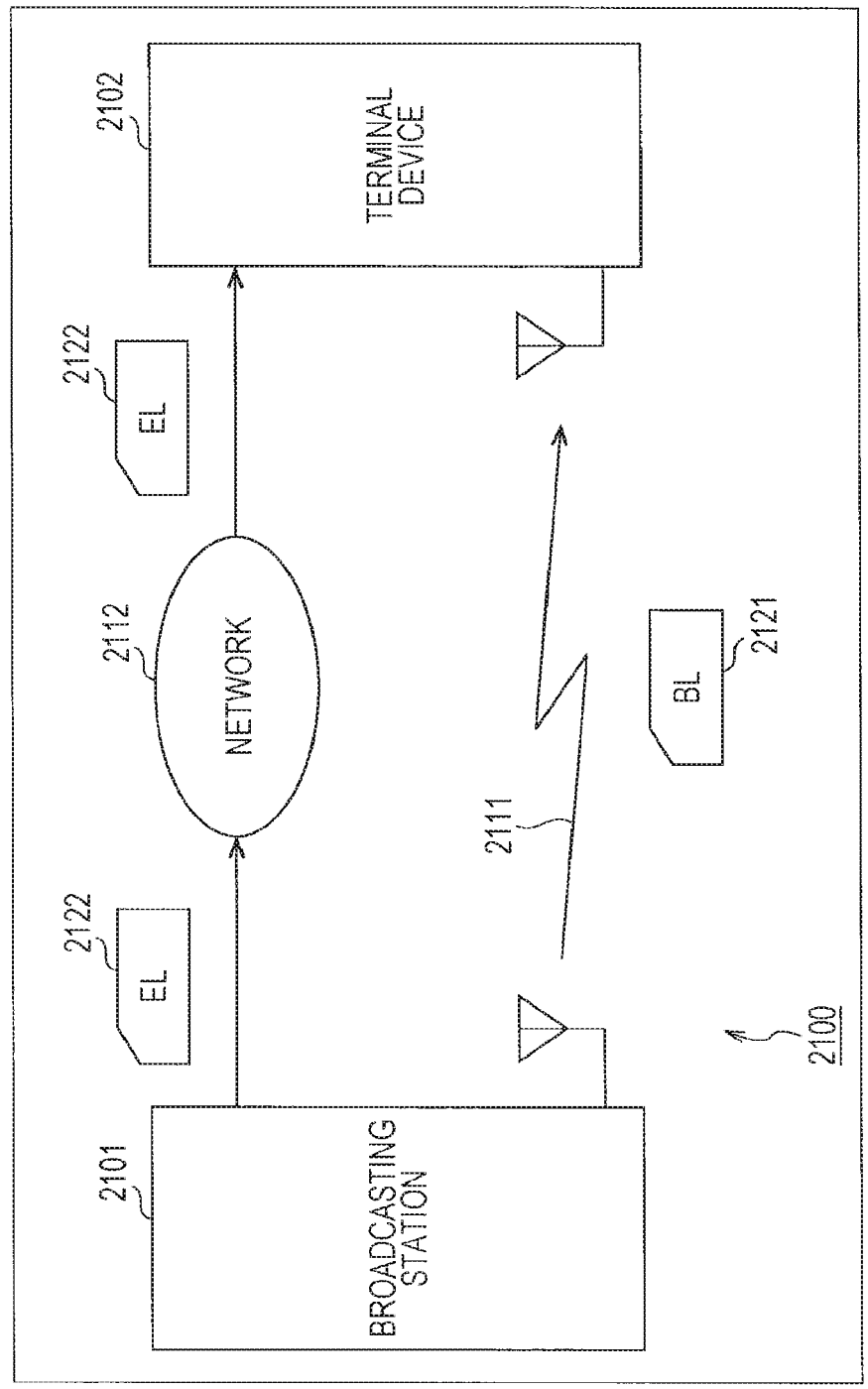
FIG. 125 is a block diagram illustrating another utilization example of scalable coding.

The scalable coding is used for transmission using a plurality of communication media, for example, as illustrated in FIG. 125.

In a data transmission system 2100 illustrated in FIG. 125, a broadcasting station 2101 transmits scalable encoded data (BL) 2121 of a base layer through terrestrial broadcasting 2111. Further, the broadcasting station 2101 transmits scalable encoded data (EL) 2122 of an enhancement layer (for example, packetizes the scalable encoded data (EL) 2122 and then transmits resultant packets) via an arbitrary network 2112 configured with a communication network including either or both of a wired network and a wireless network.

A terminal device 2102 has a reception function of receiving the terrestrial broadcasting 2111 broadcast by the broadcasting station 2101, and receives the scalable encoded data (BL) 2121 of the base layer transmitted through the terrestrial broadcasting 2111. The terminal device 2102 further has a communication function of performing communication via the network 2112, and receives the scalable encoded data (EL) 2122 of the enhancement layer transmitted via the network 2112.

The terminal device 2102 decodes the scalable encoded data (BL) 2121 of the base layer acquired through the terrestrial broadcasting 2111, for example, according to the user's instruction or the like, obtains the image of the base layer, stores the obtained image, and transmits the obtained image to another device.

Further, the terminal device 2102 combines the scalable encoded data (BL) 2121 of the base layer acquired through the terrestrial broadcasting 2111 with the scalable encoded data (EL) 2122 of the enhancement layer acquired through the network 2112, for example, according to the user's instruction or the like, obtains the scalable encoded data (BL+EL), decodes the scalable encoded data (BL+EL) to obtain the image of the enhancement layer, stores the obtained image, and transmits the obtained image to another device.

As described above, it is possible to transmit scalable encoded data of respective layers, for example, through different communication media. Thus, it is possible to distribute a load, and it is possible to prevent the occurrence of a delay or an overflow.

Further, it is possible to select a communication medium used for transmission for each layer according to the situation. For example, the scalable encoded data (BL) 2121 of the base layer having a relative large amount of data may be transmitted through a communication medium having a large bandwidth, and the scalable encoded data (EL) 2122 of the enhancement layer having a relative small amount of data may be transmitted through a communication medium having a small bandwidth. Further, for example, a communication medium for transmitting the scalable encoded data (EL) 2122 of the enhancement layer may be switched between the network 2112 and the terrestrial broadcasting 2111 according to an available bandwidth of the network 2112. Of course, the same applies to data of an arbitrary layer.

As control is performed as described above, it is possible to further suppress an increase in a load in data transmission.

Of course, the number of layers is an arbitrary, and the number of communication media used for transmission is also arbitrary. Further, the number of the terminal devices 2102 serving as a data delivery destination is also arbitrary. The above description has been described in connection with the example of broadcasting from the broadcasting station 2101, and the application example is not limited to this example. The data transmission system 2100 can be applied to any system in which encoded data generated by the scalable coding is divided into two or more in units of layers and transmitted through a plurality of lines.

In the data transmission system 2100, the present technology is applied, similarly to the application to the scalable coding and the scalable decoding described in the fourth to eighth embodiments, and thus the same effects as the effects described in the fourth to eighth embodiments can be obtained.

<Third System>

Figure 126:
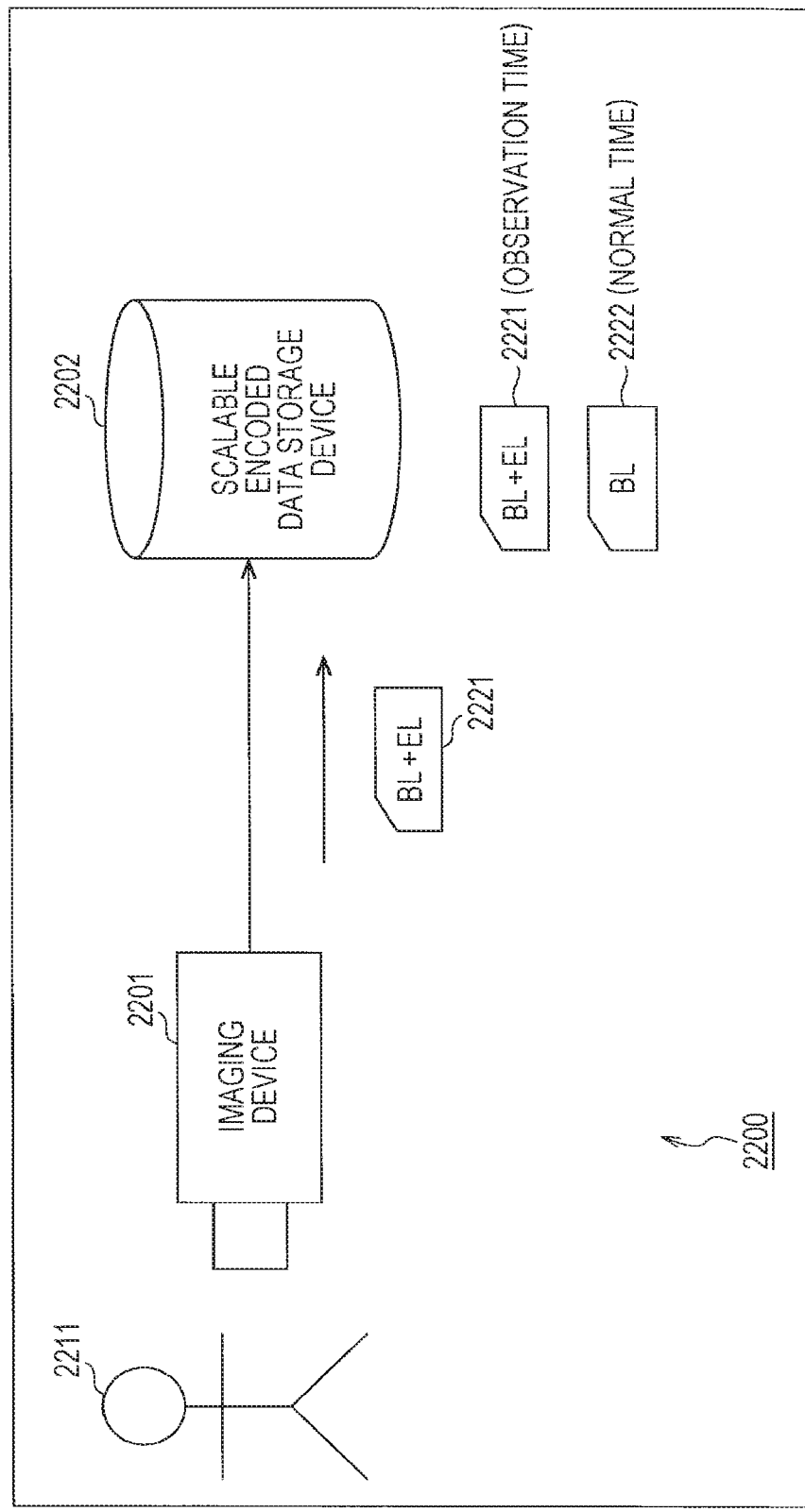
FIG. 126 is a block diagram illustrating still another utilization example of scalable coding.

The scalable coding is used for storage of encoded data, for example, as illustrated in FIG. 126.

In an imaging system 2200 illustrated in FIG. 126, an imaging device 2201 performs scalable coding on image data obtained by imaging a subject 2211, and provides scalable encoded data (BL+EL) 2221 to a scalable encoded data storage device 2202.

The scalable encoded data storage device 2202 stores the scalable encoded data (BL+EL) 2221 provided from the imaging device 2201 in a quality according to the situation. For example, during a normal time, the scalable encoded data storage device 2202 extracts data of the base layer from the scalable encoded data (BL+EL) 2221, and stores the extracted data as scalable encoded data (BL) 2222 of the base layer having a small amount of data in a low quality. On the other hand, for example, during an observation time, the scalable encoded data storage device 2202 stores the scalable encoded data (BL+EL) 2221 having a large amount of data in a high quality without change.

Accordingly, the scalable encoded data storage device 2202 can store an image in a high quality only when necessary, and thus it is possible to suppress an increase in an amount of data and improve use efficiency of a memory area while suppressing a reduction in a value of an image caused by quality deterioration.

For example, the imaging device 2201 is assumed to be a monitoring camera. When a monitoring target (for example, an intruder) is not shown on a photographed image (during a normal time), content of the photographed image is likely to be inconsequential, and thus a reduction in an amount of data is prioritized, and image data (scalable encoded data) is stored in a low quality. On the other hand, when a monitoring target is shown on a photographed image as the subject 2211 (during an observation time), content of the photographed image is likely to be consequential, and thus an image quality is prioritized, and image data (scalable encoded data) is stored in a high quality.

It may be determined whether it is the normal time or the observation time, for example, by analyzing an image through the scalable encoded data storage device 2202. Further, the imaging device 2201 may perform the determination and transmit the determination result to the scalable encoded data storage device 2202.

Further, a determination criterion as to whether it is the normal time or the observation time is arbitrary, and content of an image serving as the determination criterion is arbitrary. Of course, a condition other than content of an image may be a determination criterion. For example, switching may be performed according to the magnitude or a waveform of a recorded sound, switching may be performed at certain time intervals, or switching may be performed according an external instruction such as the user's instruction.

The above description has been described in connection with the example in which switching is performed between two states of the normal time and the observation time, but the number of states is arbitrary. For example, switching may be performed among three or more states such as a normal time, a low-level observation time, an observation time, a high-level observation time, and the like. Here, an upper limit number of states to be switched depends on the number of layers of scalable encoded data.

Further, the imaging device 2201 may decide the number of layers for the scalable coding according to a state. For example, during the normal time, the imaging device 2201 may generate the scalable encoded data (BL) 2222 of the base layer having a small amount of data in a low quality and provide the scalable encoded data (BL) 2222 of the base layer to the scalable encoded data storage device 2202. Further, for example, during the observation time, the imaging device 2201 may generate the scalable encoded data (BL+EL) 2221 of the base layer having a large amount of data in a high quality and provide the scalable encoded data (BL+EL) 2221 of the base layer to the scalable encoded data storage device 2202.

The above description has been made in connection with the example of a monitoring camera, but the purpose of the imaging system 2200 is arbitrary and not limited to a monitoring camera.

In the imaging system 2200, the present technology is applied, similarly to the application to the scalable coding and the scalable decoding described in the fourth to eighth embodiments, and thus the same effects as the effects described in the fourth to eighth embodiments can be obtained.

<14. Set Unit Module Processo>
<Other Embodiments>

The above embodiments have been described in connection with the example of the device, the system, or the like according to the present technology, but the present technology is not limited to the above examples and may be implemented as any component mounted in the device or the device configuring the system, for example, a processor serving as a system (large scale integration) LSI or the like, a module using a plurality of processors or the like, a unit using a plurality of modules or the like, a set (that is, some components of the device) in which any other function is further added to a unit, or the like.

<Video Set>

Figure 127:
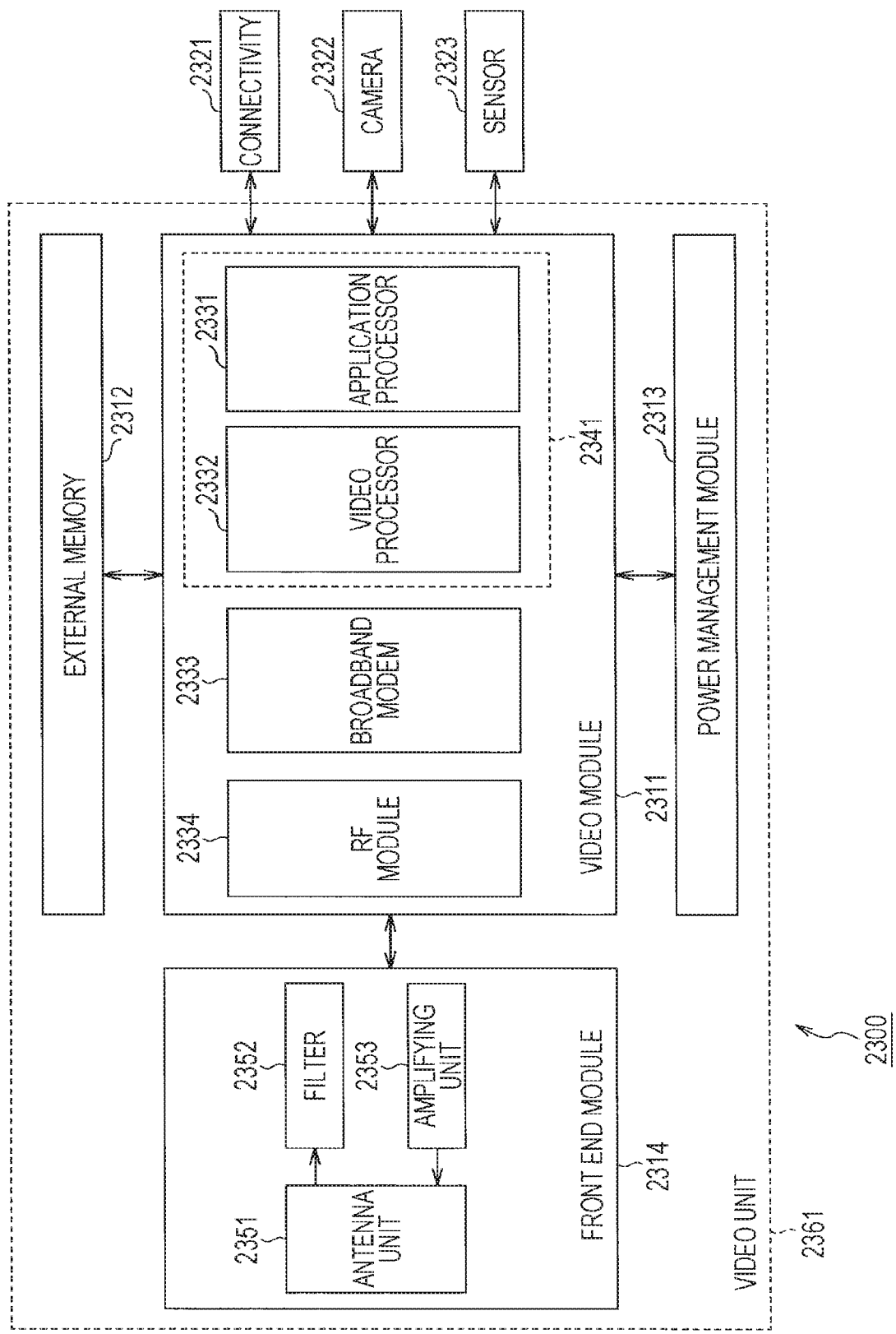
FIG. 127 is a block diagram illustrating an exemplary schematic configuration of a video set.

An example in which the present technology is implemented as a set will be described with reference to FIG. 127. FIG. 127 illustrates an exemplary schematic configuration of a video set to which the present technology is applied.

In recent years, functions of electronic devices have become diverse, and when some components are implemented as sale, provision, or the like in development or manufacturing, there are many cases in which a plurality of components having relevant functions are combined and implemented as a set having a plurality of functions as well as cases in which an implementation is performed as a component having a single function.

A video set 2300 illustrated in FIG. 127 is a multi-functionalized configuration in which a device having a function related to image encoding and/or image decoding is combined with a device having any other function related to the function.

The video set 2300 includes a module group such as a video module 2311, an external memory 2312, a power management module 2313, and a front end module 2314 and a device having relevant functions such as a connectivity 2321, a camera 2322, and a sensor 2323 as illustrated in FIG. 127.

A module is a part having multiple functions into which several relevant part functions are integrated. A concrete physical configuration is arbitrary, but, for example, it is configured such that a plurality of processes having respective functions, electronic circuit elements such as a resistor and a capacitor, and other devices are arranged and integrated on a wiring substrate. Further, a new module may be obtained by combining another module or a processor with a module.

In the case of the example of FIG. 127, the video module 2311 is a combination of components having functions related to image processing, and includes an application processor, a video processor, a broadband modem 2333, and a radio frequency (RF) module 2334.

A processor is one in which a configuration having a certain function is integrated into a semiconductor chip through System On a Chip (SoC), and also refers to, for example, a system Large Scale Integration (LSI) or the like. The configuration having the certain function may be a logic circuit (hardware configuration), may be a CPU, a ROM, a RAM, and a program (software configuration) executed using the CPU, the ROM, and the RAM, and may be a combination of a hardware configuration and a software configuration. For example, a processor may include a logic circuit, a CPU, a ROM, a RAM, and the like, some functions may be implemented through the logic circuit (hardware component), and the other functions may be implemented through a program (software component) executed by the CPU.

The application processor 2331 of FIG. 127 is a processor that executes an application related to image processing. An application executed by the application processor 2331 can not only perform a calculation process but also control components inside and outside the video module 2311 such as the video processor 2332 as necessary in order to implement a certain function.

The video processor 2332 is a process having a function related to image encoding and/or image decoding.

The broadband modem 2333 performs digital modulation on data (digital signal) to be transmitted through wired and/or wireless broadband communication that is performed via broadband line such as the Internet or a public telephone line network and converts the data into an analog signal, or performs demodulation on an analog signal received through the broadband communication and converts the analog signal into data (a digital signal). For example, the broadband modem 2333 processes arbitrary information such as image data processed by the video processor 2332, a stream including encoded image data, an application program, or setting data.

The RF module 2334 is a module that performs a frequency transform process, a modulation/demodulation process, an amplification process, a filtering process, and the like on a Radio Frequency (RF) signal transceived through an antenna. For example, the RF module 2334 performs, for example, frequency transform on a baseband signal generated by the broadband modem 2333, and generates an RF signal. Further, for example, the RF module 2334 performs, for example, frequency transform on an RF signal received through the front end module 2314, and generates a baseband signal.

Further, a dotted line 2341, that is, the application processor 2331 and the video processor 2332 may be integrated into a single processor as illustrated in FIG. 127.

The external memory 2312 is installed outside the video module 2311, and a module having a storage device used by the video module 2311. The storage device of the external memory 2312 can be implemented by any physical configuration, but is commonly used to store large capacity data such as image data of frame units, and thus it is desirable to implement the storage device of the external memory 2312 using a relative chip large-capacity semiconductor memory such as a dynamic random access memory (DRAM).

The power management module 2313 manages and controls power supply to the video module 2311 (the respective components in the video module 2311).

The front end module 2314 is a module that provides a front end function (a circuit of a transceiving end at an antenna side) to the RF module 2334. The front end module 2314 includes, for example, an antenna unit 2351, a filter 2352, and an amplifying unit 2353 as illustrated in FIG. 127.

The antenna unit 2351 includes an antenna that transceives a radio signal and a peripheral configuration. The antenna unit 2351 transmits a signal provided from the amplifying unit 2353 as a radio signal, and provides a received radio signal to the filter 2352 as an electrical signal (RF signal). The filter 2352 performs, for example, a filtering process on an RF signal received through the antenna unit 2351, and provides a processed RF signal to the RF module 2334. The amplifying unit 2353 amplifies the RF signal provided from the RF module 2334, and provides the amplified RF signal to the antenna unit 2351.

The connectivity 2321 is a module having a function related to a connection with the outside. A physical configuration of the connectivity 2321 is arbitrary. For example, the connectivity 2321 includes a configuration having a communication function other than a communication standard supported by the broadband modem 2333, an external I/O terminal, or the like.

For example, the connectivity 2321 may include a module having a communication function based on a wireless communication standard such as Bluetooth (a registered trademark), IEEE 802.11 (for example, Wireless Fidelity (Wi-Fi) (a registered trademark)), Near Field Communication (NFC), InfraRed Data Association (IrDA), an antenna that transceives a signal satisfying the standard, or the like. Further, for example, the connectivity 2321 may include a module having a communication function based on a wired communication standard such as Universal Serial Bus (USB), or High-Definition Multimedia Interface (HDMI) (a registered trademark) or a terminal that satisfies the standard. Furthermore, for example, the connectivity 2321 may include any other data (signal) transmission function or the like such as an analog I/O terminal.

Further, the connectivity 2321 may include a device of a transmission destination of data (signal). For example, the connectivity 2321 may include a drive (including a hard disk, a Solid State Drive (SSD), a Network Attached Storage (NAS), or the like as well as a drive of a removable medium) that reads/writes data from/in a recording medium such as a magnetic disk, an optical disk, a magneto optical disk, or a semiconductor memory. Furthermore, the connectivity 2321 may include an output device (a monitor, a speaker, or the like) that outputs an image or a sound.

The camera 2322 is a module having a function of photographing a subject and obtaining image data of the subject. For example, image data obtained by the photographing of the camera 2322 is provided to and encoded by the video processor 2332.

The sensor 2323 is a module having an arbitrary sensor function such as a sound sensor, an ultrasonic sensor, an optical sensor, an illuminance sensor, an infrared sensor, an image sensor, a rotation sensor, an angle sensor, an angular velocity sensor, a velocity sensor, an acceleration sensor, an inclination sensor, a magnetic identification sensor, a shock sensor, or a temperature sensor. For example, data detected by the sensor 2323 is provided to the application processor 2331 and used by an application or the like.

A configuration described above as a module may be implemented as a processor, and a configuration described as a processor may be implemented as a module.

In the video set 2300 having the above configuration, the present technology can be applied to the video processor 2332 as will be described later. Thus, the video set 2300 can be implemented as a set to which the present technology is applied.

<Exemplary Configuration of Video Processor>

Figure 128:
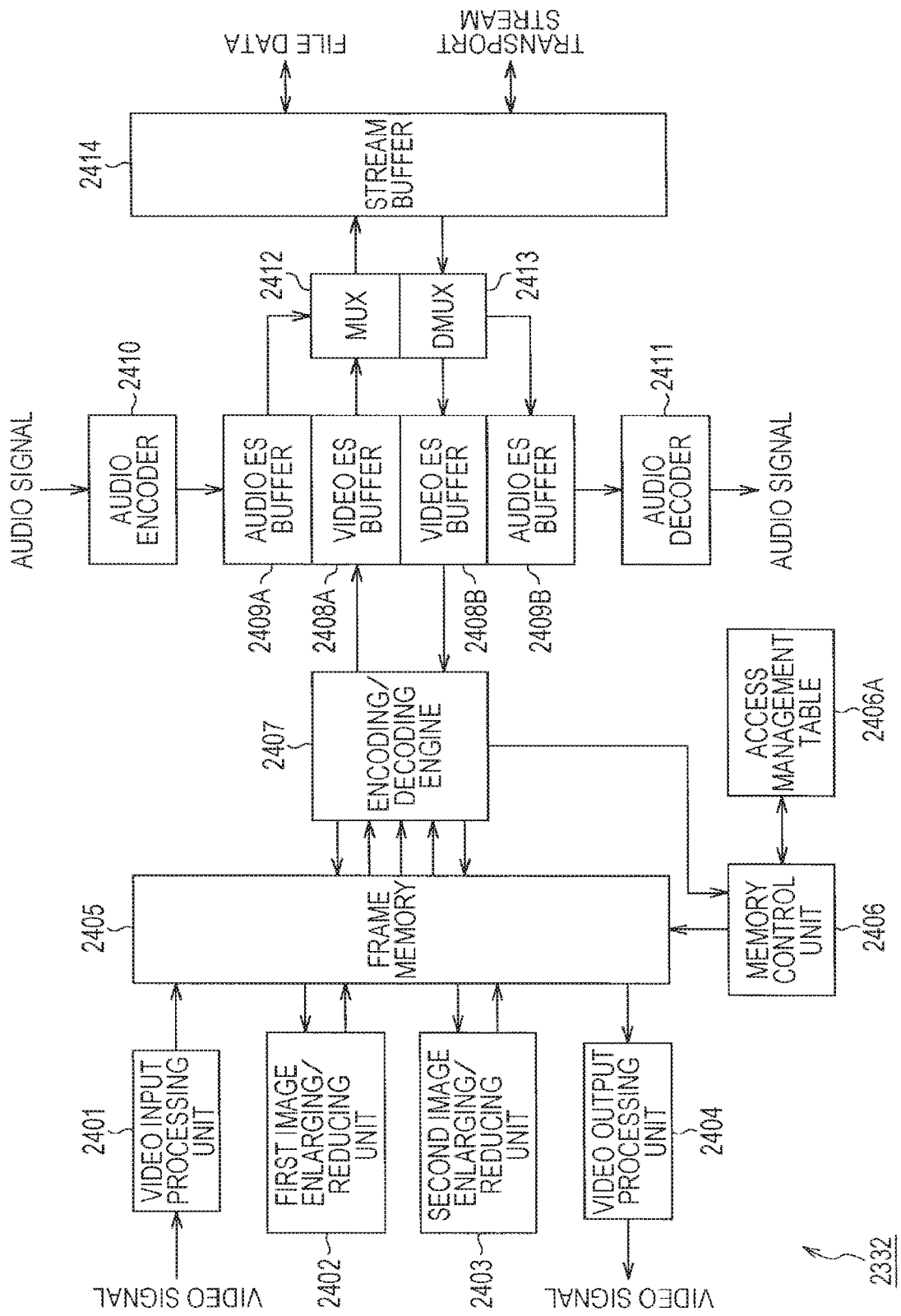
FIG. 128 is a block diagram illustrating an exemplary schematic configuration of a video processor.

FIG. 128 illustrates an exemplary schematic configuration of the video processor 2332 (FIG. 127) to which the present technology is applied.

In the case of the example of FIG. 128, the video processor 2332 has a function of receiving an input of a video signal and an audio signal and encoding the video signal and the audio signal according to a certain scheme and a function of decoding encoded video data and audio data, and reproducing and outputting a video signal and an audio signal.

The video processor 2332 includes a video input processing unit 2401, a first image enlarging/reducing unit 2402, a second image enlarging/reducing unit 2403, a video output processing unit 2404, a frame memory 2405, and a memory control unit 2406 as illustrated in FIG. 128. The video processor 2332 further includes an encoding/decoding engine 2407, video elementary stream (ES) buffers 2408A and 2408B, and audio ES buffers 2409A and 2409B. The video processor 2332 further includes an audio encoder 2410, an audio decoder 2411, a multiplexing unit (multiplexer (MUX)) 2412, a demultiplexing unit (demultiplexer (DMUX)) 2413, and a stream buffer 2414.

For example, the video input processing unit 2401 acquires a video signal input from the connectivity 2321 (FIG. 127) or the like, and converts the video signal into digital image data. The first image enlarging/reducing unit 2402 performs, for example, a format conversion process and an image enlargement/reduction process on the image data. The second image enlarging/reducing unit 2403 performs an image enlargement/reduction process on the image data according to a format of a destination to which the image data is output through the video output processing unit 2404 or performs the format conversion process and the image enlargement/reduction process which are identical to those of the first image enlarging/reducing unit 2402 on the image data. The video output processing unit 2404 performs format conversion and conversion into an analog signal on the image data, and outputs a reproduced video signal to, for example, the connectivity 2321 (FIG. 127) or the like.

The frame memory 2405 is an image data memory that is shared by the video input processing unit 2401, the first image enlarging/reducing unit 2402, the second image enlarging/reducing unit 2403, the video output processing unit 2404, and the encoding/decoding engine 2407. The frame memory 2405 is implemented as, for example, a semiconductor memory such as a DRAM.

The memory control unit 2406 receives a synchronous signal from the encoding/decoding engine 2407, and controls writing/reading access to the frame memory 2405 according to an access schedule for the frame memory 2405 written in an access management table 2406A. The access management table 2406A is updated through the memory control unit 2406 according to processing executed by the encoding/decoding engine 2407, the first image enlarging/reducing unit 2402, the second image enlarging/reducing unit 2403, or the like.

The encoding/decoding engine 2407 performs an encoding process of encoding image data and a decoding process of decoding a video stream that is data obtained by encoding image data. For example, the encoding/decoding engine 2407 encodes image data read from the frame memory 2405, and sequentially writes the encoded image data in the video ES buffer 2408A as a video stream. Further, for example, the encoding/decoding engine 2407 sequentially reads the video stream from the video ES buffer 2408B, sequentially decodes the video stream, and sequentially the decoded image data in the frame memory 2405. The encoding/decoding engine 2407 uses the frame memory 2405 as a working area at the time of the encoding or the decoding. Further, the encoding/decoding engine 2407 outputs the synchronous signal to the memory control unit 2406, for example, at a timing at which processing of each macroblock starts.

The video ES buffer 2408A buffers the video stream generated by the encoding/decoding engine 2407, and then provides the video stream to the multiplexing unit (MUX) 2412. The video ES buffer 2408B buffers the video stream provided from the demultiplexing unit (DMUX) 2413, and then provides the video stream to the encoding/decoding engine 2407.

The audio ES buffer 2409A buffers an audio stream generated by the audio encoder 2410, and then provides the audio stream to the multiplexing unit (MUX) 2412. The audio ES buffer 2409B buffers an audio stream provided from the demultiplexing unit (DMUX) 2413, and then provides the audio stream to the audio decoder 2411.

For example, the audio encoder 2410 converts an audio signal input from, for example, the connectivity 2321 (FIG. 127) or the like into a digital signal, and encodes the digital signal according to a certain scheme such as an MPEG audio scheme or an AudioCode number 3 (AC3) scheme. The audio encoder 2410 sequentially writes the audio stream that is data obtained by encoding the audio signal in the audio ES buffer 2409A. The audio decoder 2411 decodes the audio stream provided from the audio ES buffer 2409B, performs, for example, conversion into an analog signal, and provides a reproduced audio signal to, for example, the connectivity 2321 (FIG. 127) or the like.

The multiplexing unit (MUX) 2412 performs multiplexing of the video stream and the audio stream. A multiplexing method (that is, a format of a bitstream generated by multiplexing) is arbitrary. Further, at the time of multiplexing, the multiplexing unit (MUX) 2412 may add certain header information or the like to the bitstream. In other words, the multiplexing unit (MUX) 2412 may convert a stream format by multiplexing. For example, the multiplexing unit (MUX) 2412 multiplexes the video stream and the audio stream to be converted into a transport stream that is a bitstream of a transfer format. Further, for example, the multiplexing unit (MUX) 2412 multiplexes the video stream and the audio stream to be converted into data (file data) of a recording file format.

The demultiplexing unit (DMUX) 2413 demultiplexes the bitstream obtained by multiplexing the video stream and the audio stream by a method corresponding to the multiplexing performed by the multiplexing unit (MUX) 2412. In other words, the demultiplexing unit (DMUX) 2413 extracts the video stream and the audio stream (separates the video stream and the audio stream) from the bitstream read from the stream buffer 2414. In other words, the demultiplexing unit (DMUX) 2413 can perform conversion (inverse conversion of conversion performed by the multiplexing unit (MUX) 2412) of a format of a stream through the demultiplexing. For example, the demultiplexing unit (DMUX) 2413 can acquire the transport stream provided from, for example, the connectivity 2321 or the broadband modem 2333 (both FIG. 127) through the stream buffer 2414 and convert the transport stream into a video stream and an audio stream through the demultiplexing. Further, for example, the demultiplexing unit (DMUX) 2413 can acquire file data read from various kinds of recording media by, for example, the connectivity 2321 (FIG. 127) through the stream buffer 2414 and converts the file data into a video stream and an audio stream by the demultiplexing.

The stream buffer 2414 buffers the bitstream. For example, the stream buffer 2414 buffers the transport stream provided from the multiplexing unit (MUX) 2412, and provides the transport stream to, for example, the connectivity 2321 or the broadband modem 2333 (both FIG. 127) at a certain timing or based on an external request or the like.

Further, for example, the stream buffer 2414 buffers file data provided from the multiplexing unit (MUX) 2412, provides the file data to, for example, the connectivity 2321 (FIG. 127) or the like at a certain timing or based on an external request or the like, and causes the file data to be recorded in various kinds of recording media.

Furthermore, the stream buffer 2414 buffers the transport stream acquired through, for example, the connectivity 2321 or the broadband modem 2333 (both FIG. 127), and provides the transport stream to the demultiplexing unit (DMUX) 2413 at a certain timing or based on an external request or the like.

Further, the stream buffer 2414 buffers file data read from various kinds of recording media in, for example, the connectivity 2321 (FIG. 127) or the like, and provides the file data to the demultiplexing unit (DMUX) 2413 at a certain timing or based on an external request or the like.

Next, an operation of the video processor 2332 having the above configuration will be described. The video signal input to the video processor 2332, for example, from the connectivity 2321 (FIG. 127) or the like is converted into digital image data according to a certain scheme such as a 4:2:2Y/Cb/Cr scheme in the video input processing unit 2401 and sequentially written in the frame memory 2405. The digital image data is read out to the first image enlarging/reducing unit 2402 or the second image enlarging/reducing unit 2403, subjected to a format conversion process of performing a format conversion into a certain scheme such as a 4:2:0Y/Cb/Cr scheme and an enlargement/reduction process, and written in the frame memory 2405 again. The image data is encoded by the encoding/decoding engine 2407, and written in the video ES buffer 2408A as a video stream.

Further, an audio signal input to the video processor 2332 from the connectivity 2321 (FIG. 127) or the like is encoded by the audio encoder 2410, and written in the audio ES buffer 2409A as an audio stream.

The video stream of the video ES buffer 2408A and the audio stream of the audio ES buffer 2409A are read out to and multiplexed by the multiplexing unit (MUX) 2412, and converted into a transport stream, file data, or the like. The transport stream generated by the multiplexing unit (MUX) 2412 is buffered in the stream buffer 2414, and then output to an external network through, for example, the connectivity 2321 or the broadband modem 2333 (both FIG. 127). Further, the file data generated by the multiplexing unit (MUX) 2412 is buffered in the stream buffer 2414, then output to, for example, the connectivity 2321 (FIG. 127) or the like, and recorded in various kinds of recording media.

Further, the transport stream input to the video processor 2332 from an external network through, for example, the connectivity 2321 or the broadband modem 2333 (both FIG.

127) is buffered in the stream buffer 2414 and then demultiplexed by the demultiplexing unit (DMUX) 2413. Further, the file data that is read from various kinds of recording media in, for example, the connectivity 2321 (FIG. 127) or the like and then input to the video processor 2332 is buffered in the stream buffer 2414 and then demultiplexed by the demultiplexing unit (DMUX) 2413. In other words, the transport stream or the file data input to the video processor 2332 is demultiplexed into the video stream and the audio stream through the demultiplexing unit (DMUX) 2413.

The audio stream is provided to the audio decoder 2411 through the audio ES buffer 2409B and decoded, and so an audio signal is reproduced. Further, the video stream is written in the video ES buffer 2408B, sequentially read out to and decoded by the encoding/decoding engine 2407, and written in the frame memory 2405. The decoded image data is subjected to the enlargement/reduction process performed by the second image enlarging/reducing unit 2403, and written in the frame memory 2405. Then, the decoded image data is read out to the video output processing unit 2404, subjected to the format conversion process of performing format conversion to a certain scheme such as a 4:2:2Y/Cb/Cr scheme, and converted into an analog signal, and so a video signal is reproduced and output.

When the present technology is applied to the video processor 2332 having the above configuration, it is preferable that the above embodiments of the present technology be applied to the encoding/decoding engine 2407. In other words, for example, the encoding/decoding engine 2407 preferably has the functions of the image coding device and the image decoding device according to the above embodiment. Accordingly, the video processor 2332 can obtain the same effects as the effects described above with reference to FIGS. 1 to 118.

Further, in the encoding/decoding engine 2407, the present technology (that is, the functions of the image encoding devices or the image decoding devices according to the above embodiment) may be implemented by either or both of hardware such as a logic circuit or software such as an embedded program.

<Another Exemplary Configuration of Video Processor>

Figure 129:
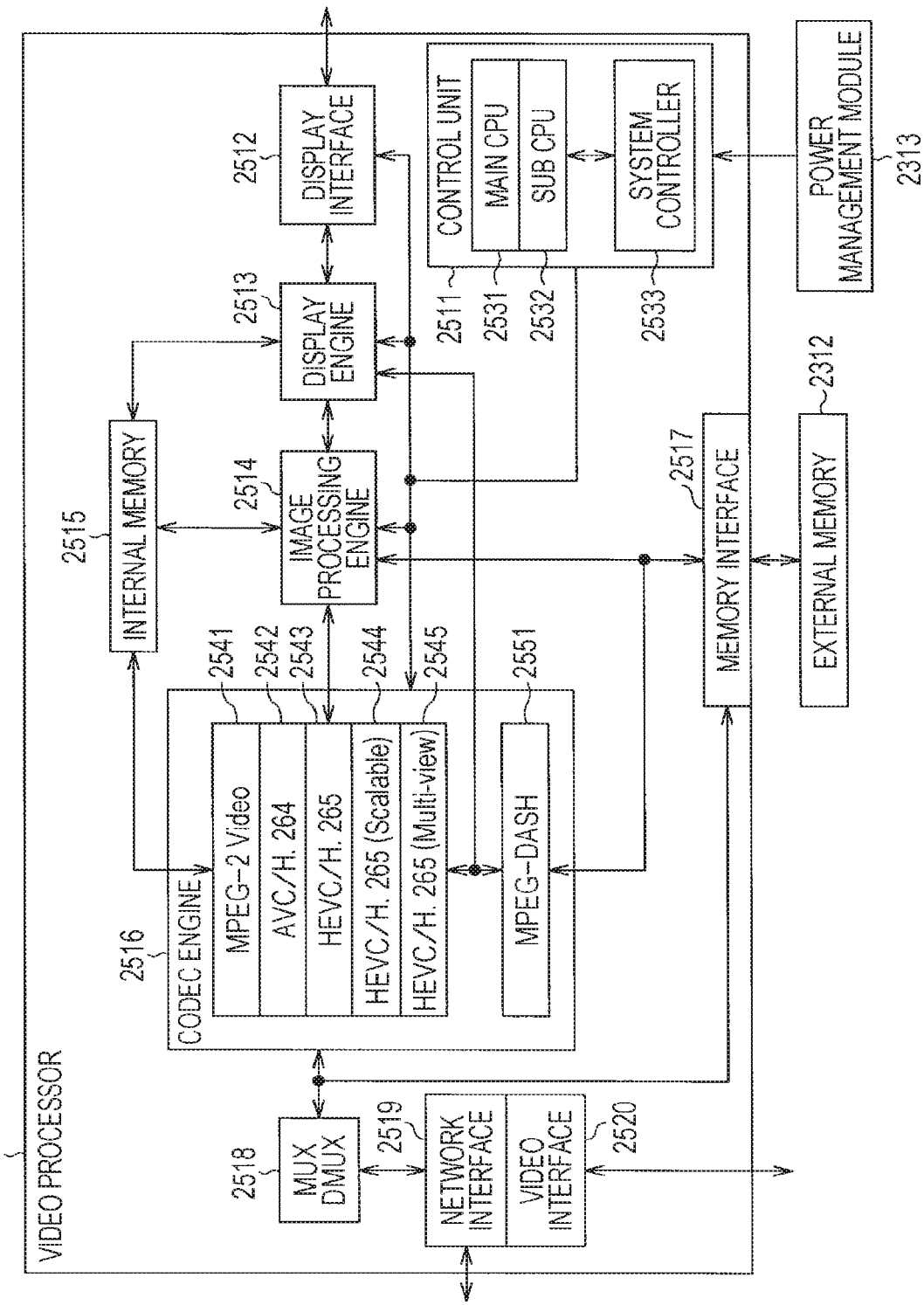
FIG. 129 is a block diagram illustrating another exemplary schematic configuration of a video processor.

FIG. 129 illustrates another exemplary schematic configuration of the video processor 2332 (FIG. 127) to which the present technology is applied. In the case of the example of FIG. 129, the video processor 2332 has a function of encoding and decoding video data according to a certain scheme.

More specifically, the video processor 2332 includes a control unit 2511, a display interface 2512, a display engine 2513, an image processing engine 2514, and an internal memory 2515 as illustrated in FIG. 129. The video processor 2332 further includes a codec engine 2516, a memory interface 2517, a multiplexing/demultiplexing unit (MUX DMUX) 2518, a network interface 2519, and a video interface 2520.

The control unit 2511 controls an operation of each processing unit in the video processor 2332 such as the display interface 2512, the display engine 2513, the image processing engine 2514, and the codec engine 2516.

The control unit 2511 includes, for example, a main CPU 2531, a sub CPU 2532, and a system controller 2533 as illustrated in FIG. 129. The main CPU 2531 executes, for example, a program for controlling an operation of each processing unit in the video processor 2332. The main CPU 2531 generates a control signal, for example, according to the program, and provides the control signal to each processing unit (that is, controls an operation of each processing unit). The sub CPU 2532 plays a supplementary role of the main CPU 2531. For example, the sub CPU 2532 executes a child process or a subroutine of a program executed by the main CPU 2531. The system controller 2533 controls operations of the main CPU 2531 and the sub CPU 2532, for examples, designates a program executed by the main CPU 2531 and the sub CPU 2532.

The display interface 2512 outputs image data to, for example, the connectivity 2321 (FIG. 127) or the like under control of the control unit 2511. For example, the display interface 2512 converts image data of digital data into an analog signal, and outputs the analog signal to, for example, the monitor device of the connectivity 2321 (FIG. 127) as a reproduced video signal or outputs the image data of the digital data to, for example, the monitor device of the connectivity 2321 (FIG. 127).

The display engine 2513 performs various kinds of conversion processes such as a format conversion process, a size conversion process, and a color gamut conversion process on the image data under control of the control unit 2511 to comply with, for example, a hardware specification of the monitor device that displays the image.

The image processing engine 2514 performs certain image processing such as a filtering process for improving an image quality on the image data under control of the control unit 2511.

The internal memory 2515 is a memory that is installed in the video processor 2332 and shared by the display engine 2513, the image processing engine 2514, and the codec engine 2516. The internal memory 2515 is used for data transfer performed among, for example, the display engine 2513, the image processing engine 2514, and the codec engine 2516. For example, the internal memory 2515 stores data provided from the display engine 2513, the image processing engine 2514, or the codec engine 2516, and provides the data to the display engine 2513, the image processing engine 2514, or the codec engine 2516 as necessary (for example, according to a request). The internal memory 2515 can be implemented by any storage device, but since the internal memory 2515 is mostly used for storage of small-capacity data such as image data of block units or parameters, it is desirable to implement the internal memory 2515 using a semiconductor memory that is relatively small in capacity (for example, compared to the external memory 2312) and fast in response speed such as a static random access memory (SRAM).

The codec engine 2516 performs processing related to encoding and decoding of image data. An encoding/decoding scheme supported by the codec engine 2516 is arbitrary, and one or more schemes may be supported by the codec engine 2516. For example, the codec engine 2516 may have a codec function of supporting a plurality of encoding/decoding schemes and perform encoding of image data or decoding of encoded data using a scheme selected from among the schemes.

In the example illustrated in FIG. 129, the codec engine 2516 includes, for example, an MPEG-2 Video 2541, an AVC/H.264 2542, a HEVC/H.265 2543, a HEVC/H.265 (Scalable) 2544, a HEVC/H.265 (Multi-view) 2545, and an MPEG-DASH 2551 as functional blocks of processing related to a codec.

The MPEG-2 Video 2541 is a functional block of encoding or decoding image data according to an MPEG-2 scheme. The AVC/H.264 2542 is a functional block of encoding or decoding image data according to an AVC scheme. The HEVC/H.265 2543 is a functional block of encoding or decoding image data according to a HEVC scheme. The HEVC/H.265 (Scalable) 2544 is a functional block of performing scalable encoding or scalable decoding on image data according to a HEVC scheme. The HEVC/H.265 (Multi-view) 2545 is a functional block of performing multi-view encoding or multi-view decoding on image data according to a HEVC scheme.

The MPEG-DASH 2551 is a functional block of transmitting and receiving image data according to an MPEG-Dynamic Adaptive Streaming over HTTP (MPEG-DASH). The MPEG-DASH is a technique of streaming a video using a HyperText Transfer Protocol (HTTP), and has a feature of selecting appropriate one from among a plurality of pieces of encoded data that differ in a previously prepared resolution or the like in units of segments and transmitting a selected one. The MPEG-DASH 2551 performs generation of a stream complying with a standard, transmission control of the stream, and the like, and uses the MPEG-2 Video 2541 to the HEVC/H.265 (Multi-view) 2545 for encoding and decoding of image data.

The memory interface 2517 is an interface for the external memory 2312. Data provided from the image processing engine 2514 or the codec engine 2516 is provided to the external memory 2312 through the memory interface 2517. Further, data read from the external memory 2312 is provided to the video processor 2332 (the image processing engine 2514 or the codec engine 2516) through the memory interface 2517.

The multiplexing/demultiplexing unit (MUX DMUX) 2518 performs multiplexing and demultiplexing of various kinds of data related to an image such as a bitstream of encoded data, image data, and a video signal. The multiplexing/demultiplexing method is arbitrary. For example, at the time of multiplexing, the multiplexing/demultiplexing unit (MUX DMUX) 2518 can not only combine a plurality of data into one but also add certain header information or the like to the data. Further, at the time of demultiplexing, the multiplexing/demultiplexing unit (MUX DMUX) 2518 can not only divide one data into a plurality of data but also add certain header information or the like to each divided data. In other words, the multiplexing/demultiplexing unit (MUX DMUX) 2518 can converts a data format through multiplexing and demultiplexing. For example, the multiplexing/demultiplexing unit (MUX DMUX) 2518 can multiplex a bitstream to be converted into a transport stream serving as a bitstream of a transfer format or data (file data) of a recording file format. Of course, inverse conversion can be also performed through demultiplexing.

The network interface 2519 is an interface for, for example, the broadband modem 2333 or the connectivity 2321 (both FIG. 127). The video interface 2520 is an interface for, for example, the connectivity 2321 or the camera 2322 (both FIG. 127).

Next, an exemplary operation of the video processor 2332 will be described. For example, when the transport stream is received from the external network through, for example, the connectivity 2321 or the broadband modem 2333 (both FIG. 127), the transport stream is provided to the multiplexing/demultiplexing unit (MUX DMUX) 2518 through the network interface 2519, demultiplexed, and then decoded by the codec engine 2516. Image data obtained by the decoding of the codec engine 2516 is subjected to certain image processing performed, for example, by the image processing engine 2514, subjected to certain conversion performed by the display engine 2513, and provided to, for example, the connectivity 2321 (FIG. 127) or the like through the display interface 2512, and so the image is displayed on the monitor.

Further, for example, image data obtained by the decoding of the codec engine 2516 is encoded by the codec engine 2516 again, multiplexed by the multiplexing/demultiplexing unit (MUX DMUX) 2518 to be converted into file data, output to, for example, the connectivity 2321 (FIG. 127) or the like through the video interface 2520, and then recorded in various kinds of recording media.

Furthermore, for example, file data of encoded data obtained by encoding image data read from a recording medium (not illustrated) through the connectivity 2321 (FIG. 127) or the like is provided to the multiplexing/demultiplexing unit (MUX DMUX) 2518 through the video interface 2520, and demultiplexed, and decoded by the codec engine 2516. Image data obtained by the decoding of the codec engine 2516 is subjected to certain image processing performed by the image processing engine 2514, subjected to certain conversion performed by the display engine 2513, and provided to, for example, the connectivity 2321 (FIG. 127) or the like through the display interface 2512, and so the image is displayed on the monitor. Further, for example, image data obtained by the decoding of the codec engine 2516 is encoded by the codec engine 2516 again, multiplexed by the multiplexing/demultiplexing unit (MUX DMUX) 2518 to be converted into a transport stream, provided to, for example, the connectivity 2321 or the broadband modem 2333 (both FIG. 127) through the network interface 2519, and transmitted to another device (not illustrated).

Further, transfer of image data or other data between the processing units in the video processor 2332 is performed, for example, using the internal memory 2515 or the external memory 2312. Furthermore, the power management module 2313 controls, for example, power supply to the control unit 2511.

When the present technology is applied to the video processor 2332 having the above configuration, it is desirable to apply the above embodiments of the present technology to the codec engine 2516. In other words, for example, it is preferable that the codec engine 2516 have a functional block of implementing the image coding device and the image decoding device according to the above embodiment. Furthermore, for example, as the codec engine 2516 operates as described above, the video processor 2332 can have the same effects as the effects described above with reference to FIGS. 1 to 118.

Further, in the codec engine 2516, the present technology (that is, the functions of the image encoding devices or the image decoding devices according to the above embodiment) may be implemented by either or both of hardware such as a logic circuit or software such as an embedded program.

The two exemplary configurations of the video processor 2332 have been described above, but the configuration of the video processor 2332 is arbitrary and may have any configuration other than the above two exemplary configuration. Further, the video processor 2332 may be configured with a single semiconductor chip or may be configured with a plurality of semiconductor chips. For example, the video processor 2332 may be configured with a three-dimensionally stacked LSI in which a plurality of semiconductors are stacked. Further, the video processor 2332 may be implemented by a plurality of LSIs.

<Application Examples to Devices>

The video set 2300 may be incorporated into various kinds of devices that process image data. For example, the video set 2300 may be incorporated into the television device 1900 (FIG. 120), the mobile telephone 1920 (FIG.

121), the recording/reproducing device 1940 (FIG. 122), the imaging device 1960 (FIG. 123), or the like. As the video set 2300 is incorporated, the devices can have the same effects as the effects described above with reference to FIGS. 1 to 118.

Further, the video set 2300 may be also incorporated into a terminal device such as the personal computer 2004, the AV device 2005, the tablet device 2006, or the mobile telephone 2007 in the data transmission system 2000 of FIG. 124, the broadcasting station 2101 or the terminal device 2102 in the data transmission system 2100 of FIG. 125, or the imaging device 2201 or the scalable encoded data storage device 2202 in the imaging system 2200 of FIG. 126. As the video set 2300 is incorporated, the devices can have the same effects as the effects described above with reference to FIGS. 1 to 118.

Further, even each component of the video set 2300 can be implemented as a component to which the present technology is applied when the component includes the video processor 2332. For example, only the video processor 2332 can be implemented as a video processor to which the present technology is applied. Further, for example, the processors indicated by the dotted line 2341 as described above, the video module 2311, or the like can be implemented as, for example, a processor or a module to which the present technology is applied. Further, for example, a combination of the video module 2311, the external memory 2312, the power management module 2313, and the front end module 2314 can be implemented as a video unit 2361 to which the present technology is applied. These configurations can have the same effects as the effects described above with reference to FIGS. 1 to 118.

In other words, a configuration including the video processor 2332 can be incorporated into various kinds of devices that process image data, similarly to the case of the video set 2300. For example, the video processor 2332, the processors indicated by the dotted line 2341, the video module 2311, or the video unit 2361 can be incorporated into the television device 1900 (FIG. 120), the mobile telephone 1920 (FIG. 121), the recording/reproducing device 1940 (FIG. 122), the imaging device 1960 (FIG. 123), the terminal device such as the personal computer 2004, the AV device 2005, the tablet device 2006, or the mobile telephone 2007 in the data transmission system 2000 of FIG. 124, the broadcasting station 2101 or the terminal device 2102 in the data transmission system 2100 of FIG. 125, the imaging device 2201 or the scalable encoded data storage device 2202 in the imaging system 2200 of FIG. 126, or the like. Further, as the configuration to which the present technology is applied is incorporated, the devices can have the same effects as the effects described above with reference to FIGS. 1 to 118, similarly to the video set 2300.

<15. Application Examples of Content Reproducing System of Mpeg-Dash>

<Application Example of MPEG-DASH>

The present technology can be also applied to a system of selecting an appropriate data from among a plurality of pieces of encoded data having different resolutions that are prepared in advance in units of segments and using the selected data, for example, a content reproducing system of HTTP streaming or a wireless communication system of the Wi-Fi standard such as MPEG DASH which will be described later.

<Overview of Content Reproducing System>

First, a content reproducing system to which the present technology is applicable will be schematically described with reference to FIGS. 130 to 132.

A basic configuration that is common in the embodiments will be described below with reference to FIGS. 130 and 131.

Figure 130:
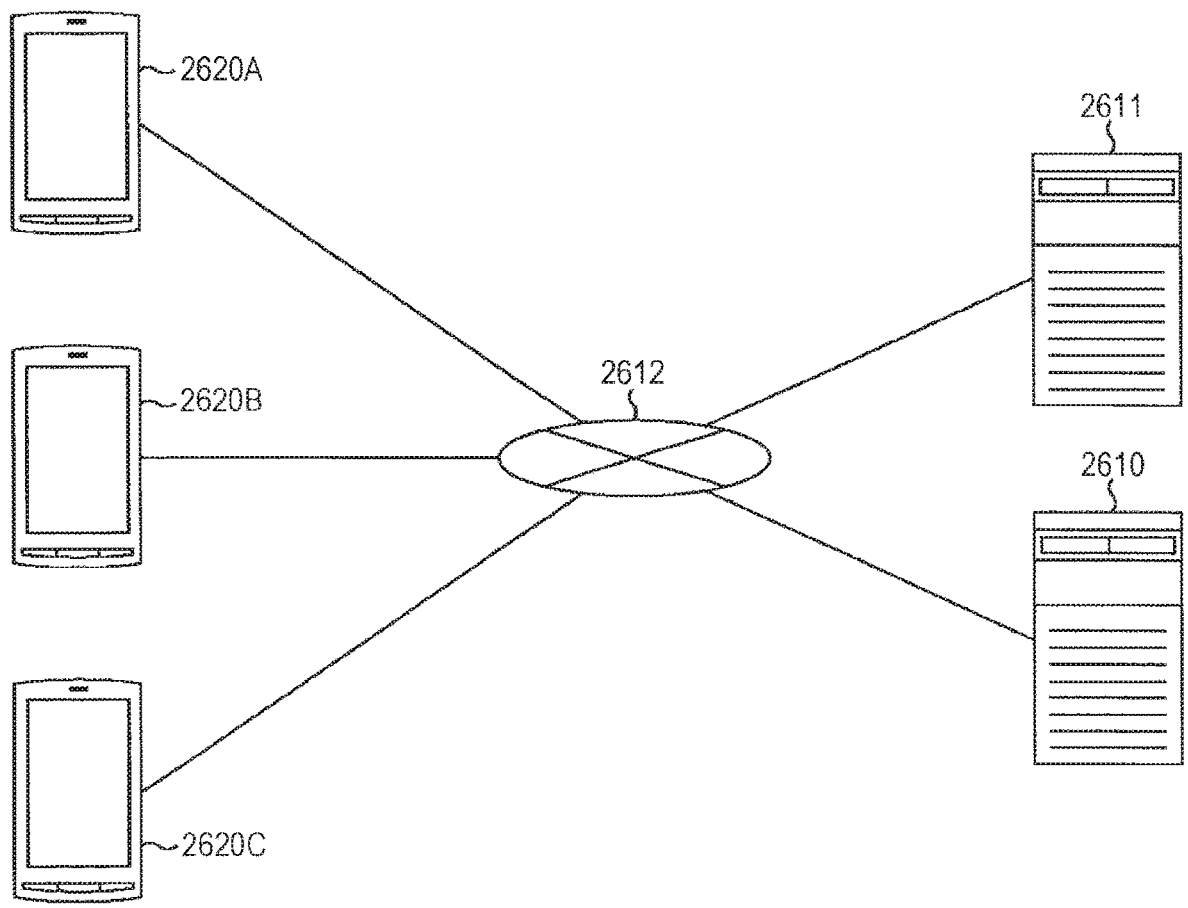
FIG. 130 is an explanatory diagram illustrating a configuration of a content reproducing system.

FIG. 130 is an explanatory diagram illustrating a configuration of a content reproducing system. The content reproducing system includes content servers 2610 and 2611, a network 2612, and a content reproducing device 2620 (a client device) as illustrated in FIG. 130.

The content servers 2610 and 2611 are connected with the content reproducing device 2620 via the network 2612. The network 2612 is a wired or wireless transmission path of information transmitted from a device connected to the network 2612.

For example, the network 2612 may include a public line network such as the Internet, a telephone line network, or a satellite communication network, various kinds of local area networks (LANs) such as the Ethernet (a registered trademark), a wide area network (WAN), or the like. Further, the network 2612 may include a dedicated line network such as an Internet protocol-virtual private network (IP-VPN).

The content server 2610 encodes content data, and generates and stores a data file including meta information of encoded data and encoded data. When the content server 2610 generates a data file of an MP4 format, encoded data corresponds to "mdat," and meta information corresponds to "moov."

Further, content data may be music data such as music, a lecture, or a radio program, video data such as a movie, a television program, a video program, a photograph, a document, a painting, and a graph, a game, software, or the like.

Here, the content server 2610 generates a plurality of data file for the same content at different bit rates. Further, in response to a content reproduction request received from the content reproducing device 2620, the content server 2611 includes information of a parameter added to a corresponding URL by the content reproducing device 2620 in a URL information of the content server 2610, and transmits the resultant information to the content reproducing device 2620. The details will be described below with reference to FIG. 131.

Figure 131:
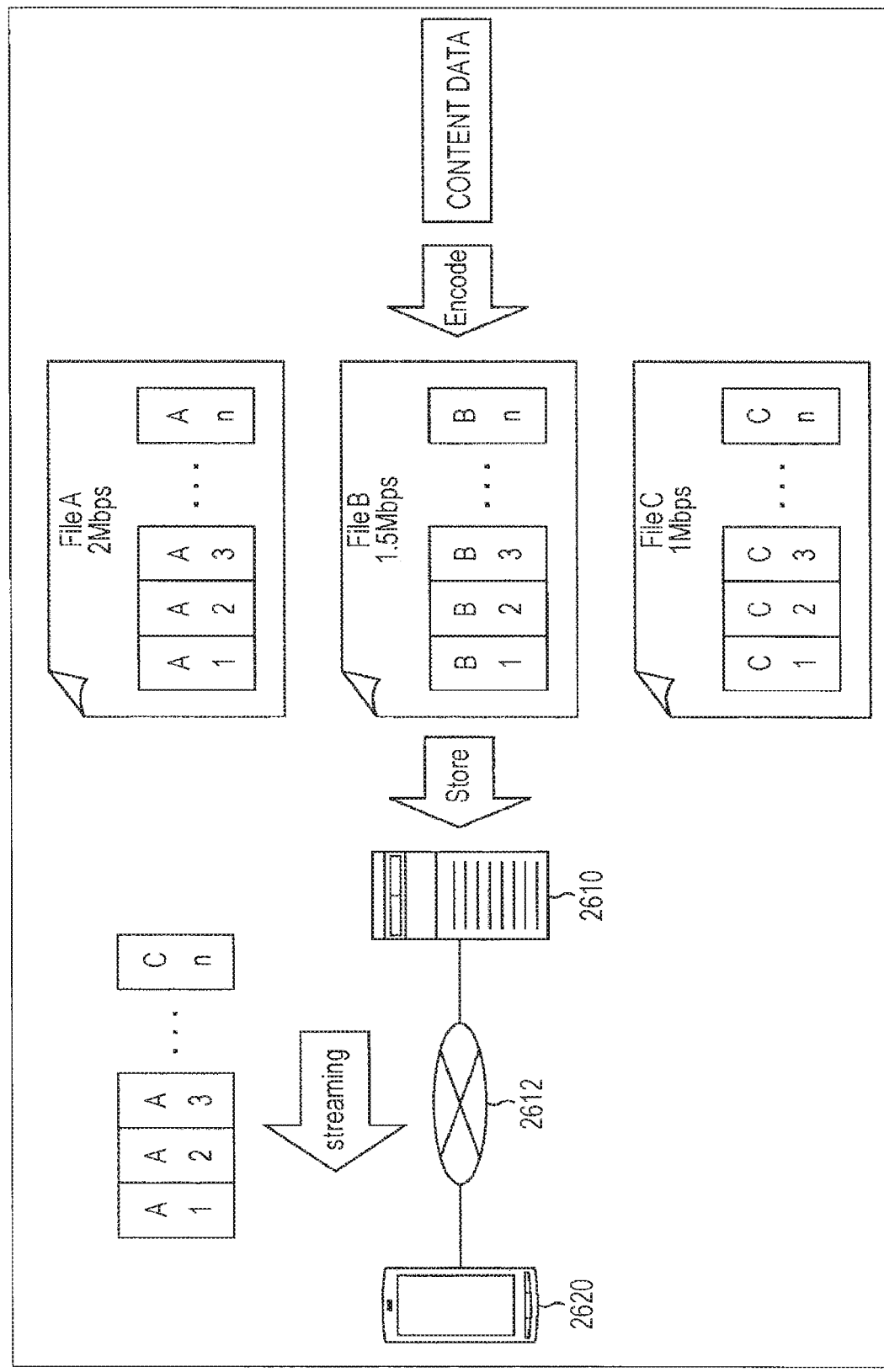
FIG. 131 is an explanatory diagram illustrating a data flow in a content reproducing system.

FIG. 131 is an explanatory diagram illustrating a data flow in the content reproducing system of FIG. 130. The content server 2610 encodes the same content data at different bit rates, and generates, for example, a file A of 2 Mbps, a file B of 1.5 Mbps, and a file C of 1 Mbps as illustrated in FIG. 131. Relatively, the file A is a high bit rate, the file B is a standard bit rate, and the file C is a low bit rate.

Further, encoded data of each file is divided into a plurality of segments as illustrated in FIG. 131. For example, encoded data of the file A is divided into segments such as "A1," "A2," "A3", . . . , and "An," encoded data of the file B is divided into segments such as "B1," "B2," "B3", . . . , and "Bn," and encoded data of the file C is divided into segments such as "C1," "C2," "C3", . . . , and "Cn."

Further, each segment may be configured with a configuration sample rather than one or more pieces of encoded video data and encoded audio data that starts from a sink sample of MP4 (for example, an IDR-picture in video coding of AVC/H.264) and is independently reproducible. For example, when video data of 30 frames per second is encoded by a Group of Picture (GOP) having a fixed length of 15 frames, each segment may be encoded video and audio data of 2 seconds corresponding to 4 GOPs or may be encoded video and audio data of 10 seconds corresponding to 20 GOPs.

Further, segments that are the same in an arrangement order in each file have the same reproduction ranges (ranges of a time position from the head of content). For example, the reproduction ranges of the segment "A2," the segment "B2," and the segment "C2" are the same, and when each segment is encoded data of 2 seconds, the reproduction ranges of the segment "A2," the segment "B2," and the segment "C2" are 2 to 4 seconds of content.

When the file A to the file C configured with a plurality of segments, the content server 2610 stores the file A to the file C. Further, as illustrated in FIG. 131, the content server 2610 sequentially transmits segments configuring different files to the content reproducing device 2620, and the content reproducing device 2620 performs streaming reproduction on the received segments.

Here, the content server 2610 according to the present embodiment transmits a play list file (hereinafter, a "media presentation description (MPD)") including bit rate information and access information of each encoded data to the content reproducing device 2620, and the content reproducing device 2620 selects any one of a plurality of bit rates based on the MPD, and requests the content server 2610 to transmit a segment corresponding to the selected bit rate.

FIG. 130 illustrates only one content server 2610, but the present disclosure is not limited to this example.

FIG. 132 is an explanatory diagram illustrating a specific example of the MPD. The MPD includes access information a plurality of pieces of encoded data having different bit rates (bandwidths) as illustrated in FIG. 132. For example, the MPD illustrated in FIG. 132 indicates that there are encoded data of 256 Kbps, encoded data of 1.024 Mbps, encoded data of 1.384 Mbps, encoded data of 1.536 Mbps, and encoded data 2.048 Mbps, and includes access information related to each encoded data. The content reproducing device 2620 can dynamically change a bit rate of encoded data that is subjected to streaming reproduction based on the MPD.

Further, FIG. 130 illustrates a mobile terminal as an example of the content reproducing device 2620, but the content reproducing device 2620 is not limited to this example. For example, the content reproducing device 2620 may be an information processing device such as a personal computer (PC), a home video processing device (a DVD recorder, a video cassette recorder (VCR), a personal digital assistants (PDA), a home-use game machine, or a household electric appliance. Further, the content reproducing device 2620 may be an information processing device such as a mobile telephone, a personal handyphone system (PHS), a portable music player, a portable video processing device, or a portable game machine.

<Configuration of Content Server 2610>

The overview of the content reproducing system has been described above with reference to FIGS. 130 to 132. Next, a configuration of the content server 2610 will be described with reference to FIG. 133.

Figure 133:
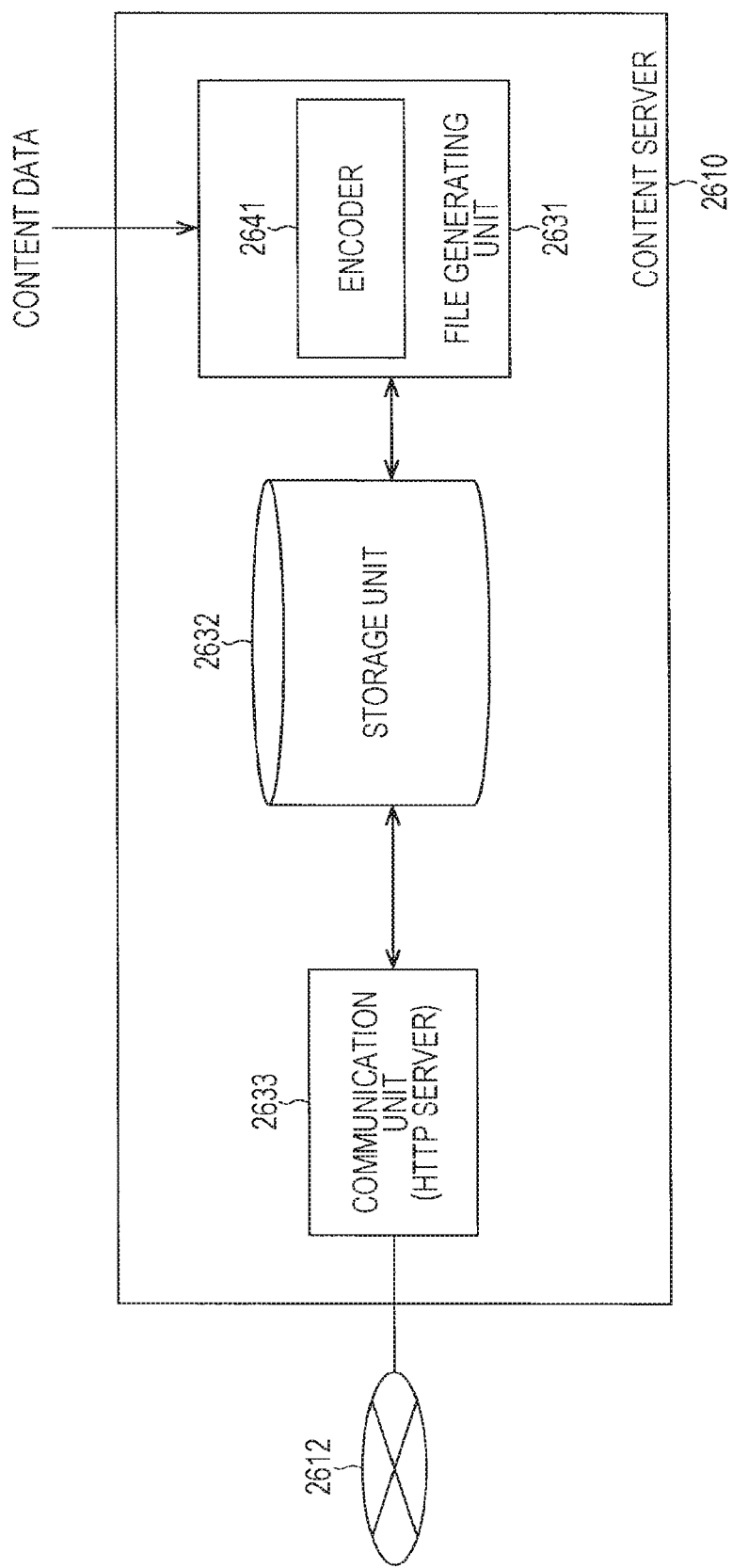
FIG. 133 is a functional block diagram illustrating a configuration of a content server of a content reproducing system.

FIG. 133 is a functional block diagram illustrating a configuration of the content server 2610. The content server 2610 includes a file generating unit 2631, a storage unit 2632, and a communication unit 2633 as illustrated in FIG. 133.

The file generating unit 2631 includes an encoder 2641 that encodes content data, and generates a plurality of pieces of encoded data having different bit rates for the same content and the MPD. For example, when encoded data of 256 Kbps, encoded data of 1.024 Mbps, encoded data of 1.384 Mbps, encoded data of 1.536 Mbps, and encoded data of 2.048 Mbps are generated, the file generating unit 2631 generates the MPD illustrated in FIG. 132.

The storage unit 2632 stores the plurality of pieces of encoded data having different bit rates and the MPD generated by the file generating unit 2631. The storage unit 2632 may be a storage medium such as a non-volatile memory, a magnetic disk, an optical disk, or a magneto optical (MO) disk. Examples of the non-volatile memory include an electrically erasable programmable read-only memory (EEPROM) and an erasable programmable ROM (EPROM). As a magnetic disk, there are a hard disk, a disk type magnetic disk, and the like. Further, as an optical disk, there are a compact disc (CD) (a digital versatile disc recordable (DVD-R), a Blu-ray Disc (BD) (a registered trademark)), and the like.

The communication unit 2633 is an interface with the content reproducing device 2620, and communicates with the content reproducing device 2620 via the network 2612. In further detail, the communication unit 2633 has a function as a HTTP server communicating with the content reproducing device 2620 according to the HTTP. For example, the communication unit 2633 transmits the MPD to the content reproducing device 2620, extracts encoded data requested based on the MPD from the content reproducing device 2620 according to the HTTP from the storage unit 2632, and transmits the encoded data to the content reproducing device 2620 as a HTTP response.

<Configuration of Content Reproducing Device 2620>

The configuration of the content server 2610 according to the present embodiment has been described above. Next, a configuration of the content reproducing device 2620 will be described with reference to FIG. 134.

Figure 134:
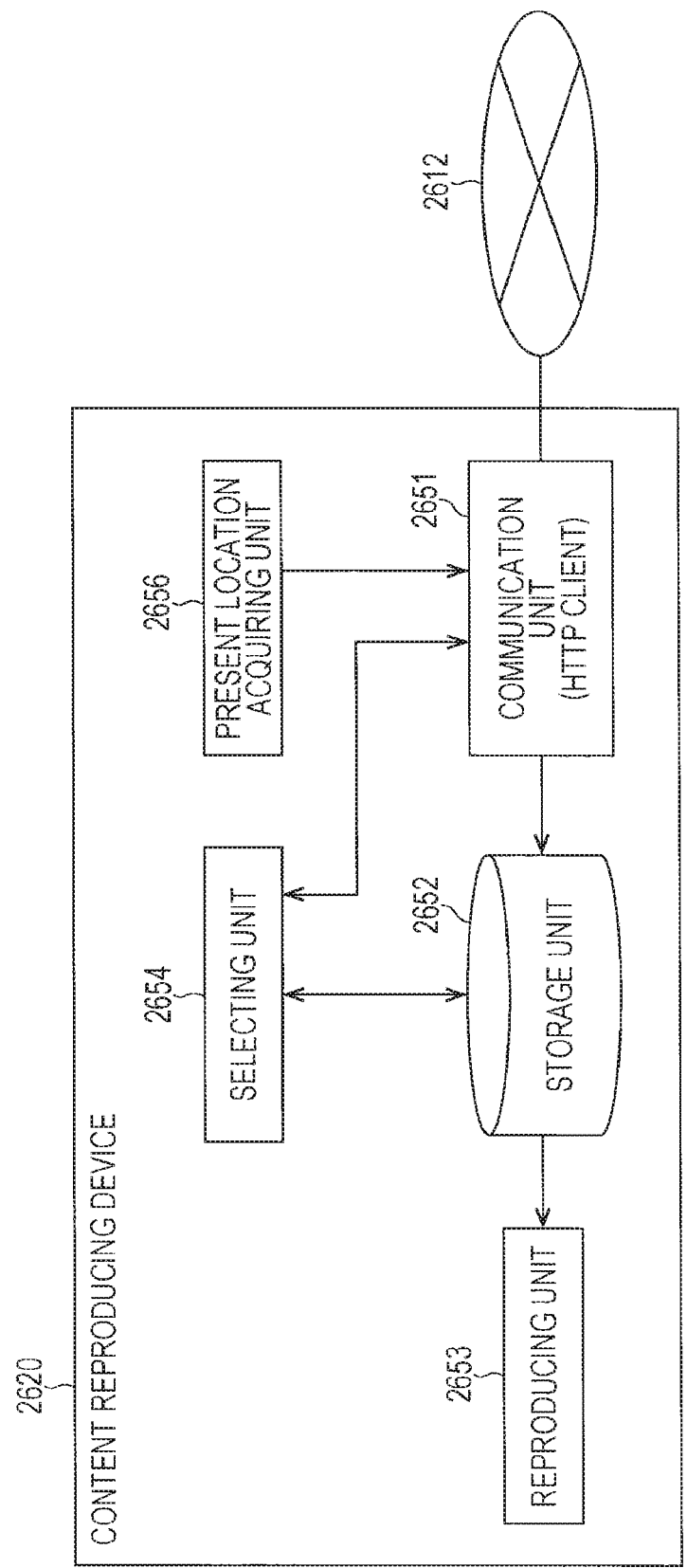
FIG. 134 is a functional block diagram illustrating a configuration of a content reproducing device of a content reproducing system.

FIG. 134 is a functional block diagram illustrating a configuration of the content reproducing device 2620. The content reproducing device 2620 includes a communication unit 2651, a storage unit 2652, a reproducing unit 2653, a selecting unit 2654, and a present location acquiring unit 2656 as illustrated in FIG. 134.

The communication unit 2651 is an interface with the content server 2610, requests the content server 2610 to transmit data, and acquires data from the content server 2610. In further detail, the communication unit 2651 has a function as a HTTP client communicating with the content reproducing device 2620 according to the HTTP. For example, the communication unit 2651 can selectively acquire the MPD and the segments of the encoded data from the content server 2610 using a HTTP range.

The storage unit 2652 stores various kinds of pieces of information related to reproduction of content. For example, the segments acquired from the content server 2610 by the communication unit 2651 are sequentially buffered. The segments of the encoded data buffered in the storage unit 2652 are sequentially supplied to the reproducing unit 2653 in a first in first out (FIFO) manner.

Further, the storage unit 2652 adds a parameter to a URL through the communication unit 2651 based on an instruction to add a parameter to a URL of content that is described in the MPD and requested from the content server 2611 which will be described later, and stores a definition for accessing the URL.

The reproducing unit 2653 sequentially reproduces the segments supplied from the storage unit 2652. Specifically, the reproducing unit 2653 performs segment decoding, DA conversion, rendering, and the like.

The selecting unit 2654 sequentially selects whether or not a segment of encoded data corresponding to any one of the bit rates included in the MPD is acquired in the same content. For example, when the selecting unit 2654 sequentially selects the segments "A1," "B2," and "A3" according to the band frequency of the network 2612, the communication unit 2651 sequentially acquires the segments "A1," "B2," and "A3" from the content server 2610 as illustrated in FIG. 131.

The present location acquiring unit 2656 may be configured with a module that acquires a current position of the content reproducing device 2620, for example, acquires a current position of a global positioning system (GPS) receiver or the like. Further, the present location acquiring unit 2656 may acquire a current position of the content reproducing device 2620 using a wireless network.

<Configuration of Content Server 2611>

Figure 135:
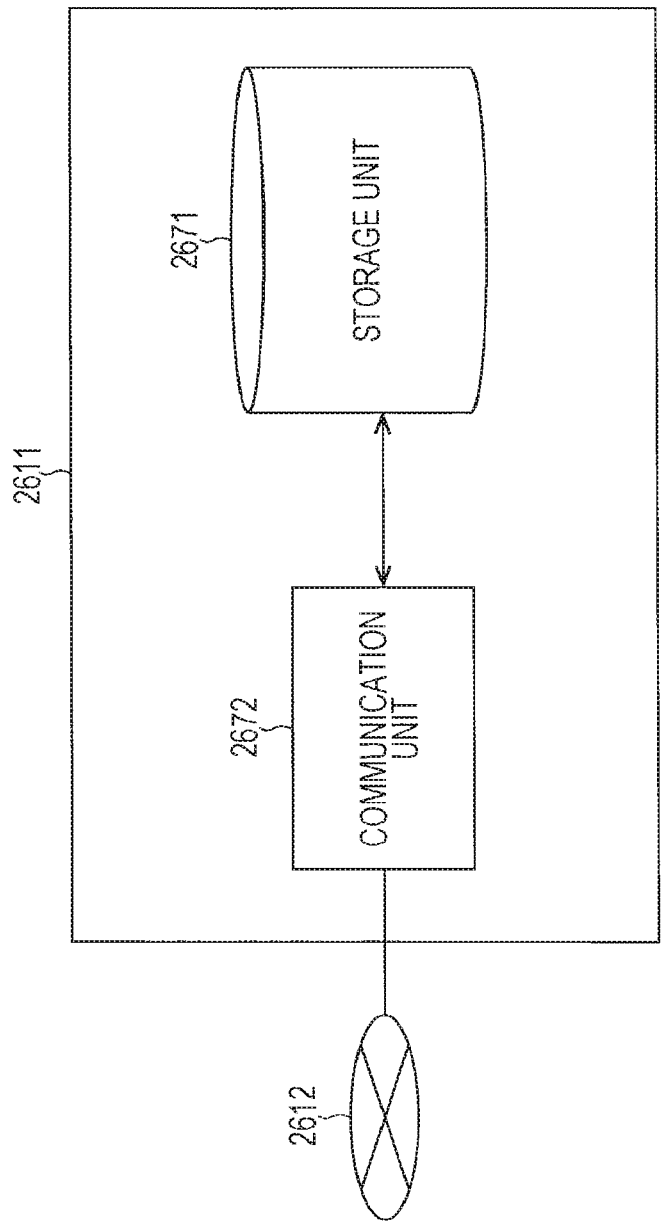
FIG. 135 is a functional block diagram illustrating a configuration of a content server of a content reproducing system.

FIG. 135 is a diagram for describing an exemplary configuration of the content server 2611. The content server 2611 includes a storage unit 2671 and a communication unit 2672 as illustrated in FIG. 135.

The storage unit 2671 stores the URL information of the MPD. The URL information of the MPD is transmitted from the content server 2611 to the content reproducing device 2620 according to the request received from the content reproducing device 2620 that requests reproduction of content. Further, when the URL information of the MPD is provided to the content reproducing device 2620, the storage unit 2671 stores definition information used when the content reproducing device 2620 adds the parameter to the URL described in the MPD.

The communication unit 2672 is an interface with the content reproducing device 2620, and communicates the content reproducing device 2620 via the network 2612. In other words, the communication unit 2672 receives the request for requesting the URL information of the MPD from the content reproducing device 2620 that requests reproduction of content, and transmits the URL information of the MPD to the content reproducing device 2620. The URL of the MPD transmitted from the communication unit 2672 includes information to which the parameter is added through the content reproducing device 2620.

Various settings can be performed on the parameter to be added to the URL of the MPD through the content reproducing device 2620 based on the definition information shared by the content server 2611 and the content reproducing device 2620. For example, information such as a current position of the content reproducing device 2620, a user ID of the user using the content reproducing device 2620, a memory size of the content reproducing device 2620, and the capacity of a storage of the content reproducing device 2620 may be added to the URL of the MPD through the content reproducing device 2620.

In the content reproducing system having the above configuration, as the present technology described above with reference to FIGS. 1 to 118 is applied, the same effects as the effects described above with reference to FIGS. 1 to 118 can be obtained.

In other words, the encoder 2641 of the content server 2610 has the function of the image coding device according to the above embodiment. Further, the reproducing unit 2653 of the content reproducing device 2620 has the function of the image decoding device according to the above embodiment. Thus, it is possible to suppress an increase in a storage capacity necessary for encoding and decoding.

Further, in the content reproducing system, as data encoded according to the present technology is transmitted and received, it is possible to suppress an increase in a storage capacity necessary for encoding and decoding.

<16. Application Examples of Wireless Communication System of Wi-Fi Standard>

<Application Examples of Wireless Communication System of Wi-Fi Standard>

A basic operation example of a wireless communication device in the wireless communication system to which the present technology is applicable will be described.

<Basic Operation Example of Wireless Communication Device>

First, wireless packets are transmitted and received until a peer to peer (P2P) connection is established, and a specific application is operated.

Then, before a connection is established through a second layer, wireless packets are transmitted and received until a specific application to be used is designated, then a P2P connection is established, and a specific application is operated. Thereafter, after a connection is established through the second layer, wireless packets for activating a specific application are transmitted and received.

<Example of Communication when Operation of Specific Application Starts>

Figure 136:
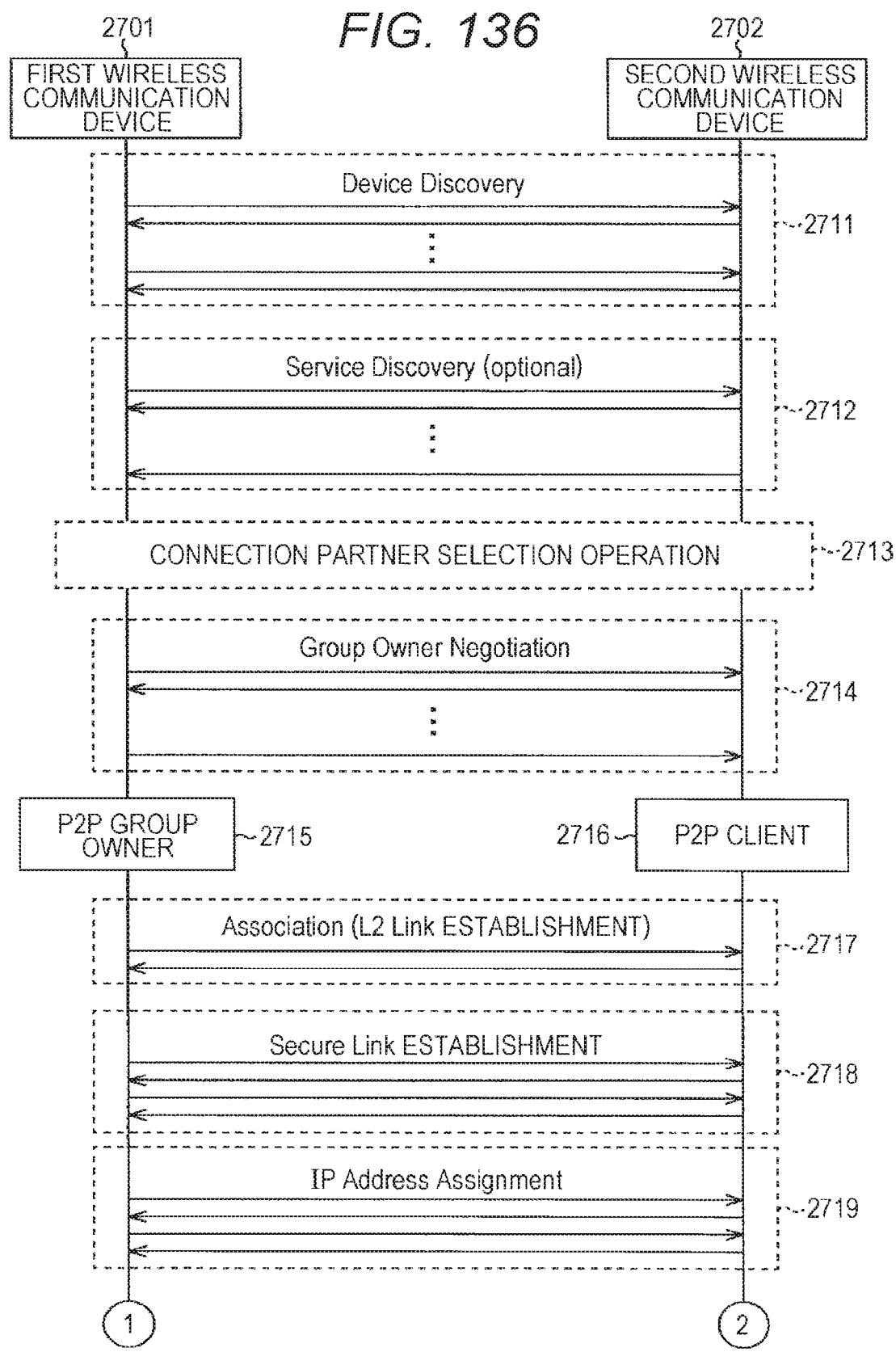
FIG. 136 is a sequence chart illustrating an exemplary communication process performed by devices of a wireless communication system.
Figure 137:
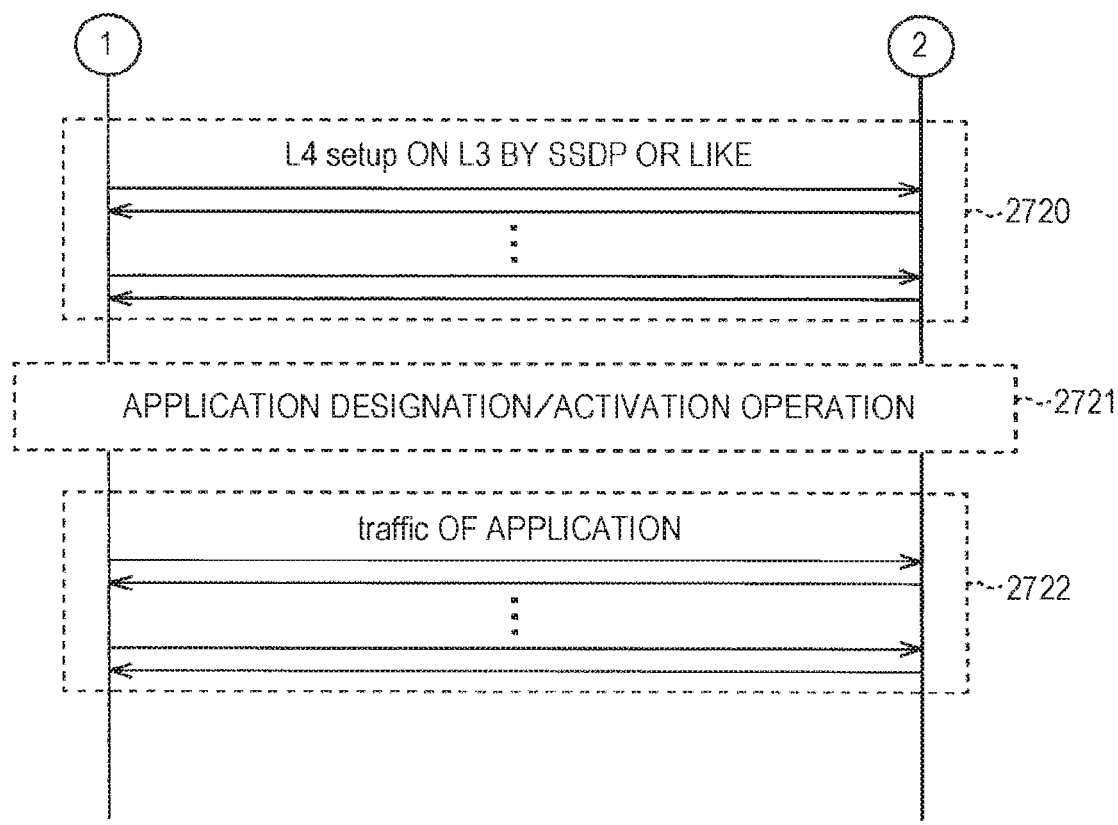
FIG. 137 is a sequence chart illustrating an exemplary communication process performed by devices of a wireless communication system.

FIG. 136 and FIG. 137 are sequence charts illustrating an exemplary communication process by devices serving as the basis of wireless communication as an example of transmission and reception of wireless packets until a Peer to Peer (P2P) connection is established, and a specific application is operated. Specifically, an exemplary direction connection establishment process of establishing a connection in the Wi-Fi direction standard (which is also referred to as "Wi-Fi P2P") standardized in the Wi-Fi Alliance is illustrated.

Here, in the Wi-Fi direct, a plurality of wireless communication devices detect the presence of the wireless communication device of the other party (device discovery and service discovery). Further, when connection device selection is performed, device authentication is performed between the selected devices through Wi-Fi protected setup (WPS), and then a direct connection is established. In the Wi-Fi direct, a plurality of wireless communication devices decide to undertakes a master device (a group owner) or a slave device (a client), and form a communication group.

Here, in this exemplary communication process, transmission and reception of some packets are not illustrated. For example, at the time of a first connection, packet exchange for using a WPS is unnecessary as described above, and packet exchange is also necessary in exchange of an authentication request/response or the like. However, in FIGS. 136 and 137, such packet exchange is not illustrated, and only a second connection and later are illustrated.

Further, in FIGS. 136 and 137, an exemplary communication process between a first wireless communication device 2701 and a second wireless communication device 2702 is illustrated, but the same applies to a communication process between other wireless communication devices.

First, the device discovery is performed between the first wireless communication device 2701 and the second wireless communication device 2702 (2711). For example, the first wireless communication device 2701 transmits a probe request (a response request signal), and receives a probe response (a response signal) to the probe request from the second wireless communication device 2702. Thus, the first wireless communication device 2701 and the second wireless communication device 2702 can discover the presence of the other party. Further, through the device discovery, it is possible to acquire a device name or a type (a TV, a PC, a smart phone, or the like) of the other party.

Then, the service discovery is performed between the first wireless communication device 2701 and the second wireless communication device 2702 (2712). For example, the first wireless communication device 2701 transmits a service discovery query of querying a service supported by the second wireless communication device 2702 discovered through the device discovery. Then, the first wireless communication device 2701 can acquire a service supported by the second wireless communication device 2702 by receiving a service discovery response from the second wireless communication device 2702. In other words, through the service discovery, it is possible to acquire, for example, a service executable by the other party. For example, the service executable by the other party is a service or a protocol (a digital living network alliance (DLNA), a digital media renderer (DMR), or the like).

Then, the user performs an operation (a connection partner selection operation) of selecting a connection partner (2713). The connection partner selection operation may be performed in only either of the first wireless communication device 2701 and the second wireless communication device 2702. For example, a connection partner selection screen is displayed on a display unit of the first wireless communication device 2701, and the second wireless communication device 2702 is selected on the connection partner selection screen as a connection partner according to the user's operation.

When the user performs the connection partner selection operation (2713), a group owner negotiation is performed between the first wireless communication device 2701 and the second wireless communication device 2702 (2714). In the example illustrated in FIGS. 136 and 137, as a result of the group owner negotiation, the first wireless communication device 2701 becomes a group owner 2715, and the second wireless communication device 2702 becomes a client 2716.

Then, processes (2717 to 2720) are performed between the first wireless communication device 2701 and the second wireless communication device 2702, and thus a direct connection is established. In other words, association (L2 (second layer) link establishment) (2717) and secure link establishment (2718) are sequentially performed. Further, IP address assignment (2719) and L4 setup (2720) on L3 by a simple the service discovery protocol (SSDP) are sequentially performed. Further, L2 (layer 2) indicates a second layer (a data link layer), L3 (layer 3) indicates a third layer (a network layer), and L4 (layer 4) indicates a fourth layer (a transport layer).

Then, the user performs a specific application designation operation or an activation operation (an application designation/activation operation) (2721). The application designation/activation operation may be performed in only either of the first wireless communication device 2701 and the second wireless communication device 2702. For example, an application designation/activation operation screen is displayed on a display unit of the first wireless communication device 2701, and a specific application is selected on the application designation/activation operation screen according to the user's operation.

When the user performs the application designation/activation operation (2721), a specific application corresponding to application designation/activation operation is executed between the first wireless communication device 2701 and the second wireless communication device 2702 (2722).

Here, a connection is considered to be performed between access point stations (AP-STAs) within a range of the specification (the specification standardized in IEEE802.11) before the Wi-Fi direct standard. In this case, it is difficult to detect a device to be connected in advance before a connection is established through the second layer (before association is performed in the terminology of IEEE802.11).

On the other hand, as illustrated in FIGS. 136 and 137, in the Wi-Fi direct, when a connection partner candidate is searched for through the device discovery or the service discovery (option), it is possible to acquire information of a connection partner. Examples of the information of the connection partner include a type of a basic device and a supported specific application. Further, it is possible to cause the user to select the connection partner based on the acquired information of the connection partner.

By extending this specification, it is also possible to implement a wireless communication system in which a specific application is designated before a connection is established through the second layer, a connection partner is selected, and the specific application is automatically activated after the selection. An example of a sequence of establishing a connection in this case is illustrated in FIG. 139. Further, an exemplary configuration of a frame format transceived in the communication process is illustrated in FIG. 138.

<Exemplary Configuration of Frame Format>

Figure 138:
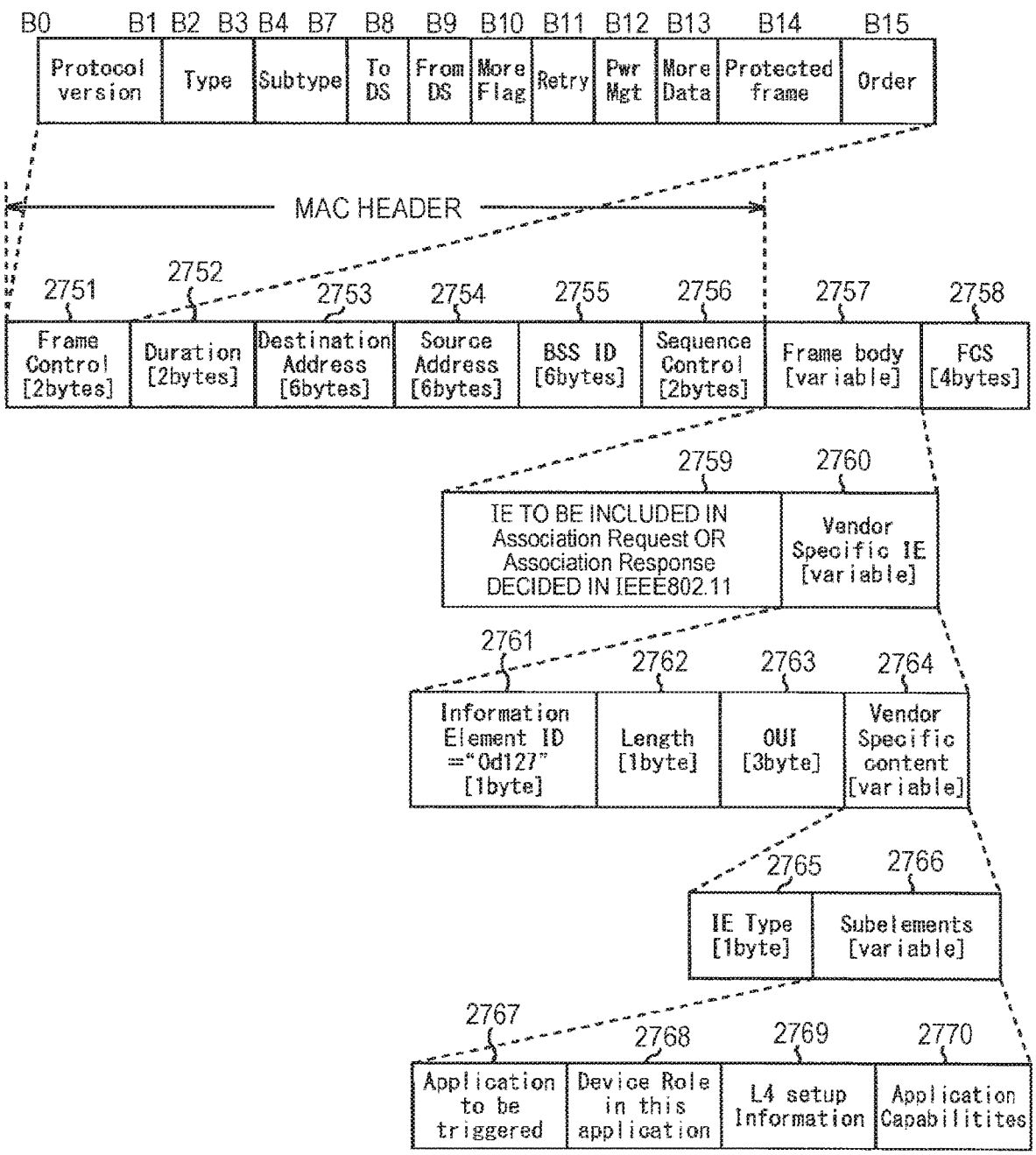
FIG. 138 is a diagram schematically illustrating an exemplary configuration of a frame format transceived in a communication process performed by devices of a wireless communication system.
Figure 139:
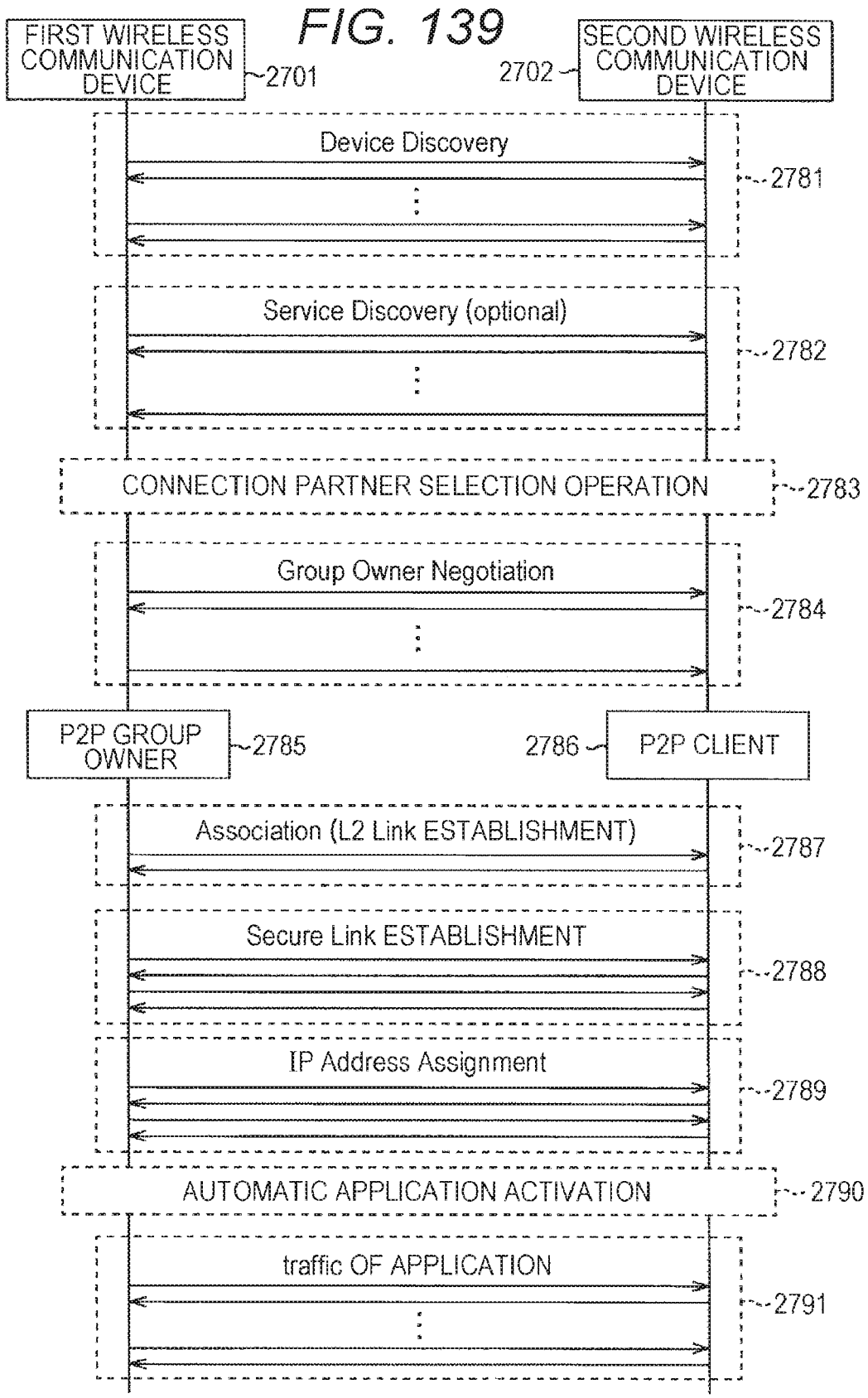
FIG. 139 is a sequence chart illustrating an exemplary communication process performed by devices of a wireless communication system.

FIG. 138 is a diagram schematically illustrating an exemplary configuration of a frame format transceived in a communication process performed by devices serving as the basis of the present technology. In other words, FIG. 138 illustrates an exemplary configuration of an MAC frame used to establish a connection through the second layer. Specifically, an example of a frame format of an association request/response (2787) for implementing the sequence illustrated in FIG. 139 is illustrated.

As illustrated in FIG. 138, an MAC frame includes a frame control (2751) to FCS (2758), and a portion range from the frame control (2751) to a sequence control (2756) serves as an MAC header. Further, when an association request is transmitted, B3B2="0b00" and B7B6B5B4="0b0000" are set in the frame control (2751). Further, when an association response is encapsulated, B3B2="0b00" and B7B6B5B4="0b0001" are set in the frame control (2751). Further, "0b00" is "00" in the binary notation, "0b0000" is "0000" in the binary notation, and "0b0001" is "0001" in the binary notation.

Here, the MAC frame (frame body (2757)) illustrated in FIG. 138 is basically an association request/response frame format described in sections 7.2.3.4 and 7.2.3.5 of the IEEE802.11-2007 specification. Here, a difference lies in that independently extended information elements (hereinafter, abbreviated as "IEs") (2759) as well as IEs defined in the IEEE 802.11 specification are included.

Further, in order to indicate a vendor specific IE (2760), 127 that is a decimal number is set to an IE type (information element ID (2761)). In this case, through section 7.3.2.26 of the IEEE802.11-2007 specification, a length field (2762) and an GUI field (2763) are subsequent, and a vendor specific content (2764) is subsequently arranged.

As content of the vendor specific content (2764), afield (IE type (2765)) indicating a type of a vendor specific IE is first set. Subsequently, a configuration capable of storing a plurality of sub elements (2766) is considered to be given.

As content of the sub element (2766), a name (2767) of a specific application to be used and a device role (2768) when the specific application operates are considered to be included. Further, information (information for L4 setup) (2769) of a specific application, a port number used for control thereof, or the like and information (capability information) (2770) related to the capability in a specific application are considered to be included. Here, for example, when a designated specific application is a DLNA, the capability information is information for specifying whether or not audio transmission/reproduction is supported, whether or not video transmission/reproduction is supported, or the like.

In the wireless communication system having the above configuration, as the present technology described above with reference to FIGS. 1 to 118 is applied, the same effects as the effects described above with reference to FIGS. 1 to 118 can be obtained. In other words, it is possible to suppress an increase in a storage capacity necessary for encoding and decoding. Further, in the wireless communication system, as transmission and reception of data encoded according to the present technology are performed, it is possible to suppress an increase in a storage capacity necessary for encoding and decoding.

In this specification, the description has been made in connection with the example in which various kinds of pieces of information as well as encoded data of image data are multiplexed into an encoded stream and transmitted from an encoding side to a decoding side. However, the technique of transmitting the information is not limited to this example. For example, the information may be transmitted or recorded as individual data associated with an encoded bit stream without being multiplexed into an encoded bit stream. Here, a term "associated" means that an image (or a part of an image such as a slice or a block) included in a bit stream can be linked with information corresponding to the image at the time of decoding. In other words, the information may be transmitted through a transmission path different from an image (or a bit stream). Further, the information may be recorded in a recording medium (or a different recording area of the same recording medium) different from an image (or a bit stream). Furthermore, for example, the information and the image (or a bit stream) may be associated with each other in arbitrary units such as units of a plurality of frames, units of frames, or units of parts of a frame.

Further, in this specification, a coding tree unit (CTU) is assumed to be a unit including a coding tree block (CTB) of an LCU (a maximum of the number of CUs) and a parameter at the time of processing on the LCU base (level). Further, a coding unit (CU) configuring a CTU is assumed to be a unit including a coding block (CB) and a parameter at the time of processing on the CU base (level).

The present technology can have the following configurations as well.

(1) An image processing device, including:
a motion compensating unit that performs motion compensation in decoding of a current layer; and
a first compressing unit that compresses a motion vector of the current layer that is reconstructed by the motion compensating unit and used for the motion compensation in decoding of another layer.

(2) The image processing device according to any of (1) to (9), further including
a second compressing unit that compresses the motion vector of the current layer reconstructed by the motion compensating unit at a compression rate higher than a compression rate of the first compressing unit,
wherein the motion compensating unit performs the motion compensation in the decoding of the current layer using the motion vector compressed by the second compressing unit.

(3) The image processing device according to (2),
wherein the second compressing unit further compresses the motion vector compressed by the first compressing unit.

(4) The image processing device according to any of (1) to (9),
wherein the motion compensating unit performs the motion compensation in the decoding of the current layer using the motion vector compressed by the first compressing unit.

(5) The image processing device according to any of (1) to (9), further including:
a receiving unit that receives a flag indicating whether or not the motion vector of the current layer used in the motion compensation in the decoding of the other layer; and
a selecting unit that selects the motion vector compressed by the first compressing unit as the motion vector of the current layer used in the motion compensation in the decoding of the other layer when the flag received through the receiving unit indicates that the motion vector is compressed, and selects the motion vector that is not compressed by the first compressing unit as the motion vector of the current layer used in the motion compensation in the decoding of the other layer when the flag received through the receiving unit indicates that the motion vector is not compressed.

(6) The image processing device according to (5),
wherein the motion compensating unit performs the motion compensation in the decoding of the current layer using the motion vector compressed by the first compressing unit regardless of a value of the flag received through the receiving unit.

(7) The image processing device according to any of (1) to (9),
wherein the first compressing unit selects a motion vector serving as a representative value from among a plurality of motion vectors reconstructed by the motion compensating unit, and compresses the motion vector of the current layer.

(8) The image processing device according to any of (1) to (9),
wherein the first compressing unit calculates a motion vector serving as a representative value using a plurality of motion vectors reconstructed by the motion compensating unit, and compresses the motion vector of the current layer.

(9) The image processing device according to any of (1) to (8),
wherein the motion compensating unit performs the motion compensation using a motion vector reconstructed in the motion compensation in the decoding of the other layer.

(10) An image processing method of an image processing device, including:
performing, by the image processing device, motion compensation in decoding of a current layer;
compressing, by the image processing device, a motion vector of the current layer that is reconstructed by the motion compensation and used in the motion compensation in decoding of another layer.

(11) An image processing device, including:
a motion predicting/compensating unit that performs motion prediction and compensation in encoding of a current layer; and
a first compressing unit that compresses a motion vector of the current layer that is generated by the motion predicting/compensating unit and used in the motion prediction and compensation in encoding of another layer.

(12) The image processing device according to any of (11) to (19), further including a second compressing unit that compresses the motion vector of the current layer generated by the motion predicting/compensating unit at a compression rate higher than a compression rate of the first compressing unit, wherein the motion predicting/compensating unit performs the motion prediction and compensation in the encoding of the current layer using the motion vector compressed by the second compressing unit.

(13) The image processing device according to (12), wherein the second compressing unit further compresses the motion vector compressed by the first compressing unit.

(14) The image processing device according to any of (11) to (19), wherein the motion predicting/compensating unit performs the motion prediction and compensation in the encoding of the current layer using the motion vector compressed by the first compressing unit.

(15) The image processing device according to any of (11) to (19), further including:

a control unit that controls whether or not the motion vector of the current layer used in the motion prediction and compensation in the encoding of the other layer is compressed;

a selecting unit that selects any one of the motion vector that is not compressed by the first compressing unit and the motion vector compressed by the first compressing unit as the motion vector of the current layer used in the motion prediction and compensation in the encoding of the other layer according to control of the control unit;

a generating unit that generates a flag indicating whether or not the motion vector of the current layer used in the motion prediction and compensation in the encoding of the other layer is compressed according to control of the control unit; and a transmitting unit that transmits the flag generated by the generating unit.

(16) The image processing device according to (15), wherein the motion predicting/compensating unit performs the motion prediction and compensation in the encoding of the current layer using the motion vector compressed by the first compressing unit regardless of control of the control unit.

(17) The image processing device according to any of (11) to (19), wherein the first compressing unit selects a motion vector serving as a representative value from among a plurality of motion vectors generated by the motion predicting/compensating unit, and compresses the motion vector of the current layer.

(18) The image processing device according to any of (11) to (19), wherein the first compressing unit calculates a motion vector serving as a representative value using a plurality of motion vectors generated by the motion predicting/compensating unit, and compresses the motion vector of the current layer.

(19) The image processing device according to any of (11) to (18), wherein the motion predicting/compensating unit performs the motion prediction and compensation using a motion vector generated in the motion prediction and compensation in the encoding of the other layer.

(20) An image processing method of an image processing device, including:

performing, by the image processing device, motion prediction and compensation in encoding of a current layer; and compressing, by the image processing device, a motion vector of the current layer that is generated by the motion prediction and compensation and used in the motion prediction and compensation in encoding of another layer.

(21) An image processing device, including:

a receiving unit that receives scalable image encoded data obtained by encoding a plurality of pieces of hierarchized image data;

a thinning processing unit that thins out an intra prediction mode on a current area of a base layer of the scalable image encoded data received by the receiving unit;

a storage unit that stores intra prediction modes of the base layer left after the thinning is performed by the thinning processing unit as a representative of the current area;

an intra predicting unit that reads the intra prediction mode of the base layer corresponding to a current block of an enhancement layer of the scalable image encoded data received by the receiving unit among the intra prediction modes of the base layer stored in the storage unit from the storage unit, performs intra prediction using the read intra prediction mode, and generates a prediction image of the current block of the enhancement layer; and a decoding unit that decodes the enhancement layer of the scalable image encoded data received by the receiving unit using the prediction image generated by the intra predicting unit.

(22) The image processing device according to any of (21) and (23) to (29), wherein the thinning processing unit sets an intra prediction mode of a block on which intra prediction is first performed in the current area as the representative of the current area, and discards an intra prediction modes of the other blocks in the current area.

(23) The image processing device according to any of (21), (22), and (24) to (29), wherein the thinning processing unit sets an intra prediction mode of a block near a center of the current area as the representative of the current area, and discards an intra prediction modes of the other blocks in the current area.

(24) The image processing device according to any of (21) to (23) and (25) to (29), wherein the receiving unit further receives a thinning rate, and the thinning processing unit thins out the intra prediction mode of the base layer at the thinning rate received by the receiving unit.

(25) The image processing device according to any of (21) to (24) and (26) to (29), wherein the thinning rate is set based on a resolution of the base layer.

(26) The image processing device according to any of (21) to (25) and (27) to (29), wherein the thinning rate is stored at a certain position of the scalable image encoded data and transmitted.

(27) The image processing device according to any of (21) to (26), (28), and (29), wherein the thinning rate is transmitted through a video parameter set.

(28) The image processing device according to any of (21) to (27) and (29),
wherein the thinning rate is transmitted through a sequence parameter set, a picture parameter set, or a slice header of the enhancement layer of the scalable image encoded data.
(29) The image processing device according to any of (21) to (28),
wherein the decoding unit decodes the base layer of the scalable image encoded data encoded according to a coding scheme different from a coding scheme of the enhancement layer of the scalable image encoded data.
(30) An image processing method, including:
receiving scalable image encoded data obtained by encoding a plurality of pieces of hierarchized image data;
thinning out an intra prediction mode on a current area of a base layer of the received scalable image encoded data;
storing intra prediction modes of the base layer left after the thinning as a representative of the current area in a storage unit;
reading the intra prediction mode of the base layer corresponding to a current block of an enhancement layer of the received scalable image encoded data among the intra prediction modes of the base layer stored in the storage unit from the storage unit, performing intra prediction using the read intra prediction mode, and generating a prediction image of the current block of the enhancement layer; and
decoding the enhancement layer of the received scalable image encoded data using the generated prediction image.
(31) An image processing device, including
a thinning processing unit that thins out an intra prediction mode on a current area of a base layer of a plurality of pieces of hierarchized image data;
a storage unit that stores intra prediction modes of the base layer left after the thinning is performed by the thinning processing unit as a representative of the current area;
an intra predicting unit that reads an intra prediction mode of the base layer corresponding to a current block of an enhancement layer of the image data among the intra prediction modes of the base layer stored in the storage unit from the storage unit, performs intra prediction using the read intra prediction mode, and generates a prediction image of the current block of the enhancement layer;
an encoding unit that encodes the enhancement layer of the image data using the prediction image generated by the intra predicting unit; and
a transmitting unit that transmits scalable image encoded data obtained by encoding the image data through the encoding unit.
(32) The image processing device according to any of (31) and (33) to (39),
wherein the thinning processing unit sets an intra prediction mode of a block on which intra prediction is first performed in the current area as the representative of the current area, and discards an intra prediction modes of the other blocks in the current area.
(33) The image processing device according to any of (31), (32), and (34) to (39),
wherein the thinning processing unit sets an intra prediction mode of a block near a center of the current area as the representative of the current area, and discards an intra prediction modes of the other blocks in the current area.
(34) The image processing device according to any of (31) to (33) and (35) to (39), further including
a thinning rate setting unit that sets a thinning rate,
wherein the thinning processing unit thins out the intra prediction mode of the base layer at the thinning rate set by the thinning rate setting unit.
(35) The image processing device according to any of (31) to (34) and (36) to (39),
wherein the thinning rate setting unit sets the thinning rate based on a resolution of the base layer.
(36) The image processing device according to any of (31) to (35) and (37) to (39),
wherein the transmitting unit stores the thinning rate at a certain position of the scalable image encoded data, and transmits the thinning rate.
(37) The image processing device according to any of (31) to (36), (38), and (39),
wherein the transmitting unit transmits the thinning rate through a video parameter set.
(38) The image processing device according to any of (31) to (37) and (39),
wherein the transmitting unit transmits the thinning rate through a sequence parameter set, a picture parameter set, or a slice header of the enhancement layer of the scalable image encoded data.
(39) The image processing device according to any of (31) to (38),
wherein the encoding unit encodes the base layer of the image data according to a coding scheme different from a coding scheme of the enhancement layer of the image data.
(40) An image processing method, including:
thinning out an intra prediction mode on a current area of a base layer of a plurality of pieces of hierarchized image data;
storing intra prediction modes of the base layer left after the thinning as a representative of the current area in a storage unit;
reading an intra prediction mode of the base layer corresponding to a current block of an enhancement layer of the image data among the intra prediction modes of the base layer stored in the storage unit from the storage unit, performing intra prediction using the read intra prediction mode, and generating a prediction image of the current block of the enhancement layer;
encoding the enhancement layer of the image data using the generated prediction image; and
transmitting scalable image encoded data obtained by encoding the image data.
(41) An image decoding device, including:
a receiving unit that receives encoded data of a current layer of image data including a plurality of layers and control information indicating a prediction direction of motion information of another layer used for decoding of a current layer of the image data;
a motion information acquiring unit that acquires the motion information of the other layer in the prediction direction indicated by the control information received by the receiving unit;
a prediction image generating unit that performs motion prediction using the motion information of the other layer in the prediction direction acquired by the motion information acquiring unit, and generates a prediction image of the current layer; and
a decoding unit that decodes the encoded data of the current layer using the prediction image generated by the prediction image generating unit.
(42) The image decoding device according to any of (41) and (43) to (49),
wherein the control information is information indicating whether or not the prediction direction is an L0 direction.
(43) The image decoding device according to any of (41), (42), and (44) to (49), wherein the control information is information indicating whether or not the prediction direction is an L1 direction.

(44) The image decoding device according to any of (41) to (43) and (45) to (49), wherein the control information is information indicating whether the prediction direction is an L0 direction or an L1 direction.

(45) The image decoding device according to any of (41) to (44) and (46) to (49), wherein the control information is information indicating the prediction direction for each of a plurality of slices obtained by dividing a picture.

(46) The image decoding device according to any of (41) to (45) and (47) to (49), wherein the receiving unit receives the control information for each of the slices.

(47) The image decoding device according to any of (41) to (46), (48), and (49), further including a converting unit that converts the prediction direction of the motion information of the other layer when the prediction direction of the motion information of the other layer acquired by the motion information acquiring unit is different from a prediction direction at the time of utilization.

(48) The image decoding device according to any of (41) to (47), and (49), wherein the converting unit further converts the motion information of the other layer acquired by the motion information acquiring unit based on the current layer.

(49) The image decoding device according to any of (41) to (48), wherein the motion information acquiring unit acquires the motion information in the prediction direction indicated by the control information in an area of the other layer corresponding to a current area of the current layer.

(50) An image decoding method, including:

receiving encoded data of a current layer of image data including a plurality of layers and control information indicating a prediction direction of motion information of another layer used for decoding of a current layer of the image data;

acquiring the motion information of the other layer in the prediction direction indicated by the received control;

performing motion prediction using the acquired motion information of the other layer in the prediction direction, and generating a prediction image of the current layer; and decoding the encoded data of the current layer using the generated prediction image.

(51) An image coding device, including:

a prediction direction setting unit that sets a prediction direction of motion information of another layer used for encoding of a current layer of image data including a plurality of layers;

a motion information acquiring unit that acquires the motion information of the other layer in the prediction direction set by the prediction direction setting unit;

a prediction image generating unit that performs motion prediction using the motion information of the other layer in the prediction direction acquired by the motion information acquiring unit, and generates a prediction image of the current layer;

an encoding unit that encodes the current layer of the image data using the prediction image generated by the prediction image generating unit; and a transmitting unit that transmits encoded data of the image data generated by the encoding unit and control information indicating the prediction direction set by the prediction direction setting unit.

(52) The image coding device according to any of (51) and (53) to (59), wherein the control information is information indicating whether or not the prediction direction set by the prediction direction setting unit is an L0 direction.

(53) The image coding device according to any of (51), (52), and (54) to (59), wherein the control information is information indicating whether or not the prediction direction set by the prediction direction setting unit is an L1 direction.

(54) The image coding device according to any of (51) to (53) and (55) to (59), wherein the control information is information indicating whether the prediction direction set by the prediction direction setting unit is an L0 direction or an L1 direction.

(55) The image coding device according to any of (51) to (54) and (56) to (59), wherein the prediction direction setting unit sets the prediction direction for each of a plurality of slices obtained by dividing a picture.

(56) The image coding device according to any of (51) to (55) and (57) to (59), wherein the transmitting unit transmits the control information for each of the slices.

(57) The image coding device according to any of (51) to (56), (58), and (59), further including, a converting unit that converts the prediction direction of the motion information of the other layer when the prediction direction of the motion information of the other layer acquired by the motion information acquiring unit is different from a prediction direction at the time of utilization.

(58) The image coding device according to any of (51) to (57) and (59), wherein the converting unit further converts the motion information of the other layer acquired by the motion information acquiring unit based on the current layer.

(59) The image coding device according to any of (51) to (58), wherein the motion information acquiring unit acquires the motion information in the prediction direction set by the prediction direction setting unit in an area of the other layer corresponding to a current area of the current layer.

(60) An image coding method, including:

setting a prediction direction of motion information of another layer used for encoding of a current layer of image data including a plurality of layers;

acquiring the motion information of the other layer in the set prediction direction;

performing motion prediction using the acquired motion information of the other layer in the prediction direction, and generating a prediction image of the current layer;

encoding the current layer of the image data using the generated prediction image; and transmitting encoded data obtained by encoding the image data and control information indicating the set prediction direction.

REFERENCE SIGNS LIST

100 Image coding device
114 Motion predicting/compensating unit
121 Motion vector compressing unit
122 Motion vector memory
200 Image decoding device
211 Motion compensating unit
221 Motion vector compressing unit
222 Motion vector memory 300 Image coding device
314 Motion predicting/compensating unit
321 Motion vector compressing unit
322 Temporal memory
323 Motion vector compressing unit
324 Motion vector memory
400 Image decoding device
411 Motion compensating unit
421 Motion vector compressing unit
422 Temporal memory
423 Motion vector compressing unit
424 Motion vector memory
500 Image coding device
514 Motion predicting/compensating unit
506 Lossless encoding unit
507 Accumulation buffer
521 Control unit
522 Flag generating unit
531 Selecting unit
532 Temporal memory
533 Motion vector compressing unit
534 Motion vector memory
535 Selecting unit
600 Image decoding device
601 Accumulation buffer
602 Lossless decoding unit
621 Control unit
631 Selecting unit
632 Temporal memory
633 Motion vector compressing unit
634 Motion vector memory
635 Selecting unit

The invention claimed is:

1. An image processing device, comprising:
motion compensating circuitry configured to performs motion compensation to generate a prediction image;
motion vector compression circuitry configured to compress an inter-layer motion vector of a collocated block in a layer direction using a same compression rate as a temporal motion vector of a collocated block in a temporal direction to generate a compressed motion vector; and
decoding circuitry configured to decode a bit stream using the prediction image.

2. The image processing device according to claim 1, further comprising:
a memory to store the compressed motion vector.

3. The image processing device according to claim 2, wherein the motion vector compression circuitry is configured to compress the inter-layer motion vector of the collocated block in the layer direction at 16×16 accuracy.

4. The image processing device according to claim 3, wherein the motion vector compression circuitry is configured to compress the inter-layer motion vector of the collocated block in the layer direction from 4×4 accuracy to 16×16 accuracy.

5. The image processing device according to claim 3, wherein the motion vector compression circuitry is configured to compress the inter-layer motion vector of the collocated block in the layer direction from 4×4 accuracy to 8×8 accuracy.

6. The image processing device according to claim 5, wherein the motion vector compression circuitry is configured to compress the inter-layer motion vector of the collocated block in the layer direction from 8×8 accuracy to 16×16 accuracy.

7. The image processing device according to claim 3, wherein the motion vector compression circuitry is configured to perform 1/16 compression on the inter-layer motion vector of the collocated block in the layer direction.

8. An image processing method, comprising:
performing motion compensation to generate a prediction image;
compressing an inter-layer motion vector of a collocated block in a layer direction using a same compression rate as a temporal motion vector of a collocated block in a temporal direction to generate a compressed motion vector; and
decoding a bit stream using the prediction image.

9. The image processing method according to claim 8, further comprising:
storing the compressed motion vector in a memory.

10. The image processing method according to claim 8, wherein said compressing comprises compressing the inter-layer motion vector of the collocated block in the layer direction at 16×16 accuracy.

11. The image processing method according to claim 10, wherein said compressing comprises compressing the inter-layer motion vector of the collocated block in the layer direction from 4×4 accuracy to 16×16 accuracy.

12. The image processing method according to claim 10, wherein said compressing comprises compressing the inter-layer motion vector of the collocated block in the layer direction from 4×4 accuracy to 8×8 accuracy.

13. The image processing method according to claim 12, wherein said compressing comprises compressing the inter-layer motion vector of the collocated block in the layer direction from 8×8 accuracy to 16×16 accuracy.

14. The image processing method according to claim 10, wherein said compressing comprises performing 1/16 compression on the inter-layer motion vector of the collocated block in the layer direction.

* * * * *